US009838095B2

(12) United States Patent
Rahman et al.

(10) Patent No.: US 9,838,095 B2
(45) Date of Patent: Dec. 5, 2017

(54) HIGHER RANK CODEBOOKS FOR ADVANCED WIRELESS COMMUNICATION SYSTEMS

(71) Applicant: Samsung Electronics Co., Ltd, Suwon-si (KR)

(72) Inventors: Md. Saifur Rahman, Richardson, TX (US); Young-Han Nam, Plano, TX (US); Eko Onggosanusi, Allen, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/214,287

(22) Filed: Jul. 19, 2016

(65) Prior Publication Data

US 2017/0041051 A1 Feb. 9, 2017

Related U.S. Application Data

(60) Provisional application No. 62/195,034, filed on Jul. 21, 2015, provisional application No. 62/200,399, (Continued)

(51) Int. Cl.
*H04B 7/0456* (2017.01)
*H04B 7/04* (2017.01)

(52) U.S. Cl.
CPC ......... *H04B 7/0456* (2013.01); *H04B 7/0482* (2013.01)

(58) Field of Classification Search
CPC .. H04B 7/0456; H04B 7/0417; H04B 7/0639; H04B 7/0486; H04B 7/0626; H04B 7/0482
See application file for complete search history.

(56) References Cited

U.S. PATENT DOCUMENTS 9,356,670 B2 * 5/2016 Ko ...................... H04B 7/0486
2013/0308715 A1 11/2013 Nam et al.
(Continued)

OTHER PUBLICATIONS

3GPP TSG-RAN WG1#82—WF on FD-MIMO codebook; Samsung, ZTE, ALU, ASB, Ericsson, CATT; Beijing China, Aug. 24-28, 2015; 7 Pages.
(Continued)

*Primary Examiner* — Vineeta Panwalkar

(57) ABSTRACT

A user equipment (UE) capable of communicating with a base station includes a plurality of antenna ports P, the UE includes a transceiver configured to receive downlink signals indicating precoder codebook parameters, the downlink signal including first and second quantities of antenna ports ($N_1$, $N_2$) indicating respective quantities of antenna ports in first and second dimensions, first and second oversampling factors ($O_1$, $O_2$) indicating respective oversampling factors for DFT beams in the first and second dimensions, and a codebook subset selection configuration among a plurality of codebook subset selection configurations, and a controller configured to determine first and second beam skip numbers ($S_1$, $S_2$) indicating respective differences of leading beam indices of two adjacent beam groups in the first and second dimensions, determine a plurality of precoding matrix indicators (PMIs) including a first PMI ($i_{1,1}$, $i_{1,2}$) and a second PMI $i_2$, based on the received downlink signals and the skip numbers ($S_1$, $S_2$), and cause the transceiver to transmit uplink signals containing the plurality of PMIs to the base station.

27 Claims, 52 Drawing Sheets

Related U.S. Application Data filed on Aug. 3, 2015, provisional application No. 62/205,445, filed on Aug. 14, 2015, provisional application No. 62/235,947, filed on Oct. 1, 2015, provisional application No. 62/238,439, filed on Oct. 7, 2015, provisional application No. 62/244,592, filed on Oct. 21, 2015, provisional application No. 62/260,060, filed on Nov. 25, 2015, provisional application No. 62/294,712, filed on Feb. 12, 2016, provisional application No. 62/208,230, filed on Aug. 21, 2015, provisional application No. 62/218,846, filed on Sep. 15, 2015.

(56) References Cited

U.S. PATENT DOCUMENTS

| | | | | |
|---|---|---|---|---|
| 2014/0328422 | A1 * | 11/2014 | Chen | H04B 7/0417 375/267 |
| 2014/0369279 | A1 | 12/2014 | Yu et al. | |

OTHER PUBLICATIONS

3GPP TSG-RAN WG1#82—WF on precoder and PMI construction for R13 FD-MIMO; Samsung, LGE, CATT Qualcomm, NTT Docomo, ZTE, Ericsson, ALU, ASB, AT&T, CMCC, KT—Beijing China, Aug. 24-28, 2015; 5 Pages.

ETSI TS 136 211 v12.6.0 (Jul. 2015) LTE; Evolved Universal Terrestrial Radio Access (E-UTRA); Physical channels and modulation (3GPP TS 36.211 version 12.6.0 Release 12) 138 Pages.

ETSI TS 136 212 v12.5.0 (Jul. 2015) LTE; Evolved Universal Terrestrial Radio Access (E-UTRA); Multiplexing and channel coding (3GPP TS 36.212 version 12.5.0 Release 12) 96 Pages.

ETSI TS 136 213 v12.6.0 (Sep. 2015) LTE; Evolved Universal Terrestrial Radio Access (E-UTRA); Physical layer procedures (3GPP TS 36.213 version 12.6.0 Release 12) 242 Pages.

The Internaional Searching Authority, "International Search Report," International Application No. PCT/KR2016/007961, dated Oct. 26, 2016, 3 pages, publisher the ISA/KR, International Application Division, Korean Intellectual Property Office, Daejeon, Republic of Korea.

Samsung, "Specification impacts and evaluation results with linear-combination codebook enhancements," RI-153407, 3GPP TSG RAN WG1 Meeting #81, Fukuoka, Japan, May 25-29, 2015, Jun. 1, 2015, 6 pages.

Ericsson, "Comparing non-precoded and beamformed CSI-RS enhancements," RI-153166, 3GPP TSG-RAN #81, Fukuoka, Japan, May 25-29, 2015, May 16, 2015, 8 pages.

Alcatel-Lucent Shanghai Bell et al., "3D Codebook Design for 3D MIMO," RI-152661, 3GPP TSG RAN WG1 Meeting #81, Fukuoka, Japan, May 25-29, 2015, May 16, 2015, 8 pages.

U.S. Office Action for U.S. Appl. No. 14/995,126, dated Mar. 1, 2017 (11 pages).

* cited by examiner

1700

5600A

Beam grouping: $(L_1,L_2) = (2,1)$
Orthogonal beam pairing: $(0,0)$, $(O_1,0)$, $(0,O_2)$, $(O_1,O_2)$

HIGHER RANK CODEBOOKS FOR ADVANCED WIRELESS COMMUNICATION SYSTEMS

CROSS-REFERENCE TO RELATED APPLICATION AND CLAIMS OF PRIORITY

This application claims priority under 35 U.S.C. §119(e) to:

U.S. Provisional Patent Application No. 62/195,034 filed on Jul. 21, 2015;

U.S. Provisional Patent Application No. 62/200,399 filed on Aug. 3, 2015;

U.S. Provisional Patent Application No. 62/205,445 filed on Aug. 14, 2015;

U.S. Provisional Patent Application No. 62/208,230 filed on Aug. 21, 2015;

U.S. Provisional Patent Application No. 62/218,846 filed on Sep. 15, 2015;

U.S. Provisional Patent Application No. 62/235,947 filed on Oct. 1, 2015;

U.S. Provisional Patent Application No. 62/238,439 filed on Oct. 7, 2015;

U.S. Provisional Patent Application No. 62/244,592 filed on Oct. 21, 2015;

U.S. Provisional Patent Application No. 62/260,060 filed on Nov. 25, 2015; and

U.S. Provisional Patent Application No. 62/294,712 filed on Feb. 12, 2016.

The above-identified provisional patent applications are hereby incorporated by reference in their entirety.

TECHNICAL FIELD

The present disclosure relates generally to a codebook design and structure associated with a two dimensional transmit antenna array. Such two dimensional arrays are associated with a type of multiple-input-multiple-output (MIMO) system often termed "full-dimension" MIMO (FD-MIMO).

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

The present disclosure relates to a pre-5th-Generation (5G) or 5G communication system to be provided for supporting higher data rates beyond 4th-Generation (4G) communication system such as Long Term Evolution (LTE).

In a first embodiment, a user equipment (UE) capable of communicating with a base station (BS) comprising a plurality of antenna ports P. The UE includes a transceiver configured to receive downlink signals indicating precoder codebook parameters, the downlink signal including first and second quantities of antenna ports ($N_1$, $N_2$) indicating respective quantities of antenna ports in first and second dimensions, first and second oversampling factors ($O_1$, $O_2$) indicating respective oversampling factors for DFT beams in the first and second dimensions, and a codebook subset selection configuration among a plurality of codebook subset selection configurations, and a controller configured to determine first and second beam skip numbers ($S_1$, $S_2$) indicating respective differences of leading beam indices of two adjacent beam groups in the first and second dimensions, determine a plurality of precoding matrix indicators (PMIs) including a first PMI pair ($i_{1,1}$, $i_{1,2}$) and a second PMI $i_2$, based on the received downlink signals and the skip numbers ($S_1$, $S_2$), and cause the transceiver to transmit uplink signals containing the plurality of PMIs to the base station, wherein the skip numbers ($S_1$, $S_2$) for rank 3 and 4 are defined as: ($S_1$, $S_2$)=(1, 1) when the codebook subset selection configuration is equal to 1;

$$(S_1, S_2) = \left(\frac{O_1}{2}, \frac{O_2}{2}\right)$$

when the codebook subset selection configuration is equal to 2;

$$(S_1, S_2) = \left(O_1, \frac{O_2}{2}\right)$$

when the codebook subset selection configuration is equal to 3; and $$(S_1, S_2) = \left(O_1, \frac{O_2}{4}\right)$$

for the codebook subset selection configuration being equal to 4, wherein the parameters ($S_1$, $S_2$) for rank 1 and 2 are defined as: ($S_1$, $S_2$)=(1, 1) when the codebook subset selection configuration is equal to 1; and ($S_1$, $S_2$)=(2, 2) when the codebook subset selection configuration is equal to 2, 3, and 4, wherein the parameters ($S_1$, $S_2$) for rank 5 to 8 are defined as: ($S_1$, $S_2$)=(1, 1) when the codebook subset selection configuration is equal to 1; and $$(S_1, S_2) = \left(\frac{O_1}{4}, \frac{O_2}{4}\right)$$

when the codebook subset selection configuration is equal to 2, 3, and 4.

A base station (BS) comprising a plurality of antenna ports p, the BS includes a transmitter configured to transmit downlink signals indicating precoder codebook parameters, the downlink signal including first and second quantities of antenna ports ($N_1$, $N_2$) indicating respective quantities of antenna ports in first and second dimensions, first and second oversampling factors ($O_1$, $O_2$) indicating respective oversampling factors for DFT beams in the first and second dimensions, and a codebook subset selection configuration among a plurality of codebook subset selection configurations, a receiver configured to receive a plurality of precoding matrix indicators (PMIs) including a first PMI pair ($i_{1,1}$, $i_{1,2}$) and a second PMI $i_2$, determined based on the received downlink signals and skip numbers $(S_1, S_2)$, and a controller configured to determine a precoder to precoding a transmission signal based on the plurality of PMIs, wherein the skip numbers $(S_1, S_2)$ for rank 3 and 4 are defined as: $(S_1, S_2)=(1, 1)$ when the codebook subset selection configuration is equal to 1;

$$(S_1, S_2) = \left(\frac{O_1}{2}, \frac{O_2}{2}\right)$$

when the codebook subset selection configuration is equal to 2;

$$(S_1, S_2) = \left(O_1, \frac{O_2}{2}\right)$$

when the codebook subset selection configuration is equal to 3; and $$(S_1, S_2) = \left(O_1, \frac{O_2}{4}\right)$$

for the codebook subset selection configuration being equal to 4, wherein the parameters $(S_1, S_2)$ for rank 1 and 2 are defined as: $(S_1, S_2)=(1, 1)$ when the codebook subset selection configuration is equal to 1; and $(S_1, S_2)=(2, 2)$ when the codebook subset selection configuration is equal to 2, 3, and 4, wherein the parameters $(S_1, S_2)$ for rank 5 to 8 are defined as: $(S_1, S_2)=(1, 1)$ when the codebook subset selection configuration is equal to 1; and $$(S_1, S_2) = \left(\frac{O_1}{4}, \frac{O_2}{4}\right)$$

when the codebook subset selection configuration is equal to 2, 3, and 4.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 57A and 56B illustrate example CSS configurations for Tables 74 and 76, respectively.

DETAILED DESCRIPTION

Figure 1:
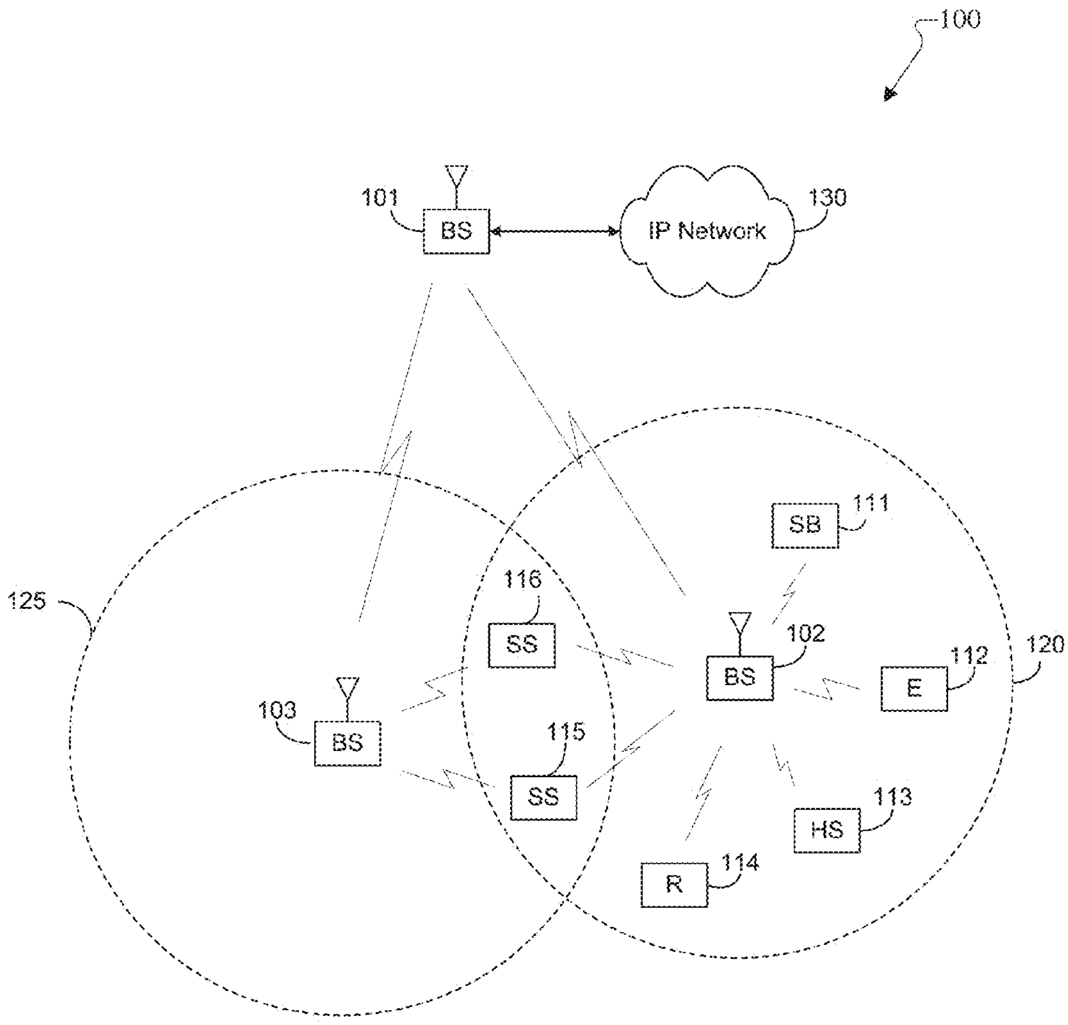
FIG. 1 illustrates an example wireless network according to this disclosure.

FIGS. 1 through 56, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated by reference into the present disclosure as if fully set forth herein: (1) 3rd generation partnership project 3GPP TS 36.211, "E-UTRA, Physical channels and modulation", Release-12; (2) 3GPP TS 36.212, "E-UTRA, Multiplexing and channel coding", Release-12; and (3) 3GPP TS 36.213, "E-UTRA, Physical layer procedures", Release-12.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) hands, e.g., 60 GHz hands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
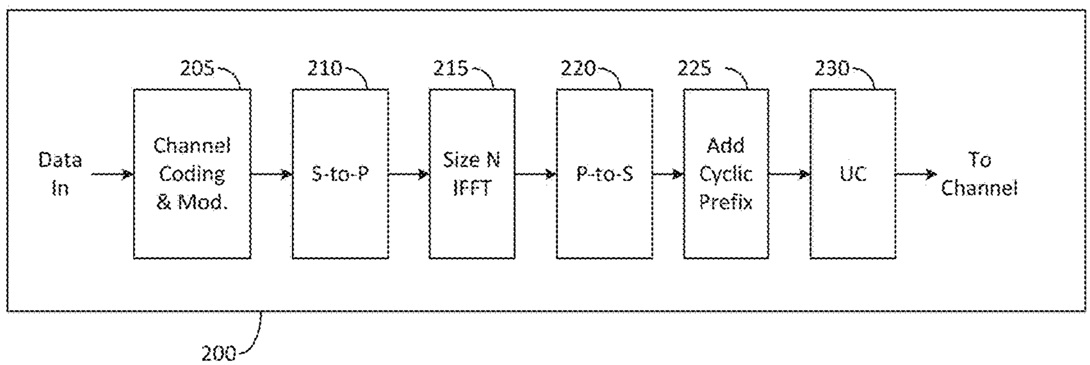
FIGS. 2A and 2B illustrate example wireless transmit and receive paths according to this disclosure.
Figure 2B:
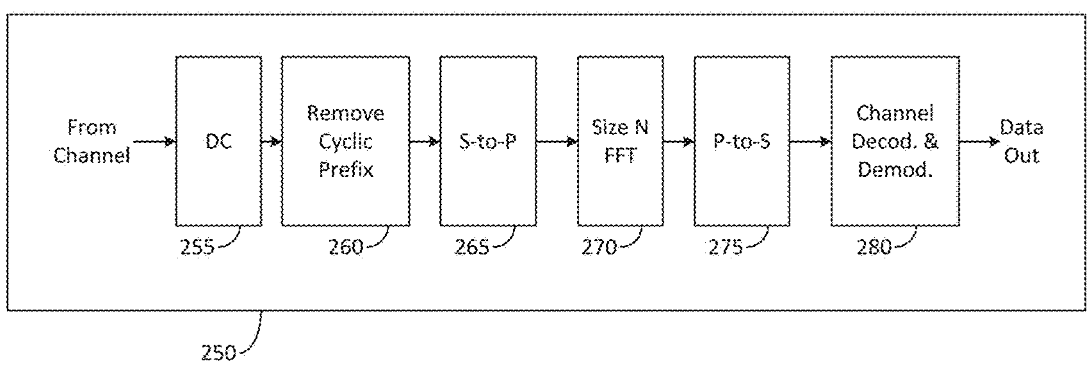

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
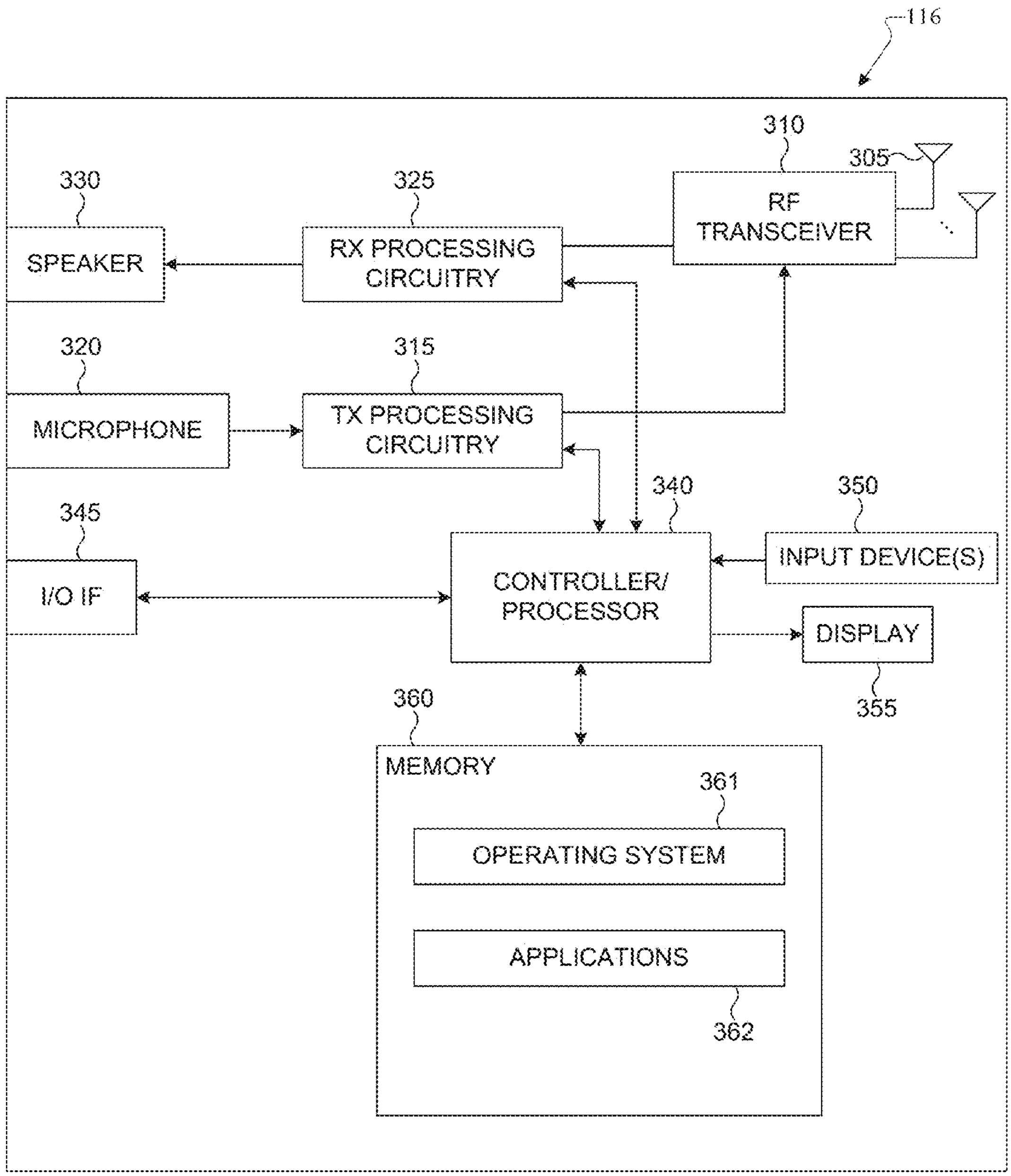
FIG. 3A illustrates an example user equipment according to this disclosure.

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for channel quality measurement and reporting for systems having 2D antenna arrays as described in embodiments of the present disclosure as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
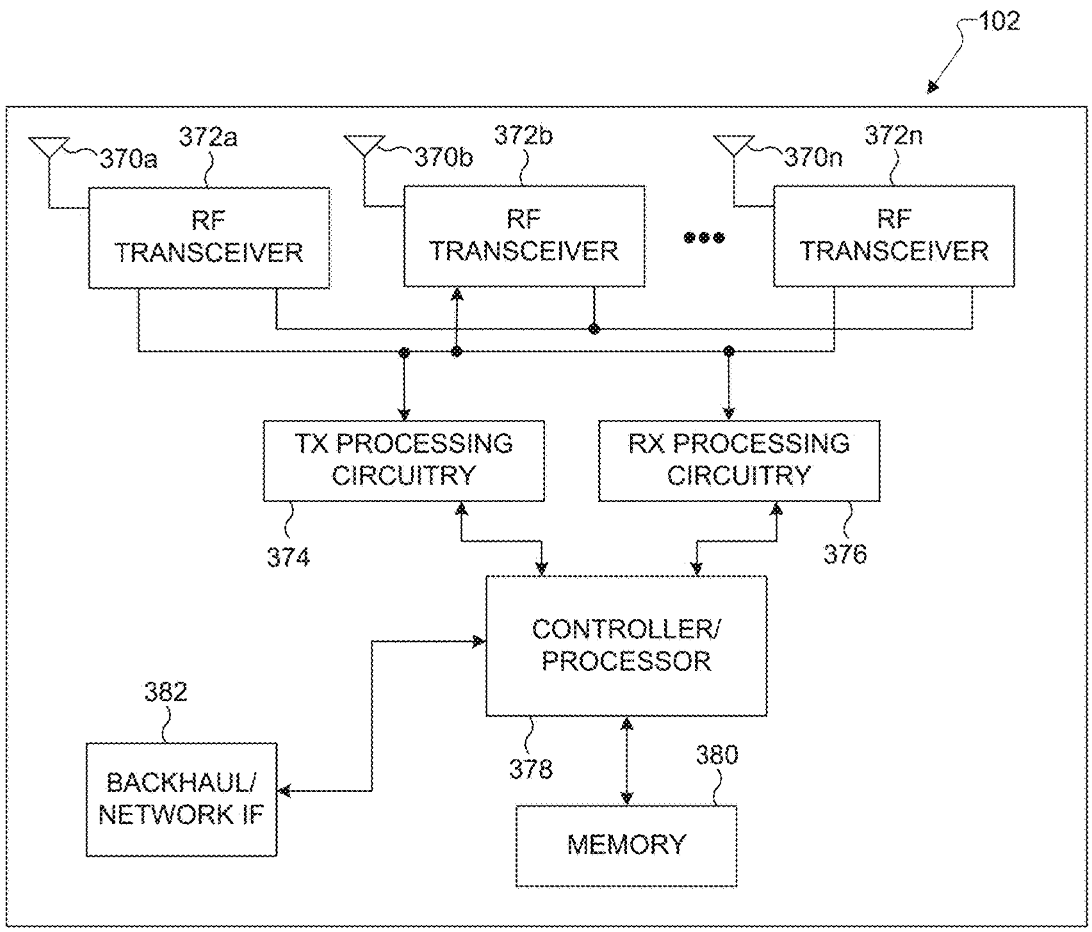
FIG. 3B illustrates an example enhanced NodeB (eNB) according to this disclosure.

FIG. 3B illustrates an example eNB 102 according to this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370*a*-370*n*, multiple RF transceivers 372*a*-372*n*, transmit (TX) processing circuitry 374, and receive (RX) processing circuitry 376. In certain embodiments, one or more of the multiple antennas 370*a*-370*n* include 2D antenna arrays. The eNB 102 also includes a controller/processor 378, a memory 380, and a backhaul or network interface 382.

The RF transceivers 372*a*-372*n* receive, from the antennas 370*a*-370*n*, incoming RF signals, such as signals transmitted by UEs or other eNBs. The RF transceivers 372*a*-372*n* down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372*a*-372*n* receive the outgoing processed baseband or IF signals from the TX processing circuitry 374 and up-converts the baseband or IF signals to RF signals that are transmitted via the antennas 370*a*-370*n*.

The controller/processor 378 can include one or more processors or other processing devices that control the overall operation of the eNB 102. For example, the controller/processor 378 could control the reception of forward channel signals and the transmission of reverse channel signals by the RF transceivers 372*a*-372*n*, the RX processing circuitry 376, and the TX processing circuitry 374 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372*a*-372*n*, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Logical Port to Antenna Port Mapping

Figure 4:
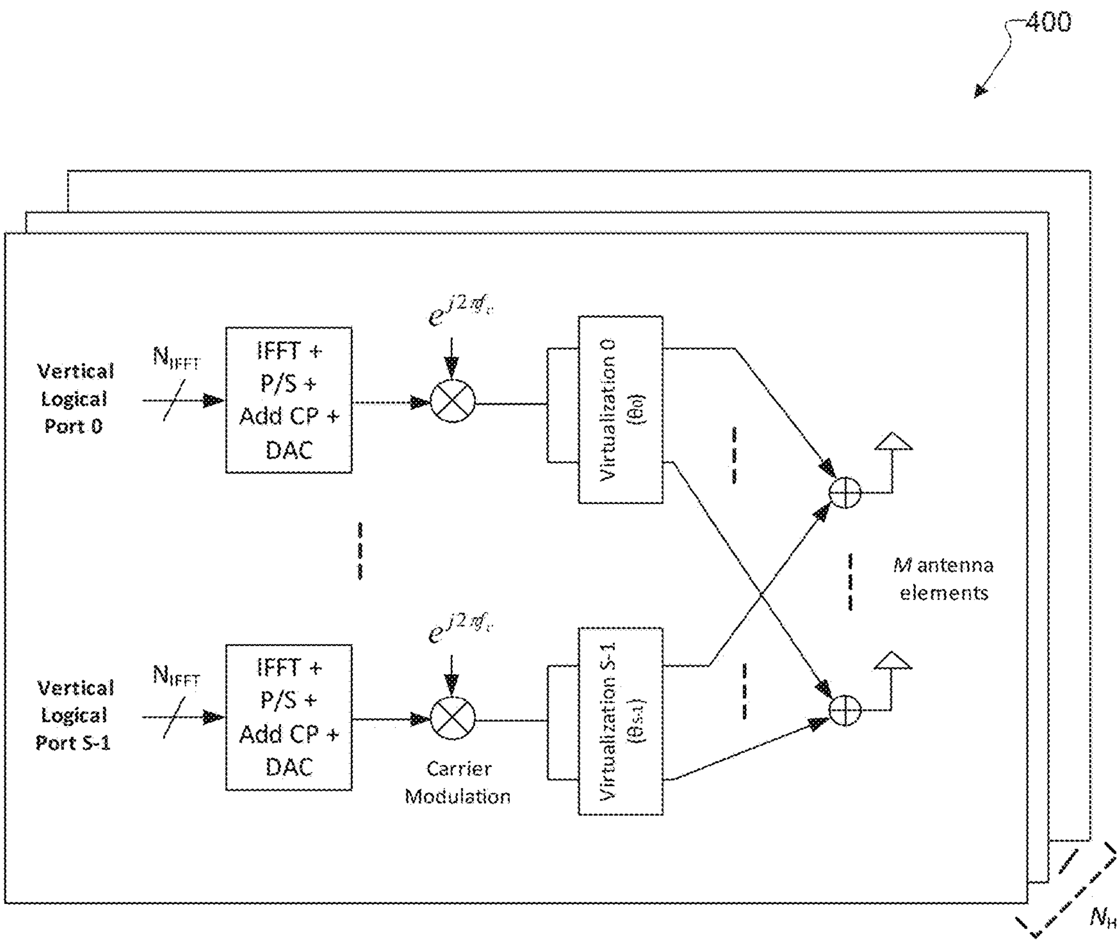
FIG. 4 illustrates logical port to antenna port mapping 400 that may be employed within the wireless communication system according to some embodiments of the current disclosure.

FIG. 4 illustrates logical port to antenna port mapping 400 that may be employed within the wireless communication system according to some embodiments of the current disclosure. The embodiment of the port mapping illustrated in FIG. 4 is for illustration only. However, port mappings come in a wide variety of configurations, and FIG. 4 does not limit the scope of this disclosure to any particular implementation of a port mapping.

FIG. 4 illustrates logical port to antenna port mapping 400, according to some embodiments of the current disclosure. In the figure, Tx signals on each logical port is fed into an antenna virtualization matrix (e.g., of a size M×1), output signals of which are fed into a set of M physical antenna ports. In some embodiments, M corresponds to a total number or quantity of antenna elements on a substantially vertical axis. In some embodiments, M corresponds to a ratio of a total number or quantity of antenna elements to S, on a substantially vertical axis, wherein M and S are chosen to be a positive integer.

Figure 5A:
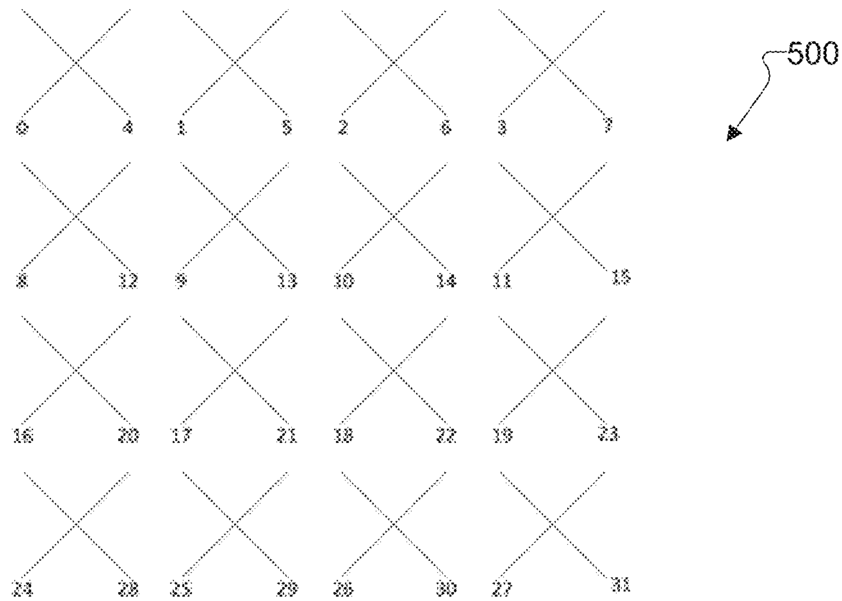
FIG. 5A illustrates a 4×4 dual-polarized antenna array 500 with antenna port (AP) indexing 1 and FIG. 5B is the same 4×4 dual-polarized antenna array 510 with antenna port indexing (AP) indexing 2 according to embodiments of the present disclosure.
Figure 5B:
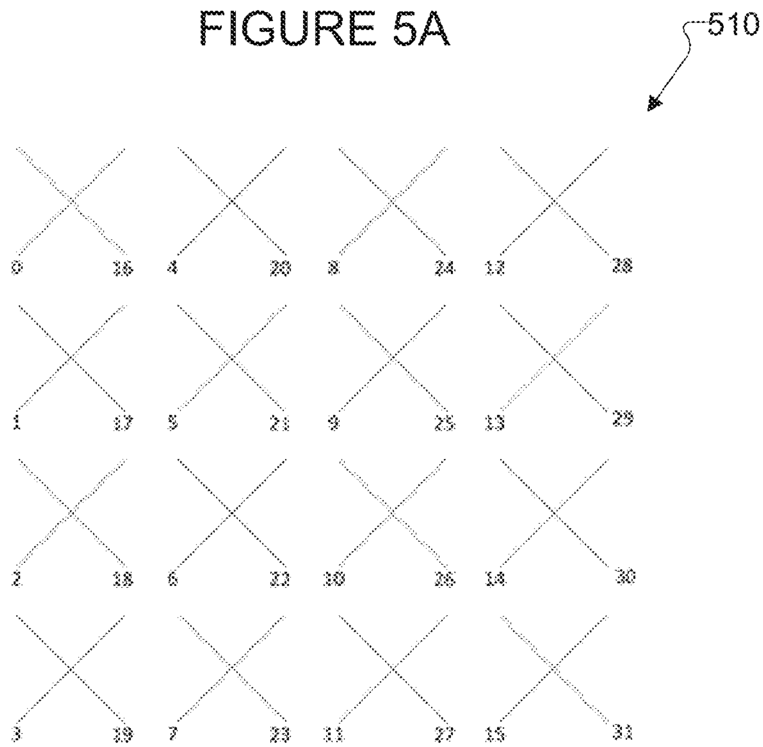

FIG. 5A illustrates a 4×4 dual-polarized antenna array 500 with antenna port (AP) indexing 1 and FIG. 5B is the same 4×4 dual-polarized antenna array 510 with antenna port indexing (AP) indexing 2.

In certain embodiments, each labelled antenna element is logically mapped onto a single antenna port. In general, one antenna port can correspond to multiple antenna elements (physical antennas) combined via a virtualization. This 4×4 dual polarized array can then be viewed as 16×2=32-element array of elements. The vertical dimension (consisting of 4 rows) facilitates elevation beamforming in addition to the azimuthal beamforming across the horizontal dimension (consisting of 4 columns of dual polarized antennas). MIMO precoding in Rel.12 LTE standardization (per TS36.211 sections 6.3.4.2 and 6.3.4.4; and TS36.213 section 7.2.4) was largely designed to offer a precoding gain for one-dimensional antenna array. While fixed beamforming (i.e. antenna virtualization) can be implemented across the elevation dimension, it is unable to reap the potential gain offered by the spatial and frequency selective nature of the channel.

Figure 6:
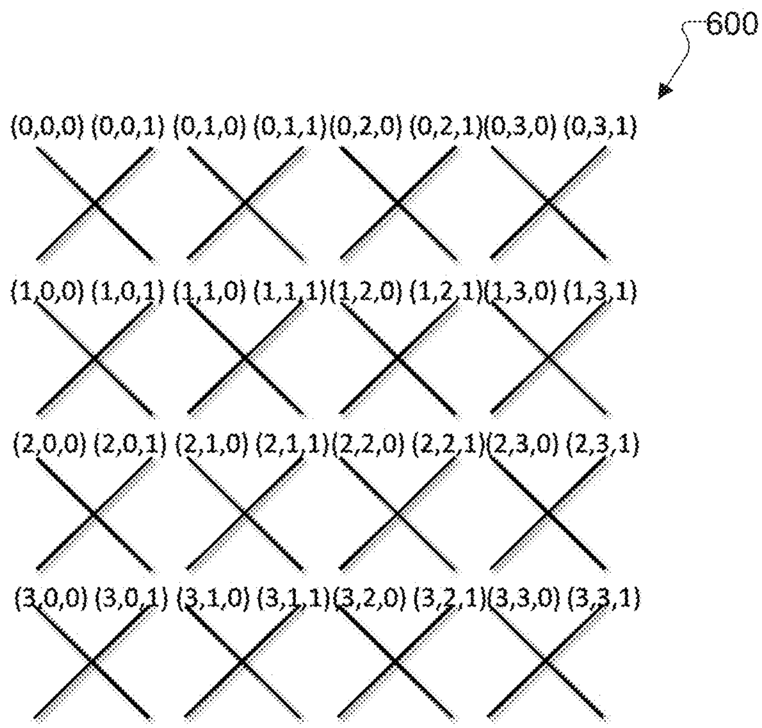
FIG. 6 illustrates numbering of TX antenna elements (or TXRU) on a dual-polarized antenna array according to embodiments of the present disclosure.

FIG. 6 illustrates another numbering of TX antenna elements (or TXRU) on a dual-polarized antenna array 600 according to embodiments of the present disclosure. The embodiment shown in FIG. 6 is for illustration only. Other embodiments could be used without departing from the scope of the present disclosure.

In certain embodiments, eNB is equipped with 2D rectangular antenna array (or TXRUs), comprising M rows and N columns with P=2 polarized, wherein each element (or TXRU) is indexed with (m, n, p), and m=0, . . . , M−1, n=0, . . . , N−1, p=0, . . . , P−1, as illustrated in FIG. 6 with M=N=4. When the example shown in FIG. 6 represents a TXRU array, a TXRU can be associated with multiple antenna elements. In one example (1-dimensional (1D) subarray partition), an antenna array comprising a column with a same polarization of a 2D rectangular array is partitioned into M groups of consecutive elements, and the M groups correspond to the M TXRUs in a column with a same polarization in the TXRU array in FIG. 6. In later embodiments, (M,N) is sometimes denoted as $(N_H, N_V)$ or $(N_1, N_2)$.

In some embodiments, a UE is configured with a CSI-RS resource comprising Q=MNP number of CSI-RS ports, wherein the CSI-RS resource is associated with MNP number of resource elements (REs) in a pair of PRBs in a subframe.

A UE is configured with a CSI-RS configuration via higher layer, configuring Q antenna ports—antenna ports A(1) through A(Q). The UE is further configured with CSI reporting configuration via higher layer in association with the CSI-RS configuration. The CSI reporting configuration includes information element (IE) indicating the CSI-RS decomposition information (or component PMI port configuration). The information element may comprise at least two integers, say $N_1$ and $N_2$, which respectively indicates a first number of antenna ports for a first dimension, and a second number of antenna ports for a second dimension, wherein $Q=N_1 \cdot N_2$.

When the UE is configured with $(N_1, N_2)$, the UE calculates CQI with a composite precoder constructed with two-component codebooks, $N_1$-Tx codebook (codebook 1) and $N_2$-Tx codebook (codebook 2). When $W_1$ and $W_2$ are respectively are precoders of codebook 1 and codebook 2, the composite precoder (of size P×(rank)) is the (column-wise) Kronecker product of the two, $W=W_1 \otimes W_2$. If PMI reporting is configured, the UE will report at least two component PMI corresponding to selected pair of $W_1$ and $W_2$.

In one method, either $W_1$ or $W_2$ is further decomposed according to the double codebook structure. For example, $W_1$ is further decomposed into:

$$W_1(n, m) = \frac{1}{p_1}\begin{bmatrix} v_m \\ \varphi_n v_m \end{bmatrix}$$

if rank 1; and $$W_1(n, m, m') = \frac{1}{p_2}\begin{bmatrix} v_m & v_{m'} \\ \varphi_n v_m & -\varphi_n v_{m'} \end{bmatrix}$$

if rank 2, wherein $p_1$ and $p_2$ are normalization factors to make total transmission power 1, $v_m$ is an m-th DFT vector out of a $(N_1/2)$-Tx DFT codebook with oversampling factor $o_1$, and $\phi_n$ is a co-phase. Furthermore, the index m, m', n determines the precoder $W_1$.

If the transmission rank is one (or number of transmission layers is one), then CQI will be derived with $$W = W_1 \otimes W_2 = \frac{1}{p_1}\begin{bmatrix} v_m \otimes W_2 \\ \varphi_n v_m \otimes W_2 \end{bmatrix};$$

and if the transmission rank is two, then CQI will be derived with $$W = W_1 \otimes W_2 |_{columnwise\ KP} = \frac{1}{p_2}\begin{bmatrix} v_m \otimes W_2 & v_{m'} \otimes W_2 \\ \varphi_n v_m \otimes W_2 & -\varphi_n v_{m'} \otimes W_2 \end{bmatrix}.$$

In one example of this method, $N_1=8$ and $N_2=4$, and the TXRUs (or the antenna ports) are numbered according to FIG. 5(*b*). In this case, $W_1$ is further decomposed into:

$$W_1(n, m) = \frac{1}{p_1}\begin{bmatrix} v_m \\ \varphi_n v_m \end{bmatrix}$$

if rank 1; and $$W_1(n, m, m') = \frac{1}{p_2}\begin{bmatrix} v_m & v_{m'} \\ \varphi_n v_m & -\varphi_n v_{m'} \end{bmatrix}$$

if rank 2, wherein $v_m$ is an m-th DFT vector out of a 4-Tx DFT codebook with oversampling factor 8; and $$\varphi_n = e^{j\frac{2\pi n}{2}}.$$

Furthermore, with one transmission layer, CQI will be derived with precoder $$W = W_1 \otimes W_2 = \frac{1}{\sqrt{8}}\begin{bmatrix} v_m \otimes W_2 \\ \varphi_n v_m \otimes W_2 \end{bmatrix};$$

and with two transmission layer, CQI will be derived with $$W = W_1 \otimes W_2 |_{columnwise\ KP} = \frac{1}{4}\begin{bmatrix} v_m \otimes W_2 & v_{m'} \otimes W_2 \\ \varphi_n v_m \otimes W_2 & -\varphi_n v_{m'} \otimes W_2 \end{bmatrix}.$$

In another method, both $W_1$ and $W_2$ are further decomposed according to the double codebook structure with two stages. The first stage codebook is used to represent WB and long-term channel, and the second stage codebook is used to represent SB and short-term channel. For example, $W_1$ and $W_2$ can be decomposed as $W_1=U_1V_1$ and $W_2=U_2V_2$, respectively, where:

$U_1$ and $U_2$ belong to the first stage codebooks $C_1^{(1)}$ and $C_2^{(1)}$; $V_1$ and $V_2$ belong to the second stage codebooks $C_1^{(2)}$ and $C_2^{(2)}$;

The double codebook $C_1=C_1^{(1)}C_1^{(2)}$ comprises of DFT vectors out of a $(N_1/2)$-Tx DFT codebook with oversampling factor $o_1$, where the first stage codebook $C_1^{(1)}$ corresponds to a set of fixed number $L_1$ of uniformly-spaced beams, and the second stage codebook $C_1^{(2)}$ corresponds to selecting one beam out of $L_1$ beams and applying a cross-polco-phase $\phi_n$; and The $C_2=C_2^{(1)}C_2^{(2)}$ comprises of DFT vectors out of a $(N_2)$-Tx DFT codebook with oversampling factor $o_2$, where the first stage codebook $C_2^{(1)}$ corresponds to a set of fixed number $L_2$ of uniformly-spaced beams, and the second stage codebook $C_2^{(2)}$ corresponds to selecting one beam out of $L_2$ beams;

In a special case, uniformly-spaced beams are consecutively-spaced beams.

A beam grouping scheme is defined in terms of two groups of parameters, one group per dimension d. A group of parameters for dimension d comprises at least one of the following parameters:

a number of antenna ports $N_d$;

an oversampling factor $o_d$;

a skip number $s_d$; (for the first stage codebook $C_d^{(1)}$)

a beam offset number $f_d$;

a beam spacing number $p_d$; (for the second stage codebook $C_d^{(2)}$) and a number of beams $L_d$.

A beam group indicated by a first PMI $i_{1,d}$ of dimension d (corresponding to $C_d^{(1)}$), is determined based upon these six parameters. The total number of beams is $N_d \cdot o_d$; and the beams are indexed by an integer $m_d$, wherein beam $m_d$, $v_{m_d}$, corresponds to a precoding vector $$v_{m_d} = \left[1 \; e^{j\frac{2\pi m_d}{o_d N_d}} \; \ldots \; e^{j\frac{2\pi m_d (N_d-1)}{o_d N_d}}\right]^t,$$

$m_d=0, \ldots, N_d \cdot o_d/k_d-1$, where $k_1=2$ and $k_2=1$, if cross-pol is considered in the first dimension, or $k_1=1$ and $k_2=2$, if cross-pol is considered in the second dimension.

The first PMI $i_{1,d}$ of dimension d, where $i_{1,d}=0, \ldots, N_d \cdot o_d/s_d-1$, can indicate any of $L_d$ beams indexed by:

$$m_d=f_d+s_d \cdot i_{1,d}, f_d+s_d \cdot i_{1,d}+p_d, \ldots f_d+s_d \cdot i_{1,d}+(L_d-1)p_d.$$

These $L_d$ beams are referred to as a beam group.

Later in this disclosure, the dimension d={1,2} and d={H, V} are used interchangeably for simplicity.

In one example, $N_1=8$ and $N_2=4$, and the TXRUs (or the antenna ports) are numbered according to FIG. 5B.

Figure 7:
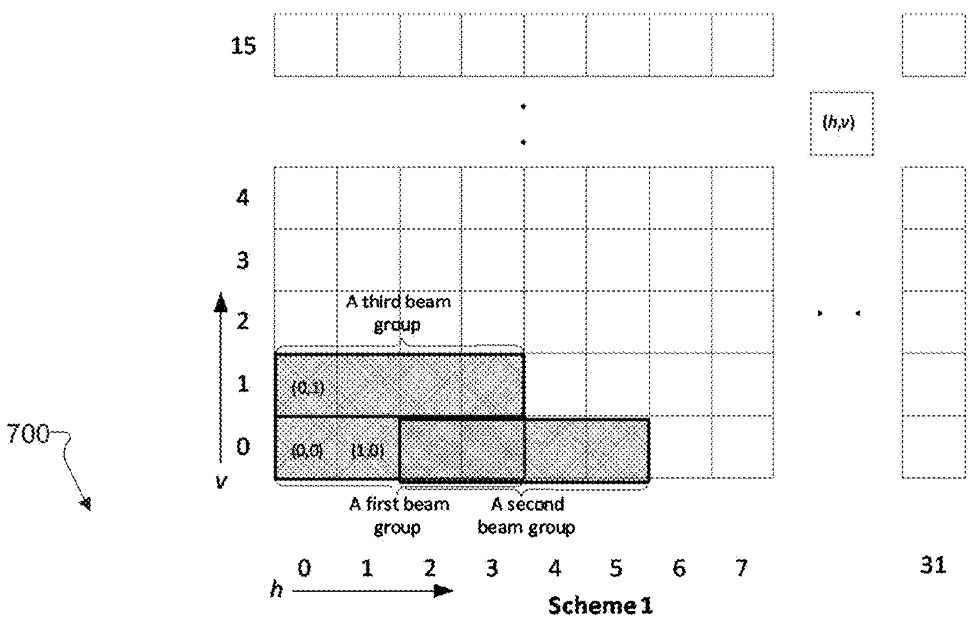
FIG. 7 illustrates beam grouping scheme, referred to as Scheme 1 according to embodiments of the present disclosure.

FIG. 7 illustrates beam grouping scheme 700, referred to as Scheme 1 according to embodiments of the present disclosure.

Figure 8:
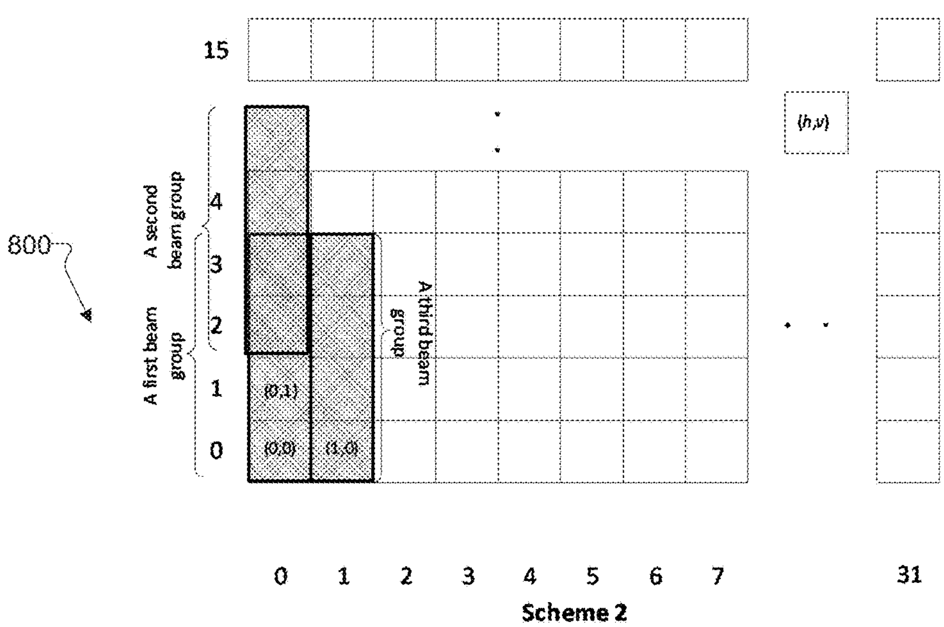
FIG. 8 illustrates beam grouping scheme, referred to as Scheme 2 according to embodiments of the present disclosure.

FIG. 8 illustrates beam grouping scheme 800, referred to as Scheme 2 according to embodiments of the present disclosure.

Figure 9:
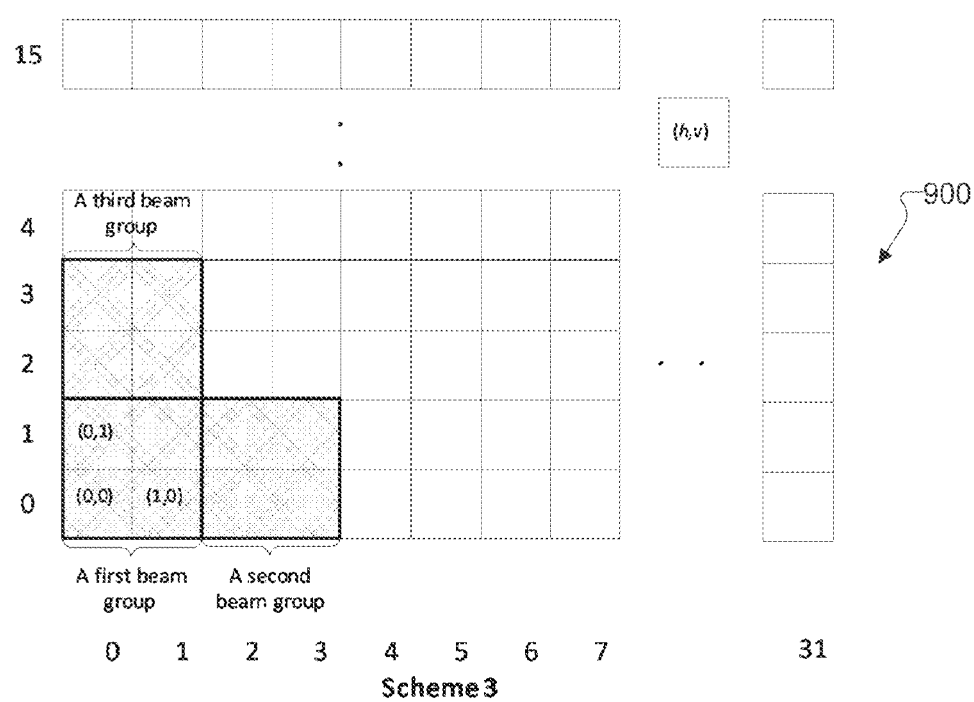
FIG. 9 illustrates beam grouping scheme, referred to as Scheme 3 according to embodiments of the present disclosure.

FIG. 9 illustrates beam grouping scheme 900, referred to as Scheme 3 according to embodiments of the present disclosure.

The related parameters for each beam scheme are listed in Table 1.

TABLE 1

Parameters for three example beam grouping schemes

| | A first oversampling factor $o_1$ for the first dimension | A first beam spacing $p_1$ for the first dimension | A first number of beams $L_1$ for the first dimension | A second oversampling factor $o_2$ for the second dimension | A second beam spacing $p_2$ for the second dimension | A second number of beams $L_2$ for the second dimension |
|---|---|---|---|---|---|---|
| Scheme 1 | 8 | 1 | 4 | 4 | 1 | 1 |
| Scheme 2 | 8 | 1 | 1 | 4 | 1 | 4 |
| Scheme 3 | 8 | 1 | 2 | 4 | 1 | 2 |

In these schemes, an oversampling factor $o_1=8$ is considered for $C_1^{(1)}$ codebook and an oversampling factor $o_2=4$ is considered for $C_2^{(1)}$ codebook. Hence, total number of beams for $C_1^{(1)}$ codebook is $$\frac{N_1 o_1}{2} = 32,$$

and total number of beams for $C_2^{(1)}$ codebook is $N_2 o_2=16$.

FIG. 7, FIG. 8 and FIG. 9 illustrate these 16×32 3D beams constructed by Kronecker product of each beam vector in $C_1^{(1)}$ codebook and each beam vector in $C_2^{(1)}$ codebook as a 16×32 grid, wherein each square correspond to a beam.

In some embodiments: the UE is configured with a parameterized KP codebook corresponding to the codebook parameters ($N_d$, $o_d$, $s_d$, $f_d$, $p_d$, $L_d$) where d=1,2 from a master codebook by applying codebook subset restriction. The master codebook is a large codebook with default codebook parameters.

In one method, the master codebook may be unique. In another method, there may be multiple master codebooks and the UE may be configured with at least one master codebook from the multiple master codebooks. An example of multiple master codebooks may be based on beam offset numbers $f_1$ and $f_2$ as shown in the table below. In this example, a 1-bit indication may be used to indicate the master codebook via higher layer such as RRC.

TABLE 2 offset numbers $f_1$ and $f_2$

| | $f_1$ | $f_2$ |
|---|---|---|
| Master codebook 0 | 0 | 0 |
| Master codebook 1 | 0, 1, . . . , $s_1 - 1$ | 0, 1, . . . , $s_2 - 1$ |

For simplicity, it is assumed that $f_1=f_1=0$ (Mater codebook 0) in the rest of the disclosure. However, the disclosure is applicable to other values of $f_1$ and $f_2$.

Two examples of master codebook parameters for Q=12, 16, and 32 antenna ports are tabulated in Table 3 and Table 4. Note that $Q=N_1N_2$ in Table 3 and Q=MNP in Table 4.

TABLE 3

| Master codebook parameters for Q = 12, 16, and 32 antenna ports | | | | | | | | | | |
|---|---|---|---|---|---|---|---|---|---|---|
| Q | $N_1$ | $N_2$ | $o_1$ | $o_2$ | $L_1$ | $L_2$ | $p_1$ | $p_2$ | $s_1$ | $s_2$ |
| 12 | 4 | 3 | 8 | 4 | 4 | 4 | 1, 2 | 1, 2 | 1, 2, 4 | 1, 2, 4 |
| 12 | 6 | 2 | 8 | 4 | 4 | 4 | 1, 2 | 1, 2 | 1, 2, 4 | 1, 2, 4 |
| 16 | 4 | 4 | 8 | 4 | 4 | 4 | 1, 2 | 1, 2 | 1, 2, 4 | 1, 2, 4 |
| 16 | 8 | 2 | 8 | 4 | 4 | 4 | 1, 2 | 1, 2 | 1, 2, 4 | 1, 2, 4 |
| 32 | 8 | 4 | 8 | 4 | 4 | 4 | 1, 2 | 1, 2 | 1, 2, 4 | 1, 2, 4 |
| 32 | 4 | 8 | 8 | 4 | 4 | 4 | 1, 2 | 1, 2 | 1, 2, 4 | 1, 2, 4 |

TABLE 4

| Master codebook parameters for Q = 12, 16, and 32 antenna ports | | | | | | | | | | | |
|---|---|---|---|---|---|---|---|---|---|---|---|
| Q | M | N | P | $o_1$ | $o_2$ | $L_1$ | $L_2$ | $p_1$ | $p_2$ | $s_1$ | $s_2$ |
| 12 | 3 | 2 | 2 | 8 | 4 | 4 | 4 | 1, 2 | 1, 2 | 1, 2, 4 | 1, 2, 4 |
| 12 | 2 | 3 | 2 | 8 | 4 | 4 | 4 | 1, 2 | 1, 2 | 1, 2, 4 | 1, 2, 4 |
| 16 | 4 | 2 | 2 | 8 | 4 | 4 | 4 | 1, 2 | 1, 2 | 1, 2, 4 | 1, 2, 4 |
| 16 | 2 | 4 | 2 | 8 | 4 | 4 | 4 | 1, 2 | 1, 2 | 1, 2, 4 | 1, 2, 4 |
| 32 | 4 | 4 | 2 | 8 | 4 | 4 | 4 | 1, 2 | 1, 2 | 1, 2, 4 | 1, 2, 4 |
| 32 | 8 | 2 | 2 | 8 | 4 | 4 | 4 | 1, 2 | 1, 2 | 1, 2, 4 | 1, 2, 4 |

The focus of this disclosure is on the details of rank>1 KP codebook design based on the codebook parameters: ($N_d$, $o_d$, $s_d$, $f_d$, $p_d$, $L_d$) where d=1,2.

Let r be the number of transmission layers (rank), where r=1,2,3,4, for example. The KP pre-coding matrix of rank r is given by:

$$P=\frac{1}{\sqrt{Qr}}[c_{m_1}\otimes u_{i_1}\otimes v_{j_1},\ c_{m_2}\otimes u_{i_2}\otimes v_{j_2},\ \ldots,\ c_{m_r}\otimes u_{i_r}\otimes v_{j_r}],$$

where $c_{m_1}, c_{m_2}, \ldots c_{m_r}$ are 2×1 QPSK co-phase vectors from $$\begin{bmatrix}1 & 1 & 1 & 1\\ 1 & j & -1 & -j\end{bmatrix};$$

$u_{i_1}, u_{i_2}, \ldots u_{i_r}$ are $(N_1/2)\times 1$ DFT vectors, where $i_k$ is the index of kth DFT vector belonging to a beam group in the first dimension codebook $C_1^{(1)}$; and $v_{j_1}, v_{j_2}, \ldots, v_{j_r}$ are $N_2\times 1$ DFT vectors, where $j_k$ is the index of kth DFT vector belonging to a beam group in the second dimension codebook $C_2^{(1)}$.

Orthogonality condition for rank r>1:

In order to ensure orthogonality between pre-coding vectors corresponding to multiple layers, any two columns, k and l, of the pre-coding matrix P must satisfy $p_k^* p_l=0$ where $p_k \overset{def}{=} c_{m_k}\otimes u_{i_k}\otimes v_{j_k}$ is the kth column of the pre-coding matrix P. Because of the specific KP structure of the pre-coding matrix, we have that the condition $p_k^* p_l=0$ is satisfied if any one of the following condition is satisfied:

1. Co-phase orthogonality: $c_{m_k}^* c_{m_l}==0$,
2. Azimuth beam orthogonality: $u_{i_k}^* u_{i_l}=0$, and
3. Elevation beam orthogonality: $v_{i_k}^* v_{i_l}=0$.

In the first condition, the orthogonality is achieved utilizing the cross-pol antenna configuration by choosing orthogonal co-phase vectors, and in the second and the third conditions, it is achieved relying on the spacing between the beams in two dimensions.

Figure 10:
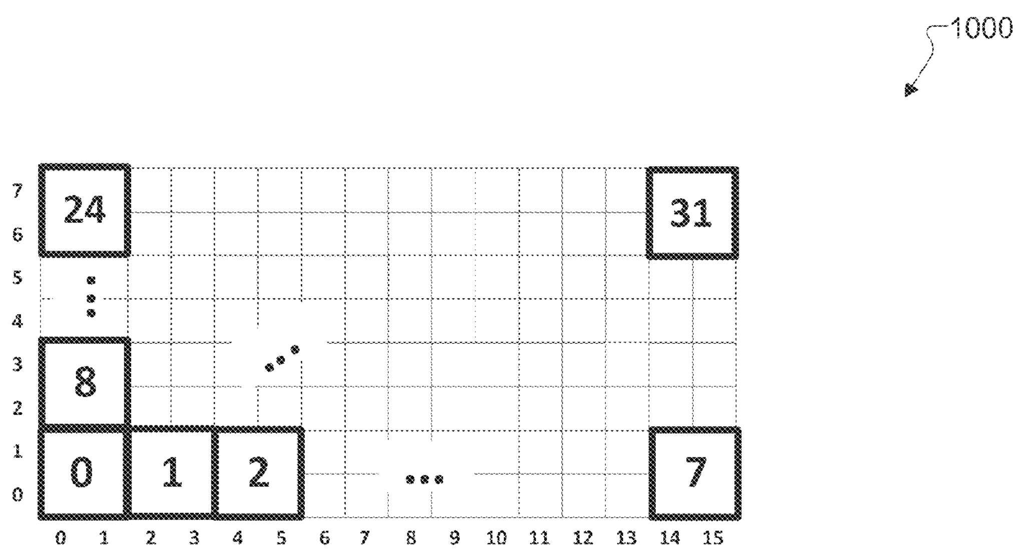
FIG. 10 illustrates beam group type 1: co-phase orthogonality according to embodiments of the present disclosure.

FIG. 10 illustrates beam group type 1 1000: co-phase orthogonality according to embodiments of the present disclosure.

Figure 11:
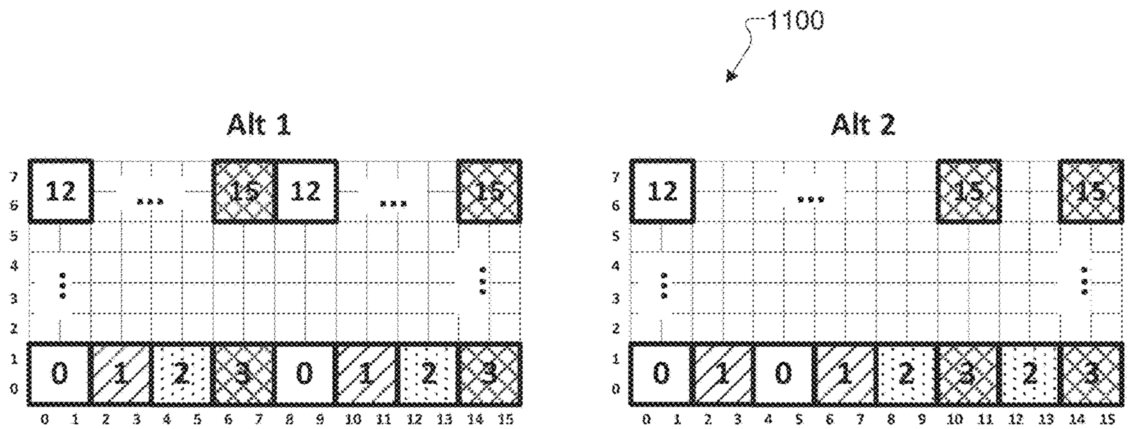
FIG. 11 illustrates an illustration of beam group type 2: horizontal beam orthogonality according to embodiments of the present disclosure.

FIG. 11 illustrates an illustration of beam group type 2 1200: horizontal beam orthogonality according to embodiments of the present disclosure.

Figure 12:
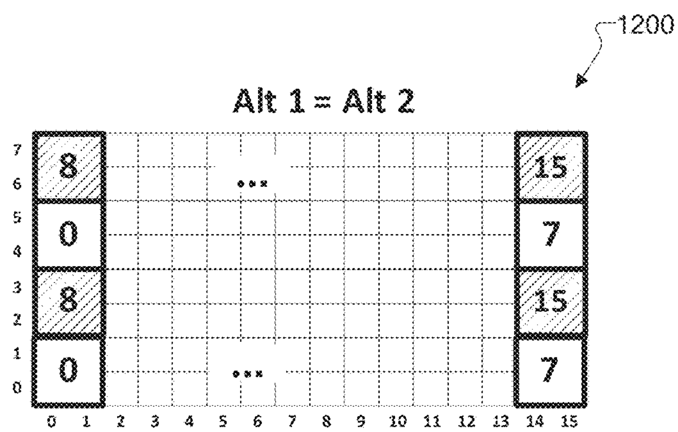
FIG. 12 illustrates an illustration of beam group type 3: vertical beam orthogonality according to embodiments of the present disclosure.

FIG. 12 illustrates an illustration of beam group type 3 1300: vertical beam orthogonality according to embodiments of the present disclosure.

Figure 13:
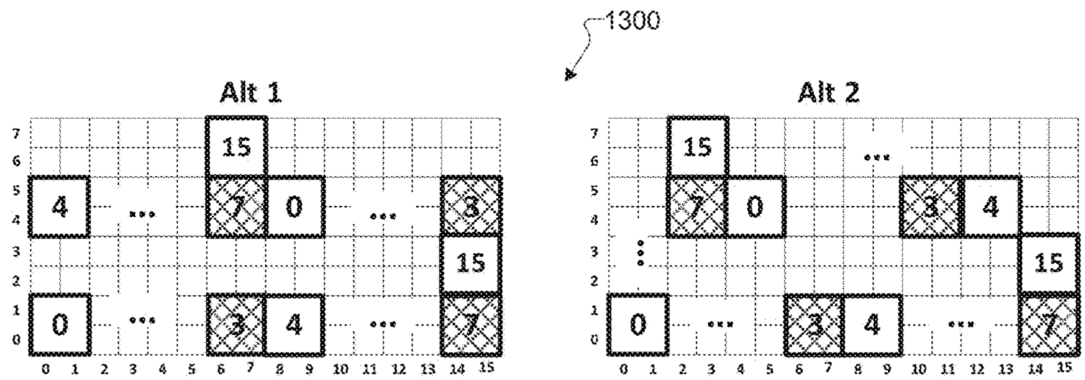
FIG. 13 illustrates beam group type 4: both horizontal and vertical beam orthogonality.

FIG. 13 illustrates beam group type 4: both horizontal and vertical beam orthogonality The number of beam group hypotheses depends on the beam group type.

In some embodiments, the beam groups in the first stage codebook $C_1$ is based upon the orthogonality condition. For instance, the beam groups may be according to at least one of the following four types:

Type 1: Adjacent beams (for co-phase orthogonality): In this type, a beam group consists of adjacent beams in both horizontal and vertical dimensions. An example of type 1 beam group is shown in FIG. 10 for $N_1=8$, $N_2=2$, $o_1=o_2=4$. In this example, a beam group consists of 2 adjacent beams in the horizontal dimension and 2 adjacent beams in vertical dimension. For example, beam group 0 consists of beams {0,1} in the horizontal dimension and beams {0,1} in the vertical dimension.

Type 2: 1D orthogonal beams in horizontal: In this type, a beam group consists of adjacent beams in vertical dimension and orthogonal beams in horizontal dimension. An example of type 2 beam group is shown in FIG. 11 for $N_1=8$, $N_2=2$, $o_1=o_2=4$. In this example, a beam group consists of 2 adjacent beams in the vertical dimension and 2 orthogonal beam pairs in horizontal dimension. For example, beam group 0 consists of beams {0,1,8,9} in the horizontal dimension and beams {0,1} in the vertical dimension.

Type 3: 1D orthogonal beams in vertical: In this type, a beam group consists of adjacent beams in horizontal dimension and orthogonal beams in vertical dimension. An example of type 2 beam group is shown in FIG. 12 for $N_1=8$, $N_2=2$, $o_1=o_2=4$. In this example, a beam group consists of 2 adjacent beams in the horizontal dimension and 2 orthogonal beam pairs in vertical dimension. For example, beam group 0 consists of beams {0,1} in the horizontal dimension and beams {0,1,4,5} in the vertical dimension.

Type 4: 2D orthogonal beams in both horizontal and vertical: In this type, a beam group consists of orthogonal beams in both horizontal and vertical dimensions. An example of type 2 beam group is shown in FIG. 13 for $N_1=8$, $N_2=2$, $o_1=o_2=4$. In this example, a beam group consists of 2 orthogonal beam pairs in the horizontal dimension and 2 orthogonal beam pairs in vertical dimension. For example, beam group 0 consists of beams {0,1,8,9} in the horizontal dimension and beams {0,1,4,5} in the vertical dimension.

For beam group types 2-4, there are two alternatives depending on the spacing between the two orthogonal beams in the same dimension:

Alt 1: the spacing between the two orthogonal beams is the maximum

Alt 2: the spacing between the two orthogonal beams is the minimum

In some embodiments, the two alternatives, Alt 1 and Alt 2, of beam group types are treated together in a single codebook or they are treated separately in two codebooks.

For example, in FIG. 11, there are four sets of orthogonal beams in horizontal dimension: {0,4,8,12}, {1,5,9,13}, {2,6,10,14}, and {3,7,11,15}. In Alt 1, beams group 0 consists of beams {0,1,8,9} in horizontal dimension where beam pairs {0,8} and {1,9} correspond to orthogonal beams with maximum spacing of 8 between them. Similarly, in Alt 2, beams group 0 consists of beams {0,1,4,5} in horizontal dimension where beam pairs {0,4} and {1,5} correspond to orthogonal beams with minimum spacing of 4 between them. Note that here spacing between two beam indices $b_1$ and $b_2$ is defined as:

$$\min\{[(b_1+b_2)+16] \bmod 16,[(b_1-b_2)+16] \bmod 16\}.$$

Table 5 shows the number of beam group hypotheses according to the beam groupings in FIG. 10-FIG. 13.

TABLE 5

Number of beam group hypotheses

| Beam group type | Number of beam group hypotheses |
|---|---|
| Type 1 (co-phase orthogonality) | 8 * 4 = 32 |
| Type 2 (horizontal beam orthogonality) | 4 * 4 = 16 (For each of Alt 1 and Alt 2) |
| Type 3 (vertical beam orthogonality) | 8 * 2 = 16 (For each of Alt 1 and Alt 2) |
| Type 4 (2D-beam orthogonality) | 8 * 2 = 16 (For each of Alt 1 and Alt 2) |

The abovementioned examples of the different beam group types for illustrations only. All embodiments in the disclosure are applicable to other beam group types. Furthermore, the beam group of size (2,2) in horizontal and vertical dimensions is also for illustrations only. The scope of this disclosure includes any other beam group sizes such as (4,1), (1,4), (4,4) etc.

One Codebook Table:

In some embodiments, a single rank r>1 double codebook is designed based upon one of the above-mentioned orthogonality conditions or beam group types. In this case, we have as single table of rank r>1.

In one example method, the first stage codebook $C_1$ indices consist of the beam group type 1. Therefore, indices of the codewords in $C_1$ correspond to $i_1$=0, 1, . . . 31 according to Table 5, where $i_1$=0-7 indicates $i_{1H}$=0-7 and $i_{1V}$=0; $i_1$=8-15 indicates $i_{1H}$=0-7 and $i_{1V}$=1; $i_1$=16-23 indicates $i_{1H}$=0-7 and $i_{1V}$=2; and $i_1$=24-31 indicates $i_{1H}$=0-7 and $i_{1V}$=3.

In some embodiments, a single rank r>1 double codebook is designed based upon more than one of the above-mentioned orthogonality conditions or beam group types. In this case, we have as single table of rank r>1.

In one example method, the first stage codebook $C_1$ indices consist of the beam group type 1 and the beam group type 4 (Alt 1 and Alt 2). Therefore, indices of the codewords in $C_1$ correspond to $i_1$=0, 1, . . . 63 according to Table 5. The indices $i_1$=0, 1, . . . 31 are for the beam group type 1; the indices $i_1$=32, 33, . . . 47 are for the beam group type 4 Alt 1; and the indices $i_1$=48,49, . . . 63 are for the beam group type 4 Alt 2. The breakdown of $i_1$ indices into ($i_{1H}$, $i_{1V}$) indices can be constructed similar to the previous embodiment.

Multiple Codebook Table:

In some embodiments, multiple rank r>1 double codebooks are designed based upon a combination of the orthogonality conditions or beam group types. In this case, we have multiple tables of rank r>1, one table for each beam group type.

In one example method, there are two codebooks (or tables), one for the beam group type 1 and another for the beam group type 4 (Alt 1 and Alt 2). Therefore, indices of the codewords in $C_1$ of the first table correspond to $i_1$=0, 1, . . . 31 and that of the second table correspond to $i_1$=0, 1, . . . 31 according to Table 5 where $i_1$=0, 1, . . . 15 are for the beam group type 4 Alt 1 and $i_1$=16, 17, . . . 31 are for the beam group type 4 Alt 2. The breakdown of $i_1$ indices into ($i_{1H}$, $i_{1V}$) indices can be constructed similar to the previous embodiment.

In some embodiments, 2-bit indication is used to configure single or multiple tables.

TABLE 6

Codebook type configuration table

| Indicator | Codebook type |
|---|---|
| 00 | Single table consisting of one beam group type |
| 01 | Single table consisting of multiple group types |
| 10 | Multiple tables, one for each beam group type |
| 11 | reserved |

Beam Group Type Determination/Configuration:

The specific beam group type depends on the channel condition between the eNB and the UE. For example, for some UEs, beam group may be of type 1; for some UEs, it may be of type 4; and for some other UEs, it may be of both type 1 and type 4. Therefore, the beam group type may be included as an important CSI parameter, which is determined/configured according to one of the following methods.

In some embodiments, the beam group type for rank r>1 is pre-configured, i.e., it is fixed in the standards specification. For example: only Type 1 and Type 4 Alt 1 are supported.

In some embodiments, beam group type for rank r>1 can be configured to the UE or reported by the UE. Alt 1: eNB detects the change in the beam group type and indicates the beam group type to the UE using an RRC information element comprising a CSI configuration. The UE is configured in the higher-layer of the beam group type. Alt 2: UE detects the change beam group type and reports an indication of the beam group type to eNB, e.g., in its CSI report.

In some embodiments, multiple beam group types for rank r>1 are configured. In this case, an indication of beam group type is included in the CSI report.

In one method, eNB configures multiple beam group types for rank r>1 to the UE. UE selects one beam group type and feeds back to the eNB. In one alternative, it is indicated jointly with the RI in the RI reporting instances. In another alternative, it is reported separately.

In another method, UE selects multiple beam group types and communicates them to the eNB, which uses them to configure a beam group type to the UE.

In some embodiments, 2-bit indication is used to configure one of the beam group type determination methods according to Table 7 below.

TABLE 7

Beam group type determination method

| Method indicator | Method |
|---|---|
| 00 | Pre-configured or fixed |
| 01 | Beam group type change is detected |
| 10 | Multiple beam group types are configured |
| 11 | Reserved |

Example Rank 2 Types Codebooks:

In some embodiments, the rank 2 codebook consists of a single table of beam group type 1, where the beam groups consist of 2 adjacent beams in horizontal dimension and 2 adjacent beams in vertical dimension, for example as shown in FIG. 10. Two beams $p_k$ and $p_l$ are selected out of the four beams; and two co-phase values are considered to obtain orthogonal beams $$\begin{bmatrix} p_k & p_l \\ p_k & -p_l \end{bmatrix} \text{ and } \begin{bmatrix} p_k & p_l \\ jp_k & -jp_l \end{bmatrix}$$

based on co-phase orthogonality.

In one example (Example 1), the two beams $p_k$ and $p_l$ are identical. In another example (Example 2), the two beams are either identical or different in either horizontal or vertical dimensions. The rank 2 beam indices for Example 1 and Example 2 for a given beam group with index $i_1=(i_{1,H}, i_{1,V})$ are shown in Table 8.

TABLE 8

| Rank 2 beam indices for a given $i_1 = (i_{1,H}, i_{1,V})$ | | |
|---|---|---|
| | (H, V) beam indices for beam 1 | (H, V) beam indices for beam 2 |
| Beam 1 = Beam 2 | $(i_{1,H}, i_{1,V}) + (0, 0)$ | $(i_{1,H}, i_{1,V}) + (0, 0)$ |
| | $(i_{1,H}, i_{1,V}) + (0, 1)$ | $(i_{1,H}, i_{1,V}) + (0, 1)$ |
| | $(i_{1,H}, i_{1,V}) + (1, 0)$ | $(i_{1,H}, i_{1,V}) + (1, 0)$ |
| | $(i_{1,H}, i_{1,V}) + (1, 1)$ | $(i_{1,H}, i_{1,V}) + (1, 1)$ |
| Beam 1 ≠ Beam 2 | $(i_{1,H}, i_{1,V}) + (0, 0)$ | $(i_{1,H}, i_{1,V}) + (0, 1)$ |
| (either horizontal | $(i_{1,H}, i_{1,V}) + (0, 0)$ | $(i_{1,H}, i_{1,V}) + (1, 0)$ |
| or vertical beams | $(i_{1,H}, i_{1,V}) + (1, 1)$ | $(i_{1,H}, i_{1,V}) + (0, 1)$ |
| are different) | $(i_{1,H}, i_{1,V}) + (1, 1)$ | $(i_{1,H}, i_{1,V}) + (1, 0)$ |

The rank 2 codebook table for Example 1 is shown in Table 9 for $N_1=8$, $N_2=2$, $o_1=o_2=4$. Similar table can be constructed for Example 2.

Please see the below Table Section for Table 9.

In some embodiments, the rank 2 codebook consists of a single table of beam group type 1 and beam group type 4 with Alt 1, where the beam group type 1 comprises of beam groups of 2 adjacent beams in horizontal dimension and 2 adjacent beams in vertical dimension (FIG. 10), and the beam group type 4 comprises of beam groups of 4 pairs of orthogonal beams that are maximally separated in both horizontal and vertical dimensions (Alt 1 in FIG. 13).

For the beam group type 1, one beam ($p_k=p_l$) out of the four beams is selected; and for the beam group type 4, a pair ($p_k$, $p_l$) of beams out the four pairs of orthogonal beams is selected. Two co-phase values are considered to obtain orthogonal beams $$\begin{bmatrix} p_k & p_l \\ p_k & -p_l \end{bmatrix} \text{ and } \begin{bmatrix} p_k & p_l \\ jp_k & -jp_l \end{bmatrix}.$$

An example rank 2 codebook table is shown in Table 10 for $N_1=8$, $N_2=2$, $o_1=o_2=4$.

Please see the below Table Section for Table 10.

In some embodiments, Table 9 of the rank 2 codebook consists of two subtables, a first subtable for a first beam group (type 1) and a second subtable for a second beam group (type 4 with Alt 1), where the details of the two codebook tables are similar to the previous embodiment of single table.

An example rank 2 codebook table is shown in Table 11 for $N_1=8$, $N_2=2$, $o_1=o_2=4$. Two alternative methods are considered for the construction of the table.

In one method (denoted by Method 1), the selected beam group type is explicitly configured to a UE (or reported by the UE). When the UE is configured with (or reports) the first beam group, the UE is configured to report PMI according to Table 8-1, in which $i_1$=0-31; on the other hand when the UE is configured with the second beam group, the UE is configured report PMI according to Table 8, in which $i_l$=0-15. In this case, depending on which beam group type is configured, the number of reported bits for $i_1$ also changes. When the first beam group type is configured, 5 bit information is reported for $i_1$=0-31; when the second group type is configured, 4 bit information is reported for $i_1$=0-15.

In another method (denoted by Method 2), the selected beam group type is configured to a UE (or reported by the UE) by means of codebook subset restriction. In this case, the first PMI $i_1$ has a total range of 0-47. When the UE is configured (or has reported) with the first beam group type, the UE is configured to restrict the PMI range to 0-31; when the UE is configured (or has reported) with the second beam group type, the UE is configured to restrict the PMI range to 32-47.

Table 8 also illustrates $i_1$ to ($i_{1H}$, $i_{1V}$) mapping. With Method 2, the first PMI $i_1$ has a total range of 0-47. With Method 1, the first PMI $i_1$ has a range of either 0-31 or 0-15. According to the table, $i_{1H}$=0-7 and $i_{1V}$=0 are indicated by $i_1$=32-39 with Method 2; and by $i_1$=0-7 with Method 1.

Please see the below Table Section for Tables 11-1 to 11-2.

In some embodiments, the rank 2 codebook consists of three tables, Table 12-1 for a first beam group (type 1), Table 12-2 for a second beam group (type 4 with Alt 1), and Table 12-3 for a third beam group (type 4 with Alt 2), where the details of the three codebook tables are similar to the previous embodiments.

An example rank 2 codebook table is shown in Table 12 for $N_1=8$, $N_2=2$, $o_1=o_2=4$. Two alternative methods are considered for the construction of the table.

In one method (denoted by Method 1), the selected beam group type is explicitly configured to a UE (or reported by the UE). When the UE is configured with (or reports) the first beam group, the UE is configured to report PMI according to Table 12-1, in which $i_1$=0-31; on the other hand when the UE is configured with the second beam group, the UE is configured report PMI according to Table 12-2, in which $i_1$=0-15; and when the UE is configured with the third beam group, the UE is configured report PMI according to Table 12-3, in which $i_1$=0-15. In this case, depending on which beam group type is configured, the number of reported bits for $i_1$ also changes. When the first beam group type is configured, 5 bit information is reported for $i_1$=0-31; when the second or the third group type is configured, 4 bit information is reported for $i_1$=0-15.

In another method (denoted by Method 2), the selected beam group type is configured to a UE (or reported by the UE) by means of codebook subset restriction. In this case, the first PMI $i_1$ has a total range of 0-63. When the UE is configured (or has reported) with the first beam group type, the UE is configured to restrict the PMI range to 0-31; when the UE is configured (or has reported) with the second beam group type, the UE is configured to restrict the PMI range to 32-47; and when the UE is configured (or has reported) with the third beam group type, the UE is configured to restrict the PMI range to 48-63.

Table 12-4 illustrates $i_1$ to ($i_{1H}$, $i_{1V}$) mapping. With Method 2, the first PMI $i_1$ has a total range of 0-63. With Method 1, the first PMI $i_1$ has a range of either 0-31 or 0-15. According to the table, $i_{1H}$=0-7 and $i_{1V}$=0 are indicated by $i_1$=32-39 with Method 2; and by $i_1$=0-7 with Method 1.

Similarly, $i_{1n}$=0-7 and $i_{1V}$=0 are indicated by $i_1$=48-55 with Method 2; and by $i_1$=0-7 with Method 1.

Please see the below Table Section for Tables 12-1 to 12-4.

In some embodiments, the rank 2 codebook consists of three tables, Table 13-1 for a first beam group (type 1), Table 13-2 for a second beam group (type 2 with Alt 1), and Table 13-3 for a third beam group (type 4 with Alt 1), where the details of the three codebook tables are similar to the previous embodiments.

An example rank 2 codebook table is shown in Tables 13-1 to 13-4 for $N_1$=8, $N_2$=2, $o_1$=$o_2$=4. Two alternative methods are considered for the construction of the table.

In one method (denoted by Method 1), the selected beam group type is explicitly configured to a UE (or reported by the UE). When the UE is configured with (or reports) the first beam group, the UE is configured to report PMI according to Table 13-1, in which $i_1$=0-31; on the other hand when the UE is configured with the second beam group, the UE is configured report PMI according to Table 13-2, in which $i_1$=0-15; and when the UE is configured with the third beam group, the UE is configured report PMI according to Table 13-3, in which $i_1$=0-15. In this case, depending on which beam group type is configured, the number of reported bits for $i_1$ also changes. When the first beam group type is configured, 5 bit information is reported for $i_1$=0-31; when the second or the third group type is configured, 4 bit information is reported for $i_1$=0-15.

In another method (denoted by Method 2), the selected beam group type is configured to a UE (or reported by the UE) by means of codebook subset restriction. In this case, the first PMI $i_1$ has a total range of 0-63. When the UE is configured (or has reported) with the first beam group type, the UE is configured to restrict the PMI range to 0-31; when the UE is configured (or has reported) with the second beam group type, the UE is configured to restrict the PMI range to 32-47; and when the UE is configured (or has reported) with the third beam group type, the UE is configured to restrict the PMI range to 48-63.

Table 13-4 illustrates $i_1$ to ($i_{1H}$, $i_{1V}$) mapping. With Method 2, the first PMI $i_1$ has a total range of 0-63. With Method 1, the first PMI $i_1$ has a range of either 0-31 or 0-15. According to the table, $i_{1H}$=0-3 and $i_{1V}$=0 are indicated by $i_1$=32-35 with Method 2; and by $i_1$=0-3 with Method 1. Similarly, $i_{1H}$=0-7 and $i_{1V}$=0 are indicated by $i_1$=48-55 with Method 2; and by $i_1$=0-7 with Method 1.

Please see the below Table Section for Tables 13-1 to 13-4.

Another example rank 2 codebook table is shown in Tables 14-1 to 14-4 for $N_1$=8, $N_2$=2, $o_1$=$o_2$=4. Two alternative methods, Method 1 and Method 2, are considered for the construction of the table. Details of the methods are skipped because it is similar to the previous embodiments.

Please see the below Table Section for Tables 14-1 to 14-4.

In some embodiments, the rank 2 codebook consists of three tables, Table 15-1 for a first beam group (type 1), Table 15-2 for a second beam group (type 2 with Alt 1), and Table 15-3 for beam group (type 3 with Alt 1), where the details of the three codebook tables are similar to the previous embodiments.

Another example rank 2 codebook table is shown in Table 15 for $N_1$=8, $N_2$=2, $o_1$=$o_2$=4. Two alternative methods, Method 1 and Method 2, are considered for the construction of the table. Details of the methods are skipped because it is similar to the previous embodiments.

Please see the below Table Section for Tables 15-1 to 15-4.

Although the above rank 2 codebooks are for $N_1$=8 and $N_2$=2, the rank 2 codebooks for other values of $N_1$ and $N_2$ such as ($N_1$, $N_2$)=(4,4), (2,6), and (4,3) can be similarly constructed.

Also, the idea of the disclosure is applicable to construct codebooks of rank more than 2.

Figure 14:
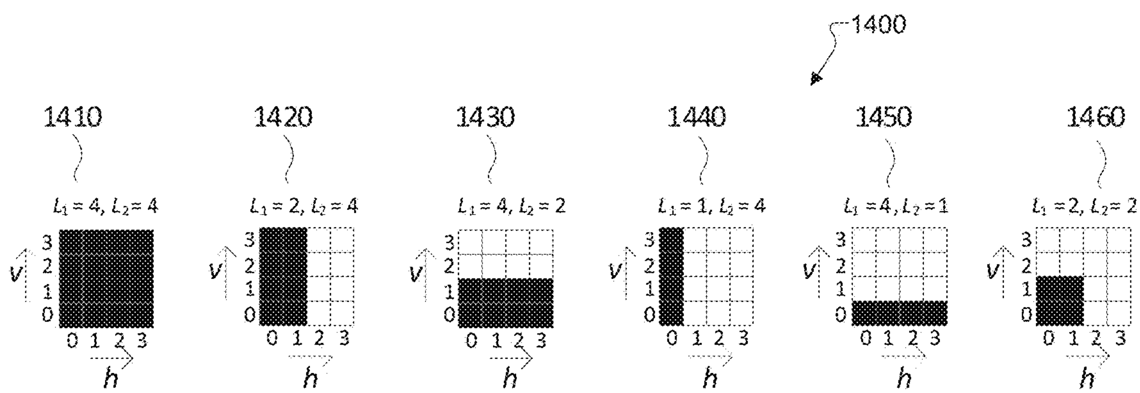
FIG. 14 illustrates subset restriction on rank-1 $i_2$ according to the embodiments of the present disclosure.

FIG. 14 illustrates subset restriction 1400 on rank-1 $i_2$ according to the embodiments of the present disclosure.

Depending on the values of parameters $L_1$ and $L_2$, indicating the numbers of beams in a beam group on the first and the second dimensions, subset restriction on rank-1 $i_2$ indices can be differently applied. FIG. 14 illustrates codebook subset restriction on rank-1 $i_2$ indices in terms of parameters $L_1$ and $L_2$, with an assumption that the master codebook has rank-1 $i_2$ indices corresponding to 1410: ($L_1$, $L_2$)=(4,4). In this case, the master codebook for $i_2$ comprises 16 beams, spanned by 4×4 beams in the first and the second dimensions. In some embodiments, the index h and v in the figure corresponds to $i_{2,1}$ and $i_{2,2}$. The shaded squares represent the rank-1 $i_2$ (or $i_{2,1}$ and $i_{2,2}$) indices that are obtained after subset restriction and the white squares represent the indices that are not included. In the figure, 1410, 1420, 1430, 1440, 1450 and 1460 respectively correspond to a codebook subset when ($L_1$,$L_2$)=(4,4), (2,4), (4,2), (1,4), (4,1) and (2,2) are configured. For example, 1450 shows that the beam group selected after the codebook subset restriction comprises four beams in the h dimension: (v=$i_{2,2}$=0 and h=$i_{2,1}$=0, 1, 2, 3).

Table 16 illustrates the codebook subset restriction table according to some embodiments of the present disclosure. Depending on the configured values of $L_1$ and $L_2$, the subset of rank-1 $i_2$ indices can be obtained from a row of the table. Note that $L_1$=$L_2$=4 corresponds to no subset restriction. In these embodiments it is assumed that ($i_{1,1}$, $i_{1,2}$)=($i_{1,H}$, $i_{1,V}$), but the same design can apply even if ($i_{1,1}$, $i_{1,2}$)=($i_{1,V}$, $i_{1,H}$).

TABLE 16

An illustration of subset restriction on rank-1 $i_2$

| ($L_1$, $L_2$) | Corresponding case in FIG. 14 | Number of $i_2$ indices |
|---|---|---|
| (4, 1) | 1450 | 16 (=4 beams × 4 co-phases) |
| (1, 4) | 1440 | 16 |
| (2, 2) | 1460 | 16 |
| (4, 2) | 1430 | 32 (=8 beams × 4 co-phases) |
| (2, 4) | 1420 | 32 |
| (4, 4) | 1410 | 64 (=16 beams × 4 co-phases) |

In some embodiments, UE is configured with the 2 layer (or rank 2) codebook with the same codebook parameters as 1 layer codebook. In particular, rank 2 pre-coders are obtained out of those beams in the same beam groups. In other words, two beams $p_k$ and $p_l$ comprising a rank-2 precoder are selected from a beam group; and two co-phase values construct two orthogonal matrices corresponding to two different rank-2 precoding matrix:

$$\begin{bmatrix} p_k & p_l \\ p_k & -p_l \end{bmatrix} \text{ and } \begin{bmatrix} p_k & p_l \\ jp_k & -jp_l \end{bmatrix}.$$

In some embodiments, UE is configured with ($L_1$, $L_2$) chosen from the set {(1,4),(2,2),(4,1)}—which respectively correspond to 1440, 1450 and 1460; then a beam group comprises 4 beams. The 4 beams comprising a beam group in each of 1440, 1450 and 1460 can be indexed as 0, 1, 2, and 3.

Figure 15:
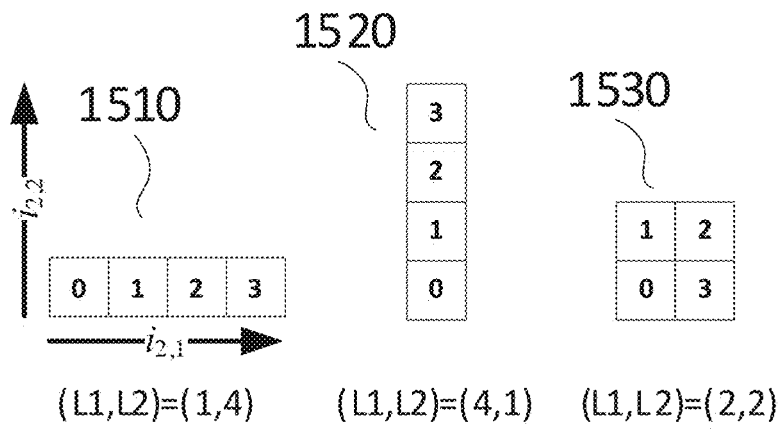
FIG. 15 illustrates example beam indices in a beam group for the three beam grouping schemes 1500 according to the embodiments of the present disclosure.

FIG. 15 illustrates example beam indices in a beam group for the three beam grouping schemes 1500 according to the embodiments of the present disclosure. In the FIG. 15, the four selected beams are sequentially indexed into 0, 1, 2, and 3. 1510, 1520 and 1530 respectively illustrates the beam indexing for those beam groups of 1440, 1450 and 1460. These indexing are for illustration only, and embodiments in the disclosures are applicable to any other type of beam indexing.

If indices of the two rank-2 beams, k and 1, are the same (k=l), then there are 4 possible rank 2 pairs, and if they are different k≠l then there are $$\binom{4}{2} = 6$$

possible rank-2 pairs. So, there are 10 rank-2 beam pairs in total.

Table 17 shows an example construction of rank 2 beam pairs (k, l) ∈ {0, 1, 2, 3}, according to some embodiments of the present disclosure. In some embodiments, the beam indices 0,1,2,3 here correspond to the beam indices shown in FIG. 15. Note that the beam pair indices 0-7 correspond to Rel. 12 based rank 2 beam pairs. As shown in Table 17, the beam pair indices 8 and 9 are the rest of beam pairs that have not been represented in Rel-12 codebook.

TABLE 17

Rank 2 Beam Pair Index Table

| Beam pair index | Beam Pairs (k, l) | Comments |
|---|---|---|
| 0 | (0, 0) | Same beam construction |
| 1 | (1, 1) | |
| 2 | (2, 2) | |
| 3 | (3, 3) | |
| 4 | (0, 1) | Different beam construction - |
| 5 | (1, 2) | Rel12 |
| 6 | (0, 3) | |
| 7 | (1, 3) | |
| 8 | (0, 2) | Different beam construction - |
| 9 | (2, 3) | non-Rel12 |

In some embodiments, for each of $(L_1, L_2) \in \{(1,4),(4,1)\}$ corresponding to 1510 and 1520, beam pair indices 0-7 in Table 17 are selected to construct a rank-2 precoding matrix codebook. On the other hand, for $(L_1,L_2)=(2,2)$ corresponding to 1530, beam pair indices 0-3 (same beam construction) in Table 17 and an additional set of beam pair indices are selected to construct a rank-2 precoding matrix codebook.

The additional set of beam pair indices should be selected in such a way that the codebook represents more frequently selected rank-2 precoder matrices in the two dimensional beam space. Such a selection can be system-specific, or UE specific, depending on the channel condition and deployment scenario. Hence, it is proposed that the additional set is configured either UE specifically or system-wide.

Examples of the additional set of beam pair indices for $(L_1,L_2)=(2,2)$ corresponding to 1530 are:

Scheme 0: The set comprises beam pairs corresponding to beam pair indices 4-7, which correspond to different beam construction according to Rel-12.

Scheme 1: The set comprises beam pairs which have one dimensional beam variability;

Scheme 2: The set comprises the 3 beam pairs including beam 0, and an additional beam pair of (1,3).

Scheme 3: The set comprises a set of 4 beam pairs selected from beam pair indices 4-9 in Table 17.

Figure 16:
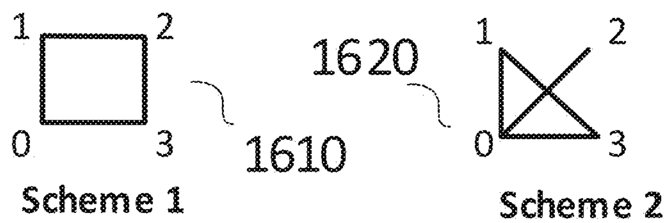
FIG. 16 illustrates different alternatives for remaining four rank 2 beam pairs for $(L_1,L_2)=(2,2)$ according to the embodiments of the present disclosure.

FIG. 16 illustrates Scheme 1 1610 and Scheme 2 1620 according to the embodiments of the present disclosure.

Table 18 illustrates a rank-2 codebook construction schemes for $(L_1, L_2)=(2,2)$ according to some embodiments of the present disclosure. A scheme can be configured to a UE in higher layer (RRC, by eNB); or it can be pre-configured at the UE.

TABLE 178

Alternatives for remaining 4 beam pairs for rank 2

| Scheme for $(L_1, L_2) = (2, 2)$ | Configured beam pair indices (Table 17) |
|---|---|
| 0 | 0-7 |
| 1 | 0-6, 9 |
| 2 | 0-4, 6-8 |
| 3 | 0-3, and 4 indices out of 4-9 |

FIG. 16 illustrates different alternatives for remaining four rank 2 beam pairs for 1530 $(L_1,L_2)=(2,2)$ according to the embodiments of the present disclosure.

In these embodiments, the total number of precoding matrix for each selected $(L_1, L_2) \in \{(1,4),(4,1),(2,2)\}$ in the codebook is 16, and they are constructed according to the selected values of (k,l) corresponding to selected beam pair indices in Table 17 and two choices of co-phases:

$$\begin{bmatrix} p_k & p_l \\ p_k & -p_l \end{bmatrix} \text{ and } \begin{bmatrix} p_k & p_l \\ jp_k & -jp_l \end{bmatrix}.$$

There are two options to construct the mater rank-2 codebook:

Option 1: All the 10 beam pairs in Table 17 are included in the rank-2 master codebook for all the pairs of $(L_1, L_2)$.

Option 2: All the beam pairs in Table 17 excluding non-Rel12 different beam pairs (i.e., beam pair index 8 and 9) are included in the rank-2 master codebook for all the pairs of $(L_1, L_2)$.

In some embodiments, Table 19 is used as a rank-2 (2 layer) master codebook, which is constructed according to Option 1, that can be used for any of Q=12, 16 and 32 antenna configurations, wherein the corresponding rank 2 precoder is $$W^{(2)}_{m_1,m_2,m'_1,m'_1,n} = \frac{1}{\sqrt{2Q}} \begin{bmatrix} v_{m_1} \otimes v_{m_2} & v_{m'_1} \otimes v_{m'_2} \\ \varphi_n v_{m_1} \otimes v_{m_2} & -\varphi_n v_{m'_1} \otimes v_{m'_2} \end{bmatrix}.$$

In this rank-2 master codebook table, the $2^{nd}$ dimension beam index $m_2$ ($m_2'$) increases first as $i_2$ increases. Similar table can be constructed for the case in which the $1^{st}$ dimension beam index $m_1$ ($m_1'$) increases first as $i_2$ increases.

This master codebook includes rank-2 precoders that are used for both Schemes 1 and 2, 1610 and 1620.

The master codebook comprises the following rank-2 precoders:

Set 1: The two layers are with the same beam in both dimensions (indices 0-3 in Table 17), which maps to $i_2$=0-31;

Set 2a: The two layers are with a first beam in the first dimension, and are with Rel12 based two different beams in the second dimension (indices 4-7 in Table 17), which maps to $i_2$=32-39;

Set 2b (used for Option 1): The two layers are with a first beam in the first dimension, and are with non-Rel12 based two different beams in the second dimension (indices 8-9 in Table 17), which maps to $i_2$=40-43;

Set 3: Same construction as those for $i_2$=32-43, with replacing the first beam with a second, a third and a fourth beam in the first dimension, which maps to $i_2$=44-79.

Set 4: Same construction as those for $i_2$=32-79, with swapping the role of the first and the second dimension, which maps to $i_2$=80-127.

Set 5 (used for Scheme 2 only): The closest diagonal beam pairs in the +45 degree direction, which maps to $i_2$=128-159.

Set 6 (used for Scheme 2 only): The closest diagonal beam pairs in the −45 degree direction, which maps to $i_2$=160-191.

The master codebook for Option 2 and Scheme 2 (1620) can be similarly constructed, by selecting only those components (sets) that correspond to Option 2:

Set 1: The two layers are with the same beam in both dimensions (indices 0-3 in Table 17) . . . 32 precoders;

Set 2a: The two layers are with a first beam in the first dimension, and are with Rel12 based two different beams in the second dimension (indices 4-7 in Table 17) . . . 8 precoders;

Set 3: Same construction as Set 2, with replacing the first beam with a second, a third and a fourth beam in the first dimension . . . 24(=8×3) precoders.

Set 4: Same construction as Set 2 and Set 3, with swapping the role of the first and the second dimension . . . 32 precoders Set 5 (used for scheme 2 only): The closest diagonal beam pairs in the +45 degree direction . . . (32 precoders)

Set 6 (used for scheme 2 only): The closest diagonal beam pairs in the −45 degree direction . . . (32 precoders)

The PMI indices ($i_2$) can be correspondingly mapped to those 160 (=32×5) precoders.

In some embodiments, a rank-2 master codebook is defined, and the UE is configured with a rank-2 codebook which is a subset of the rank-2 master codebook. The selected subset is configured for the UE in the higher layer, by means of a plurality of codebook subset restriction parameters, e.g., ($L_1$, $L_2$), scheme index in Table 18, etc.

For example, if the UE is configured with ($L_1$, $L_2$)=(1, 4), then Set 1 corresponding to ($L_1$, $L_2$)=(1, 4) comprising 8 precoders and Set 2a comprising 8 precoders, are selected as valid rank-2 precoders for PMI reporting. In this case, the total number of rank-2 precoders after the CSR is 16, which can be reported by a 4-bit field. It is noted that other cases with ($L_1$, $L_2$)=(4, 1) and (2, 2) can also be similarly constructed, and a 4-bit field can convey the selected rank-2 precoder after CSR in these cases as well.

For example, if the UE is configured with Scheme 1 (1610) with Option 2 with $L_1$=$L_2$=2, then Set 1, Set 2a, Set 3 and Set 4 corresponding to $L_1$=$L_2$=2 are selected as valid rank-2 precoders for PMI reporting. In this case, Set 1 has 8 precoders (4×2 same-beam precoders, including two different co-phases), Set 2a and Set 3 have 4 precoders (2×2 different-beam precoders in the $1^{st}$ dimension), and Set 4 has 4 precoders (2×2 different-beam precoders in the $2^{nd}$ dimension). The total number of rank-2 precoders after the CSR is 16, which can be reported by a 4-bit field.

For example, if the UE is configured with Scheme 2 (1620) with Option 2 with $L_1$=$L_2$=2, then Set 1, Set 2a, Set 4, Set 5 and Set 6 corresponding to $L_1$=$L_2$=2 and Scheme 2 (1620) are selected as valid rank-2 precoders for PMI reporting. In this case, Set 1 has 8 precoders (4×2 same-beam precoders), Set 2a and Set 4 have 4 precoders (2 different-beam precoders respectively in the and the $2^{nd}$ dimensions), and Set 5 and Set 6 have 4 precoders (2 diagonal beam pairs respectively in the +45 and −45 degree directions). The total number of rank-2 precoders after the CSR is 16, which can be reported by a 4-bit field.

In some embodiments, the UE reports $i_{2,1}$ ($i_{2,1}$'), $i_{2,2}$ ($i_{2,2}$') and n in place of $i_2$, in which case $m_1$, $m_1$', $m_2$, and $m_2$' are determined as:

$$m_1=s_1 i_{1,1}+p_1 i_{2,1}, m_1'=s_1 i_{1,1}+p_1 i_{2,1}', m_2=s_2 i_{1,2}+p_2 i_{2,2}, \text{ and } m_2'=s_2 i_{1,2}+p_2 i_{2,2}'.$$

In those embodiments related to Table 19, and other related embodiments, the parameters $s_1$, $s_2$, $p_1$, and $p_2$ in this table can be selected, e.g., according to Table 3, and it is assumed that $L_1$=

$$i_{1,H}=0, 1, \ldots, \frac{N_1 O_1}{P s_1}-1 \text{ and } i_{1,V}=0, 1, \ldots, \frac{N_2 O_2}{s_2}-1.$$

Please see the below Table Section for Table 19.

Note that if ($L_1$,$L_2$) is restricted to {(4,1), (1,4), (2,2)}, then some codewords in Table 19 can never be selected. Hence, we alternatively propose to reduce the size of master codebook and define the codebook subset restriction in terms of ($L_1$, $L_2$) accordingly.

In some embodiments, a rank-2 master codebook is defined, and the UE is configured with a rank-2 codebook which is a subset of the rank-2 master codebook. The selected subset is configured for the UE in the higher layer, by means of a plurality of codebook subset restriction parameters, e.g., ($L_1$, $L_2$), scheme index in Table 18, and the like.

An example rank-2 master codebook construction can be found in Table 20 assuming $S_1$=$s_2$=2 and $p_1$=$p_2$=1. The master codebook can be used for any of Q=12, 16 and 32 antenna configurations, wherein the corresponding rank 2 precoding matrix is:

$$W^{(2)}_{m_1,m_2,m_1',m_2',n}=\frac{1}{\sqrt{2Q}}\begin{bmatrix} v_{m_1}\otimes v_{m_2} & v_{m_1'}\otimes v_{m_2'} \\ \varphi_n v_{m_1}\otimes v_{m_2} & -\varphi_n v_{m_1'}\otimes v_{m_2'} \end{bmatrix}.$$

In this table, the $2^{nd}$ dimension beam index $m_2$ increases first as $i_2$ increases. Similar table can be constructed for the case in which the $1^{st}$ dimension beam index $m_1$ increases first as $i_2$ increases. The codebook comprises all the same beam pairs corresponding to the three beam groups ($L_1$,$L_2$)=(4,1), (1,4) and (2,2) (indices 0-3 in Table 17), different beam pairs-Rel12 (indices 4-7 in Table 177) corresponding to the beam groups ($L_1$,$L_2$)=(4,1) and (1,4), and different beam pairs—non-Rel12 (indices 8-9 in Table 17) corresponding to the beam groups ($L_1$,$L_2$)=(2,2).

In this case, the codebook subset restriction can be constructed as in Table 21 for 1140, 1150 and 1160.

In some embodiments, the beam spacing $p_1$ for the first dimension is selected such that a narrowly spaced beams in the first dimension comprise a beam group, and the beam spacing $p_2$ for the second dimension is selected such that a widely spaced beams in the second dimension comprise the beam group. For example, for Q=16, $N_1$=8, $N_2$=2, $o_1$=$o_2$=8, $p_1$ and $p_2$ can be chosen as: $p_1$=1, $p_2$=8, i.e., a beam group in the first dimension comprises of narrowly spaced adjacent beams and a beam group in the second dimension comprises of widely spaced orthogonal beams.

Please see the below Table Section for Tables 20 and 21.

In some embodiments, $v_{m_1}$, $v_{m_1}'$, $v_{m_2}$, and $v_{m_2}'$ to comprise a precoding matrix $$W^{(2)}_{m_1,m_2,m_1',m_1',n} = \frac{1}{\sqrt{2Q}} \begin{bmatrix} v_{m_1} \otimes v_{m_2} & v_{m_1'} \otimes v_{m_2'} \\ \varphi_n v_{m_1} \otimes v_{m_2} & -\varphi_n v_{m_1'} \otimes v_{m_2'} \end{bmatrix},$$

are differently configured depending on whether beamformed CSI-RS, or non-precoded CSI-RS or both are configured. In one such example with Q=16 and $N_1$=8 and $N_2$=2:

When the UE is configured with only non-precoded CSI-RS or both types of CSI-RS, the UE is further configured to use:

$$v_{m_1} = \begin{bmatrix} 1 & e^{j\frac{2\pi m_1}{32}} & e^{j\frac{4\pi m_1}{32}} & e^{j\frac{6\pi m_1}{32}} \end{bmatrix}^t, \; v_{m_2} = \begin{bmatrix} 1 & e^{j\frac{2\pi m_2}{32}} \end{bmatrix}^t,$$

$$v_{m_1'} = \begin{bmatrix} 1 & e^{j\frac{2\pi m_1'}{32}} & e^{j\frac{4\pi m_1'}{32}} & e^{j\frac{6\pi m_1'}{32}} \end{bmatrix}^t \text{ and } v_{m_2'} = \begin{bmatrix} 1 & e^{j\frac{2\pi m_2'}{32}} \end{bmatrix}^t;$$

When the UE is configured with only beamformed CSI-RS, the UE is further configured to use:

$$v_{m_1}=e_{m_1}^{(4\times1)}, v_{m_2}=e_{m_2}^{(2\times1)},$$

$$v_{m_1'}=e_{m_1'}^{(4\times1)}, \text{ and } v_{m_2'}=e_{m_2'}^{(2\times1)};$$

Herein $e_m^{(N\times1)}$, m=0, 1, . . . , N−1, is an N×1 column vector comprising with (N−1) elements with zero value and one element with value of one. The one element with value of one is on (m+1)-th row. For example, $e_1^{(4\times1)}=[0\ 1\ 0\ 0]^t$; and $e_2^{(4\times1)}=[0\ 0\ 1\ 0]^t$. In this case, the UE is further configured to use $i_{1,1}=i_{1,2}=0$ in the table entries, and the UE is configured to report only $i_2$ as PMI, and not to report $i_{1,1}$ and $i_{1,2}$.

In these embodiments, the UE can identify that a configured CSI-RS resource is beamformed or non-precoded by:

Alt 1. Explicit RRC indication: The UE is configured with a higher-layer parameter for the configured CSI-RS resource, indicating whether the configured CSI-RS resource is beamformed or non-precoded.

Alt 2. Implicit indication: The UE is configured with a different set of CSI-RS port numbers for beamformed CSI-RS than the non-precoded CSI-RS. In one example, the beamformed CSI-RS takes antenna port numbers 200-207, while the non-precoded CSI-RS takes antenna port numbers 15-30.

Embodiment: Alternative Master Codebook Design

In the legacy rank-2 codebook design, dual-pol propagation and azimuth angle spread have been taken into account. In the Rel-10 8-Tx rank-2 codebook, rank-2 precoder codebook comprises two types of rank-2 precoding matrices:

Type 1. Same-beam: the two beams for the two layers are the same

Type 2. Different-beam: the two beams for the two layers are different

For each selected beam pair for the two layers, two precoders can be constructed with applying two co-phase matrices of $$\begin{bmatrix} 1 & 1 \\ 1 & -1 \end{bmatrix} \text{ and } \begin{bmatrix} 1 & 1 \\ j & -j \end{bmatrix}.$$

Figure 17:
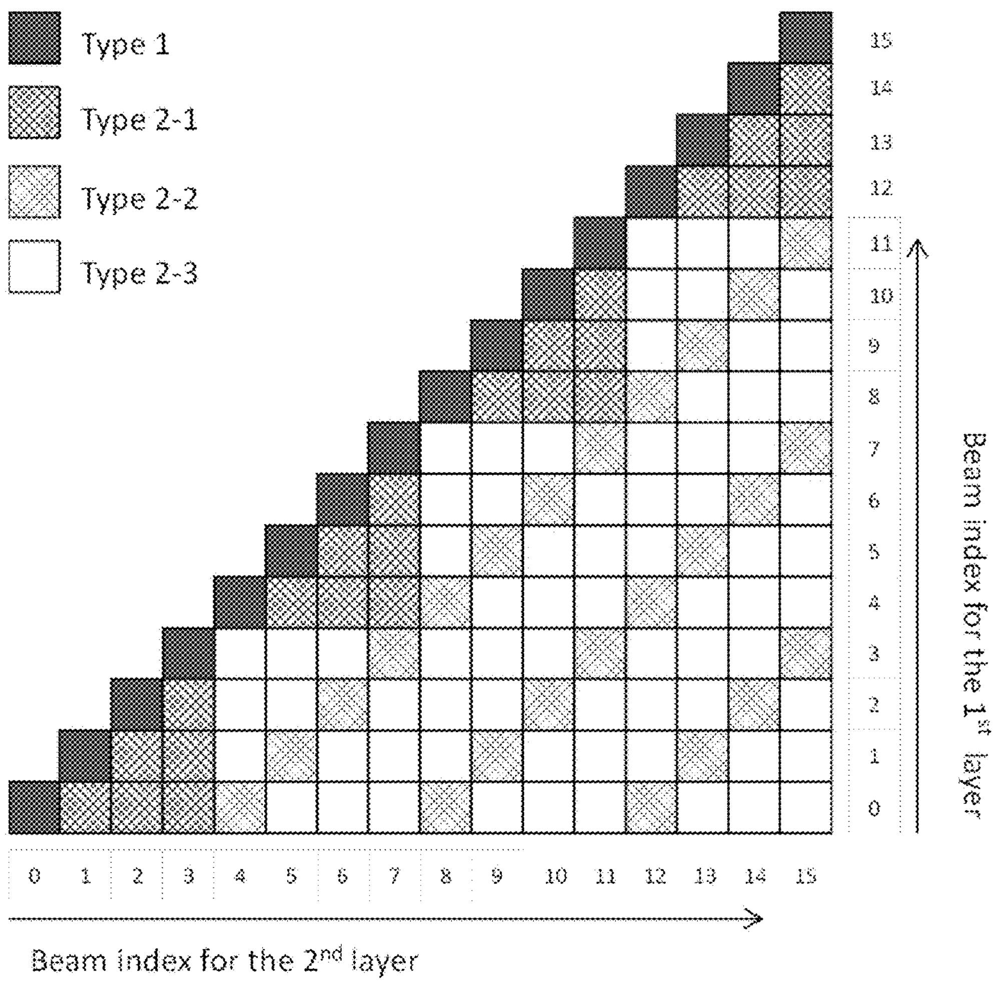
FIG. 17 illustrates total rank-2 beam pair combinations with 16 beams per layer according to embodiments of the present disclosure.

For FD-MIMO, a similar rank-2 codebook construction can be considered. Relying on the Kronecker structure, a rank-2 master codebook can be constructed with these two types of rank-2 precoding matrices. For the 2D antenna configurations, the type 2 precoding matrices are further classified into:

Type 2-1. Different-beam in horizontal only: the two beams for the two layers are different for the horizontal component Type 2-2. Different-beam in vertical only: the two beams for the two layers are different for the vertical component Type 2-2. Different-beam in both horizontal & vertical: the two beams for the two layers are different for both horizontal and vertical components FIG. 17 illustrates total Rank-2 beam pair combinations 1700 with 16 beams per layer according to embodiments of the present disclosure. FIG. 17 illustrates total 136 (=1+2+ . . . +16) beam combinations that can be used to construct FD-MIMO rank-2 precoders, with assuming a beam index mapping table of Table 22. The figure further shows the corresponding precoding matrix types. Considering the two co-phase matrices, the total number of rank-2 precoders in this case become 136×2=276, which seems to be too many, even for a master codebook.

TABLE 22

| Beam index mapping for $(L_1, L_2)$ = (4, 4) | | | | | | | | | | | | | | | | |
|---|---|---|---|---|---|---|---|---|---|---|---|---|---|---|---|---|
| | Beam index | | | | | | | | | | | | | | | |
| | 0 | 1 | 2 | 3 | 4 | 5 | 6 | 7 | 8 | 9 | 10 | 11 | 12 | 13 | 14 | 15 |
| (V, H) | (0, 0) | (0, 1) | (0, 2) | (0, 3) | (1, 0) | (1, 1) | (1, 2) | (1, 3) | (2, 0) | (2, 1) | (2, 2) | (2, 3) | (3, 0) | (3, 1) | (3, 2) | (3, 3) |

Figure 18:
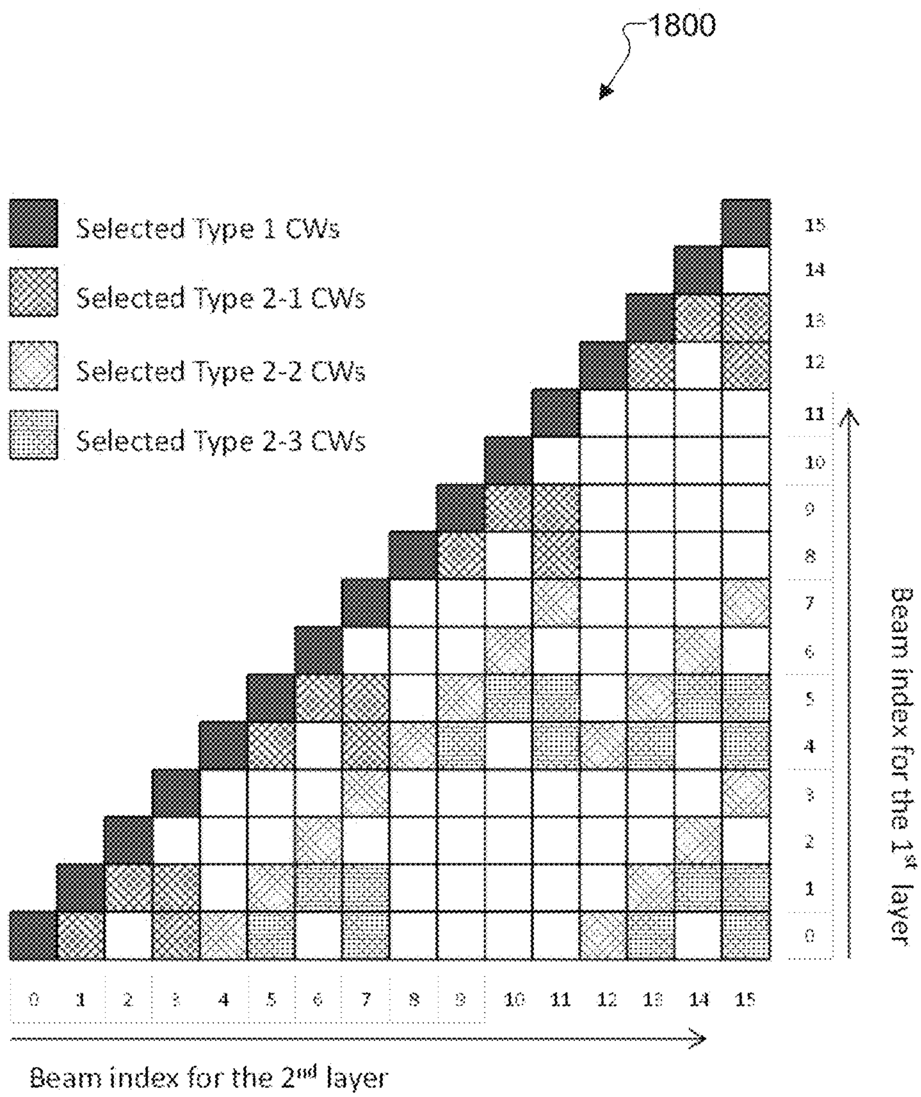
FIG. 18 illustrates rank-2 beam pair combinations obtained with extension of Rel-10 8-Tx design to 2D according to embodiments of the present disclosure.

One potential way to construct a master codebook with a reasonable size is to reuse the Rel-10 8-Tx beam pair combinations for both dimensions as illustrated in FIG. 18. In this case, the number of beam pair combinations per dimension per beam group is 8: {(0,0),(1,1),(2,2),(3,3),(0,1),(1,2),(0,3),(1,3)}. In this case, the total number of beam pair combinations for the 2 dimensions per beam group is 8×8=64. With applying the two co-phase matrices, the total number of rank-2 precoding matrices per beam group constructed in this way becomes 64×2=128. When compared with the total 64 number of rank-1 precoding matrices per beam group, this master rank-2 codebook still has twice large number as the rank-1 precoding matrix in the master codebook.

FIG. 18 illustrates Rank-2 beam pair combinations 1800 obtained with extension of Rel-10 8-Tx design to 2D according to embodiments of the present disclosure.

Alternative Master Codebook Design

TABLE 23

Beam index mapping for $(L_1, L_2) = (4, 4)$

| | Beam pair index | | | | | | | |
|---|---|---|---|---|---|---|---|---|
| | 0 | 1 | 2 | 3 | 4 | 5 | 6 | 7 |
| (first layer, second layer) | (0, 0) | (1, 1) | (2, 2) | (3, 3) | (0, 1) | (1, 2) | (0, 3) | (1, 3) |

Figure 19:
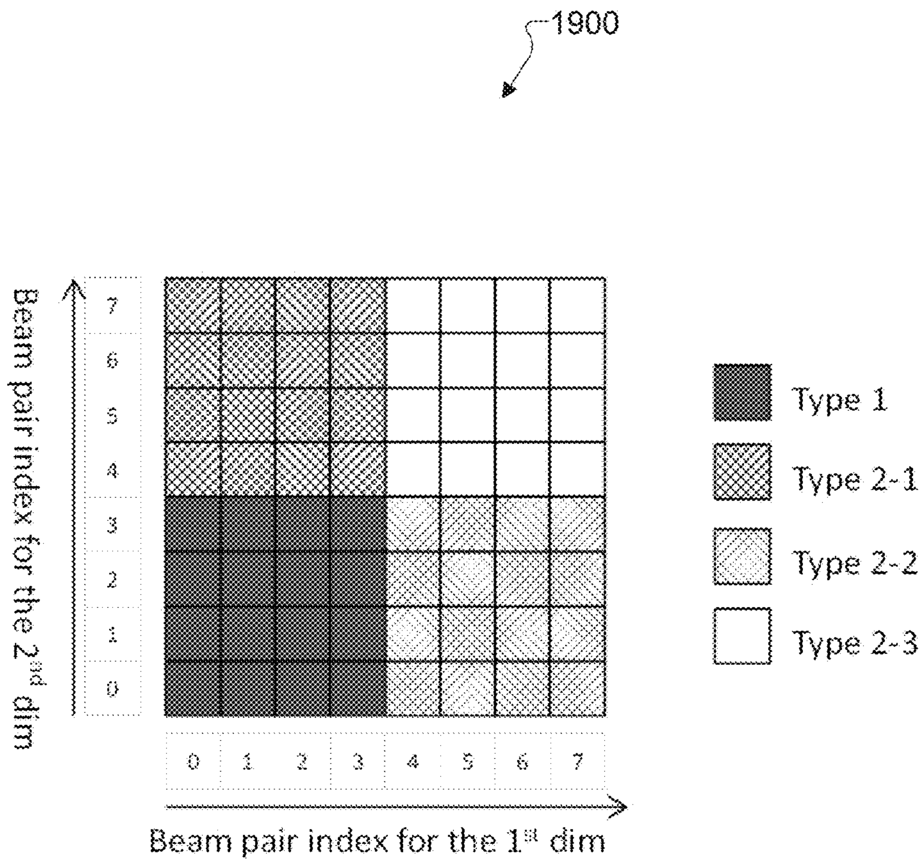
FIG. 19 illustrates a method to construct rank-2 master codebook according to some embodiments of the present disclosure.

FIG. 19 and Table 23 illustrate a method to construct rank-2 master codebook 1900 according to some embodiments of the present disclosure. Utilizing the 8 beam pairs in Table 23 for each dimension, an 8×8 grid can be considered for the two dimensions as shown in FIG. 19. When beam pair indices (x, y) is selected for the $1^{st}$ and $2^{nd}$ dimensions, corresponding beam pairs are selected for the two dimensions, according to Table 23.

For example, applying Table 23 to each of x and y, with x=1 the selected beam pair for the first dimension is (1,1) and with y=2, the selected beam pair for the second dimension is (2,2). Then, the corresponding rank-2 precoding matrix is:

$$W^{(2)}_{m_1,m_2,m'_1,m'_1,n} = \frac{1}{\sqrt{2Q}}\begin{bmatrix} v_{m_1} \otimes v_{m_2} & v_{m'_1} \otimes v_{m'_2} \\ \varphi_n v_{m_1} \otimes v_{m_2} & -\varphi_n v_{m'_1} \otimes v_{m'_2} \end{bmatrix},$$

where $$m_1 = m_1' = s_1 \cdot i_{1,1} + p_1; \text{ and}$$

$$m_2 = m_2' = s_2 \cdot i_{1,2} + 2p_2.$$

In general, when the selected beam pair for the first dimension is $(a_0,a_1)$ and the selected beam pair for the second dimension is $(b_0,b_1)$, the beam indices $m_1$, $m_1'$, $m_2$, $m_2'$ are selected as $$m_1 = s_1 \cdot i_{1,1} + a_0 \cdot p_1;$$

$$m_1' = s_1 \cdot i_{1,1} + a_1 \cdot p_1;$$

$$m_2 = s_2 \cdot i_{1,2} + b_0 \cdot 2p_2; \text{ and}$$

$$m_2' = s_2 \cdot i_{1,2} + b_1 \cdot 2p_2.$$

As total number of pairs for (x,y) in FIG. 19 is 64, with applying the two co-phases of {1,j} for $\phi_n$, total number of codewords becomes 128. In order to keep the number of codewords to 64, one possible alternative is to keep type 1 and type 2-3 codewords. In this case, (x, y)∈{(x, y):x∈{0,1, 2,3}; y∈{0,1,2,3}}Å{(x, y):x∈{4,5,6,7}; y∈{4,5,6,7}}.

FIGS. 20A to 20D illustrates antenna configurations and antenna numbering 2001, 2002, 2003 and 2004 respectively considered in some embodiments of the present disclosure. In all the four antenna configurations of FIGS. 20A to 20D, cross pol (or Cross-pol) antenna array is considered, in which a pair of antenna elements in a same physical location are polarized in two distinct angles, e.g., +45 degrees and −45 degrees.

Figure 20A:
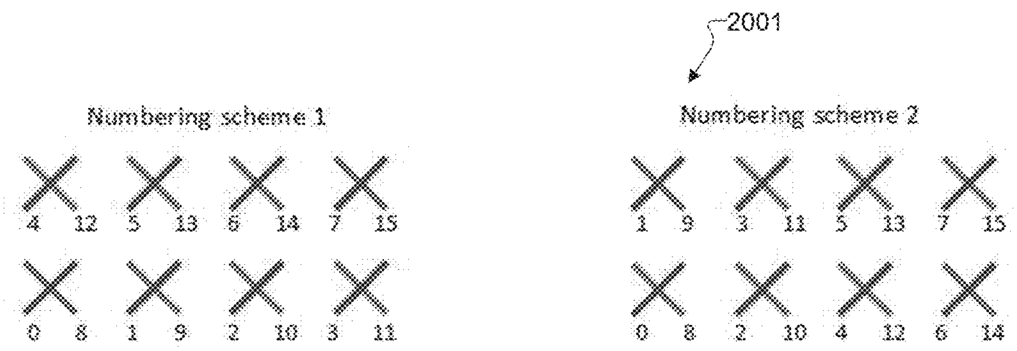
FIGS. 20A to 20D illustrates antenna configurations and antenna numbering according to some embodiments of the present disclosure.
Figure 20C:
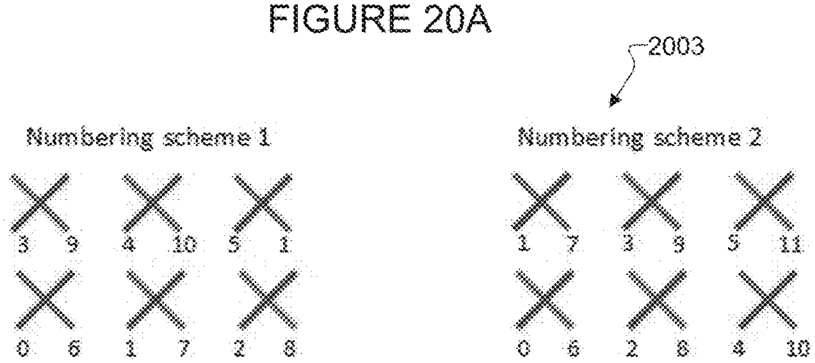
Figure 20B:
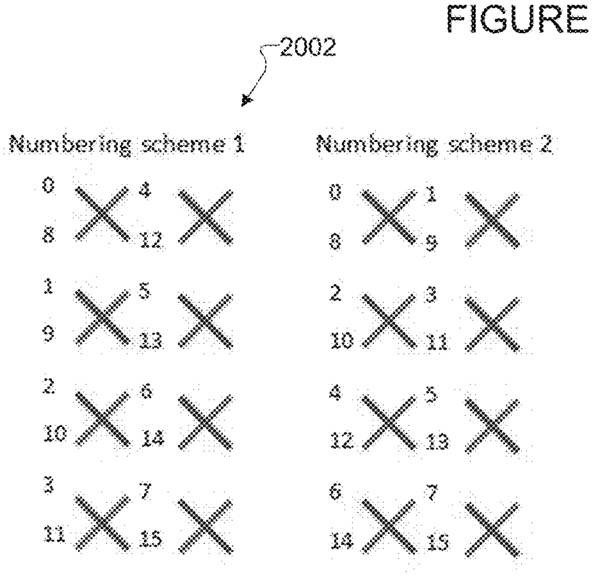

FIGS. 20A and 20B are antenna configurations with 16 CSI-RS ports, comprising 8 pairs of cross-pol antenna elements placed in a 2D antenna panel. The 8 pairs can be placed in 2×4 (FIG. 20A) or 4×2 manner (FIG. 20B) on horizontal and vertical dimensions.

Figure 20D:
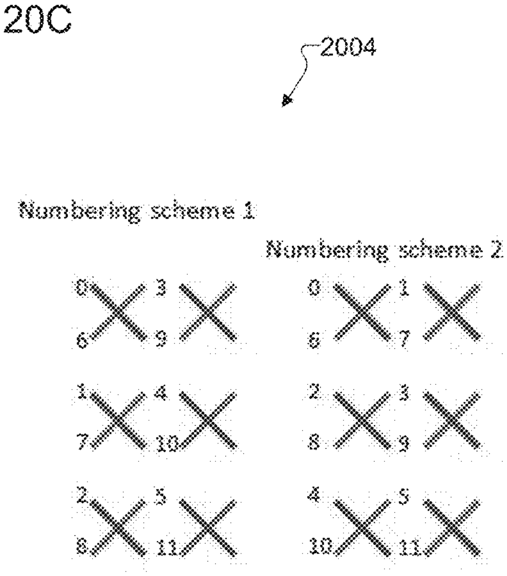

FIGS. 20C and 20D are antenna configurations with 12 CSI-RS ports, comprising 6 pairs of cross-pol antenna elements placed in a 2D antenna panel. The 8 pairs can be placed in 2×3 (FIG. 20C) or 3×2 manner (FIG. 20D) on horizontal and vertical dimensions.

Antenna number assignment in FIGS. 20A to 20D

In FIGS. 20A to 2D, antennas are indexed with integer numbers, 0, 1, . . . ,15 for 16-port configurations (FIGS. 20A and 20B), and 0, . . . , 11 for 12-port configurations (FIGS. 20C and 20D).

In wide arrays (such as 12-port config A and 16-port config A), antenna numbers are assigned such that

- Consecutive numbers are assigned for all the antenna elements for a first polarization, and proceed to a second polarization.
- For a given polarization,
  - Numbering scheme 1: consecutive numbers are assigned for a first row with progressing one edge to another edge, and proceed to a second row.
  - Numbering scheme 2: consecutive numbers are assigned for a first column with progressing one edge to another edge, and proceed to a second column.

For example, in FIG. 20A, antenna numbers 0-7 are assigned for a first polarization, and 8-15 are assigned for a second polarization; and antenna numbers 0-3 are assigned for a first row and 4-7 are assigned for a second row.

Antenna numbers in tall arrays (such as 12-port config B and 16-port config B) are obtained by simply rotating the wide antenna arrays (such as 12-port config A and 16-port config A) by 90 degrees.

PMI feedback precoder generation according to the antenna numbering in FIGS. 20A to 20D In some embodiments, when a UE is configure with 12 or 16 port CSI-RS for a CSI-RS resource, the UE is configured to report a PMI feedback precoder according to the antenna numbers in FIGS. 2A to 2D. A rank-1 precoder, $W_{m,n,p}$, which is an $N_{CSIRS}$×1 vector, to be reported by the UE has the following form:

$$W_{m,n,p} = [w_0\ w_1\ \ldots\ w_{N_{CSIRS}-1}]^t = \frac{1}{\sqrt{N_{CSIRS}}}\begin{bmatrix} v_m \otimes u_n \\ \varphi_p(v_{m'} \otimes u_{n'}) \end{bmatrix},$$

wherein:

- $N_{CSIRS}$=number of configured CSI-RS ports in the CSI-RS resource, e.g., 12, 16, etc.
- $u_n$ is a N×1 oversampled DFT vector for a first dimension, whose oversampling factor is $o_2$.
- $v_m$ is a M×1 oversampled DFT vector for a second dimension, whose oversampling factor is $o_1$.
- The dimension assignment can be done with N≥M according to numbering scheme 1 in FIGS. 20A to 20D, with (N,M)∈{(4,2),(4,3),(2,2)}; alternatively, the dimension assignment can be done with N≤M with swapping the role of columns and rows, with (N,M)∈{(2,4),(3,4), (2,2)} according to numbering scheme 2 in FIGS. 20A to 20D.

$\phi_p$ is a co-phase, e.g., in a form of $$e^{\frac{2\pi p}{4}},$$

p=0, 1, 2, 3.

Here, example set of oversampling factors that can be configured for $S_1$ and $S_2$ are 4 and 8; and m, m' ∈{0, 1, . . . , $o_1$ M}, and n, n' ∈{0, 1, . . . , $o_2$N}. In a special case, m=m' and n=n'.

Figure 21:
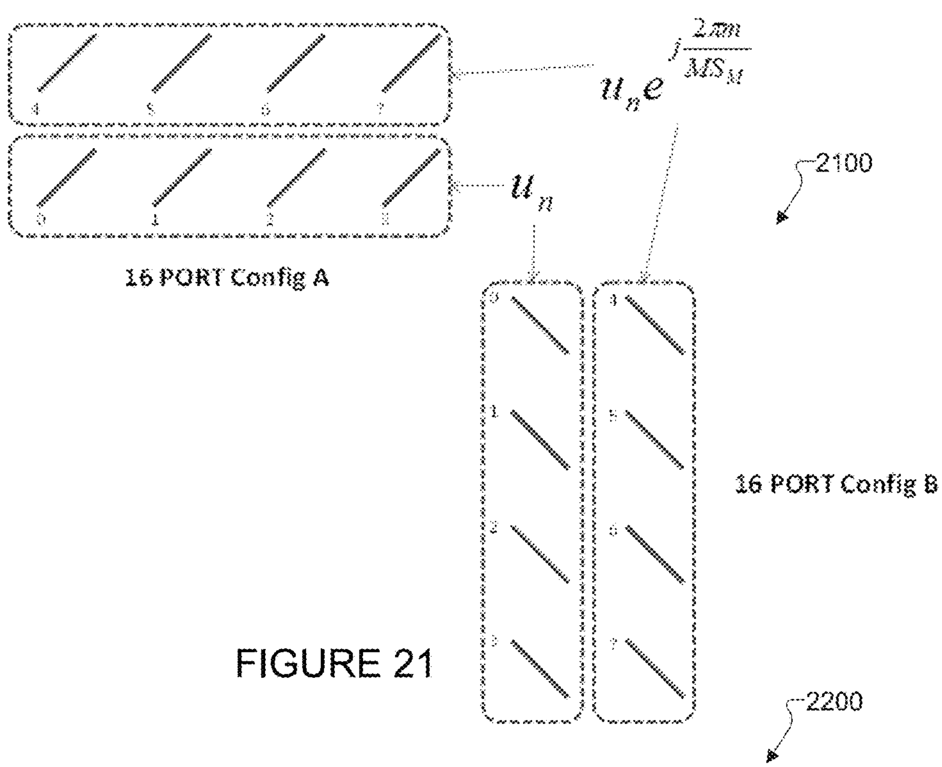
FIG. 21 illustrates that a precoder codebook construction according to some embodiments of the present disclosure.

FIG. 21 illustrates a precoding weight application 2100 to antenna configurations of FIGS. 20A to 20D according to some embodiments of the present disclosure.

When any of 16-port config A and B is used at the eNB with configuring $N_{CSIRS}$=16 to the UE, a submatrix $v_m \otimes u_n$ of $W_{m,n,p}$ corresponds to a precoder applied on 8 co-pol elements, whose antenna numbers are 0 through 7. Given the antenna configuration, M=2 and N=4 should be configured for $v_m$ and $u_n$. If 16-port config A is used, $u_n$ is a 4×1 vector representing a horizontal DFT beam and $v_m$ is a 2×1 vector representing a vertical DFT beam. If 16-port config B is used, $u_n$ is a 4×1 vector representing a vertical DFT beam and $v_m$ is a 2×1 vector representing a horizontal DFT beam.

With 12 or 16-port configurations, $v_m$ can be written as $$v_m = \begin{bmatrix}1 & e^{j\frac{2\pi m}{M'}}\end{bmatrix}^t = \begin{bmatrix}1 & e^{j\frac{2\pi m}{Mo_1}}\end{bmatrix}^t.$$

With 16-port configurations, $u_n$ can be written as:

$$u_n = \begin{bmatrix}1 & e^{j\frac{2\pi n}{N'}} & e^{j\frac{4\pi n}{N'}} & e^{j\frac{6\pi n}{N'}}\end{bmatrix}^t = \begin{bmatrix}1 & e^{j\frac{2\pi n}{No_2}} & e^{j\frac{4\pi n}{No_2}} & e^{j\frac{6\pi n}{No_2}}\end{bmatrix}^t.$$

With 12-port configurations, $u_n$ can be written as:

$$u_n = \begin{bmatrix}1 & e^{j\frac{2\pi n}{N'}} & e^{j\frac{4\pi n}{N'}}\end{bmatrix}^t = \begin{bmatrix}1 & e^{j\frac{2\pi n}{No_2}} & e^{j\frac{4\pi n}{No_2}}\end{bmatrix}^t.$$

Precoding weights to be applied to antenna port numbers 0 through 3 are $u_n$, and the preceding weights to be applied to antenna ports 4 through 7 are $$u_n e^{j\frac{2\pi m}{Mo_1}} = u_n e^{j\frac{2\pi m}{M'}}$$

with an appropriate power normalization factor. Similarly, preceding weights to be applied to antenna port numbers 8 through 11 are $u_n$', and the precoding weights to be applied to antenna ports 12 through 15 are $$u_{n'} e^{j\frac{2\pi m'}{Mo_1}}$$

with an appropriate power normalization factor. This method of preceding weight application is illustrated in FIG. 21.

It is noted that the preceding weight assignment on the antennas can be similarly illustrated for 12-port config A and B, to the case of 16-port config A and B.

For CQI derivation purpose, UE needs to assume that PDSCH signals on antenna ports {7, . . . 6+v} for v layers would result in signals equivalent to corresponding symbols transmitted on antenna numbers in {0, 1, . . . , $N_{CSIRS}$−1}, as given by $$\begin{bmatrix} y^{(0)}(i) \\ \vdots \\ y^{(N_{CSIRS}-1)}(i) \end{bmatrix} = W_{m,n,p}(i) \begin{bmatrix} x^{(0)}(i) \\ \vdots \\ x^{(v-1)}(i) \end{bmatrix},$$

where $x(i)=[x^{(0)}(i) \ldots x^{(v-1)}(i)]^T$ is a vector of symbols from the layer mapping in subclause 6.3.3.2 of 3GPPTS36.211, where $W_{m,n,p}(i)$ is the precoding matrix corresponding to the reported PMI applicable to x(i).

Parameter configuration for oversampled DFT codebooks $v_m$ and $u_n$:

FIG. 21 illustrates that a precoder codebook construction 2100 according to some embodiments of the present disclosure.

$$W_{m,n,p} = [w_0 \; w_1 \; \ldots \; w_{N_{CSIRS}-1}]^t = \frac{1}{\sqrt{N_{CSIRS}}} \begin{bmatrix} v_m \otimes u_n \\ \varphi_p(v_{m'} \otimes u_{n'}) \end{bmatrix}$$

can be flexibly used for both wide and tall 2D arrays, with appropriately configuring parameters M and N.

On the other hand, it is also sometimes desired to allocate a smaller DFT oversampling factor for the vertical dimension than for the horizontal dimension, maybe due to different angle/spread distribution. Hence, configurability of parameters to change the oversampled codebooks, $v_m$ and $u_n$, is desired for that purpose. This motivates the following method.

In some embodiments, a UE is configured to report PMI, which are generated according to a precoding matrix, comprising at least those two oversampled DFT vectors: $v_m$ and $u_n$. For the generation of the PMI, the UE is further configured to select a codebook for $v_m$ and a codebook for $u_n$, wherein each codebook for $v_m$ and $u_n$ is selected from multiple codebook choices. For this purpose, the UE may be configured with a set of parameters by higher layers.

Some example parameters are:

M' and N': to determine the denominator of the exponents for the oversampled DFT vectors $v_m$ and $u_n$:

$$v_m = \begin{bmatrix}1 & e^{j\frac{2\pi m}{M'}}\end{bmatrix}^t; \text{ and } u_n = \begin{bmatrix}1 & e^{j\frac{2\pi n}{N'}} & e^{j\frac{4\pi n}{N'}} & e^{j\frac{6\pi n}{N'}}\end{bmatrix}^t \text{ or } u_n = \begin{bmatrix}1 & e^{j\frac{2\pi n}{N'}} & e^{j\frac{4\pi n}{N'}}\end{bmatrix}^t.$$

$P_M$: to select a codebook out of multiple (e.g., 2) codebooks corresponding to $v_m$ and similarly; and $P_N$: for $u_n$.

In one method, M' and N' are directly configured by two higher layer parameters respectively defined for M' and N'.

In one such example, M'∈{16,32} and N'∈{16,32}.

In another such example, M'∈{8,16,32} and N'∈{8,16,32}.

In another method, a pair M' and N' is configured by a higher layer parameter, namely newParameterToIndicateDenominator. Although this method is less flexible than the previous one, it has a benefit of being able to limit the UE complexity increase.

In one such example:

| newParameterToIndicateDenominator | (M', N') |
|---|---|
| A first value | (32, 16) |
| A second value | (16, 32) |

In another method, $P_M$ and $P_N$ correspond to oversampling factors $o_1$ and $o_2$ which is allowed to have a value of either 2, 4 or 8.

In some embodiments, to facilitate the UE CSI reporting operation according to some embodiments of the present disclosure, a CSI resource configuration, i.e., CSI-RS-ConfigNZP comprises an additional field, e.g., newParameterToIndicateDenominator, to indicate DFT oversampling factor as illustrated in the following:

```
CSI-RS-ConfigNZP-r11 ::=   SEQUENCE {
    csi-RS-ConfigNZPId-r11       CSI-RS-ConfigNZPId-r11,
    antennaPortsCount-r11        ENUMERATED {an1, an2, an4, an8,
    an12, an16},
    newParameterToIndicateDenominator       ENUMERATED  {a
first   value,   a second value, ...},
    ...
}
```

Figure 22:
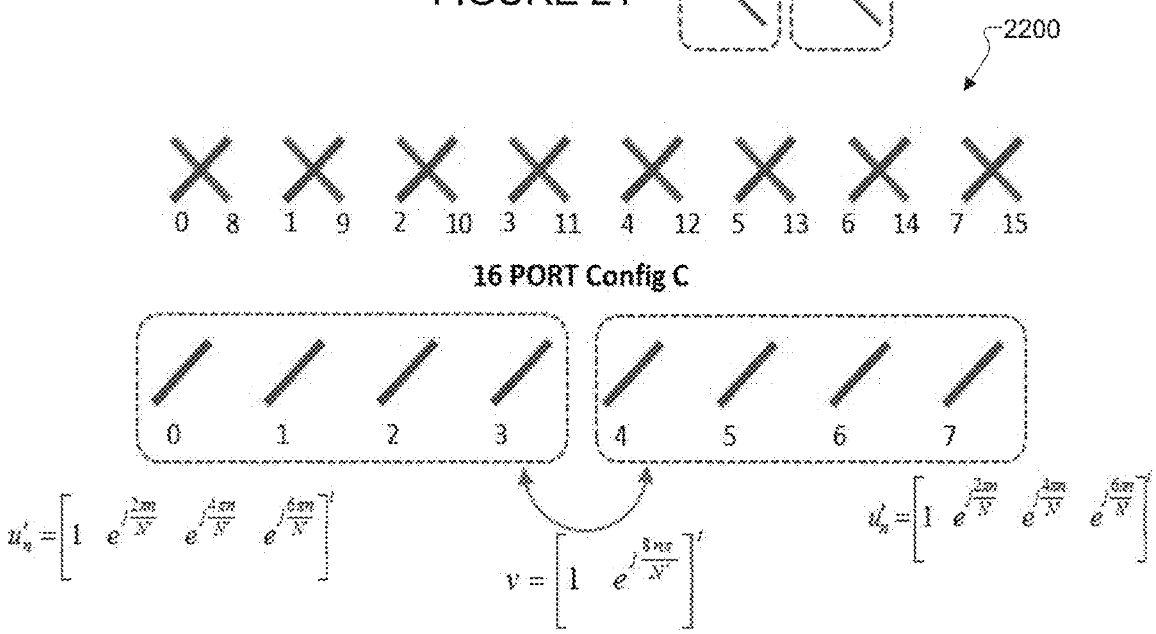
FIG. 22 illustrates an example 1D antenna configurations and antenna numbering—16 port according to embodiments of the present disclosure.

FIG. 22 illustrates an example 1D antenna configurations and antenna numbering 2200—16 port according to embodiments of the present disclosure.

Figure 23:
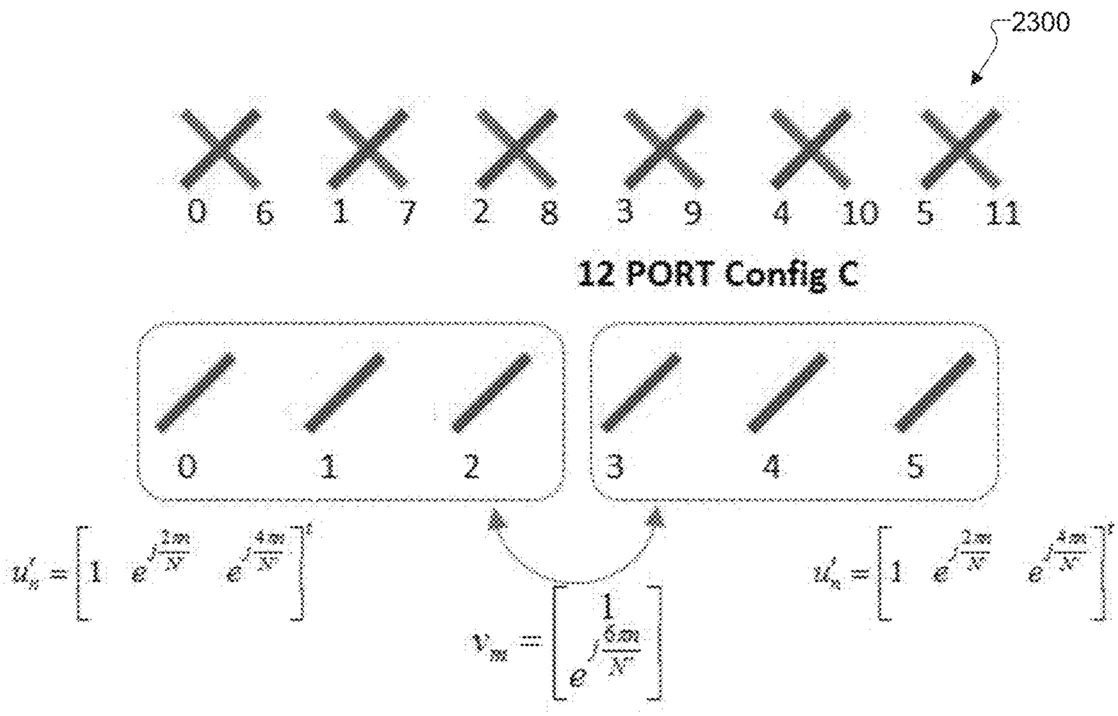
FIG. 23 illustrates an example 1D antenna configurations and antenna numbering—12 port according to embodiments of the present disclosure.

FIG. 23 illustrates an example 1D antenna configurations and antenna numbering 2300—12 port according to embodiments of the present disclosure.

FIG. 22 and FIG. 23 show an 1D antenna configuration and application of the precoding matrix 2200 and 2300 constructed for 16 and 12 port CSI-RS respectively according to some embodiments of the present disclosure.

For this antenna configuration, a rank-1 precoding matrix $W_{n,p}$ can be constructed as:

$$W_{n,p} = [w_0 \; w_1 \; \ldots \; w_{N_{CSIRS}-1}]^t = \frac{1}{\sqrt{N_{CSIRS}}}\begin{bmatrix} u_n \\ \varphi_p u_n \end{bmatrix},$$

wherein:

$u_n$ is a N×1 oversampled DFT vector, whose oversampling factor is $S_N$:

$$u_n = [1 \; e^{j\frac{2\pi n}{N'}} \; e^{j\frac{4\pi n}{N'}} \; e^{j\frac{6\pi n}{N'}} \; e^{j\frac{8\pi n}{N'}} \; e^{j\frac{10\pi n}{N'}} \; e^{j\frac{12\pi n}{N'}} \; e^{j\frac{14\pi n}{N'}}]^t$$

for 16 port CSI-RS; and $$u_n = [1 \; e^{j\frac{2\pi n}{N'}} \; e^{j\frac{4\pi n}{N'}} \; e^{j\frac{6\pi n}{N'}} \; e^{j\frac{8\pi n}{N'}} \; e^{j\frac{10\pi n}{N'}}]^t$$

for 12 port CSI-RS;

N=8 (for FIG. 22, i.e., for 16 port CSI-RS) or 6 (for FIG. 23, i.e., for 12 port CSI-RS) number of columns $N' = N \cdot S_N$.

It is noted that the rank-1 precoding matrix $W_{m,n,p}$ constructed for the 2D antenna array of FIG. 2 of the following form:

$$W_{m,n,p} = [w_0 \; w_1 \; \ldots \; w_{N_{CSIRS}-1}]^t =$$

$$\frac{1}{\sqrt{N_{CSIRS}}}\begin{bmatrix} v_m \otimes u'_n \\ \varphi_p(v_m \otimes u'_n) \end{bmatrix} = \frac{1}{\sqrt{N_{CSIRS}}}\begin{bmatrix} u'_n \\ e^{j\frac{2\pi m}{M'}} u'_n \\ \varphi_p u'_n \\ \varphi_p e^{j\frac{2\pi m}{M'}} u'_n \end{bmatrix};$$

where $u_n'$ is an oversampled DFT vector of length N/2, can be used for constructing the rank-1 precoding matrix $W_{n,p}$ constructed for the 1D antenna array, with some changes: $v_m \otimes u_n'$, the single-pol component of $W_{m,n,p}$, should be the same as $u_n$ so that it can be used for 1D array. We can see that $u_n$ can be written as:

$$u_n = \left[u'_n \; e^{j\frac{2\pi n}{N'}\cdot\frac{N}{2}} u'_n\right]^t = \begin{bmatrix} 1 \\ e^{j\frac{2\pi n}{N'}\cdot\frac{N}{2}} \end{bmatrix} \otimes u'_n;$$

and hence, we need to have $$v_m = \begin{bmatrix} 1 \\ e^{j\frac{2\pi m}{M'}} \end{bmatrix}$$

should be equal to $$\begin{bmatrix} 1 \\ e^{j\frac{2\pi n}{N'}\cdot\frac{N}{2}} \end{bmatrix},$$

in order to use the 2D precoding matrix to 1D antenna array. With equating the exponents, we obtain:

$$m = \frac{M'n}{N'} \cdot \frac{N}{2} = \frac{M'n}{2o_2}.$$

With 16-port CSI-RS case illustrated in FIG. 22, N/2=4; in this case, $$u'_n = [1 \; e^{j\frac{2\pi n}{N'}} \; e^{j\frac{4\pi n}{N'}} \; e^{j\frac{6\pi}{N'}}]^t \text{ and } m = \frac{4M'n}{N'} \left(\text{or } v_m = \begin{bmatrix} 1 \\ e^{j\frac{8\pi n}{N'}} \end{bmatrix}\right).$$

Furthermore, if M'=N', we need $$m = 4n \left(\text{or } v_m = \begin{bmatrix} 1 \\ e^{j\frac{8\pi n}{M'}} \end{bmatrix}\right),$$

to use the 2D precoding matrix to 1D antenna array. If M'=N'/2, we need $$m = 2n \left( \text{or } v_m = \begin{bmatrix} 1 \\ e^{j\frac{4\pi n}{M'}} \end{bmatrix} \right),$$

to use the 2D precoding matrix to 1D antenna array.

With 12-port CSI-RS case illustrated in FIG. 23, N/2=3; in this case, $$u'_n = [1 \;\; e^{j\frac{2\pi n}{N'}} \;\; e^{j\frac{4\pi n}{N'}}]^t \text{ and } m = \frac{3M'n}{N'} \left( \text{or } v_m = \begin{bmatrix} 1 \\ e^{j\frac{6\pi n}{N'}} \end{bmatrix} \right).$$

Furthermore, if M'=N', we need m=3n, to use the 2D precoding matrix to 1D antenna array. If M'=N'/2, we need $$m = 3n/2 \left( \text{or } v_m = \begin{bmatrix} 1 \\ e^{j\frac{3\pi n}{N'}} \end{bmatrix} \right),$$

to use the 2D precoding matrix to 1D antenna array.

Dimension-Restricted PMI

Hence, in some embodiments, for rank-1 reporting, a UE can be configured to report PMI corresponding to a precoding matrix $W_{m,n,p}$, in the 2D codebook, wherein the first index m, is determined as a deterministic function of the second index n and the number of CSI-RS ports. The UE is configured this way when eNB wants to use the 2D codebook constructed for the 2D array of FIG. 2 for supporting 1D array of FIG. 22 and FIG. 23. The UE is configured to report PMI in such a way when the UE is configured to report dimension restricted PMI by higher-layer signaling (RRC). Some examples are as in the following.

In the below examples, the UE is configured to report information only on n and p.

Ex 1) When the number of CSI-RS ports is 16 and M'=N', the UE is configured to report $W_{m=4n,n,p}$. Here m=4n and $$v_m = \begin{bmatrix} 1 \\ e^{j\frac{8\pi n}{M'}} \end{bmatrix}$$

is assumed for CQI derivation and precoding matrix construction.

Ex 2) When the number of CSI-RS ports is 12 and M'=N', the UE is configured to report $W_{m=3n,n,p}$. Here m=3n and $$v_m = \begin{bmatrix} 1 \\ e^{j\frac{6\pi n}{M'}} \end{bmatrix}$$

is assumed for CQI derivation and precoding matrix construction.

Ex 3) When the number of CSI-RS ports is 16 and M'=N'/2, the UE is configured to report $W_{m=2n,n,p}$. Here m=2n and $$v_m = \begin{bmatrix} 1 \\ e^{j\frac{4\pi n}{M'}} \end{bmatrix}$$

is assumed for CQI derivation and precoding matrix construction.

Ex 4) When the number of CSI-RS ports is 12 and M'=N'/2, the UE is configured to report $W_{m=3n/2,n,p}$. Here m=3n/2 and $$v_m = \begin{bmatrix} 1 \\ e^{j\frac{3\pi n}{M'}} \end{bmatrix}$$

is assumed for CQI derivation and precoding matrix construction.

For rank-2 reporting, a UE can be configured to report PMI corresponding to a precoding matrix $W_{m,n,m',n',p}^{(2)}$, in the 2D codebook, wherein the first indices m and m' are respectively determined as deterministic functions of the second index n, n' and the number of CSI-RS ports. The UE is configured to report PMI in such a way when the UE is configured to report dimension restricted PMI by higher-layer signaling (RRC).

Here, $$W^{(2)}_{m_1,m_2,m'_1,m'_1,n} = \frac{1}{\sqrt{2Q}} \begin{bmatrix} v_{m_1} \otimes u_{m_2} & v_{m'_1} \otimes u_{m'_2} \\ \varphi_n v_{m_1} \otimes u_{m_2} & -\varphi_n v_{m'_1} \otimes u_{m'_2} \end{bmatrix}.$$

Ex 1) When the number of CSI-RS ports is 16 and M'=N', the UE is configured to report $W_{m=4n,n,m'=4n',n'm,p}$.

Ex 2) When the number of CSI-RS ports is 12 and M'=N', the UE is configured to report $W_{m=3n,n,m'=3n',n',p}$.

Ex 3) When the number of CSI-RS ports is 16 and M'=N'/2, the UE is configured to report $W_{m=2n,n,m'=2n'u,n',p}$.

Ex 4) When the number of CSI-RS ports is 12 and M'=N'/2, the UE is configured to report $W_{m=3n/2,n,m'=3n'/2,n',p}$.

The dimension restriction can apply in a similar manner for other rank cases as well.

In this case, only the first dimension PMI's (i.e., m and p) are reported, and the second dimension PMI's (i.e., n) are determined as a function of m and not reported, i.e., the PMI is dimension-restricted.

In some alternative embodiments, a UE is configured to report PMI according to a rank-specific codebook table.

An example table for RI=1 is shown in Table 24, wherein:

$$W^{(1)}_{m_1,m_2,n} = \frac{1}{\sqrt{Q}} \begin{bmatrix} v_{m_1} \otimes u_{m_2} \\ \varphi_n v_{m_1} \otimes u_{m_2} \end{bmatrix},$$

Q is number of configured NZP CSI-RS ports

TABLE 24

| Master codebook for 1 layer CSI reporting for $(L_1, L_2) = (4, 2)$ | | | | |
|---|---|---|---|---|
| $i_2$ | 0 | 1 | 2 | 3 |
| Precoder | $W_{s_1 i_{1,1}, s_2 i_{1,2}, 0}^{(1)}$ | $W_{s_1 i_{1,1}, s_2 i_{1,2}, 1}^{(1)}$ | $W_{s_1 i_{1,1}, s_2 i_{1,2}, 2}^{(1)}$ | $W_{s_1 i_{1,1}, s_2 i_{1,2}, 3}^{(1)}$ |
| $i_2$ | 4 | 5 | 6 | 7 |
| Precoder | $W_{s_1 i_{1,1}+p_1, s_2 i_{1,2}, 0}^{(1)}$ | $W_{s_1 i_{1,1}+p_1, s_2 i_{1,2}, 1}^{(1)}$ | $W_{s_1 i_{1,1}+p_1, s_2 i_{1,2}, 2}^{(1)}$ | $W_{s_1 i_{1,1}+p_1, s_2 i_{1,2}, 3}^{(1)}$ |
| $i_2$ | 8 | 9 | 10 | 11 |
| Precoder | $W_{s_1 i_{1,1}+2p_1, s_2 i_{1,2}, 0}^{(1)}$ | $W_{s_1 i_{1,1}+2p_1, s_2 i_{1,2}, 1}^{(1)}$ | $W_{s_1 i_{1,1}+2p_1, s_2 i_{1,2}, 2}^{(1)}$ | $W_{s_1 i_{1,1}+2p_1, s_2 i_{1,2}, 3}^{(1)}$ |
| $i_2$ | 12 | 13 | 14 | 15 |
| Precoder | $W_{s_1 i_{1,1}+3p_1, s_2 i_{1,2}, 0}^{(1)}$ | $W_{s_1 i_{1,1}+3p_1, s_2 i_{1,2}, 1}^{(1)}$ | $W_{s_1 i_{1,1}+3p_1, s_2 i_{1,2}, 2}^{(1)}$ | $W_{s_1 i_{1,1}+3p_1, s_2 i_{1,2}, 3}^{(1)}$ |
| $i_2$ | 16-31 | | | |
| Precoder | Entries 16-31 constructed with replacing the second subscript $s_2 i_{1,2}$ with $s_2 i_{1,2} + p_2$ in entries 0-15. | | | |

An example table for RI=2 is shown in Table 25, wherein:

$$W_{m_1,m_2,m_1',m_1',n}^{(2)} = \frac{1}{\sqrt{2Q}}\begin{bmatrix} v_{m_1} \otimes u_{m_2} & v_{m_1'} \otimes u_{m_2'} \\ \varphi_n v_{m_1} \otimes u_{m_2} & -\varphi_n v_{m_1'} \otimes u_{m_2'} \end{bmatrix}$$

Please see the below Table Section for Table 25.

When the UE is configured to report dimension restricted PMI by higher-layer signaling (RRC), the UE is configured to force $i_{1,2}=0$, and report only $i_{1,1}$ and $i_2$ according to Table 24. In addition the UE is further configured to select a subset of $\{i_2 : i_2 \in \{0, 1, \ldots, 15\}\}$ in the codebook which corresponds to the 1D beam group, and report $i_2$ values selected from the subset only.

The same dimension restriction can apply for other rank cases as well.

Dimension Restricted PMI Configuration

In one method, the UE is configured to report the dimension-restricted PMI if a parameter configured in the higher-layer indicates "1D" configuration; the UE is configured to use the 2D PMI $W_{m,n,p}$ if the parameter indicates "2D" configuration.

In another method, the UE is configured to report the dimension-restricted PMI if a parameter(s) configured in the higher-layer indicates that at least one of M and N is 1; the UE is configured to use the 2D PMI $W_{m,n,p}$ otherwise.

In another method, the UE is configured to report the dimension-restricted PMI if a parameter, say PmiDimensionRestriction is configured in the higher-layer; the UE is configured to use the 2D PMI $W_{m,n,p}$ if the parameter is not configured.

In some embodiments, the UE is configured with a set of codebook subset selection parameters (including the PMI dimension restriction as well), according to the configured antenna dimension parameters, i.e., M and/or N.

Parameterized Codebook/Codebook Subset Selection

U.S. Provisional patent application Ser. No. 14/995,126 filed on Jan. 23, 2016 discloses a parameterized codebook, and is hereby incorporated by reference in their entirety. Some embodiments in that disclosure are reproduced below.

A group of parameters for dimension d comprises at least one of the following parameters:

a number of antenna ports $N_d$;

an oversampling factor $o_d$;

a beam group spacing $s_d$; (for W1)

a beam offset number $f_d$;

a beam spacing number $p_d$; (for W2) and a number of beams $L_d$.

A beam group indicated by a first PMI $i_{1,d}$ of dimension d (corresponding to $W_d^{(1)}$), is determined based upon these six parameters.

The total number of beams is $N_d \cdot o_d$; and the beams are indexed by an integer $m_d$, wherein beam $m_d$, $v_{m_d}$, corresponds to a precoding vector $$v_{m_d} = \left[1 \;\; e^{j\frac{2\pi m_d}{o_d N_d}} \;\; \ldots \;\; e^{j\frac{2\pi m_d (N_d-1)}{o_d N_d}}\right]^t, \; m_d = 0, \ldots, N_d \cdot o_d - 1.$$

The first PMI of dimension d, namely $i_{1,d}=0, N_d \cdot o_d / s_d - 1$, can indicate any of $L_d$ beams indexed by:

$$m_d = f_d + s_d \cdot i_{1,d}, f_d + s_d \cdot i_{1,d} + p_d, \ldots f_d + s_d \cdot i_{1,d} + (L_d - 1) p_d.$$

These $L_d$ beams are referred to as a beam group.

In some embodiments: the UE is configured with a parameterized KP codebook corresponding to the codebook parameters ($N_d$, $o_d$, $s_d$, $f_d$, $p_d$, $L_d$) where d=1,2 from a (master) codebook by applying codebook subset selection. The master codebook is a large codebook with default codebook parameters.

In some embodiments: the UE is configured with at least one of those codebook parameters ($N_d$, $o_d$, $s_d$, $f_d$, $p_d$, $L_d$) and/or PMI dimension restriction for each dimension, when the UE is configured with a set of parameters related to the antenna dimension information, e.g., Q, M and N.

The focus of this disclosure is on an alternate design of rank 3-8 codebooks.

In some embodiments, the master rank 3-8 codebook parameters for Q=8, 12, 16, and 32 antenna ports and $(L_1, L_2)=(4,2)$ are according to Table 26, where multiple oversampling factors in two dimension are supported. The remaining codebook parameters may be fixed, for example, $s_1=s_2=1$ or 2, and $p_1=1$, 2, or $O_1$ and $p_2=1$, 2, or $O_2$. Note that $Q=PN_1N_2$ in Table 26.

TABLE 26

Master rank 3-8 codebook parameters for Q = 8, 12, 16, and 32 antenna ports and $(L_1, L_2) = (4, 2)$

| Q | $N_1$ | $N_2$ | P | $O_1$ | $O_2$ | $L_1$ | $L_2$ |
|---|---|---|---|---|---|---|---|
| 8 | 2 | 2 | 2 | 2, 4, 8 | 2, 4, 8 | 4 | 2 |
| 12 | 3 | 2 | 2 | 2, 4, 8 | 2, 4, 8 | 4 | 2 |
| 12 | 2 | 3 | 2 | 2, 4, 8 | 2, 4, 8 | 4 | 2 |
| 16 | 4 | 2 | 2 | 2, 4, 8 | 2, 4, 8 | 4 | 2 |
| 16 | 2 | 4 | 2 | 2, 4, 8 | 2, 4, 8 | 4 | 2 |
| 32 | 4 | 4 | 2 | 2, 4, 8 | 2, 4, 8 | 4 | 2 |
| 32 | 8 | 2 | 2 | 2, 4, 8 | 2, 4, 8 | 4 | 2 |

The oversampling factor in one or both dimensions is configurable according to the below table.

| | |
|---|---|
| Oversampling factor $O_d$ in dimension d where d = 1, 2 | 2, 4, 8 |

In some embodiments, the master codebook parameters for Q=8, 12, 16, and 32 antenna ports and $(L_1,L_2)=(4,2)$ are according to Table 27, where single oversampling factors in two dimension are supported. The remaining codebook parameters may be fixed, for example, $s_1=s_2=2$, and $p_1=p_2=8$.

TABLE 27

Master rank 3-8 codebook parameters for Q = 8, 12, 16, and 32 antenna ports and $(L_1, L_2) = (4, 2)$

| Q | $N_1$ | $N_2$ | P | $O_1$ | $O_2$ | $L_1$ | $L_2$ |
|---|---|---|---|---|---|---|---|
| 8 | 2 | 2 | 2 | 8 | 8 | 4 | 2 |
| 12 | 3 | 2 | 2 | 8 | 8 | 4 | 2 |
| 12 | 2 | 3 | 2 | 8 | 8 | 4 | 2 |
| 16 | 4 | 2 | 2 | 8 | 8 | 4 | 2 |
| 16 | 2 | 4 | 2 | 8 | 8 | 4 | 2 |
| 32 | 4 | 4 | 2 | 8 | 8 | 4 | 2 |
| 32 | 8 | 2 | 2 | 8 | 8 | 4 | 2 |

In some embodiments, the master codebook parameters are rank-agnostic and hence are the same for all ranks, e.g. 1-8.

In some embodiments, the master codebook parameters are rank-specific and hence are different for different ranks, e.g. 1-8. In one example, the rank 1-2 master codebook parameters are specified a first set of values, the rank 3-4 master codebook parameters are specified a second set of values, and the rank 5-8 master codebook parameters are specified a third set of values. An example of rank-specific master codebook parameters is shown in Table 28.

TABLE 28

Rank-specific master codebook parameters

| | | | | $(s_1, s_2)$ | | | $(p_1, p_2)$ | | |
|---|---|---|---|---|---|---|---|---|---|
| Q $(N_1, N_2)$ | P | $(O_1, O_2)$ | $(L_1, L_2)$ | Rank 1-2 | Rank 3-4 | Rank 5-8 | Rank 1-2 | Rank 3-4 | Rank 5-8 |
| 8 (2, 2)<br>12 (3, 2)<br>16 (4, 2)<br>32 (4, 4), (8, 2) | 2 | (8, 8) | (4, 2) | (2, 2) | (8, 4) | (2, 2) | (1, 1) | (2, 2) | (1, 1) |

Rank 3-8 Master Beam Group

Figure 24:
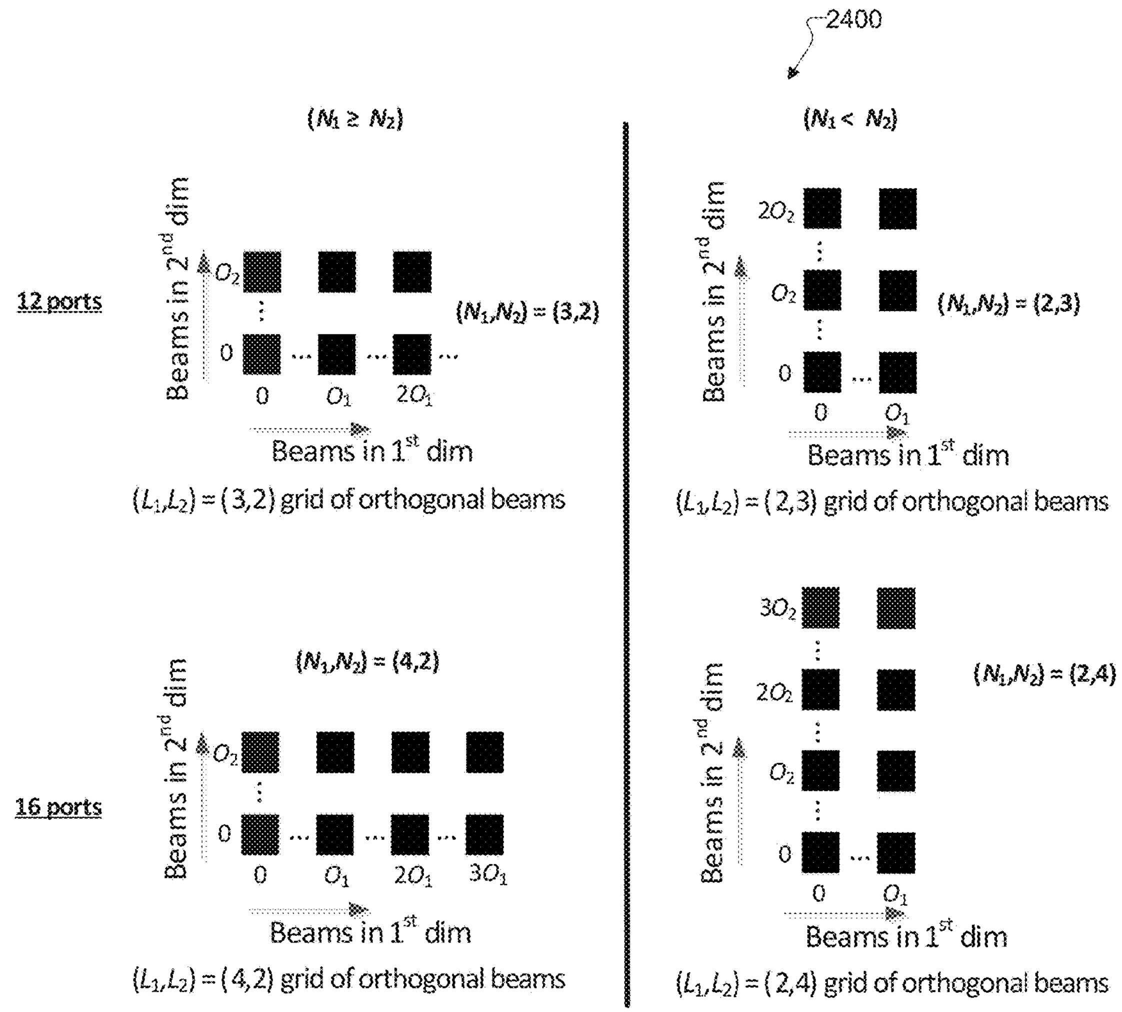
FIG. 24 illustrates the master beam group for 12 and 16 ports according to some embodiments of the present disclosure.

FIG. 24 illustrates the master beam group 2400 of for 12 and 16 ports according to some embodiments of the present disclosure.

In some embodiments, the rank 3-8 master codebook consists of W1 orthogonal beam groups as shown in FIG. 24. Two orthogonal beam group configurations, depending on the configured $(N_1,N_2)$ are:

If $N_1 \geq N_2$, then the orthogonal beam group size is (3,2) and (4,2) for 12 and 16 ports, respectively; and If $N_1 < N_2$, then the orthogonal beam group size is (2,3) and (2,4) for 12 and 16 ports, respectively.

For 12 ports, two orthogonal beam groups are:

For $N_1 \geq N_2$, the beam group consists of 6 "closest" orthogonal beams in 2D, where 3 orthogonal beams with indices $\{0, O_1, 2O_1\}$ are for the 1st or longer dimension and 2 orthogonal beams with indices $\{0, O_2\}$ are for the 2nd or shorter dimension; and For $N_1 < N_2$, the beam group consists of 6 "closest" orthogonal beams in 2D, where 2 orthogonal beams with indices $\{0, O_1\}$ are for the 1st or shorter dimension and 3 orthogonal beams with indices $\{0, O_2, 2O_2\}$ are for the 2nd or longer dimension.

For 16 ports, two orthogonal beam groups are:

For $N_1 \geq N_2$, the beam group consists of 8 "closest" orthogonal beams in 2D, where 4 orthogonal beams with indices $\{0, O_1, 2O_1, 3O_1\}$ are for the 1st or longer dimension and 2 orthogonal beams with indices $\{0, O_2\}$ are for the 2nd or shorter dimension; and For $N_1 < N_2$, the beam group consists of 8 "closest" orthogonal beams in 2D, where 2 orthogonal beams with indices $\{0, O_1\}$ are for the 1st or shorter dimension and 4 orthogonal beams with indices $\{0, O_2, 2O_2, 3O_2\}$ are for the 2nd or longer dimension.

Unless otherwise specified, 16 ports with $N_1 \geq N_2$ is assumed in the rest of the disclosure. All embodiments in this disclosure, however, are applicable to $N_1 < N_2$ configuration, and also 12 ports.

Rank 3-8 Beam Grouping Schemes from the Master Beam Group

In some embodiments, a UE is configured with a beam group consisting of beams which are a subset of beams in the master beam group. In one method, the configuration is via RRC signaling.

Figure 25:
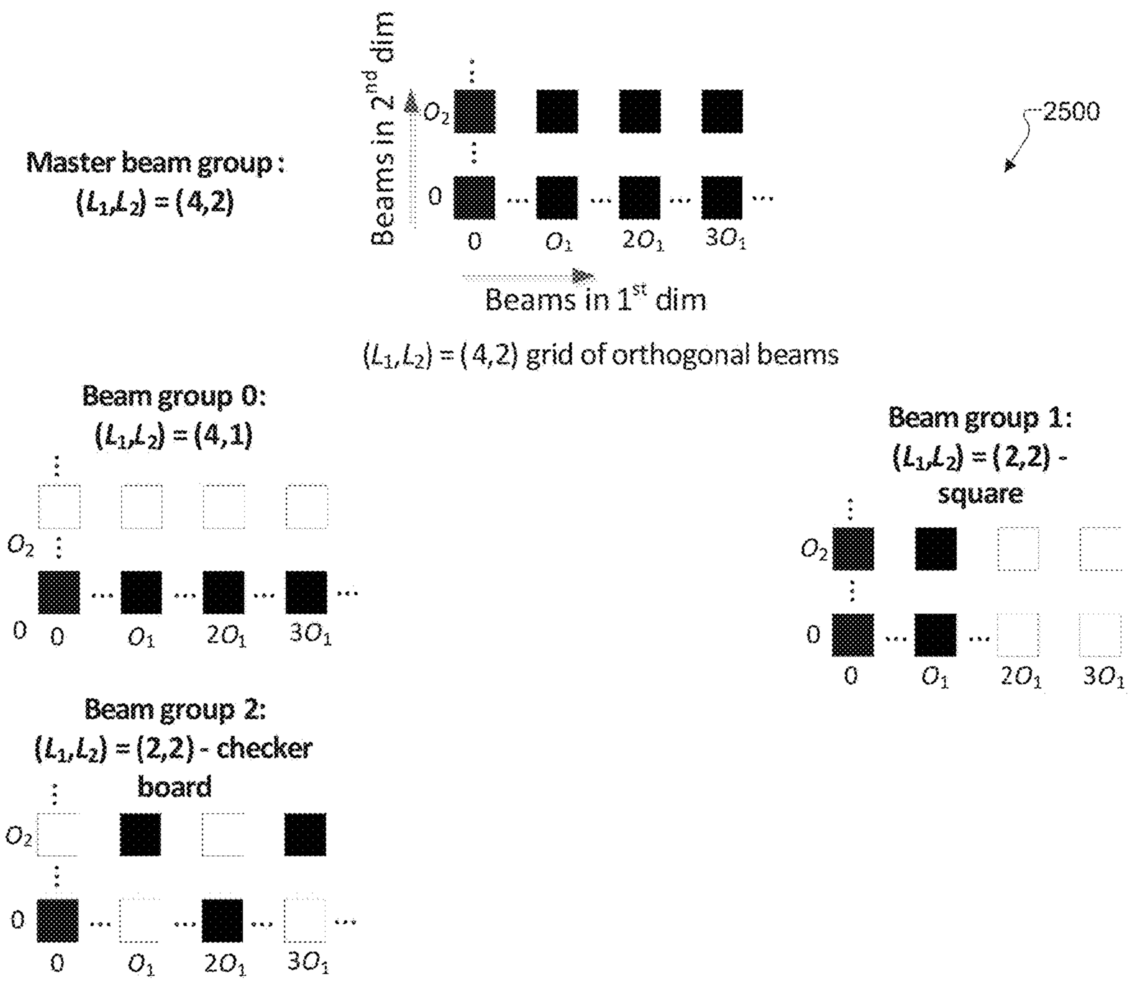
FIG. 25 illustrates beam grouping schemes for rank 3-8 according to some embodiments of the present disclosure.

FIG. 25 illustrates beam group schemes 2500 for rank 3-8 according to some embodiments of the present disclosure. The 1st dim and the 2nd dim in the figure correspond to beams in the first dimension and in the second dimension. The shaded (black) squares represent the beams that form a beam group and are obtained after beam selection and the white squares represent the beams that are not included in the beam group.

In FIG. 25:

Beam Group 0 corresponds to a beam group when $(L_1, L_2)=(4,1)$ is configured and the selected beam combination comprises of 4 orthogonal beams located at $\{(x,0)\}$ where $x=\{0, O_1, 2O_1, 3O_1\}$;

Beam Group 1 corresponds to a beam group when $(L_1, L_2)=(2,2)$-square pattern is configured and the selected beam combination comprises of 4 orthogonal beams located at $\{(0,0),(0, O_1), (O_1,O_2), (O_1,0)\}$; and Beam Group 2 corresponds to a beam group when $(L_1, L_2)=(2,2)$-checker board pattern is configured and the selected beam combination comprises of 4 orthogonal beams located at $\{(0,0), (O_1,O_2), (2O_1,0), (3O_1,O_2)\}$.

In some embodiments, a UE is configured with a beam group by means of codebook subset selection (CSS) or codebook subsampling on rank 3-8 $i_2'$ indices, with an assumption that the master codebook has rank 3-8 $i_2'$ indices corresponding to $(L_1, L_2)=(4,2)$ as shown in FIG. 24.

In one method, the CSS configuration is in terms of parameters $L_1$ and $L_2$.

In one method, the CSS configuration is explicit for Beam Group 0, Beam Group 1, and Beam Group 2 (FIG. 25).

In another method, the CSS configuration is in terms of a bitmap of length 8 (equal to number of beams in master beam group), where the number of 1's in the bitmap is 4.

In another method, the CSS configuration is in terms of a bitmap of length equal to the number of $i_2'$ indices in the master codebook, where the number of 1's in the bitmap is fixed.

In some embodiments, the 1st dim and the 2nd dim in the figure correspond to $i_{2,1}$ and $i_{2,2}$.

In some embodiments, the shaded (black) squares represent the rank 3-8 $i_2$ (or $i_{2,1}$ and $i_{2,2}$) indices that form a beam group and are obtained after subset selection and the white squares represent the indices that are not included in the beam group.

In some embodiments, $Q=2N_1{*}N_2$.

In some embodiments, the UE reports $i_{2,1}$, $i_{2,2}$ and n in place of $i_2$, in which case $m_1$ and $m_2$ are determined as:

$$m_1=s_1i_{1,1}+p_1i_{2,1} \text{ and } m_2=s_2i_{1,2}+p_2i_{2,2}.$$

In those embodiments, $p_1=O_1$ and $p_2=O_2$. So, $m_1=s_1i_{1,1}+O_1i_{2,1}$ and $m_2=s_2i_{1,2}+O_2i_{2,2}$.

In those embodiments, $$i_{1,1}=0, 1, \ldots, \frac{N_1O_1}{s_1}-1 \text{ and } i_{1,2}=0, 1, \ldots, \frac{N_2O_2}{s_2}-1.$$

Rank 3 Codebook

In some embodiments, Table 29 is used as a rank-3 (3 layer) master codebook that can be used for any of Q=8, 12, 16, and 32 antenna port configurations, wherein the corresponding rank 3 precoder is either $$W^{(3)}_{m_1,m_1',m_2,m_2'}=\frac{1}{\sqrt{3Q}}\begin{bmatrix} v_{m_1}\otimes u_{m_2} & v_{m_1}\otimes u_{m_2} & v_{m_1'}\otimes u_{m_2'} \\ v_{m_1}\otimes u_{m_2} & -v_{m_1}\otimes u_{m_2} & -v_{m_1'}\otimes u_{m_2'} \end{bmatrix} \text{ or } W^{(3)}_{m_1,m_1',m_2,m_2'}=\frac{1}{\sqrt{3Q}}\begin{bmatrix} v_{m_1}\otimes u_{m_2} & v_{m_1}\otimes u_{m_2} & v_{m_1'}\otimes u_{m_2'} \\ v_{m_1}\otimes u_{m_2} & -v_{m_1}\otimes u_{m_2} & -v_{m_1'}\otimes u_{m_2'} \end{bmatrix}.$$

Please see the below Table Section for Table 29.

Table 30 shows $i_2'$ indices to orthogonal beam pairs mapping that are considered to derive rank-3 precoders $W_{m_1,m_1',m_2,m_2'}^{(3)}$ and $\tilde{W}_{m_1,m_1',m_2,m_2'}^{(3)}$ in Table 29.

TABLE 30

$i_2'$ indices to orthogonal beam pairs mapping (in Table 29)

| $i_2'$ indices | Orthogonal beam pairs |
|---|---|
| 0-3 | $(0, 0), (O_1, 0)$ |
| 4-7 | $(O_1, 0), (2O_1, 0)$ |
| 8-11 | $(2O_1, 0), (3O_1, 0)$ |
| 12-15 | $(3O_1, 0), (0, 0)$ |
| 16-19 | (0, O2), (O1, O2) |
| 20-23 | (0, 0), (0, O2) |
| 24-27 | (O1, 0), (O1, O2) |
| 28-31 | (0, 0), (O1, O2) |
| 32-35 | (O1, O2), (2O1, 0) |
| 36-39 | (2O1, 0), (3O1, O2) |
| 40-43 | (3O1, O2), (0, 0) |

Depending on the configured beam group, a UE selects a subset of $i_2'$ indices in Table 29 in order to derive the codebook for PMI calculation. Table 31 shows selected rank-3 $i_2'$ indices determined dependent upon a selected beam group. Beam group 0, Beam group 1, and Beam group 2 are constructed according to FIG. 25.

TABLE 31

Selected $i_2'$ indices for rank-3 CSI reporting (in Table 29)

| Beam Group | Selected $i_2'$ indices |
|---|---|
| 0 | 0-15 |
| 1 | 0-3, 16-27 |
| 2 | 28-43 |

Rank 4 Codebook

In some embodiments, Table 32 is used as a rank-4 (4 layer) master codebook that can be used for any of Q=8, 12, 16, and 32 antenna port configurations, wherein the corresponding rank 4 precoder is $$W^{(4)}_{m_1,m_1',m_2,m_2',n}=\frac{1}{\sqrt{4Q}}\begin{bmatrix} v_{m_1}\otimes u_{m_2} & v_{m_1'}\otimes u_{m_2} & v_{m_1}\otimes u_{m_2} & v_{m_1'}\otimes u_{m_2} \\ \varphi_n v_{m_1}\otimes u_{m_2} & \varphi_n v_{m_1'}\otimes u_{m_2} & -\varphi_n v_{m_1}\otimes u_{m_2} & -\varphi_n v_{m_1'}\otimes u_{m_2} \end{bmatrix}.$$

Please see the below Table Section for Table 32.

Table 33 shows $i_2'$ indices to orthogonal beam pairs mapping that are considered to derive rank-4 precoders $W_{m_1,m_1',m_2,m_2',n}^{(4)}$ in Table 32.

TABLE 33

$i_2'$ indices to orthogonal beam pairs mapping (in Table 32)

| $i_2'$ indices | Orthogonal beam pairs |
|---|---|
| 0-1 | $(0, 0), (O_1, 0)$ |
| 2-3 | $(O_1, 0), (2O_1, 0)$ |
| 4-5 | $(2O_1, 0), (3O_1, 0)$ |
| 6-7 | $(3O_1, 0), (0, 0)$ |
| 8-9 | (0, O2), (O1, O2) |
| 10-11 | (0, 0), (0, O2) |
| 12-13 | (O1, 0), (O1, O2) |
| 14-15 | (0, 0), (O1, O2) |

TABLE 33-continued

| $i_2$' indices to orthogonal beam pairs mapping (in Table 32) | |
|---|---|
| $i_2$' indices | Orthogonal beam pairs |
| 16-17 | (O1, O2), (2O1, 0) |
| 18-19 | (2O1, 0), (3O1, O2) |
| 20-21 | (3O1, O2), (0, 0) |

Depending on the configured beam group, a UE selects a subset of $i_2$' indices in Table 32 in order to derive the codebook for PMI calculation. Table 34 shows selected rank-4 $i_2$' indices determined dependent upon a selected beam group. Beam group 0, Beam group 1, and Beam group 2 are constructed according to FIG. 25.

TABLE 34

| Selected $i_2$' indices for rank-4 CSI reporting (in Table 32) | |
|---|---|
| Beam Group | Selected $i_2$' indices |
| 0 | 0-7 |
| 1 | 0-1, 8-13 |
| 2 | 14-21 |

Rank 5-6 Master Codebook

In some embodiments, Table 35 is used as a rank-5 (5 layer) master codebook that can be used for any of Q=8, 12, 16, and 32 antenna port configurations, wherein the corresponding rank 5 precoder is $$W^{(5)}_{m_1,m_1',m_1'',m_2,m_2',m_2''} = \frac{1}{\sqrt{5Q}}\begin{bmatrix} v_{m_1}\otimes u_{m_2} & v_{m_1}\otimes u_{m_2} & v_{m_1'}\otimes u_{m_2'} & v_{m_1'}\otimes u_{m_2'} & v_{m_1''}\otimes u_{m_2''} \\ v_{m_1}\otimes u_{m_2} & -v_{m_1}\otimes u_{m_2} & v_{m_1'}\otimes u_{m_2'} & -v_{m_1'}\otimes u_{m_2'} & v_{m_1''}\otimes u_{m_2''} \end{bmatrix}.$$

Please see the below Table Section for Table 35.

In some embodiments, Table 36 is used as a rank-6 (6 layer) master codebook that can be used for any of Q=8, 12, 16, and 32 antenna port configurations, wherein the corresponding rank 6 precoder is $$W^{(6)}_{m_1,m_1',m_1'',m_2,m_2',m_2''} = \frac{1}{\sqrt{6Q}}\begin{bmatrix} v_{m_1}\otimes u_{m_2} & v_{m_1}\otimes u_{m_2} & v_{m_1'}\otimes u_{m_2'} & v_{m_1'}\otimes u_{m_2'} & v_{m_1''}\otimes u_{m_2''} & v_{m_1''}\otimes u_{m_2''} \\ v_{m_1}\otimes u_{m_2} & -v_{m_1}\otimes u_{m_2} & v_{m_1'}\otimes u_{m_2'} & -v_{m_1'}\otimes u_{m_2'} & v_{m_1''}\otimes u_{m_2''} & -v_{m_1''}\otimes u_{m_2''} \end{bmatrix}$$

Please see the below Table Section for Table 36.

Table 37 shows $i_2$' indices to orthogonal beam triples mapping that are considered to derive rank-5 precoders $W_{m_1,m_1',m_1'',m_2,m_2',m_2''}^{(5)}$ in Table 35, and rank-6 precoders $W_{m_1,m_1',m_1'',m_2,m_2',m_2''}^{(6)}$ in Table 36.

TABLE 37

| $i_2$' indices to orthogonal beam triples mapping for rank 5-6 (in Table 35 and Table 36) | |
|---|---|
| $i_2$' indices | Orthogonal beam pairs |
| 0 | (0, 0), ($O_1$, 0), ($2O_1$, 0) |
| 1 | ($O_1$, 0), ($2O_1$, 0), ($3O_1$, 0) |
| 2 | ($2O_1$, 0), ($3O_1$, 0), (0, 0) |
| 3 | ($3O_1$, 0), (0, 0), ($2O_1$, 0) |
| 4 | (0, 0), (O1, 0), (O1, O2) |
| 5 | (O1, 0), (O1, O2), (0, O2) |
| 6 | (O1, O2), (0, O2), (0, 0) |
| 7 | (0, O2), (0, 0), (O1, 0) |
| 8 | (0, 0), (O1, O2), (2O1, 0) |
| 9 | (O1, O2), (2O1, 0), (3O1, O2) |
| 10 | (2O1, 0), (3O1, O2), (0, 0) |
| 11 | (3O1, O2), (0, 0), (O1, O2) |

Depending on the configured beam group, a UE selects a subset of $i_2$' indices in Table 35 (rank-5) and Table 36 (rank-6) in order to derive the codebook for PMI calculation. Table 38 shows selected rank-5 and rank-6 $i_2$' indices determined dependent upon a selected beam group. Beam group 0, Beam group 1, and Beam group 2 are constructed according to FIG. 25.

Table 38: Selected $i_2$' indices for rank-5 and rank-6 CSI reporting (in Table 35 and Table 36

TABLE 36

| Beam Group | Selected $i_2$' indices |
|---|---|
| 0 | 0-3 |
| 1 | 4-7 |
| 2 | 8-11 |

Rank 7-8 Master Codebook

In some embodiments, Table 39 is used as a rank-7 (7 layer) master codebook that can be used for any of Q=8, 12, 16, and 32 antenna port configurations, wherein the corresponding rank 7 precoder is $$W^{(7)}_{m_1,m_1',m_1'',m_1''',m_2,m_2',m_2'',m_2'''} = \frac{1}{\sqrt{7Q}}\begin{bmatrix} v_{m_1}\otimes u_{m_2} & v_{m_1}\otimes u_{m_2} & v_{m_1'}\otimes u_{m_2'} & v_{m_1'}\otimes u_{m_2'} & v_{m_1''}\otimes u_{m_2''} & v_{m_1''}\otimes u_{m_2''} & v_{m_1'''}\otimes u_{m_2'''} \\ v_{m_1}\otimes u_{m_2} & -v_{m_1}\otimes u_{m_2} & v_{m_1'}\otimes u_{m_2'} & -v_{m_1'}\otimes u_{m_2'} & v_{m_1''}\otimes u_{m_2''} & -v_{m_1''}\otimes u_{m_2''} & v_{m_1'''}\otimes u_{m_2'''} \end{bmatrix}$$

TABLE 39

| Master codebook for 7 layer CSI reporting for $(N_1, N_2) = (4, 2)$ and $(L_1, L_2) = (4, 2)$ | |
|---|---|
| $i_2'$ | 0 |
| Precoder | $W_{s_1 i_{1,1}, s_1 i_{1,1}+O_1, s_1 i_{1,1}+2O_1, s_1 i_{1,1}+3O_1, s_2 i_{1,2}, s_2 i_{1,2}, s_2 i_{1,2}, s_2 i_{1,2}}^{(7)}$ |
| $i_2'$ | 1 |
| Precoder | $W_{s_1 i_{1,1}, s_1 i_{1,1}+O_1, s_1 i_{1,1}+O_1, s_1 i_{1,1}, s_2 i_{1,2}, s_2 i_{1,2}, s_2 i_{1,2}+O_2, s_2 i_{1,2}+O_2}^{(7)}$ |
| $i_2'$ | 2 |
| Precoder | $W_{s_1 i_{1,1}, s_1 i_{1,1}+O_1, s_1 i_{1,1}+2O_1, s_1 i_{1,1}+3O_1, s_2 i_{1,2}, s_2 i_{1,2}+O_2, s_2 i_{1,2}, s_2 i_{1,2}+O_2}^{(7)}$ |

In some embodiments, Table 40 is used as a rank-8 (8 layer) master codebook that can be used for any of Q=8, 12, 16, and 32 antenna port configurations, wherein the corresponding rank 8 precoder is $$W^{(8)}_{m_1,m_1',m_1'',m_1''',m_2,m_2',m_2'',m_2'''} = \frac{1}{\sqrt{8Q}}\begin{bmatrix} v_{m_1}\otimes u_{m_2} & v_{m_1}\otimes u_{m_2} & v_{m_1'}\otimes u_{m_2'} & v_{m_1'}\otimes u_{m_2'} & v_{m_1''}\otimes u_{m_2''} & v_{m_1''}\otimes u_{m_2''} & v_{m_1'''}\otimes u_{m_2'''} & v_{m_1'''}\otimes u_{m_2'''} \\ v_{m_1}\otimes u_{m_2} & -v_{m_1}\otimes u_{m_2} & v_{m_1'}\otimes u_{m_2'} & -v_{m_1'}\otimes u_{m_2'} & v_{m_1''}\otimes u_{m_2''} & -v_{m_1''}\otimes u_{m_2''} & v_{m_1'''}\otimes u_{m_2'''} & -v_{m_1'''}\otimes u_{m_2'''} \end{bmatrix}$$

TABLE 40

| Master codebook for 8 layer CSI reporting for $(N_1, N_2) = (4, 2)$ and $(L_1, L_2) = (4, 2)$ | |
|---|---|
| $i_2'$ | 0 |
| Precoder | $W_{s_1 i_{1,1}, s_1 i_{1,1}+O_1, s_1 i_{1,1}+2O_1, s_1 i_{1,1}+3O_1, s_2 i_{1,2}, s_2 i_{1,2}, s_2 i_{1,2}, s_2 i_{1,2}}^{(8)}$ |
| $i_2'$ | 1 |
| Precoder | $W_{s_1 i_{1,1}, s_1 i_{1,1}+O_1, s_1 i_{1,1}+O_1, s_1 i_{1,1}, s_2 i_{1,2}, s_2 i_{1,2}, s_2 i_{1,2}+O_2, s_2 i_{1,2}+O_2}^{(8)}$ |
| $i_2'$ | 2 |
| Precoder | $W_{s_1 i_{1,1}, s_1 i_{1,1}+O_1, s_1 i_{1,1}+2O_1, s_1 i_{1,1}+3O_1, s_2 i_{1,2}, s_2 i_{1,2}+O_2, s_2 i_{1,2}, s_2 i_{1,2}+O_2}^{(8)}$ |

Table 41 shows $i_2'$ indices to orthogonal beam quadruples mapping that are considered to derive rank-7 precoders $W_{m_1,m_1',m_1'',m_1''',m_2,m_2',m_2'',m_2'''}^{(7)}$ in Table 39, and rank-8 precoders $W_{m_1,m_1',m_1'',m_1''',m_2,m_2',m_2'',m_2'''}^{(8)}$ in Table 40.

TABLE 41

| $i_2'$ indices to orthogonal beam triples mapping for rank 7-8 (in Table 39 and Table 40) | |
|---|---|
| $i_2'$ indices | Orthogonal beam pairs |
| 0 | $(0, 0), (O_1, 0), (2O_1, 0), (3O_1, 0)$ |
| 1 | $(0, 0), (O_1, 0), (O_1, O2), (0, O2)$ |
| 2 | $(0, 0), (O_1, O2), (2O_1, 0), (3O_1, O2)$ |

Depending on the configured beam group, a UE selects a subset of $i_2'$ indices in Table 39 (rank-7) and Table 40 (rank-8) in order to derive the codebook for PMI calculation. Table 42 shows selected rank-7 and rank-8 $i_2'$ indices determined dependent upon a selected beam group. Beam group 0, Beam group 1, and Beam group 2 are constructed according to FIG. 25.

TABLE 42

| Selected $i_2'$ indices for rank-7 and rank-8 CSI reporting (in Table 39 and Table 40) | |
|---|---|
| Beam Group | Selected $i_2'$ indices |
| 0 | 0 |
| 1 | 1 |
| 2 | 2 |

Alternate Rank 3-4 Codebook Designs

Figure 26:
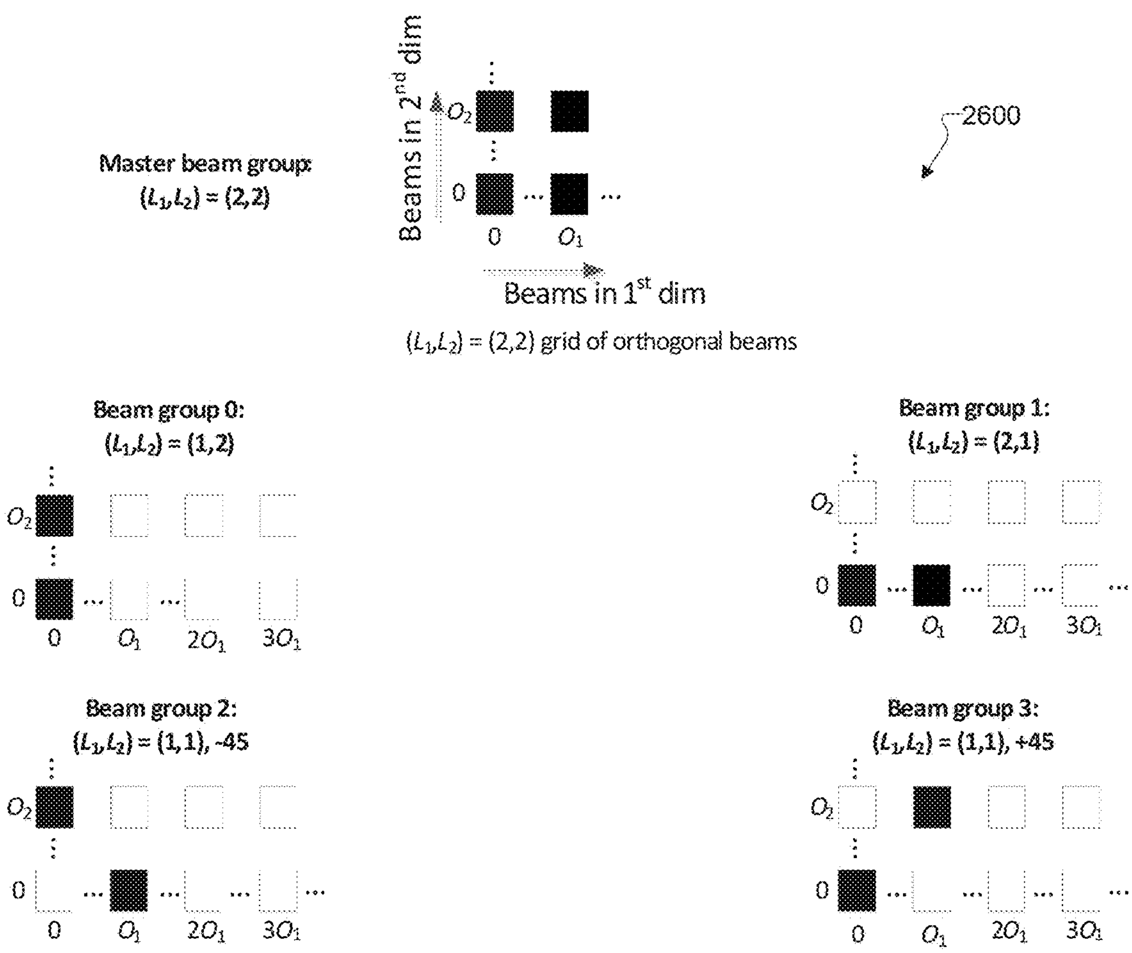
FIG. 26 illustrates example beam grouping schemes for rank 3-4 according to some embodiments of the present disclosure.

FIG. 26 illustrates example beam grouping schemes 2600 for rank 3-4 according to some embodiments of the present disclosure.

In some embodiments, the rank 3-4 master codebook consists of W1 beam groups of $(L_1,L_2)=(2,2)$ beams as shown in FIG. 26. The beam group consists of 4 "closest" orthogonal beams in 2D, where 4 orthogonal beams with indices $\{0, O_1\}$ are for the 1st or longer dimension and 2 orthogonal beams with indices $\{0, O_2\}$ are for the 2nd or shorter dimension.

In some embodiments, FIG. 26 illustrates rank 3-4 beam groups according to some embodiments of the present disclosure. The 1st dim and the 2nd dim in the figure correspond to beams in the first dimension and in the second dimension. The shaded (black) squares represent the beams that form a beam group and are obtained after beam selection and the white squares represent the beams that are not included in the beam group.

In the figure, Beam Group 0 corresponds to a beam group when $(L_1,L_2)=(1,2)$ is configured and the selected orthogonal beam pair is vertical (or in 2nd dim) and is located at $\{(0,x)\}$ where $x=\{0, O_2\}$; Beam Group 1 corresponds to a beam group when $(L_1,L_2)=(2,1)$ is configured and the selected orthogonal beam pair is horizontal (in 1st dim) and is located at $\{(x,0)\}$ where $x=\{0, O_1\}$; Beam Group 2 corresponds to a beam group when $(L_1,L_2)=(1,1)$ is configured and the selected orthogonal beam pair is in −45 degree direction and is located at $(O_1,0)$ and $(0, O_2)$; and Beam Group 3 corresponds to a beam group when $(L_1,L_2)=(1,1)$ is configured and the selected orthogonal beam pair is in +45 degree direction and is located at (0,0) and $(O_1, O_2)$.

In some embodiments, Table 43 and Table 44 are used as a rank-3 (3 layers) and rank-4 (4 layers) master codebook that can be used for any of Q=8, 12, 16, and 32 antenna port configurations.

Please see the Table Section for Tables 43 and 44.

Table 45 shows $i_2'$ indices to orthogonal beam pairs mapping that are considered to derive rank-3 precoders $W_{m_1,m_1',m_2,m_2'}^{(3)}$ and $\tilde{W}_{m_1,m_1',m_2,m_2'}^{(3)}$ in Table 43. Depending on the configured beam group, a UE selects a subset of $i_2'$ indices in Table 45 in order to derive the codebook for PMI calculation. Table also shows selected rank-3 $i_2'$ indices determined dependent upon a selected beam group. Beam group 0, Beam group 1, and Beam group 2 are constructed according to FIG. 26. The corresponding mapping for rank-4 pre-coders in Table 44 is also shown in Table 45.

TABLE 45

$i'_2$ indices to orthogonal beam pairs mapping (in Table 43)

| Beam Group | Rank-3 $i_2'$ indices | Rank-3 $i_2'$ indices | Rank-4 $i_2'$ indices | Rank-4 $i_2'$ indices | Orthogonal beam pairs |
|---|---|---|---|---|---|
| 0 | 0-3 | 4 (2 bits) | 0-1 | 2 (1 bit) | (0, 0), (0, $O_2$) |
| 1 | 4-7 | | 2-3 | | (0, 0), ($O_1$, 0) |
| 2 | 8-11 | | 4-5 | | (0, $O_2$), ($O_1$, 0) |
| 3 | 12-15 | | 6-7 | | (0, 0), ($O_1$, $O_2$) |

In some embodiments, a beam group is configured with a beam group which is a subset of the four beam group set S={Beam Group 0, Beam Group 1, Beam Group 2, and Beam Group 3}, where beam groups are according to FIG. 26. Depending on the configured subset of S, the UE derives rank 3-4 $i_2'$ indices from Table 45.

In one example, the configured beam group is a singleton subset of S, for example S0=(Beam Group 1).

In one example, the configured beam group is a non-singleton, strict subset of S, for example S1={Beam Group 0, Beam Group 1}, and S2={Beam Group 1, Beam Group 3}.

In one example, the configured beam group is the full set S3=S.

For these example sets S0-S3, the selected rank 3-4 $i_2'$ indices and their mapping to $i_2$ indices and the corresponding number of feedback bits are tabulated in Table 46. Note that this table is for illustration only. Similar table can be constructed for other beam groups according to some embodiments of this disclosure.

TABLE 46

$i'_2$ indices to $i_2$ indices mapping for example beam groups

| Configured beam group | Rank-3 $i_2'$ indices | Rank-3$i_2$ indices (number of bits) | Rank-4 $i_2'$ indices | Rank-4$i_2$ indices (number of bits) |
|---|---|---|---|---|
| S0 | 4-7 | 0-3 (2 bits) | 2-3 | 0-1 (1 bit) |
| S1 | 0-7 | 0-7 (3 bits) | 0-3 | 0-3 (2 bits) |
| S2 | 4-7, 12-15 | 0-7 (3 bits) | 2-3, 6-7 | 0-3 (2 bits) |
| S3 | 0-15 | 0-7 (4 bits) | 0-7 | 0-7 (3 bits) |

Figure 27:
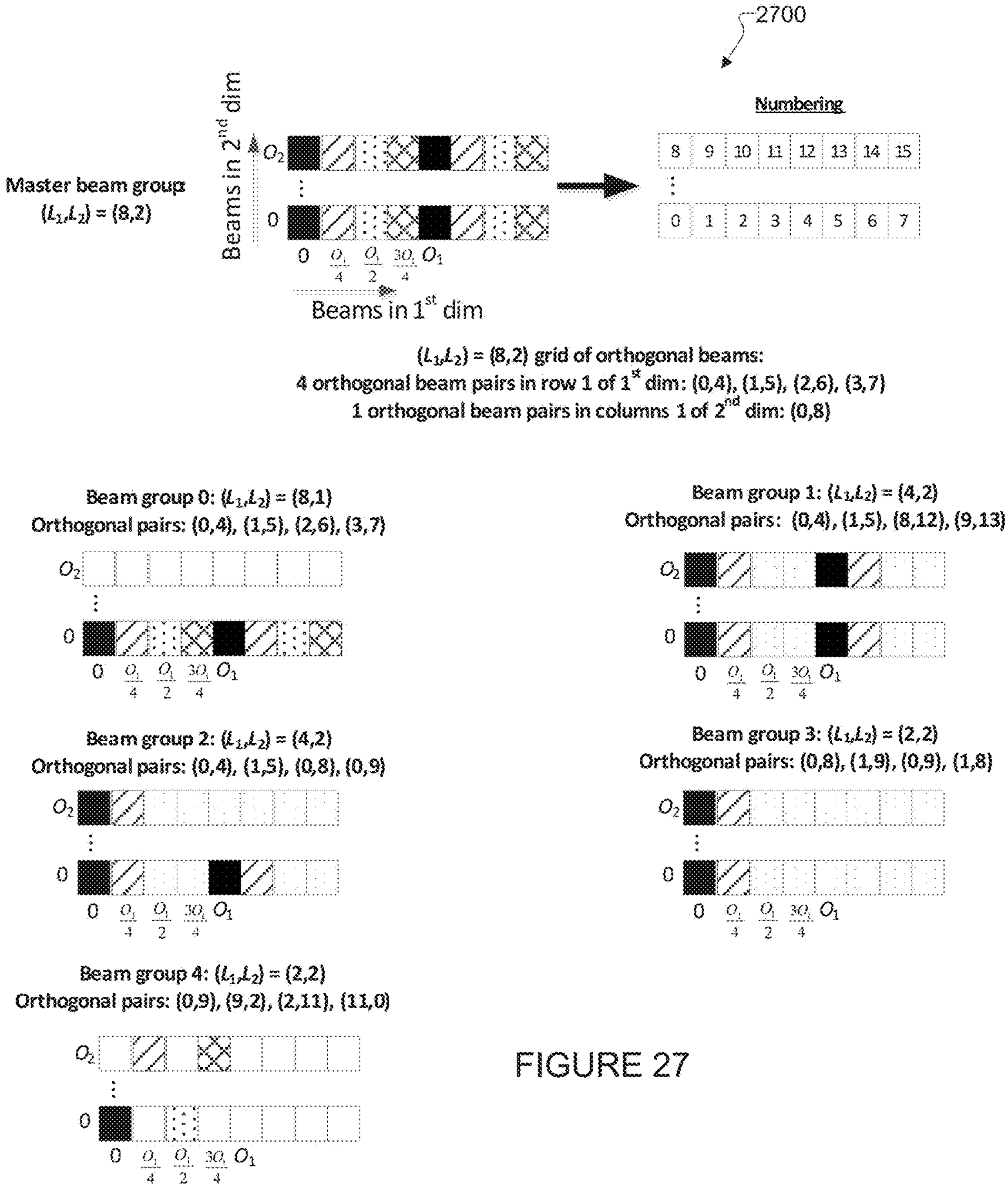
FIG. 27 illustrates example beam grouping schemes for rank 3-4 according to some embodiments of the present disclosure.

FIG. 27 illustrates example beam grouping schemes 2700 for rank 3-4 according to some embodiments of the present disclosure.

In some embodiments, the rank 3-4 master codebook consists of W1 beam groups of $(L_1,L_2)=(8,2)$ beams as shown in FIG. 27, where it is assumed that $O_1$ belongs to {4,8,16, . . . }. The beam group consists of 4 quadruple of orthogonal beams, which are shown as black and three pattern squares, where each quadruple comprises of 4 "closest" orthogonal beams in 2D. For example, the quadruple shown in black comprises of 4 orthogonal beams {0,4,8,12}. Note that beams are numbered according to the numbering scheme shown to the right-hand-side of the (8,2) grid in the figure. The same numbering scheme will be used in the embodiments below. The 4 orthogonal beams for the other three quadruples shown as three patterns can be determined similarly.

In some embodiments, FIG. 27 illustrates rank 3-4 beam groups according to some embodiments of the present disclosure. The 1st dim and the 2nd dim in the figure correspond to beams in the first dimension and in the second dimension. The black and three pattern squares represent the beams that form a beam group and are obtained after beam selection and the white squares represent the beams that are not included in the beam group.

In the FIG. 27:

Beam Group 0 corresponds to a beam group when $(L_1, L_2)=(8,1)$ is configured and the selected orthogonal beam pairs are along horizontal (or 1st dim) and are located at {(0,4),(1,5),(2,6),(3,7)};

Beam Group 1 corresponds to a beam group when $(L_1, L_2)=(4,2)$ is configured and the selected orthogonal beam pairs are located at {(0,4),(1,5)} in the first row and at {(2,6),(3,7)} in the second row;

Beam Group 2 corresponds to a beam group when $(L_1, L_2)=(4,2)$ is configured and the selected orthogonal beam pairs are located at {(0,4),(1,5)} in the first row, (0,8) in the first column, and (0,9) along the +45 direction;

Beam Group 3 corresponds to a beam group when $(L_1, L_2)=(2,2)$ is configured and the selected orthogonal beam pairs are located at {(0,8),(1,9)} in the first and the second columns, (0,9) along the +45 direction, and (1,8) along the −45 direction; and Beam Group 4 corresponds to a beam group when $(L_1, L_2)=(2,2)$-checker pattern is configured and the selected orthogonal beam pairs are located at {(0,9), (9,2),(2,11,(11,0)} which form a checker pattern.

In some embodiments, similar to Table 43 and Table 44, rank-3 (3 layers) and rank-4 (4 layers) master codebooks can be constructed by considering union of all orthogonal beam pairs according to Beam Group 0-Beam Group 4 in FIG. 27, that can be used for any of Q=8, 12, 16, and 32 antenna port configurations.

In some embodiments, a UE is configured with at least one beam group out of Beam Group 0-Beam Group 4 in FIG. 27 according to some embodiments of this disclosure. Depending on the configured beam group, the UE either selects the beams from (8,2) beam grid in FIG. 27 or $i_2'$ indices from the associated rank 3-4 codebook tables, and maps them sequentially to $i_2$ indices 0−A, according to some embodiments of this disclosure, where A+1 is the number of selected $i_2'$ indices.

Figure 28:
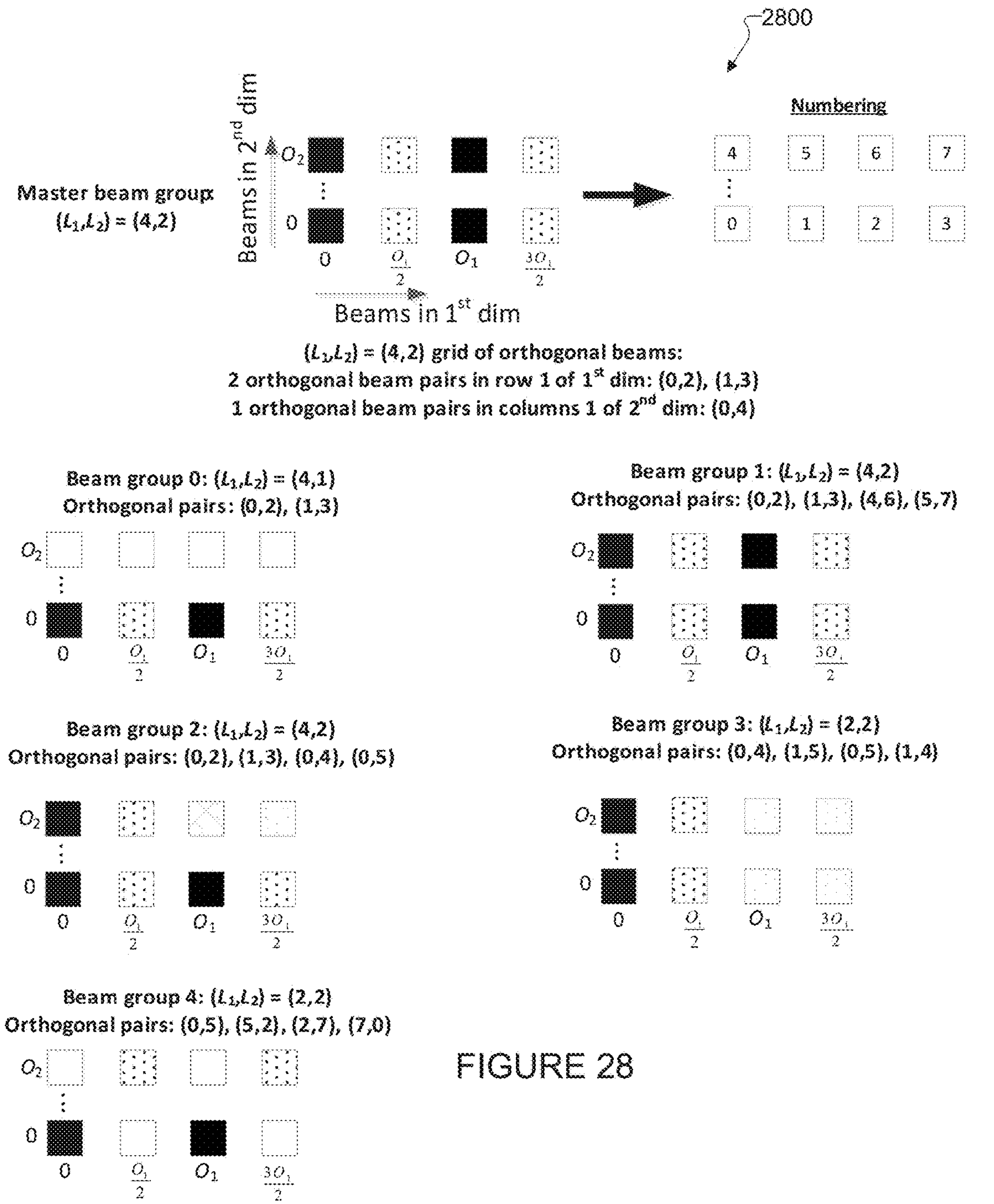
FIG. 28 illustrates beam grouping schemes for rank 3-4 according to some embodiments of the present disclosure.

FIG. 28 illustrates beam grouping schemes 2800 for rank 3-4 according to some embodiments of the present disclosure.

In some embodiments, the rank 3-4 master codebook consists of W1 beam groups of $(L_1,L_2)=(4,2)$ beams as shown in FIG. 28, where it is assumed that $O_1$ belongs to {2,4,8,16, . . . }. The beam group consists of 2 quadruple of orthogonal beams, which are shown as black and dotted pattern squares, where each quadruple comprises of 4 "closest" orthogonal beams in 2D. For example, the quadruple shown in black comprises of 4 orthogonal beams {0,2,4,6}. Note that beams are numbered according to the numbering scheme shown to the right-hand-side of the (4,2) grid in the figure. The same numbering scheme will be used in the embodiments below. The 4 orthogonal beams for the other quadruple shown as dotted patterns is {1,3,5,7}.

FIG. 28 illustrates rank 3-4 beam groups according to some embodiments of the current invention, the illustrations of different beam groups is similar to those in FIG. 27.

In some embodiments, similar to Table 43 and Table 44, rank-3 (3 layers) and rank-4 (4 layers) master codebooks can be constructed by considering union of all orthogonal beam pairs according to Beam Group 0-Beam Group 4 in FIG. 28, that can be used for any of Q=8, 12, 16, and 32 antenna port configurations.

In some embodiments, a UE is configured with at least one beam group out of Beam Group 0-Beam Group 4 in FIG. 28 according to some embodiments of this disclosure. Depending on the configured beam group, the UE either selects the beams from (4,2) beam grid in FIG. 28 or $i_2'$ indices from the associated rank 3-4 codebook tables, and maps them sequentially to $i_2$ indices 0−A, according to some embodiments of this disclosure, where A+1 is the number of selected $i_2'$ indices.

Rank 3-4 Codebook Based on Orthogonal Pair Type

Figure 29:
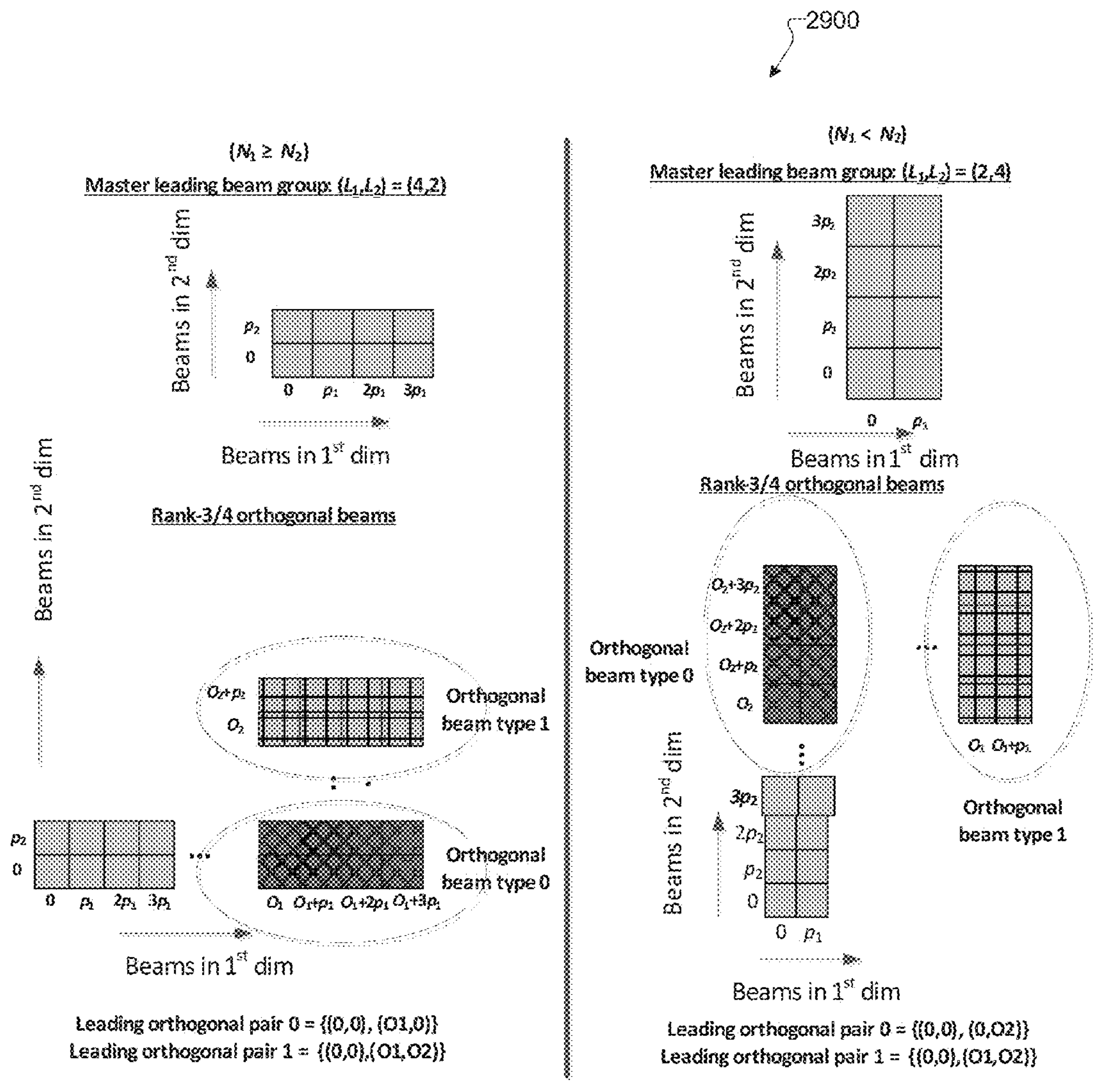
FIG. 29 illustrates example rank 3-4 orthogonal beam pairs for 2 antenna ports in shorter dimension according to some embodiments of the present disclosure.

FIG. 29 illustrates example rank 3-4 orthogonal beam pairs 2900 for 2 antenna ports in shorter dimension according to some embodiments of the present disclosure.

In some embodiments, starting from the master leading beam group of size $(L_1,L_2)=(4,2)$ for $N_1 \geq N_2$ and (2,4) for $N_1<N_2$, the rank-3 and rank-4 orthogonal beam pairs are constructed based upon the orthogonal pair type. An illustration of example orthogonal pair types, for 2 antenna ports in the shorter dimension, is shown in FIG. 29. The top of the figure shows the master beam group which comprises of the leading beams $\{b_0\}$ of the group of orthogonal beam pairs $\{(b_0,b_1)\}$, where $$b_0 \in B_0^A \equiv \{(x,y): x \in \{0,p_1,2p_1,3p_1\} \text{ and } y \in \{0,p_2\}\} \text{ for } N_1 \geq N_2, \text{ and}$$

$$b_0 \in B_0^B \equiv \{(x,y): x \in \{0,p_1\} \text{ and } y \in \{0,p_2,2p_2,3p_2\}\} \text{ for } N_1 < N_2.$$

The orthogonal beams $\{b_1\}$ of the orthogonal pairs are determined dependent upon the orthogonal pair type.

Two example orthogonal beam types are:

Orthogonal beam type 0: This pair is constructed by considering beams that are orthogonal to the leading beams in the longer dimension only. According to this construction, the orthogonal beams are $$b_1 \in B_1^A \equiv \{(O_1+x,y):(x,y) \in B_0^A\} \text{ for } N_1 \geq N_2, \text{ and}$$

$$b_1 \in B_1^B \equiv \{(x,O_2+y):(x,y) \in B_0^B\} \text{ for } N_1 < N_2; \text{ and}$$

Orthogonal beam type 1: This pair is constructed by considering beams that are orthogonal to the leading beams in both longer and shorter dimensions. According to this construction, the orthogonal beams are $$b_1 \in B_1^{(A)} \equiv \{(O_1+x,O_2+y):(x,y) \in B_0^A\} \text{ for } N_1 \geq N_2, \text{ and}$$

$$b_1 \in B_1^{(B)} \equiv \{(O_1+x,O_2+y):(x,y) \in B_0^B\} \text{ for } N_1 < N_2.$$

In general, for $N_1 \geq N_2$, $$\text{Orthogonal beam type 0}: b_1 \in B_1^{(A)} \equiv \{(n_1O_1+x,y):(x,y) \in B_0^A\}; \text{ and}$$

$$\text{Orthogonal beam type 1}: b_1 \in B_1^{(A)} \equiv \{(n_1O_1+x,n_2O_2+y):(x,y) \in B_0^A\}.$$

Here, $n_1 \in \{1, \ldots, N_1-1\}$ and $n_2 \in \{1, \ldots, N_2-1\}$. For $N_1<N_2$, the general orthogonal beam types can be defined similarly.

In one method, $n_1$, $n_2$ are fixed in the specification. In another method, $n_1$, $n_2$ is either configured by higher-layer signaling (RRC) or reported by the UE.

In some embodiments, separate rank 3-4 codebooks are constructed for each of the orthogonal beam pair types. For example, for Orthogonal pairs 0 and Orthogonal pair 1 in FIG. 29, two separate rank 3-4 tables are constructed similar to some embodiments of this disclosure.

In some embodiments, a single rank 3-4 codebooks are constructed for each of the orthogonal beam pair types. For example, for Orthogonal pairs 0 and Orthogonal pair 1 in FIG. 29, a single rank 3-4 tables is constructed.

For $N_1 \geq N_2$, Table 48 and Table 49 show the example of single master rank 3-4 codebook tables that can be used for any of Q=8, 12, 16, and 32 antenna port configurations, wherein $\delta_1$, $\delta_2$ are according to Table 47. For $N_1<N_2$, the codebook tables can be constructed similarly.

In one method, $s_1=O_1$, and $s_2=O_2$. In this case $i_{1,2}=0$ and $i_{1,2}=1$ result in the same precoding matrix.

- If $(N_1, N_2)=(4,2)$, then $i_{1,1} \in \{0, 1, \ldots, N_1-1\}$ and $i_{1,2}=0$. In this case $i_{1,2}$ is not reported by the UE. Then, the number of bits for indicating $(i_{1,1}, i_{1,2})$ pair is correspondingly determined with counting only the $i_{1,1}$ component.
- If $(N_1, N_2)=(3,2)$, then $i_{1,1} \gamma \{0, 1, \ldots, N_1-1\}$ and $i_{1,2}=0$; and hence $i_{1,2}$ is not reported by the UE. Then, the number of bits for indicating $(i_{1,1}, i_{1,2})$ pair is correspondingly determined, with counting only the $i_{1,1}$ component.

In one method, $s_1=O_1$, and $s_2=O_2/2$. In this case $i_{1,2}=0$ and $i_{1,2}=1$ result in the difference precoding matrices.

- If $(N_1, N_2)=(4,2)$, then $i_{1,1} \in \{0,1,2,3\}$ and $i_{1,2} \in \{0,1\}$. Then, the number of bits for indicating $(i_{1,1},i_{1,2})$ pair is (2+1=3) bits.
- If $(N_1, N_2)=(3,2)$, then $i_{1,1} \in \{0,1,2\}$ and $i_{1,2} \in \{0,1\}$. Then, the number of bits for indicating $(i_{1,1}, i_{1,2})$ pair is (2+1=3) bits.

TABLE 47

Orthogonal beam type to $(\delta_1, \delta_2)$ mapping

| Type | Configuration | $\delta_1$ | $\delta_2$ |
|---|---|---|---|
| Orthogonal beam type 0 | $N_1 \geq N_2$ | $O_1$ | 0 |
| | $N_1 < N_2$ | 0 | $O_2$ |
| Orthogonal beam type 1 | Both | $O_1$ | $O_2$ |

Please see the Table Section for Tables 48 and 49.

In some embodiments, the rank 3-4 orthogonal beam pair type is pre-determined, for example Orthogonal beam type 0.

In some embodiments, a UE is configured with a rank 3-4 orthogonal pair type e.g., selected from Orthogonal beam type 0 and Orthogonal beam type 1, by the eNB via RRC.

In some embodiments, a UE reports a rank 3-4 orthogonal pair type selected from Orthogonal beam type 0 and Orthogonal beam type 1, to the eNB.

In one method, this indication is SB and short-term. In this case, the UE reports orthogonal pair type per subband, and $i_2$ can indicate this information as well as other information such as beam selection and co-phase.

In another method, it is WB and long-term. In this case the UE reports one orthogonal pair type for whole set S subbands in case of PUSCH reporting. In case of PUCCH reporting, this information is reported together with $i_1$ ($i_{11}$ and $i_{12}$).

Figure 30:
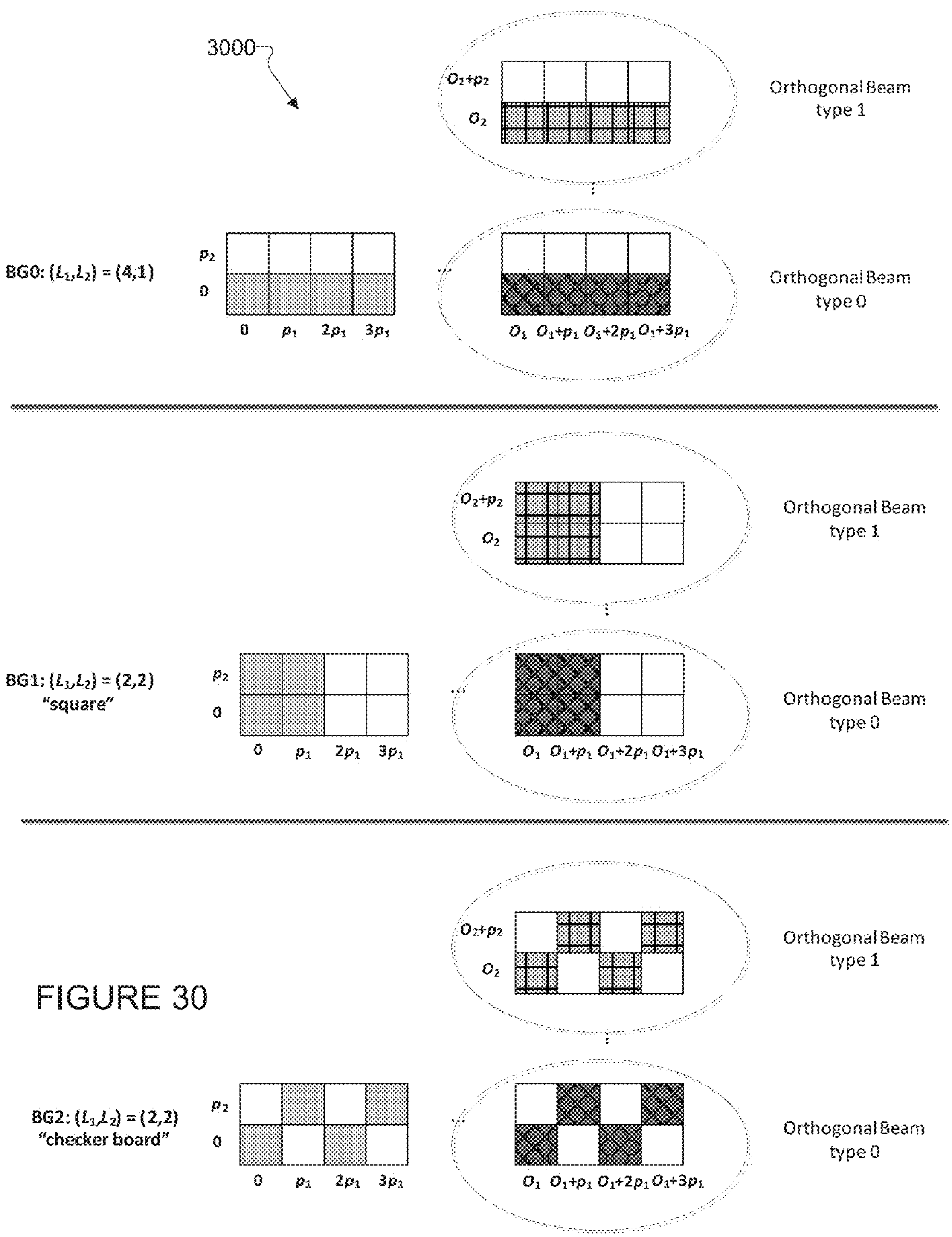
FIG. 30 illustrates beam grouping schemes for rank 3-4: $N_1 \geq N_2$ case according to some embodiments of the present disclosure.

FIG. 30 illustrates beam grouping schemes 3000 for rank 3-4: $N_1 \geq N_2$ case according to some embodiments of the present disclosure.

In some embodiments, for $N_1 \geq N_2$, FIG. 30 illustrates rank 3-4 beam groups BG0, BG1, and BG2. For $N_1 < N_2$, the beam groups are obtained by 90 degree rotation of those in FIG. 30. The shaded (gray) and pattern squares represent the beams that form a beam group and are obtained after beam selection and the white squares represent the beams that are not included in the beam group.

In FIG. 30:

- Beam Group 0 corresponds to a beam group when ($L_1$, $L_2$)=(4,1) is configured and the selected beams are in the 1st dimension only;
- Beam Group 1 corresponds to a beam group when ($L_1$, $L_2$)=(2,2)-square is configured and the selected beams form a square; and
- Beam Group 2 corresponds to a beam group when ($L_1$, $L_2$)=(2,2)-checker board is configured and the selected beams form a checker board.

In some embodiments, a UE is configured with a beam group from BG0, BG1, and BG2 according to some embodiments of the present disclosure. Depending on the configured BG, UE constructs the rank 3-4 codebook for the PMI calculation.

Depending on the configured beam group, a UE selects a subset of $i_2'$ indices in Table 48 and Table 49 in order to derive the rank 3 & 4 codebook for PMI calculation. In one method, the UE sequentially maps the selected $i_2'$ indices to 0–A to obtain the corresponding $i_2$ indices, where A+1 is the number of selected $i_2'$ indices.

Table 280 and Table 281 respectively show selected rank-3 & 4 $i_2'$ indices determined dependent upon a selected beam group. Beam group 0, Beam group 1, and Beam group 2 are constructed according to FIG. 30.

TABLE 50

Selected $i_2'$ indices for rank-3 CSI reporting (in Table 2848)

| Beam Group | Selected $i_2'$ indices |
|---|---|
| 0 | 0-15 |
| 1 | 0-7, 16-23 |
| 2 | 0-3, 8-11, 20-23, 28-31 |

TABLE 51

Selected $i_2'$ indices for rank-4 CSI reporting (in Table 2847)

| Beam Group | Selected $i_2'$ indices |
|---|---|
| 0 | 0-7 |
| 1 | 0-3, 8-11 |
| 2 | 0-1, 4-5, 10-11, 14-15 |

In one method, a UE is configured with a beam group type indicator and an orthogonal beam type indicator by higher layer.

In another method, a UE is configured with a beam group type indicator by higher layer, and configured to report an orthogonal beam type indicator together with either $i_1$ or $i_2$.

Figure 31:
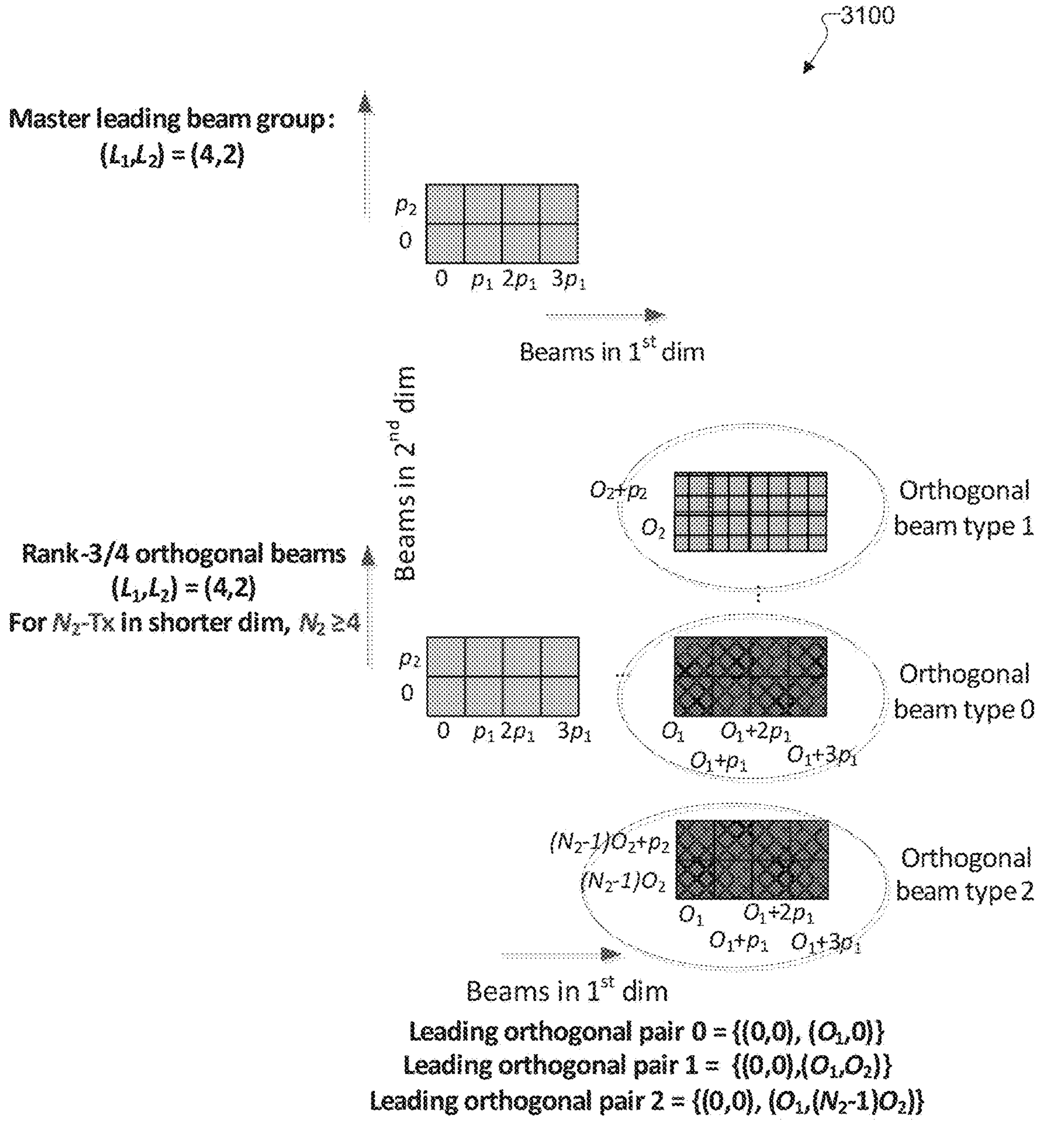
FIG. 31 illustrates rank 3-4 orthogonal beam pairs for $N_2 \geq 4$ antenna ports in shorter dimension according to some embodiments of the present disclosure.

FIG. 31 illustrates Rank 3-4 orthogonal beam pairs 3100 for $N_2 \geq 4$ antenna ports in shorter dimension according to some embodiments of the present disclosure.

In some embodiments, for $N_2 \geq 4$ antenna ports in the shorter dimension, as shown in FIG. 31, three orthogonal pair types are considered for rank 3-4 orthogonal beam pair construction, where Orthogonal pair 0 and 1 are the same as explained above. Orthogonal pair 2 is constructed by considering beams that are orthogonal to the leading beams in both longer and shorter dimensions, and that are going shown as shown in the figure. According to this construction, the orthogonal beams are:

$$b_1 \in \{(O_1+x,(N_2-1)O_2+y): x \in \{0,p_1,2p_1,3p_1\} \text{ and } y \in \{0, p_2\}\}.$$

The rank 3-4 codebook tables in this case can be constructed according to some embodiments of this disclosure.

Rank 5-8 Codebook Based on Orthogonal Pair Type: 16 Ports

Figure 32:
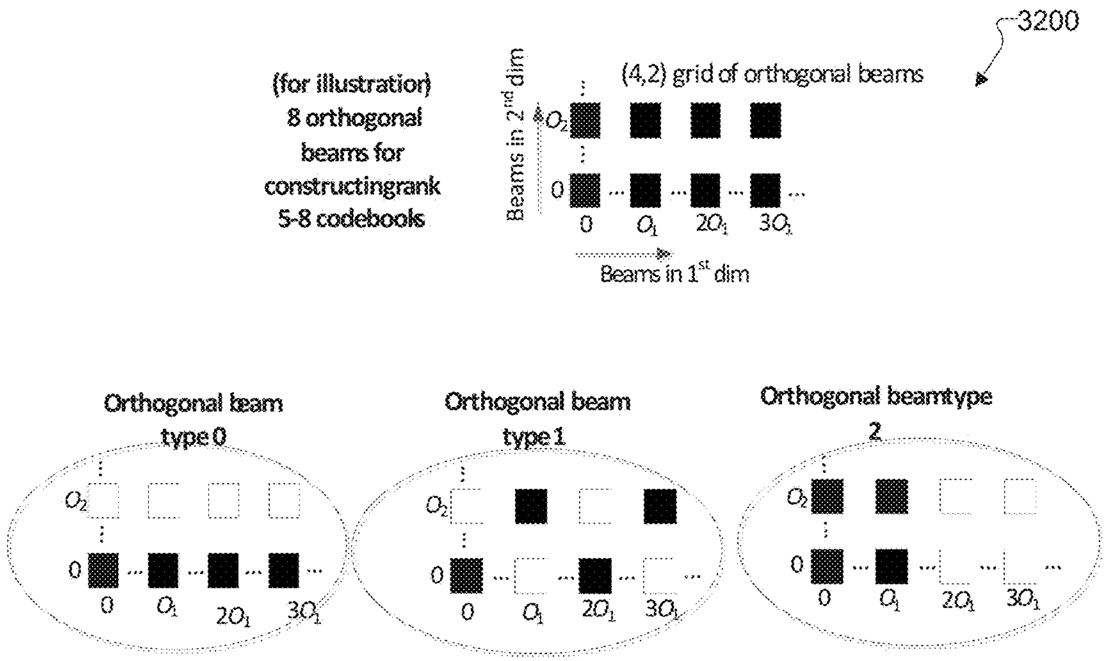
FIG. 32 illustrates rank 5-8 orthogonal beam combinations for $(N_1,N_2)=(4,2)$ according to some embodiments of the present disclosure.

FIG. 32 illustrates rank 5-8 orthogonal beam combinations 3200 for $(N_1,N_2)=(4,2)$ according to some embodiments of the present disclosure.

In some embodiments, for $(N_1,N_2)=(4,2)$, starting from the 8 orthogonal beams, as illustrated in FIG. 32, orthogonal beam combinations for rank 5-8 precoding matrices are constructed based upon the orthogonal beam types. An illustration of example orthogonal beam types is also shown in FIG. 32. The top of the figure shows the 8 orthogonal beams which comprises of the orthogonal beams $(b_0,b_1)$, where $(b_0,b_1) \in \{(x, y): x \in \{0, O_1, 2O_1, 3O_1\} \text{ and } y \in \{0, O_2\}\}$.

Three orthogonal beam types that is likely to show up in practice according to the propagation channel characteristics are:

- Orthogonal beam type 0: This pair is constructed by considering 4 beams that are orthogonal in the first (longer) dimension only. According to this construction, the orthogonal beams are $(b_0,b_1) \in \{(x,0): x \in \{0, O_1, 2O_1, 3O_1\}\}$;
- Orthogonal beam type 1: This pair is constructed by considering 4 beams that are orthogonal in both first (longer) and second (shorter) dimensions and that form a checker pattern. According to this construction, the orthogonal beams are $(b_0,b_1) \in \{(0,0), (0, O_2), (O_1,0), (O_1, O_2)\}$; and
- Orthogonal beam type 2: This pair is constructed by considering 4 beams that are orthogonal in both first (longer) and second (shorter) dimensions and that form a square. According to this construction, the orthogonal beams are $(b_0,b_1) \in \{(x, y): x \in \{0, O_1\} \text{ and } y \in \{0, O_2\}\}$.

For $(N_1,N_2)=(2,4)$ configuration, the orthogonal beam type construction is similar (90 degree rotation of orthogonal beam types in FIG. 32).

In some embodiments, the rank 5-8 orthogonal beam type is pre-determined, for example Orthogonal beam type 0.

In some embodiments, a UE is configured with a rank 5-8 orthogonal beam type by the eNB via RRC.

In some embodiments, a UE reports a rank 5-8 orthogonal beam type to the eNB.

In one method, the candidate orthogonal beam type comprises only types 0 and 1.

In one method, this indication is SB and short-term. In this case, the UE reports orthogonal beam type per subband, and $i_2$ can indicate this information as well as other information such as beam selection and co-phase.

In another method, it is WB and long-term. In this case the UE reports one orthogonal beam type for whole (set S) subbands in case of PUSCH reporting. In case of PUCCH reporting, this information is reported together with $i_1$ ($i_{11}$ and $i_{12}$).

TABLE 52

Orthogonal beam type to (δ) mapping: 16 ports

| Type | Configuration | $\delta_{1,1}$ | $\delta_{2,1}$ | $\delta_{1,2}$ | $\delta_{2,2}$ | $\delta_{1,3}$ | $\delta_{2,3}$ |
|---|---|---|---|---|---|---|---|
| Orthogonal | $N_1 \geq N_2$ | $O_1$ | 0 | $2O_1$ | 0 | $3O_1$ | 0 |
| beam type 0 | $N_1 < N_2$ | 0 | $O_2$ | 0 | $2O_2$ | 0 | $3O_2$ |
| Orthogonal | $N_1 \geq N_2$ | $O_1$ | $O_2$ | $2O_1$ | 0 | $3O_1$ | $O_2$ |
| beam type 1 | $N_1 < N_2$ | $O_1$ | $O_2$ | 0 | $2O_2$ | 0 | $3O_2$ |
| Orthogonal beam type 2 | Both | $O_1$ | 0 | $O_1$ | $O_2$ | 0 | $O_2$ |

In one method, $s_1=2$, and $s_2=2$.

- $i_{1,1} \in \{0, \ldots, O_1/2-1\}$ and $i_{1,2} \in \{0, \ldots, O_2/2-1\}$. Then, the number of bits for indicating $(i_{1,1}, i_{1,2})$ pair is corresponding correspondingly determined. This is valid for both cases of $(N_1, N_2)=(4,2)$ and (3,2).

In some embodiments, $\delta_1$, $\delta_2$ for rank 3-4 and $\delta_{1,1}$, $\delta_{1,2}$, $\delta_{1,3}$, $\delta_{2,1}$, $\delta_{2,2}$, $\delta_{2,3}$ for rank 5-8 are respectively configured with two separate orthogonal beam type configurations according to Table 47 and Table 52.

In some embodiments, $\delta_1$, $\delta_2$ for rank 3-4 and $\delta_{1,1}$, $\delta_{1,2}$, $\delta_{1,3}$, $\delta_{2,1}$, $\delta_{2,2}$, $\delta_{2,3}$ for rank 5-8 are configured with a common orthogonal beam type configuration according to Table 47 and Table 52. For example, if orthogonal beam type 0 is configured, type 0 is configured for rank 3-8 and the delta values are selected as in the following:

| | $\delta_1$ | $\delta_2$ |
|---|---|---|
| Orthogonal beam type 0 | $O_1$ | 0 |

| | $\delta_{1,1}$ | $\delta_{2,1}$ | $\delta_{1,2}$ | $\delta_{2,2}$ | $\delta_{1,3}$ | $\delta_{2,3}$ |
|---|---|---|---|---|---|---|
| Orthogonal beam type 0 | $O_1$ | 0 | $2O_1$ | 0 | $3O_1$ | 0 |

In some embodiments, $\delta_1$, $\delta_2$ for rank 3-4 and $\delta_{1,1}$, $\delta_{1,2}$, $\delta_{1,3}$, $\delta_{2,1}$, $\delta_{2,2}$, $\delta_{2,3}$ for rank 5-8 are configured according to Table 53, wherein $\delta_1$, $\delta_2$ for rank 3-4 is mapped to $\delta_{1,1}$, $\delta_{2,1}$ in the table.

TABLE 53

Alternate delta table for rank 3-8 codebook

| | | k | | | |
|---|---|---|---|---|---|
| | δ | 0 | 1 | 2 | 3 |
| If $N_2 = 1$ | $\delta_{1,k}$ | 0 | $O_1$ | $2O_1$ | $3O_1$ |
| | $\delta_{2,k}$ | 0 | 0 | 0 | 0 |
| If $N_1 > 1$ and $N_2 > 1$ | $\delta_{1,k}$ | 0 | $O_1$ | 0 | $O_1$ |
| | $\delta_{2,k}$ | 0 | 0 | $O_2$ | $O_2$ |
| If $N_1 = 1$ | $\delta_{1,k}$ | 0 | 0 | 0 | 0 |
| | $\delta_{2,k}$ | 0 | $O_2$ | $2O_2$ | $3O_2$ |

Rank 5-8 Codebook Based on Orthogonal Pair Type: 12 Ports

Figure 33:
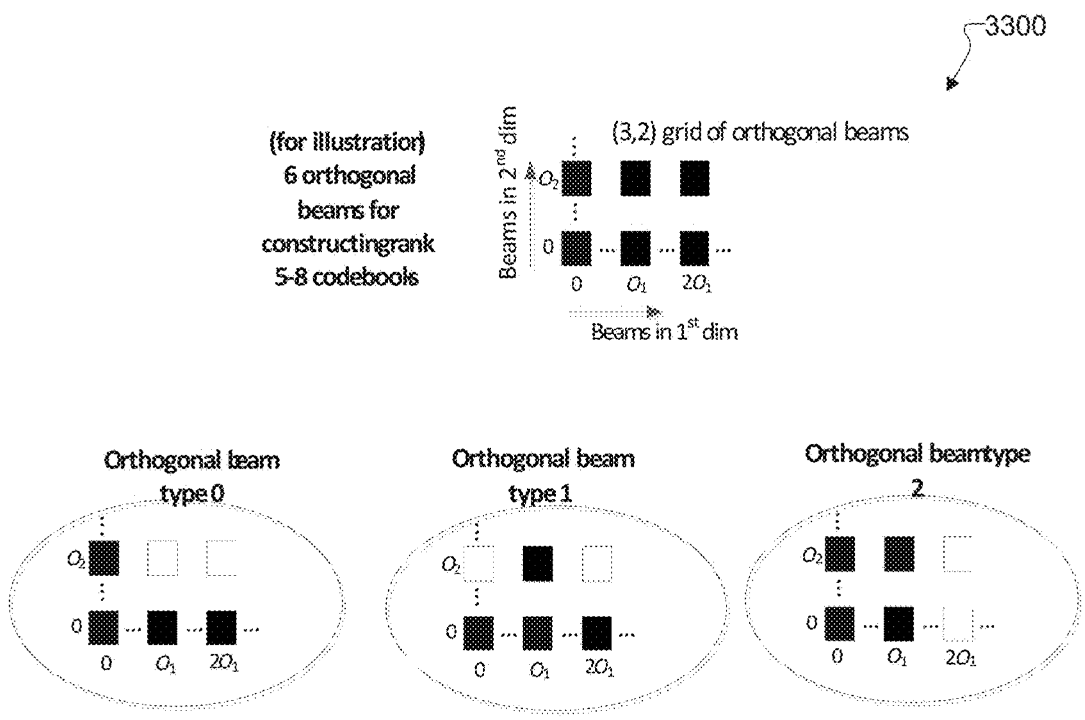
FIG. 33 illustrates rank 5-8 orthogonal beam combinations for $(N_1,N_2)=(3,2)$ according to some embodiments of the present disclosure.

FIG. 33 illustrates rank 5-8 orthogonal beam combinations 3300 for $(N_1,N_2)=(3,2)$ according to some embodiments of the present disclosure.

In some embodiments, for $(N_1,N_2)=(3,2)$, starting from the 6 orthogonal beams, as illustrated in FIG. 33, orthogonal beam combinations for rank 5-8 precoding matrices are constructed based upon the orthogonal beam types. An illustration of example orthogonal beam types is also shown in FIG. 33. The top of the figure shows the 6 orthogonal beams which comprises of the orthogonal beams $(b_0,b_1)$, where $(b_0, b_1) \in \{(x, y): x \in \{0, O_1, 2O_1\}$ and $y \in \{0, O_2\}\}$.

Three orthogonal beam types that is likely to show up in practice according to the propagation channel characteristics are:

- Orthogonal beam type 0: This pair is constructed by considering 3 beams that are orthogonal in the longer dimension and 1 beam in the shorter dimension. According to this construction, the orthogonal beams are $(b_0, b_1) \in \{(x,0): x \in \{0, O_1, 2O_1\}\} \cup \{(0, O_2)\}$;
- Orthogonal beam type 1: This pair is constructed by considering 3 beams that are orthogonal in the longer dimension and 1 beam in the shorter dimension. According to this construction, the orthogonal beams are $(b_0, b_1) \in \{(x,0): x \in \{0, O_1, 2O_1\}\} \cup \{(O_1, O_2)\}$; and
- Orthogonal beam type 2: This pair is constructed by considering 4 beams that are orthogonal in both first (longer) and second (shorter) dimensions and that form a square. According to this construction, the orthogonal beams are $(b_0,b_1) \in \{(x, y): x \in \{0,O_1\}$ and $y \in \{0, O_2\}\}$.

In some embodiments, similar to 16 ports case, a UE is configured with one orthogonal beam type in FIG. 33 according to some embodiments of this disclosure.

In some embodiments, similar to 16 ports case, a UE reports one orthogonal beam type in FIG. 33 according to some embodiments of this disclosure.

For rank 5, 6, 7, 8, the precoding matrices are determined according to the configured orthogonal beam type as in Table 54.

TABLE 54

Orthogonal beam type to (δ) mapping: 12 ports

| Type | Configuration | $\delta_{1,1}$ | $\delta_{2,1}$ | $\delta_{1,2}$ | $\delta_{2,2}$ | $\delta_{1,3}$ | $\delta_{2,3}$ |
|---|---|---|---|---|---|---|---|
| Orthogonal | $N_1 \geq N_2$ | $O_1$ | 0 | $2O_1$ | 0 | 0 | $O_2$ |
| beam type 0 | $N_1 < N_2$ | 0 | $O_2$ | 0 | $2O_2$ | $O_1$ | 0 |
| Orthogonal | $N_1 \geq N_2$ | $O_1$ | 0 | $2O_1$ | 0 | $O_1$ | $O_2$ |
| beam type 1 | $N_1 < N_2$ | 0 | $O_2$ | 0 | $2O_2$ | $O_1$ | $O_2$ |
| Orthogonal beam type 2 | Both | $O_1$ | 0 | $O_1$ | $O_2$ | 0 | $O_2$ |

Alternate Rank 3-4 Codebook Designs on Orthogonal Pair Type

Figure 34:
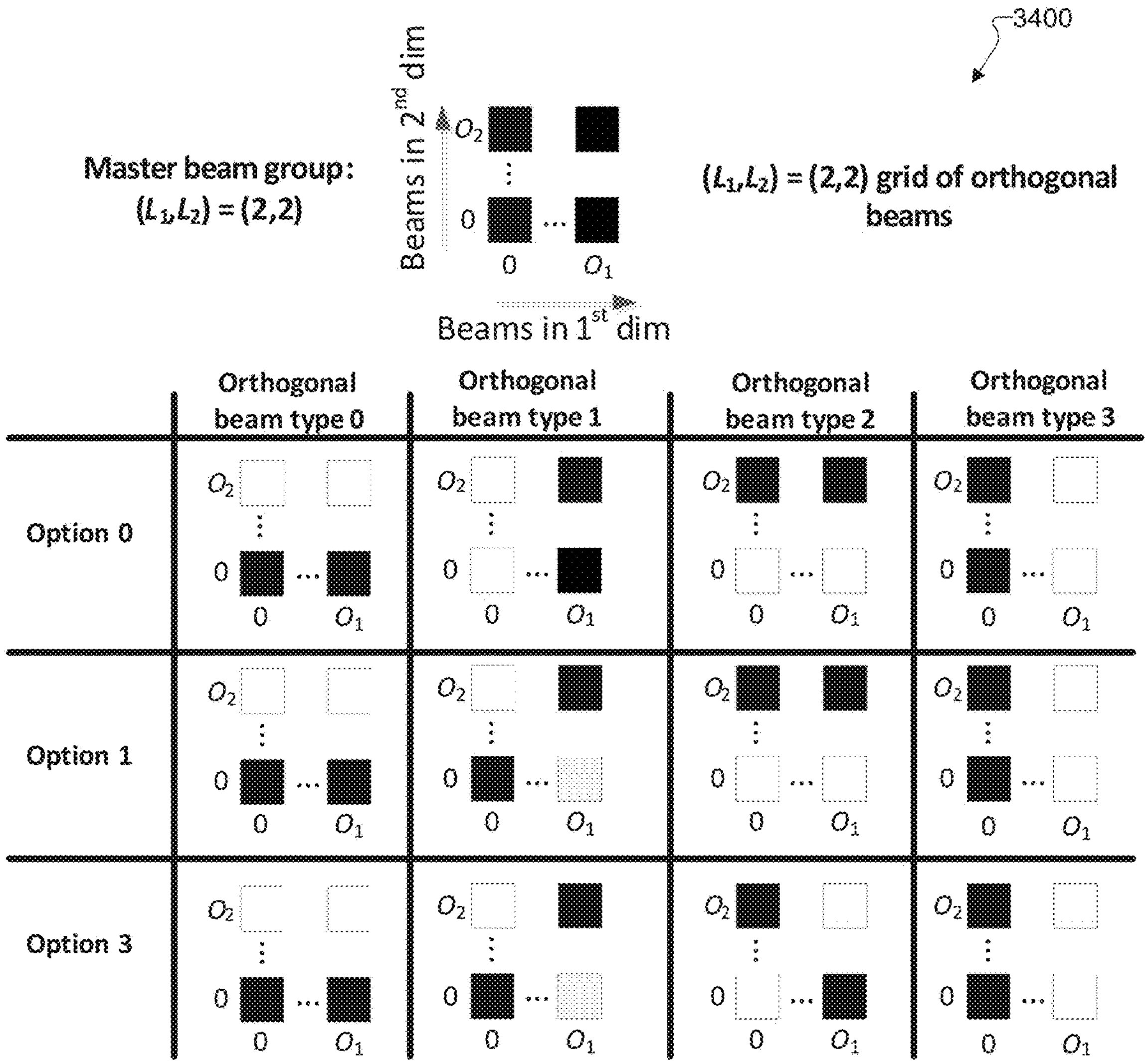
FIG. 34 illustrates the rank 3-4 master codebook comprising W1 beam groups according to some embodiments of the present disclosure.

FIG. 34 illustrates an illustration of beam grouping schemes 3400 for rank 3-4 according to some embodiments of the present disclosure.

TABLE 55

Orthogonal beam type to (δ) mapping for rank 3-4 codebook

| Type | Orthogonal beam type (k) | $\delta_{1,0}^{(k)}$ | $\delta_{2,0}^{(k)}$ | $\delta_{1,1}^{(k)}$ | $\delta_{2,1}^{(k)}$ |
|---|---|---|---|---|---|
| Option 0 | 0 | 0 | 0 | 0 | $O_1$ |
| | 1 | 0 | $O_1$ | $O_1$ | $O_2$ |
| | 2 | $O_1$ | $O_2$ | 0 | $O_2$ |
| | 3 | 0 | $O_2$ | 0 | 0 |
| Option 1 | 0 | 0 | 0 | 0 | $O_1$ |
| | 1 | 0 | 0 | $O_1$ | $O_2$ |
| | 2 | $O_1$ | $O_2$ | 0 | $O_2$ |
| | 3 | 0 | $O_2$ | 0 | 0 |
| Option 2 | 0 | 0 | 0 | 0 | $O_1$ |
| | 1 | 0 | 0 | $O_1$ | $O_2$ |
| | 2 | $O_1$ | $O_2$ | 0 | $O_2$ |
| | 3 | 0 | $O_2$ | 0 | $O_1$ |

FIG. 34 illustrates the rank 3-4 master codebook 3400 comprising W1 beam groups according to some embodiments of the present disclosure. The beam group consists of 4 "closest" orthogonal beams in 2D, where 4 orthogonal beams with indices $\{0, O_1\}$ are for the 1st dimension and 2 orthogonal beams with indices $\{0, O_2\}$ are for the 2nd dimension.

Starting from these 4 orthogonal beams, 4 orthogonal beam pair types are constructed that are included in the rank 3-4 master codebook.

There are multiple options to construct 4 orthogonal pairs. Out of which, three important options, Option 0, Option 1, and Option 2 are shown in FIG. 34.

- Option 0: In this option, 4 orthogonal beam pairs correspond to 2 horizontal pairs (Orthogonal beam type 0, Orthogonal beam type 2) and 2 vertical pairs (Orthogonal beam type 1, Orthogonal beam type 3).
- Option 1: In this option, 4 orthogonal beam pairs correspond to 2 horizontal pairs (Orthogonal beam type 0, Orthogonal beam type 2), 1 vertical pair (Orthogonal beam type 3), and 1 diagonal up pair (Orthogonal beam type 1).
- Option 2: In this option, 4 orthogonal beam pairs correspond to 1 horizontal pair (Orthogonal beam type 0), 1 vertical pair (Orthogonal beam type 3), 1 diagonal up pair (Orthogonal beam type 1), and 1 diagonal down pair (Orthogonal beam type 2).

The rank-3 and rank-4 codebooks according to this orthogonal beam pair construction is shown in Table 56 and Table 57, respectively, where Table 55 is used for $\delta_{1,0}^{(k)}$, $\delta_{2,0}^{(k)}$, $\delta_{1,1}^{(k)}$, and $\delta_{2,1}^{(k)}$ values for each of the considered codebook option, where the superscript k=0, 1, 2, and 3 are used for Orthogonal beam type 0, Orthogonal beam type 1, Orthogonal beam type 2, and Orthogonal beam type 3, respectively. Note that the codebooks can be used for any of Q=8, 12, 16, and 32 antenna port configurations with at least 2 ports in the shorter dimension.

Please see the below Table Section for Table 56 and 57.

In some embodiments, a UE is configured with one of Option 0, Option 1, and Option 2 for rank 3-4 codebooks.

In some embodiments, the rank 3-4 codebook option is pre-determined, for example Option 1.

In some embodiments, a UE is configured with one orthogonal beam type from Orthogonal beam type 0, Orthogonal beam type 1, Orthogonal beam type 2, and Orthogonal beam type 3 in FIG. 34 according to some embodiments of this disclosure.

In some embodiments, a UE reports one orthogonal beam type from Orthogonal beam type 0, Orthogonal beam type 1, Orthogonal beam type 2, and Orthogonal beam type 3 in FIG. 34 according to some embodiments of this disclosure.

Embodiments on rank 3-4 codebooks with 2, 3, or 4 orthogonal beam types (without SB beam selection)

Figure 35:
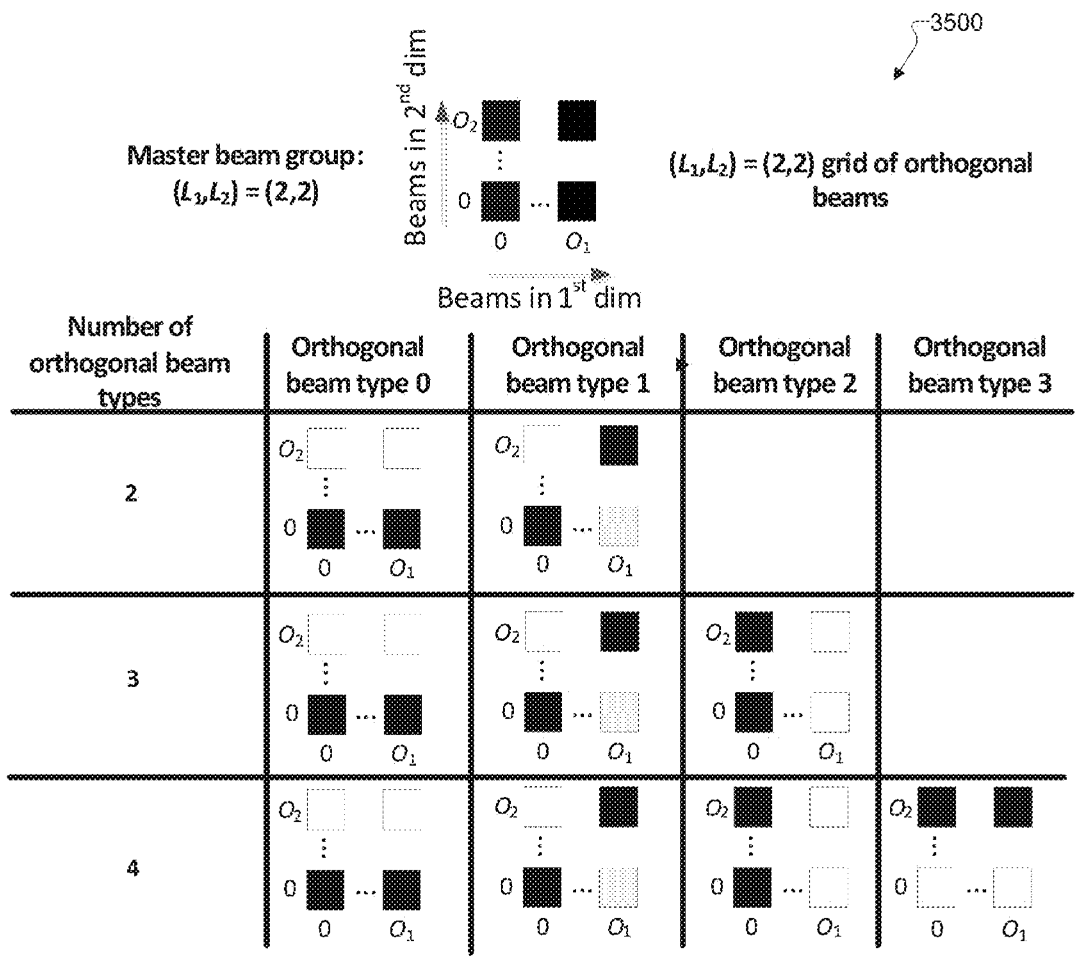
FIG. 35 illustrates beam grouping schemes for rank 3-4 according to embodiments of the present disclosure.

FIG. 35 illustrates beam grouping schemes 3500 for rank 3-4 according to embodiments of the present disclosure.

TABLE 58

Number of orthogonal beam type to (δ) mapping for rank 3-4 codebook

| Number of orthogonal beam types (K) | Orthogonal beam type (k) | $\delta_{1,0}^{(k)}$ | $\delta_{2,0}^{(k)}$ | $\delta_{1,1}^{(k)}$ | $\delta_{2,1}^{(k)}$ |
|---|---|---|---|---|---|
| 2, 3, 4 | 0 | 0 | 0 | $O_1$ | 0 |
| | 1 | 0 | 0 | $O_1$ | $O_2$ |
| 3, 4 | 2 | 0 | 0 | 0 | $O_2$ |
| 4 | 3 | 0 | $O_2$ | $O_1$ | $O_2$ |

In some embodiments, as shown in FIG. 35, the rank 3-4 master beam group consists of 4 "closest" orthogonal beams in 2D, where 4 orthogonal beams with indices $\{0, O_1\}$ are for the 1st dimension and 2 orthogonal beams with indices $\{0, O_2\}$ are for the 2nd dimension, and 2, 3, or 4 orthogonal beam types are considered to construct the rank 3-4 codebooks. The 4 orthogonal beam types are as follows:

- Orthogonal beam type 0 corresponds to the orthogonal beam pair $\{(0,0),(O_1,0)\}$.
- Orthogonal beam type 1 corresponds to the orthogonal beam pair $\{(0,0),(O_1,O_2)\}$.
- Orthogonal beam type 2 corresponds to the orthogonal beam pair $\{(0,0),(0,O_2)\}$.
- Orthogonal beam type 3 corresponds to the orthogonal beam pair $\{(0, O_2),(O_1,O_2)\}$.

Depending on the number of orthogonal beam types considered to construct the rank 3-4 codebooks, the orthogonal beam types are selected as follows:

- If the number of orthogonal beam types=2, then Orthogonal beam type 0 and Orthogonal beam type 1 are selected.
- If the number of orthogonal beam types=3, then Orthogonal beam type 0, Orthogonal beam type 1, and Orthogonal beam type 2 are selected.
- If the number of orthogonal beam types=4, then Orthogonal beam type 0, Orthogonal beam type 1, Orthogonal beam type 2, and Orthogonal beam type 3 are selected.

Please see the below Table Section for Table 59 and 60.

The rank-3 and rank-4 codebooks according to this orthogonal beam pair construction is shown in Table 59 and Table 60, respectively, where Table 58 is used for $\delta_{1,0}^{(k)}$, $\delta_{2,0}^{(k)}$, $\delta_{1,1}^{(k)}$, and $\delta_{2,1}^{(k)}$ values for each of K=2, 3, or 4, where the superscript k=0, 1, 2, and 3 are used for Orthogonal beam type 0, Orthogonal beam type 1, Orthogonal beam type 2, and Orthogonal beam type 3, respectively. Note that the codebooks can be used for any of Q=8, 12, 16, and 32 antenna port configurations with at least 2 ports in the shorter dimension.

The number of bits to report rank 3-4 PMI ($i_2$) is shown in Table 61 for both SB and WB reporting of orthogonal beam type. Note that in case SB reporting of orthogonal beam type, K=2 requires 1 bit and K=3,4 requires 2 bits in each SB. For WB reporting, 1 bit (K=1) and 2 bits (K=3,4) are reported for the whole WB.

TABLE 61

| Number of rank 3-4 $i_2$ bits | | | | |
|---|---|---|---|---|
| | SB reporting of orthogonal beam type | | WB reporting of orthogonal beam type | |
| K | Number of $i_2$ bits in each SB (Rank 3) | Number of $i_2$ bits in each SB (Rank 4) | Number of $i_2$ bits in each SB (Rank 3) | Number of $i_2$ bits in each SB (Rank 4) |
| 2 | 2 + 1 = 3 | 1 + 1 = 2 | 2 | 1 |
| 3 | 2 + 2 = 4 | 1 + 2 = 3 | | |
| 4 | 2 + 2 = 4 | 1 + 2 = 3 | | |

In some embodiments, a UE is configured with one of K=2, 3, or 4 for rank 3-4 codebooks.

In some embodiments, the rank 3-4 codebook is predetermined with a fixed K value, for example K=4.

In some embodiments, a UE is configured with one orthogonal beam type depending on the configured value of K according to some embodiments of this disclosure.

In some embodiments, a UE reports one orthogonal beam type from K orthogonal beam types depending on the configured value of K according to some embodiments of this disclosure.

In one method, the configured value of K=4.

In one method, this reporting is SB and short-term. In this case, the UE reports orthogonal beam type per subband, and $i_2$ can indicate this information as well as other information such as beam selection and co-phase.

In another method, it is WB and long-term. In this case the UE reports one orthogonal beam type for whole (set S) subbands in case of PUSCH reporting. In case of PUCCH reporting, this information is reported together with $i_1$ ($i_{11}$ and $i_{12}$).

Embodiments on rank 3-4 codebooks with 2, 3, or 4 orthogonal beam types (with SB beam selection)

Figure 36A:
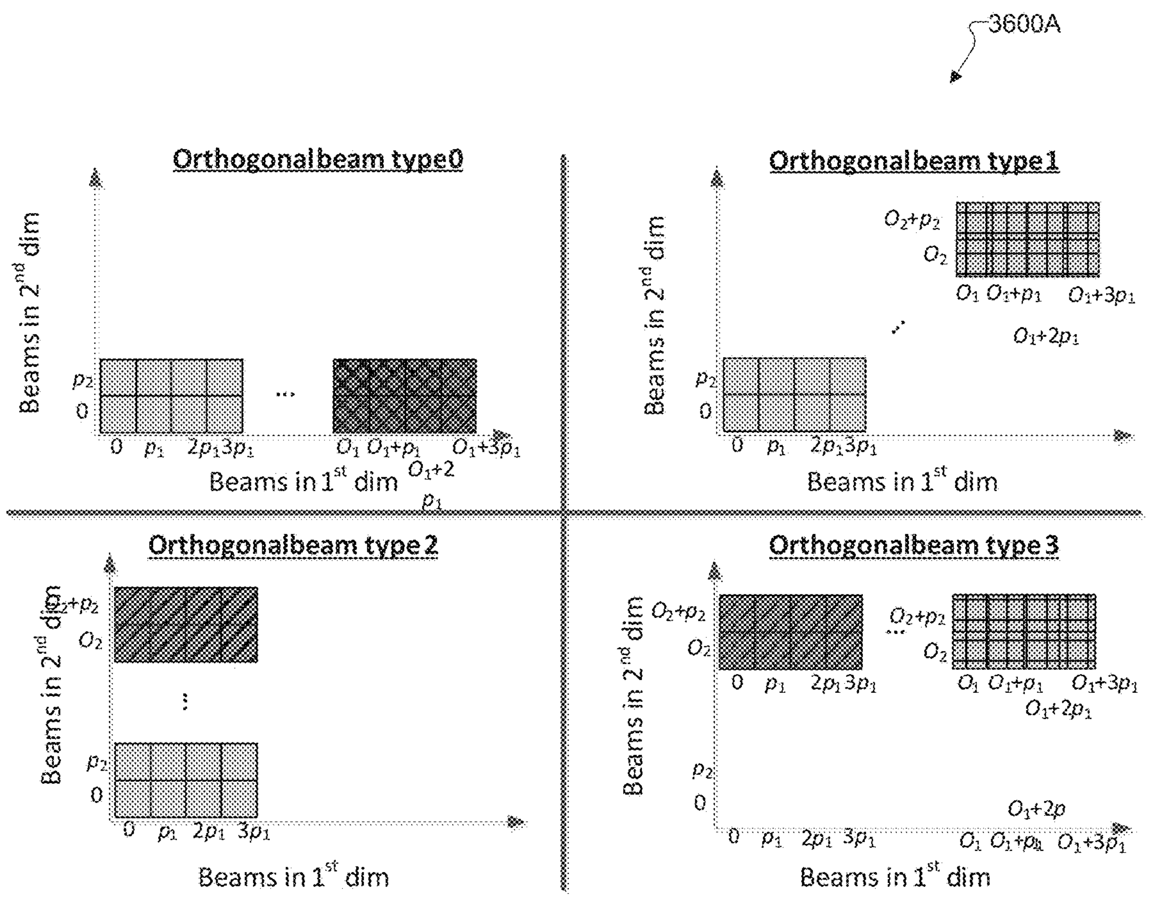
FIGS. 36A and 36B illustrate beam grouping schemes for rank 3-4 according to embodiments of the present disclosure.

FIG. 36 illustrates beam grouping schemes 3600 for rank 3-4 according to embodiments of the present disclosure.

In some embodiments, as shown in FIG. 36, the rank 3-4 master beam group consists of 4 "closest" orthogonal beam groups of size $(L_1,L_2)=(4,2)$ in 2D for $N_1 \geq N_2$ configuration, where 4 orthogonal beam groups are located at $\{0, O_1\}$ for the 1st dimension and $\{0, O_2\}$ are for the 2nd dimension. The 4 orthogonal beam types are the same as in FIG. 35 except that each type corresponds to a pair of orthogonal beam groups. Depending on the number of orthogonal beam types (K) considered to construct the rank 3-4 codebooks, the orthogonal beam types are selected as follows:

- Orthogonal beam type 0 corresponds to the orthogonal beam group pair located at $\{(0,0),(O_1,0)\}$.
- Orthogonal beam type 1 corresponds to the orthogonal beam group pair located at $\{(0,0),(O_1,O_2)\}$.
- Orthogonal beam type 2 corresponds to the orthogonal beam group pair located at $\{(0,0),(0,O_2)\}$.
- Orthogonal beam type 3 corresponds to the orthogonal beam group pair located at $\{(0, O_2),(O_1,O_2)\}$.

Please see the below Table Section for Tables 62 and 63.

The rank-3 and rank-4 codebooks according to this orthogonal beam group pair construction is shown in Table 62 and Table 63, respectively, where Table 48 is used for $\delta_{1,0}^{(k)}$, $\delta_{2,0}^{(k)}$, $\delta_{1,1}^{(k)}$, and $\delta_{2,1}^{(k)}$ values for each of K=2, 3, or 4, where the superscript k=0, 1, 2, and 3 are used for Orthogonal beam type 0, Orthogonal beam type 1, Orthogonal beam type 2, and Orthogonal beam type 3, respectively. Note that the codebooks can be used for any of Q=8, 12, 16, and 32 antenna port configurations with at least 2 ports in the shorter dimension.

Some of the embodiments of this disclosure on configuration or reporting of K, orthogonal beam type, and delta values are applicable to this embodiment.

It is straightforward for the skilled-in-the-art to recognize that the this embodiment is applicable to other orthogonal beam group sizes including size $(L_1,L_2)=(4,1)$, (2,2), (2,1), and (1,1).

Embodiments on delta reporting with $i_1$ ($i_{1,1}$ and $i_{1,2}$)

In some embodiments, a UE reports $\delta_1$, $\delta_2$ (or $\delta_{1,0}^{(0)}$, $\delta_{2,0}^{(0)}$, $\delta_{1,1}^{(0)}$, and $\delta_{2,1}^{(0)}$) for rank 3-4 codebooks and $\delta_{1,1}$, $\delta_{1,2}$, $\delta_{1,3}$, $\delta_{2,1}$, $\delta_{2,2}$, $\delta_{2,3}$ for rank 5-8 codebooks, according to some embodiments of this disclosure, jointly with $i_1$ (or $i_{1,1}$ or $i_{1,2}$).

In one alternative, the UE reports $i_1'=(i_1,j)$ where $i_1$ corresponds to the W1 beam group reporting and j corresponds to the orthogonal beam type ($\delta_1$, $\delta_2$ or $\delta_{1,0}^{(0)}$, $\delta_{2,0}^{(0)}$, $\delta_{1,1}^{(0)}$, and $\delta_{2,1}^{(0)}$) reporting for rank 3-4. For example, for rank 3-4 codebook tables in Table 62 and Table 637, the UE reports $i_1'$ using a 4-bit indication, where the 2 bits are used to indicate $i_1$ and 2 bits are used indicate j.

In one method, the two most significant bits (MSB) corresponds to the orthogonal beam type (j) and the 2 two least significant bits (LSB) corresponds to $i_1$. Table 64 shows an example of such $i_1'$ reporting.

TABLE 64

| $i_1'$ to ($i_1$, j) mapping for rank 3-4 codebooks (Table 62 and Table 63) | | | | |
|---|---|---|---|---|
| $b_3b_2b_1b_0$ | j | | $b_1b_0$ | $i_1$ |
| 0000 | 00 | Orthogonal beam type 0 | 00 | 0 |
| 0001 | | | 01 | 1 |
| 0010 | | | 10 | 2 |
| 0011 | | | 11 | 3 |
| 0100-0111 | 01 | Orthogonal beam type 1 | 00, 01, 10, 11 | 0-3 |
| 1000-1011 | 10 | Orthogonal beam type 2 | 00, 01, 10, 11 | 0-3 |
| 1100-1111 | 11 | Orthogonal beam type 3 | 00, 01, 10, 11 | 0-3 |

In another method, the two most significant bits (MSB) corresponds to $i_1$ and the 2 two least significant bits (LSB) corresponds to the orthogonal beam type (j).

In another alternative, the UE reports $i_{1,1}'=(i_{1,1}, j)$ where $i_{1,1}$ corresponds to the W1 beam group reporting in the 1st dimension and j corresponds to the orthogonal beam type ($\delta_1$, $\delta_2$ or $\delta_{1,0}^{(0)}$, $\delta_{2,0}^{(0)}$, $\delta_{1,1}^{(0)}$, and $\delta_{2,1}^{(0)}$) reporting for rank 3-4. For example, for rank 3-4 codebook tables in Table 62 and Table 63 the UE reports $i_{1,1}'$ using a 4-bit indication, where the 2 bits are used to indicate $i_{1,1}$ and 2 bits are used indicate j. Similar to the first alternative, 2 bits to indicate j may either be 2 LSBs or 2 MSBs of the 4-bit indication.

In yet another alternative, the UE reports $i_{1,2}'=(i_{1,2}, j)$ where $i_{1,2}$ corresponds to the W1 beam group reporting in the 2nd dimension and j corresponds to the orthogonal beam type ($\delta_1$, $\delta_2$ or $\delta_{1,0}^{(0)}$, $\delta_{2,0}^{(0)}$, $\delta_{1,1}^{(0)}$, and $\delta_{2,1}^{(0)}$) reporting for rank 3-4.

The above-mentioned alternatives are applicable to rank 5-8 codebooks. For instance, $i_1'$ may be reported using a 4-bit indication, whose 2 bits are for $i_1$ ($i_{1,1}$ and $i_{1,2}$) indication and 2 bits are for orthogonal beam type ($\delta_{1,1}$, $\delta_{1,2}$, $\delta_{1,3}$, $\delta_{2,1}$, $\delta_{2,2}$, $\delta_{2,3}$) indication.

Other Rank 3-8 Codebook Design Alternatives

In some embodiments, rank 3-8 codebooks can be constructed according to alternative master codebook alternatives 1-4 shown in FIG. 37, FIG. 38, FIG. 39, and FIG. 40, according to some embodiments of this disclosure.

Figure 37:
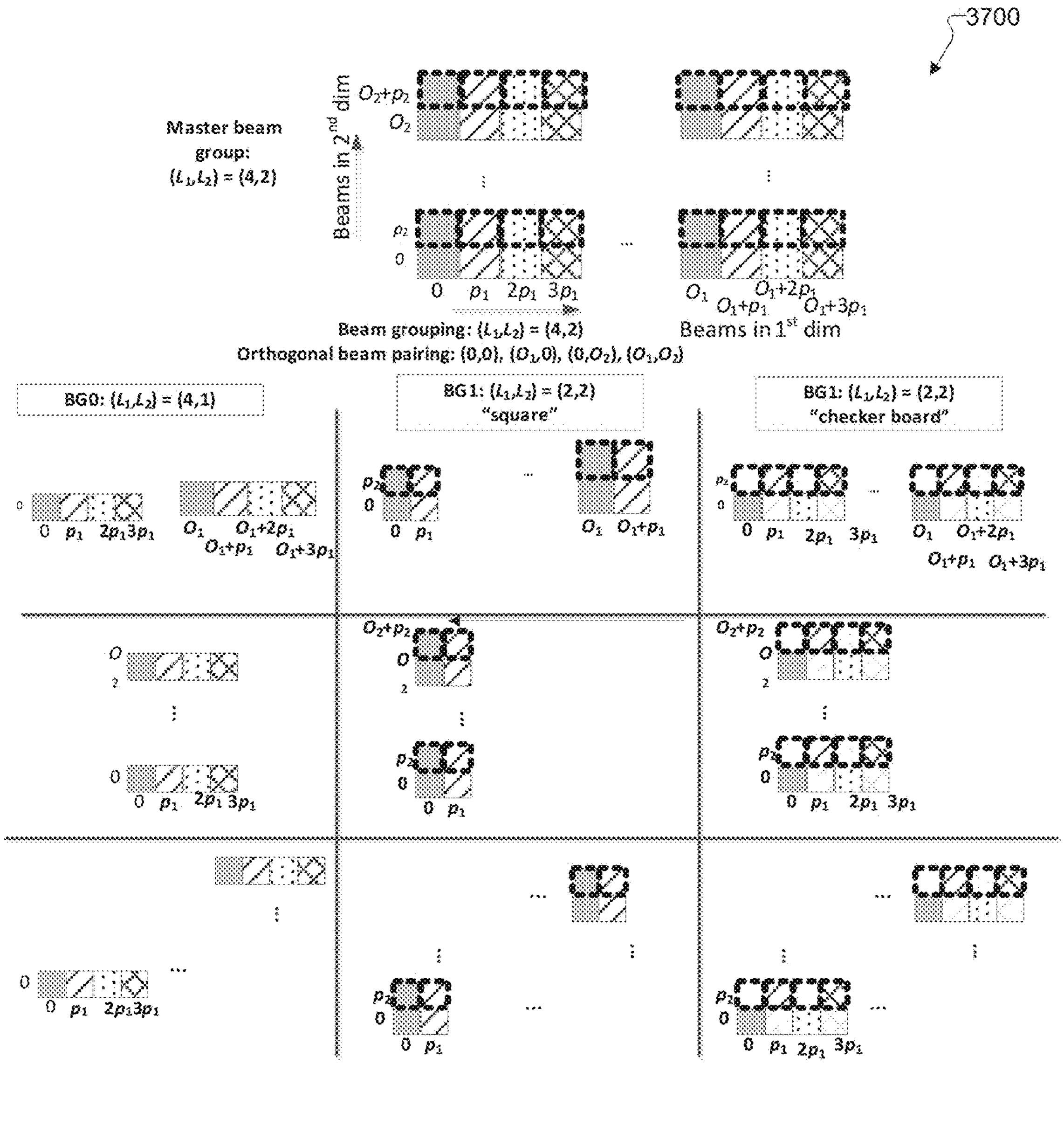
FIG. 37 illustrates an alternate rank 3-8 codebook design 1 3700: $(L_1,L_2)=(4,2)$ according to embodiments of the present disclosure.
Figure 38:
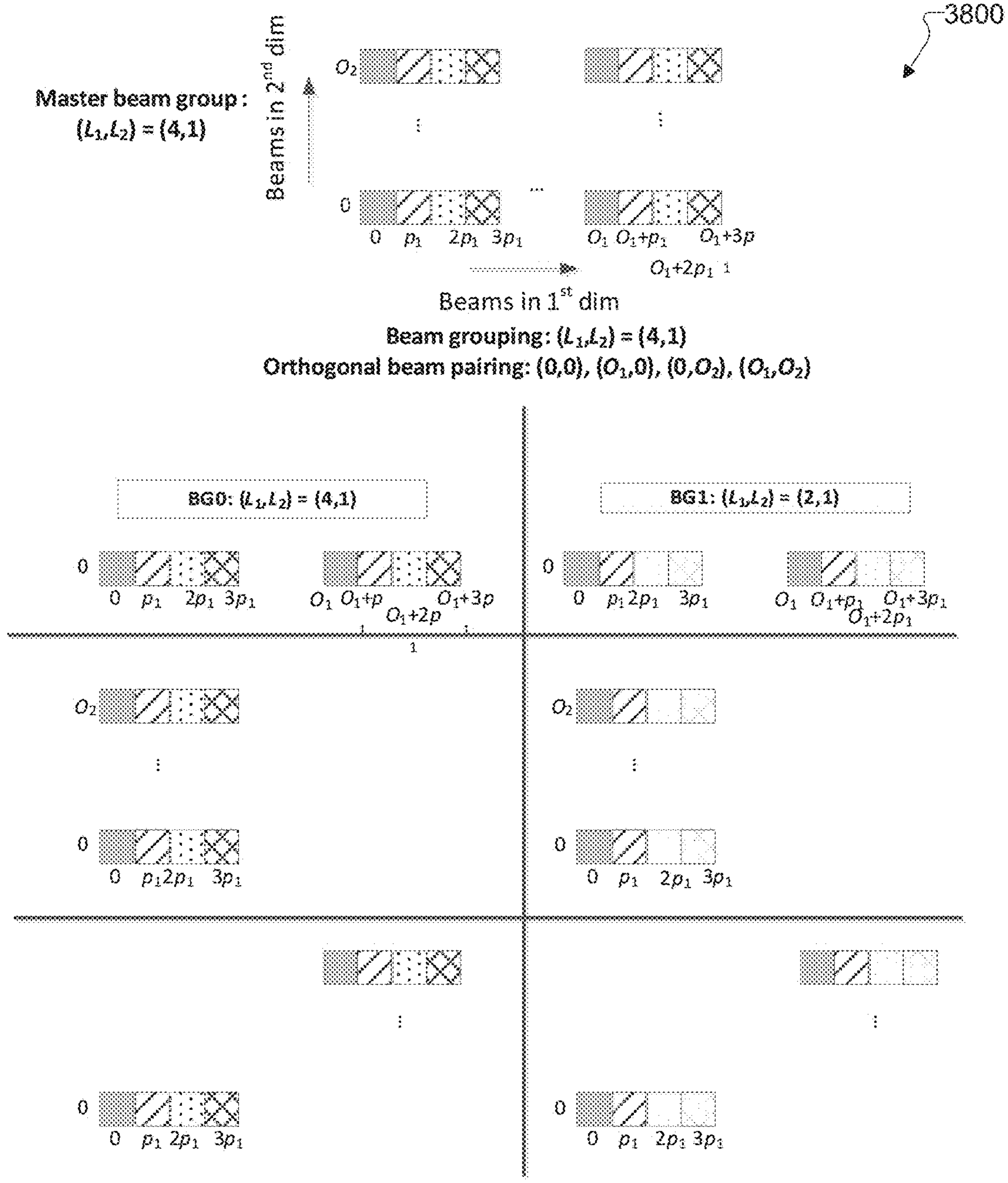
FIG. 38 illustrates an alternate rank 3-8 codebook design 2 3800: $(L_1,L_2)=(4,1)$ according to embodiments of the present disclosure.
Figure 39:
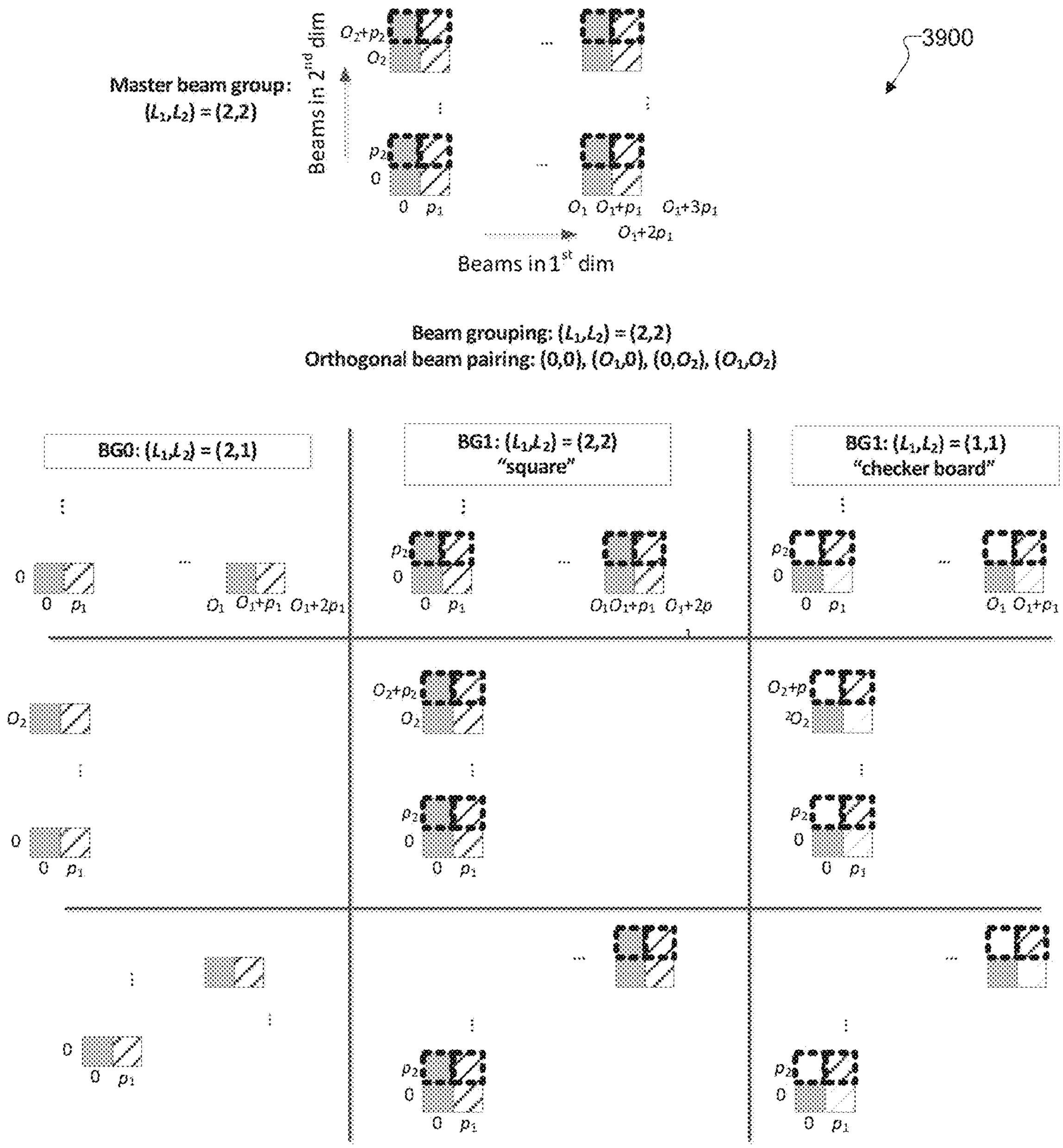
FIG. 39 illustrates an alternate rank 3-8 codebook design 3 3900: $(L_1,L_2)=(2,2)$ according to embodiments of the present disclosure.

FIG. 37 illustrates an alternate rank 3-8 codebook design 1 3700: $(L_1,L_2)=(4,2)$ according to embodiments of the present disclosure;

FIG. 38 illustrates an Alternate rank 3-8 codebook design 2 3800: $(L_1,L_2)=(4,1)$ according to embodiments of the present disclosure;

FIG. 39 illustrates an alternate rank 3-8 codebook design 3 3900: $(L_1,L_2)=(2,2)$ according to embodiments of the present disclosure.

Figure 40:
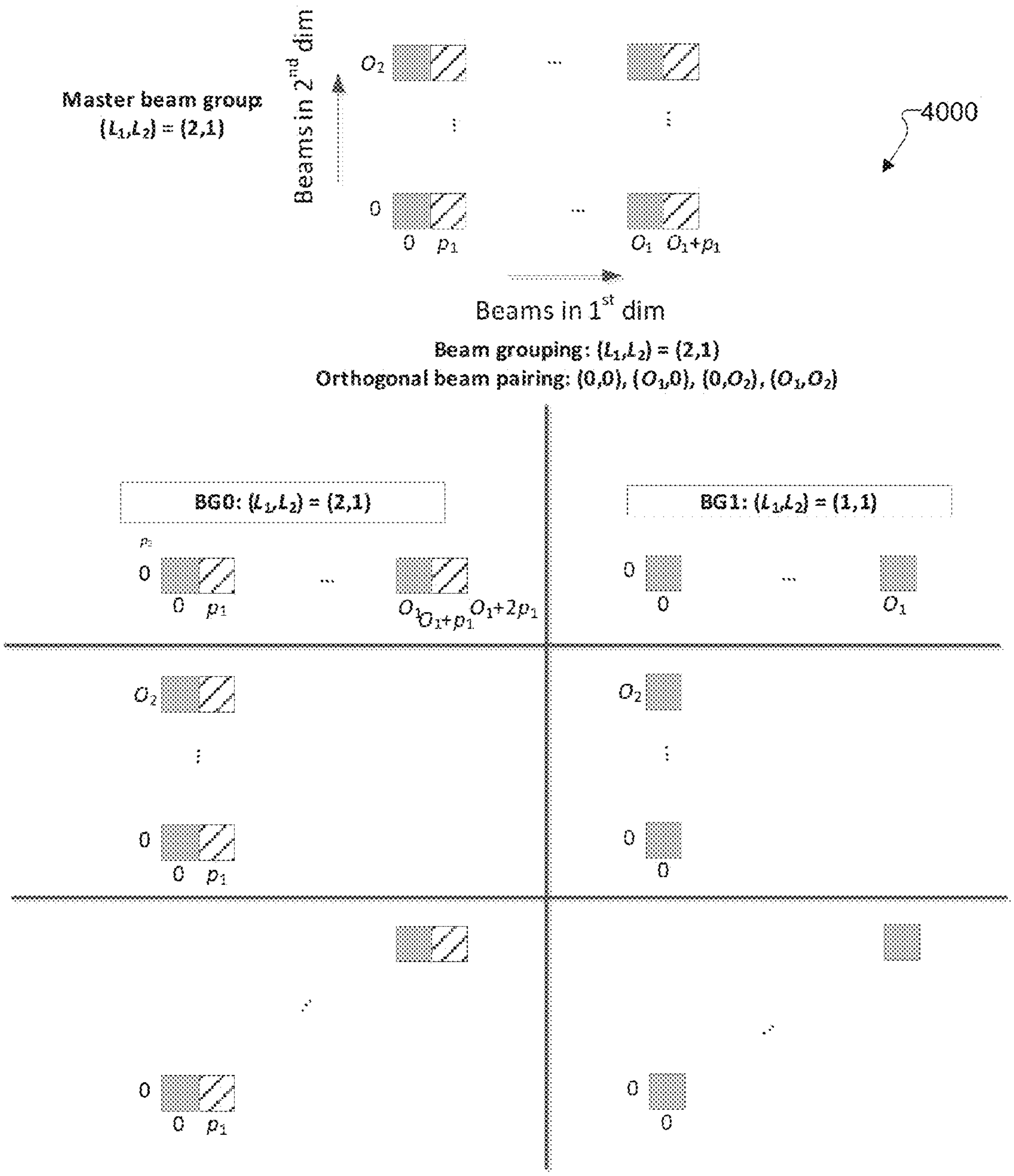
FIG. 40 illustrates an alternate rank 3-8 codebook design 4 4000: $(L_1,L_2)=(2,1)$ according to embodiments of the present disclosure.

FIG. 40 illustrates an alternate rank 3-8 codebook design 4 4000: $(L_1,L_2)=(2,1)$ according to embodiments of the present disclosure.

Figure 36B:
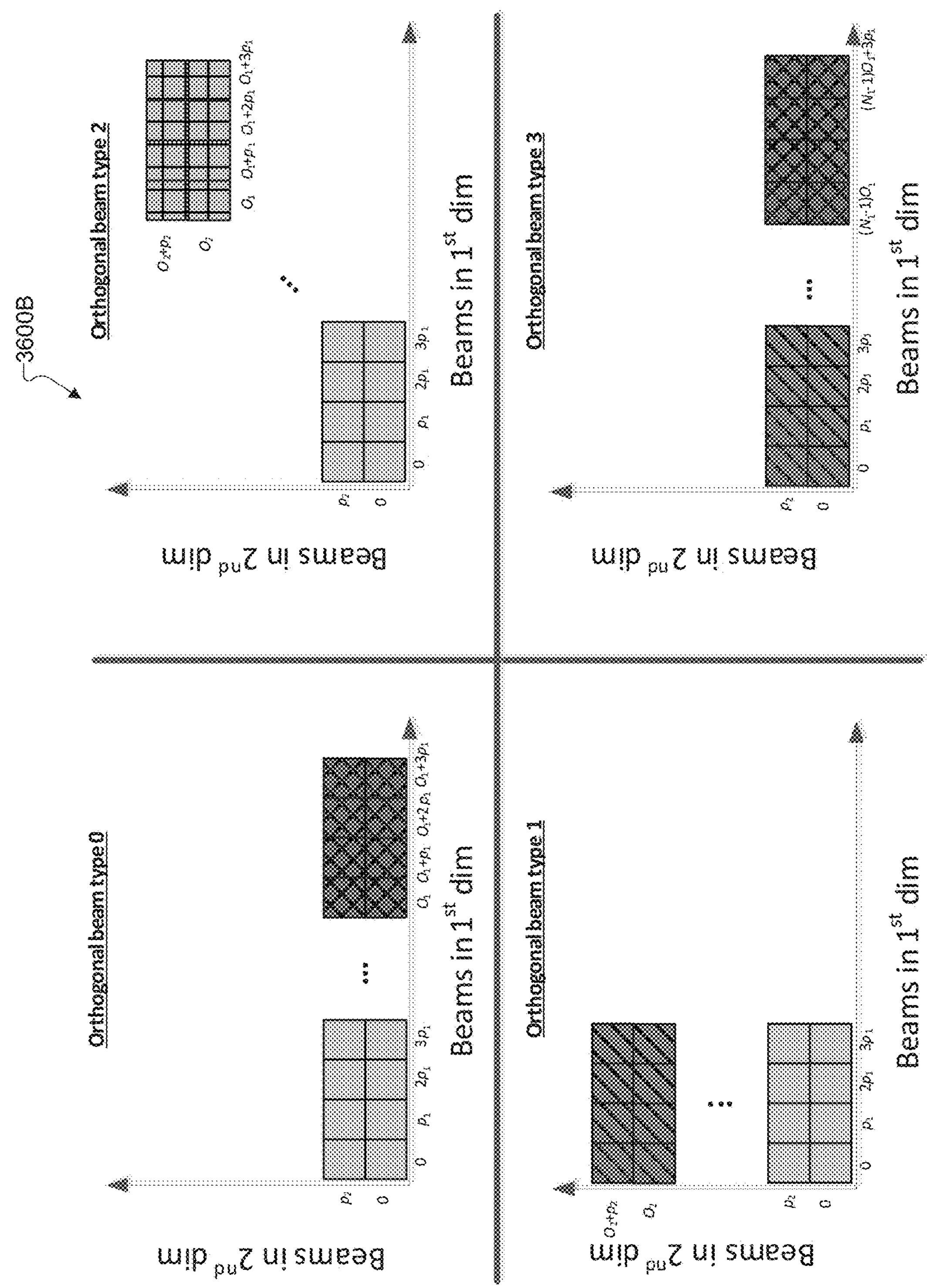

In some embodiments, as shown in FIG. 36B, the rank 3-4 master beam group consists of 4 orthogonal beam types of size $(L_1,L_2)=(4,2)$ in 2D for $N_1 \geq N_2$ configuration, where the orthogonal beam types are as follows: Orthogonal beam type 0 corresponds to the orthogonal beam group pair located at $\{(0,0),(O_1,0)\}$. Orthogonal beam type 1 corresponds to the orthogonal beam group pair located at $\{(0,0),(O_1,O_2)\}$. Orthogonal beam type 2 corresponds to the orthogonal beam group pair located at $\{(0,0),(0,O_2)\}$. Orthogonal beam type 3 corresponds to the orthogonal beam group pair located at $\{(0,0),((N_1-1)O_1,0)\}$.

The rank-3 and rank-4 codebooks according to construction is shown in Table 66 and Table 67, respectively, where Table 65 is used for $\delta_1$ and $\delta_2$ values and the indices k=0, 1, 2, and 3 are used for Orthogonal beam type 0, Orthogonal beam type 1, Orthogonal beam type 2, and Orthogonal beam type 3, respectively. Note that the codebooks can be used for any of Q=8, 12, 16, and 32 antenna port configurations. Note also that k=3 is applicable to Q=12, 16, and 32 ports.

TABLE 65

Orthogonal beam type to $(\delta_1, \delta_2)$ mapping for $N_1 \geq N_2$

| | | k | | | |
|---|---|---|---|---|---|
| | $\delta$ | 0 | 1 | 2 | 3 |
| If $N_1 > 1$ and $N_2 > 1$ | $\delta_1$ | $O_1$ | 0 | $O_1$ | $(N_1-1)O_1$ |
| | $\delta_2$ | 0 | $O_2$ | $O_2$ | 0 |
| If $N_2 = 1$ | $\delta_1$ | $O_1$ | $2O_1$ | $3O_1$ | $(N_1-1)O_1$ |
| | $\delta_2$ | 0 | 0 | 0 | 0 |

The UE is configured to report $i_{1,1}$, $i_{1,2}$, and k jointly WB and long-term according to some embodiments of this disclosure, where the range of values that they take are follows:

$$i_{1,1} = 0, 1, \ldots, \frac{O_1 N_1}{s_1} - 1;\ i_{1,2} = 0, 1, \ldots, \frac{O_2 N_2}{s_2} - 1;$$

and k=0,1,2,3. Note that 2-bit indication is needed to report the orthogonal beam type k.

Please see the below Table Section for Tables 66 and 67.

In some embodiments, a UE is configured with a beam group configuration from four configurations, namely Config 1, Config 2, Config 3, and Config 4, for codebook subset selection on master rank 3-4 codebooks. For k=0, an illustration of the four configurations is shown FIG. 41. Depending on the configuration, the UE selects $i_2'$ indices (in Table 66 and Table 67) according to Table 68 and Table 69 for rank 3 and rank 4, respectively, for PMI reporting. The parameters $(s_1,s_2)$ and $(p_1,p_2)$ for the four configurations are shown in Table 68 and Table 69. Note that three options are provided for $s_2$ in case of Config 4. Depending on the desired number of beams (or resolution) in the shorter dimension, the UE is configured with one option.

Figure 41:
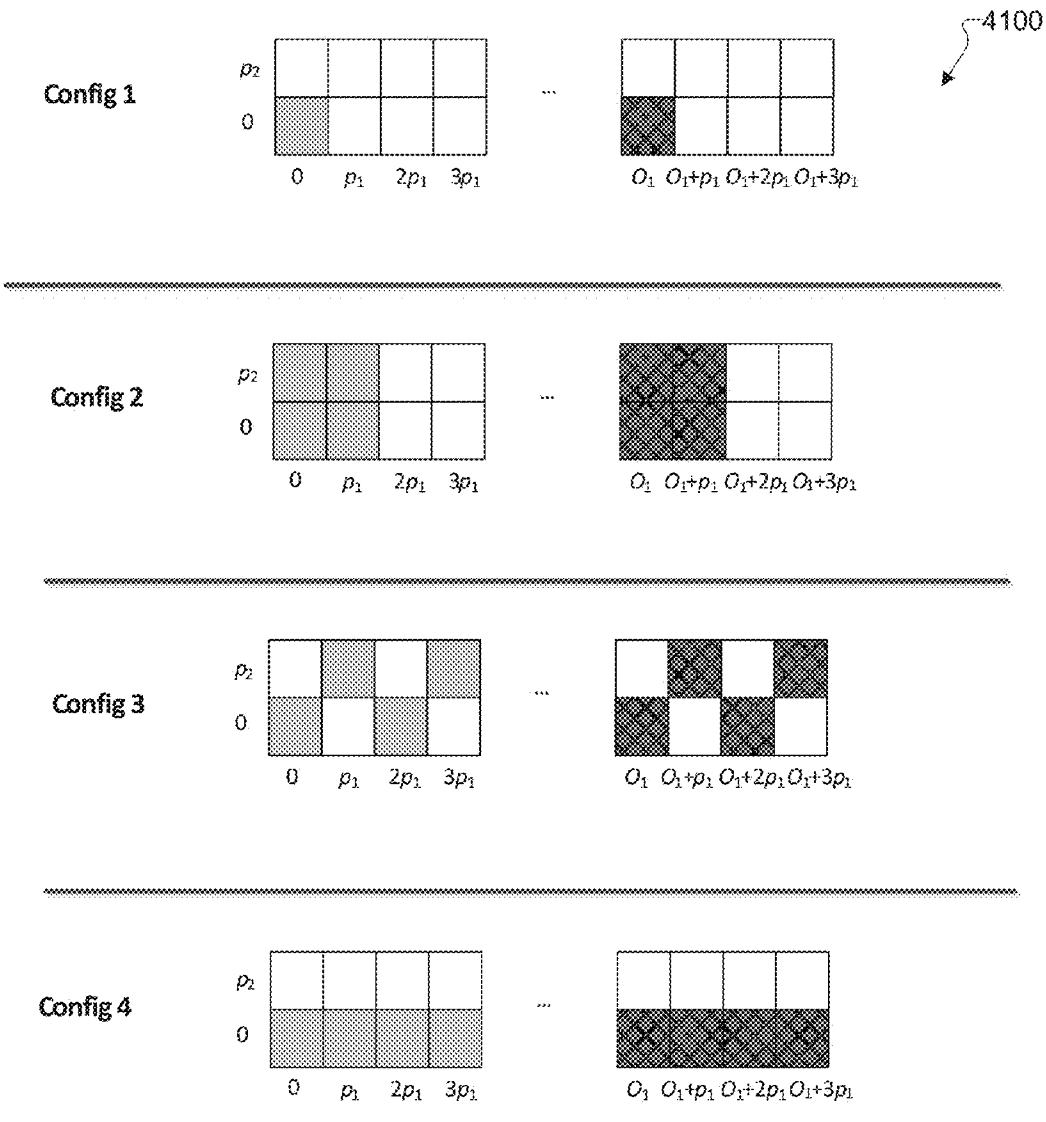
FIG. 41 illustrates example orthogonal beams for rank 3-4 when k=0 according to some embodiments of the present disclosure.

FIG. 41 illustrates example orthogonal beams 4100 for rank 3-4 when k=0 according to some embodiments of the present disclosure.

TABLE 68

Selected $i_2'$ indices for rank-3 CSI reporting (in Table 66)

| Config | Selected $i_2'$ indices | (s1, s2) | $(p_1, p_2)$ |
|---|---|---|---|
| 1 | 0, 2 | (1, 1) | (—, —) |
| 2 | 0-7, 16-23 | $(O_1, O_2)$ | $\left(\frac{O_1}{2}, \frac{O_2}{2}\right)$ |
| 3 | 0-3, 8-11, 20-23, 28-31 | $(O_1, O_2)$ | $\left(\frac{O_1}{4}, \frac{O_2}{2}\right)$ |
| 4 | 0-15 | $(O_1, —)$ If $N_2 = 1$<br>Option 0: $(O_1, 2)$ If $N_2 > 1$ and $N_2 > 1$<br>Option 1: $\left(O_1, \frac{O_2}{2}\right)$ If $N_1 > 1$ and $N_2 > 1$<br>Option 2: $(O_1, O_2)$ If $N_1 > 1$ and $N_2 > 1$ | $\left(\frac{O_1}{4}, —\right)$ |

TABLE 69

| Selected $i_2'$ indices for rank-4 CSI reporting (in Table 67) | | | |
|---|---|---|---|
| Config | Selected $i_2'$ indices | (s1, s2) | $(p_1, p_2)$ |
| 1 | 0, 1 | (1, 1) | (—, —) |
| 2 | 0-3, 8-11 | $(O_1, O_2)$ | $\left(\frac{O_1}{2}, \frac{O_2}{2}\right)$ |
| 3 | 0-1, 4-5, 10-11, 14-15 | $(O_1, O_2)$ | $\left(\frac{O_1}{4}, \frac{O_2}{2}\right)$ |
| 4 | 0-7 | $(O_1, —)$ If $N_2 = 1$<br>Option 0: $(O_1, 2)$ If $N_1 > 1$ and $N_2 > 1$<br>Option 1: $\left(O_1, \frac{O_2}{2}\right)$ If $N_1 > 1$ and $N_2 > 1$<br>Option 2: $(O_1, O_2)$ If $N_1 > 1$ and $N_2 > 1$ | $\left(\frac{O_1}{4}, —\right)$ |

Note that $p_1=s_1/L_1$ for Configs 2-4, where $L_1$ is the number of included beam indices along the first dimension of the master codebook. In other words, for Configs 2-4, the effective oversampling is kept fixed for rank 3-4.

In some embodiments, a UE is configured with a larger table of $\delta_1$ and $\delta_2$ values (index k). In one example, the table of $\delta_1$ and $\delta_2$ values include all orthogonal pairs with the leading beam (0,0). An example of such a table is shown in Table 70. Depending on the number of antenna ports (Q), the UE uses a subset of $\delta_1$, $\delta_2$ (or k values). For instance, if Q=8, the UE uses k=0-2; if Q=12, the UE uses k=0-4; and Q=16, the UE uses k=0-6. Note the 2-bit indication is needed for Q=8, and 3-bit indication is needed for Q=12,16.

TABLE 70

| Orthogonal beam type to $(\delta_1, \delta_2)$ mapping for $N_1 \geq N_2$ | | | | | | | | |
|---|---|---|---|---|---|---|---|---|
| | | k | | | | | | |
| | δ | 0 | 1 | 2 | 3 | 4 | 5 | 6 |
| If $N_1 > 1$ and | $\delta_1$ | $O_1$ | 0 | $O_1$ | $2O_1$ | $2O_1$ | $3O_1$ | $3O_1$ |
| $N_2 > 1$ | $\delta_2$ | 0 | $O_2$ | $O_2$ | 0 | $O_2$ | 0 | $O_2$ |
| If $N_2 = 1$ | $\delta_1$ | $O_1$ | $2O_1$ | $3O_1$ | $4O_1$ | $5O_1$ | $6O_1$ | $7O_1$ |
| | $\delta_2$ | 0 | 0 | 0 | 0 | 0 | 0 | 0 |

In some embodiments, a UE is configured with rank 3-4 codebooks with codebook subset restriction (CSR) on k, which determines a subset of values of k UE can report.

In one method, the CSR configuration is based on a bitmap.

For example, for k values in Table 70, a 7-bit bitmap can be configured to indicate a subset of k values that UE can report.

For example, for k values in Table 65, a 4-bit bitmap can be configured to indicate a subset of k values that UE can report.

It is straightforward for the skilled-in-the-art to recognize that the this embodiment is applicable to antenna port configuration $N_1<N_2$ and other orthogonal beam group sizes including size $(L_1,L_2)$=(4,1), (2,2), (2,1), and (1,1).

Alternate rank 5-6 codebooks for $N_1 \geq N_2$

Figure 42:
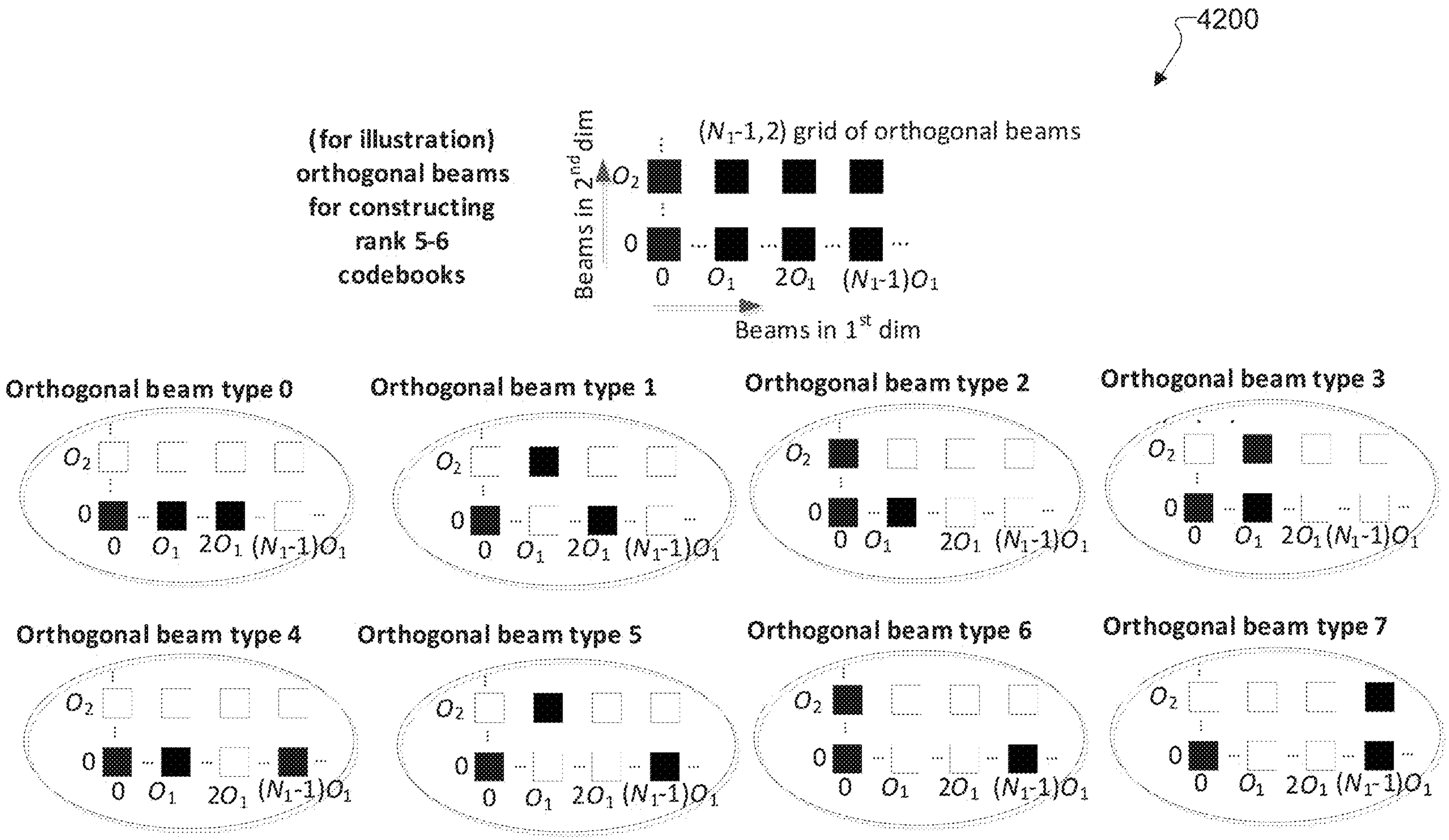
FIG. 42 illustrates alternate rank 5-6 orthogonal beam types 4200 according to embodiments of the present disclosure.

FIG. 42 illustrates alternate rank 5-6 orthogonal beam types 4200 according to embodiments of the present disclosure.

In some embodiments, a UE reports or is configured with a orthogonal beam type for rank 5-6 codebooks from Orthogonal beam types 0-7 as shown in FIG. 42 according to some embodiments of this disclosure. Depending on the configuration, the UE selects the three orthogonal beams, the first beam is located at (0,0), and the 2nd and 3rd beams correspond to indices $(k_1,k_2)$ as in Table 71, where $k_1$, and $k_2$ take k values in Table 70. The UE them derives rank-5 and rank-6 pre-coders $W_{i_{1,1},i_{1,2}}^{(5)}$ and $W_{i_{1,1},i_{1,2}}^{(6)}$ as defined above.

TABLE 71

| Orthogonal beam type to $\delta_{1,1}$, $\delta_{1,2}$, $\delta_{2,1}$, $\delta_{2,2}$, for rank 5-6 codebook for 12 or 16 port with $N_1 \geq N_2 > 1$ | |
|---|---|
| Orthogonal beam type | $(k_1, k_2)$ from Table 70 for $\delta_{1,k_1}$, $\delta_{1,k_2}$, $\delta_{2,k_1}$, $\delta_{2,k_2}$ |
| 0 | (0, 3) |
| 1 | (2, 3) |
| 2 | (0, 1) |
| 3 | (0, 2) |
| 4 | $(0, N_1 + 1)$ |
| 5 | $(2, N_1 + 1)$ |
| 6 | $(1, N_1 + 1)$ |
| 7 | $(N_1 + 1, N_1 + 2)$ |

For $N_1<N_2$, the rank 5-6 codebook design is similar.

Alternate rank 7-8 codebooks for $N_1 \geq N_2$

Figure 43:
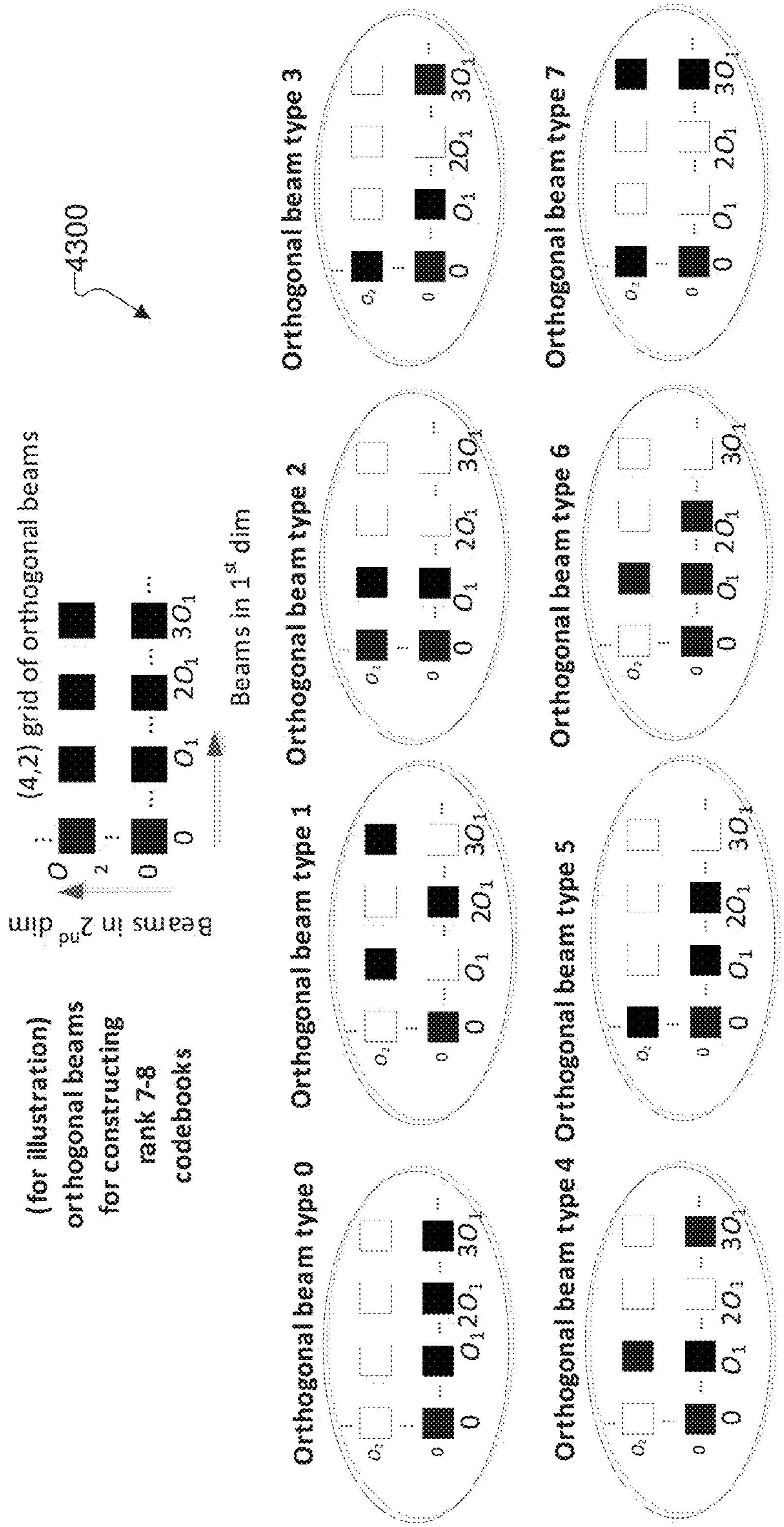
FIG. 43 illustrates an alternate rank 7-8 orthogonal beam types according to embodiments of the present disclosure.

FIG. 43 illustrates alternate rank 7-8 orthogonal beam types 4300 according to embodiments of the present disclosure.

In some embodiments, a UE reports or is configured with a orthogonal beam type for rank 7-8 codebooks from Orthogonal beam types 0-7 as shown in FIG. 43 according to some embodiments of this disclosure. Depending on the configuration, the UE selects the four orthogonal beams, the first beam is located at (0,0), and the 2nd, 3rd, and 4th beams correspond to indices $(k_1,k_2,k_3)$ as in Table 72 (for 16 ports), where $k_1$, $k_2$, and $k_3$ take k values in Table 70. The UE them derives rank-7 and rank-8 pre-coders $W_{i_{1,1},i_{1,2}}^{(7)}$ and $W_{i_{1,1},i_{1,2}}^{(8)}$ as defined above. The delta table for 12 ports can be constructed similarly.

TABLE 72

| Orthogonal beam type to $\delta_{1,1}, \delta_{1,2}, \delta_{2,1}, \delta_{2,2}, \delta_{1,3}, \delta_{2,3}$ for rank 7-8 codebook for 16 port with $N_1 \geq N_2 > 1$ | |
|---|---|
| Orthogonal beam type | $(k_1, k_2, k_3)$ from Table 70 for $\delta_{1,k_1}, \delta_{1,k_2}, \delta_{1,k_3}, \delta_{2,k_1}, \delta_{2,k_2}, \delta_{2,k_3}$ |
| 0 | (0, 3, 5) |
| 1 | (2, 3, 6) |
| 2 | (0, 1, 2) |
| 3 | (0, 1, 5) |
| 4 | (0, 2, 5) |
| 5 | (0, 1, 3) |
| 6 | (0, 2, 3) |
| 7 | (1, 5, 6) |

For $N_1<N_2$, the rank 7-8 codebook design is similar.

Embodiments on delta reporting with $i_1$ ($i_{1,1}$ and $i_{1,2}$)

In some embodiments, a UE reports $\delta_1$, $\delta_2$ (or $\delta_1$, $\delta_2$ (or $\delta_{1,0}^{(0)}, \delta_{2,0}^{(0)}, \delta_{1,1}^{(0)}$, and $\delta_{2,1}^{(0)}$) for rank 3-4 codebooks and $\delta_{1,1}, \delta_{1,2}, \delta_{1,3}, \delta_{2,1}, \delta_{2,2}, \delta_{2,3}$ for rank 5-8 codebooks, according to some embodiments of this disclosure, jointly with $i_1$ (or $i_{1,1}$ or $i_{1,2}$).

In one alternative, the UE reports $i_1'=(i_1,j)$ where $i_1$ corresponds to the W1 beam group reporting and j corresponds to the orthogonal beam type ($\delta_1$, $\delta_2$ or $\delta_{1,0}^{(0)}, \delta_{2,0}^{(0)}, \delta_{1,1}^{(0)}$, and $\delta_{2,1}^{(0)}$) reporting for rank 3-4. For example, for rank 3-4 codebook tables in Table 56 and Table 57, the UE reports $i_1'$ using a 4-bit indication, where the 2 bits are used to indicate $i_1$ and 2 bits are used indicate j.

In one method, the two most significant bits (MSB) corresponds to the orthogonal beam type (j) and the 2 two least significant bits (LSB) corresponds to $i_1$. Table 73 shows an example of such $i_1'$ reporting.

TABLE 73

| $i'_1$ to $(i_1, j)$ mapping for rank 3-4 codebooks (Table 56 and Table 57) | | | | |
|---|---|---|---|---|
| $b_3b_2b_1b_0$ | j | | $b_1b_0$ | $i_1$ |
| 0000 | 00 | Orthogonal beam type 0 | 00 | 0 |
| 0001 | | | 01 | 1 |
| 0010 | | | 10 | 2 |
| 0011 | | | 11 | 3 |
| 0100-0111 | 01 | Orthogonal beam type 1 | 00, 01, 10, 11 | 0-3 |
| 1000-1011 | 10 | Orthogonal beam type 2 | 00, 01, 10, 11 | 0-3 |
| 1100-1111 | 11 | Orthogonal beam type 3 | 00, 01, 10, 11 | 0-3 |

In another method, the two most significant bits (MSB) corresponds to $i_1$ and the 2 two least significant bits (LSB) corresponds to the orthogonal beam type (j).

In another alternative, the UE reports $i_{1,1}'=(i_{1,1},j)$ where $i_{1,1}$ corresponds to the W1 beam group reporting in the 1st dimension and j corresponds to the orthogonal beam type ($\delta_1$, $\delta_2$ or $\delta_{1,0}^{(0)}, \delta_{2,0}^{(0)}, \delta_{1,1}^{(0)}$, and $\delta_{2,1}^{(0)}$) reporting for rank 3-4. For example, for rank 3-4 codebook tables in Table 56 and Table 57, the UE reports $i_{1,1}'$ using a 4-bit indication, where the 2 bits are used to indicate $i_{1,1}$ and 2 bits are used indicate j. Similar to the first alternative, 2 bits to indicate j may either be 2 LSBs or 2 MSBs of the 4-bit indication.

In yet another alternative, the UE reports $i_{1,2}'=(i_{1,2}, j)$ where $i_{1,2}$ corresponds to the W1 beam group reporting in the 2nd dimension and j corresponds to the orthogonal beam type ($\delta_1$, $\delta_2$, or $\delta_{1,0}^{(0)}, \delta_{2,0}^{(0)}, \delta_{1,1}^{(0)}$, and $\delta_{2,1}^{(0)}$) reporting for rank 3-4.

The above-mentioned alternatives are applicable to rank 5-8 codebooks. For instance, may be reported using a 4-bit indication, whose 2 bits are for $i_1$ ($i_{1,1}$ and $i_{1,2}$) indication and 2 bits are for orthogonal beam type ($\delta_{1,1}, \delta_{1,2}, \delta_{1,3}, \delta_{2,1}, \delta_{2,2}, \delta_{2,3}$) indication.

In another alternative, for rank 3-4 codebook, the UE reports $i_1'=(i_1, k)$ or $i_{11}'=(i_{11}, k)$ or $i_{1,2}'=(i_{1,2},k)$ where $i_1$ (or $i_{1,1}$ or $i_{1,2}$) corresponds to the W1 beam group reporting and k corresponds to the orthogonal beam pair from Table 70. For example, the UE reports $i_1'$ or $i_{1,1}'$ or $i_{1,2}'$ using a (x+y)-bit indication, where the x bits are used to indicate $i_1$ (or $i_{1,1}$ or $i_{1,2}$) and y bits are used to indicate k.

In another alternative, for rank 5-6 codebook, the UE reports $i_1'=(i_1,k_1,k_2)$ or $i_{11}'=(i_{1,1},k_1,k_2)$ or $i_{1,2}'=(i_{1,2},k_1,k_2)$ where $i_1$ (or $i_{1,1}$ or $i_{1,2}$) corresponds to the W1 beam group reporting and $k_1$, $k_2$ corresponds to the orthogonal beam type from Table 70 and Table 71. For example, the UE reports $i_1'$ or $i_{1,1}'$ or $i_{1,2}'$ using a (x+y)-bit indication, where the x bits are used to indicate $i_1$ (or $i_{1,1}$ or $i_{1,2}$) and y bits are used to indicate $k_1$, $k_2$.

In another alternative, for rank 5-6 codebook, the UE reports $i_1'=(i_1, k_1, k_2, k_3)$ or $i_{11}'=(i_{11}, k_1, k_2, k_3)$ or $i_{1,2}'=(i_{1,2}, k_1, k_2, k_3)$ where $i_1$ (or $i_{1,1}$ or $i_{1,2}$) corresponds to the W1 beam group reporting and $k_1,k_2,k_3$ corresponds to the orthogonal beam type from Table 70 and Table 72. For example, the UE reports $i_1'$ or $i_{1,1}'$ or $i_{1,2}'$ using a (x+y)-bit indication, where the x bits are used to indicate $i_1$ (or $i_{1,1}$ or $i_{1,2}$) and y bits are used to indicate $k_1,k_2,k_3$.

Embodiment on Master Codebook for all Config

Master Rank-1 Codebook

In some embodiments, the rank-1 class A codebook is described in Table 74 and Table 75.

A UE is configured with one of Config 1, Config 2, Config 3, and Config 4. Depending on the configured Config parameter, the UE performs codebook subset selection (CSS) by selecting a subset of indices in Table 75 according to Table 74.

TABLE 74

Figure 57A:
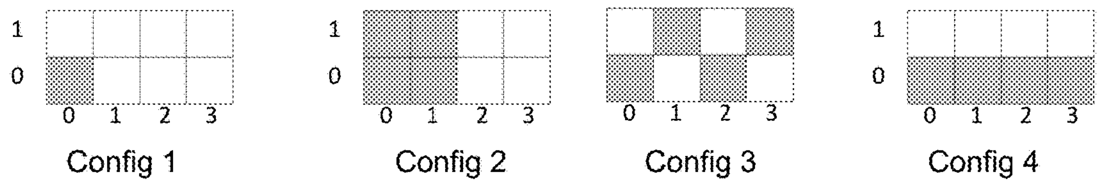

| CSS table for four configurations with the bit maps for the four configurations illustrated in FIG 57A. | | |
|---|---|---|
| Config | Selected $i'_2$ indices | (s1 ,s2) |
| Config 1 | 0-3 | (1, 1) |
| Config 2 | 0-7, 16-23 | (2, 2) |
| Config 3 | 0-3, 8-11, 20-23, 28-31 | (2, 2) |
| Config 4 | 0-15 | (2, 2) |

$$W^{(1)}_{m_1,m_2,n} = \frac{1}{\sqrt{Q}}\begin{bmatrix} v_{m_1} \otimes u_{m_2} \\ \varphi_n v_{m_1} \otimes u_{m_2} \end{bmatrix}$$

$$v_{m_1} = \begin{bmatrix} 1 & e^{j\frac{2\pi m_1}{O_1 N_1}} & \ldots & e^{j\frac{2\pi m_1(N_1-1)}{O_1 N_1}} \end{bmatrix}^t,$$

$$u_{m_2} = \begin{bmatrix} 1 & e^{j\frac{2\pi m_2}{O_2 N_2}} & \ldots & e^{j\frac{2\pi m_2(N_2-1)}{O_2 N_2}} \end{bmatrix}^t$$

$$i_{1,1} = 0, 1, \ldots, O_1N_1/s_1 - 1$$

$$i_{1,2} = 0, 1, \ldots, O_2N_2/s_2 - 1$$

$p_1=1$ and $p_2=1$.

The proposed rank-1 codebook is characterized by three parameters: $\{i_{11}, i_{12}, i_2\}$, where $i_2$ corresponds to the selected $i_2'$ indices from Table 75 according to the Config parameter.

TABLE 75

| Master codebook for 1 layer CSI reporting | | | | |
|---|---|---|---|---|
| $i_2'$ | 0 | 1 | 2 | 3 |
| Precoder | $W_{s_1 i_{1,1}, s_2 i_{1,2}, 0}^{(1)}$ | $W_{s_1 i_{1,1}, s_2 i_{1,2}, 1}^{(1)}$ | $W_{s_1 i_{1,1}, s_2 i_{1,2}, 2}^{(1)}$ | $W_{s_1 i_{1,1}, s_2 i_{1,2}, 3}^{(1)}$ |
| $i_2'$ | 4 | 5 | 6 | 7 |
| Precoder | $W_{s_1 i_{1,1}+1, s_2 i_{1,2}, 0}^{(1)}$ | $W_{s_1 i_{1,1}+1, s_2 i_{1,2}, 1}^{(1)}$ | $W_{s_1 i_{1,1}+1, s_2 i_{1,2}, 2}^{(1)}$ | $W_{s_1 i_{1,1}+1, s_2 i_{1,2}, 3}^{(1)}$ |
| $i_2'$ | 8 | 9 | 10 | 11 |
| Precoder | $W_{s_1 i_{1,1}+2, s_2 i_{1,2}, 0}^{(1)}$ | $W_{s_1 i_{1,1}+2, s_2 i_{1,2}, 1}^{(1)}$ | $W_{s_1 i_{1,1}+2, s_2 i_{1,2}, 2}^{(1)}$ | $W_{s_1 i_{1,1}+2, s_2 i_{1,2}, 3}^{(1)}$ |
| $i_2'$ | 12 | 13 | 14 | 15 |
| Precoder | $W_{s_1 i_{1,1}+3, s_2 i_{1,2}, 0}^{(1)}$ | $W_{s_1 i_{1,1}+3, s_2 i_{1,2}, 1}^{(1)}$ | $W_{s_1 i_{1,1}+3, s_2 i_{1,2}, 2}^{(1)}$ | $W_{s_1 i_{1,1}+3, s_2 i_{1,2}, 3}^{(1)}$ |
| $i_2'$ | 16-31 | | | |
| Precoder | Entries 16-31 constructed with replacing the second subscript $s_2 i_{1,2}$ with $s_2 i_{1,2}+1$ in entries 0-15 | | | |

Master Rank-2 Codebook

In some embodiments, the rank-2 class A codebook is described in Table 76 and Table 77. Note that in Config 3 and Config 4, the four beams shown in grey are numbered 0-3, and legacy 8-Tx rank-2 beam pairs {00,11,22,33,01,12,13, 03} are formed according to this numbering in the proposed rank-2 codebook. Also note that for Config 1, the rank-2 codebook corresponds to a single beam and QPSK {1,j,−1,−j} co-phase.

A UE is configured with one of Config 1, Config 2, Config 3, and Config 4. Depending on the configured Config parameter, the UE performs codebook subset selection (CSS) by selecting a subset of $i_2'$ indices in Table 77 according to Table 76.

TABLE 76

Figure 57B:
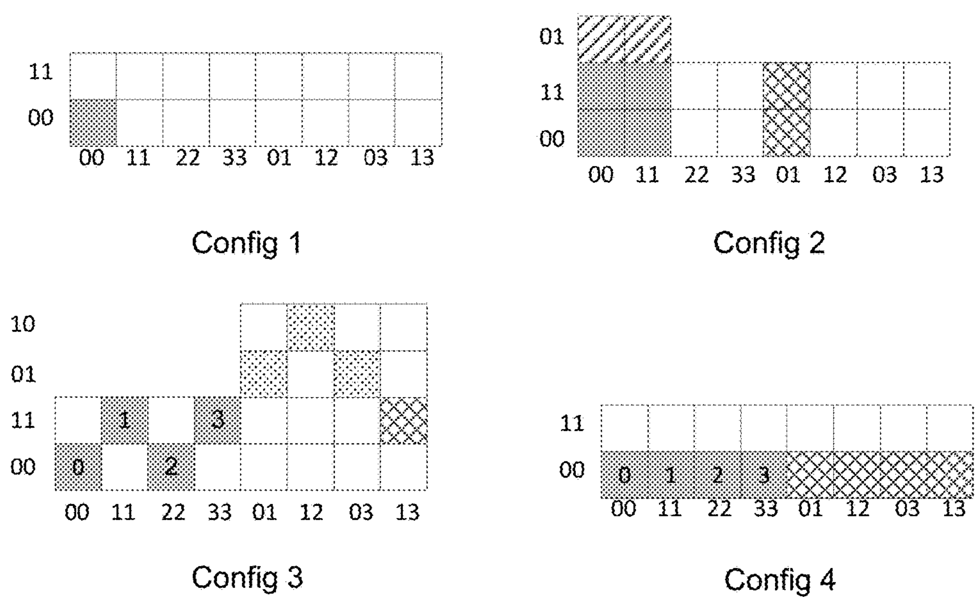

CSS table for four configurations with the bit maps for the four illustrated in FIG 57B.

| Config | Selected $i'_2$ indices | (s1, s2) |
|---|---|---|
| Config 1 | 0-1,36-37 | (1, 1) |
| Config 2 | 0-3, 8-9, 16-19, 22-23, 32-35 | (2, 2) |
| Config 3 | 0-1, 4-5, 18-21, 24-31 | (2, 2) |
| Config 4 | 0-15 | (2, 2) |

$$W^{(2)}_{m_1,m'_1,m_2,m'_2,n} = \frac{1}{\sqrt{2Q}}\begin{bmatrix} v_{m_1}\otimes u_{m_2} & v_{m'_1}\otimes u_{m'_2} \\ \varphi_n v_{m_1}\otimes u_{m_2} & -\varphi_n v_{m'_1}\otimes u_{m'_2}\end{bmatrix}$$

$$v_{m_1} = \left[\,1 \quad e^{j\frac{2\pi m_1}{O_1 N_1}} \quad \ldots \quad e^{j\frac{2\pi m_1(N_1-1)}{O_1 N_1}}\,\right]^t,$$

$$u_{m_2} = \left[\,1 \quad e^{j\frac{2\pi m_2}{O_2 N_2}} \quad \ldots \quad e^{j\frac{2\pi m_2(N_2-1)}{O_2 N_2}}\,\right]^t$$

$$i_{1,1} = 0, 1, \ldots, O_1N_1/s_1 - 1$$

$$i_{1,2} = 0, 1, \ldots, O_2N_2/s_2 - 1$$

If Config 2 and $N_1 \le N_2$, then $p_1 = O_1$ and $p_2 = 1$.

Otherwise $p_1 = 1$ and $p_2 = 1$.

The proposed rank-2 codebook is characterized by three parameters: $\{i_{11}, i_{12}, i_2\}$, where corresponds to the selected $i_2'$ indices from Table 76 according to the Config parameter.

Please see the below Table Section for Table 77.

Master Rank 3-4 Codebook

In some embodiments, the codebook for rank 3-4 is characterized by four parameters: $\{i_{11}, i_{12}, k, i_2\}$, and codewords are identified by $\{i_{1,1}', i_{1,2}, i_2\}$ in CSI feedback. Different values of the parameter k are used to construct different orthogonal beam groups for rank 3-4 codebooks.

Figure 44:
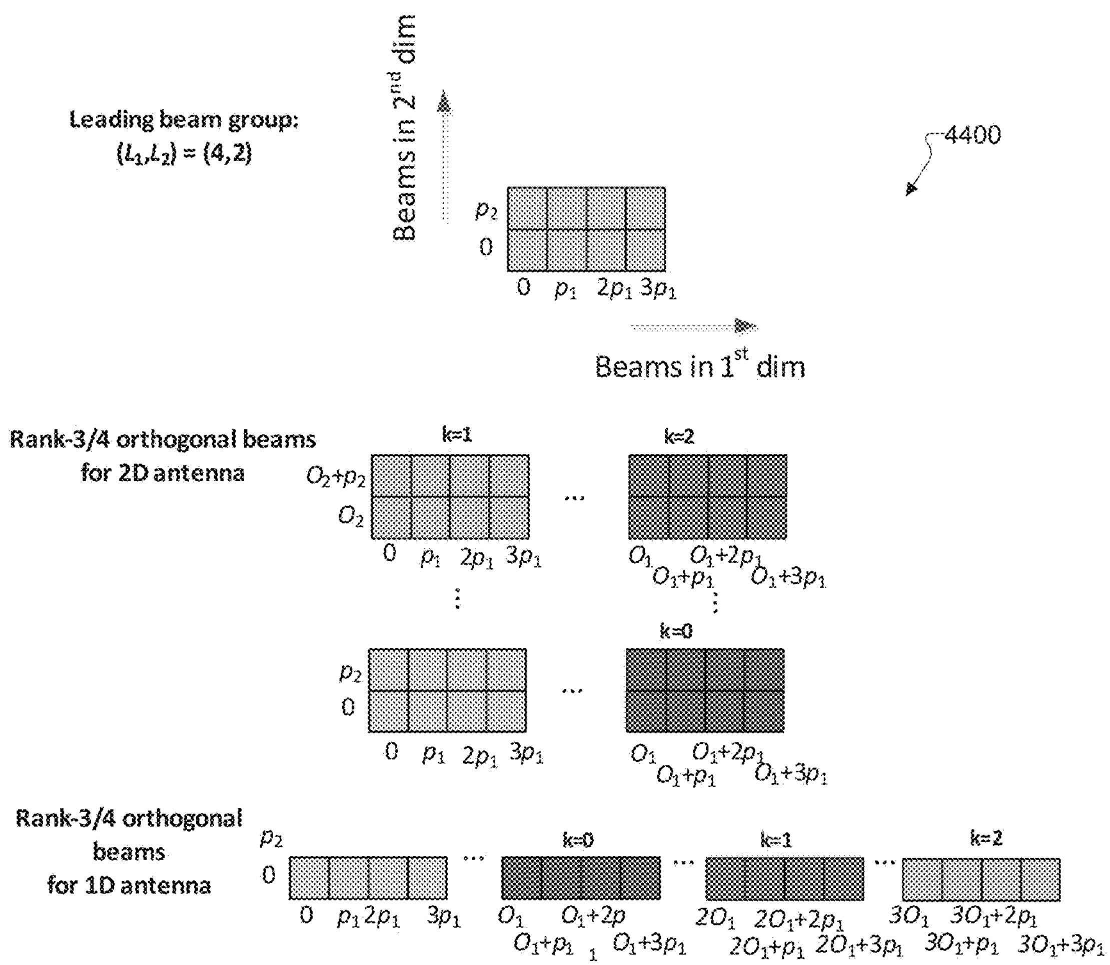
FIG. 44 illustrates three example orthogonal-beam groups 4400, indexed by k=0,1,2 for rank 3-4 according to some embodiments of the present disclosure.

FIG. 44 illustrates three example orthogonal-beam groups 4400, indexed by k=0,1,2 for Ranks 3-4 according to some embodiments of the present disclosure.

Table 79 and Table 80 show the rank 3-4 codebook tables that can be used for any of Q=8, 12, and 16 antenna port configurations, where $\delta_1$, $\delta_2$ are selected from Table 78 depending on the k value, the corresponding rank 3 precoder is either $$W^{(3)}_{m_1,m'_1,m_2,m'_2} = \frac{1}{\sqrt{3Q}}\begin{bmatrix} v_{m_1}\otimes u_{m_2} & v_{m_1}\otimes u_{m_2} & v_{m'_1}\otimes u_{m'_2} \\ v_{m_1}\otimes u_{m_2} & -v_{m_1}\otimes u_{m_2} & -v_{m'_1}\otimes u_{m'_2}\end{bmatrix},$$

$$\text{or } \tilde{W}^{(3)}_{m_1,m'_1,m_2,m'_2} = \frac{1}{\sqrt{3Q}}\begin{bmatrix} v_{m_1}\otimes u_{m_2} & v_{m'_1}\otimes u_{m'_2} & v_{m'_1}\otimes u_{m'_2} \\ v_{m_1}\otimes u_{m_2} & v_{m'_1}\otimes u_{m'_2} & -v_{m'_1}\otimes u_{m'_2}\end{bmatrix},$$

and the corresponding rank 4 precoder is $$W^{(4)}_{m_1,m'_1,m_2,m'_2,n} = \frac{1}{\sqrt{4Q}}\begin{bmatrix} v_{m_1}\otimes u_{m_2} & v_{m'_1}\otimes u_{m'_2} & v_{m_1}\otimes u_{m_2} & v_{m'_1}\otimes u_{m'_2} \\ \varphi_n v_{m_1}\otimes u_{m_2} & \varphi_n v_{m'_1}\otimes u_{m'_2} & -\varphi_n v_{m_1}\otimes u_{m_2} & -\varphi_n v_{m'_1}\otimes u_{m'_2}\end{bmatrix}.$$

UE feeds back k in PMI as part of the W1 indication. In particular, k is jointly encoded with $i_1$ indication(s), where $i_{1,1}' = (O_1N_1/s_1)k + i_{1,1}$ is reported in CSI feedback.

There are two alternatives for the number of values of k:

If $N_1>1$ and $N_2>1$: k=0,1 in Table 78.

If $N_2=1$: k=0,1,2 in Table 78.

TABLE 78

| Orthogonal beam type to ($\delta_1$, $\delta_2$) mapping | | | | |
|---|---|---|---|---|
| K | | 0 | 1 | 2 |
| If $N_1 > 1$ and $N_2 > 1$ | $\delta_1$ | $O_1$ | 0 | |
| | $\delta_2$ | 0 | $O_2$ | |
| If $N_2 = 1$ | | $O_1$ | $2O_1$ | $3O_1$ |
| | | 0 | 0 | 0 |

$i_{1,1} = 0, 1, \ldots, O_1N_1/s_1 - 1$
$i_{1,2} = 0, 1, \ldots, O_2N_2/s_2 - 1$ Please see the below Table Section for Tables 79 and 80.

Codebook Subset Selection

Figure 45:
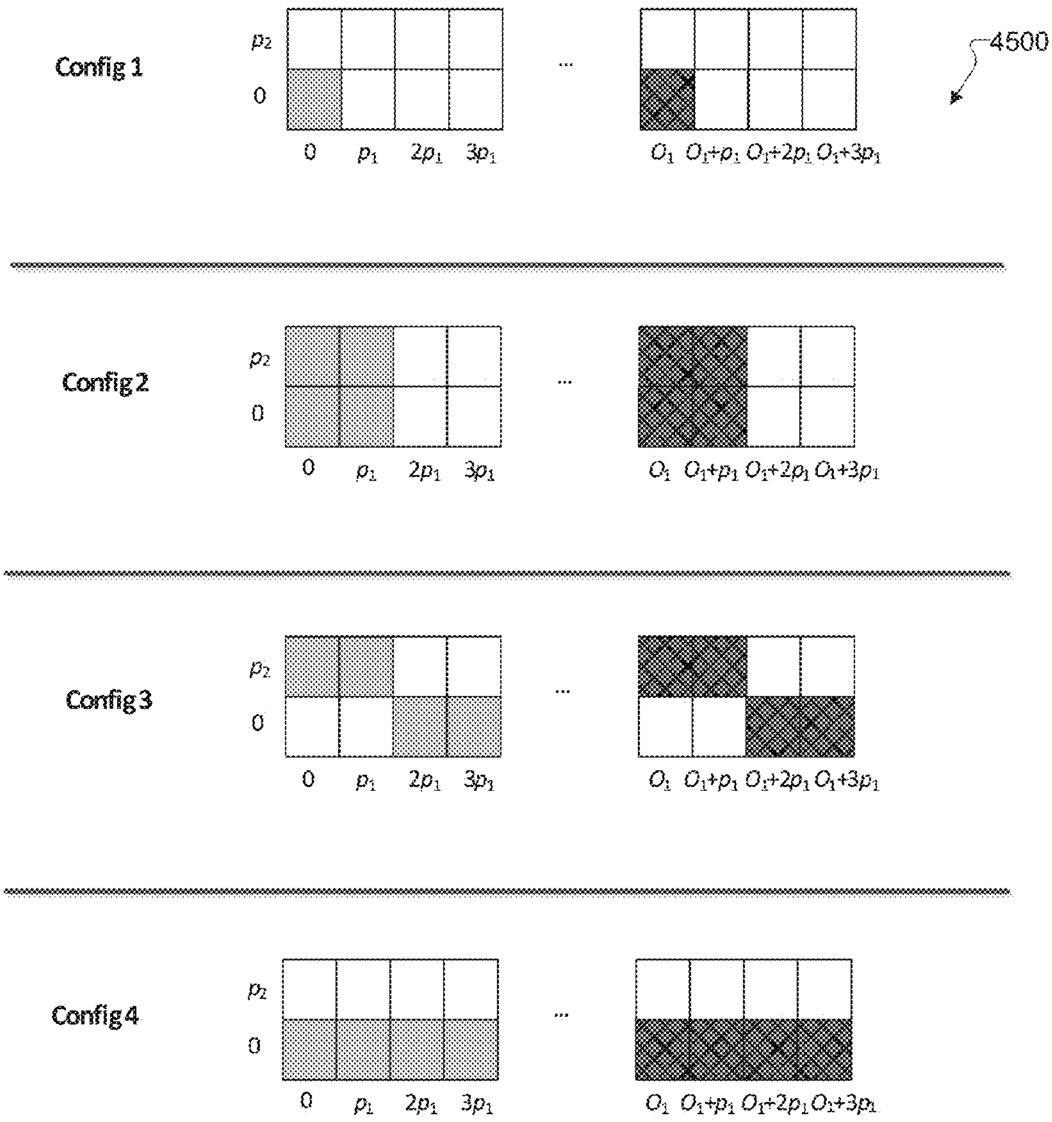
FIG. 45 illustrates example orthogonal beams 4500 for rank 3-4 when k=0 according to some embodiments of the present disclosure.

FIG. 45 illustrates example orthogonal beams 4500 for rank 3-4 when k=0 according to some embodiments of the present disclosure.

TABLE 81

| Selected $i_2$' indices for rank-3 CSI reporting (in Table 79) | | | |
|---|---|---|---|
| Config | Selected $i_2$' indices | (s1, s2) | ($p_1$, $p_2$) |
| 1 | 0, 2 | (1, 1) | (—, —) |
| 2 | 0-7, 16-23 | $\left(\frac{O_1}{2}, \frac{O_2}{2}\right)$ | $\left(\frac{O_1}{4}, \frac{O_2}{4}\right)$ |
| 3 | 8-23 | $\left(O_1, \frac{O_2}{2}\right)$ | $\left(\frac{O_1}{4}, \frac{O_2}{4}\right)$ |
| 4 | 0-15 | $\left(O_1, \frac{O_2}{4}\right)$ | $\left(\frac{O_1}{4}, -\right)$ |

TABLE 82

| Selected $i_2$' indices for rank-4 CSI reporting (in Table 80) | | | |
|---|---|---|---|
| Config | Selected $i_2$' indices | (s1, s2) | ($p_1$, $p_2$) |
| 1 | 0, 1 | (1, 1) | (—, —) |
| 2 | 0-3, 8-11 | $\left(\frac{O_1}{2}, \frac{O_2}{2}\right)$ | $\left(\frac{O_1}{4}, \frac{O_2}{4}\right)$ |
| 3 | 4-11 | $\left(O_1, \frac{O_2}{2}\right)$ | $\left(\frac{O_1}{4}, \frac{O_2}{4}\right)$ |
| 4 | 0-7 | $\left(O_1, \frac{O_2}{4}\right)$ | $\left(\frac{O_1}{4}, —\right)$ |

With the (s1,s2) and (p1,p2) parameters proposed in Table 81 and Table 82:

when O1=8 the effective oversampling factor is the same as legacy (i.e., 4), and;

when O1=4 the effective oversampling factor is same as the configured one (i.e., 4).

Master Rank 5-8 Codebook

For ranks 5-8, the proposed codebooks are characterized by two parameters: $\{i_{11}, i_{12}\}$, and these are used to form $i_1$ indication(s), rather than $\{i_{11}, i_{12}, k\}$ that is used for ranks 3-4. For rank 5, 6, 7, 8, the precoding matrices are as in the following, where $\delta_{1,1}$, $\delta_{1,2}$, $\delta_{1,3}$, $\delta_{2,1}$, $\delta_{2,2}$, $\delta_{2,3}$ are determined by the RRC 'Config' parameter, and $(s_1, s_2) = (1, 1)$ for Config 1; and $(s_1, s_2) = \left(\frac{O_1}{4}, \frac{O_2}{4}\right)$ for Config 2, 3, 4.

$$W_{i_{1,1}i_{1,2}}^{(5)} = \frac{1}{\sqrt{5Q}}\begin{bmatrix} v_{s_1 i_{1,1}} \otimes u_{s_2 i_{1,2}} & v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} \\ v_{s_1 i_{1,1}} \otimes u_{s_2 i_{1,2}} & -v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & -v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} \end{bmatrix}$$

…

$$W_{i_{1,1}i_{1,2}}^{(6)} = \frac{1}{\sqrt{6Q}}\begin{bmatrix} v_{s_1 i_{1,1}} \otimes u_{s_2 i_{1,2}} & v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} & v_{s_1 i_{1,1}+\delta_{1,2}} \otimes u_{s_2 i_{1,2}+\delta_{2,2}} \\ v_{s_1 i_{1,1}} \otimes u_{s_2 i_{1,2}} & -v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & -v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} & -v_{s_1 i_{1,1}+\delta_{1,2}} \otimes u_{s_2 i_{1,2}+\delta_{2,2}} \end{bmatrix}$$

…

$$W_{i_{1,1}i_{1,2}}^{(7)} = \frac{1}{\sqrt{7Q}}\begin{bmatrix} v_{s_1 i_{1,1}} \otimes u_{s_2 i_{1,2}} & v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} & v_{s_1 i_{1,1}+\delta_{1,2}} \otimes u_{s_2 i_{1,2}+\delta_{2,2}} & v_{s_1 i_{1,1}+\delta_{1,3}} \otimes u_{s_2 i_{1,2}+\delta_{2,3}} \\ v_{s_1 i_{1,1}} \otimes u_{s_2 i_{1,2}} & -v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & -v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} & -v_{s_1 i_{1,1}+\delta_{1,2}} \otimes u_{s_2 i_{1,2}+\delta_{2,2}} & v_{s_1 i_{1,1}+\delta_{1,3}} \otimes u_{s_2 i_{1,2}+\delta_{2,3}} \end{bmatrix}$$

…

$$W_{i_{1,1}i_{1,2}}^{(8)} = \frac{1}{\sqrt{8Q}}\begin{bmatrix} v_{s_1 i_{1,1}} \otimes u_{s_2 i_{1,2}} & v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} & v_{s_1 i_{1,1}+\delta_{1,2}} \otimes u_{s_2 i_{1,2}+\delta_{2,2}} & v_{s_1 i_{1,1}+\delta_{1,3}} \otimes u_{s_2 i_{1,2}+\delta_{2,3}} & v_{s_1 i_{1,1}+\delta_{1,3}} \otimes u_{s_2 i_{1,2}+\delta_{2,3}} \\ v_{s_1 i_{1,1}} \otimes u_{s_2 i_{1,2}} & -v_{s_1 i_{1,1}} \otimes u_{s_2 i_{1,2}} & v_{s_1 i_{1,1}+\delta_{1,1}} \otimes u_{s_2 i_{1,2}+\delta_{2,1}} & -v_{s_1 i_{1,1}+\delta_{1,1}} \otimes u_{s_2 i_{1,2}+\delta_{2,1}} & v_{s_1 i_{1,1}+\delta_{1,2}} \otimes u_{s_2 i_{1,2}+\delta_{2,2}} & -v_{s_1 i_{1,1}+\delta_{1,2}} \otimes u_{s_2 i_{1,2}+\delta_{2,2}} & v_{s_1 i_{1,1}+\delta_{1,3}} \otimes u_{s_2 i_{1,2}+\delta_{2,3}} & -v_{s_1 i_{1,1}+\delta_{1,3}} \otimes u_{s_2 i_{1,2}+\delta_{2,3}} \end{bmatrix}$$

Figure 46:
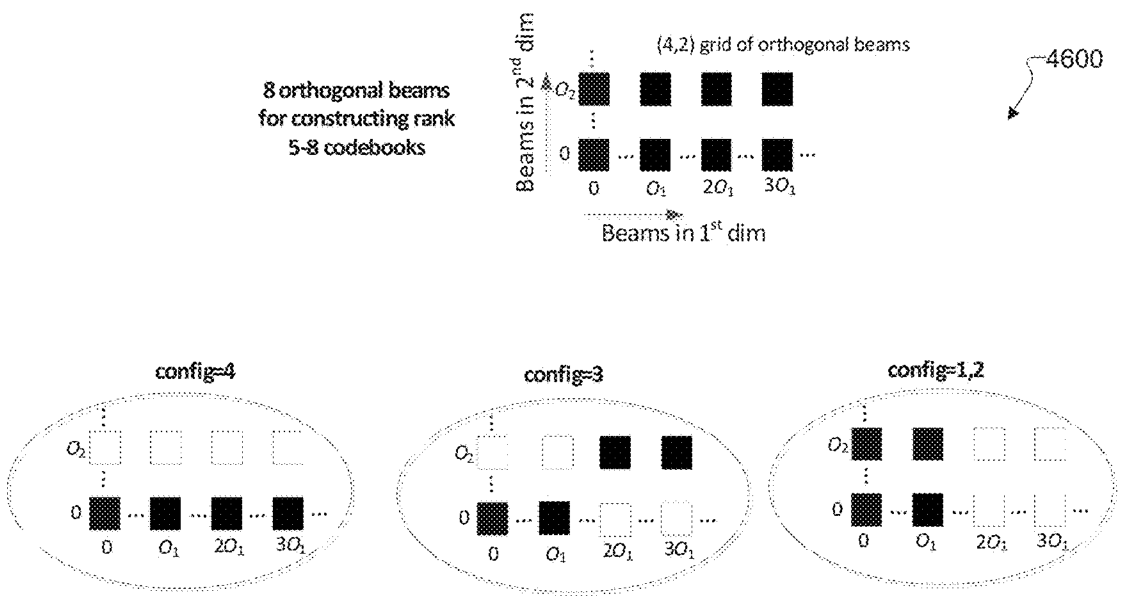
FIG. 46 illustrates orthogonal beam grouping 4600 for rank 5-8: 16 ports according to some embodiments of the present disclosure.

FIG. 46 illustrates orthogonal beam grouping 4600 for rank 5-8: 16 ports according to some embodiments of the present disclosure.

For 16 ports, $\delta_{1,1}$, $\delta_{1,2}$, $\delta_{1,3}$, $\delta_{2,1}$, $\delta_{2,2}$, $\delta_{2,3}$ are defined as the following Table 83.

TABLE 83

Delta values for 16-port rank 5-8 codebooks

| | Antenna configuration | $\delta_{1,1}$ | $\delta_{2,1}$ | $\delta_{1,2}$ | $\delta_{2,2}$ | $\delta_{1,3}$ | $\delta_{2,3}$ |
|---|---|---|---|---|---|---|---|
| config = 4 | $N_1 \geq N_2$ | $O_1$ | 0 | $2O_1$ | 0 | $3O_1$ | 0 |
| | $N_1 < N_2$ | 0 | $O_2$ | 0 | $2O_2$ | 0 | $3O_2$ |
| config = 3 | $N_1 \geq N_2$ | $O_1$ | 0 | $2O_1$ | $O_2$ | $3O_1$ | $O_2$ |
| | $N_1 < N_2$ | 0 | $O_2$ | $O_1$ | $2O_2$ | $O_1$ | $3O_2$ |
| Config = 1, 2 | Both | $O_1$ | 0 | $O_1$ | $O_2$ | 0 | $O_2$ |

Figure 47:
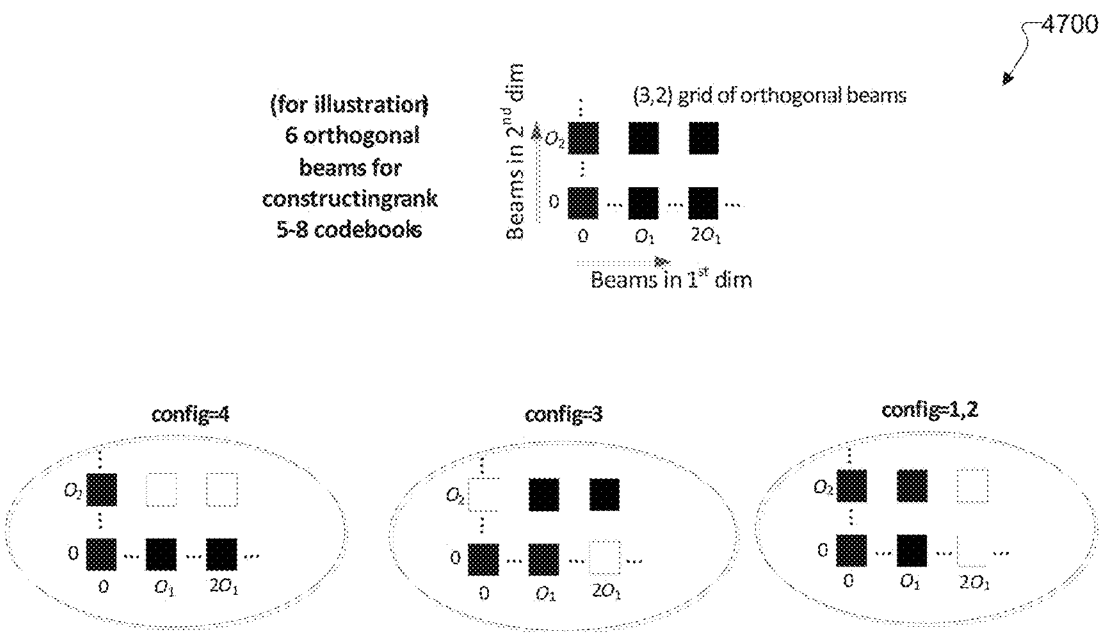
FIG. 47 illustrates example orthogonal beam grouping for rank 5-8: 12 ports according to embodiments of the present disclosure.

FIG. 47 illustrates example orthogonal beam grouping 4700 for rank 5-8: 12 ports according to embodiments of the present disclosure.

For 12 ports, $\delta_{1,1}$, $\delta_{1,2}$, $\delta_{1,3}$, $\delta_{2,1}$, $\delta_{2,2}$, $\delta_{2,3}$ are defined as the following Table 84:

TABLE 84

Delta values for 12-port rank 5-8 codebooks

| Type | Configuration | $\delta_{1,1}$ | $\delta_{2,1}$ | $\delta_{1,2}$ | $\delta_{2,2}$ | $\delta_{1,3}$ | $\delta_{2,3}$ |
|---|---|---|---|---|---|---|---|
| Config = 4 | $N_1 \geq N_2$ | $O_1$ | 0 | $2O_1$ | 0 | 0 | $O_2$ |
| | $N_1 < N_2$ | 0 | $O_2$ | 0 | $2O_2$ | $O_1$ | 0 |
| Config = 3 | $N_1 \geq N_2$ | $O_1$ | 0 | $2O_1$ | $O_2$ | $O_1$ | $O_2$ |
| | $N_1 < N_2$ | 0 | $O_2$ | $O_1$ | $2O_2$ | $O_1$ | $O_2$ |
| Config = 1, 2 | Both | $O_1$ | 0 | $O_1$ | $O_2$ | 0 | $O_2$ |

Figure 48:
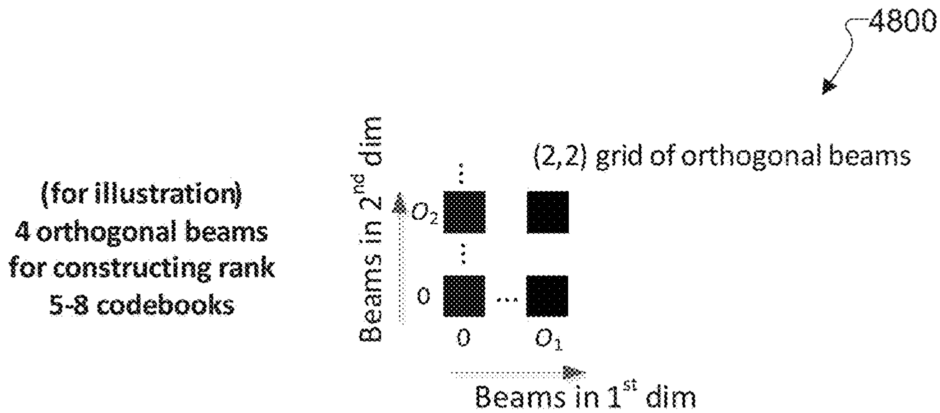
FIG. 48 illustrates example orthogonal beam grouping for rank 5-8: 8 ports according to embodiments of the present disclosure.

FIG. 48 illustrates example orthogonal beam grouping 4800 for rank 5-8: 8 ports according to embodiments of the present disclosure.

For 8 ports, $\delta_{1,1}$, $\delta_{1,2}$, $\delta_{1,3}$, $\delta_{2,1}$, $\delta_{2,2}$, $\delta_{2,3}$ are defined as the following Table 85:

TABLE 85

Delta values for 8-port rank 5-8 codebooks

| Type | Configuration | $\delta_{1,1}$ | $\delta_{2,1}$ | $\delta_{1,2}$ | $\delta_{2,2}$ | $\delta_{1,3}$ | $\delta_{2,3}$ |
|---|---|---|---|---|---|---|---|
| Config = 1, 2, 3, 4 | $N_1$ = N2 | $O_1$ | 0 | $O_1$ | $O_2$ | 0 | $O_2$ |

Embodiment on Separate Codebook of Each Config

In some embodiment, the rank 1-8 codebook tables can be alternatively written as four separate rank 1-8 codebook tables in their respective tables, one for each of Config 1, Config 2, Config 3, and Config 4.

For instance, the rank-1 codebook for Config 1 according to the master codebook table in Table 75 can be written alternatively according to the first codebook table in Table 87; the rank-1 codebook for Config 2 according to the master codebook table in Table 75 can be written alternatively according to the second codebook table in Table 87; the rank-1 codebook for Config 3 according to the master codebook table in Table 75 can be written alternatively according to the third codebook table in Table 87; and the rank-1 codebook for Config 4 according to the master codebook table in Table 75 can be written alternatively according to the fourth codebook table in Table 87.

The separate codebook tables for rank 2-8 can be constructed similarly.

In some embodiment, for 8 antenna ports {15,16,17,18, 19,20,21,22}, 12 antenna ports {15,16,17,18,19,20,21,22, 23,24,25,26} 16 antenna ports {15,16,17,18,19,20,21,22,23, 24,25,26,27,28,29,30}, and UE configured with higher layer parameter CSI-Reporting-Type, and CSI-Reporting Type is set to 'CLASS A', each PMI value corresponds to three codebook indices $(i_{1,1},i_{1,2},i_2)$ given in Table 87, Table 88, Table 89, Table 90, Table 91, Table 92, Table 93, or Table 94, where the quantities $\phi_n$, $u_m$ and $v_{l,m}$ are given by $$\varphi_n = e^{j\pi n/2}$$

$$u_m = \left[1 \;\; e^{j\frac{2\pi m}{O_2 N_2}} \;\; \ldots \;\; e^{j\frac{2\pi m(N_2-1)}{O_2 N_2}}\right]^T$$

$$v_{l,m} = \left[u_m \;\; e^{j\frac{2\pi l}{O_1 N_1}} u_m \;\; \ldots \;\; e^{j\frac{2\pi l(N_1-1)}{O_1 N_1}} u_m\right]^T.$$

The values of $N_1$, $N_2$, $O_1$, and $O_2$ are configured with the higher-layer parameters Codebook-Config-N1, Codebook-Config-N2, Codebook-Over-Sampling-RateConfig-O1, and Codebook-Over-Sampling-RateConfig-O2, respectively. The supported configurations of $(O_1,O_2)$ and $(N_1,N_2)$ for a given number of CSI-RS ports are given in Table 86. The number of CSI-RS ports, P, is $2N_1N_2$.

UE is not expected to be configured with value of CodebookConfig set to 2 or 3, if the value of codebookConfigN2 is set to 1.

UE shall only use $i_{1,2}$=0 and shall not report $i_{1,2}$ if the value of codebookConfigN2 is set to 1.

A first PMI value $i_1$ corresponds to the codebook indices pair $\{i_{1,1}, i_{1,2}\}$, and a second PMI value $i_2$ corresponds to the codebook index $i_2$ given in Table j with v equal to the associated RI value and where j=v+62.

In some cases codebook subsampling is supported. The sub-sampled codebook for PUCCH mode 2-1 for value of parameter Codebook-Config set to 2, 3, or 4 is defined in Table 7.2.2-1F for PUCCH Reporting Type 1a of the specification TS36.213.

In some cases codebook subsampling is supported. For instance, the sub-sampled codebook for PUCCH mode 2-1 for value of parameter Codebook-Config set to 2, 3, or 4 is defined according to that for the legacy 8-Tx codebook. For Codebook-Config=1, no subsampling is done for $i_2$.

TABLE 86

Supported configurations of $(O_1, O_2)$and $(N_1, N_2)$

| Number of CSI-RS antenna ports, P | $(N_1, N_2)$ | $(O_1, O_2)$ |
|---|---|---|
| 8 | (2, 2) | (4, 4), (8, 8) |
| 12 | (2, 3) | (8, 4), (8, 8) |
| | (3, 2) | (8, 4), (4, 4) |
| 16 | (2, 4) | (8, 4), (8, 8) |
| | (4, 2) | (8, 4), (4, 4) |
| | (8, 1) | (4, —), (8, —) |

Please see the below Table Section for Tables 87-1 to 87-4.

Please see the below Table Section for Tables 88-1 to 88-4.

Please see the below Table Section for Tables 89-1 to 89-5.

Please see the below Table Section for Tables 90-1 to 90-6.

Please see the below Table Section for Tables 91-1 to 91-4.

Please see the below Table Section for Tables 92-1 to 92-4.

Please see the below Table Section for Tables 93-1 to 93-5.

Please see the below Table Section for Tables 94-1 to 94-5.

In an alternate embodiment, the rank 1-8 codebook tables are given as in Tables 95-1 to 95-3, Tables 96-1 to 96-4, Table 97-1 to 97-4, Tables 98-1 to 98-4, Table 99, Table 100, Table 101, and Table 102.

Please see the below Table Section for Tables 95-1 to 95-3.

Please see the below Table Section for Tables 96-1 to 96-4.

Please see the below Table Section for Tables 97-1 to 97-4.

Please see the below Table Section for Tables 98-1 to 98-4.

Please see the below Table Section for Table 99.

Please see the below Table Section for Table 100.

Please see the below Table Section for Table 101.

Please see the below Table Section for Table 102.

Embodiment on rank 5-8 codebook for 1D port layout

In some embodiments, the rank 5-8 codebooks in case of the 1D port layouts such as $(N_1,N_2)=(6,1)$, (8,1), (1,6) and (1,8), the 1D orthogonal beam groups are used for different Codebook-Config values including Codebook-Config=1,2, 3,4.

In one example of $N_2=1$, the same orthogonal beam group is used irrespective of whether Codebook-Config=1 or 4 for rank 5-8 codebooks. An example of the orthogonal beam group is shown in FIG. 49.

Figure 49:
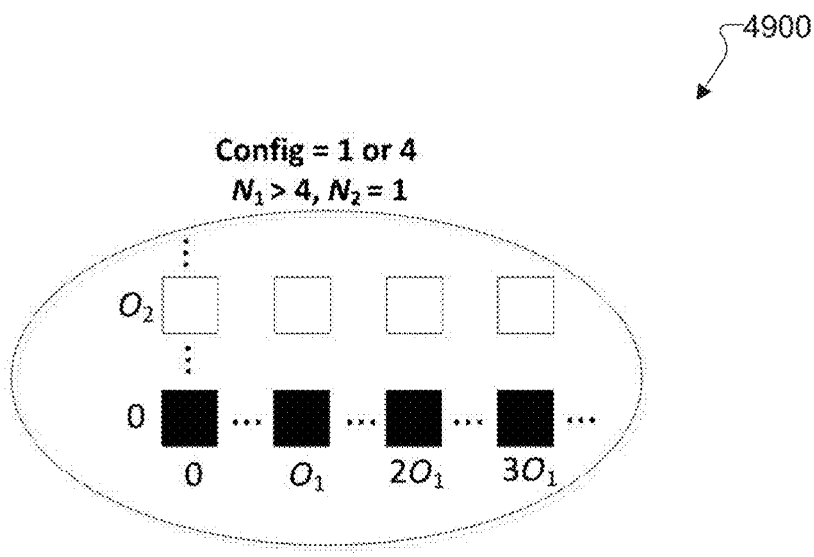
FIG. 49 illustrates an example of orthogonal beam group for 1D port layout according to embodiments of the present disclosure.

FIG. 49 illustrates an example of orthogonal beam group for 1D port layout according to embodiments of the present disclosure.

In another example of $N_2=1$, the different orthogonal beam groups are used for Codebook-Config=1 and 4 for rank 5-8 codebooks. An example of the orthogonal beam group is shown in FIG. 50.

Figure 50:
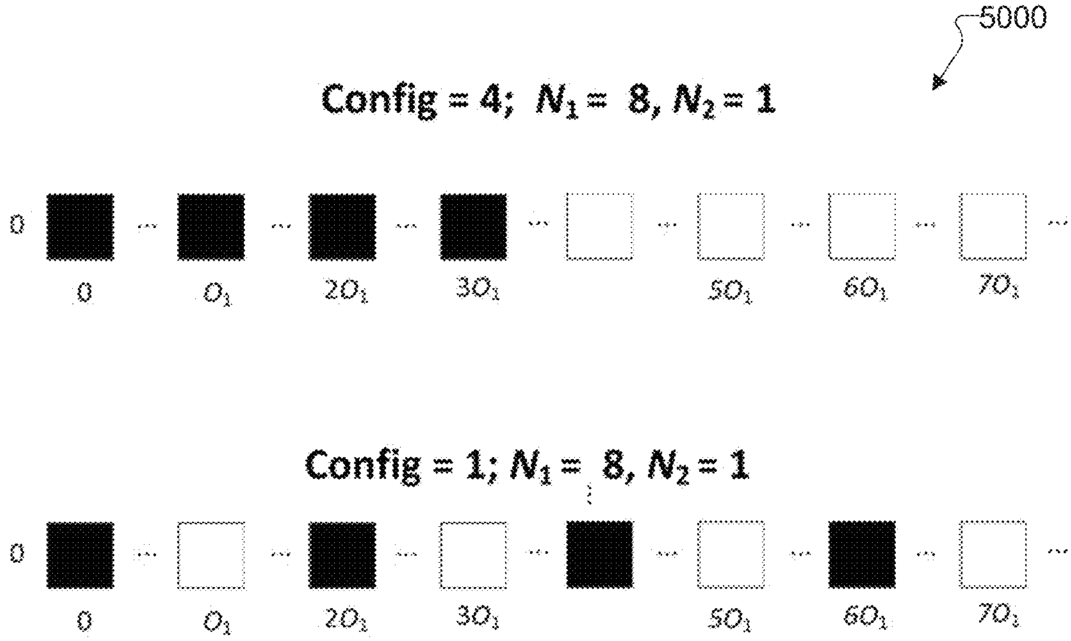
FIG. 50 illustrates an example of orthogonal beam group for 1D port layout according to embodiments of the present disclosure.

FIG. 50 illustrates an example of orthogonal beam group 5000 for 1D port layout according to embodiments of the present disclosure.

In another example of $N_2=1$, the same orthogonal beam group is used irrespective of whether Codebook-Config=1, 2, 3 or 4 for rank 5-8 codebooks. An example of the orthogonal beam group is shown in FIG. 51.

Figure 51:
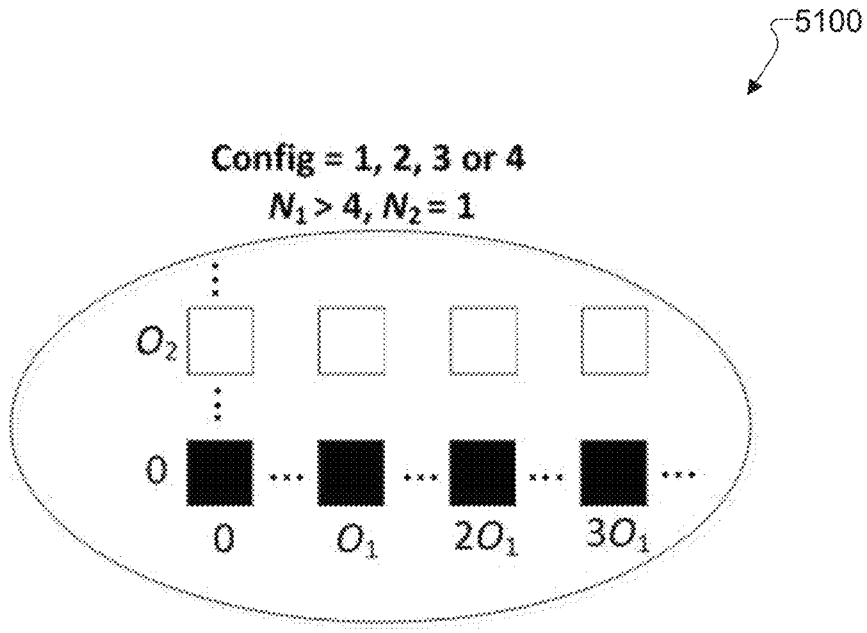
FIG. 51 illustrates an example of orthogonal beam group 5100 for 1D port layout according to embodiments of the present disclosure.

FIG. 51 illustrates an example of orthogonal beam group 5100 for 1D port layout according to embodiments of the present disclosure.

In another example of $N_2=1$, the different orthogonal beam groups are used for Codebook-Config=1 and 4 for rank 5-8 codebooks. An example of the orthogonal beam group is shown in FIG. 52.

Figure 52:
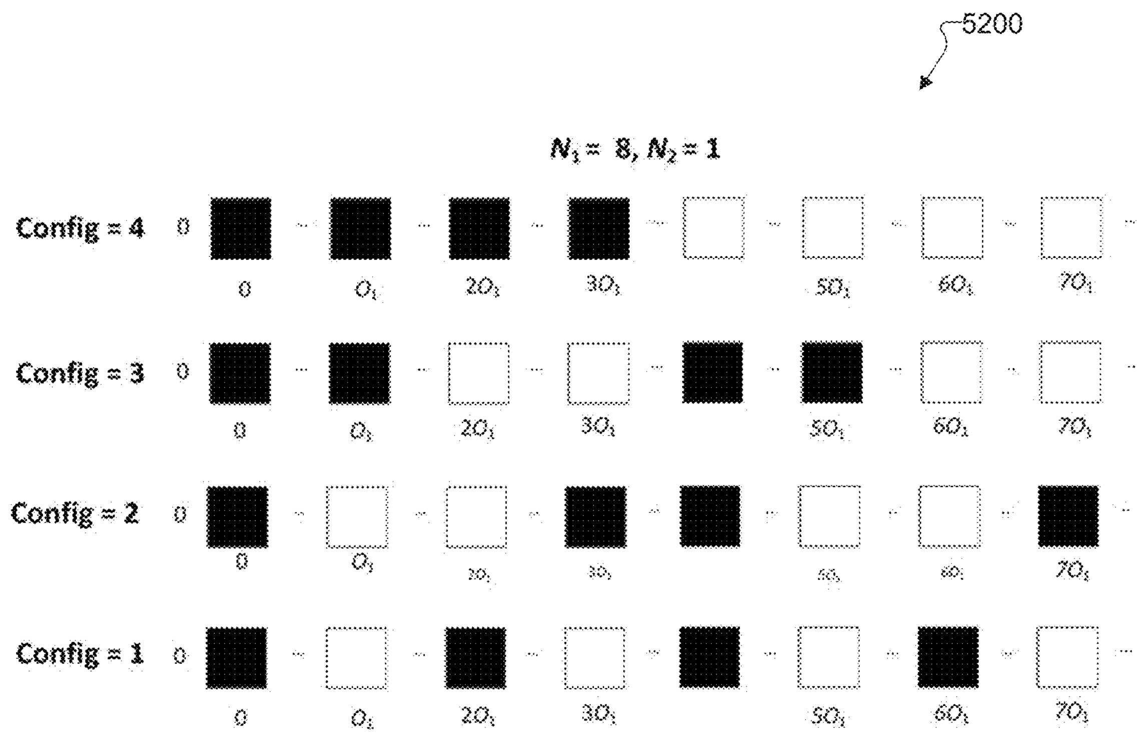
FIG. 52 illustrates an example of orthogonal beam group 5200 for 1D port layout according to embodiments of the present disclosure.

FIG. 52 illustrates an example of orthogonal beam group 5200 for 1D port layout according to embodiments of the present disclosure.

These Codebook-Config to orthogonal beam group mappings are for illustration only, and they can be mapped to other orthogonal beam groups including the ones shown here or not shown.

Other rank 3-8 codebook design alternatives

In some embodiments, rank 3-8 codebooks can be constructed according to alternative master codebook alternatives 1-4 shown in FIG. 53, FIG. 54, FIG. 55, and FIG. 56, according to some embodiments of this disclosure.

Figure 53A:
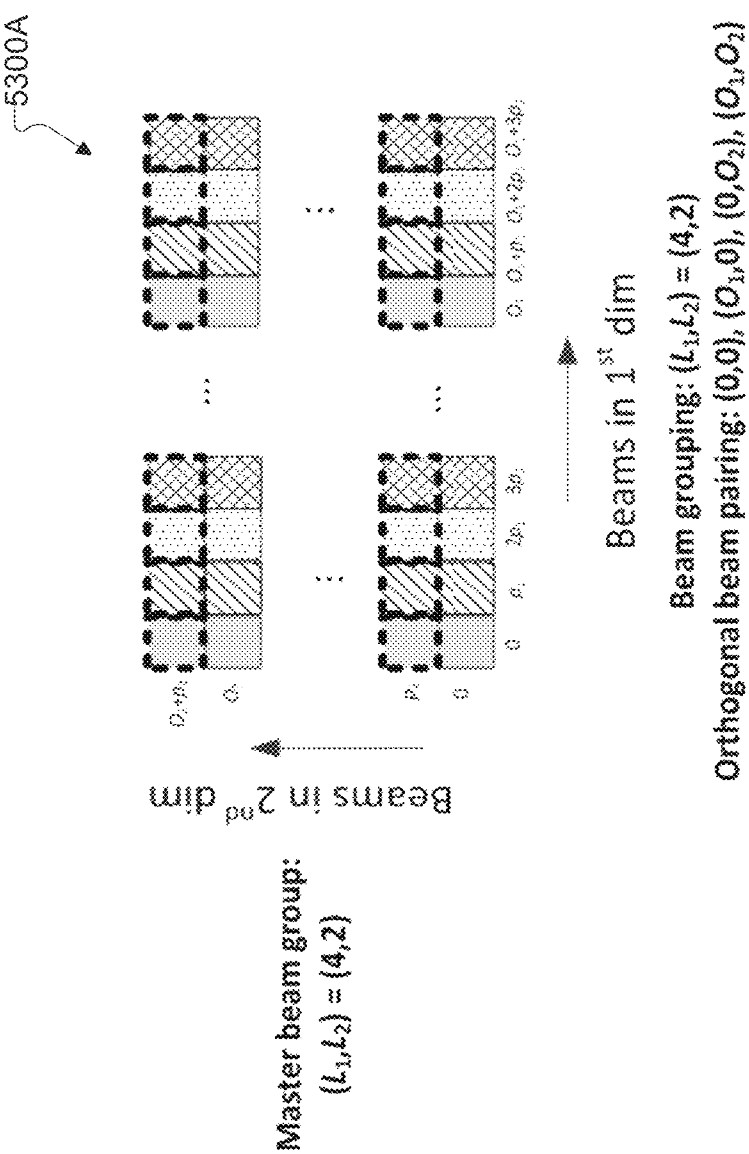
FIGS. 53A and 53B illustrate an alternate rank 3-8 codebook design 1: $(L_1,L_2)=(4,2)$ according to embodiments of the present disclosure.
Figure 53B:
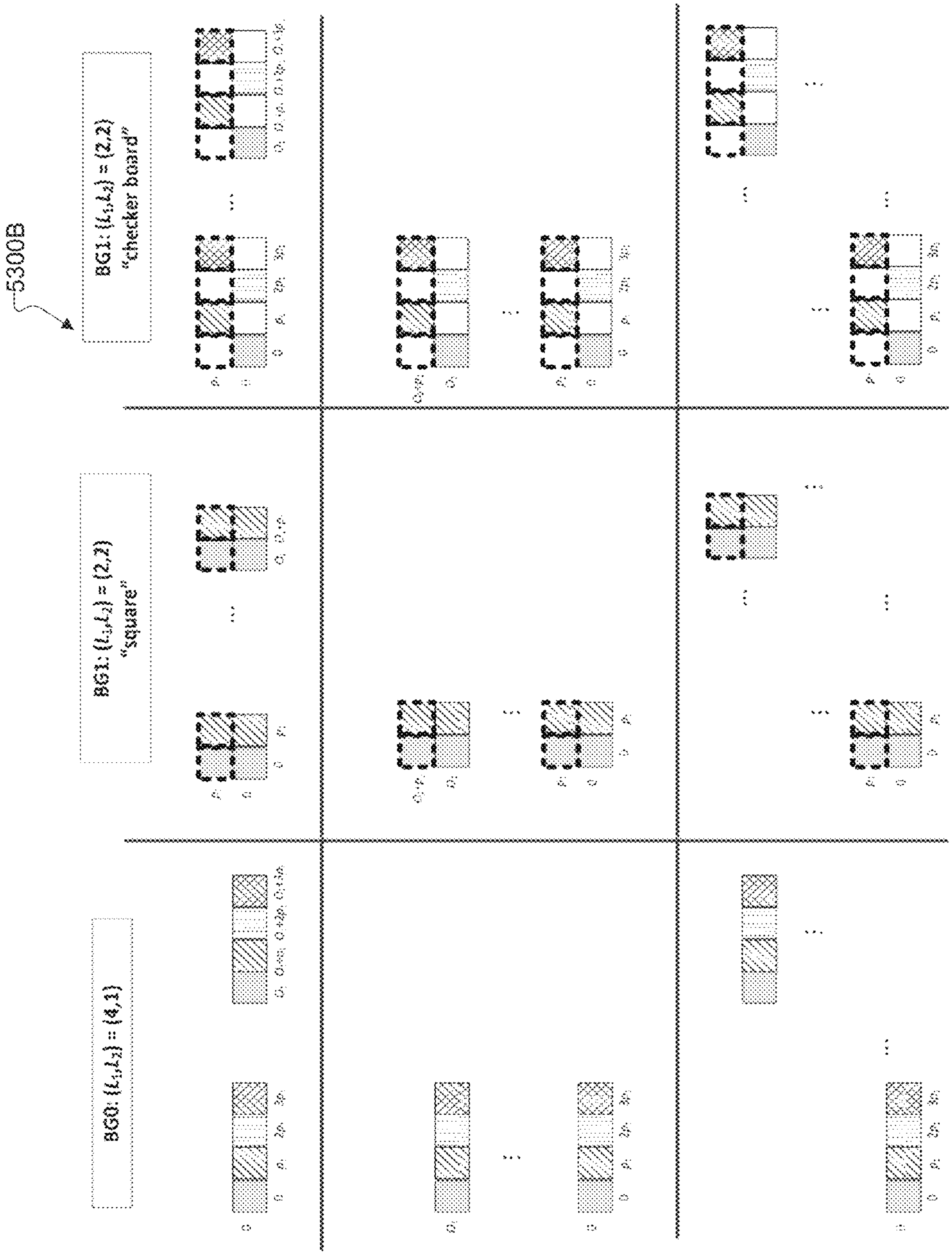

FIGS. 53A and 53B illustrate an alternate rank 3-8 codebook design 1 5300A, 5300B: $(L_1,L_2)=(4,2)$ according to embodiments of the present disclosure.

Figure 54:
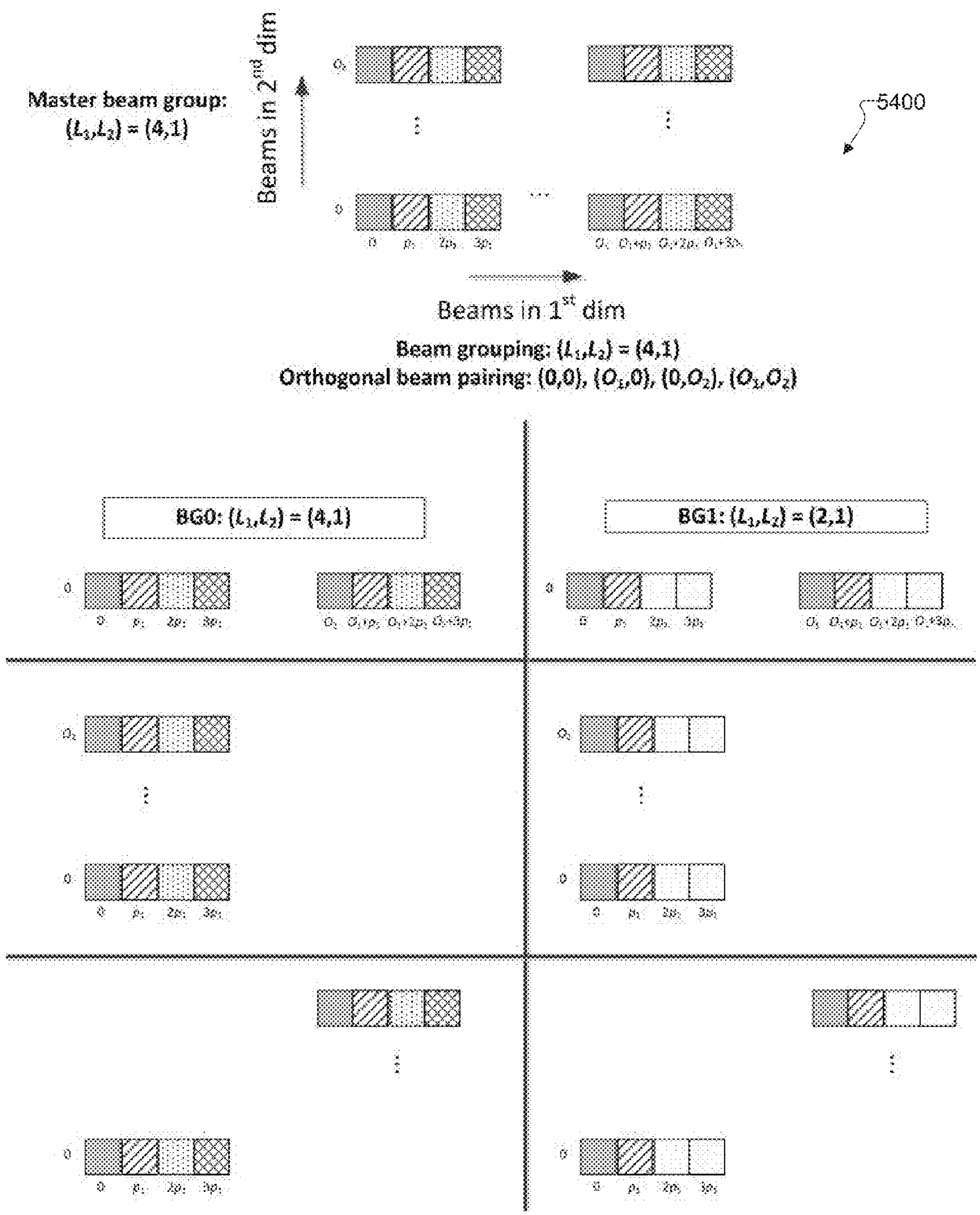
FIG. 54 illustrates an alternate rank 3-8 codebook design 2: $(L_1,L_2)=(4,1)$ according to embodiments of the present disclosure.

FIG. 54 illustrates an alternate rank 3-8 codebook design 2 5400: $(L_1,L_2)=(4,1)$ according to embodiments of the present disclosure.

Figure 55A:
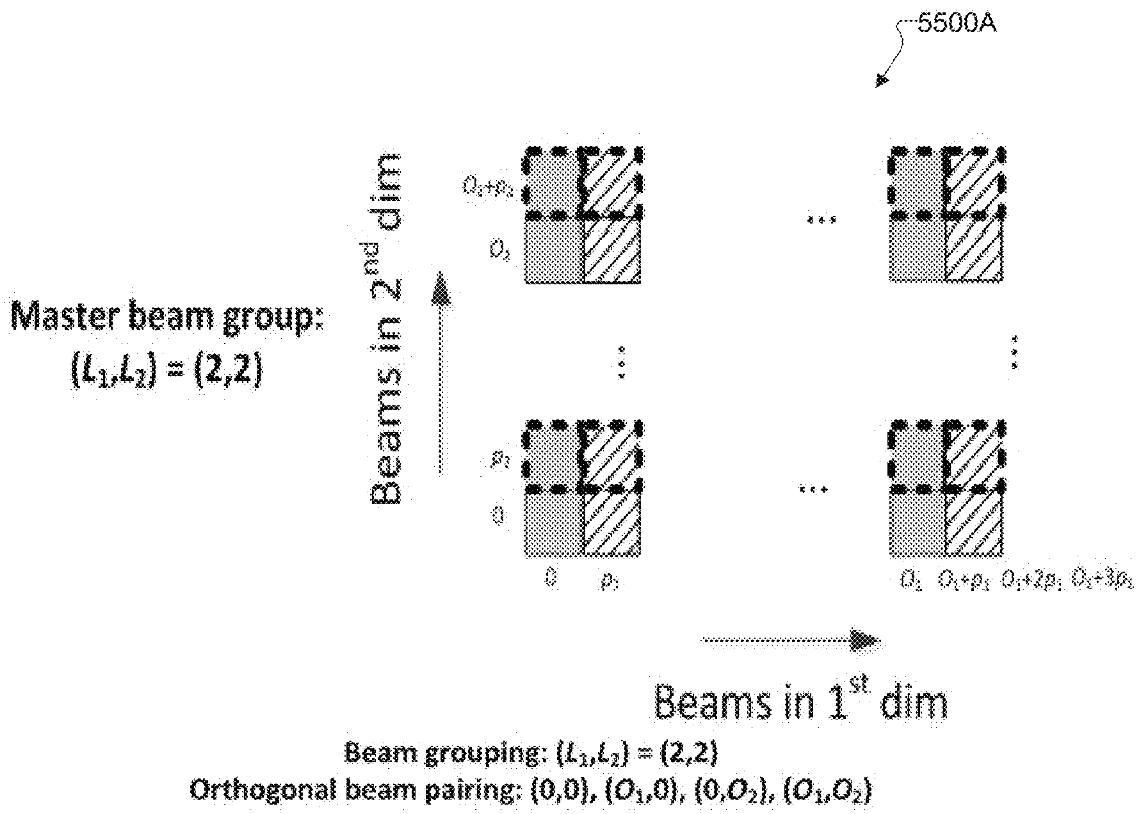
FIGS. 55A and 55B illustrate an alternate rank 3-8 codebook design 3: $(L_1,L_2)=(2,2)$ according to embodiments of the present disclosure.
Figure 55B:
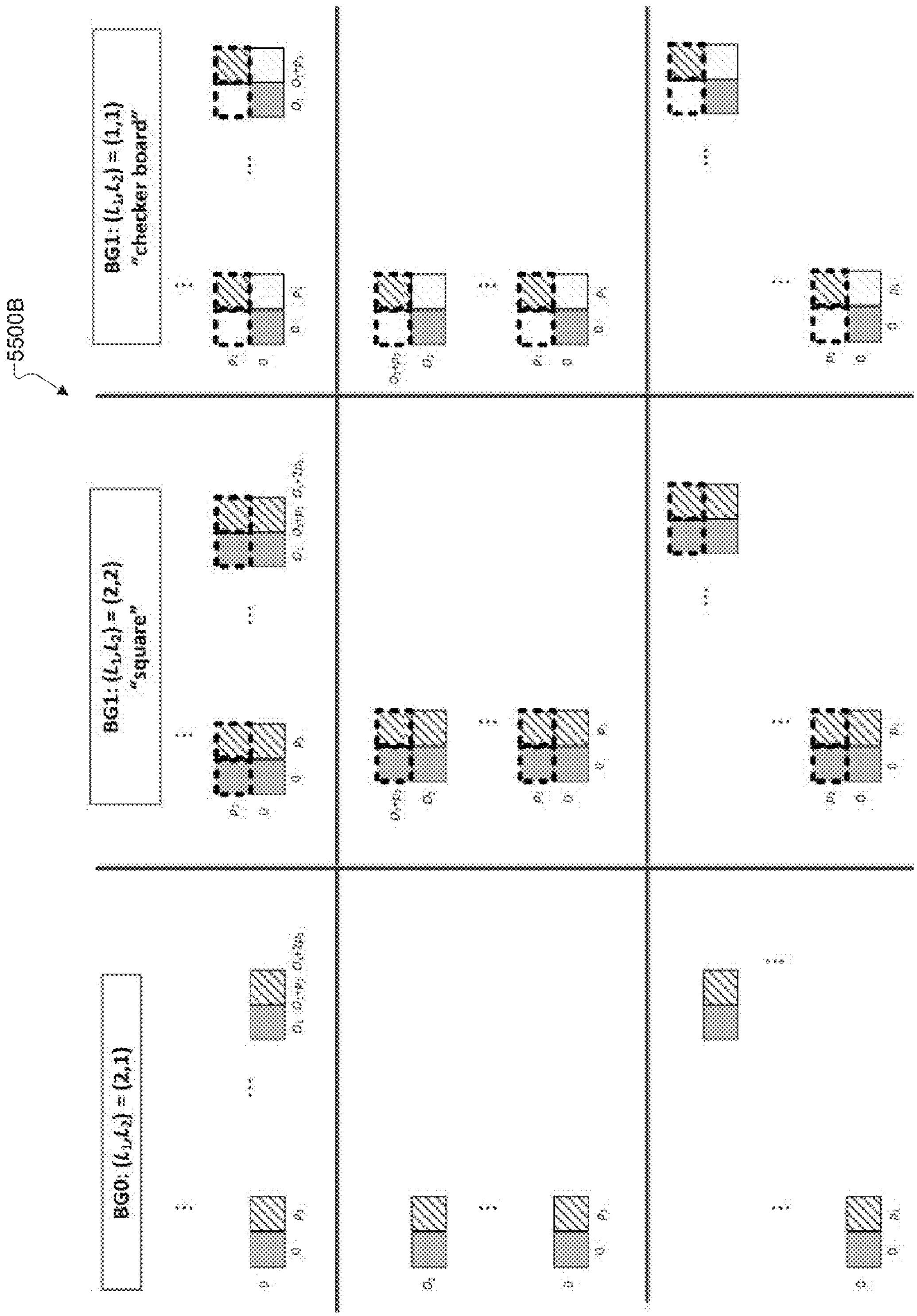

FIGS. 55A and 55B illustrate an alternate rank 3-8 codebook design 3 5500A, 5500B: $(L_1,L_2)=(2,2)$ according to embodiments of the present disclosure.

Figure 56A:
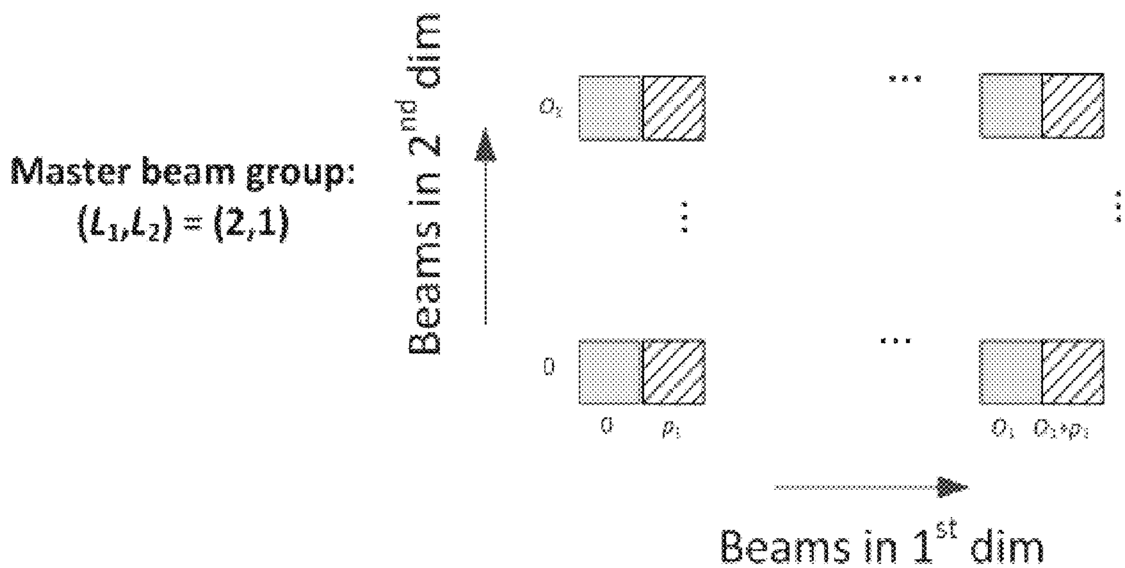
FIGS. 56A and 56B illustrate an alternate rank 3-8 codebook design 4: $(L_1,L_2)=(2,1)$ according to embodiments of the present disclosure.
Figure 56B:
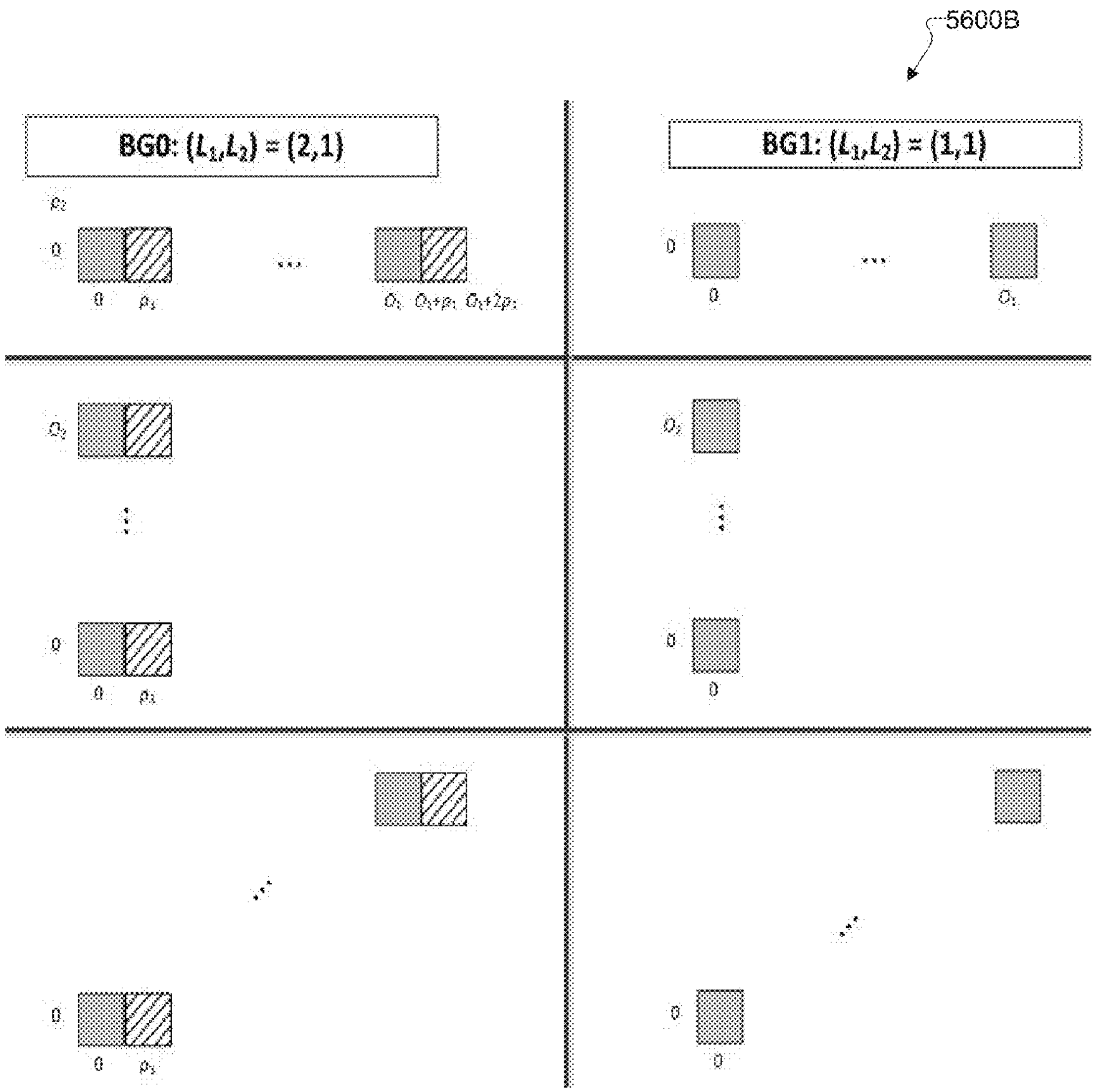

FIGS. 56A and 56B illustrate an alternate rank 3-8 codebook design 4 5600A, 5600B: $(L_1,L_2)=(2,1)$ according to embodiments of the present disclosure.

To aid the Patent Office and any readers of any patent issued on this application in interpreting the claims appended hereto, applicants wish to note that they do not intend any of the appended claims or claim elements to invoke 35 U.S.C. §112(f) unless the words "means for" or "step for" are explicitly used in the particular claim. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. §112(f).

Although the present disclosure has been described with an exemplary embodiment, various changes and modifications may be suggested to one skilled in the art. It is intended that the present disclosure encompass such changes and modifications as fall within the scope of the appended claims.

Table Section

TABLE 9

Single rank 2 codebook table for $N_1 = 8$, $N_2 = 2$, $o_1 = o_2 = 4$: Beam group type 1, Example 1

| | $i_2$ | | | |
|---|---|---|---|---|
| $i_1$ | 0 | 1 | 2 | 3 |
| 0-31 | $W^{(2)}_{2i_{1,H}, 2i_{1,V}, 2i_{1,H}, 2i_{1,V}, 0}$ | $W^{(2)}_{2i_{1,H}, 2i_{1,V}, 2i_{1,H}, 2i_{1,V}, 1}$ | $W^{(2)}_{2i_{1,H}+1, 2i_{1,V}, 2i_{1,H}+1, 2i_{1,V}, 0}$ | $W^{(2)}_{2i_{1,H}+1, 2i_{1,V}, 2i_{1,H}+1, 2i_{1,V}, 1}$ |
| | $i_2$ | | | |
| $i_1$ | 4 | 5 | 6 | 7 |
| 0-31 | $W^{(2)}_{2i_{1,H}, 2i_{1,V}+1, 2i_{1,H}, 2i_{1,V}+1, 0}$ | $W^{(2)}_{2i_{1,H}, 2i_{1,V}+1, 2i_{1,H}, 2i_{1,V}+1, 1}$ | $W^{(2)}_{2i_{1,H}+1, 2i_{1,V}+1, 2i_{1,H}+1, 2i_{1,V}+1, 0}$ | $W^{(2)}_{2i_{1,H}+1, 2i_{1,V}+1, 2i_{1,H}+1, 2i_{1,V}+1, 1}$ |

TABLE 9-continued

Single rank 2 codebook table for $N_1 = 8$, $N_2 = 2$, $o_1 = o_2 = 4$: Beam group type 1, Example 1 where $W^{(2)}_{m_H, m_V, m'_H, m'_V, n} = \frac{1}{4}\begin{bmatrix} \mathrm{v}_{m_H} \otimes \mathrm{v}_{m_V} & \mathrm{v}_{m'_H} \otimes \mathrm{v}_{m'_V} \\ \varphi_n \mathrm{v}_{m_H} \otimes \mathrm{v}_{m_V} & -\varphi_n \mathrm{v}_{m'_H} \otimes \mathrm{v}_{m'_V} \end{bmatrix}$

| $i_1$ | $i_{1,H}$ | $i_{1,V}$ |
|---|---|---|
| 0-7 | 0-7 | 0 |
| 8-15 | 0-7 | 1 |
| 16-23 | 0-7 | 2 |
| 24-31 | 0-7 | 3 |

TABLE 10

Single rank 2 codebook table for $N_1 = 8$, $N_2 = 2$, $o_1 = o_2 = 4$: Beam group type 1 and Beam group Type 4 Alt 1

| | $i_2$ | | |
|---|---|---|---|
| $i_1$ | 0 | 1 | 2 |
| 0-31 | $W^{(2)}_{2i_{1,H}, 2i_{1,V}, 2i_{1,H}, 2i_{1,V}, 0}$ | $W^{(2)}_{2i_{1,H}, 2i_{1,V}, 2i_{1,H}, 2i_{1,V}, 1}$ | $W^{(2)}_{2i_{1,H}+1, 2i_{1,V}, 2i_{1,H}+1, 2i_{1,V}, 0}$ |
| | $i_2$ | | |
| $i_1$ | 3 | 4 | 5 |
| 0-31 | $W^{(2)}_{2i_{1,H}+1, 2i_{1,V}, 2i_{1,H}+1, 2i_{1,V}, 1}$ | $W^{(2)}_{2i_{1,H}, 2i_{1,V}+1, 2i_{1,H}, 2i_{1,V}+1, 0}$ | $W^{(2)}_{2i_{1,H}, 2i_{1,V}+1, 2i_{1,H}, 2i_{1,V}+1, 1}$ |
| | $i_2$ | | |
| $i_1$ | 6 | 7 | 8 |
| 0-31 | $W^{(2)}_{2i_{1,H}+1, 2i_{1,V}+1, 2i_{1,H}+1, 2i_{1,V}+1, 0}$ | $W^{(2)}_{2i_{1,H}+1, 2i_{1,V}+1, 2i_{1,H}+1, 2i_{1,V}+1, 1}$ | $W^{(2)}_{2i_{1,H}, 2i_{1,V}, 2i_{1,H}+8, 2i_{1,V}+4, 0}$ |
| | $i_2$ | | |
| $i_1$ | 9 | 10 | 11 |
| 0-31 | $W^{(2)}_{2i_{1,H}, 2i_{1,V}, 2i_{1,H}+8, 2i_{1,V}+4, 1}$ | $W^{(2)}_{2i_{1,H}+1, 2i_{1,V}, 2i_{1,H}+9, 2i_{1,V}+4, 0}$ | $W^{(2)}_{2i_{1,H}+1, 2i_{1,V}, 2i_{1,H}+9, 2i_{1,V}+4, 1}$ |
| | $i_2$ | | |
| | 12 | 13 | 14 |
| | $W^{(2)}_{2i_{1,H}, 2i_{1,V}+1, 2i_{1,H}+8, 2i_{1,V}+5, 0}$ | $W^{(2)}_{2i_{1,H}, 2i_{1,V}+1, 2i_{1,H}+8, 2i_{1,V}+5, 1}$ | $W^{(2)}_{2i_{1,H}+1, 2i_{1,V}+1, 2i_{1,H}+9, 2i_{1,V}+5, 0}$ |
| | | | $i_2$ |
| | | $i_1$ | 15 |
| | | 0-31 | $W^{(2)}_{2i_{1,H}+1, 2i_{1,V}+1, 2i_{1,H}+9, 2i_{1,V}+5, 1}$ |

where $W^{(2)}_{m_H, m_V, m'_H, m'_V, n} = \frac{1}{4}\begin{bmatrix} \mathrm{v}_{m_H} \otimes \mathrm{v}_{m_V} & \mathrm{v}_{m'_H} \otimes \mathrm{v}_{m'_V} \\ \varphi_n \mathrm{v}_{m_H} \otimes \mathrm{vmv}_{V} & -\varphi_n \mathrm{v}_{m'_H} \otimes \mathrm{v}_{m'_V} \end{bmatrix}$

| $i_1$ | $i_{1,H}$ | $i_{1,V}$ |
|---|---|---|
| 0-7 | 0-7 | 0 |
| 8-15 | 0-7 | 1 |
| 16-23 | 0-7 | 2 |
| 24-31 | 0-7 | 3 |

Tables 11-1 to 11-3: Two rank 2 codebook tables for $N_1=8$, $N_2=2$, $o_1=o_2=4$

TABLE 11-1

| A first beam group type (type 1) | | | | |
|---|---|---|---|---|
| | $i_2$ | | | |
| $i_1$ | 0 | 1 | 2 | 3 |
| 0-31 | $W_{2i_{1,H}, 2i_{1,V}, 2i_{1,H}, 2i_{1,V}, 0}^{(2)}$ | $W_{2i_{1,H}, 2i_{1,V}, 2i_{1,H}, 2i_{1,V}, 1}^{(2)}$ | $W_{2i_{1,H}+1, 2i_{1,V}, 2i_{1,H}+1, 2i_{1,V}, 0}^{(2)}$ | $W_{2i_{1,H}+1, 2i_{1,V}, 2i_{1,H}+1, 2i_{1,V}, 1}^{(2)}$ |
| | $i_2$ | | | |
| $i_1$ | 4 | 5 | 6 | 7 |
| 0-31 | $W_{2i_{1,H}, 2i_{1,V}+1, 2i_{1,H}, 2i_{1,V}+1, 0}^{(2)}$ | $W_{2i_{1,H}, 2i_{1,V}+1, 2i_{1,H}, 2i_{1,V}+1, 1}^{(2)}$ | $W_{2i_{1,H}+1, 2i_{1,V}+1, 2i_{1,H}+1, 2i_{1,V}+1, 0}^{(2)}$ | $W_{2i_{1,H}+1, 2i_{1,V}+1, 2i_{1,H}+1, 2i_{1,V}+1, 1}^{(2)}$ |

where $W^{(2)}_{m_H,m_V,m'_H,m'_V,n} = \frac{1}{4}\begin{bmatrix} v_{m_H}\otimes v_{m_V} & v_{m'_H}\otimes v_{m'_V} \\ \varphi_n v_{m_H}\otimes v_{m_V} & -\varphi_n v_{m'_H}\otimes v_{m'_V} \end{bmatrix}$

TABLE 11-2

| A second beam group type (type 4 Alt 1) | | | | |
|---|---|---|---|---|
| | $i_2$ | | | |
| $i_1$ | 0 | 1 | 2 | 3 |
| Method 1: 0-15 Method 2: 32-47 | $W_{2i_{1,H}, 2i_{1,V}, 2i_{1,H}+8, 2i_{1,V}+4, 0}^{(2)}$ | $W_{2i_{1,H}, 2i_{1,V}, 2i_{1,H}+8, 2i_{1,V}+4, 1}^{(2)}$ | $W_{2i_{1,H}+1, 2i_{1,V}, 2i_{1,H}+9, 2i_{1,V}+4, 0}^{(2)}$ | $W_{2i_{1,H}+1, 2i_{1,V}, 2i_{1,H}+9, 2i_{1,V}+4, 1}^{(2)}$ |
| | $i_2$ | | | |
| $i_1$ | 4 | 5 | 6 | 7 |
| Method 1: 0-15 Method 2: 32-47 | $W_{2i_{1,H}, 2i_{1,V}+1, 2i_{1,H}+8, 2i_{1,V}+5, 0}^{(2)}$ | $W_{2i_{1,H}, 2i_{1,V}+1, 2i_{1,H}+8, 2i_{1,V}+5, 1}^{(2)}$ | $W_{2i_{1,H}+1, 2i_{1,V}+1, 2i_{1,H}+9, 2i_{1,V}+5, 0}^{(2)}$ | $W_{2i_{1,H}+1, 2i_{1,V}+1, 2i_{1,H}+9, 2i_{1,V}+5, 1}^{(2)}$ |

where $W^{(2)}_{m_H,m_V,m'_H,m'_V,n} = \frac{1}{4}\begin{bmatrix} v_{m_H}\otimes v_{m_V} & v_{m'_H}\otimes v_{m'_V} \\ \varphi_n v_{m_H}\otimes v_{m_V} & -\varphi_n v_{m'_H}\otimes v_{m'_V} \end{bmatrix}$

TABLE 11-3

| $i_1$ to $(i_{1H}, i_{1V})$ mapping | | | |
|---|---|---|---|
| Method 1 $i_1$ (in each table) | Method 2 $i_1$ (across the two tables) | $i_{1,H}$ | $i_{1,V}$ |
| 0-7 (the first table/beam group) | 0-7 | 0-7 | 0 |
| 8-15 (the first table/beam group) | 8-15 | 0-7 | 1 |
| 16-23 (the first table/beam group) | 16-23 | 0-7 | 2 |
| 24-31 (the first table/beam group) | 24-31 | 0-7 | 3 |
| 0-7 (the second table/beam group) | 32-39 | 0-7 | 0 |
| 8-15 (the second table/beam group) | 40-47 | 0-7 | 1 |

Tables 12-1 to 12-3: Three rank 2 codebook tables for $N_1=8$, $N_2=2$, $o_1=o_2=4$

TABLE 12-1

| A first beam group type (type 1) | | | | |
|---|---|---|---|---|
| | $i_2$ | | | |
| $i_1$ | 0 | 1 | 2 | 3 |
| 0-31 | $W_{2i_{1,H}, 2i_{1,V}, 2i_{1,H}, 2i_{1,V}, 0}^{(2)}$ | $W_{2i_{1,H}, 2i_{1,V}, 2i_{1,H}, 2i_{1,V}, 1}^{(2)}$ | $W_{2i_{1,H}+1, 2i_{1,V}, 2i_{1,H}+1, 2i_{1,V}, 0}^{(2)}$ | $W_{2i_{1,H}+1, 2i_{1,V}, 2i_{1,H}+1, 2i_{1,V}, 1}^{(2)}$ |
| | $i_2$ | | | |
| $i_1$ | 4 | 5 | 6 | 7 |
| 0-31 | $W_{2i_{1,H}, 2i_{1,V}+1, 2i_{1,H}, 2i_{1,V}+1, 0}^{(2)}$ | $W_{2i_{1,H}, 2i_{1,V}+1, 2i_{1,V}+1, 1}^{(2)}$ | $W_{2i_{1,H}+1, 2i_{1,V}+1, 2i_{1,H}+1, 2i_{1,V}+1, 0}^{(2)}$ | $W_{2i_{1,H}+1, 2i_{1,V}+1, 2i_{1,H}+1, 2i_{1,V}+1, 1}^{(2)}$ |

where $W_{m_H,m_V,m'_H,m'_V,n}^{(2)} = \frac{1}{4}\begin{bmatrix} v_{m_H} \otimes v_{m_V} & v_{m'_H} \otimes v_{m'_V} \\ \varphi_n v_{m_H} \otimes v_{m_V} & -\varphi_n v_{m'_H} \otimes v_{m'_V} \end{bmatrix}$

TABLE 12-2

| A second beam group type (type 4 Alt 1) | | | | |
|---|---|---|---|---|
| | $i_2$ | | | |
| $i_1$ | 0 | 1 | 2 | 3 |
| Method 1: 0-15 Method 2: 32-47 | $W_{2i_{1,H}, 2i_{1,V}, 2i_{1,H}+4, 2i_{1,V}+4, 0}^{(2)}$ | $W_{2i_{1,H}, 2i_{1,V}, 2i_{1,H}+4, 2i_{1,V}+1, 1}^{(2)}$ | $W_{2i_{1,H}+1, 2i_{1,V}, 2i_{1,H}+5, 2i_{1,V}+4, 0}^{(2)}$ | $W_{2i_{1,H}+1, 2i_{1,V}, 2i_{1,H}+5, 2i_{1,V}+4, 1}^{(2)}$ |
| | $i_2$ | | | |
| $i_1$ | 4 | 5 | 6 | 7 |
| Method 1: 0-15 Method 2: 32-47 | $W_{2i_{1,H}, 2i_{1,V}+1, 2i_{1,H}+4, 2i_{1,V}+5, 0}^{(2)}$ | $W_{2i_{1,H}, 2i_{1,V}+1, 2i_{1,H}+4, 2i_{1,V}+5, 1}^{(2)}$ | $W_{2i_{1,H}+1, 2i_{1,V}+1, 2i_{1,H}+5, 2i_{1,V}+5, 0}^{(2)}$ | $W_{2i_{1,H}+1, 2i_{1,V}+1, 2i_{1,H}+5, 2i_{1,V}+5, 1}^{(2)}$ |

where $W_{m_H,m_V,m'_H,m'_V,n}^{(2)} = \frac{1}{4}\begin{bmatrix} v_{m_H} \otimes v_{m_V} & v_{m'_H} \otimes v_{m'_V} \\ \varphi_n v_{m_H} \otimes v_{m_V} & -\varphi_n v_{m'_H} \otimes v_{m'_V} \end{bmatrix}$

TABLE 12-3

| A third beam group type (type 4 Alt 2) | | | | |
|---|---|---|---|---|
| | $i_2$ | | | |
| $i_1$ | 0 | 1 | 2 | 3 |
| Method 1: 0-15 Method 2: 48-63 | $W_{2i_{1,H}, 2i_{1,V}, 2i_{1,H}+12, 2i_{1,V}+4, 0}^{(2)}$ | $W_{2i_{1,H}, 2i_{1,V}, 2i_{1,H}+12, 2i_{1,V}+4, 1}^{(2)}$ | $W_{2i_{1,H}+1, 2i_{1,V}, 2i_{1,H}+13, 2i_{1,V}+4, 0}^{(2)}$ | $W_{2i_{1,H}+1, 2i_{1,V}, 2i_{1,H}+13, 2i_{1,V}+4, 1}^{(2)}$ |
| | $i_2$ | | | |
| $i_1$ | 4 | 5 | 6 | 7 |
| Method 1: 0-15 Method 2: 48-63 | $W_{2i_{1,H}, 2i_{1,V}+1, 2i_{1,H}+12, 2i_{1,V}+5, 0}^{(2)}$ | $W_{2i_{1,H}, 2i_{1,V}+1, 2i_{1,H}+12, 2i_{1,V}+5, 1}^{(2)}$ | $W_{2i_{1,H}+1, 2i_{1,V}+1, 2i_{1,H}+13, 2i_{1,V}+5, 0}^{(2)}$ | $W_{2i_{1,H}+1, 2i_{1,V}+1, 2i_{1,H}+13, 2i_{1,V}+5, 1}^{(2)}$ |

where $W_{m_H,m_V,m'_H,m'_V,n}^{(2)} = \frac{1}{4}\begin{bmatrix} v_{m_H} \otimes v_{m_V} & v_{m'_H} \otimes v_{m'_V} \\ \varphi_n v_{m_H} \otimes v_{m_V} & -\varphi_n v_{m'_H} \otimes v_{m'_V} \end{bmatrix}$

TABLE 12-4

| $i_1$ to $(i_{1,H}, i_{1,V})$ mapping | | | |
|---|---|---|---|
| Method 1 $i_1$ (in each table) | Method 2 $i_1$ (across the three tables) | $i_{1,H}$ | $i_{1,V}$ |
| 0-7 (the first table/beam group) | 0-7 | 0-7 | 0 |
| 8-15 (the first table/beam group) | 8-15 | 0-7 | 1 |
| 16-23 (the first table/beam group) | 16-23 | 0-7 | 2 |
| 24-31 (the first table/beam group) | 24-31 | 0-7 | 3 |
| 0-7 (the second table/beam group) | 32-39 | 0-7 | 0 |
| 8-15 (the second table/beam group) | 40-47 | 0-7 | 1 |

TABLE 12-4-continued

| $i_1$ to $(i_{1,H}, i_{1,V})$ mapping | | | |
|---|---|---|---|
| Method 1 $i_1$ (in each table) | Method 2 $i_1$ (across the three tables) | $i_{1,H}$ | $i_{1,V}$ |
| 0-7 (the third table/beam group) | 48-55 | 0-7 | 0 |
| 8-15 (the third table/beam group) | 56-63 | 0-7 | 1 |

Table 13-1 to 13-4: Three rank 2 codebook tables for $N_1=8$, $N_2=2$, $o_1=o_2=4$

TABLE 13-1

| A first beam group type (type 1) | | | | |
|---|---|---|---|---|
| | $i_2$ | | | |
| $i_1$ | 0 | 1 | 2 | 3 |
| 0-31 | $W^{(2)}_{2i_{1,H},2i_{1,V},2i_{1,H},2i_{1,V},0}$ | $W^{(2)}_{2i_{1,H},2i_{1,V},2i_{1,H},2i_{1,V},1}$ | $W^{(2)}_{2i_{1,H}+1,2i_{1,V},2i_{1,H}+1,2i_{1,V},0}$ | $W^{(2)}_{2i_{1,H}+1,2i_{1,V},2i_{1,H}+1,2i_{1,V},1}$ |
| | $i_2$ | | | |
| $i_1$ | 4 | 5 | 6 | 7 |
| 0-31 | $W^{(2)}_{2i_{1,H},2i_{1,V}+1,2i_{1,H},2i_{1,V}+1,0}$ | $W^{(2)}_{2i_{1,H},2i_{1,V}+1,2i_{1,H},2i_{1,V}+1,1}$ | $W^{(2)}_{2i_{1,H}+1,2i_{1,V}+1,2i_{1,H}+1,2i_{1,V}+1,0}$ | $W^{(2)}_{2i_{1,H}+1,2i_{1,V}+1,2i_{1,H}+1,2i_{1,V}+1,1}$ |

where $W^{(2)}_{m_H,m_V,m'_H,m'_V,n} = \frac{1}{4}\begin{bmatrix} v_{m_H} \otimes v_{m_V} & v_{m'_H} \otimes v_{m'_V} \\ \varphi_n v_{m_H} \otimes v_{m_V} & -\varphi_n v_{m'_H} \otimes v_{m'_V} \end{bmatrix}$

TABLE 13-2

| A second beam group type (type 2 Alt 1) | | | | |
|---|---|---|---|---|
| | $i_2$ | | | |
| $i_1$ | 0 | 1 | 2 | 3 |
| Method 1: 0-15 Method 2: 32-47 | $W^{(2)}_{2i_{1,H},2i_{1,V},2i_{1,H}+8,2i_{1,V},0}$ | $W^{(2)}_{2i_{1,H},2i_{1,V},2i_{1,H}+8,2i_{1,V},1}$ | $W^{(2)}_{2i_{1,H}+1,2i_{1,V},2i_{1,H}+9,2i_{1,V},0}$ | $W^{(2)}_{2i_{1,H}+1,2i_{1,V},2i_{1,H}+92i_{1,V},1}$ |
| | $i_2$ | | | |
| $i_1$ | 4 | 5 | 6 | 7 |
| Method 1: 0-15 Method 2: 32-47 | $W^{(2)}_{2i_{1,H},2i_{1,V}+1,2i_{1,H}+8,2i_{1,V}+1,0}$ | $W^{(2)}_{2i_{1,H},2i_{1,V}+1,2i_{1,H}+8,2i_{1,V}+1,1}$ | $W^{(2)}_{2i_{1,H}+1,2i_{1,V}+1,2i_{1,H}+9,2i_{1,V}+1,0}$ | $W^{(2)}_{2i_{1,H}+1,2i_{1,V}+1,2i_{1,H}+9,2i_{1,V}+1,1}$ |

where $W^{(2)}_{m_H,m_V,m'_H,m'_V,n} = \frac{1}{4}\begin{bmatrix} v_{m_H} \otimes v_{m_V} & v_{m'_H} \otimes v_{m'_V} \\ \varphi_n v_{m_H} \otimes v_{m_V} & -\varphi_n v_{m'_H} \otimes v_{m'_V} \end{bmatrix}$

TABLE 13-3

| A third beam group type (type 4 Alt 1) | | | | |
|---|---|---|---|---|
| | $i_2$ | | | |
| $i_1$ | 0 | 1 | 2 | 3 |
| Method:1 0-15 Method 2: 48-63 | $W^{(2)}_{2i_{1,H},2i_{1,V},2i_{1,H}+8,2i_{1,V}+4,0}$ | $W^{(2)}_{2i_{1,H},2i_{1,V},2i_{1,H}+8,2i_{1,V}+4,1}$ | $W^{(2)}_{2i_{1,H}+1,2i_{1,V},2i_{1,H}+9,2i_{1,V}+4,0}$ | $W^{(2)}_{2i_{1,H}+1,2i_{1,V},2i_{1,H}+9,2i_{1,V}+4,1}$ |

TABLE 13-3-continued

| $i_1$ | $i_2$ = 4 | 5 | 6 | 7 |
|---|---|---|---|---|
| Method:1 0-15 Method 2: 48-63 | $W^{(2)}_{2i_{1,H},2i_{1,V}+1,2i_{1,H}+8,2i_{1,V}+5,0}$ | $W^{(2)}_{2i_{1,H},2i_{1,V}+1,2i_{1,H}+8,2i_{1,V}+5,1}$ | $W^{(2)}_{2i_{1,H}+1,2i_{1,V}+1,2i_{1,H}+9,2i_{1,V}+5,0}$ | $W^{(2)}_{2i_{1,H}+1,2i_{1,V}+1,2i_{1,H}+9,2i_{1,V}+5,1}$ |

where $W^{(2)}_{m_H,m_V,m'_H,m'_V,n} = \frac{1}{4}\begin{bmatrix} v_{m_H}\otimes v_{m_V} & v_{m'_H}\otimes v_{m'_V} \\ \varphi_n v_{m_H}\otimes v_{m_V} & -\varphi_n v_{m'_H}\otimes v_{m'_V} \end{bmatrix}$

TABLE 13-4

$i_1$ to $(i_{1H}, i_{1V})$ mapping

| Method 1 $i_1$ (in each table) | Method 2 $i_1$ (across the three tables) | $i_{1,H}$ | $i_{1,V}$ |
|---|---|---|---|
| 0-7 (the first table/beam group) | 0-7 | 0-7 | 0 |
| 8-15 (the first table/beam group) | 8-15 | 0-7 | 1 |
| 16-23 (the first table/beam group) | 16-23 | 0-7 | 2 |
| 24-31 (the first table/beam group) | 24-31 | 0-7 | 3 |
| 0-3 (the second table/beam group) | 32-35 | 0-3 | 0 |
| 4-7 (the second table/beam group) | 36-39 | 0-3 | 1 |

TABLE 13-4-continued $i_1$ to $(i_{1H}, i_{1V})$ mapping

| Method 1 $i_1$ (in each table) | Method 2 $i_1$ (across the three tables) | $i_{1,H}$ | $i_{1,V}$ |
|---|---|---|---|
| 8-11 (the second table/beam group) | 40-43 | 0-3 | 2 |
| 12-15 (the second table/beam group) | 44-47 | 0-3 | 3 |
| 0-7 (the third table/beam group) | 48-55 | 0-7 | 0 |
| 8-15 (the third table/beam group) | 56-63 | 0-7 | 1 |

TABLE 14-1

A first beam group type (type 1)

| $i_1$ | $i_2$ = 0 | 1 | 2 | 3 |
|---|---|---|---|---|
| 0-31 | $W^{(2)}_{2i_{1,H},2i_{1,V}2i_{1,H},2i_{1,V},0}$ | $W^{(2)}_{2i_{1,H},2i_{1,V},2i_{1,H},2i_{1,V},1}$ | $W^{(2)}_{2i_{1,H}+1,2i_{1,V},2i_{1,H}+1,2i_{1,V},0}$ | $W^{(2)}_{2i_{1,H}+1,2i_{1,V},2i_{1,H}+1,2i_{1,V},1}$ |

| $i_1$ | $i_2$ = 4 | 5 | 6 | 7 |
|---|---|---|---|---|
| 0-31 | $W^{(2)}_{2i_{1,H},2i_{1,V}+1,2i_{1,H},2i_{1,V}+1,0}$ | $W^{(2)}_{2i_{1,H},2i_{1,V}+1,2i_{1,H},2i_{1,V}+1,1}$ | $W^{(2)}_{2i_{1,H}+1,2i_{1,V}+1,2i_{1,H}+1,2i_{1,V}+1,0}$ | $W^{(2)}_{2i_{1,H}+1,2i_{1,V}+1,2i_{1,H}+1,2i_{1,V}+1,1}$ |

where $W^{(2)}_{m_H,m_V,m'_H,m'_V,n} = \frac{1}{4}\begin{bmatrix} v_{m_H}\otimes v_{m_V} & v_{m'_H}\otimes v_{m'_V} \\ \varphi_n v_{m_H}\otimes v_{m_V} & -\varphi_n v_{m'_H}\otimes v_{m'_V} \end{bmatrix}$

TABLE 14-2

A second beam group type (type 3 Alt 1)

| $i_1$ | $i_2$ = 0 | 1 | 2 | 3 |
|---|---|---|---|---|
| Method 1: 0-15 Method 2: 32-47 | $W^{(2)}_{2i_{1,H},2i_{1,V},2i_{1,H},2i_{1,V}+4,0}$ | $W^{(2)}_{2i_{1,H},2i_{1,V},2i_{1,H},2i_{1,V}+4,1}$ | $W^{(2)}_{2i_{1,H}+1,2i_{1,V},2i_{1,H}+1,2i_{1,V}+4,0}$ | $W^{(2)}_{2i_{1,H}+1,2i_{1,V},2i_{1,H}+1,2i_{1,V}+4,1}$ |

| $i_1$ | $i_2$ = 4 | 5 | 6 | 7 |
|---|---|---|---|---|
| Method 1: 0-15 Method 2: 32-47 | $W^{(2)}_{2i_{1,H},2i_{1,V}+1,2i_{1,H},2i_{1,V}+5,0}$ | $W^{(2)}_{2i_{1,H},2i_{1,V}+1,2i_{1,H},2i_{1,H},2i_{1,V}+5,1}$ | $W^{(2)}_{2i_{1,H}+1,2i_{1,V}+1,2i_{1,H}+1,2i_{1,V}+5,0}$ | $W^{(2)}_{2i_{1,H}+1,2i_{1,V}+12i_{1,H}+12i_{1,V}+5,1}$ |

where $W^{(2)}_{m_H,m_V,m'_H,m'_V,n} = \frac{1}{4}\begin{bmatrix} v_{m_H}\otimes v_{m_V} & v_{m'_H}\otimes v_{m'_V} \\ \varphi_n v_{m_H}\otimes v_{m_V} & -\varphi_n v_{m'_H}\otimes v_{m'_V} \end{bmatrix}$

TABLE 14-3

| A third beam group type (type 4 Alt 1) | | | | |
|---|---|---|---|---|
| | $i_2$ | | | |
| $i_1$ | 0 | 1 | 2 | 3 |
| Method 1: 0-15 Method 2: 48-63 | $W^{(2)}_{2i_{1,H},2i_{1,V},2i_{1,H}+8,2i_{1,V}+4,0}$ | $W^{(2)}_{2i_{1,H},2i_{1,V},2i_{1,H}+8,2i_{1,V}+4,1}$ | $W^{(2)}_{2i_{1,H}+1,2i_{1,V},2i_{1,H}+9,2i_{1,V}+4,0}$ | $W^{(2)}_{2i_{1,H}+1,2i_{1,V},2i_{1,H}+9,2i_{1,V}+4,1}$ |
| | $i_2$ | | | |
| $i_1$ | 4 | 5 | 6 | 7 |
| Method 1: 0-15 Method 2: 48-63 | $W^{(2)}_{2i_{1,H},2i_{1,V}+1,2i_{1,H}+8,2i_{1,V}+5,0}$ | $W^{(2)}_{2i_{1,H},2i_{1,V}+1,2i_{1,H}+8,2i_{1,V}+5,1}$ | $W^{(2)}_{2i_{1,H}+1,2i_{1,V}+1,2i_{1,H}+9,2i_{1,V}+5,0}$ | $W^{(2)}_{2i_{1,H}+1,2i_{1,V}+1,2i_{1,H}+9,2i_{1,V}+5,1}$ |

where $W^{(2)}_{m_H,m_V,m'_H,m'_V,n} = \frac{1}{4}\begin{bmatrix} v_{m_H} \otimes v_{m_V} & v_{m'_H} \otimes v_{m'_V} \\ \varphi_n v_{m_H} \otimes v_{m_V} & -\varphi_n v_{m'_H} \otimes v_{m'_V} \end{bmatrix}$

TABLE 14-4

| $i_1$ to $(i_{1,H}, i_{1,V})$ mapping | | | |
|---|---|---|---|
| Method 1 $i_1$ (in each table) | Method 2 $i_1$ (across the three tables) | $i_{1,H}$ | $i_{1,V}$ |
| 0-7 (the first table/beam group) | 0-7 | 0-7 | 0 |
| 8-15 (the first table/beam group) | 8-15 | 0-7 | 1 |
| 16-23 (the first table/beam group) | 16-23 | 0-7 | 2 |
| 24-31 (the first table/beam group) | 24-31 | 0-7 | 3 |
| 0-7 (the second table/beam group) | 32-39 | 0-7 | 0 |
| 8-15 (the second table/beam group) | 40-47 | 0-7 | 1 |

TABLE 14-4-continued

| $i_1$ to $(i_{1,H}, i_{1,V})$ mapping | | | |
|---|---|---|---|
| Method 1 $i_1$ (in each table) | Method 2 $i_1$ (across the three tables) | $i_{1,H}$ | $i_{1,V}$ |
| 0-7 (the third table/beam group) | 48-55 | 0-7 | 0 |
| 8-15 (the third table/beam group) | 56-63 | 0-7 | 1 |

Tables 15-1 to 15-4 Three rank 2 codebook tables for $N_1=8$, $N_2=2$, $o_1=o_2=4$

TABLE 15-1

| A first beam group type (type 1) | | | | |
|---|---|---|---|---|
| | $i_2$ | | | |
| $i_1$ | 0 | 1 | 2 | 3 |
| 0-31 | $W^{(2)}_{2i_{1,H},2i_{1,V},2i_{1,H},2i_{1,V},0}$ | $W^{(2)}_{2i_{1,H},2i_{1,V},2i_{1,H},2i_{1,V},1}$ | $W^{(2)}_{2i_{1,H}+1,2i_{1,V},2i_{1,H}+1,2i_{1,V},0}$ | $W^{(2)}_{2i_{1,H}+1,2i_{1,V},2i_{1,H}+1,2i_{1,V},1}$ |
| | $i_2$ | | | |
| $i_1$ | 4 | 5 | 6 | 7 |
| 0-31 | $W^{(2)}_{2i_{1,H},2i_{1,V}+1,2i_{1,H},2i_{1,V}+1,0}$ | $W^{(2)}_{2i_{1,H},2i_{1,V}+1,2i_{1,H},2i_{1,V}+1,1}$ | $W^{(2)}_{2i_{1,H}+1,2i_{1,V}+1,2i_{1,H}+1,2i_{1,V}+1,0}$ | $W^{(2)}_{2i_{1,H}+1,2i_{1,V}+1,2i_{1,H}+12i_{1,V}+1,1}$ |

where $W^{(2)}_{m_H,m_V,m'_H,m'_V,n} = \frac{1}{4}\begin{bmatrix} v_{m_H} \otimes v_{m_V} & v_{m'_H} \otimes v_{m'_V} \\ \varphi_n v_{m_H} \otimes v_{m_V} & -\varphi_n v_{m'_H} \otimes v_{m'_V} \end{bmatrix}$

TABLE 15-2

| A second beam group type (type 2 Alt 1) | | | | |
|---|---|---|---|---|
| | $i_2$ | | | |
| $i_1$ | 0 | 1 | 2 | 3 |
| Method 1: 0-15 Method 2: 32-47 | $W^{(2)}_{2i_{1,H},2i_{1,V},2i_{1,H}+8,2i_{1,V},0}$ | $W^{(2)}_{2i_{1,H},2i_{1,V},2i_{1,H}+8,2i_{1,V},1}$ | $W^{(2)}_{2i_{1,H}+1,2i_{1,V},2i_{1,H}+9,2i_{1,V},0}$ | $W^{(2)}_{2i_{1,H}+1,2i_{1,V},2i_{1,H}+9,2i_{1,V},1}$ |

TABLE 15-2-continued

| $i_1$ | $i_2$: 4 | 5 | 6 | 7 |
|---|---|---|---|---|
| Method 1: 0-15 Method 2: 32-47 | $W^{(2)}_{2i_{1,H},2i_{1,V}+1,2i_{1,H}+8,2i_{1,V}+1,0}$ | $W^{(2)}_{2i_{1,H},2i_{1,V}+1,2i_{1,H}+8,2i_{1,V}+1,1}$ | $W^{(2)}_{2i_{1,H}+1,2i_{1,V}+1,2i_{1,H}+9,2i_{1,V}+1,0}$ | $W^{(2)}_{2i_{1,H}+1,2i_{1,V}+1,2i_{1,H}+9,2i_{1,V}+1,1}$ |

where $W^{(2)}_{m_H,m_V,m'_H,m'_V,n} = \frac{1}{4}\begin{bmatrix} v_{m_H} \otimes v_{m_V} & v_{m'_H} \otimes v_{m'_V} \\ \varphi_n v_{m_H} \otimes v_{m_V} & -\varphi_n v_{m'_H} \otimes v_{m'_V} \end{bmatrix}$

TABLE 15-3

A third beam group type (type 3 Alt 1)

| $i_1$ | $i_2$: 0 | 1 | 2 | 3 |
|---|---|---|---|---|
| Method 1: 0-15 Method 2: 48-63 | $W^{(2)}_{2i_{1,H},2i_{1,V},2i_{1,H},2i_{1,V}+4,0}$ | $W^{(2)}_{2i_{1,H},2i_{1,V},2i_{1,H},2i_{1,V}+4,1}$ | $W^{(2)}_{2i_{1,H}+1,2i_{1,V},2i_{1,H}+1,2i_{1,V}+4,0}$ | $W^{(2)}_{2i_{1,H}+1,2i_{1,V},2i_{1,H}+1,2i_{1,V}+4,1}$ |
| $i_1$ | $i_2$: 4 | 5 | 6 | 7 |
| Method 1: 0-15 Method 2: 48-63 | $W^{(2)}_{2i1,H,2i1,V+1,2i1,H,2i1,V+5,0}$ | $W^{(2)}_{2i1,H,2i1,V+1,2i1,H,2i1,V+5,1}$ | $W^{(2)}_{2i1,H+1,2i1,V+1,2i1,H+1,2i1,V+5,0}$ | $W^{(2)}_{2i1,H+1,2i1,V+1,2i1,H+1,2i1,V+5,1}$ |

where $W^{(2)}_{m_H,m_V,m'_H,m'_V,n} = \frac{1}{4}\begin{bmatrix} v_{m_H} \otimes v_{m_V} & v_{m'_H} \otimes v_{m'_V} \\ \varphi_n v_{m_H} \otimes v_{m_V} & -\varphi_n v_{m'_H} \otimes v_{m'_V} \end{bmatrix}$

TABLE 15-4

$i_1$ to $(i_{1,H}, i_{1,V})$ mapping

| Method 1 $i_1$ (in each table) | Method 2 $i_1$ (across the three tables) | $i_{1,H}$ | $i_{1,V}$ |
|---|---|---|---|
| 0-7 (the first table/beam group) | 0-7 | 0-7 | 0 |
| 8-15 (the first table/beam group) | 8-15 | 0-7 | 1 |
| 16-23 (the first table/beam group) | 16-23 | 0-7 | 2 |
| 24-31 (the first table/beam group) | 24-31 | 0-7 | 3 |
| 0-3 (the second table/beam group) | 32-35 | 0-3 | 0 |
| 4-7 (the second table/beam group) | 36-39 | 0-3 | 1 |

TABLE 15-4-continued $i_1$ to $(i_{1,H}, i_{1,V})$ mapping

| Method 1 $i_1$ (in each table) | Method 2 $i_1$ (across the three tables) | $i_{1,H}$ | $i_{1,V}$ |
|---|---|---|---|
| 8-11 (the second table/beam group) | 40-43 | 0-3 | 2 |
| 12-15 (the second table/beam group) | 44-47 | 0-3 | 3 |
| 0-7 (the third table/beam group) | 48-55 | 0-7 | 0 |
| 8-15 (the third table/beam group) | 56-63 | 0-7 | 1 |

TABLE 19

Master codebook for 2 layer CSI reporting for $L_1 = L_2 = 4$ (Option 1)

| | | |
|---|---|---|
| $i_2$ | 0 | 1 |
| Precoder | $W_{s_1 i_{1,H},\ s_2 i_{1,V},\ s_1 i_{1,H},\ s_2 i_{1,V},\ 0}^{(2)}$ | $W_{s_1 i_{1,H},\ s_2 i_{1,V},\ s_1 i_{1,H},\ s_2 i_{1,V},\ 1}^{(2)}$ |
| $i_2$ | 4 | 5 |
| Precoder | $W_{s_1 i_{1,H},\ s_2 i_{1,V}+2p_2,\ s_1 i_{1,H},\ s_2 i_{1,V}+2p_2,\ 0}^{(2)}$ | $W_{s_1 i_{1,H},\ s_2 i_{1,V}+2p_2,\ s_1 i_{1,H},\ s_2 i_{1,V}+2p_2,\ 1}^{(2)}$ |
| $i_2$ | 8-15 | |
| Precoder | Entries 8-15 constructed with replacing the first and third subscripts $s_1 i_{1,H}$ with $s_1 i_{1,H} + p_1$ in entries 0-15. | |

TABLE 19-continued

| Master codebook for 2 layer CSI reporting for $L_1 = L_2 = 4$ (Option 1) | | |
|---|---|---|
| $i_2$ | 16-23 | |
| Precoder | Entries 16-23 constructed with replacing the first and third subscripts $s_1 i_{1,H}$ with $s_1 i_{1,H} + 2p_1$ in entries 0-15. | |
| $i_2$ | 24-31 | |
| Precoder | Entries 24-31 constructed with replacing the first and third subscripts $s_1 i_{1,H}$ with $s_1 i_{1,H} + 3p_1$ in entries 0-15. | |
| $i_2$ | 32 | 33 |
| Precoder | $W_{s_1 i_{1,H},\, s_2 i_{1,V},\, s_1 i_{1,H},\, s_2 i_{1,V}+p_2,\, 0}^{(2)}$ | $W_{s_1 i_{1,H},\, s_2 i_{1,V},\, s_1 i_{1,H},\, s_2 i_{1,V}+p_2,\, 1}^{(2)}$ |
| $i_2$ | 36 | 37 |
| Precoder | $W_{s_1 i_{1,H},\, s_2 i_{1,V},\, s_1 i_{1,H},\, s_2 i_{1,V}+3p_2,\, 0}^{(2)}$ | $W_{s_1 i_{1,H},\, s_2 i_{1,V},\, s_1 i_{1,H},\, s_2 i_{1,V}+3p_2,\, 1}^{(2)}$ |
| $i_2$ | 40 | 41 |
| Precoder | $W_{s_1 i_{1,H},\, s_2 i_{1,V},\, s_1 i_{1,H},\, s_2 i_{1,V}+2p_2,\, 0}^{(2)}$ | $W_{s_1 i_{1,H},\, s_2 i_{1,V},\, s_1 i_{1,H},\, s_2 i_{1,V}+2p_2,\, 1}^{(2)}$ |
| $i_2$ | 44-55 | |
| Precoder | Entries 44-55 constructed with replacing the first and third subscripts $s_1 i_{1,H}$ with $s_1 i_{1,H} + p_1$ in entries 32-43. | |
| $i_2$ | 56-67 | |
| Precoder | Entries 55-67 constructed with replacing the first and third subscripts $s_1 i_{1,H}$ with $s_1 i_{1,H} + 2p_1$ in entries 32-43. | |
| $i_2$ | 68-79 | |
| Precoder | Entries 68-79 constructed with replacing the first and third subscripts $s_1 i_{1,H}$ with $s_1 i_{1,H} + 3p_1$ in entries 32-43. | |
| $i_2$ | 80-127 | |
| Precoder | Entries 80-127 constructed similar to entries 32-79 in the other dimension. | |
| $i_2$ | 128 | 129 |
| Precoder | $W_{s_1 i_{1,H},\, s_2 i_{1,V},\, s_1 i_{1,H}+p_1,\, s_2 i_{1,V}+p_2,\, 0}^{(2)}$ | $W_{s_1 i_{1,H},\, s_2 i_{1,V},\, s_1 i_{1,H}+p_1,\, s_2 i_{1,V}+p_2,\, 1}^{(2)}$ |
| $i_2$ | 132 | 133 |
| Precoder | $W_{s_1 i_{1,H},\, s_2 i_{1,V}+2p_2,\, s_1 i_{1,H}+p_1,\, s_2 i_{1,V}+3p_2,\, 0}^{(2)}$ | $W_{s_1 i_{1,H},\, s_2 i_{1,V}+2p_2,\, s_1 i_{1,H}+p_1,\, s_2 i_{1,V}+3p_2,\, 1}^{(2)}$ |
| $i_2$ | 136-159 | |
| Precoder | Entries 136-159 constructed similar to entries 128-135 by considering remaining +45 degree closest diagonal pairs. | |
| $i_2$ | 160-191 | |
| Precoder | Entries 160-191 constructed similar to entries 128-159 by considering −45 degree closest diagonal pairs. | |
| $i_2$ | 2 | 3 |
| Precoder | $W_{s_1 i_{1,H},\, s_2 i_{1,V}+p_2,\, s_1 i_{1,H},\, s_2 i_{1,V}+p_2,\, 0}^{(2)}$ | $W_{s_1 i_{1,H},\, s_2 i_{1,V}+p_2,\, s_1 i_{1,H},\, s_2 i_{1,V}+p_2,\, 1}^{(2)}$ |
| $i_2$ | 6 | 7 |
| Precoder | $W_{s_1 i_{1,H},\, s_2 i_{1,V}+3p_2,\, s_1 i_{1,H},\, s_2 i_{1,V}+3p_2,\, 0}^{(2)}$ | $W_{s_1 i_{1,H},\, s_2 i_{1,V}+3p_2,\, s_1 i_{1,H},\, s_2 i_{1,V}+3p_2,\, 1}^{(2)}$ |
| $i_2$ | 8-15 | |
| Precoder | Entries 8-15 constructed with replacing the first and third subscripts $s_1 i_{1,H}$ with $s_1 i_{1,H} + p_1$ in entries 0-15. | |
| $i_2$ | 16-23 | |
| Precoder | Entries 16-23 constructed with replacing the first and third subscripts $s_1 i_{1,H}$ with $s_1 i_{1,H} + 2p_1$ in entries 0-15. | |
| $i_2$ | 24-31 | |
| Precoder | Entries 24-31 constructed with replacing the first and third subscripts $s_1 i_{1,H}$ with $s_1 i_{1,H} + 3p_1$ in entries 0-15. | |
| $i_2$ | 34 | 35 |
| Precoder | $W_{s_1 i_{1,H},\, s_2 i_{1,V}+p_2,\, s_1 i_{1,H},\, s_2 i_{1,V}+2p_2,\, 0}^{(2)}$ | $W_{s_1 i_{1,H},\, s_2 i_{1,V}+p_2,\, s_1 i_{1,H},\, s_2 i_{1,V}+2p_2,\, 1}^{(2)}$ |

TABLE 19-continued

| Master codebook for 2 layer CSI reporting for $L_1 = L_2 = 4$ (Option 1) | | |
|---|---|---|
| $i_2$ | 38 | 39 |
| Precoder | $W_{s_1 i_{1,H},\ s_2 i_{1,V}+p_2,\ s_1 i_{1,H},\ s_2 i_{1,V}+3p_2,\ 0}^{(2)}$ | $W_{s_1 i_{1,H},\ s_2 i_{1,V}+p_2,\ s_1 i_{1,H},\ s_2 i_{1,V}+3p_2,\ 1}^{(2)}$ |
| $i_2$ | 42 | 43 |
| Precoder | $W_{s_1 i_{1,H},\ s_2 i_{1,V}+2p_2,\ s_1 i_{1,H},\ s_2 i_{1,V}+3p_2,\ 0}^{(2)}$ | $W_{s_1 i_{1,H},\ s_2 i_{1,V}+2p_2,\ s_1 i_{1,H},\ s_2 i_{1,V}+3p_2,\ 1}^{(2)}$ |
| $i_2$ | 44-55 | |
| Precoder | Entries 44-55 constructed with replacing the first and third subscripts $s_1 i_{1,H}$ with $s_1 i_{1,H} + p_1$ in entries 32-43. | |
| $i_2$ | 56-67 | |
| Precoder | Entries 55-67 constructed with replacing the first and third subscripts $s_1 i_{1,H}$ with $s_1 i_{1,H} + 2p_1$ in entries 32-43. | |
| $i_2$ | 68-79 | |
| Precoder | Entries 68-79 constructed with replacing the first and third subscripts $s_1 i_{1,H}$ with $s_1 i_{1,H} + 3p_1$ in entries 32-43. | |
| $i_2$ | 80-127 | |
| Precoder | Entries 80-127 constructed similar to entries 32-79 in the other dimension. | |
| $i_2$ | 130 | 131 |
| Precoder | $W_{s_1 i_{1,H},\ s_2 i_{1,V}+p_2,\ s_1 i_{1,H}+p_1,\ s_2 i_{1,V}+2p_2,\ 0}^{(2)}$ | $W_{s_1 i_{1,H},\ s_2 i_{1,V}+p_2,\ s_1 i_{1,H}+p_1,\ s_2 i_{1,V}+2p_2,\ 1}^{(2)}$ |
| $i_2$ | 134 | 135 |
| Precoder | $W_{s_1 i_{1,H},\ s_2 i_{1,V}+3p_2,\ s_1 i_{1,H}+p_1,\ s_2 i_{1,V}+p_2,\ 0}^{(2)}$ | $W_{s_1 i_{1,H},\ s_2 i_{1,V}+3p_2,\ s_1 i_{1,H}+p_1,\ s_2 i_{1,V}+p_2,\ 1}^{(2)}$ |
| $i_2$ | 136-159 | |
| Precoder | Entries 136-159 constructed similar to entries 128-135 by considering remaining +45 degree closest diagonal pairs. | |
| $i_2$ | 160-191 | |
| Precoder | Entries 160-191 constructed similar to entries 128-159 by considering −45 degree closest diagonal pairs. | |

TABLE 20

| Alternate master codebook for 2 layer CSI reporting ($s_1 = s_2 = 2$ and $p_1 = p_2 = 1$) | | |
|---|---|---|
| $i_2$ | 0 | 1 |
| Precoder | $W_{2i_{1,H},\ 2i_{1,V},\ 2i_{1,H},\ 2i_{1,V},\ 0}^{(2)}$ | $W_{2i_{1,H},\ 2i_{1,V},\ 2i_{1,H},\ 2i_{1,V},\ 1}^{(2)}$ |
| $i_2$ | 4 | 5 |
| Precoder | $W_{2i_{1,H},\ 2i_{1,V}+2,\ 2i_{1,H},\ 2i_{1,V}+2,\ 0}^{(2)}$ | $W_{2i_{1,H},\ 2i_{1,V}+2,\ 2i_{1,H},\ 2i_{1,V}+2,\ 1}^{(2)}$ |
| $i_2$ | 8 | 9 |
| Precoder | $W_{2i_{1,H},\ 2i_{1,V},\ 2i_{1,H},\ 2i_{1,V}+1,\ 0}^{(2)}$ | $W_{2i_{1,H},\ 2i_{1,V},\ 2i_{1,H},\ 2i_{1,V}+1,1}^{(2)}$ |
| $i_2$ | 12 | 13 |
| Precoder | $W_{2i_{1,H},\ 2i_{1,V},\ 2i_{1,H},\ 2i_{1,V}+3,\ 0}^{(2)}$ | $W_{2i_{1,H},\ 2i_{1,V},\ 2i_{1,H},\ 2i_{1,V}+3,\ 1}^{(2)}$ |
| $i_2$ | 16 | 17 |
| Precoder | $W_{2i_{1,H}+1,2i_{1,V}+1,2i_{1,H}+1,2i_{1,V}+1,\ 0}^{(2)}$ | $W_{2i_{1,H}+1,2i_{1,V}+1,2i_{1,H}+1,2i_{1,V}+1,1}^{(2)}$ |
| $i_2$ | 20 | 21 |
| Precoder | $W_{2i_{1,H}+1,2i_{1,V},\ 2i_{1,H}+1,2i_{1,V}+1,\ 0}^{(2)}$ | $W_{2i_{1,H}+1,2i_{1,V},\ 2i_{1,H}+1,2i_{1,V}+1,1}^{(2)}$ |
| $i_2$ | 24 | 25 |
| Precoder | $W_{2i_{1,H},\ 2i_{1,V}+1,2i_{1,H}+1,2i_{1,V},\ 0}^{(2)}$ | $W_{2i_{1,H},\ 2i_{1,V}+1,2i_{1,H}+1,2i_{1,V},\ 1}^{(2)}$ |

TABLE 20-continued

| Alternate master codebook for 2 layer CSI reporting ($s_1 = s_2 = 2$ and $p_1 = p_2 = 1$) | | |
|---|---|---|
| $i_2$ | 28 | 29 |
| Precoder | $W_{2i_{1,H}+2,\ 2i_{1,V},\ 2i_{1,H}+2,\ 2i_{1,V},\ 0}^{(2)}$ | $W_{2i_{1,H}+2,\ 2i_{1,V},\ 2i_{1,H}+2,\ 2i_{1,V},\ 1}^{(2)}$ |
| $i_2$ | 32 | 33 |
| Precoder | $W_{2i_{1,H},\ 2i_{1,V},\ 2i_{1,H}+1,2i_{1,V},\ 0}^{(2)}$ | $W_{2i_{1,H},\ 2i_{1,V},\ 2i_{1,H}+1,2i_{1,V},\ 1}^{(2)}$ |
| $i_2$ | 36 | 37 |
| Precoder | $W_{2i_{1,H},\ 2i_{1,V},\ 2i_{1,H}+3,\ 2i_{1,V},\ 0}^{(2)}$ | $W_{2i_{1,H},\ 2i_{1,V},\ 2i_{1,H}+3,\ 2i_{1,V},\ 1}^{(2)}$ |
| $i_2$ | 2 | 3 |
| Precoder | $W_{2i_{1,H},\ 2i_{1,V}+1,2i_{1,H}2i_{1,V}+1,\ 0}^{(2)}$ | $W_{2i_{1,H},\ 2i_{1,V}+1,2i_{1,H},\ 2i_{1,V}+1,1}^{(2)}$ |
| $i_2$ | 6 | 7 |
| Precoder | $W_{2i_{1,H},\ 2i_{1,V}+3,\ 2i_{1,H},\ 2i_{1,V}+3,\ 0}^{(2)}$ | $W_{2i_{1\ H},\ 2i_{1,V}+3,\ 2i_{1,H},\ 2i_{1,V}+3,\ 1}^{(2)}$ |
| $i_2$ | 10 | 11 |
| Precoder | $W_{2i_{1,H},\ 2i_{1,V}+1,2i_{1,H},\ 2i_{1,V}+2,\ 0}^{(2)}$ | $W_{2i_{1,H},\ 2i_{1,V}+1,2i_{1,H},\ 2i_{1,V}+2,\ 1}^{(2)}$ |
| $i_2$ | 14 | 15 |
| Precoder | $W_{2i_{1,H},\ 2i_{1,V}+1,2i_{1,H},\ 2i_{1,V}+3,\ 0}^{(2)}$ | $W_{2i_{1,H},\ 2i_{1,V}+1,2i_{1,H},\ 2i_{1,V}+3,\ 1}^{(2)}$ |
| $i_2$ | 18 | 19 |
| Precoder | $W_{2i_{1,H},\ 2i_{1,V}+1,2i_{1,H}+1,2i_{1,V}+1,\ 0}^{(2)}$ | $W_{2i_{1,H},\ 2i_{1,V}+1,2i_{1,H}+1,2i_{1,V}+1,1}^{(2)}$ |
| $i_2$ | 22 | 23 |
| Precoder | $W_{2i_{1,H},\ 2i_{1,V},\ 2i_{1,H}+1,2i_{1,V}+1,\ 0}^{(2)}$ | $W_{2i_{1,H},\ 2i_{1,V},\ 2i_{1,H}+1,2i_{1,V}+1,1}^{(2)}$ |
| $i_2$ | 26 | 27 |
| Precoder | $W_{2i_{1,H}+1,2i_{1,V},\ 2i_{1,H}+1,2i_{1,V},\ 0}^{(2)}$ | $W_{2i_{1,H}+1,2i_{1,V},\ 2i_{1,H}+1,2i_{1,V},\ 1}^{(2)}$ |
| $i_2$ | 30 | 31 |
| Precoder | $W_{2i_{1,H}+3,\ 2i_{1,V},\ 2i_{1,H}+3,\ 2i_{1,V},\ 0}^{(2)}$ | $W_{2i_{1,H}+3,\ 2i_{1,V},\ 2i_{1,H}+3,\ 2i_{1,V},\ 1}^{(2)}$ |
| $i_2$ | 34 | 35 |
| Precoder | $W_{2i_{1,H}+1,2i_{1,V},\ 2i_{1,H}+2,\ 2i_{1,V},\ 0}^{(2)}$ | $W_{2i_{1,H}+1,2i_{1,V},\ 2i_{1,H}+2,\ 2i_{1,V},\ 1}^{(2)}$ |
| $i_2$ | 38 | 39 |
| Precoder | $W_{2i_{1,H}+1,2i_{1,V},\ 2i_{1,H}+3,\ 2i_{1,V},\ 0}^{(2)}$ | $W_{2i_{1,H}+1,2i_{1,V},\ 2i_{1,H}+1,2i_{1,V},\ 1}^{(2)}$ |

TABLE 21

An illustration of subset restriction on rank-2 $i_2$ (Table 20)

| Beam grouping configuration | ($L_1$, $L_2$) | $i_2$ after subset restriction | Number of $i_2$ indices | Mapping to reported $i_2$ indices |
|---|---|---|---|---|
| 0 | (4, 1) | 0-1, 26-39 | 16 | 0-15 |
| 1 | (1, 4) | 0-15 | 16 | 0-15 |
| 2 | (2, 2) | Scheme 0: 0-3, 8-9, 16-19, 24-27, 32-33<br>Scheme 1: 0-3, 8-9, 16-21, 26-27, 32-33<br>Scheme 2: 0-3, 8-9, 16-17, 22-27, 32-33 | 16 | 0-15 |

TABLE 25

| Master codebook for 2 layer CSI reporting for $(L_1, L_2) = (4, 2)$ | | |
|---|---|---|
| $i_2$ | 0 | 1 |
| Precoder | $W_{s_1 i_{1,1}, s_2 i_{1,2}, s_1 i_{1,1}, s_2 i_{1,2}, 0}^{(2)}$ | $W_{s_1 i_{1,1}, s_2 i_{1,2}, s_1 i_{1,1}, s_2 i_{1,2}, 1}^{(2)}$ |
| $i_2$ | 4 | 5 |
| Precoder | $W_{s_1 i_{1,1}+2p_1, s_2 i_{1,2}, s_1 i_{1,1}+2p_1, s_2 i_{1,2}, 0}^{(2)}$ | $W_{s_1 i_{1,1}+2p_1, s_2 i_{1,2}, s_1 i_{1,1}+2p_1, s_2 i_{1,2}, 1}^{(2)}$ |
| $i_2$ | 8 | 9 |
| Precoder | $W_{s_1 i_{1,1}, s_2 i_{1,2}, s_1 i_{1,1}+p_1, s_2 i_{1,2}, 0}^{(2)}$ | $W_{s_1 i_{1,1}, s_2 i_{1,2}, s_1 i_{1,1}+p_1, s_2 i_{1,2}, 1}^{(2)}$ |
| $i_2$ | 12 | 13 |
| Precoder | $W_{s_1 i_{1,1}, s_2 i_{1,2}, s_1 i_{1,1}+p_3, s_2 i_{1,2}, 0}^{(2)}$ | $W_{s_1 i_{1,1}, s_2 i_{1,2}, s_1 i_{1,1}+p_3, s_2 i_{1,2}, 1}^{(2)}$ |
| $i_2$ | 16-31 | |
| Precoder | Entries 16-31 constructed with replacing the second subscript $s_2 i_{1,2}$ with $s_2 i_{1,2} + p_2$ in entries 0-15. | |
| $i_2$ | 2 | 3 |
| Precoder | $W_{s_1 i_{1,1}+p_1, s_2 i_{1,2}, s_1 i_{1,1}+p_1, s_2 i_{1,2}, 0}^{(2)}$ | $W_{s_1 i_{1,1}+p_1, s_2 i_{1,2}, s_1 i_{1,1}+p_1, s_2 i_{1,2}, 1}^{(2)}$ |
| $i_2$ | 6 | 7 |
| Precoder | $W_{s_1 i_{1,1}+3p_1, s_2 i_{1,2}, s_1 i_{1,1}+3p_1, s_2 i_{1,2}, 0}^{(2)}$ | $W_{s_1 i_{1,1}+3p_1, s_2 i_{1,2}, s_1 i_{1,1}+3p_2, s_2 i_{1,2}, 1}^{(2)}$ |
| $i_2$ | 10 | 11 |
| Precoder | $W_{s_1 i_{1,1}+p_1, s_2 i_{1,2}, s_1 i_{1,1}+2p_1, s_2 i_{1,2}, 0}^{(2)}$ | $W_{s_1 i_{1,1}+p_1, s_2 i_{1,2}, s_1 i_{1,1}+2p_1, s_2 i_{1,2}, 1}^{(2)}$ |
| $i_2$ | 14 | 15 |
| Precoder | $W_{s_1 i_{1,1}+p_1, s_2 i_{1,2}, s_1 i_{1,1}+3p_1, s_2 i_{1,2}, 0}^{(2)}$ | $W_{s_1 i_{1,1}+p_1, s_2 i_{1,2}, s_1 i_{1,1}+3p_1, s_2 i_{1,2}, 1}^{(2)}$ |
| $i_2$ | 16-31 | |
| Precoder | Entries 16-31 constructed with replacing the second subscript $s_2 i_{1,2}$ with $s_2 i_{1,2} + p_2$ in entries 0-15. | |

TABLE 29

| Master codebook for 3 layer CSI reporting for $(N_1, N_2) = (4, 2)$ and $(L_1, L_2) = (4, 2)$ | | |
|---|---|---|
| $i_2'$ | 0 | 1 |
| Precoder | $W_{s_1 i_{1,1}, s_1 i_{1,1}+O_1, s_2 i_{1,2}, s_2 i_{1,2}}^{(3)}$ | $W_{s_1 i_{1,1}+O_1, s_1 i_{1,1}, s_2 i_{1,2}, s_2 i_{1,2}}^{(3)}$ |
| $i_2'$ | 4 | 5 |
| Precoder | $W_{s_1 i_{1,1}+O_1, s_1 i_{1,1}+2O_1, s_2 i_{1,2}, s_2 i_{1,2}}^{(3)}$ | $W_{s_1 i_{1,1}+2O_1, s_1 i_{1,1}+O_1, s_2 i_{1,2}, s_2 i_{1,2}}^{(3)}$ |
| $i_2'$ | 8 | 9 |
| Precoder | $W_{s_1 i_{1,1}+2O_1, s_1 i_{1,1}+3O_1, s_2 i_{1,2}, s_2 i_{1,2}}^{(3)}$ | $W_{s_1 i_{1,1}+3O_1, s_1 i_{1,1}+2O_1, s_2 i_{1,2}, s_2 i_{1,2}}^{(3)}$ |
| $i_2'$ | 12 | 13 |
| Precoder | $W_{s_1 i_{1,1}+3O_1, s_1 i_{1,1}, s_2 i_{1,2}, s_2 i_{1,2}}^{(3)}$ | $W_{s_1 i_{1,1}, s_1 i_{1,1}+3O_1, s_2 i_{1,2}, s_2 i_{1,2}}^{(3)}$ |
| $i_2'$ | 16 | 17 |
| Precoder | $W_{s_1 i_{1,1}, s_1 i_{1,1}+O_1, s_2 i_{1,2}+O_2, s_2 i_{1,2}+O_2}^{(3)}$ | $W_{s_1 i_{1,1}+O_1, s_1 i_{1,1}, s_2 i_{1,2}+O_2, s_2 i_{1,2}+O_2}^{(3)}$ |
| $i_2'$ | 20 | 21 |
| Precoder | $W_{s_1 i_{1,1}, s_1 i_{1,1}, s_2 i_{1,2}, s_2 i_{1,2}+O_2}^{(3)}$ | $W_{s_1 i_{1,1}, s_1 i_{1,1}, s_2 i_{1,2}+O_2, s_2 i_{1,2}}^{(3)}$ |
| $i_2'$ | 24 | 25 |
| Precoder | $W_{s_1 i_{1,1}+O_1, s_1 i_{1,1}+O_1, s_2 i_{1,2}, s_2 i_{1,2}+O_2}^{(3)}$ | $W_{s_1 i_{1,1}+O_1, s_1 i_{1,1}+O_1, s_2 i_{1,2}+O_2, s_2 i_{1,2}}^{(3)}$ |

TABLE 29-continued

| Master codebook for 3 layer CSI reporting for $(N_1, N_2) = (4, 2)$ and $(L_1, L_2) = (4, 2)$ | | |
|---|---|---|
| $i_2'$ | 28 | 29 |
| Precoder | $W_{s_1 i_{1,1}, s_1 i_{1,1}+O_1, s_2 i_{1,2}, s_2 i_{1,2}+O_2}^{(3)}$ | $W^{(3)}_{s_1 i_{1,1}+O, s_1 i_{1,1_1}, s_2 i_{1,2}+O_2, s_2 i_{1,2}}$ |
| $i_2'$ | 32 | 33 |
| Precoder | $W_{s_1 i_{1,1}+O_1, s_1 i_{1,1}+2O_1, s_2 i_{1,2}+O_2, s_2 i_{1,2}}^{(3)}$ | $W_{s_1 i_{1,1}+2O_1, s_1 i_{1,1}+O_1, s_2 i_{1,2}, s_2 i_{1,2}+O_2}^{(3)}$ |
| $i_2'$ | 36 | 37 |
| Precoder | $W_{s_1 i_{1,1}+2O_1, s_1 i_{1,1}+3O_1, s_2 i_{1,2}, s_2 i_{1,2}+O_2}^{(3)}$ | $W_{s_1 i_{1,1}+3O_1, s_1 i_{1,1}+2O_1, s_2 i_{1,2}+O_2, s_2 i_{1,2}}^{(3)}$ |
| $i_2'$ | 40 | 41 |
| Precoder | $W_{s_1 i_{1,1}+3O_1, s_1 i_{1,1}, s_2 i_{1,2}+O_2, s_2 i_{1,2}}^{(3)}$ | $W_{s_1 i_{1,1}, s_1 i_{1,1}+3O_1, s_2 i_{1,2}, s_2 i_{1,2}+O_2}^{(3)}$ |
| $i_2'$ | 2 | 3 |
| Precoder | $\tilde{W}_{s_1 i_{1,1}, s_1 i_{1,1}+O_1, s_2 i_{1,2}, s_2 i_{1,2}}^{(3)}$ | $\tilde{W}_{s_1 i_{1,1}+O_1, s_1 i_{1,1}, s_2 i_{1,2}, s_2 i_{1,2}}^{(3)}$ |
| $i_2'$ | 6 | 7 |
| Precoder | $\tilde{W}_{s_1 i_{1,1}+O_1, s_1 i_{1,1}+2O_1, s_2 i_{1,2}, s_2 i_{1,2}}^{(3)}$ | $\tilde{W}_{s_1 i_{1,1}+2O_1, s_1 i_{1,1}+O_1, s_2 i_{1,2}, s_2 i_{1,2}}^{(3)}$ |
| $i_2'$ | 10 | 11 |
| Precoder | $\tilde{W}_{s_1 i_{1,1}+2O_1, s_1 i_{1,1}+3O_1, s_2 i_{1,2}, s_2 i_{1,2}}^{(3)}$ | $\tilde{W}_{s_1 i_{1,1}+3O_1, s_1 i_{1,1}+2O_1, s_2 i_{1,2}, s_2 i_{1,2}}^{(3)}$ |
| $i_2'$ | 14 | 15 |
| Precoder | $\tilde{W}_{s_1 i_{1,1}+3O_1, s_1 i_{1,1}, s_2 i_{1,2}, s_2 i_{1,2}}^{(3)}$ | $\tilde{W}_{s_1 i_{1,1}, s_1 i_{1,1}+3O_1, s_2 i_{1,2}, s_2 i_{1,2}}^{(3)}$ |
| $i_2'$ | 18 | 19 |
| Precoder | $\tilde{W}_{s_1 i_{1,1}, s_1 i_{1,1}+O_1, s_2 i_{1,2}+O_2, s_2 i_{1,2}+O_2}^{(3)}$ | $\tilde{W}_{s_1 i_{1,1}+O_1, s_1 i_{1,1}, s_2 i_{1,2}+O_2, s_2 i_{1,2}+O_2}^{(3)}$ |
| $i_2'$ | 22 | 23 |
| Precoder | $\tilde{W}_{s_1 i_{1,1}, s_1 i_{1,1}, s_2 i_{1,2}, s_2 i_{1,2}+O_2}^{(3)}$ | $\tilde{W}_{s_1 i_{1,1}, s_1 i_{1,1}, s_2 i_{1,2}+O_2, s_2 i_{1,2}}^{(3)}$ |
| $i_2'$ | 26 | 27 |
| Precoder | $\tilde{W}_{s_1 i_{1,1}+O_1, s_1 i_{1,1}+O_1, s_2 i_{1,2}, s_2 i_{1,2}+O_2}^{(3)}$ | $\tilde{W}_{s_1 i_{1,1}+O_1, s_1 i_{1,1}+O_1, s_2 i_{1,2}+O_2, s_2 i_{1,2}}^{(3)}$ |
| $i_2'$ | 30 | 31 |
| Precoder | $\tilde{W}_{s_1 i_{1,1}, s_1 i_{1,1}+O_1, s_2 i_{1,2}, s_2 i_{1,2}+O_2}^{(3)}$ | $\tilde{W}_{s_1 i_{1,1}+O_1, s_1 i_{1,1}, s_2 i_{1,2}+O_2, s_2 i_{1,2}}^{(3)}$ |
| $i_2'$ | 34 | 35 |
| Precoder | $\tilde{W}_{s_1 i_{1,1}+O_1, s_1 i_{1,1}+2O_1, s_2 i_{1,2}+O_2, s_2 i_{1,2}}^{(3)}$ | $\tilde{W}_{s_1 i_{1,1}+2O_1, s_1 i_{1,1}+O_1, s_2 i_{1,2}, s_2 i_{1,2}+O_2}^{(3)}$ |
| $i_2'$ | 38 | 39 |
| Precoder | $\tilde{W}_{s_1 i_{1,1}+2O_1, s_1 i_{1,1}+3O_1, s_2 i_{1,2}, s_2 i_{1,2}+O_2}^{(3)}$ | $\tilde{W}_{s_1 i_{1,1}+3O_1, s_1 i_{1,1}+2O_1, s_2 i_{1,2}+O_1, s_2 i_{1,2}}^{(3)}$ |
| $i_2'$ | 42 | 43 |
| Precoder | $\tilde{W}_{s_1 i_{1,1}+3O_1, s_1 i_{1,1}, s_2 i_{1,2}+O_2, s_2 i_{1,2}}^{(3)}$ | $\tilde{W}_{s_1 i_{1,1}, s_1 i_{1,1}+3O_1, s_2 i_{1,2}, s_2 i_{1,2}+O_2}^{(3)}$ |

TABLE 32

| Master codebook for 4 layer CSI reporting for $(N_1, N_2) = (4, 2)$ and $(L_1, L_2) = (4, 2)$ | | |
|---|---|---|
| $i_2'$ | 0 | 1 |
| Precoder | $W_{s_1 i_{1,1}, s_1 i_{1,1}+O_1, s_2 i_{1,2}, s_2 i_{1,2}, 0}^{(4)}$ | $W_{s_1 i_{1,1}, s_1 i_{1,1}+O_1, s_2 i_{1,2}, s_2 i_{1,2}, 1}^{(4)}$ |

TABLE 32-continued

Master codebook for 4 layer CSI reporting for $(N_1, N_2) = (4, 2)$ and $(L_1, L_2) = (4, 2)$

| | | |
|---|---|---|
| $i_2'$ | 4 | 5 |
| Precoder | $W^{(4)}_{s_1i_{1,1}+2O_1, s_1i_{1,1}+3O_1, s_2i_{1,2}, s_2i_{1,2}, 0}$ | $W^{(4)}_{s_1i_{1,1}+2O_1, s_1i_{1,1}+3O_1, s_2i_{1,2}, s_2i_{1,2}, 1}$ |
| $i_2'$ | 8 | 9 |
| Precoder | $W^{(3)}_{s_1i_{1,1}, s_1i_{1,1}+O_1, s_2i_{1,2}+O_2, s_2i_{1,2}+O_2, 0}$ | $W^{(3)}_{s_1i_{1,1}, s_1i_{1,1}+O_1, s_2i_{1,2}+O_2, s_2i_{1,2}+O_2, 1}$ |
| $i_2'$ | 12 | 13 |
| Precoder | $W^{(3)}_{s_1i_{1,1}+O_1, s_1i_{1,1}+O_1, s_2i_{1,2}, s_2i_{1,2}+O_2, 0}$ | $W^{(3)}_{s_1i_{1,1}+O_1, s_1i_{1,1}+O_1, s_2i_{1,2}, s_2i_{1,2}+O_2, 1}$ |
| $i_2'$ | 16 | 17 |
| Precoder | $W^{(3)}_{s_1i_{1,1}+O_1, s_1i_{1,1}+2O_1, s_2i_{1,2}+O_2, s_2i_{1,2}, 0}$ | $W^{(3)}_{s_1i_{1,1}+O_1, s_1i_{1,1}+2O_1, s_2i_{1,2}+O_2, s_2i_{1,2}, 1}$ |
| $i_2'$ | 20 | 21 |
| Precoder | $W^{(3)}_{s_1i_{1,1}+3O_1, s_1i_{1,1}, s_2i_{1,2}+O_2, s_2i_{1,2}, 0}$ | $W^{(3)}_{s_1i_{1,1}+3O_1, s_1i_{1,1}, s_2i_{1,2}+O_2, s_2i_{1,2}, 1}$ |
| $i_2'$ | 2 | 3 |
| Precoder | $W^{(4)}_{s_1i_{1,1}+O_1, s_1i_{1,1}+2O_1, s_2i_{1,2}, s_2i_{1,2}, 0}$ | $W^{(4)}_{s_1i_{1,1}+O_1, s_1i_{1,1}+2O_1, s_2i_{1,2}, s_2i_{1,2}, 1}$ |
| $i_2'$ | 6 | 7 |
| Precoder | $W^{(4)}_{s_1i_{1,1}+3O_1, s_1i_{1,1}, s_2i_{1,2}, s_2i_{1,2}, 0}$ | $W^{(4)}_{s_1i_{1,1}+3O_1, s_1i_{1,1}, s_2i_{1,2}, s_2i_{1,2}, 1}$ |
| $i_2'$ | 10 | 11 |
| Precoder | $W^{(4)}_{s_1i_{1,1}, s_1i_{1,1}, s_2i_{1,2}, s_2i_{1,2}+O_2, 0}$ | $W^{(4)}_{s_1i_{1,1}, s_1i_{1,1}, s_2i_{1,2}, s_2i_{1,2}+O_2, 1}$ |
| $i_2'$ | 14 | 15 |
| Precoder | $W^{(3)}_{s_1i_{1,1}, s_1i_{1,1}+O_1, s_2i_{1,2}, s_2i_{1,2}+O_2, 0}$ | $W^{(3)}_{s_1i_{1,1}, s_1i_{1,1}+O_1, s_2i_{1,2}, s_2i_{1,2}+O_2, 1}$ |
| $i_2'$ | 18 | 19 |
| Precoder | $W^{(3)}_{s_1i_{1,1}+2O_1, s_1i_{1,1}+3O_1, s_2i_{1,2}, s_2i_{1,2}+O_2, 0}$ | $W^{(3)}_{s_1i_{1,1}+2O_1, s_1i_{1,1}+3O_1, s_2i_{1,2}, s_2i_{1,2}+O_2, 1}$ |

TABLE 35

Master codebook for 5 layer CSI reporting for $(N_1, N_2) = (4, 2)$ and $(L_1, L_2) = (4, 2)$

| | | |
|---|---|---|
| $i_2'$ | 0 | 1 |
| Precoder | $W^{(5)}_{s_1i_{1,1}, s_1i_{1,1}+O_1, s_1i_{1,1}+2O_1, s_2i_{1,2}, s_2i_{1,2}, s_2i_{1,2}}$ | $W^{(5)}_{s_1i_{1,1}+O_1, s_1i_{1,1}+2O_1, s_1i_{1,1}+3O_1, s_2i_{1,2}, s_2i_{1,2}, s_2i_{1,2}}$ |
| $i_2'$ | 2 | 3 |
| Precoder | $W^{(5)}_{s_1i_{1,1}+2O_1, s_1i_{1,1}+3O_1, s_1i_{1,1}, s_2i_{1,2}, s_2i_{1,2}, s_2i_{1,2}}$ | $W^{(5)}_{s_1i_{1,1}+3O_1, s_1i_{1,1}, s_1i_{1,1}+O_1, s_2i_{1,2}, s_2i_{1,2}, s_2i_{1,2}}$ |
| $i_2'$ | 4 | 5 |
| Precoder | $W^{(5)}_{s_1i_{1,1}, s_1i_{1,1}+O_1, s_1i_{1,1}+O_1, s_2i_{1,2}, s_2i_{1,2}, s_2i_{1,2}+O_2}$ | $W^{(5)}_{s_1i_{1,1}+O_1, s_1i_{1,1}+O_1, s_1i_{1,1}, s_2i_{1,2}, s_2i_{1,2}+O_2, s_2i_{1,2}+O_2}$ |
| $i_2'$ | 6 | 7 |
| Precoder | $W^{(5)}_{s_1i_{1,1}+O_1, s_1i_{1,1}, s_1i_{1,1}, s_2i_{1,2}+O_2, s_2i_{1,2}+O_2, s_2i_{1,2}}$ | $W^{(5)}_{s_1i_{1,1}, s_1i_{1,1}, s_1i_{1,1}+O_1, s_2i_{1,2}+O_2, s_2i_{1,2}, s_2i_{1,2}}$ |
| $i_2'$ | 8 | 9 |
| Precoder | $W^{(5)}_{s_1i_{1,1}, s_1i_{1,1}+O_1, s_1i_{1,1}+2O_1, s_2i_{1,2}, s_2i_{1,2}+O_2, s_2i_{1,2}}$ | $W^{(5)}_{s_1i_{1,1}+O_1, s_1i_{1,1}+2O_1, s_1i_{1,1}+3O_1, s_2i_{1,2}+O_2, s_2i_{1,2}, s_2i_{1,2}+O_2}$ |
| $i_2'$ | 10 | 11 |
| Precoder | $W^{(5)}_{s_1i_{1,1}+2O_1, s_1i_{1,1}+3O_1, s_1i_{1,1}, s_2i_{1,2}, s_2i_{1,2}+O_2, s_2i_{1,2}}$ | $W^{(5)}_{s_1i_{1,1}+3O_1, s_1i_{1,1}+O_1, s_1i_{1,1}, s_2i_{1,2}+O_2, s_2i_{1,2}, s_2i_{1,2}+O_2}$ |

TABLE 36

| Master codebook for 6 layer CSI reporting for $(N_1, N_2) = (4, 2)$ and $(L_1, L_2) = (4, 2)$ | | |
|---|---|---|
| $i_2'$ | 0 | 1 |
| Precoder | $W^{(6)}_{s_1i_{1,1}, s_1i_{1,1}+O_1, s_1i_{1,1}+2O_1, s_2i_{1,2}, s_2i_{1,2}, s_2i_{1,2}}$ | $W^{(6)}_{s_1i_{1,1}+O_1, s_1i_{1,1}+2O_1, s_1i_{1,1}+3O_1, s_2i_{1,2}, s_2i_{1,2}, s_2i_{1,2}}$ |
| $i_2'$ | 2 | 3 |
| Precoder | $W^{(6)}_{s_1i_{1,1}+2O_1, s_1i_{1,1}+3O_1, s_1i_{1,1}, s_2i_{1,2}, s_2i_{1,2}, s_2i_{1,2}}$ | $W^{(6)}_{s_1i_{1,1}+3O_1, s_1i_{1,1}, s_1i_{1,1}+O_1, s_2i_{1,2}, s_2i_{1,2}, s_2i_{1,2}}$ |
| $i_2'$ | 4 | 5 |
| Precoder | $W^{(6)}_{s_1i_{1,1}, s_1i_{1,1}+O_1, s_1i_{1,1}+O_1, s_2i_{1,2}, s_2i_{1,2}, s_2i_{1,2}+O_2}$ | $W^{(6)}_{s_1i_{1,1}+O_1, s_1i_{1,1}+O_1, s_1i_{1,1}, s_2i_{1,2}, s_2i_{1,2}+O_2, s_2i_{1,2}+O_2}$ |
| $i_2'$ | 6 | 7 |
| Precoder | $W^{(6)}_{s_1i_{1,1}+O_1, s_1i_{1,1}, s_1i_{1,1}, s_2i_{1,2}+O_2, s_2i_{1,2}+O_2, s_2i_{1,2}}$ | $W^{(6)}_{s_1i_{1,1}, s_1i_{1,1}, s_1i_{1,1}+O_1, s_2i_{1,2}+O_2, s_2i_{1,2}, s_2i_{1,2}}$ |
| $i_2'$ | 8 | 9 |
| Precoder | $W^{(6)}_{s_1i_{1,1}, s_1i_{1,1}+O_1, s_1i_{1,1}+2O_1, s_2i_{1,2}, s_2i_{1,2}+O_2, s_2i_{1,2}}$ | $W^{(6)}_{s_1i_{1,1}+O_1, s_1i_{1,1}+2O_1, s_1i_{1,1}, s_2i_{1,2}+O_2, s_2i_{1,2}, s_2i_{1,2}+O_2}$ |
| $i_2'$ | 10 | 11 |
| Precoder | $W^{(6)}_{s_1i_{1,1}+2O_1, s_1i_{1,1}+3O_1, s_1i_{1,1}, s_2i_{1,2}, s_2i_{1,2}+O_2, s_2i_{1,2}}$ | $W^{(6)}_{s_1i_{1,1}+3O_1, s_1i_{1,1}, s_1i_{1,1}+O_1, s_2i_{1,2}+O_2, s_2i_{1,2}, s_2i_{1,2}+O_2}$ |

TABLE 43

| Master codebook for 3 layer CSI reporting for $(N_1, N_2) = (4, 2)$ and $(L_1, L_2) = (2, 2)$ | | |
|---|---|---|
| $i_2'$ | 0 | 1 |
| Precoder | $W^{(3)}_{s_1i_{1,1}, s_1i_{1,1}, s_2i_{1,2}, s_2i_{1,2}+O_2}$ | $W^{(3)}_{s_1i_{1,1}, s_1i_{1,1}, s_2i_{1,2}+O_2, s_2i_{1,2}}$ |
| $i_2'$ | 4 | 5 |
| Precoder | $W^{(3)}_{s_1i_{1,1}, s_1i_{1,1}+O_1, s_2i_{1,2}, s_2i_{1,2}}$ | $W^{(3)}_{s_1i_{1,1}+O_1, s_1i_{1,1}, s_2i_{1,2}, s_2i_{1,2}}$ |
| $i_2'$ | 8 | 9 |
| Precoder | $W^{(3)}_{s_1i_{1,1}, s_1i_{1,1}+O_1, s_2i_{1,2}+O_2, s_2i_{1,2}}$ | $W^{(3)}_{s_1i_{1,1}+O_1, s_1i_{1,1}, s_2i_{1,2}, s_2i_{1,2}+O_2}$ |
| $i_2'$ | 12 | 13 |
| Precoder | $W^{(3)}_{s_1i_{1,1}, s_1i_{1,1}+O_1, s_2i_{1,2}, s_2i_{1,2}+O_2}$ | $W^{(3)}_{s_1i_{1,1}+O_1, s_1i_{1,1}, s_2i_{1,2}+O_2, s_2i_{1,2}}$ |
| $i_2'$ | 2 | 3 |
| Precoder | $\tilde{W}^{(3)}_{s_1i_{1,1}, s_1i_{1,1}, s_2i_{1,2}, s_2i_{1,2}+O_2}$ | $\tilde{W}^{(3)}_{s_1i_{1,1}, s_1i_{1,1}, s_2i_{1,2}+O_2, s_2i_{1,2}}$ |
| $i_2'$ | 6 | 7 |
| Precoder | $\tilde{W}^{(3)}_{s_1i_{1,1}, s_1i_{1,1}+O_1, s_2i_{1,2}, s_2i_{1,2}}$ | $W^{(3)}_{s_1i_{1,1}+O_1, s_1i_{1,1}, s_2i_{1,2}, s_2i_{1,2}}$ |
| $i_2'$ | 10 | 11 |
| Precoder | $\tilde{W}^{(3)}_{s_1i_{1,1}, s_1i_{1,1}+O_1, s_2i_{1,2}+O_2, s_2i_{1,2}}$ | $\tilde{W}^{(3)}_{s_1i_{1,1}+O_1, s_1i_{1,1}, s_2i_{1,2}, s_2i_{1,2}+O_2}$ |
| $i_2'$ | 14 | 15 |
| Precoder | $\tilde{W}^{(3)}_{s_1i_{1,1}, s_1i_{1,1}+O_1, s_2i_{1,2}, s_2i_{1,2}+O_2}$ | $\tilde{W}^{(3)}_{s_1i_{1,1}+O_1, s_1i_{1,1}, s_2i_{1,2}+O_2, s_2i_{1,2}}$ |

TABLE 44

| Master codebook for 4 layer CSI reporting for $(N_1, N_2) = (4, 2)$ and $(L_1, L_2) = (2, 2)$ | | |
|---|---|---|
| $i_2'$ | 0 | 1 |
| Precoder | $W_{s_1i_{1,1}, s_1i_{1,1}, s_2i_{1,2}, s_2i_{1,2}+O_2, 0}^{(4)}$ | $W_{s_1i_{1,1}, s_1i_{1,1}, s_2i_{1,2}, s_2i_{1,2}+O_2, 1}^{(4)}$ |
| $i_2'$ | 4 | 5 |
| Precoder | $W_{s_1i_{1,1}, s_1i_{1,1}+O_1, s_2i_{1,2}+O_2, s_2i_{1,2}, 0}^{(4)}$ | $W_{s_1i_{1,1}, s_1i_{1,1}+O_1, s_2i_{1,2}+O_2, s_2i_{1,2}, 1}^{(4)}$ |
| $i_2'$ | 2 | 3 |
| Precoder | $W_{s_1i_{1,1}, s_1i_{1,1}+O_1, s_2i_{1,2}, s_2i_{1,2}, 0}^{(4)}$ | $W_{s_1i_{1,1}, s_1i_{1,1}+O_1, s_2i_{1,2}, s_2i_{1,2}, 1}^{(4)}$ |
| $i_2'$ | 6 | 7 |
| Precoder | $W_{s_1i_{1,1}, s_1i_{1,1}+O_1, s_2i_{1,2}, s_2i_{1,2}+O_2, 0}^{(4)}$ | $W_{s_1i_{1,1}, s_1i_{1,1}+O_1, s_2i_{1,2}, s_2i_{1,2}+O_2, 1}^{(4)}$ |

TABLE 48

| Master codebook for 3 layer CSI reporting and $N_1 \geq N_2$ | | |
|---|---|---|
| $i_2'$ | 0 | 1 |
| Precoder | $W_{s_1i_{1,1}, s_1i_{1,1}+\delta_1, s_2i_{1,2}, s_2i_{1,2}+\delta_2}^{(3)}$ | $W_{s_1i_{1,1}+\delta_1, s_1i_{1,1}, s_2i_{1,2}+\delta_2, s_2i_{1,2}}^{(3)}$ |
| $i_2'$ | 4 | 5 |
| Precoder | $W_{s_1i_{1,1}+p_1, s_1i_{1,1}+p_1+\delta_1, s_2i_{1,2}, s_2i_{1,2}+\delta_2}^{(3)}$ | $W_{s_1i_{1,1}+p_1+\delta_1, s_1i_{1,1}+p_1, s_2i_{1,2}+\delta_2, s_2i_{1,2}}^{(3)}$ |
| $i_2'$ | 8 | 9 |
| Precoder | $W_{s_1i_{1,1}+2p_1, s_1i_{1,1}+2p_1+\delta_1, s_2i_{1,2}, s_2i_{1,2}+\delta_2}^{(3)}$ | $W_{s_1i_{1,1}+2p_1+\delta_1, s_1i_{1,1}+2p_1, s_2i_{1,2}+\delta_2, s_2i_{1,2}}^{(3)}$ |
| $i_2'$ | 12 | 13 |
| Precoder | $W_{s_1i_{1,1}+3p_1, s_1i_{1,1}+3p_1+\delta_1, s_2i_{1,2}, s_2i_{1,2}+\delta_2}^{(3)}$ | $W_{s_1i_{1,1}+3p_1+\delta_1, s_1i_{1,1}+3p_1, s_2i_{1,2}+\delta_2, s_2i_{1,2}}^{(3)}$ |
| $i_2'$ | 16-31 | |
| Precoder | Entries 16-31 constructed with replacing $s_2i_{1,2}$ in third and fourth subscripts with $s_2i_{1,2} + p_2$ in entries 0-15. | |
| $i_2'$ | 2 | 3 |
| Precoder | $\tilde{W}_{s_1i_{1,1}, s_1i_{1,1}+\delta_1, s_2i_{1,2}, s_2i_{1,2}+\delta_2}^{(3)}$ | $\tilde{W}_{s_1i_{1,1}+\delta_1, s_1i_{1,1}, s_2i_{1,2}+\delta_2, s_2i_{1,2}}^{(3)}$ |
| $i_2'$ | 6 | 7 |
| Precoder | $\tilde{W}_{s_1i_{1,1}+p_1, s_1i_{1,1}+p_1+\delta_1, s_2i_{1,2}, s_2i_{1,2}+\delta_2}^{(3)}$ | $\tilde{W}_{s_1i_{1,1}+p_1+\delta_1, s_1i_{1,1}+p_1, s_2i_{1,2}+\delta_2, s_2i_{1,2}}^{(3)}$ |
| $i_2'$ | 10 | 11 |
| Precoder | $\tilde{W}_{s_1i_{1,1}+2p_1, s_1i_{1,1}+2p_1+\delta_1, s_2i_{1,2}, s_2i_{1,2}+\delta_2}^{(3)}$ | $\tilde{W}_{s_1i_{1,1}+2p_1+\delta_1, s_1i_{1,1}+2p_1, s_2i_{1,2}+\delta_2, s_2i_{1,2}}^{(3)}$ |
| $i_2'$ | 14 | 15 |
| Precoder | $\tilde{W}_{s_1i_{1,1}+3p_1, s_1i_{1,1}+3p_1+\delta_1, s_2i_{1,2}, s_2i_{1,2}+\delta_2}^{(3)}$ | $\tilde{W}_{s_1i_{1,1}+p_1+3\delta_1, s_1i_{1,1}+p_1, s_2i_{1,2}+3\delta_2, s_2i_{1,2}}^{(3)}$ |
| $i_2'$ | 16-31 | |
| Precoder | Entries 16-31 constructed with replacing $s_2i_{1,2}$ in third and fourth subscripts with $s_2i_{1,2} + p_2$ in entries 0-15. | |

TABLE 49

| Master codebook for 4 layer CSI reporting and $N_1 \geq N_2$ | | |
|---|---|---|
| $i_2'$ | 0 | 1 |
| Precoder | $W_{s_1i_{1,1}, s_1i_{1,1}+\delta_1, s_2i_{1,2}, s_2i_{1,2}+\delta_2, 0}^{(4)}$ | $W_{s_1i_{1,1}, s_1i_{1,1}+\delta_1, s_2i_{1,2}, s_2i_{1,2}+\delta_2, 1}^{(4)}$ |
| $i_2'$ | 4 | 5 |
| Precoder | $W_{s_1i_{1,1}+2p_1, s_1i_{1,1}+2p_1+\delta_1, s_2i_{1,2}, s_2i_{1,2}+\delta_2, 0}^{(4)}$ | $W_{s_1i_{1,1}+2p_1, s_1i_{1,1}+2p_1+\delta_1, s_2i_{1,2}, s_2i_{1,2}+\delta_2, 1}^{(4)}$ |

TABLE 49-continued

| Master codebook for 4 layer CSI reporting and $N_1 \geq N_2$ | | |
|---|---|---|
| $i_2'$ | 8-15 | |
| Precoder | Entries 8-15 constructed with replacing $s_2 i_{1,2}$ in third and fourth subscripts with $s_2 i_{1,2} + p_2$ in entries 0-7. | |
| $i_2'$ | 2 | 3 |
| Precoder | $W_{s_1 i_{1,1}+p_1,\ s_1 i_{1,1}+p_1+\delta_1,\ s_2 i_{1,2},\ s_2 i_{1,2}+\delta_2,\ 0}^{(4)}$ | $W_{s_1 i_{1,1}+p_1,\ s_1 i_{1,1}+p_1+\delta_1,\ s_2 i_{1,2},\ s_2 i_{1,2}+\delta_2,\ 1}^{(4)}$ |
| $i_2'$ | 6 | 7 |
| Precoder | $W_{s_1 i_{1,1}+3p_1,\ s_1 i_{1,1}+3p_1+\delta_1,\ s_2 i_{1,2},\ s_2 i_{1,2}+\delta_2,\ 0}^{(4)}$ | $W_{s_1 i_{1,1}+3p_1,\ s_1 i_{1,1}+3p_1+\delta_1,\ s_2 i_{1,2},\ s_2 i_{1,2}+\delta_2,\ 1}^{(4)}$ |
| $i_2'$ | 8-15 | |
| Precoder | Entries 8-15 constructed with replacing $s_2 i_{1,2}$ in third and fourth subscripts with $s_2 i_{1,2} + p_2$ in entries 0-7. | |

TABLE 56

| Master codebook for 3 layer CSI reporting | | |
|---|---|---|
| $i_2'$ | 0 | 1 |
| Precoder | $W_{s_1 i_{1,1}+\delta_{1,0}^{0},\ s_1 i_{1,1}+\delta_{1,1}^{0},\ s_2 i_{1,2}+\delta_{2,0}^{0},\ s_2 i_{1,2}+\delta_{2,1}^{0}}^{(3)}$ | $W_{s_1 i_{1,1}+\delta_{1,1}^{0},\ s_1 i_{1,1}+\delta_{1,0}^{0},\ s_2 i_{1,2}+\delta_{2,1}^{0},\ s_2 i_{1,2}+\delta_{2,0}^{0}}^{(3)}$ |
| $i_2'$ | 2 | 3 |
| Precoder | $\tilde{W}_{s_1 i_{1,1}+\delta_{1,0}^{0},\ s_1 i_{1,1}+\delta_{1,1}^{0},\ s_2 i_{1,2}+\delta_{2,0}^{0},\ s_2 i_{1,2}+\delta_{2,1}^{0}}^{(3)}$ | $\tilde{W}_{s_1 i_{1,1}+\delta_{1,1}^{0},\ s_1 i_{1,1}+\delta_{1,0}^{0},\ s_2 i_{1,2}+\delta_{2,1}^{0},\ s_2 i_{1,2}+\delta_{2,0}^{0}}^{(3)}$ |
| $i_2'$ | 4-15 | |
| Precoder | Entries 4-15 constructed with replacing the superscript 0 in $\delta_{1,0}^{(0)}$, $\delta_{2,0}^{(0)}$, $\delta_{1,1}^{(0)}$, and $\delta_{2,1}^{(0)}$ with 1, 2, and 3. | |

TABLE 57

| Master codebook for 4 layer CSI reporting | | |
|---|---|---|
| $i_2'$ | 0 | 1 |
| Precoder | $W_{s_1 i_{1,1}+\delta_{1,0}^{0},\ s_1 i_{1,1}+\delta_{1,1}^{0},\ s_2 i_{1,2}+\delta_{2,0}^{0},\ s_2 i_{1,2}+\delta_{2,1}^{0},\ 0}^{(4)}$ | $W_{s_1 i_{1,1}+\delta_{1,0}^{0},\ s_1 i_{1,1}+\delta_{1,1}^{0},\ s_2 i_{1,2}+\delta_{2,0}^{0},\ s_2 i_{1,2}+\delta_{2,1}^{0},\ 1}^{(4)}$ |
| $i_2'$ | 2-7 | |
| Precoder | Entries 2-7 constructed with replacing the superscript 0 in $\delta_{1,0}^{(0)}$, $\delta_{2,0}^{(0)}$, $\delta_{1,1}^{(0)}$, and $\delta_{2,1}^{(0)}$ with 1, 2, and 3. | |

TABLE 59

| Master codebook for 3 layer CSI reporting | | |
|---|---|---|
| $i_2'$ | 0 | 1 |
| Precoder | $W_{s_1 i_{1,1}+\delta_{1,0}^{0},\ s_1 i_{1,1}+\delta_{1,1}^{0},\ s_2 i_{1,2}+\delta_{2,0}^{0},\ s_2 i_{1,2}+\delta_{2,1}^{0}}^{(3)}$ | $W_{s_1 i_{1,1}+\delta_{1,1}^{0},\ s_1 i_{1,1}+\delta_{1,0}^{0},\ s_2 i_{1,2}+\delta_{2,1}^{0},\ s_2 i_{1,2}+\delta_{2,0}^{0}}^{(3)}$ |
| $i_2'$ | 2 | 3 |
| Precoder | $\tilde{W}_{s_1 i_{1,1}+\delta_{1,0}^{0},\ s_1 i_{1,1}+\delta_{1,1}^{0},\ s_2 i_{1,2}+\delta_{2,0}^{0},\ s_2 i_{1,2}+\delta_{2,1}^{0}}^{(3)}$ | $\tilde{W}_{s_1 i_{1,1}+\delta_{1,1}^{0},\ s_1 i_{1,1}+\delta_{1,0}^{0},\ s_2 i_{1,2}+\delta_{2,1}^{0},\ s_2 i_{1,2}+\delta_{2,0}^{0}}^{(3)}$ |
| $i_2'$ | 4-(4K-1) | |
| Precoder | Entries 4-(4K-1) constructed with replacing the superscript 0 in $\delta_{1,0}^{(0)}$, $\delta_{2,0}^{(0)}$, $\delta_{1,1}^{(0)}$, and $\delta_{2,1}^{(0)}$ with 1, . . . , K-1 in entries 0-3. | |

TABLE 60

| Master codebook for 4 layer CSI reporting | | |
|---|---|---|
| $i_2'$ | 0 | 1 |
| Precoder | $W_{s_1 i_{1,1}+\delta_{1,0}^{0},\ s_1 i_{1,1}+\delta_{1,1}^{0},\ s_2 i_{1,2}+\delta_{2,0}^{0},\ s_2 i_{1,2}+\delta_{2,1}^{0},\ 0}^{(4)}$ | $W_{s_1 i_{1,1}+\delta_{1,0}^{0},\ s_1 i_{1,1}+\delta_{1,1}^{0},\ s_2 i_{1,2}+\delta_{2,0}^{0},\ s_2 i_{1,2}+\delta_{2,1}^{0},\ 1}^{(4)}$ |

TABLE 60-continued

| Master codebook for 4 layer CSI reporting | |
|---|---|
| $i_2'$ | 2-(2K-1) |
| Precoder | Entries 2-(2K-1) constructed with replacing the superscript 0 in $\delta_{1,0}^{(0)}$, $\delta_{2,0}^{(0)}$, $\delta_{1,1}^{(0)}$, and $\delta_{2,1}^{(0)}$ with 1, . . . , K-1 in entries 0-1. |

TABLE 62

| Master codebook for 3 layer CSI reporting | | |
|---|---|---|
| $i_2'$ | 0 | 1 |
| Precoder | $W_{s_1 i_{1,1}+\delta_{1,0}^0,\ s_1 i_{1,1}+\delta_{1,1}^0,\ s_2 i_{1,2}+\delta_{2,0}^0,\ s_2 i_{1,2}+\delta_{2,1}^0}^{(3)}$ | $W_{s_1 i_{1,1}+\delta_{1,1}^0,\ s_1 i_{1,1}+\delta_{1,0}^0,\ s_2 i_{1,2}+\delta_{2,1}^0,\ s_2 i_{1,2}+\delta_{2,0}^0}^{(3)}$ |
| $i_2'$ | 2 | 3 |
| Precoder | $\tilde{W}_{s_1 i_{1,1}+\delta_{1,0}^0,\ s_1 i_{1,1}+\delta_{1,1}^0,\ s_2 i_{1,2}+\delta_{2,0}^0,\ s_2 i_{1,2}+\delta_{2,1}^0}^{(3)}$ | $\tilde{W}_{s_1 i_{1,1}+\delta_{1,1}^0,\ s_1 i_{1,1}+\delta_{1,0}^0,\ s_2 i_{1,2}+\delta_{2,1}^0,\ s_2 i_{1,2}+\delta_{2,0}^0}^{(3)}$ |
| $i_2'$ | 4-15 | |
| Precoder | Entries 4-15 constructed with replacing $s_1 i_{1,1}$ in first and second subscripts with $s_1 i_{1,1} + p_1$, $s_1 i_{1,1} + 2p_1$, and $s_1 i_{1,1} + 3p_1$ in entries 0-3. | |
| $i_2'$ | 16-31 | |
| Precoder | Entries 16-31 constructed with replacing $s_2 i_{1,2}$ in third and fourth subscripts with $s_2 i_{1,2} + p_2$ in entries 0-15. | |
| $i_2'$ | 32-(32K-1) | |
| Precoder | Entries 32-(32K-1) constructed with replacing the superscript 0 in $\delta_{1,0}^{(0)}$, $\delta_{2,0}^{(0)}$, $\delta_{1,1}^{(0)}$, and $\delta_{2,1}^{(0)}$ with 1, . . . , K-1 in entries 0-31. | |

TABLE 63

| Master codebook for 4 layer CSI reporting | | |
|---|---|---|
| $i_2'$ | 0 | 1 |
| Precoder | $W_{s_1 i_{1,1}+\delta_{1,0}^0,\ s_1 i_{1,1}+\delta_{1,1}^0,\ s_2 i_{1,2}+\delta_{2,0}^0,\ s_2 i_{1,2}+\delta_{2,1}^0,\ 0}^{(4)}$ | $W_{s_1 i_{1,1}+\delta_{1,0}^0,\ s_1 i_{1,1}+\delta_{1,1}^0,\ s_2 i_{1,2}+\delta_{2,0}^0,\ s_2 i_{1,2}+\delta_{2,1}^0,\ 1}^{(4)}$ |
| $i_2'$ | 2-7 | |
| Precoder | Entries 2-7 constructed with replacing $s_1 i_{1,1}$ in first and second subscripts with $s_1 i_{1,1} + p_1$, $s_1 i_{1,1} + 2p_1$, and $s_1 i_{1,1} + 3p_1$ in entries 0-1. | |
| $i_2'$ | 8-15 | |
| Precoder | Entries 8-15 constructed with replacing $s_2 i_{1,2}$ in third and fourth subscripts with $s_2 i_{1,2} + p_2$ in entries 0-7. | |
| $i_2'$ | 16-(16K-1) | |
| Precoder | Entries 16-(16K-1) constructed with replacing the superscript 0 in $\delta_{1,0}^{(0)}$, $\delta_{2,0}^{(0)}$, $\delta_{1,1}^{(0)}$, and $\delta_{2,1}^{(0)}$with 1, . . . , K-1 in entries 0-15. | |

TABLE 66

| Master codebook for 3 layer CSI reporting for $N_1 \geq N_2$ | | |
|---|---|---|
| $i_2'$ | 0 | 1 |
| $i_{1,1}, i_{1,2}, k$ | $W_{s_1 i_{1,1},\ s_1 i_{1,1}+\delta_1,\ s_2 i_{1,2},\ s_2 i_{1,2}+\delta_2}^{(3)}$ | $W_{s_1 i_{1,1}+\delta_1,\ s_1 i_{1,1},\ s_2 i_{1,2}+\delta_2,\ s_2 i_{1,2}}^{(3)}$ |
| $i_2'$ | 4 | 5 |
| $i_{1,1}, i_{1,2}, k$ | $W_{s_1 i_{1,1}+p_1,\ s_1 i_{1,1}+p_1+\delta_1,\ s_2 i_{1,2},\ s_2 i_{1,2}+\delta_2}^{(3)}$ | $W_{s_1 i_{1,1}+p_1+\delta_1,\ s_1 i_{1,1}+p_1,\ s_2 i_{1,2}+\delta_2,\ s_2 i_{1,2}}^{(3)}$ |
| $i_2'$ | 8 | 9 |
| $i_{1,1}, i_{1,2}, k$ | $W_{s_1 i_{1,1}+2p_1,\ s_1 i_{1,1}+2p_1+\delta_1,\ s_2 i_{1,2},\ s_2 i_{1,2}+\delta_2}^{(3)}$ | $W_{s_1 i_{1,1}+2p_1+\delta_1,\ s_1 i_{1,1}+2p_1,\ s_2 i_{1,2}+\delta_2,\ s_2 i_{1,2}}^{(3)}$ |
| $i_2'$ | 12 | 13 |
| $i_{1,1}, i_{1,2}, k$ | $W_{s_1 i_{1,1}+3p_1,\ s_1 i_{1,1}+3p_1+\delta_1,\ s_2 i_{1,2},\ s_2 i_{1,2}+\delta_2}^{(3)}$ | $W_{s_1 i_{1,1}+3p_1+\delta_1,\ s_1 i_{1,1}+3p_1,\ s_2 i_{1,2}+\delta_2,\ s_2 i_{1,2}}^{(3)}$ |

TABLE 66-continued

| Master codebook for 3 layer CSI reporting for $N_1 \geq N_2$ | | |
|---|---|---|
| $i_2'$ | 16-31 | |
| $i_{1,1}, i_{1,2}, k$ | Entries 16-31 constructed with replacing $s_2 i_{1,2}$ in third and fourth subscripts with $s_2 i_{1,2} + p_2$ in entries 0-15. | |
| $i_2'$ | 2 | 3 |
| $i_{1,1}, i_{1,2}, k$ | $\tilde{W}^{(3)}_{s_1 i_{1,1}, s_1 i_{1,1}+\delta_1, s_2 i_{1,2}, s_2 i_{1,2}+\delta_2}$ | $\tilde{W}^{(3)}_{s_1 i_{1,1}+\delta_1, s_1 i_{1,1}, s_2 i_{1,2}+\delta_2, s_2 i_{1,2}}$ |
| $i_2'$ | 6 | 7 |
| $i_{1,1}, i_{1,2}, k$ | $\tilde{W}^{(3)}_{s_1 i_{1,1}+p_1, s_1 i_{1,1}+p_1+\delta_1, s_2 i_{1,2}, s_2 i_{1,2}+\delta_2}$ | $\tilde{W}^{(3)}_{s_1 i_{1,1}+p_1+\delta_1, s_1 i_{1,1}+p_1, s_2 i_{1,2}+\delta_2, s_2 i_{1,2}}$ |
| $i_2'$ | 10 | 11 |
| $i_{1,1}, i_{1,2}, k$ | $\tilde{W}^{(3)}_{s_1 i_{1,1}+2p_1, s_1 i_{1,1}+2p_1+\delta_1, s_2 i_{1,2}, s_2 i_{1,2}+\delta_2}$ | $\tilde{W}^{(3)}_{s_1 i_{1,1}+2p_1+\delta_1, s_1 i_{1,1}+2p_1, s_2 i_{1,2}+\delta_2, s_2 i_{1,2}}$ |
| $i_2'$ | 14 | 15 |
| $i_{1,1}, i_{1,2}, k$ | $\tilde{W}^{(3)}_{s_1 i_{1,1}+3p_1, s_1 i_{1,1}+3p_1+\delta_1, s_2 i_{1,2}, s_2 i_{1,2}+\delta_2}$ | $\tilde{W}^{(3)}_{s_1 i_{1,1}+3p_1+\delta_1, s_1 i_{1,1}+3p_1, s_2 i_{1,2}+\delta_2, s_2 i_{1,2}}$ |
| $i_2'$ | 16-31 | |
| $i_{1,1}, i_{1,2}, k$ | Entries 16-31 constructed with replacing $s_2 i_{1,2}$ in third and fourth subscripts with $s_2 i_{1,2} + p_2$ in entries 0-15. | |

TABLE 67

| Master codebook for 4 layer CSI reporting for $N_1 \geq N_2$ | | |
|---|---|---|
| $i_2'$ | 0 | 1 |
| $i_{1,1}, i_{1,2}, k$ | $W^{(4)}_{s_1 i_{1,1}, s_1 i_{1,1}+\delta_1, s_2 i_{1,2}, s_2 i_{1,2}+\delta_2, 0}$ | $W^{(4)}_{s_1 i_{1,1}, s_1 i_{1,1}+\delta_1, s_2 i_{1,2}, s_2 i_{1,2}+\delta_2, 1}$ |
| $i_2'$ | 4 | 5 |
| $i_{1,1}, i_{1,2}, k$ | $W^{(4)}_{s_1 i_{1,1}+2p_1, s_1 i_{1,1}+2p_1+\delta_1, s_2 i_{1,2}, s_2 i_{1,2}+\delta_2, 0}$ | $W^{(4)}_{s_1 i_{1,1}+2p_1, s_1 i_{1,1}+2p_1+\delta_1, s_2 i_{1,2}, s_2 i_{1,2}+\delta_2, 1}$ |
| $i_2'$ | 8-15 | |
| $i_{1,1}, i_{1,2}, k$ | Entries 8-15 constructed with replacing $s_2 i_{1,2}$ in third and fourth subscripts with $s_2 i_{1,2} + p_2$ in entries 0-7. | |
| $i_2'$ | 2 | 3 |
| $i_{1,1}, i_{1,2}, k$ | $W^{(4)}_{s_1 i_{1,1}+p_1, s_1 i_{1,1}+p_1+\delta_1, s_2 i_{1,2}, s_2 i_{1,2}+\delta_2, 0}$ | $W^{(4)}_{s_1 i_{1,1}+p_1, s_1 i_{1,1}+p_1+\delta_1, s_2 i_{1,2}, s_2 i_{1,2}+\delta_2, 1}$ |
| $i_2'$ | 6 | 7 |
| $i_{1,1}, i_{1,2}, k$ | $W^{(4)}_{s_1 i_{1,1}+3p_1, s_1 i_{1,1}+3p_1+\delta_1, s_2 i_{1,2}, s_2 i_{1,2}+\delta_2, 0}$ | $W^{(4)}_{s_1 i_{1,1}+3p_1, s_1 i_{1,1}+3p_1+\delta_1, s_2 i_{1,2}, s_2 i_{1,2}+\delta_2, 1}$ |
| $i_2'$ | 8-15 | |
| $i_{1,1}, i_{1,2}, k$ | Entries 8-15 constructed with replacing $s_2 i_{1,2}$ in third and fourth subscripts with $s_2 i_{1,2} + p_2$ in entries 0-7. | |

TABLE 77

| Master codebook for 2 layer CSI reporting | | |
|---|---|---|
| $i_2'$ | 0 | 1 |
| $i_{1,1}, i_{1,2}$ | $W^{(2)}_{s_1 i_{1,1}, s_1 i_{1,1}, s_2 i_{1,2}, s_2 i_{1,2}, 0}$ | $W^{(2)}_{s_1 i_{1,1}, s_1 i_{1,1}, s_2 i_{1,2}, s_2 i_{1,2}, 1}$ |
| $i_2'$ | 4 | 5 |
| $i_{1,1}, i_{1,2}$ | $W^{(2)}_{s_1 i_{1,1}+2p_1, s_1 i_{1,1}+2p_1, s_2 i_{1,2}, s_2 i_{1,2}, 0}$ | $W^{(2)}_{s_1 i_{1,1}+2p_1, s_1 i_{1,1}+2p_1, s_2 i_{1,2}, s_2 i_{1,2}, 1}$ |
| $i_2'$ | 8 | 9 |
| $i_{1,1}, i_{1,2}$ | $W^{(2)}_{s_1 i_{1,1}, s_1 i_{1,1}+p_1, s_2 i_{1,2}, s_2 i_{1,2}, 0}$ | $W^{(2)}_{s_1 i_{1,1}, s_1 i_{1,1}+p_1, s_2 i_{1,2}, s_2 i_{1,2}, 1}$ |
| $i_2'$ | 12 | 13 |
| $i_{1,1}, i_{1,2}$ | $W^{(2)}_{s_1 i_{1,1}, s_1 i_{1,1}+3p_1, s_2 i_{1,2}, s_2 i_{1,2}, 0}$ | $W^{(2)}_{s_1 i_{1,1}, s_1 i_{1,1}+3p_1, s_2 i_{1,2}, s_2 i_{1,2}, 1}$ |

TABLE 77-continued

| Master codebook for 2 layer CSI reporting | | |
|---|---|---|
| $i_2'$ | 16 | 17 |
| $i_{1,1}, i_{1,2}$ | $W_{s_1 i_{1,1}, s_1 i_{1,1}, s_2 i_{1,2}+p_2, s_2 i_{1,2}+p_2, 0}^{(2)}$ | $W_{s_1 i_{1,1}, s_1 i_{1,1}, s_2 i_{1,2}+p_2, s_2 i_{1,2}+p_2, 1}^{(2)}$ |
| $i_2'$ | 20 | 21 |
| $i_{1,1}, i_{1,2}$ | $W_{s_1 i_{1,1}+3p_1, s_1 i_{1,1}+3p_1, s_2 i_{1,2}+p_2, s_2 i_{1,2}+p_2, 0}^{(2)}$ | $W_{s_1 i_{1,1}+3p_1, s_1 i_{1,1}+3p_1, s_2 i_{1,2}+p_2, s_2 i_{1,2}+p_2, 1}^{(2)}$ |
| $i_2'$ | 24 | 25 |
| $i_{1,1}, i_{1,2}$ | $W_{s_1 i_{1,1}+p_1, s_1 i_{1,1}+3p_1, s_2 i_{1,2}+p_2, s_2 i_{1,2}+p_2, 0}^{(2)}$ | $W_{s_1 i_{1,1}+p_1, s_1 i_{1,1}+3p_1, s_2 i_{1,2}+p_2, s_2 i_{1,2}+p_2, 1}^{(2)}$ |
| $i_2'$ | 28 | 29 |
| $i_{1,1}, i_{1,2}$ | $W_{s_1 i_{1,1}+p_1, s_1 i_{1,1}+2p_1, s_2 i_{1,2}+p_2, s_2 i_{1,2}, 0}^{(2)}$ | $W_{s_1 i_{1,1}+p_1, s_1 i_{1,1}+2p_1, s_2 i_{1,2}+p_2, s_2 i_{1,2}, 1}^{(2)}$ |
| $i_2'$ | 32 | 33 |
| $i_{1,1}, i_{1,2}$ | $W_{s_1 i_{1,1}, s_1 i_{1,1}, s_2 i_{1,2}, s_2 i_{1,2}+p_2, 0}^{(2)}$ | $W_{s_1 i_{1,1}, s_1 i_{1,1}, s_2 i_{1,2}, s_2 i_{1,2}+p_2, 1}^{(2)}$ |
| $i_2'$ | 36 | 37 |
| $i_{1,1}, i_{1,2}$ | $W_{s_1 i_{1,1}, s_1 i_{1,1}, s_2 i_{1,2}, s_2 i_{1,2}, 2}^{(2)}$ | $W_{s_1 i_{1,1}, s_1 i_{1,1}, s_2 i_{1,2}, s_2 i_{1,2}, 3}^{(2)}$ |
| $i_2'$ | 2 | 3 |
| $i_{1,1}, i_{1,2}$ | $W_{s_1 i_{1,1}+p_1, s_1 i_{1,1}+p_1, s_2 i_{1,2}, s_2 i_{1,2}, 0}^{(2)}$ | $W_{s_1 i_{1,1}+p_1, s_1 i_{1,1}+p_1, s_2 i_{1,2}, s_2 i_{1,2}, 1}^{(2)}$ |
| $i_2'$ | 6 | 7 |
| $i_{1,1}, i_{1,2}$ | $W_{s_1 i_{1,1}+3p_1, s_1 i_{1,1}+3p_1, s_2 i_{1,2}, s_2 i_{1,2}, 0}^{(2)}$ | $W_{s_1 i_{1,1}+3p_1, s_1 i_{1,1}+3p_1, s_2 i_{1,2}, s_2 i_{1,2}, 1}^{(2)}$ |
| $i_2'$ | 10 | 11 |
| $i_{1,1}, i_{1,2}$ | $W_{s_1 i_{1,1}+p_1, s_1 i_{1,1}+2p_1, s_2 i_{1,2}, s_2 i_{1,2}, 0}^{(2)}$ | $W_{s_1 i_{1,1}+p_1, s_1 i_{1,1}+2p_1, s_2 i_{1,2}, s_2 i_{1,2}, 1}^{(2)}$ |
| $i_2'$ | 14 | 15 |
| $i_{1,1}, i_{1,2}$ | $W_{s_1 i_{1,1}+p_1, s_1 i_{1,1}+3p_1, s_2 i_{1,2}, s_2 i_{1,2}, 0}^{(2)}$ | $W_{s_1 i_{1,1}+p_1, s_1 i_{1,1}+3p_1, s_2 i_{1,2}, s_2 i_{1,2}, 1}^{(2)}$ |
| $i_2'$ | 18 | 19 |
| $i_{1,1}, i_{1,2}$ | $W_{s_1 i_{1,1}+p_1, s_1 i_{1,1}+p_1, s_2 i_{1,2}+p_2, s_2 i_{1,2}+p_2, 0}^{(2)}$ | $W_{s_1 i_{1,1}+p_1, s_1 i_{1,1}+p_1, s_2 i_{1,2}+p_2, s_2 i_{1,2}+p_2, 1}^{(2)}$ |
| $i_2'$ | 22 | 23 |
| $i_{1,1}, i_{1,2}$ | $W_{s_1 i_{1,1}, s_1 i_{1,1}+p_1, s_2 i_{1,2}+p_2, s_2 i_{1,2}+p_2, 0}^{(2)}$ | $W_{s_1 i_{1,1}, s_1 i_{1,1}+p_1, s_2 i_{1,2}+p_2, s_2 i_{1,2}+p_2, 1}^{(2)}$ |
| $i_2'$ | 26 | 27 |
| $i_{1,1}, i_{1,2}$ | $W_{s_1 i_{1,1}, s_1 i_{1,1}+p_1, s_2 i_{1,2}, s_2 i_{1,2}+p_2, 0}^{(2)}$ | $W_{s_1 i_{1,1}, s_1 i_{1,1}+p_1, s_2 i_{1,2}, s_2 i_{1,2}+p_2, 1}^{(2)}$ |
| $i_2'$ | 30 | 31 |
| $i_{1,1}, i_{1,2}$ | $W_{s_1 i_{1,1}, s_1 i_{1,1}+3p_1, s_2 i_{1,2}, s_2 i_{1,2}+p_2, 0}^{(2)}$ | $W_{s_1 i_{1,1}, s_1 i_{1,1}+3p_1, s_2 i_{1,2}, s_2 i_{1,2}+p_2, 1}^{(2)}$ |
| $i_2'$ | 34 | 35 |
| $i_{1,1}, i_{1,2}$ | $W_{s_1 i_{1,1}+p_1, s_1 i_{1,1}+p_1, s_2 i_{1,2}, s_2 i_{1,2}+p_2, 0}^{(2)}$ | $W_{s_1 i_{1,1}+p_1, s_1 i_{1,1}+p_1, s_2 i_{1,2}, s_2 i_{1,2}+p_2, 1}^{(2)}$ |

TABLE 79

| Master codebook for 3 layer CSI reporting | | |
|---|---|---|
| $i_2'$ | 0 | 1 |
| $i_{1,1}, i_{1,2}, k$ | $W_{s_1 i_{1,1}, s_1 i_{1,1}+\delta_1, s_2 i_{1,2}, s_2 i_{1,2}+\delta_2}^{(3)}$ | $W_{s_1 i_{1,1}+\delta_1, s_1 i_{1,1}, s_2 i_{1,2}+\delta_2, s_2 i_{1,2}}^{(3)}$ |
| $i_2'$ | 4 | 5 |
| $i_{1,1}, i_{1,2}, k$ | $W_{s_1 i_{1,1}+p_1, s_1 i_{1,1}+p_1+\delta_1, s_2 i_{1,2}, s_2 i_{1,2}+\delta_2}^{(3)}$ | $W_{s_1 i_{1,1}+p_1+\delta_1, s_1 i_{1,1}+p_1, s_2 i_{1,2}+\delta_2, s_2 i_{1,2}}^{(3)}$ |

TABLE 79-continued

| Master codebook for 3 layer CSI reporting | | |
|---|---|---|
| $i_2'$ | 8 | 9 |
| $i_{1,1}, i_{1,2}, k$ | $W_{s_1 i_{1,1}+2p_1,\, s_1 i_{1,1}+2p_1+\delta_1,\, s_2 i_{1,2},\, s_2 i_{1,2}+\delta_2}^{(3)}$ | $W_{s_1 i_{1,1}+2p_1+\delta_1,\, s_1 i_{1,1}+2p_1,\, s_2 i_{1,2}+\delta_2,\, s_2 i_{1,2}}^{(3)}$ |
| $i_2'$ | 12 | 13 |
| $i_{1,1}, i_{1,2}, k$ | $W_{s_1 i_{1,1}+3p_1,\, s_1 i_{1,1}+3p_1+\delta_1,\, s_2 i_{1,2},\, s_2 i_{1,2}+\delta_2}^{(3)}$ | $W_{s_1 i_{1,1}+3p_1+\delta_1,\, s_1 i_{1,1}+3p_1,\, s_2 i_{1,2}+\delta_2,\, s_2 i_{1,2}}^{(3)}$ |
| $i_2'$ | 16-31 | |
| $i_{1,1}, i_{1,2}, k$ | Entries 16-31 constructed with replacing $s_2 i_{1,2}$ in third and fourth subscripts with $s_2 i_{1,2} + p_2$ in entries 0-15. | |
| $i_2'$ | 2 | 3 |
| $i_{1,1}, i_{1,2}, k$ | $\tilde{W}_{s_1 i_{1,1},\, s_1 i_{1,1}+\delta_1,\, s_2 i_{1,2},\, s_2 i_{1,2}+\delta_2}^{(3)}$ | $\tilde{W}_{s_1 i_{1,1}+\delta_1,\, s_1 i_{1,1},\, s_2 i_{1,2}+\delta_2,\, s_2 i_{1,2}}^{(3)}$ |
| $i_2'$ | 6 | 7 |
| $i_{1,1}, i_{1,2}, k$ | $\tilde{W}_{s_1 i_{1,1}+p_1,\, s_1 i_{1,1}+p_1+\delta_1,\, s_2 i_{1,2},\, s_2 i_{1,2}+\delta_2}^{(3)}$ | $\tilde{W}_{s_1 i_{1,1}+p_1+\delta_1,\, s_1 i_{1,1}+p_1,\, s_2 i_{1,2}+\delta_2,\, s_2 i_{1,2}}^{(3)}$ |
| $i_2'$ | 10 | 11 |
| $i_{1,1}, i_{1,2}, k$ | $\tilde{W}_{s_1 i_{1,1}+2p_1,\, s_1 i_{1,1}+2p_1+\delta_1,\, s_2 i_{1,2},\, s_2 i_{1,2}+\delta_2}^{(3)}$ | $\tilde{W}_{s_1 i_{1,1}+2p_1+\delta_1,\, s_1 i_{1,1}+2p_1,\, s_2 i_{1,2}+\delta_2,\, s_2 i_{1,2}}^{(3)}$ |
| $i_2'$ | 14 | 15 |
| $i_{1,1}, i_{1,2}, k$ | $\tilde{W}_{s_1 i_{1,1}+3p_1,\, s_1 i_{1,1}+3p_1+\delta_1,\, s_2 i_{1,2},\, s_2 i_{1,2}+\delta_2}^{(3)}$ | $\tilde{W}_{s_1 i_{1,1}+3p_1+\delta_1,\, s_1 i_{1,1}+3p_1,\, s_2 i_{1,2}+\delta_2,\, s_2 i_{1,2}}^{(3)}$ |
| $i_2'$ | 16-31 | |
| $i_{1,1}, i_{1,2}, k$ | Entries 16-31 constructed with replacing $s_2 i_{1,2}$ in third and fourth subscripts with $s_2 i_{1,2} + p_2$ in entries 0-15. | |

TABLE 80

| Codebook for 4 layer CSI reporting | | |
|---|---|---|
| $i_2'$ | 0 | 1 |
| $i_{1,1}, i_{1,2}, k$ | $W_{s_1 i_{1,1},\, s_1 i_{1,1}+\delta_1,\, s_2 i_{1,2},\, s_2 i_{1,2}+\delta_2,\, 0}^{(4)}$ | $W_{s_1 i_{1,1},\, s_1 i_{1,1}+\delta_1,\, s_2 i_{1,2},\, s_2 i_{1,2}+\delta_2,\, 1}^{(4)}$ |
| $i_2'$ | 4 | 5 |
| $i_{1,1}, i_{1,2}, k$ | $W_{s_1 i_{1,1}+2p_1,\, s_1 i_{1,1}+2p_1+\delta_1,\, s_2 i_{1,2},\, s_2 i_{1,2}+\delta_2,\, 0}^{(4)}$ | $W_{s_1 i_{1,1}+2p_1,\, s_1 i_{1,1}+2p_1+\delta_1,\, s_2 i_{1,2},\, s_2 i_{1,2}+\delta_2,\, 1}^{(4)}$ |
| $i_2'$ | 8-15 | |
| $i_{1,1}, i_{1,2}, k$ | Entries 8-15 constructed with replacing $s_2 i_{1,2}$ in third and fourth subscripts with $s_2 i_{1,2} + p_2$ in entries 0-7. | |
| $i_2'$ | 2 | 3 |
| $i_{1,1}, i_{1,2}, k$ | $W_{s_1 i_{1,1}+p_1,\, s_1 i_{1,1}+p_1+\delta_1,\, s_2 i_{1,2},\, s_2 i_{1,2}+\delta_2,\, 0}^{(4)}$ | $W_{s_1 i_{1,1}+p_1,\, s_1 i_{1,1}+p_1+\delta_1,\, s_2 i_{1,2},\, s_2 i_{1,2}+\delta_2,\, 1}^{(4)}$ |
| $i_2'$ | 6 | 7 |
| $i_{1,1}, i_{1,2}, k$ | $W_{s_1 i_{1,1}+3p_1,\, s_1 i_{1,1}+3p_1+\delta_1,\, s_2 i_{1,2},\, s_2 i_{1,2}+\delta_2,\, 0}^{(4)}$ | $W_{s_1 i_{1,1}+3p_1,\, s_1 i_{1,1}+3p_1+\delta_1,\, s_2 i_{1,2},\, s_2 i_{1,2}+\delta_2,\, 1}^{(4)}$ |
| $i_2'$ | 8-15 | |
| $i_{1,1}, i_{1,2}, k$ | Entries 8-15 constructed with replacing $s_2 i_{1,2}$ in third and fourth subscripts with $s_2 i_{1,2} + p_2$ in entries 0-7. | |

TABLE 87-1

| Codebook for 1-layer CSI reporting using antenna ports 15 to 14 + P (Codebook-Config No. 1) | | | | | | |
|---|---|---|---|---|---|---|
| Value of | | | $i_2$ | | | |
| Codebook-Config | $i_{1,1}$ | $i_{1,2}$ | 0 | 1 | 2 | 3 |
| 1 | $0, 1, \ldots, O_1N_1 - 1$ | $0, 1, \ldots, O_2N_2 - 1$ | $W^{(1)}_{i_{1,1},i_{1,2},0}$ | $W^{(1)}_{i_{1,1},i_{1,2},1}$ | $W^{(1)}_{i_{1,1},i_{1,2},2}$ | $W^{(1)}_{i_{1,1},i_{1,2},3}$ |

where $W^{(1)}_{l,m,n} = \frac{1}{\sqrt{P}}\begin{bmatrix} v_{l,m} \\ \varphi_n v_{l,m} \end{bmatrix}$

TABLE 87-2

Codebook for 1-layer CSI reporting using antenna ports 15 to 14 + P (Codebook-Config No. 2)

| Value of Codebook-Config | $i_{1,1}$ | $i_{1,2}$ | $i_2$: 0 | 1 | 2 | 3 |
|---|---|---|---|---|---|---|
| 2 | $0, 1, \ldots, \frac{N_1 O_1}{2} - 1$ | $0, 1, \ldots, \frac{N_2 O_2}{2} - 1$ | $W^{(1)}_{2i_{1,1},2i_{1,2},0}$ | $W^{(1)}_{2i_{1,1},2i_{1,2},1}$ | $W^{(1)}_{2i_{1,1},2i_{1,2},2}$ | $W^{(1)}_{2i_{1,1},2i_{1,2},3}$ |
| Value of Codebook-Config | $i_{1,1}$ | $i_{1,2}$ | $i_2$: 4 | 5 | 6 | 7 |
| 2 | $0, 1, \ldots, \frac{N_1 O_1}{2} - 1$ | $0, 1, \ldots, \frac{N_2 O_2}{2} - 1$ | $W^{(1)}_{2i_{1,1}+1,2i_{1,2},0}$ | $W^{(1)}_{2i_{1,1}+1,2i_{1,2},1}$ | $W^{(1)}_{2i_{1,1}+1,2i_{1,2},2}$ | $W^{(1)}_{2i_{1,1}+1,2i_{1,2},3}$ |
| Value of Codebook-Config | $i_{1,1}$ | $i_{1,2}$ | $i_2$: 8 | 9 | 10 | 11 |
| 2 | $0, 1, \ldots, \frac{N_1 O_1}{2} - 1$ | $0, 1, \ldots, \frac{N_2 O_2}{2} - 1$ | $W^{(1)}_{2i_{1,1},2i_{1,2}+1,0}$ | $W^{(1)}_{2i_{1,1},2i_{1,2}+1,1}$ | $W^{(1)}_{2i_{1,1},2i_{1,2}+1,1}$ | $W^{(1)}_{2i_{1,1},2i_{1,2}+1,3}$ |
| Value of Codebook-Config | $i_{1,1}$ | $i_{1,2}$ | $i_2$: 12 | 13 | 14 | 15 |
| 2 | $0, 1, \ldots, \frac{N_1 O_1}{2} - 1$ | $0, 1, \ldots, \frac{N_2 O_2}{2} - 1$ | $W^{(1)}_{2i_{1,1}+1,2i_{1,2}+1,0}$ | $W^{(1)}_{2i_{1,1}+1,2i_{1,2}+1,1}$ | $W^{(1)}_{2i_{1,1}+1,2i_{1,2}+1,2}$ | $W^{(1)}_{2i_{1,1}+1,2i_{1,2}+1,3}$ |

where $W^{(1)}_{l,m,n} = \frac{1}{\sqrt{P}} \begin{bmatrix} v_{l,m} \\ \varphi_n v_{l,m} \end{bmatrix}$

TABLE 87-3

Codebook for 1-layer CSI reporting using antenna ports 15 to 14 + P (Codebook-Config No.3)

| Value of Codebook-Config | $i_{1,1}$ | $i_{1,2}$ | $i_2$: 0 | 1 | 2 | 3 |
|---|---|---|---|---|---|---|
| 3 | $0, 1, \ldots, \frac{N_1 O_1}{2} - 1$ | $0, 1, \ldots, \frac{N_2 O_2}{2} - 1$ | $W^{(1)}_{2x,2y,0}$ | $W^{(1)}_{2x,2y,1}$ | $W^{(1)}_{2x,2y,2}$ | $W^{(1)}_{2x,2y,3}$ |
| Value of Codebook-Config | $i_{1,1}$ | $i_{1,2}$ | $i_2$: 4 | 5 | 6 | 7 |
| 3 | $0, 1, \ldots, \frac{N_1 O_1}{2} - 1$ | $0, 1, \ldots, \frac{N_2 O_2}{2} - 1$ | $W^{(1)}_{2x+2,2y,0}$ | $W^{(1)}_{2x+2,2y,1}$ | $W^{(1)}_{2x+2,2y,2}$ | $W^{(1)}_{2x+2,2y,3}$ |
| Value of Codebook-Config | $i_{1,1}$ | $i_{1,2}$ | $i_2$: 8 | 9 | 10 | 11 |
| 3 | $0, 1, \ldots, \frac{N_1 O_1}{2} - 1$ | $0, 1, \ldots, \frac{N_2 O_2}{2} - 1$ | $W^{(1)}_{2x+1,2y+1,0}$ | $W^{(1)}_{2x+1,2y+1,1}$ | $W^{(1)}_{2x+1,2y+1,2}$ | $W^{(1)}_{2x+1,2y+1,3}$ |
| Value of Codebook-Config | $i_{1,1}$ | $i_{1,2}$ | $i_2$: 12 | 13 | 14 | 15 |
| 3 | $0, 1, \ldots, \frac{N_1 O_1}{2} - 1$ | $0, 1, \ldots, \frac{N_2 O_2}{2} - 1$ | $W^{(1)}_{2x+3,2y+1,0}$ | $W^{(1)}_{2x+3,2y+1,1}$ | $W^{(1)}_{2x+3,2y+1,2}$ | $W^{(1)}_{2x+3,2y+1,3}$ |

where $x = i_{1,1}$, $y = i_{1,2}$, $W^{(1)}_{l,m,n} = \frac{1}{\sqrt{P}} \begin{bmatrix} v_{l,m} \\ \varphi_n v_{l,m} \end{bmatrix}$, if $N_1 \geq N_2$ $x = i_{1,2}$, $y = i_{1,1}$, $W^{(1)}_{l,m,n} = \frac{1}{\sqrt{P}} \begin{bmatrix} v_{m,l} \\ \varphi_n v_{m,l} \end{bmatrix}$, if $N_1 < N_2$ Table 87-4

| Codebook for 1-layer CSI reporting using antenna ports 15 to 14 + P (Codebook-Config No. 4) | | | | | | |
|---|---|---|---|---|---|---|
| Value of | | | $i_2$ | | | |
| Codebook-Config | $i_{1,1}$ | $i_{1,2}$ | 0 | 1 | 2 | 3 |
| 4 | $0, 1, \ldots, \frac{N_1 O_1}{2} - 1$ | $0, 1, \ldots, \frac{N_2 O_2}{2} - 1$ | $W^{(1)}_{2x,2y,0}$ | $W^{(1)}_{2x,2y,1}$ | $W^{(1)}_{2x,2y,2}$ | $W^{(1)}_{2x,2y,3}$ |
| Value of | | | $i_2$ | | | |
| Codebook-Config | $i_{1,1}$ | $i_{1,2}$ | 4 | 5 | 6 | 7 |
| 4 | $0, 1, \ldots, \frac{N_1 O_1}{2} - 1$ | $0, 1, \ldots, \frac{N_2 O_2}{2} - 1$ | $W^{(1)}_{2x+1,2y,0}$ | $W^{(1)}_{2x+1,2y,1}$ | $W^{(1)}_{2x+1,2y,2}$ | $W^{(1)}_{2x+1,2y,3}$ |
| Value of | | | $i_2$ | | | |
| Codebook-Config | $i_{1,1}$ | $i_{1,2}$ | 8 | 9 | 10 | 11 |
| 4 | $0, 1, \ldots, \frac{N_1 O_1}{2} - 1$ | $0, 1, \ldots, \frac{N_2 O_2}{2} - 1$ | $W^{(1)}_{2x+2,2y,0}$ | $W^{(1)}_{2x+2,2y,1}$ | $W^{(1)}_{2x+2,2y,2}$ | $W^{(1)}_{2x+2,2y,3}$ |
| Value of | | | $i_2$ | | | |
| Codebook-Config | $i_{1,1}$ | $i_{1,2}$ | 12 | 13 | 14 | 15 |
| 4 | $0, 1, \ldots, \frac{N_1 O_1}{2} - 1$ | $0, 1, \ldots, \frac{N_2 O_2}{2} - 1$ | $W^{(1)}_{2x+3,2y,0}$ | $W^{(1)}_{2x+3,2y,1}$ | $W^{(1)}_{2x+3,2y,2}$ | $W^{(1)}_{2x+3,2y,3}$ |

where $x = i_{1,1}$, $y = i_{1,2}$, $W^{(1)}_{l,m,n} = \frac{1}{\sqrt{P}}\begin{bmatrix} v_{l,m} \\ \varphi_n v_{l,m} \end{bmatrix}$, if $N_1 \geq N_2$ $x = i_{1,2}$, $y = i_{1,1}$, $W^{(1)}_{l,m,n} = \frac{1}{\sqrt{P}}\begin{bmatrix} v_{m,l} \\ \varphi_n v_{m,l} \end{bmatrix}$, if $N_1 < N_2$

TABLE 88-1

| Codebook for 2-layer CSI reporting using antenna ports 15 to 14 + P (Codebook-Config No. 1) | | | | | | |
|---|---|---|---|---|---|---|
| Value of | | | $i_2$ | | | |
| Codebook-Config | $i_{1,1}$ | $i_{1,2}$ | 0 | 1 | 2 | 3 |
| 1 | $0, 1, \ldots, O_1N_1 - 1$ | $0, 1, \ldots, O_2N_2 - 1$ | $W^{(2)}_{i_{1,1},i_{1,1},i_{1,2},i_{1,2},0}$ | $W^{(2)}_{i_{1,1},i_{1,1},i_{1,2},i_{1,2},1}$ | $W^{(2)}_{i_{1,1},i_{1,1},i_{1,2},i_{1,2},2}$ | $W^{(2)}_{i_{1,1},i_{1,1},i_{1,2},i_{1,2},3}$ |

$$W^{(2)}_{l,l',m,m',n} = \frac{1}{\sqrt{2P}}\begin{bmatrix} v_{l,m} & v_{l',m'} \\ \varphi_n v_{l,m} & -\varphi_n v_{l',m'} \end{bmatrix}$$

TABLE 88-2

| Codebook for 2-layer CSI reporting using antenna ports 15 to 14 + P (Codebook-Config No. 2) | | | | |
|---|---|---|---|---|
| Value of | | | $i_2$ | |
| Codebook-Config | $i_{1,1}$ | $i_{1,2}$ | 0 | 1 |
| 2 | $0, 1, \ldots, \frac{N_1 O_1}{2} - 1$ | $0, 1, \ldots, \frac{N_2 O_2}{2} - 1$ | $W^{(2)}_{2i_{1,1},2i_{1,1},2i_{1,2},2i_{1,2},0}$ | $W^{(2)}_{2i_{1,1},2i_{1,1},2i_{1,2},2i_{1,2},1}$ |
| Value of | | | $i_2$ | |
| Codebook-Config | $i_{1,1}$ | $i_{1,2}$ | 2 | 3 |
| 2 | $0, 1, \ldots, \frac{N_1 O_1}{2} - 1$ | $0, 1, \ldots, \frac{N_2 O_2}{2} - 1$ | $W^{(2)}_{2i_{1,1}+p,2i_{1,1}+p,2i_{1,2},2i_{1,2},0}$ | $W^{(2)}_{2i_{1,1}+p,2i_{1,1}+p,2i_{1,2},2i_{1,2},1}$ |

TABLE 88-2-continued

| Value of Codebook-Config | $i_{1,1}$ | $i_{1,2}$ | $i_2$: 4 | $i_2$: 5 |
|---|---|---|---|---|
| 2 | $0, 1, \ldots, \frac{N_1 O_1}{2} - 1$ | $0, 1, \ldots, \frac{N_2 O_2}{2} - 1$ | $W^{(2)}_{2i_{1,1}+p,2i_{1,1}+p,2i_{1,2}+1,2i_{1,2}+1,0}$ | $W^{(2)}_{2i_{1,1}+p,2i_{1,1}+p,2i_{1,2}+1,2i_{1,2}+1,1}$ |
| **Value of Codebook-Config** | **$i_{1,1}$** | **$i_{1,2}$** | **$i_2$: 6** | **$i_2$: 7** |
| 2 | $0, 1, \ldots, \frac{N_1 O_1}{2} - 1$ | $0, 1, \ldots, \frac{N_2 O_2}{2} - 1$ | $W^{(2)}_{2i_{1,1},2i_{1,1},2i_{1,2}+1,2i_{1,2}+1,0}$ | $W^{(2)}_{2i_{1,1},2i_{1,1},2i_{1,2}+1,2i_{1,2}+1,1}$ |
| **Value of Codebook-Config** | **$i_{1,1}$** | **$i_{1,2}$** | **$i_2$: 8** | **$i_2$: 9** |
| 2 | $0, 1, \ldots, \frac{N_1 O_1}{2} - 1$ | $0, 1, \ldots, \frac{N_2 O_2}{2} - 1$ | $W^{(2)}_{2i_{1,1},2i_{1,1}+p,2i_{1,2},2i_{1,2},0}$ | $W^{(2)}_{2i_{1,1},2i_{1,1}+p,2i_{1,2},2i_{1,2},1}$ |
| **Value of Codebook-Config** | **$i_{1,1}$** | **$i_{1,2}$** | **$i_2$: 10** | **$i_2$: 11** |
| 2 | $0, 1, \ldots, \frac{N_1 O_1}{2} - 1$ | $0, 1, \ldots, \frac{N_2 O_2}{2} - 1$ | $W^{(2)}_{2i_{1,1},2i_{1,1}+p,2i_{1,2}+1,2i_{1,2}+1,0}$ | $W^{(2)}_{2i_{1,1},2i_{1,1}+p,2i_{1,2}+1,2i_{1,2}+1,1}$ |
| **Value of Codebook-Config** | **$i_{1,1}$** | **$i_{1,2}$** | **$i_2$: 12** | **$i_2$: 13** |
| 2 | $0, 1, \ldots, \frac{N_1 O_1}{2} - 1$ | $0, 1, \ldots, \frac{N_2 O_2}{2} - 1$ | $W^{(2)}_{2i_{1,1},2i_{1,1},2i_{1,2},2i_{1,2}+1,0}$ | $W^{(2)}_{2i_{1,1},2i_{1,1},2i_{1,2},2i_{1,2}+1,1}$ |
| **Value of Codebook-Config** | **$i_{1,1}$** | **$i_{1,2}$** | **$i_2$: 14** | **$i_2$: 15** |
| 2 | $0, 1, \ldots, \frac{N_1 O_1}{2} - 1$ | $0, 1, \ldots, \frac{N_2 O_2}{2} - 1$ | $W^{(2)}_{2i_{1,1}+p,2i_{1,1}+p,2i_{1,2},2i_{1,2}+1,0}$ | $W^{(2)}_{2i_{1,1}+p,2i_{1,1}+p,2i_{1,2},2i_{1,2}+1,1}$ |

where $W^{(2)}_{l,l',m,m',n} = \frac{1}{\sqrt{2P}} \begin{bmatrix} v_{l,m} & v_{l',m'} \\ \varphi_n v_{l,m} & -\varphi_n v_{l',m'} \end{bmatrix}$;

If $N_1 > N_2$, then $p = 1$ otherwise $p = O_1$.

TABLE 88-3

Codebook for 2-layer CSI reporting using antenna ports 15 to 14 + P(Codebook-Config No. 3)

| Value of Codebook-Config | $i_{1,1}$ | $i_{1,2}$ | $i_2$: 0 | $i_2$: 1 | $i_2$: 2 |
|---|---|---|---|---|---|
| 3 | $0, 1, \ldots, \frac{N_1 O_1}{2} - 1$ | $0, 1, \ldots, \frac{N_2 O_2}{2} - 1$ | $W_{2x,2x,2y,2y,0}^{(2)}$ | $W_{2x,2x,2y,2y,1}^{(2)}$ | $W_{2x+1,2x+1,2y+1,2y+1,0}^{(2)}$ |
| **Value of Codebook-Config** | **$i_{1,1}$** | **$i_{1,2}$** | **$i_2$: 3** | **$i_2$: 4** | **$i_2$: 5** |
| 3 | $0, 1, \ldots, \frac{N_1 O_1}{2} - 1$ | $0, 1, \ldots, \frac{N_2 O_2}{2} - 1$ | $W_{2x+1,2x+1,2y+1,2y+1,1}^{(2)}$ | $W_{2x+2,2x+2,2y,2y,0}^{(2)}$ | $W_{2x+2,2x+2,2y,2y,1}^{(2)}$ |

TABLE 88-3-continued

Codebook for 2-layer CSI reporting using antenna ports 15 to 14 + P(Codebook-Config No. 3)

| Value of Codebook-Config | $i_{1,1}$ | $i_{1,2}$ | $i_2$: 6 | $i_2$: 7 | $i_2$: 8 |
|---|---|---|---|---|---|
| 3 | $0, 1, \ldots, \frac{N_1O_1}{2}-1$ | $0, 1, \ldots, \frac{N_2O_2}{2}-1$ | $W_{2x+3,2x+3,2y+1,2y+1,0}^{(2)}$ | $W_{2x+3,2x+3,2y+1,2y+1,1}^{(2)}$ | $W_{2x,2x+1,2y,2y+1,0}^{(2)}$ |

| Value of Codebook-Config | $i_{1,1}$ | $i_{1,2}$ | $i_2$: 9 | $i_2$: 10 | $i_2$: 11 |
|---|---|---|---|---|---|
| 3 | $0, 1, \ldots, \frac{N_1O_1}{2}-1$ | $0, 1, \ldots, \frac{N_2O_2}{2}-1$ | $W_{2x,2x+1,2y,2y+1,1}^{(2)}$ | $W_{2x+1,2x+2,2y+1,2y,0}^{(2)}$ | $W_{2x+1,2x+2,2y+1,2y,1}^{(2)}$ |

| Value of Codebook-Config | $i_{1,1}$ | $i_{1,2}$ | $i_2$: 12 | $i_2$: 13 | $i_2$: 14 |
|---|---|---|---|---|---|
| 3 | $0, 1, \ldots, \frac{N_1O_1}{2}-1$ | $0, 1, \ldots, \frac{N_2O_2}{2}-1$ | $W_{2x,2x+3,2y,2y+1,0}^{(2)}$ | $W_{2x,2x+3,2y,2y+1,1}^{(2)}$ | $W_{2x+1,2x+3,2y+1,2y+1,0}^{(2)}$ |

| Value of Codebook-Config | $i_{1,1}$ | $i_{1,2}$ | $i_2$: 15 |
|---|---|---|---|
| 3 | $0, 1, \ldots, \frac{N_1O_1}{2}-1$ | $0, 1, \ldots, \frac{N_2O_2}{2}-1$ | $W_{2x+1,2x+3,2y+1,2y+1,1}^{(2)}$ |

where $x = i_{1,1}$, $y = i_{1,2}$, $W_{l,l',m,m',n}^{(2)} = \frac{1}{\sqrt{2}P}\begin{bmatrix} v_{l,m} & v_{l',m'} \\ \varphi_n v_{l,m} & -\varphi_n v_{l',m'} \end{bmatrix}$ if $N_1 \geqq N_2$ and $x = i_{1,2}$, $y = i_{1,1}$, $W_{l,l',m,m',n}^{(2)} = \frac{1}{\sqrt{2P}}\begin{bmatrix} v_{m,l} & v_{m',l'} \\ \varphi_n v_{m,l} & -\varphi_n v_{m',l'} \end{bmatrix}$, if $N_1 < N_2$

TABLE 88-4

Codebook for 2-layer CSI reporting using antenna ports 15 to 14 + P (Codebook-Config No. 4)

| Value of Codebook-Config | $i_{1,1}$ | $i_{1,2}$ | $i_2$: 0 | $i_2$: 1 | $i_2$: 2 | $i_2$: 3 |
|---|---|---|---|---|---|---|
| 4 | $0, 1, \ldots, \frac{N_1O_1}{2}-1$ | $0, 1, \ldots, \frac{N_2O_2}{2}-1$ | $W_{2x,2x,2y,2y,0}^{(2)}$ | $W_{2x,2x,2y,2y,1}^{(2)}$ | $W_{2x+1,2x+1,2y,2y,0}^{(2)}$ | $W_{2x+1,2x+1,2y,2y,1}^{(2)}$ |

| Value of Codebook-Config | $i_{1,1}$ | $i_{1,2}$ | $i_2$: 4 | $i_2$: 5 | $i_2$: 6 | $i_2$: 7 |
|---|---|---|---|---|---|---|
| 4 | $0, 1, \ldots, \frac{N_1O_1}{2}-1$ | $0, 1, \ldots, \frac{N_2O_2}{2}-1$ | $W_{2x+2,2x+2,2y,2y,0}^{(2)}$ | $W_{2x+2,2x+2,2y,2y,1}^{(2)}$ | $W_{2x+3,2x+3,2y,2y,0}^{(2)}$ | $W_{2x+3,2x+3,2y,2y,1}^{(2)}$ |

| Value of Codebook-Config | $i_{1,1}$ | $i_{1,2}$ | $i_2$: 8 | $i_2$: 9 | $i_2$: 10 | $i_2$: 11 |
|---|---|---|---|---|---|---|
| 4 | $0, 1, \ldots, \frac{N_1O_1}{2}-1$ | $0, 1, \ldots, \frac{N_2O_2}{2}-1$ | $W_{2x,2x+1,2y,2y,0}^{(2)}$ | $W_{2x,2x+1,2y,2y,1}^{(2)}$ | $2_{x+1,2x+2,2y,2y,0}^{(2)}$ | $2_{2x+1,2x+2,2y,2y,1}^{(2)}$ |

TABLE 88-4-continued

| Codebook for 2-layer CSI reporting using antenna ports 15 to 14 + P (Codebook-Config No. 4) | | | | | | |
|---|---|---|---|---|---|---|
| Value of | | | $i_2$ | | | |
| Codebook-Config | $i_{1,1}$ | $i_{1,2}$ | 12 | 13 | 14 | 15 |
| 4 | $0, 1, \ldots, \frac{N_1 O_1}{2} - 1$ | $0, 1, \ldots, \frac{N_2 O_2}{2} - 1$ | $W_{2x,2x+3,2y,2y,0}^{(2)}$ | $W_{2x,2x+3,2y,2y,1}^{(2)}$ | $2_{x+1,2x+3,2y,2y,0}^{(2)}$ | $W_{2x+1,2x+3,2y,2y,1}^{(2)}$ |

where $x = i_{1,1}$, $y = i_{1,2}$, $W_{l,l',m,m',n}^{(2)} = \frac{1}{\sqrt{2}P}\begin{bmatrix} v_{l,m} & v_{l',m'} \\ \varphi_n v_{l,m} & -\varphi_n v_{l',m'} \end{bmatrix}$ if $N_1 \geqq N_2$ and $x = i_{1,2}$, $y = i_{1,1}$, $W_{l,l',m,m',n}^{(2)} = \frac{1}{\sqrt{2P}}\begin{bmatrix} v_{m,l} & v_{m',l'} \\ \varphi_n v_{m,l} & -\varphi_n v_{m',l'} \end{bmatrix}$, if $N_1 < N_2$

TABLE 89-1

| Codebook for 3-layer CSI reporting using antenna ports 15 to 14 + P (Codebook-Config No. 1) | | | | |
|---|---|---|---|---|
| | | $N_1 > 1$, $N_2 > 1$ | | |
| Value of | | | $i_2$ | |
| Codebook-Config | $i_{1,1}$ | $i_{1,2}$ | 0 | 1 |
| 1 | $0, 1, \ldots, O_1N_1 - 1$<br>$O_1N_1, O_1N_1 + 1, \ldots, 2O_1N_1 - 1$ | $0, 1, \ldots, O_2N_2 - 1$<br>$0, 1, \ldots, O_2N_2 - 1$ | $W_{i_{1,1}, i_{1,1}+O_1, i_{1,2}, i_{1,2}}^{(3)}$<br>$W_{i_{1,1}, i_{1,1}, i_{1,2}, i_{1,2}+O_2}^{(3)}$ | $\tilde{W}_{i_{1,1}, i_{1,1}+O_1, i_{1,2}, i_{1,2}}^{(3)}$<br>$\tilde{W}_{i_{1,1}, i_{1,1}, i_{1,2}, i_{1,2}+O_2}^{(3)}$ |

where $W_{l,l',m,m'}^{(3)} = \frac{1}{\sqrt{3P}}\begin{bmatrix} v_{l,m} & v_{l,m} & v_{l',m'} \\ v_{l,m} & -v_{l,m} & -v_{l',m'} \end{bmatrix}$ and $\tilde{W}_{l,l',m,m'}^{(3)} = \frac{1}{\sqrt{3P}}\begin{bmatrix} v_{l,m} & v_{l',m'} & v_{l',m'} \\ v_{l,m} & v_{l',m'} & -v_{l',m'} \end{bmatrix}$

| | | $N_2 = 1$ | | |
|---|---|---|---|---|
| Value of | | | $i_2$ | |
| Codebook-Config | $i_{1,1}$ | $i_{1,2}$ | 0 | 1 |
| 1 | $0, 1, \ldots, O_1N_1 - 1$<br>$O_1N_1, O_1N_1 + 1, \ldots, 2O_1N_1 - 1$<br>$2O_1N_1, \ldots, 3O_1N_1 - 1$ | 0<br>0<br>0 | $W_{i_{1,1}, i_{1,1}+O_1, 0, 0}^{(3)}$<br>$W_{i_{1,1}, i_{1,1}+2O_1, 0, 0}^{(3)}$<br>$W_{i_{1,1}, i_{1,1}+3O_1, 0, 0}^{(3)}$ | $\tilde{W}_{i_{1,1}, i_{1,1}+O_1, 0, 0}^{(3)}$<br>$\tilde{W}_{i_{1,1}, i_{1,1}+2O_1, 0, 0}^{(3)}$<br>$\tilde{W}_{i_{1,1}, i_{1,1}+3O_1, 0, 0}^{(3)}$ |

where $W_{l,l',m,m'}^{(3)} = \frac{1}{\sqrt{3P}}\begin{bmatrix} v_{l,m} & v_{l,m} & v_{l',m'} \\ v_{l,m} & -v_{l,m} & -v_{l',m'} \end{bmatrix}$ and $\tilde{W}_{l,l',m,m'}^{(3)} = \frac{1}{\sqrt{3P}}\begin{bmatrix} v_{l,m} & v_{l',m'} & v_{l',m'} \\ v_{l,m} & v_{l',m'} & -v_{l',m'} \end{bmatrix}$

TABLE 89-2

| Codebook for 3-layer CSI reporting using antenna ports 15 to 14 + P (Codebook-Config No. 2) | | | | | |
|---|---|---|---|---|---|
| Value of Codebook- | | | | $i_2$ | |
| Config | $i_{1,1}$ | $i_{1,2}$ | 0 | 1 | 2 |
| 2 | $0, \ldots, 2N_1 - 1$<br>$2N_1, \ldots, 4N_1 - 1$ | $0, 1, \ldots, 2N_2 - 1$<br>$0, 1, \ldots, 2N_2 - 1$ | $W_{2i_{1,1}, 2i_{1,1}+4, 2i_{1,2}, 2i_{1,2}}^{(3)}$<br>$W_{2i_{1,1}, 2i_{1,1}, 2i_{1,2}, 2i_{1,2}+4}^{(3)}$ | $W_{2i_{1,1}+4, 2i_{1,1}, 2i_{1,2}, 2i_{1,2}}^{(3)}$<br>$W_{2i_{1,1}, 2i_{1,1}, 2i_{1,2}+4, 2i_{1,2}}^{(3)}$ | $\tilde{W}_{2i_{1,1}, 2i_{1,1}+4, 2i_{1,2}, 2i_{1,2}}^{(3)}$<br>$\tilde{W}_{2i_{1,1}, 2i_{1,1}, 2i_{1,2}, 2i_{1,2}+4}^{(3)}$ |
| Value of Codebook- | | | | $i_2$ | |
| Config | $i_{1,1}$ | $i_{1,2}$ | 3 | 4 | 5 |
| 2 | $0, \ldots, 2N_1 - 1$<br>$2N_1, \ldots, 4N_1 - 1$ | $0, 1, \ldots, 2N_2 - 1$<br>$0, 1, \ldots, 2N_2 - 1$ | $\tilde{W}_{2i_{1,1}+4, 2i_{1,1}, 2i_{1,2}, 2i_{1,2}}^{(3)}$<br>$\tilde{W}_{2i_{1,1}, 2i_{1,1}, 2i_{1,2}+4, 2i_{1,2}}^{(3)}$ | $W_{2i_{1,1}+1, 2i_{1,1}+5, 2i_{1,2}, 2i_{1,2}}^{(3)}$<br>$W_{2i_{1,1}+1, 2i_{1,1}+1, 2i_{1,2}, 2i_{1,2}+4}^{(3)}$ | $W_{2i_{1,1}+5, 2i_{1,1}+1, 2i_{1,2}, 2i_{1,2}}^{(3)}$<br>$W_{2i_{1,1}+1, 2i_{1,1}+1, 2i_{1,2}+4, 2i_{1,2}}^{(3)}$ |
| Value of Codebook- | | | | $i_2$ | |
| Config | $i_{1,1}$ | $i_{1,2}$ | 6 | 7 | 8 |
| 2 | $0, \ldots, 2N_1 - 1$<br>$2N_1, \ldots, 4N_1 - 1$ | $0, 1, \ldots, 2N_2 - 1$<br>$0, 1, \ldots, 2N_2 - 1$ | $\tilde{W}_{2i_{1,1}+1, 2i_{1,1}+5, 2i_{1,2}, 2i_{1,2}}^{(3)}$<br>$\tilde{W}_{2i_{1,1}+1, 2i_{1,1}+1, 2i_{1,2}, 2i_{1,2}+4}^{(3)}$ | $\tilde{W}_{2i_{1,1}+5, 2i_{1,1}+1, 2i_{1,2}, 2i_{1,2}}^{(3)}$<br>$\tilde{W}_{2i_{1,1}+1, 2i_{1,1}+1, 2i_{1,2}+4, 2i_{1,2}}^{(3)}$ | $W_{2i_{1,1}, 2i_{1,1}+4, 2i_{1,2}+1, 2i_{1,2}+1}^{(3)}$<br>$W_{2i_{1,1}, 2i_{1,1}, 2i_{1,2}+1, 2i_{1,2}+5}^{(3)}$ |

TABLE 89-2-continued

| Codebook for 3-layer CSI reporting using antenna ports 15 to 14 + P (Codebook-Config No. 2) | | | | | |
|---|---|---|---|---|---|
| Value of Codebook- | | | $i_2$ | | |
| Config | $i_{1,1}$ | $i_{1,2}$ | 9 | 10 | 11 |
| 2 | 0, . . . , $2N_1 - 1$<br>$2N_1$, . . . , $4N_1 - 1$ | 0, 1, . . . , $2N_2 - 1$<br>0, 1, . . . , $2N_2 - 1$ | $W_{2i_{1,1}+4,\ 2i_{1,1},\ 2i_{1,2}+1,\ 2i_{1,2}+1}^{(3)}$<br>$W_{2i_{1,1},\ 2i_{1,1},\ 2i_{1,2}+5,\ 2i_{1,2}+1}^{(3)}$ | $\tilde{W}_{2i_{1,1},\ 2i_{1,1}+4,\ 2i_{1,2}+1,\ 2i_{1,2}+1}^{(3)}$<br>$\tilde{W}_{2i_{1,1},\ 2i_{1,1},\ 2i_{1,2}+1,\ 2i_{1,2}+5}^{(3)}$ | $\tilde{W}_{2i_{1,1}+4,\ 2i_{1,1},\ 2i_{1,2}+1,\ 2i_{1,2}+1}^{(3)}$<br>$\tilde{W}_{2i_{1,1},\ 2i_{1,1},\ 2i_{1,2}+5,\ 2i_{1,2}+1}^{(3)}$ |
| Value of Codebook- | | | $i_2$ | | |
| Config | $i_{1,1}$ | $i_{1,2}$ | 12 | 13 | 14 |
| 2 | 0, . . . , $2N_1 - 1$<br>$2N_1$, . . . , $4N_1 - 1$ | 0, 1, . . . , $2N_2 - 1$<br>0, 1, . . . , $2N_2 - 1$ | $W_{2i_{1,1}+1,\ 2i_{1,1}+5,\ 2i_{1,2}+1,\ 2i_{1,2}+1}^{(3)}$<br>$W_{2i_{1,1}+1,\ 2i_{1,1}+1,\ 2i_{1,2}+1,\ 2i_{1,2}+5}^{(3)}$ | $W_{2i_{1,1}+5,\ 2i_{1,1}+1,\ 2i_{1,2}+1,\ 2i_{1,2}+1}^{(3)}$<br>$W_{2i_{1,1}+1,\ 2i_{1,1}+1,\ 2i_{1,2}+5,\ 2i_{1,2}+1}^{(3)}$ | $\tilde{W}_{2i_{1,1}+1,\ 2i_{1,1}+5,\ 2i_{1,2}+1,\ 2i_{1,2}+1}^{(3)}$<br>$\tilde{W}_{2i_{1,1}+1,\ 2i_{1,1}+1,\ 2i_{1,2}+1,\ 2i_{1,2}+5}^{(3)}$ |

| Value of Codebook- | | | $i_2$ |
|---|---|---|---|
| Config | $i_{1,1}$ | $i_{1,2}$ | 15 |
| 2 | 0, . . . , $2N_1 - 1$<br>$2N_1$, . . . , $4N_1 - 1$ | 0, 1, . . . , $2N_2 - 1$<br>0, 1, . . . , $2N_2 - 1$ | $\tilde{W}_{2i_{1,1}+5,\ 2i_{1,1}+1,\ 2i_{1,2}+1,\ 2i_{1,2}+1}^{(3)}$<br>$\tilde{W}_{2i_{1,1}+1,\ 2i_{1,1}+1,\ 2i_{1,2}+5,\ 2i_{1,2}+1}^{(3)}$ |

where $W_{l,l',m,m'}^{(3)} = \frac{1}{\sqrt{3P}}\begin{bmatrix} v_{\frac{O_1}{4}l,\frac{O_2}{4}m} & v_{\frac{O_1}{4}l,\frac{O_2}{4}m} & v_{\frac{O_1}{4}l',\frac{O_2}{4}m'} \\ v_{\frac{O_1}{4}l,\frac{O_2}{4}m} & -v_{\frac{O_1}{4}l,\frac{O_2}{4}m} & -v_{\frac{O_1}{4}l',\frac{O_2}{4}m'} \end{bmatrix}$, $\tilde{W}_{l,l',m,m'}^{(3)} = \frac{1}{\sqrt{3P}}\begin{bmatrix} v_{\frac{O_1}{4}l,\frac{O_2}{4}m} & v_{\frac{O_1}{4}l',\frac{O_2}{4}m'} & v_{\frac{O_1}{4}l',\frac{O_2}{4}m'} \\ v_{\frac{O_1}{4}l,\frac{O_2}{4}m} & -v_{\frac{O_1}{4}l',\frac{O_2}{4}m'} & -v_{\frac{O_1}{4}l',\frac{O_2}{4}m'} \end{bmatrix}$

TABLE 89-3

| Codebook for 3-layer CSI reporting using antenna ports 15 to 14 + P (Codebook-Config No. 3) | | | | | | |
|---|---|---|---|---|---|---|
| Value of Codebook- | | | $i_2$ | | | |
| Config | $i_{1,1}$ | $i_{1,2}$ | 0 | 1 | 2 | 3 |
| 3 | 0, . . . , $N_1 - 1$<br>$N_1$, . . . , $2N_1 - 1$ | 0, 1, . . . , $2N_1 - 1$<br>0, 1, . . . , $2N_1 - 1$ | $W_{4x+2,4x+6,2y,2y}^{(3)}$<br>$W_{4x+2,4x+2,2y,2y+4}^{(3)}$ | $W_{4x+6,4x+2,2y,2y}^{(3)}$<br>$W_{4x+2,4x+2,2y+4,2y}^{(3)}$ | $\tilde{W}_{4x+2,4x+6,2y,2y}^{(3)}$<br>$\tilde{W}_{4x+2,4x+2,2y,2y+4}^{(3)}$ | $\tilde{W}_{4x+6,4x+2,2y,2y}^{(3)}$<br>$\tilde{W}_{4x+2,4x+2,2y+4,2y}^{(3)}$ |
| Value of Codebook- | | | $i_2$ | | | |
| Config | $i_{1,1}$ | $i_{1,2}$ | 4 | 5 | 6 | 7 |
| 3 | 0, . . . , $N_1 - 1$<br>$N_1$, . . . , $2N_1 - 1$ | 0, 1, . . . , $2N_1 - 1$<br>0, 1, . . . , $2N_1 - 1$ | $W_{4x+3,4x+7,2y,2y}^{(3)}$<br>$W_{4x+3,4x+3,2y,2y+4}^{(3)}$ | $W_{4x+7,4x+3,2y,2y}^{(3)}$<br>$W_{4x+3,4x+3,2y+4,2y}^{(3)}$ | $\tilde{W}_{4x+3,4x+7,2y,2y}^{(3)}$<br>$\tilde{W}_{4x+3,4x+3,2y,2y+4}^{(3)}$ | $\tilde{W}_{4x+7,4x+3,2y,2y}^{(3)}$<br>$\tilde{W}_{4x+3,4x+3,2y+4,2y}^{(3)}$ |
| Value of Codebook- | | | $i_2$ | | | |
| Config | $i_{1,1}$ | $i_{1,2}$ | 8 | 9 | 10 | 11 |
| 3 | 0, . . . , $N_1 - 1$<br>$N_1$, . . . , $2N_1 - 1$ | 0, 1, . . . , $2N_1 - 1$<br>0, 1, . . . , $2N_1 - 1$ | $W_{4x,4x+4,2y+1,2y+1}^{(3)}$<br>$W_{4x,4x,2y+1,2y+5}^{(3)}$ | $W_{4x+4,4x,2y+1,2y+1}^{(3)}$<br>$W_{4x,4x,2y+5,2y+1}^{(3)}$ | $\tilde{W}_{4x,4x+4,2y+1,2y+1}^{(3)}$<br>$\tilde{W}_{4x,4x,2y+1,2y+5}^{(3)}$ | $\tilde{W}_{4x+4,4x,2y+1,2y+1}^{(3)}$<br>$\tilde{W}_{4x,4x,2y+5,2y+1}^{(3)}$ |
| Value of Codebook- | | | $i_2$ | | | |
| Config | $i_{1,1}$ | $i_{1,2}$ | 12 | 13 | 14 | 15 |
| 3 | 0, . . . , $N_1 - 1$<br>$N_1$, . . . , $2N_1 - 1$ | 0, 1, . . . , $2N_1 - 1$<br>0, 1, . . . , $2N_1 - 1$ | $W_{4x+1,4x+5,2y+1,2y+1}^{(3)}$<br>$W_{4x+1,4x+1,2y+1,2y+5}^{(3)}$ | $W_{4x+5,4x+1,2y+1,2y+1}^{(3)}$<br>$W_{4x+1,4x+1,2y+5,2y+1}^{(3)}$ | $\tilde{W}_{4x+1,4x+5,2y+1,2y+1}^{(3)}$<br>$\tilde{W}_{4x+1,4x+1,2y+1,2y+5}^{(3)}$ | $\tilde{W}_{4x+5,4x+1,2y+1,2y+1}^{(3)}$<br>$\tilde{W}_{4x+1,4x+1,2y+5,2y+1}^{(3)}$ |

where $x = i_{1,1}$, $y = i_{1,2}$, $W_{l,l',m,m'}^{(3)} = \frac{1}{\sqrt{3P}}\begin{bmatrix} v_{\frac{O_1}{4}l,\frac{O_2}{4}m} & v_{\frac{O_1}{4}l,\frac{O_2}{4}m} & v_{\frac{O_1}{4}l',\frac{O_2}{4}m'} \\ v_{\frac{O_1}{4}l,\frac{O_2}{4}m} & -v_{\frac{O_1}{4}l,\frac{O_2}{4}m} & -v_{\frac{O_1}{4}l',\frac{O_2}{4}m'} \end{bmatrix}$, $$\tilde{W}_{l,l',m,m'}^{(3)} = \frac{1}{\sqrt{3P}}\begin{bmatrix} v_{\frac{O_1 l}{4},\frac{O_2 m}{4}} & v_{\frac{O_1 l'}{4},\frac{O_2 m'}{4}} & v_{\frac{O_1 l'}{4},\frac{O_2 m'}{4}} \\ v_{\frac{O_1 l}{4},\frac{O_2 m}{4}} & v_{\frac{O_1 l'}{4},\frac{O_2 m'}{4}} & -v_{\frac{O, l'}{4},\frac{O_2 m'}{4}} \end{bmatrix}, \text{ if } N_1 \geqq N_2 \text{ and } x = i_{1,2},\ y = i_{1,1},$$

TABLE 89-3-continued

Codebook for 3-layer CSI reporting using antenna ports 15 to 14 + P (Codebook-Config No. 3)

$$W^{(3)}_{l,l',m,m'} = \frac{1}{\sqrt{3P}}\begin{bmatrix} v_{\frac{O_1}{4}m,\frac{O_2}{4}l} & v_{\frac{O_1}{4}m,\frac{O_2}{4}l} & v_{\frac{O_1}{4}m',\frac{O_2}{4}l'} \\ v_{\frac{O_1}{4}m,\frac{O_2}{4}l} & -v_{\frac{O_1}{4}m,\frac{O_2}{4}l} & -v_{\frac{O_1}{4}m',\frac{O_2}{4}l'} \end{bmatrix}, W^{(3)}_{l,l',m,m'} = \frac{1}{\sqrt{3P}}\begin{bmatrix} v_{\frac{O_1}{4}m,\frac{O_2}{4}l} & v_{\frac{O_1}{4}m',\frac{O_2}{4}l'} & v_{\frac{O_1}{4}m',\frac{O_2}{4}l'} \\ v_{\frac{O_1}{4}m,\frac{O_2}{4}l} & -v_{\frac{O_1}{4}m',\frac{O_2}{4}l'} & -v_{\frac{O_1}{4}m',\frac{O_2}{4}l'} \end{bmatrix}, \text{if } N_1 < N_2.$$

TABLE 89-4

Codebook for 3-layer CSI reporting using antenna ports 15 to 14 + P (Codebook-Config No. 4)
$N_1 > 1, N_2 > 1$

| Value of Codebook-Config | $i_{1,1}$ | $i_{1,2}$ | $i_2$ = 0 | 1 | 2 | 3 |
|---|---|---|---|---|---|---|
| 4 | $0, \ldots, N_1-1$<br>$N_1, \ldots, 2N_1-1$ | $0, 1, \ldots, 4N_1-1$<br>$0, 1, \ldots, 4N_1-1$ | $W^{(3)}_{4x,4x+4,y,y}$<br>$W^{(3)}_{4x,4x,y,y+4}$ | $W^{(3)}_{4x+4,4x,y,y}$<br>$W^{(3)}_{4x,4x,y+4,y}$ | $\tilde{W}^{(3)}_{4x,4x+4,y,y}$<br>$\tilde{W}^{(3)}_{4x,4x,y,y+4}$ | $\tilde{W}^{(3)}_{4x+4,4x,y,y}$<br>$\tilde{W}^{(3)}_{4x,4x,y+4,y}$ |

| Value of Codebook-Config | $i_{1,1}$ | $i_{1,2}$ | $i_2$ = 4 | 5 | 6 | 7 |
|---|---|---|---|---|---|---|
| 4 | $0, \ldots, N_1-1$<br>$N_1, \ldots, 2N_1-1$ | $0, 1, \ldots, 4N_1-1$<br>$0, 1, \ldots, 4N_1-1$ | $W^{(3)}_{4x+1,4x+5,y,y}$<br>$W^{(3)}_{4x+1,4x+1,y,y+4}$ | $W^{(3)}_{4x+5,4x+1,y,y}$<br>$W^{(3)}_{4x+1,4x+1,y+4,y}$ | $\tilde{W}^{(3)}_{4x+1,4x+5,y,y}$<br>$\tilde{W}^{(3)}_{4x+1,4x+1,y,y+4}$ | $\tilde{W}^{(3)}_{4x+5,4x+1,y,y}$<br>$\tilde{W}^{(3)}_{4x+1,4x+1,y+4,y}$ |

| Value of Codebook-Config | $i_{1,1}$ | $i_{1,2}$ | $i_2$ = 8 | 9 | 10 | 11 |
|---|---|---|---|---|---|---|
| 4 | $0, \ldots, N_1-1$<br>$N_1, \ldots, 2N_1-1$ | $0, 1, \ldots, 4N_1-1$<br>$0, 1, \ldots, 4N_1-1$ | $W^{(3)}_{4x+2,4x+6,y,y}$<br>$W^{(3)}_{4x+2,4x+2,y,y+4}$ | $W^{(3)}_{4x+6,4x+2,y,y}$<br>$W^{(3)}_{4x+2,4x+2,y+4,y}$ | $\tilde{W}^{(3)}_{4x+2,4x+6,y,y}$<br>$\tilde{W}^{(3)}_{4x+2,4x+2,y,y+4}$ | $\tilde{W}^{(3)}_{4x+6,4x+2,y,y}$<br>$\tilde{W}^{(3)}_{4x+2,4x+2,y+4,y}$ |

| Value of Codebook-Config | $i_{1,1}$ | $i_{1,2}$ | $i_2$ = 12 | 13 | 14 | 15 |
|---|---|---|---|---|---|---|
| 4 | $0, \ldots, N_1-1$<br>$N_1, \ldots, 2N_1-1$ | $0, 1, \ldots, 4N_1-1$<br>$0, 1, \ldots, 4N_1-1$ | $W^{(3)}_{4x+3,4x+7,y,y}$<br>$W^{(3)}_{4x+3,4x+3,y,y+4}$ | $W^{(3)}_{4x+7,4x+3,y,y}$<br>$W^{(3)}_{4x+3,4x+3,y+4,y}$ | $\tilde{W}^{(3)}_{4x+3,4x+7,y,y}$<br>$\tilde{W}^{(3)}_{4x+3,4x+3,y,y+4}$ | $\tilde{W}^{(3)}_{4x+7,4x+3,y,y}$<br>$\tilde{W}^{(3)}_{4x+3,4x+3,y+4,y}$ |

where $x = i_{1,1}$, $y = i_{1,2}$, $W^{(3)}_{l,l',m,m'} = \frac{1}{\sqrt{3P}}\begin{bmatrix} v_{\frac{O_1}{4}l,\frac{O_2}{4}m} & v_{\frac{O_1}{4}l,\frac{O_2}{4}m} & v_{\frac{O_1}{4}l',\frac{O_2}{4}m'} \\ v_{\frac{O_1}{4}l,\frac{O_2}{4}m} & -v_{\frac{O_1}{4}l,\frac{O_2}{4}m} & -v_{\frac{O_1}{4}l',\frac{O_2}{4}m'} \end{bmatrix}$, $$\tilde{W}^{(3)}_{l,l',m,m'} = \frac{1}{\sqrt{3P}}\begin{bmatrix} v_{\frac{O_1 l}{4},\frac{O_2 m}{4}} & v_{\frac{O_1 l'}{4},\frac{O_2 m'}{4}} & v_{\frac{O_1 l'}{4},\frac{O_2 m'}{4}} \\ v_{\frac{O_1 l}{4},\frac{O_2 m}{4}} & v_{\frac{O_1 l'}{4},\frac{O_2 m'}{4}} & -v_{\frac{O_1 l'}{4},\frac{O_2 m'}{4}} \end{bmatrix}, \text{if } N_1 \geqq N_2 \text{ and } x = i_{1,2},\ y = i_{1,1},$$

$$W^{(3)}_{l,l',m,m'} = \frac{1}{\sqrt{3P}}\begin{bmatrix} v_{\frac{O_1}{4}m,\frac{O_2}{4}l} & v_{\frac{O_1}{4}m,\frac{O_2}{4}l} & v_{\frac{O_1}{4}m',\frac{O_2}{4}l'} \\ v_{\frac{O_1}{4}m,\frac{O_2}{4}l} & -v_{\frac{O_1}{4}m,\frac{O_2}{4}l} & -v_{\frac{O_1}{4}m',\frac{O_2}{4}l'} \end{bmatrix}, W^{(3)}_{l,l',m,m'} = \frac{1}{\sqrt{3P}}\begin{bmatrix} v_{\frac{O_1}{4}m,\frac{O_2}{4}l} & v_{\frac{O_1}{4}m',\frac{O_2}{4}l'} & v_{\frac{O_1}{4}m',\frac{O_2}{4}l'} \\ v_{\frac{O_1}{4}m,\frac{O_2}{4}l} & -v_{\frac{O_1}{4}m',\frac{O_2}{4}l'} & -v_{\frac{O_1}{4}m',\frac{O_2}{4}l'} \end{bmatrix}, \text{if } N_1 < N_2.$$

TABLE 89-5

Codebook for 3-layer CSI reporting using antenna ports 15 to 14 + P (Codebook-Config No. 4)
$N_2 = 1$

| Value of Codebook-Config | $i_{1,1}$ | $i_{1,2}$ | $i_2$ = 0 | 1 | 2 | 3 |
|---|---|---|---|---|---|---|
| 4 | $0, \ldots, N_1-1$<br>$N_1, \ldots, 2N_1-1$<br>$2N_1, \ldots, 3N_1-1$ | 0<br>0<br>0 | $W^{(3)}_{4i_{1,1}, 4i_{1,1}+4, 0, 0}$<br>$W^{(3)}_{4i_{1,1}, 4i_{1,1}+8, 0, 0}$<br>$W^{(3)}_{4i_{1,1}, 4i_{1,1}+12, 0, 0}$ | $W^{(3)}_{4i_{1,1}+4, 4i_{1,1}, 0, 0}$<br>$W^{(3)}_{4i_{1,1}+8, 4i_{1,1}, 0, 0}$<br>$W^{(3)}_{4i_{1,1}+12, 4i_{1,1}, 0, 0}$ | $\tilde{W}^{(3)}_{4i_{1,1}, 4i_{1,1}+4, 0, 0}$<br>$\tilde{W}^{(3)}_{4i_{1,1}, 4i_{1,1}+8, 0, 0}$<br>$\tilde{W}^{(3)}_{4i_{1,1}, 4i_{1,1}+12, 0, 0}$ | $\tilde{W}^{(3)}_{4i_{1,1}+4, 4i_{1,1}, 0, 0}$<br>$\tilde{W}^{(3)}_{4i_{1,1}+8, 4i_{1,1}, 0, 0}$<br>$\tilde{W}^{(3)}_{4i_{1,1}+12, 4i_{1,1}, 0, 0}$ |

TABLE 89-5-continued

Codebook for 3-layer CSI reporting using antenna ports 15 to 14 + P (Codebook-Config No. 4)
$N_2 = 1$

| Value of Codebook-Config | $i_{1,1}$ | $i_{1,2}$ | $i_2$: 4 | 5 | 6 | 7 |
|---|---|---|---|---|---|---|
| 4 | $0, \ldots, N_1 - 1$<br>$N_1, \ldots, 2N_1 - 1$<br>$2N_1, \ldots, 3N_1 - 1$ | 0<br>0<br>0 | $W_{4i_{1,1}+1, 4i_{1,1}+5, 0, 0}^{(3)}$<br>$W_{4i_{1,1}+1, 4i_{1,1}+9, 0, 0}^{(3)}$<br>$W_{4i_{1,1}+1, 4i_{1,1}+13, 0, 0}^{(3)}$ | $W_{4i_{1,1}+5, 4i_{1,1}+1, 0, 0}^{(3)}$<br>$W_{4i_{1,1}+9, 4i_{1,1}+1, 0, 0}^{(3)}$<br>$W_{4i_{1,1}+13, 4i_{1,1}+1, 0, 0}^{(3)}$ | $\tilde{W}_{4i_{1,1}+1, 4i_{1,1}+5, 0, 0}^{(3)}$<br>$\tilde{W}_{4i_{1,1}+1, 4i_{1,1}+9, 0, 0}^{(3)}$<br>$\tilde{W}_{4i_{1,1}+1, 4i_{1,1}+13, 0, 0}^{(3)}$ | $\tilde{W}_{4i_{1,1}+5, 4i_{1,1}+1, 0, 0}^{(3)}$<br>$\tilde{W}_{4i_{1,1}+9, 4i_{1,1}+1, 0, 0}^{(3)}$<br>$\tilde{W}_{4i_{1,1}+13, 4i_{1,1}+1, 0, 0}^{(3)}$ |

| Value of Codebook-Config | $i_{1,1}$ | $i_{1,2}$ | $i_2$: 8 | 9 | 10 | 11 |
|---|---|---|---|---|---|---|
| 4 | $0, \ldots, N_1 - 1$<br>$N_1, \ldots, 2N_1 - 1$<br>$2N_1, \ldots, 3N_1 - 1$ | 0<br>0<br>0 | $W_{4i_{1,1}+2, 4i_{1,1}+6, 0, 0}^{(3)}$<br>$W_{4i_{1,1}+2, 4i_{1,1}+10, 0, 0}^{(3)}$<br>$W_{4i_{1,1}+2, 4i_{1,1}+14, 0, 0}^{(3)}$ | $W_{4i_{1,1}+6, 4i_{1,1}+2, 0, 0}^{(3)}$<br>$W_{4i_{1,1}+10, 4i_{1,1}+2, 0, 0}^{(3)}$<br>$W_{4i_{1,1}+14, 4i_{1,1}+2, 0, 0}^{(3)}$ | $\tilde{W}_{4i_{1,1}+2, 4i_{1,1}+6, 0, 0}^{(3)}$<br>$\tilde{W}_{4i_{1,1}+2, 4i_{1,1}+10, 0, 0}^{(3)}$<br>$\tilde{W}_{4i_{1,1}+2, 4i_{1,1}+14, 0, 0}^{(3)}$ | $\tilde{W}_{4i_{1,1}+6, 4i_{1,1}+2, 0, 0}^{(3)}$<br>$\tilde{W}_{4i_{1,1}+10, 4i_{1,1}+2, 0, 0}^{(3)}$<br>$\tilde{W}_{4i_{1,1}+14, 4i_{1,1}+2, 0, 0}^{(3)}$ |

| Value of Codebook-Config | $i_{1,1}$ | $i_{1,2}$ | $i_2$: 12 | 13 | 14 | 15 |
|---|---|---|---|---|---|---|
| 4 | $0, \ldots, N1 - 1$<br>$N_1, \ldots, 2N_1 - 1$<br>$2N_1, \ldots, 3N_1 - 1$ | 0<br>0<br>0 | $W_{4i_{1,1}+3, 4i_{1,1}+7, 0, 0}^{(3)}$<br>$W_{4i_{1,1}+3, 4i_{1,1}+11, 0, 0}^{(3)}$<br>$W_{4i_{1,1}+3, 4i_{1,1}+15, 0, 0}^{(3)}$ | $W_{4i_{1,1}+7, 4i_{1,1}+3, 0, 0}^{(3)}$<br>$W_{4i_{1,1}+11, 4i_{1,1}+3, 0, 0}^{(3)}$<br>$W_{4i_{1,1}+15, 4i1,1+3, 0, 0}^{(3)}$ | $\tilde{W}_{4i_{1,1}+3, 4i_{1,1}+7, 0, 0}^{(3)}$<br>$\tilde{W}_{4i_{1,1}+3, 4i_{1,1}+11, 0, 0}^{(3)}$<br>$\tilde{W}_{4i_{1,1}+3, 4i_{1,1}+15, 0, 0}^{(3)}$ | $\tilde{W}_{4i_{1,1}+7, 4i_{1,1}+3, 0, 0}^{(3)}$<br>$\tilde{W}_{4i_{1,1}+11, 4i_{1,1}+3, 0, 0}^{(3)}$<br>$\tilde{W}_{4i_{1,1}+15, 4i_{1,1}+3, 0, 0}^{(3)}$ |

$$\text{where } W_{l,l',m,m'}^{(3)} = \frac{1}{\sqrt{3P}}\begin{bmatrix} v_{\frac{O_1 l}{4}, \frac{O_2 m}{4}} & v_{\frac{O_1 l}{4}, \frac{O_2 m}{4}} & v_{\frac{O_1 l'}{4}, \frac{O_2 m'}{4}} \\ v_{\frac{O_1 l}{4}, \frac{O_2 m}{4}} & -v_{\frac{O_1 l}{4}, \frac{O_2 m}{4}} & -v_{\frac{O_1 l'}{4}, \frac{O_2 m'}{4}} \end{bmatrix}, \quad \tilde{W}_{l,l',m,m'}^{(3)} = \frac{1}{\sqrt{3P}}\begin{bmatrix} v_{\frac{O_1 l}{4}, \frac{O_2 m}{4}} & v_{\frac{O_1 l'}{4}, \frac{O_2 m'}{4}} & v_{\frac{O_1 l'}{4}, \frac{O_2 m'}{4}} \\ v_{\frac{O_1 l}{4}, \frac{O_2 m}{4}} & v_{\frac{O_1 l'}{4}, \frac{O_2 m'}{4}} & -v_{\frac{O_1 l'}{4}, \frac{O_2 m'}{4}} \end{bmatrix}$$

TABLE 90-1

Codebook for 4-layer CSI reporting using antenna ports 15 to 14 + P (Codebook-Config No. 1)

| Value of Codebook-Config | $i_{1,1}$ | $i_{1,2}$ | $i_2$: 0 | 1 |
|---|---|---|---|---|
| 1 | $0, 1, \ldots, O_1N_1 - 1$<br>$O_1N_1, O_1N_1 + 1, \ldots, 2O_1N_1 - 1$ | $0, 1, \ldots, O_2N_2 - 1$<br>$0, 1, \ldots, O_2N_2 - 1$ | $W_{i_{1,1}, i_{1,1}+O_1, i_{1,2}, i_{1,2}, 0}^{(4)}$<br>$W_{i_{1,1}, i_{1,1}, i_{1,2}, i_{1,2}+O_2, 0}^{(4)}$ | $W_{i_{1,1}, i_{1,1}+O_1, i_{1,2}, i_{1,2}, 1}^{(4)}$<br>$W_{i_{1,1}, i_{1,1}, i_{1,2}, i_{1,2}+O_2, 1}^{(4)}$ |

$$\text{where } W_{l,l',m,m',n}^{(4)} = \frac{1}{\sqrt{4P}}\begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$$

TABLE 90-2

Codebook for 4-layer CSI reporting using antenna ports 15 to 14 + P (Codebook-Config No. 1)
$N_2 = 1$

| Value of Codebook-Config | $i_{1,1}$ | $i_{1,2}$ | $i_2$: 0 | 1 |
|---|---|---|---|---|
| 1 | $0, 1, \ldots, O_1N_1 - 1$<br>$O_1N_1, O_1N_1 + 1, \ldots, 2O_1N_1 - 1$<br>$2O_1N_1, \ldots, 3O_1N_1 - 1$ | 0<br>0<br>0 | $W_{i_{1,1}, i_{1,1}+O_1, 0, 0, 0}^{(4)}$<br>$W_{i_{1,1}, i_{1,1}+2O_1, 0, 0, 0}^{(4)}$<br>$W_{i_{1,1}, i_{1,1}+3O_1, 0, 0, 0}^{(4)}$ | $W_{i_{1,1}, i_{1,1}+O_1, 0, 0, 1}^{(4)}$<br>$W_{i_{1,1}, i_{1,1}+2O_1, 0, 0, 1}^{(4)}$<br>$W_{i_{1,1}, i_{1,1}+3O_1, 0, 0, 1}^{(4)}$ |

$$\text{where } W_{l,l',m,m',n}^{(4)} = \frac{1}{\sqrt{4P}}\begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$$

TABLE 90-3

Codebook for 4-layer CSI reporting using antenna ports 15 to 14 + P (Codebook-Config No. 2)

| $i_{1,1}$ | $i_{1,2}$ | $i_2$: 0 | $i_2$: 1 | $i_2$: 2 |
|---|---|---|---|---|
| $0, \ldots, 2N_1 - 1$ | $0, 1, \ldots, 2N_1 - 1$ | $W^{(4)}_{2i_{1,1}, 2i_{1,1}+4, 2i_{1,2}, 2i_{1,2}, 0}$ | $W^{(4)}_{2i_{1,1}, 2i_{1,1}+4, 2i_{1,2}, 2i_{1,2}, 1}$ | $W^{(4)}_{2i_{1,1}+1, 2i_{1,1}+5, 2i_{1,2}, 2i_{1,2}, 0}$ |
| $2N_1, \ldots, 4N_1 - 1$ | $0, 1, \ldots, 2N_1 - 1$ | $W^{(4)}_{2i_{1,1}, 2i_{1,1}, 2i_{1,2}, 2i_{1,2}+1, 0}$ | $W^{(4)}_{2i_{1,1}, 2i_{1,1}, 2i_{1,2}, 2i_{1,2}+4, 1}$ | $W^{(4)}_{2i_{1,1}+1, 2i_{1,1}+1, 2i_{1,2}, 2i_{1,2}+4, 0}$ |

| $i_{1,1}$ | $i_{1,2}$ | $i_2$: 3 | $i_2$: 4 | $i_2$: 5 |
|---|---|---|---|---|
| $0, \ldots, 2N_1 - 1$ | $0, 1, \ldots, 2N_1 - 1$ | $W^{(4)}_{2i_{1,1}+1, 2i_{1,1}+5, 2i_{1,2}, 2i_{1,2}, 1}$ | $W^{(4)}_{2i_{1,1}, 2i_{1,1}+4, 2i_{1,2}+1, 2i_{1,2}+1, 0}$ | $W^{(4)}_{2i_{1,1}, 2i_{1,1}+4, 2i_{1,2}+1, 2i_{1,2}+1, 1}$ |
| $2N_1, \ldots, 4N_1 - 1$ | $0, 1, \ldots, 2N_1 - 1$ | $W^{(4)}_{2i_{1,1}+1, 2i_{1,1}+1, 2i_{1,2}, 2i_{1,2}+4,1}$ | $W^{(4)}_{2i_{1,1}, 2i_{1,1}, 2i_{1,2}+1, 2i_{1,2}+5, 0}$ | $W^{(4)}_{2i_{1,1}, 2i_{1,1}, 2i_{1,2}+1, 2i_{1,2}+5, 1}$ |

| $i_{1,1}$ | $i_{1,2}$ | $i_2$: 6 | $i_2$: 7 |
|---|---|---|---|
| $0, \ldots, 2N_1 - 1$ | $0, 1, \ldots, 2N_1 - 1$ | $W^{(4)}_{2i_{1,1}+1, 2i_{1,1}+5, 2i_{1,2}+1, 2i_{1,2}+1, 0}$ | $W^{(4)}_{2i_{1,1}+1, 2i_{1,1}+5, 2i_{1,2}+1, 2i_{1,2}+1, 1}$ |
| $2N_1, \ldots, 4N_1 - 1$ | $0, 1, \ldots, 2N_1 - 1$ | $W^{(4)}_{2i_{1,1}+1, 2i_{1,1}+1,2i_{1,2}+1, 2i_{1,2}+5, 0}$ | $W^{(4)}_{2i_{1,1}+1, 2i_{1,1}+1, 2i_{1,2}+1, 2i_{1,2}+5,1}$ |

where $W^{(4)}_{l,l',m,m',n} = \frac{1}{\sqrt{4P}}\begin{bmatrix} v_{\frac{O_1}{4}l,\frac{O_2}{4}m} & v_{\frac{O_1}{4}l',\frac{O_2}{4}m'} & v_{\frac{O_1}{4}l,\frac{O_2}{4}m} & v_{\frac{O_1}{4}l',\frac{O_2}{4}m'} \\ \varphi_n v_{\frac{O_1}{4}l,\frac{O_2}{4}m} & \varphi_n v_{\frac{O_1}{4}l',\frac{O_2}{4}m'} & -\varphi_n v_{\frac{O_1}{4}l,\frac{O_2}{4}m} & -\varphi_n v_{\frac{O_1}{4}l',\frac{O_2}{4}m'} \end{bmatrix}$

TABLE 90-4

Codebook for 4-layer CSI reporting using antenna ports 15 to 14 + P (Codebook-Config No. 3)

| Value of Codebook-Config | $i_{1,1}$ | $i_{1,2}$ | $i_2$: 0 | $i_2$: 1 | $i_2$: 2 | $i_2$: 3 |
|---|---|---|---|---|---|---|
| 3 | $0, \ldots, N_1 - 1$ | $0, 1, \ldots, 2N_1 - 1$ | $W^{(4)}_{4x+1,4x+6,2y,2y,0}$ | $W^{(4)}_{4x+2,4x+6,2y,2y,1}$ | $W^{(4)}_{4x+3,4x+7,2y,2y,0}$ | $W^{(4)}_{4x+3,4x+7,2y,2y,1}$ |
| | $N_1, \ldots, 2N_1 - 1$ | $0, 1, \ldots, 2N_1 - 1$ | $W^{(4)}_{4x+2,4x+3,2y,2y+4,0}$ | $W^{(4)}_{4x+2,4x+2,2y,2y+4,1}$ | $W^{(4)}_{4x+3,4x+3,2y,2y+4,0}$ | $W^{(4)}_{4x+3,4x+3,2y,2y+4,1}$ |

| Value of Codebook-Config | $i_{1,1}$ | $i_{1,2}$ | $i_2$: 4 | $i_2$: 5 | $i_2$: 6 | $i_2$: 7 |
|---|---|---|---|---|---|---|
| 3 | $0, \ldots, N_1 - 1$ | $0, 1, \ldots, 2N_1 - 1$ | $W^{(4)}_{4x,4x+4,2y+1,2y+1,0}$ | $W^{(4)}_{4x,4x+4,2y+1,2y+1,1}$ | $W^{(4)}_{4x+1,4x+5,2y+1,2y+1,0}$ | $W^{(4)}_{4x+1,4x+5,2y+1,2y+1,1}$ |
| | $N_1, \ldots, 2N_1 - 1$ | $0, 1, \ldots, 2N_1 - 1$ | $W^{(4)}_{4x,4x,2y+1,2y+5,0}$ | $W^{(4)}_{4x,4x,2y+1,2y+5,1}$ | $W^{(4)}_{4x+1,4x+1,2y+1,2y+5,0}$ | $W^{(4)}_{4x+1,4x+1,2y+1,2y+5,1}$ |

where $x = i_{1,1}$, $y = i_{1,2}$, $W^{(4)}_{l,l',m,m'n} = \frac{1}{\sqrt{4P}}\begin{bmatrix} v_{\frac{O_1}{4}l,\frac{O_2}{4}m} & v_{\frac{O_1}{4}l',\frac{O_2}{4}m'} & v_{\frac{O_1}{4}l,\frac{O_2}{4}m} & v_{\frac{O_1}{4}l',\frac{O_2}{4}m'} \\ \varphi_n v_{\frac{O_1}{4},\frac{O_2}{4}m} & \varphi_n v_{\frac{O_1}{4}l',\frac{O_2}{4}m'} & -\varphi_n v_{\frac{O_1}{4}l,\frac{O_2}{4}m} & -\varphi_n v_{\frac{O_1}{4}l',\frac{O_2}{4}m'} \end{bmatrix}$, if $N_1 \geqq N_2$ and $x = i_{1,2}$, $y = i_{1,1}$, $W^{(4)}_{l,l',m,m',n} = \frac{1}{\sqrt{4P}}\begin{bmatrix} v_{\frac{O_1}{4}m,\frac{O_2}{4}l} & v_{\frac{O_1}{4}m',\frac{O_2}{4}l'} & v_{\frac{O_1}{4}m,\frac{O_2}{4}l} & v_{\frac{O_1}{4}m',\frac{O_2}{4}l'} \\ \varphi_n v_{\frac{O_1}{4}m,\frac{O_2}{4}l} & \varphi_n v_{\frac{O_1}{4}m',\frac{O_2}{4}l'} & -\varphi_n v_{\frac{O_1}{4}m,\frac{O_2}{4}l} & -\varphi_n v_{\frac{O_1}{4}m',\frac{O_2}{4}l'} \end{bmatrix}$, if $N_1 < N_2$.

TABLE 90-5

Codebook for 4-layer CSI reporting using antenna ports 15 to 14 + P (Codebook-Config No. 4)
$N_1 > 1, N_2 > 1$

| Value of Codebook-Config | $i_{1,1}$ | $i_{1,2}$ | $i_2$: 0 | $i_2$: 1 | $i_2$: 2 | $i_2$: 3 |
|---|---|---|---|---|---|---|
| 4 | $0, \ldots, N_1 - 1$ | $0, 1, \ldots, 4N_1 - 1$ | $W^{(4)}_{4x,4x+4,y,y,0}$ | $W^{(4)}_{4x,4x+4,y,y,1}$ | $W^{(4)}_{4x+1,4x+5,y,y,0}$ | $W^{(4)}_{4x+1,4x+5,y,y,1}$ |
| | $N_1, \ldots, 2N_1 - 1$ | $0, 1, \ldots, 4N_1 - 1$ | $W^{(4)}_{4x,4x,y,y+4,0}$ | $W^{(4)}_{4x,4x,y,y+4,1}$ | $W^{(4)}_{4x+1,4x+1,y,y+4,0}$ | $W^{(4)}_{4x+1,4x+1,y,y+4,1}$ |

TABLE 90-5-continued

Codebook for 4-layer CSI reporting using antenna ports 15 to 14 + P (Codebook-Config No. 4)
$N_1 > 1, N_2 > 1$

| Value of Codebook-Config | $i_{1,1}$ | $i_{1,2}$ | $i_2$: 4 | 5 | 6 | 7 |
|---|---|---|---|---|---|---|
| 4 | $0, \ldots, N_1-1$ | $0, 1, \ldots, 4N_1-1$ | $W_{4x+2,4x+6,y,y,0}^{(4)}$ | $W_{4x+2,4x+6,y,y,1}^{(4)}$ | $W_{4x+3,4x+7,y,y,0}^{(4)}$ | $W_{4x+3,4x+7,y,y,1}^{(4)}$ |
| | $N_1, \ldots, 2N_1-1$ | $0, 1, \ldots, 4N_1-1$ | $W_{4x+2,4x+2,y,y+4,0}^{(4)}$ | $W_{4x+2,4x+2,y,y+4,1}^{(4)}$ | $W_{4x+3,4x+3,y,y+4,0}^{(4)}$ | $W_{4x+3,4x+3,y,y+4,1}^{(4)}$ |

$$\text{where } x = i_{1,1},\ y = i_{1,2},\ W_{l,l',m,m'n}^{(4)} = \frac{1}{\sqrt{4P}}\begin{bmatrix} v_{\frac{O_1}{4}l,\frac{O_2}{4}m} & v_{\frac{O_1}{4}l',\frac{O_2}{4}m'} & v_{\frac{O_1}{4}l,\frac{O_2}{4}m} & v_{\frac{O_1}{4}l',\frac{O_2}{4}m'} \\ \varphi_n v_{\frac{O_1}{4},\frac{O_2}{4}m} & \varphi_n v_{\frac{O_1}{4}l',\frac{O_2}{4}m'} & -\varphi_n v_{\frac{O_1}{4}l,\frac{O_2}{4}m} & -\varphi_n v_{\frac{O_1}{4}l',\frac{O_2}{4}m'} \end{bmatrix},$$

$$\text{if } N_1 \geqq N_2 \text{ and } x = i_{1,2},\ y = i_{1,1},\ W_{l,l',m,m',n}^{(4)} = \frac{1}{\sqrt{4P}}\begin{bmatrix} v_{\frac{O_1}{4}m,\frac{O_2}{4}l} & v_{\frac{O_1}{4}m',\frac{O_2}{4}l'} & v_{\frac{O_1}{4}m,\frac{O_2}{4}l} & v_{\frac{O_1}{4}m',\frac{O_2}{4}l'} \\ \varphi_n v_{\frac{O_1}{4}m,\frac{O_2}{4}l} & \varphi_n v_{\frac{O_1}{4}m',\frac{O_2}{4}l'} & -\varphi_n v_{\frac{O_1}{4}m,\frac{O_2}{4}l} & -\varphi_n v_{\frac{O_1}{4}m',\frac{O_2}{4}l'} \end{bmatrix}, \text{ if } N_1 < N_2.$$

TABLE 90-6

Codebook for 4-layer CSI reporting using antenna ports 15 to 14 + P (Codebook-Config No. 4)
$N_2 = 1$

| Value of Codebook-Config | $i_{1,1}$ | $i_{1,2}$ | $i_2$: 0 | 1 | 2 | 3 |
|---|---|---|---|---|---|---|
| 4 | $0, \ldots, N_1-1$ | 0 | $W_{4i_{1,1}, 4i_{1,1}+4, 0, 0, 0}^{(4)}$ | $W_{4i_{1,1}, 4i_{1,1}+4, 0, 0, 1}^{(4)}$ | $W_{4i_{1,1}+1, 4i_{1,1}+5, 0, 0, 0}^{(4)}$ | $W_{4i_{1,1}+1, 4i_{1,1}+5, 0, 0, 1}^{(4)}$ |
| | $N_1, \ldots, 2N_1-1$ | 0 | $W_{4i_{1,1}, 4i_{1,1}+8, 0, 0, 0}^{(4)}$ | $W_{4i_{1,1}, 4i_{1,1}+8, 0, 0, 1}^{(4)}$ | $W_{4i_{1,1}+1, 4i_{1,1}+9, 0, 0, 0}^{(4)}$ | $W_{4i_{1,1}+1, 4i_{1,1}+9, 0, 0, 1}^{(4)}$ |
| | $2N_1, \ldots, 3N_1-1$ | 0 | $W_{4i_{1,1}, 4i_{1,1}+12, 0, 0, 0}^{(4)}$ | $W_{4i_{1,1}, 4i_{1,1}+12, 0, 0, 1}^{(4)}$ | $W_{4i_{1,1}+1, 4i_{1,1}+13, 0, 0, 0}^{(4)}$ | $W_{4i_{1,1}+1, 4i_{1,1}+13, 0, 0, 1}^{(4)}$ |
| **Value of Codebook-Config** | **$i_{1,1}$** | **$i_{1,2}$** | **$i_2$: 4** | **5** | **6** | **7** |
| 4 | $0, \ldots, N_1-1$ | 0 | $W_{4i_{1,1}+2, 4i_{1,1}+6, 0, 0, 0}^{(4)}$ | $W_{4i_{1,1}+2, 4i_{1,1}+6, 0, 0, 1}^{(4)}$ | $W_{4i_{1,1}+3, 4i_{1,1}+7, 0, 0, 0}^{(4)}$ | $W_{4i_{1,1}+3, 4i_{1,1}+7, 0, 0, 1}^{(4)}$ |
| | $N_1, \ldots, 2N_1-1$ | 0 | $W_{4i_{1,1}+2, 4i_{1,1}+10, 0, 0, 0}^{(4)}$ | $W_{4i_{1,1}+2, 4i_{1,1}+10, 0, 0, 1}^{(4)}$ | $W_{4i_{1,1}+3, 4i_{1,1}+11, 0, 0, 0}^{(4)}$ | $W_{4i_{1,1}+3, 4i_{1,1}+11, 0, 0, 1}^{(4)}$ |
| | $2N_1, \ldots, 3N_1-1$ | 0 | $W_{4i_{1,1}+2, 4i_{1,1}+14, 0, 0, 0}^{(4)}$ | $W_{4i_{1,1}+2, 4i_{1,1}+14, 0, 0, 1}^{(4)}$ | $W_{4i_{1,1}+3, 4i_{1,1}+15, 0, 0, 0}^{(4)}$ | $W_{4i_{1,1}+3, 4i_{1,1}+15, 0, 0, 1}^{(4)}$ |

$$\text{where } W_{l,l',m,m',n}^{(4)} = \frac{1}{\sqrt{4P}}\begin{bmatrix} v_{\frac{O_1}{4}l,\frac{O_2}{4}m} & v_{\frac{O_1}{4}l',\frac{O_2}{4}m'} & v_{\frac{O_1}{4}l,\frac{O_2}{4}m} & v_{\frac{O_1}{4}l',\frac{O_2}{4}m'} \\ \varphi_n v_{\frac{O_1}{4}l,\frac{O_2}{4}m} & \varphi_n v_{\frac{O_1}{4}l',\frac{O_2}{4}m'} & -\varphi_n v_{\frac{O_1}{4}l\frac{O_2}{4}m} & -\varphi_n v_{\frac{O_1}{4}l',\frac{O_2}{4}m'} \end{bmatrix}$$

Table 91-1

Codebook for 5-layer CSI reporting using antenna ports 15 to 14 + P
$P = 8, N_1 = N_2$

| Value of Codebook-Config | $i_{1,1}$ | $i_{1,2}$ | $i_2$: 0 |
|---|---|---|---|
| 1 | $0, 1, \ldots, O_1N_1-1$ | $0, 1, \ldots, O_2N_2-1$ | $W_{i_{1,1},i_{1,1}+O_1,i_{1,1}+O_1,i_{1,2},i_{1,2},i_{1,2}+O_2}^{(5)}$ |
| 2-4 | $0, 1, \ldots, 4N_1-1$ | $0, 1, \ldots, 4N_2-1$ | $W_{i_{1,1},i_{1,1}+4,i_{1,1}+4,i_{1,2},i_{1,2},i_{1,2}+4}^{(5)}$ |

$$W_{l,l',l'',m,m',m''}^{(5)} = \frac{1}{\sqrt{5P}}\begin{bmatrix} v_{\frac{O_1}{4}l,\frac{O_2}{4}m} & v_{\frac{O_1}{4}l,\frac{O_2}{4}m} & v_{\frac{O_1}{4}l',\frac{O_2}{4}m'} & v_{\frac{O_1}{4}l',\frac{O_2}{4}m'} & v_{\frac{O_1}{4}l'',\frac{O_2}{4}m''} \\ v_{\frac{O_1}{4}l,\frac{O_2}{4}m} & -v_{\frac{O_1}{4}l,\frac{O_2}{4}m} & v_{\frac{O_1}{4}l',\frac{O_2}{4}m'} & -v_{\frac{O_1}{4}l',\frac{O_2}{4}m'} & v_{\frac{O_1}{4}l'',\frac{O_2}{4}m''} \end{bmatrix} \text{ for Codebook-Config} = 2\text{-}4$$

$$W_{l,l',l'',m,m',m''}^{(5)} = \frac{1}{\sqrt{5P}}\begin{bmatrix} v_{l,m} & v_{l,m} & v_{l',m'} & v_{l',m'} & v_{l'',m''} \\ v_{l,m} & -v_{l,m} & v_{l',m'} & -v_{l',m'} & v_{l'',m''} \end{bmatrix} \text{ for Codebook-Config} = 1$$

TABLE 91-2

| Codebook for 5-layer CSI reporting using antenna ports 15 to 14 + P<br>P = 12, 16, $N_1 > 1$, $N_2 > 1$ | | | |
|---|---|---|---|
| Value of Codebook-Config | $i_{1,1}$ | $i_{1,2}$ | $i_2$<br>0 |
| 1 | 0, 1, . . . , $O_1N_1 - 1$ | 0, 1, . . . , $O_2N_2 - 1$ | $W_{i_{1,1},i_{1,1}+O_1,i_{1,1}+O_1,i_{1,2},i_{1,2},i_{1,2}+O_2}^{(5)}$ |

$$\text{where } W_{l,l',l'',m,m',m''}^{(5)} = \frac{1}{\sqrt{5P}}\begin{bmatrix} v_{l,m} & v_{l,m} & v_{l',m'} & v_{l',m'} & v_{l'',m''} \\ v_{l,m} & -v_{l,m} & v_{l',m'} & -v_{l',m'} & v_{l'',m''} \end{bmatrix}$$

TABLE 91-3

| Codebook for 5-layer CSI reporting using antenna ports 15 to 14 + P<br>P = 16, $N_2 = 1$ | | | |
|---|---|---|---|
| Value of Codebook-Config | $i_{1,1}$ | $i_{1,2}$ | $i_2$<br>0 |
| 1 | 0, 1, . . . , $O_1N_1 - 1$ | 0, 1, . . . , $O_2N_2 - 1$ | $W_{i,1,1,i_{1,1}+O_1,i_{1,1}+2O_1,i_{1,2},i_{1,2},i_{1,2}}^{(5)}$ |

$$\text{where } W_{l,l',l'',m,m',m''}^{(5)} = \frac{1}{\sqrt{5P}}\begin{bmatrix} v_{l,m} & v_{l,m} & v_{l',m'} & v_{l',m'} & v_{l'',m''} \\ v_{l,m} & -v_{l,m} & v_{l',m'} & -v_{l',m'} & v_{l'',m''} \end{bmatrix}$$

TABLE 91-4

| Codebook for 5-layer CSI reporting using antenna ports 15 to 14 + P<br>P = 12, 16 | | | |
|---|---|---|---|
| Value of Codebook-Config | $i_{1,1}$ | $i_{1,2}$ | $i_2$<br>0 |
| 2 | 0, 1, . . . , $4N_1 - 1$ | 0, 1, . . . , $4N_1 - 1$ | $W_{i_{1,1},i_{1,1}+4,i_{1,1}+4,i_{1,2},i_{1,2},i_{1,2}+4}^{(5)}$ if $N_1 > 1$, $N_2 > 1$ |
| 3 | 0, 1, . . . , $4N_1 - 1$ | 0, 1, . . . , $4N_1 - 1$ | $W_{i_{1,1},i_{1,1}+4,i_{1,1}+8,i_{1,2},i_{1,2},i_{1,2}+4}^{(5)}$ if $N_1 \geq N_2$<br>$W_{i_{1,1},i_{1,1},i_{1,1}+4,i_{1,2},i_{1,2}+4,i_{1,2}+8}^{(5)}$ if $N_1 < N_2$ |
| 4 | 0, 1, . . . , $4N_1 - 1$ | 0, 1, . . . , $4N_1 - 1$ | $W_{i_{1,1},i_{1,1}+4,i_{1,1}+8,i_{1,2},i_{1,2},i_{1,2}}^{(5)}$ if $N_1 \geq N_2$<br>$W_{i_{1,1},i_{1,1},i_{1,1},i_{1,2},i_{1,2}+4,i_{1,2}+8}^{(5)}$ if $N_1 < N_2$ |

$$\text{Where } W_{l,l',l'',m,m',m''}^{(5)} = \frac{1}{\sqrt{5P}}\begin{bmatrix} v_{\frac{O_1}{4}l,\frac{O_2}{4}m} & v_{\frac{O_1}{4}l,\frac{O_2}{4}m} & v_{\frac{O_1}{4}l',\frac{O_2}{4}m'} & v_{\frac{O_1}{4}l',\frac{O_2}{4}m'} & v_{\frac{O_1}{4}l'',\frac{O_2}{4}m''} \\ v_{\frac{O_1}{4}l,\frac{O_2}{4}m} & -v_{\frac{O_1}{4}l,\frac{O_2}{4}m} & v_{\frac{O_1}{4}l',\frac{O_2}{4}m'} & -v_{\frac{O_1}{4}l',\frac{O_2}{4}m'} & v_{\frac{O_1}{4}l'',\frac{O_2}{4}m''} \end{bmatrix}$$

TABLE 92-1

| Codebook for 6-layer CSI reporting using antenna ports 15 to 14 + P<br>P = 8, $N_1 = N_2$ | | | |
|---|---|---|---|
| Value of Codebook-Config | $i_{1,1}$ | $i_{1,2}$ | $i_2$<br>0 |
| 1 | 0, 0, . . . , $O_1N_1 - 1$ | 0, 0, . . . , $O_2N_2 - 1$ | $W_{i_{1,1},i_{1,1}+O_1,i_{1,1}+O_1,i_{1,2},i_{1,2},i_{1,2}+O_2}^{(6)}$ |
| 2-4 | 0,1, . . . , $4N_1 - 1$ | 0,1, . . . , $4N_2 - 1$ | $W_{i_{1,1},i_{1,1}+4,i_{1,1}+4,i_{1,2},i_{1,2}+4}^{(6)}$ |

where $$W_{l,l',l'',m,m',m''}^{(6)} = \frac{1}{\sqrt{6P}}\begin{bmatrix} v_{\frac{O_1}{4}l,\frac{O_2}{4}m} & v_{\frac{O_1}{4}l,\frac{O_2}{4}m} & v_{\frac{O_1}{4}l',\frac{O_2}{4}m'} & v_{\frac{O_1}{4}l',\frac{O_2}{4}m'} & v_{\frac{O_1}{4}l'',\frac{O_2}{4}m''} & v_{\frac{O_1}{4}l'',\frac{O_2}{4}m''} \\ v_{\frac{O_1}{4}l,\frac{O_2}{4}m} & -v_{\frac{O_1}{4}l,\frac{O_2}{4}m} & v_{\frac{O_1}{4}l',\frac{O_2}{4}m'} & -v_{\frac{O_1}{4}l',\frac{O_2}{4}m'} & v_{\frac{O_1}{4}l'',\frac{O_2}{4}m''} & -v_{\frac{O_1}{4}l'',\frac{O_2}{4}m''} \end{bmatrix} \text{ for Codebook-Config} = 2\text{-}4$$

$$W_{l,l',l'',m,m',m''}^{(6)} = \frac{1}{\sqrt{6P}}\begin{bmatrix} v_{l,m} & v_{l,m} & v_{l',m'} & v_{l',m'} & v_{l'',m''} & v_{l'',m''} \\ v_{l,m} & -v_{l,m} & v_{l',m'} & -v_{l',m'} & v_{l'',m''} & -v_{l'',m''} \end{bmatrix} \text{ for Codebook-Config} = 1$$

TABLE 92-2

| Codebook for 6-layer CSI reporting using antenna ports 15 to 14 + P<br>P = 12, 16 $N_1 > 1$, $N_2 > 1$ | | | |
|---|---|---|---|
| Value of Codebook-Config | $i_{1,1}$ | $i_{1,2}$ | $i_2$<br>0 |
| 1 | $0, 1, \ldots, O_1N_1 - 1$ | $0, 1, \ldots, O_2N_2 - 1$ | $W_{i_{1,1},i_{1,1}+O_1,i_{1,1}+O_1,i_{1,2},i_{1,2},i_{1,2}+O_2}^{(6)}$ |

where $W_{l,l',l'',m,m',m''}^{(6)} = \frac{1}{\sqrt{6P}}\begin{bmatrix} v_{l,m} & v_{l,m} & v_{l',m'} & v_{l',m'} & v_{l'',m''} & v_{l'',m''} \\ v_{l,m} & -v_{l,m} & v_{l',m'} & -v_{l',m'} & v_{l'',m''} & -v_{l'',m''} \end{bmatrix}$

TABLE 92-3

| Codebook for 6-layer CSI reporting using antenna ports 15 to 14 + P<br>P = 16, $N_2 = 1$ | | | |
|---|---|---|---|
| Value of Codebook-Config | $i_{1,1}$ | $i_{1,2}$ | $i_2$<br>0 |
| 1 | $0, 1, \ldots, O_1N_1 - 1$ | $0, 1, \ldots, O_2N_2 - 1$ | $W_{i_{1,1},i_{1,1}+O_1,i_{1,1}+2O_1,i_{1,2},i_{1,2},i_{1,2}}^{(6)}$ |

where $W_{l,l',l'',m,m',m''}^{(6)} = \frac{1}{\sqrt{6P}}\begin{bmatrix} v_{l,m} & v_{l,m} & v_{l',m'} & v_{l',m'} & v_{l'',m''} & v_{l'',m''} \\ v_{l,m} & -v_{l,m} & v_{l',m'} & -v_{l',m'} & v_{l'',m''} & -v_{l'',m''} \end{bmatrix}$

TABLE 92-4

| Codebook for 6-layer CSI reporting using antenna ports 15 to 14 + P<br>P = 12, 16 | | | |
|---|---|---|---|
| Value of Codebook-Config | $i_{1,1}$ | $i_{1,2}$ | $i_2$<br>0 |
| 2 | $0, 1, \ldots, 4N_1 - 1$ | $0, 1, \ldots, 4N_1 - 1$ | $W_{i_{1,1},i_{1,1}+4,i_{1,1}+4,i_{1,2},i_{1,2},i_{1,2}+4}^{(6)}$ if $N_1 > 1$, $N_2 > 1$ |
| 3 | $0, 1, \ldots, 4N_1 - 1$ | $0, 1, \ldots, 4N_1 - 1$ | $W_{i_{1,1},i_{1,1}+4,i_{1,1}+4,i_{1,2},i_{1,2},i_{1,2}+4}^{(6)}$ if $N_1 \geq N_2$<br>$W_{i_{1,1},i_{1,1},i_{1,1}+4,i_{1,2},i_{1,2}+4,i_{1,2}+8}^{(6)}$ if $N_1 < N_2$ |
| 4 | $0, 1, \ldots, 4N_1 - 1$ | $0, 1, \ldots, 4N_1 - 1$ | $W_{i_{1,1},i_{1,1}+4,i_{1,1}+8,i_{1,2},i_{1,2},i_{1,2}}^{(6)}$ if $N_1 \geq N_2$<br>$W_{i_{1,1},i_{1,1},i_{1,1},i_{1,2},i_{1,2}+4,i_{1,2}+8}^{(6)}$ if $N_1 < N_2$ |

Where $W_{l,l',l'',m,m',m''}^{(6)} = \frac{1}{\sqrt{6P}}\begin{bmatrix} v_{\frac{O_1}{4}l,\frac{O_2}{4}m} & v_{\frac{O_1}{4}l,\frac{O_2}{4}m} & v_{\frac{O_1}{4}l',\frac{O_2}{4}m'} & v_{\frac{O_1}{4}l',\frac{O_2}{4}m'} & v_{\frac{O_1}{4}l'',\frac{O_2}{4}m''} & v_{\frac{O_1}{4}l'',\frac{O_2}{4}m''} \\ v_{\frac{O_1}{4}l,\frac{O_2}{4}m} & -v_{\frac{O_1}{4}l,\frac{O_2}{4}m} & v_{\frac{O_1}{4}l',\frac{O_2}{4}m'} & -v_{\frac{O_1}{4}l',\frac{O_2}{4}m'} & v_{\frac{O_1}{4}l'',\frac{O_2}{4}m''} & -v_{\frac{O_1}{4}l'',\frac{O_2}{4}m''} \end{bmatrix}$

TABLE 93-1

| Codebook for 7-layer CSI reporting using antenna ports 15 to 14 + P<br>P = 8, $N_1 - N_2$ | | | |
|---|---|---|---|
| Value of Codebook-Config | $i_{1,1}$ | $i_{1,2}$ | $i_2$<br>0 |
| 1 | $0, 1, \ldots, O_1N_1 - 1$ | $0, 1, \ldots, O_2N_2 - 1$ | $W_{i_{1,1},i_{1,1}+O_1,i_{1,1}+O_1,i_{1,1},i_{1,2},i_{1,2},i_{1,2}+O_2,i_{1,2}+O_2}^{(7)}$ |
| 2-4 | $0, 1, \ldots, 4N_1 - 1$ | $0, 1, \ldots, 4N_2 - 1$ | $W_{i_{1,1},i_{1,1}+4,i_{1,1}+4,i_{1,1},i_{1,2},i_{1,2},i_{1,2}+4,i_{1,2}+4}^{(7)}$ |

where $$W_{l,l',l'',l''',m,m',m'',m'''}^{(7)} = \frac{1}{\sqrt{7P}}\begin{bmatrix} v_{\frac{O_1}{4}l,\frac{O_2}{4}m} & v_{\frac{O_1}{4}l,\frac{O_2}{4}m} & v_{\frac{O_1}{4}l',\frac{O_2}{4}m'} & v_{\frac{O_1}{4}l',\frac{O_2}{4}m'} & v_{\frac{O_1}{4}l'',\frac{O_2}{4}m''} & v_{\frac{O_1}{4}l'',\frac{O_2}{4}m''} & v_{\frac{O_1}{4}l''',\frac{O_2}{4}m'''} \\ v_{\frac{O_1}{4}l,\frac{O_2}{4}m} & -v_{\frac{O_1}{4}l,\frac{O_2}{4}m} & v_{\frac{O_1}{4}l',\frac{O_2}{4}m'} & -v_{\frac{O_1}{4}l',\frac{O_2}{4}m'} & v_{\frac{O_1}{4}l'',\frac{O_2}{4}m''} & -v_{\frac{O_1}{4}l'',\frac{O_2}{4}m''} & v_{\frac{O_1}{4}l''',\frac{O_2}{4}m'''} \end{bmatrix}$$

for Codebook-Config = 2-4

$$W_{l,l',l'',l''',m,m',m'',m'''}^{(7)} = \frac{1}{\sqrt{7P}}\begin{bmatrix} v_{l,m} & v_{l,m} & v_{l',m'} & v_{l',m'} & v_{l'',m''} & v_{l'',m''} & v_{l''',m'''} \\ v_{l,m} & -v_{l,m} & v_{l',m'} & -v_{l',m'} & v_{l'',m''} & -v_{l'',m''} & v_{l''',m'''} \end{bmatrix}$$

for Codebook-Config = 1

TABLE 93-2

| Codebook for 7-layer CSI reporting using antenna ports 15 to 14 + P<br>P = 12, 16 $N_1 > 1$, $N_2 > 1$ | | | |
|---|---|---|---|
| Value of Codebook-Config | $i_{1,1}$ | $i_{1,2}$ | $i_2$<br>0 |
| 1 | $0, 1, \ldots, O_1N_1 - 1$ | $0, 1, \ldots, O_2N_2 - 1$ | $W_{i_{1,1},i_{1,1}+O_1,i_{1,1}+O_1,i_{1,1},i_{1,2},i_{1,2},i_{1,2}+O_2,i_{1,2}+O_2}^{(7)}$ |

where $W_{l,l',l'',l''',m,m',m'',m'''}^{(7)} = \frac{1}{\sqrt{7P}}\begin{bmatrix} v_{l,m} & v_{l,m} & v_{l',m'} & v_{l',m'} & v_{l'',m''} & v_{l'',m''} & v_{l''',m'''} \\ v_{l,m} & -v_{l,m} & v_{l',m'} & -v_{l',m'} & v_{l'',m''} & -v_{l'',m''} & v_{l''',m'''} \end{bmatrix}$

TABLE 93-3

| Codebook for 7-layer CSI reporting using antenna ports 15 to 14 + P<br>P = 16, $N_2 = 1$ | | | |
|---|---|---|---|
| Value of Codebook-Config | $i_{1,1}$ | $i_{1,2}$ | $i_2$<br>0 |
| 1 | $0, 1, \ldots, O_1N_1 - 1$ | $0, 1, \ldots, O_2N_2 - 1$ | $W_{i_{1,1},i_{1,1}+O_1,i_{1,1}+2O_1,i_{1,1}+3O_1,i_{1,2},i_{1,2},i_{1,2},i_{1,2}}^{(7)}$ |

where $W_{l,l',l'',l''',m,m',m'',m'''}^{(7)} = \frac{1}{\sqrt{7P}}\begin{bmatrix} v_{l,m} & v_{l,m} & v_{l',m'} & v_{l',m'} & v_{l'',m''} & v_{l'',m''} & v_{l''',m'''} \\ v_{l,m} & -v_{l,m} & v_{l',m'} & -v_{l',m'} & v_{l'',m''} & -v_{l'',m''} & v_{l''',m'''} \end{bmatrix}$

TABLE 93-4

| Codebook for 7-layer CSI reporting using antenna ports 15 to 14 + P<br>P = 12 | | | |
|---|---|---|---|
| Value of Codebook-Config | $i_{1,1}$ | $i_{1,2}$ | $i_2$<br>0 |
| 2 | $0, 1, \ldots, 4N_1 - 1$ | $0, 1, \ldots, 4N_1 - 1$ | $W_{i_{1,1},i_{1,1}+4,i_{1,1}+4,i_{1,1},i_{1,2},i_{1,2},i_{1,2}+4,i_{1,2}+4}^{(7)}$ if $N_1 > 1$, $N_2 > 1$ |
| 3 | $0, 1, \ldots, 4N_1 - 1$ | $0, 1, \ldots, 4N_1 - 1$ | $W_{i_{1,1},i_{1,1}+4,i_{1,1}+4,i_{1,2},i_{1,2},i_{1,2}+4,i_{1,2}+4}^{(7)}$ if $N_1 \geq N_2$<br>$W_{i_{1,1},i_{1,1},i_{1,1}+4,i_{1,1}+4,i_{1,2},i_{1,2}+4,i_{1,2}+8,i_{1,2}+4}^{(7)}$ if $N_1 < N_2$ |
| 4 | $0, 1, \ldots, 4N_1 - 1$ | $0, 1, \ldots, 4N_1 - 1$ | $W_{i_{1,1},i_{1,1}+4,i_{1,1}+8,i_{1,1},i_{1,2},i_{1,2},i_{1,2},i_{1,2}+4}^{(7)}$ if $N_1 \geq N_2$<br>$W_{i_{1,1},i_{1,1},i_{1,1},i_{1,1}+4,i_{1,2},i_{1,2}+4,i_{1,2}+8,i_{1,2}}^{(7)}$ if $N_1 < N_2$ |

Where $W_{l,l',l'',l'''m,m',m'',m'''}^{(7)} = \frac{1}{\sqrt{7P}}\begin{bmatrix} v_{\frac{O_1}{4}l,\frac{O_2}{4}m} & v_{\frac{O_1}{4}l,\frac{O_2}{4}m} & v_{\frac{O_1}{4}l',\frac{O_2}{4}m'} & v_{\frac{O_1}{4}l',\frac{O_2}{4}m'} & v_{\frac{O_1}{4}l'',\frac{O_2}{4}m''} & v_{\frac{O_1}{4}l'',\frac{O_2}{4}m''} & v_{\frac{O_1}{4}l''',\frac{O_2}{4}m'''} \\ v_{\frac{O_1}{4}l,\frac{O_2}{4}m} & -v_{\frac{O_1}{4}l,\frac{O_2}{4}m} & v_{\frac{O_1}{4}l',\frac{O_2}{4}m'} & -v_{\frac{O_1}{4}l',\frac{O_2}{4}m'} & v_{\frac{O_1}{4}l'',\frac{O_2}{4}m''} & -v_{\frac{O_1}{4}l'',\frac{O_2}{4}m''} & v_{\frac{O_1}{4}l''',\frac{O_2}{4}m'''} \end{bmatrix}$

TABLE 93-5

| Codebook for 7-layer CSI reporting using antenna ports 15 to 14 + P<br>P = 16 | | | |
|---|---|---|---|
| Value of Codebook-Config | $i_{1,1}$ | $i_{1,2}$ | $i_2$<br>0 |
| 2 | $0, 1, \ldots, 4N_1 - 1$ | $0, 1, \ldots, 4N_1 - 1$ | $W_{i_{1,1},i_{1,1}+4,i_{1,1}+4,i_{1,1},i_{1,2},i_{1,2},i_{1,2}+4,i_{1,2}+4}^{(7)}$ if $N_1 > 1$, $N_2 > 1$ |
| 3 | $0, 1, \ldots, 4N_1 - 1$ | $0, 1, \ldots, 4N_1 - 1$ | $W_{i_{1,1},i_{1,1}+4,i_{1,1}+8,i_{1,1}+12,i_{1,2},i_{1,2},i_{1,2}+4,i_{1,2}+4}^{(7)}$ if $N_1 \geq N_2$<br>$W_{i_{1,1},i_{1,1},i_{1,1}+4,i_{1,1}+4,i_{1,2},i_{1,2}+4,i_{1,2}+8,i_{1,2}+12}^{(7)}$ if $N_1 < N_2$ |
| 4 | $0, 1, \ldots, 4N_1 - 1$ | $0, 1, \ldots, 4N_1 - 1$ | $W_{i_{1,1},i_{1,1}+4,i_{1,1}+8,i_{1,1}+12,i_{1,2},i_{1,2},i_{1,2},i_{1,2}}^{(7)}$ if $N_1 \geq N_2$<br>$W_{i_{1,1},i_{1,1},i_{1,1},i_{1,1},i_{1,2},i_{1,2}+4,i_{1,2}+8,i_{1,2}+12}^{(7)}$ if $N_1 < N_2$ |

Where $W_{l,l',l'',l'''m,m',m'',m'''}^{(7)} = \frac{1}{\sqrt{7P}}\begin{bmatrix} v_{\frac{O_1}{4}l,\frac{O_2}{4}m} & v_{\frac{O_1}{4}l,\frac{O_2}{4}m} & v_{\frac{O_1}{4}l',\frac{O_2}{4}m'} & v_{\frac{O_1}{4}l',\frac{O_2}{4}m'} & v_{\frac{O_1}{4}l'',\frac{O_2}{4}m''} & v_{\frac{O_1}{4}l'',\frac{O_2}{4}m''} & v_{\frac{O_1}{4}l''',\frac{O_2}{4}m'''} \\ v_{\frac{O_1}{4}l,\frac{O_2}{4}m} & -v_{\frac{O_1}{4}l,\frac{O_2}{4}m} & v_{\frac{O_1}{4}l',\frac{O_2}{4}m'} & -v_{\frac{O_1}{4}l',\frac{O_2}{4}m'} & v_{\frac{O_1}{4}l'',\frac{O_2}{4}m''} & -v_{\frac{O_1}{4}l'',\frac{O_2}{4}m''} & v_{\frac{O_1}{4}l''',\frac{O_2}{4}m'''} \end{bmatrix}$

TABLE 94-1

| Codebook for 8-layer CSI reporting using antenna ports 15 to 14 + P<br>$P = 8, N_1 = N_2$ | | | |
|---|---|---|---|
| Value of Codebook-Config | $i_{1,1}$ | $i_{1,2}$ | $i_2$<br>0 |
| 1 | $0, 1, \ldots, O_1N_1 - 1$ | $0, 1, \ldots, O_2N_2 - 1$ | $W^{(8)}_{i_{1,1},i_{1,1}+O_1,i_{1,1}+O_1,i_{1,1},i_{1,2},i_{1,2},i_{1,2}+O_2,i_{1,2}+O_2}$ |
| 2-4 | $0, 1, \ldots, 4N_1 - 1$ | $0, 1, \ldots, 4N_2 - 1$ | $W^{(8)}_{i_{1,1},i_{1,1}+4,i_{1,1}+4,i_{1,1},i_{1,2},i_{1,2},i_{1,2}+4,i_{1,2}+4}$ |

where $$W^{(8)}_{l,l',l'',l''',m,m',m'',m'''} = \frac{1}{\sqrt{8P}}\begin{bmatrix} v_{\frac{O_1}{4}l,\frac{O_2}{4}m} & v_{\frac{O_1}{4}l,\frac{O_2}{4}m} & v_{\frac{O_1}{4}l',\frac{O_2}{4}m'} & v_{\frac{O_1}{4}l',\frac{O_2}{4}m'} & v_{\frac{O_1}{4}l'',\frac{O_2}{4}m''} & v_{\frac{O_1}{4}l'',\frac{O_2}{4}m''} & v_{\frac{O_1}{4}l''',\frac{O_2}{4}m'''} & v_{\frac{O_1}{4}l''',\frac{O_2}{4}m'''} \\ v_{\frac{O_1}{4}l,\frac{O_2}{4}m} & -v_{\frac{O_1}{4}l,\frac{O_2}{4}m} & v_{\frac{O_1}{4}l',\frac{O_2}{4}m'} & -v_{\frac{O_1}{4}l',\frac{O_2}{4}m'} & v_{\frac{O_1}{4}l'',\frac{O_2}{4}m''} & -v_{\frac{O_1}{4}l'',\frac{O_2}{4}m''} & v_{\frac{O_1}{4}l''',\frac{O_2}{4}m'''} & -v_{\frac{O_1}{4}l''',\frac{O_2}{4}m'''} \end{bmatrix}$$

for Codebook-Config = 2-4

$$W^{(8)}_{l,l',l'',l''',m,m',m'',m'''} = \frac{1}{\sqrt{8P}}\begin{bmatrix} v_{l,m} & v_{l,m} & v_{l',m'} & v_{l',m'} & v_{l'',m''} & v_{l'',m''} & v_{l''',m'''} & v_{l''',m'''} \\ v_{l,m} & -v_{l,m} & v_{l',m'} & -v_{l',m'} & v_{l'',m''} & -v_{l'',m''} & v_{l''',m'''} & -v_{l''',m'''} \end{bmatrix}$$

for Codebook-Config = 1

TABLE 94-2

| Codebook for 8-layer CSI reporting using antenna ports 15 to 14 + P<br>$P = 12, 16\ N_1 > 1, N_2 > 1$ | | | |
|---|---|---|---|
| Value of Codebook-Config | $i_{1,1}$ | $i_{1,2}$ | $i_2$<br>0 |
| 1 | $0, 1, \ldots, O_1N_1 - 1$ | $0, 1, \ldots, O_2N_2 - 1$ | $W^{(8)}_{i_{1,1},i_{1,1}+O_1,i_{1,1}+O_1,i_{1,1},i_{1,2},i_{1,2},i_{1,2}+O_2,i_{1,2}+O_2}$ |

where $W^{(8)}_{l,l',l'',l''',m,m',m'',m'''} = \frac{1}{\sqrt{8P}}\begin{bmatrix} v_{l,m} & v_{l,m} & v_{l',m'} & v_{l',m'} & v_{l'',m''} & v_{l'',m''} & v_{l''',m'''} & v_{l''',m'''} \\ v_{l,m} & -v_{l,m} & v_{l',m'} & -v_{l',m'} & v_{l'',m''} & -v_{l'',m''} & v_{l''',m'''} & -v_{l''',m'''} \end{bmatrix}$

TABLE 94-3

| Codebook for 8-layer CSI reporting using antenna ports 15 to 14 + P<br>$P = 16, N_2 = I$ | | | |
|---|---|---|---|
| Value of Codebook-Config | $i_{1,1}$ | $i_{1,2}$ | $i_2$<br>0 |
| 1 | $0, 1, \ldots, O_1N_1 - 1$ | $0, 1, \ldots, O_2N_2 - 1$ | $W^{(8)}_{i_{1,1},i_{1,1}+O_1,i_{1,1}+2O_1,i_{1,1}+3O_1,i_{1,2},i_{1,2},i_{1,2},i_{1,2}}$ |

where $W^{(8)}_{l,l',l'',l''',m,m',m'',m'''} = \frac{1}{\sqrt{8P}}\begin{bmatrix} v_{l,m} & v_{l,m} & v_{l',m'} & v_{l',m'} & v_{l'',m''} & v_{l'',m''} & v_{l''',m'''} & v_{l''',m'''} \\ v_{l,m} & -v_{l,m} & v_{l',m'} & -v_{l',m'} & v_{l'',m''} & -v_{l'',m''} & v_{l''',m'''} & -v_{l''',m'''} \end{bmatrix}$

TABLE 94-4

| Codebook for 8-layer CSI reporting using antenna ports 15 to 14 + P<br>$P = 12$ | | | |
|---|---|---|---|
| Value of Codebook-Config | $i_{1,1}$ | $i_{1,2}$ | $i_2$<br>0 |
| 2 | $0, 1, \ldots, 4N_1 - 1$ | $0, 1, \ldots, 4N_1 - 1$ | $W^{(8)}_{i_{1,1},i_{1,1}+4,i_{1,1}+4,i_{1,1},i_{1,2},i_{1,2},i_{1,2}+4,i_{1,2}+4}$ if $N_1 > 1, N_2 > 1$ |
| 3 | $0, 1, \ldots, 4N_1 - 1$ | $0, 1, \ldots, 4N_1 - 1$ | $W^{(8)}_{i_{1,1},i_{1,1}+4,i_{1,1}+8,i_{1,1}+4,i_{1,2},i_{1,2},i_{1,2}+4,i_{1,2}+4}$ if $N_1 \geq N_2$<br>$W^{(8)}_{i_{1,1},i_{1,1},i_{1,1}+4,i_{1,1}+4,i_{1,2},i_{1,2}+4,i_{1,2}+8,i_{1,2}+4}$ if $N_1 < N_2$ |
| 4 | $0, 1, \ldots, 4N_1 - 1$ | $0, 1, \ldots, 4N_1 - 1$ | $W^{(8)}_{i_{1,1},i_{1,1}+4,i_{1,1}+8,i_{1,1},i_{1,2},i_{1,2},i_{1,2},i_{1,2}+4}$ if $N_1 \geq N_2$<br>$W^{(8)}_{i_{1,1},i_{1,1},i_{1,1},i_{1,1}+4,i_{1,2},i_{1,2}+4,i_{1,2}+8,i_{1,2}}$ if $N_1 < N_2$ |

Where $W^{(8)}_{l,l',l'',l''',m,m',m'',m'''} = \frac{1}{\sqrt{8P}}\begin{bmatrix} v_{\frac{O_1}{4}l,\frac{O_2}{4}m} & v_{\frac{O_1}{4}l,\frac{O_2}{4}m} & v_{\frac{O_1}{4}l',\frac{O_2}{4}m'} & v_{\frac{O_1}{4}l',\frac{O_2}{4}m'} & v_{\frac{O_1}{4}l'',\frac{O_2}{4}m''} & v_{\frac{O_1}{4}l'',\frac{O_2}{4}m''} & v_{\frac{O_1}{4}l''',\frac{O_2}{4}m'''} & v_{\frac{O_1}{4}l''',\frac{O_2}{4}m'''} \\ v_{\frac{O_1}{4}l,\frac{O_2}{4}m} & -v_{\frac{O_1}{4}l,\frac{O_2}{4}m} & v_{\frac{O_1}{4}l',\frac{O_2}{4}m'} & -v_{\frac{O_1}{4}l',\frac{O_2}{4}m'} & v_{\frac{O_1}{4}l'',\frac{O_2}{4}m''} & -v_{\frac{O_1}{4}l'',\frac{O_2}{4}m''} & v_{\frac{O_1}{4}l''',\frac{O_2}{4}m'''} & -v_{\frac{O_1}{4}l''',\frac{O_2}{4}m'''} \end{bmatrix}$

TABLE 94-5

| Codebook for 8-layer CSI reporting using antenna ports 15 to 14 + P<br>P = 16 | | | |
|---|---|---|---|
| Value of | | | $i_2$ |
| Codebook-Config | $i_{1,1}$ | $i_{1,2}$ | 0 |
| 2 | $0, 1, \ldots, 4N_1 - 1$ | $0, 1, \ldots, 4N_1 - 1$ | $W_{i_{1,1},i_{1,1}+4,i_{1,1}+4,i_{1,1},i_{1,2},i_{1,2},i_{1,2}+4,i_{1,2}+4}^{(8)}$ if $N_1 > 1, N_2 > 1$ |
| 3 | $0, 1, \ldots, 4N_1 - 1$ | $0, 1, \ldots, 4N_1 - 1$ | $W_{i_{1,1},i_{1,1}+4,i_{1,1}+8,i_{1,1}+12,i_{1,2},i_{1,2},i_{1,2}+4,i_{1,2}+4}^{(8)}$ if $N_1 \geq N_2$<br>$W_{i_{1,1},i_{1,1},i_{1,1}+4,i_{1,1}+4,i_{1,2},i_{1,2}+4,i_{1,2}+8,i_{1,2}+12}^{(8)}$ if $N_1 < N_2$ |
| 4 | $0, 1, \ldots, 4N_1 - 1$ | $0, 1, \ldots, 4N_1 - 1$ | $W_{i_{1,1},i_{1,1}+4,i_{1,1}+8,i_{1,1}+12,i_{1,2},i_{1,2},i_{1,2},i_{1,2}}^{(8)}$ if $N_1 \geq N_2$<br>$W_{i_{1,1},i_{1,1},i_{1,1},i_{1,1},i_{1,2},i_{1,2}+4,i_{1,2}+8,i_{1,2}+12}^{(8)}$ if $N_1 < N_2$ |

Where $W_{l,l',l'',l''',m,m',m'',m'''}^{(8)} = \frac{1}{\sqrt{8P}} \begin{bmatrix} v_{\frac{O_1}{4}l,\frac{O_2}{4}m} & v_{\frac{O_1}{4}l,\frac{O_2}{4}m} & v_{\frac{O_1}{4}l',\frac{O_2}{4}m'} & v_{\frac{O_1}{4}l',\frac{O_2}{4}m'} & v_{\frac{O_1}{4}l'',\frac{O_2}{4}m''} & v_{\frac{O_1}{4}l'',\frac{O_2}{4}m''} & v_{\frac{O_1}{4}l''',\frac{O_2}{4}m'''} & v_{\frac{O_1}{4}l''',\frac{O_2}{4}m'''} \\ v_{\frac{O_1}{4}l,\frac{O_2}{4}m} & -v_{\frac{O_1}{4}l,\frac{O_2}{4}m} & v_{\frac{O_1}{4}l',\frac{O_2}{4}m'} & -v_{\frac{O_1}{4}l',\frac{O_2}{4}m'} & v_{\frac{O_1}{4}l'',\frac{O_2}{4}m''} & -v_{\frac{O_1}{4}l'',\frac{O_2}{4}m''} & v_{\frac{O_1}{4}l''',\frac{O_2}{4}m'''} & -v_{\frac{O_1}{4}l''',\frac{O_2}{4}m'''} \end{bmatrix}$

TABLE 95-1

| Codebook for 1-layer CSI reporting using antenna ports 15 to 14 + P | | | | | | |
|---|---|---|---|---|---|---|
| Value of | | | $i_2$ | | | |
| Codebook-Config | $i_{1,1}$ | $i_{1,2}$ | 0 | 1 | 2 | 3 |
| 1 | $0, 1, \ldots, O_1N_1 - 1$ | $0, 1, \ldots, O_2N_2 - 1$ | $W_{i_{1,1},i_{1,2},0}^{(1)}$ | $W_{i_{1,1},i_{1,2},1}^{(1)}$ | $W_{i_{1,1},i_{1,2},2}^{(1)}$ | $W_{i_{1,1},i_{1,2},3}^{(1)}$ |

where $W_{l,m,n}^{(1)} = \frac{1}{\sqrt{P}} \begin{bmatrix} v_{l,m} \\ \varphi_n v_{l,m} \end{bmatrix}$, if $N_1 \geq N_2$ $W_{l,m,n}^{(1)} = \frac{1}{\sqrt{P}} \begin{bmatrix} v_{m,l} \\ \varphi_n v_{m,l} \end{bmatrix}$, if $N_1 < N_2$

TABLE 95-2

| Codebook for 1-layer CSI reporting using antenna ports 15 to 14 + P | | | | | | |
|---|---|---|---|---|---|---|
| Value of | | | $i_2$ | | | |
| Codebook-Config | $i_{1,1}$ | $i_{1,2}$ | 0 | 1 | 2 | 3 |
| 2 | $0, 1, \ldots, \frac{N_1O_1}{2} - 1$ | $0, 1, \ldots, \frac{N_2O_2}{2} - 1$ | $W_{2i_{1,1},2i_{1,2},0}^{(1)}$ | $W_{2i_{1,1},2i_{1,2},1}^{(1)}$ | $W_{2i_{1,1},2i_{1,2},2}^{(1)}$ | $W_{2i_{1,1},2i_{1,2},3}^{(1)}$ |
| Value of | | | $i_2$ | | | |
| Codebook-Config | $i_{1,1}$ | $i_{1,2}$ | 4 | 5 | 6 | 7 |
| 2 | $0, 1, \ldots, \frac{N_1O_1}{2} - 1$ | $0, 1, \ldots, \frac{N_2O_2}{2} - 1$ | $W_{2i_{1,1}+1,2i_{1,2},0}^{(1)}$ | $W_{2i_{1,1}+1,2i_{1,2},1}^{(1)}$ | $W_{2i_{1,1}+1,2i_{1,2},2}^{(1)}$ | $W_{2i_{1,1}+1,2i_{1,2},3}^{(1)}$ |
| Value of | | | $i_2$ | | | |
| Codebook-Config | $i_{1,1}$ | $i_{1,2}$ | 8 | 9 | 10 | 11 |
| 2 | $0, 1, \ldots, \frac{N_1O_1}{2} - 1$ | $0, 1, \ldots, \frac{N_2O_2}{2} - 1$ | $W_{2i_{1,1},2i_{1,2}+1,0}^{(1)}$ | $W_{2i_{1,1},2i_{1,2}+1,1}^{(1)}$ | $W_{2i_{1,1},2i_{1,2}+1,1}^{(1)}$ | $W_{2i_{1,1},2i_{1,2}+1,3}^{(1)}$ |
| Value of | | | $i_2$ | | | |
| Codebook-Config | $i_{1,1}$ | $i_{1,2}$ | 12 | 13 | 14 | 15 |
| 2 | $0, 1, \ldots, \frac{N_1O_1}{2} - 1$ | $0, 1, \ldots, \frac{N_2O_2}{2} - 1$ | $W_{2i_{1,1}+1,2i_{1,2}+1,0}^{(1)}$ | $W_{2i_{1,1}+1,2i_{1,2}+1,1}^{(1)}$ | $W_{2i_{1,1}+1,2i_{1,2}+1,2}^{(1)}$ | $W_{2i_{1,1}+1,2i_{1,2}+1,3}^{(1)}$ |

where $W_{l,m,n}^{(1)} = \frac{1}{\sqrt{P}} \begin{bmatrix} v_{l,m} \\ \varphi_n v_{l,m} \end{bmatrix}$, if $N_1 \geq N_2$ $W_{l,m,n}^{(1)} = \frac{1}{\sqrt{P}} \begin{bmatrix} v_{m,l} \\ \varphi_n v_{m,l} \end{bmatrix}$, if $N_1 < N_2$

TABLE 95-2

| Codebook for 1-layer CSI reporting using antenna ports 15 to 14 + P | | | | | | |
|---|---|---|---|---|---|---|
| Value of | | | $i_2$ | | | |
| Codebook-Config | $i_{1,1}$ | $i_{1,2}$ | 0 | 1 | 2 | 3 |
| 3 | $0, 1, \ldots, \frac{N_1O_1}{2}-1$ | $0, 1, \ldots, \frac{N_2O_2}{2}-1$ | $W_{2i_{1,1},2i_{1,2},0}^{(1)}$ | $W_{2i_{1,1},2i_{1,2},1}^{(1)}$ | $W_{2i_{1,1},2i_{1,2},2}^{(1)}$ | $W_{2i_{1,1},2i_{1,2},3}^{(1)}$ |
| Value of | | | $i_2$ | | | |
| Codebook-Config | $i_{1,1}$ | $i_{1,2}$ | 4 | 5 | 6 | 7 |
| 3 | $0, 1, \ldots, \frac{N_1O_1}{2}-1$ | $0, 1, \ldots, \frac{N_2O_2}{2}-1$ | $W_{2i_{1,1}+2,2i_{1,2},0}^{(1)}$ | $W_{2i_{1,1}+2,2i_{1,2},1}^{(1)}$ | $W_{2i_{1,1}+2,2i_{1,2},2}^{(1)}$ | $W_{2i_{1,1}+2,2i_{1,2},3}^{(1)}$ |
| Value of | | | $i_2$ | | | |
| Codebook-Config | $i_{1,1}$ | $i_{1,2}$ | 8 | 9 | 10 | 11 |
| 3 | $0, 1, \ldots, \frac{N_1O_1}{2}-1$ | $0, 1, \ldots, \frac{N_2O_2}{2}-1$ | $W_{2i_{1,1}+1,2i_{1,2}+1,0}^{(1)}$ | $W_{2i_{1,1}+1,2i_{1,2}+1,1}^{(1)}$ | $W_{2i_{1,1}+1,2i_{1,2}+1,2}^{(1)}$ | $W_{2i_{1,1}+1,2i_{1,2}+1,3}^{(1)}$ |
| Value of | | | $i_2$ | | | |
| Codebook-Config | $i_{1,1}$ | $i_{1,2}$ | 12 | 13 | 14 | 15 |
| 3 | $0, 1, \ldots, \frac{N_1O_1}{2}-1$ | $0, 1, \ldots, \frac{N_2O_2}{2}-1$ | $W_{2i_{1,1}+3,2i_{1,2}+1,0}^{(1)}$ | $W_{2i_{1,1}+3,2i_{1,2}+1,1}^{(1)}$ | $W_{2i_{1,1}+3,2i_{1,2}+1,2}^{(1)}$ | $W_{2i_{1,1}+3,2i_{1,2}+1,3}^{(1)}$ |

where $W_{l,m,n}^{(1)} = \frac{1}{\sqrt{P}}\begin{bmatrix} v_{l,m} \\ \varphi_n v_{l,m} \end{bmatrix}$, if $N_1 \geq N_2$ $W_{l,m,n}^{(1)} = \frac{1}{\sqrt{P}}\begin{bmatrix} v_{m,l} \\ \varphi_n v_{m,l} \end{bmatrix}$, if $N_1 < N_2$

TABLE 95-3

| Codebook for 1-layer CSI reporting using antenna ports 15 to 14 + P | | | | | | |
|---|---|---|---|---|---|---|
| Value of | | | $i_2$ | | | |
| Codebook-Config | $i_{1,1}$ | $i_{1,2}$ | 0 | 1 | 2 | 3 |
| 4 | $0, 1, \ldots, \frac{N_1O_1}{2}-1$ | $0, 1, \ldots, \frac{N_2O_2}{2}-1$ | $W_{2i_{1,1},2i_{1,2},0}^{(1)}$ | $W_{2i_{1,1},2i_{1,2},1}^{(1)}$ | $W_{2i_{1,1},2i_{1,2},2}^{(1)}$ | $W_{2i_{1,1},2i_{1,2},3}^{(1)}$ |
| Value of | | | $i_2$ | | | |
| Codebook-Config | $i_{1,1}$ | $i_{1,2}$ | 4 | 5 | 6 | 7 |
| 4 | $0, 1, \ldots, \frac{N_1O_1}{2}-1$ | $0, 1, \ldots, \frac{N_2O_2}{2}-1$ | $W_{2i_{1,1}+1,2i_{1,2},0}^{(1)}$ | $W_{2i_{1,1}+1,2i_{1,2},1}^{(1)}$ | $W_{2i_{1,1}+1,2i_{1,2},2}^{(1)}$ | $W_{2i_{1,1}+1,2i_{1,2},3}^{(1)}$ |
| Value of | | | $i_2$ | | | |
| Codebook-Config | $i_{1,1}$ | $i_{1,2}$ | 8 | 9 | 10 | 11 |
| 4 | $0, 1, \ldots, \frac{N_1O_1}{2}-1$ | $0, 1, \ldots, \frac{N_2O_2}{2}-1$ | $W_{2i_{1,1}+2,2i_{1,2},0}^{(1)}$ | $W_{2i_{1,1}+2,2i_{1,2},1}^{(1)}$ | $W_{2i_{1,1}+2,2i_{1,2},2}^{(1)}$ | $W_{2i_{1,1}+2,2i_{1,2},3}^{(1)}$ |

TABLE 95-3-continued

| Codebook for 1-layer CSI reporting using antenna ports 15 to 14 + P | | | | | | |
|---|---|---|---|---|---|---|
| Value of | | | $i_2$ | | | |
| Codebook-Config | $i_{1,1}$ | $i_{1,2}$ | 12 | 13 | 14 | 15 |
| 4 | $0, 1, \ldots, \frac{N_1O_1}{2} - 1$ | $0, 1, \ldots, \frac{N_2O_2}{2} - 1$ | $W_{2i_{1,1}+3,2i_{1,2},0}^{(1)}$ | $W_{2i_{1,1}+3,2i_{1,2},1}^{(1)}$ | $W_{2i_{1,1}+3,2i_{1,2},2}^{(1)}$ | $W_{2i_{1,1}+3,2i_{1,2},3}^{(1)}$ |

where $W_{l,m,n}^{(1)} = \frac{1}{\sqrt{P}}\begin{bmatrix} v_{l,m} \\ \varphi_n v_{l,m} \end{bmatrix}$, if $N_1 \geq N_2$ $W_{l,m,n}^{(1)} = \frac{1}{\sqrt{P}}\begin{bmatrix} v_{m,l} \\ \varphi_n v_{m,l} \end{bmatrix}$, if $N_1 < N_2$

TABLE 96-1

| Codebook for 2-layer CSI reporting using antenna ports 15 to 14 + P | | | | | | |
|---|---|---|---|---|---|---|
| Value of | | | $i_2$ | | | |
| Codebook-Config | $i_{1,1}$ | $i_{1,2}$ | 0 | 1 | 2 | 3 |
| 1 | $0, 1, \ldots, O_1N_1 - 1$ | $0, 1, \ldots, O_2N_2 - 1$ | $W_{i_{1,1},i_{1,1},i_{1,2},i_{1,2},0}^{(2)}$ | $W_{i_{1,1},i_{1,1},i_{1,2},i_{1,2},1}^{(2)}$ | $W_{i_{1,1},i_{1,1},i_{1,2},i_{1,2},2}^{(2)}$ | $W_{i_{1,1},i_{1,1},i_{1,2},i_{1,2},3}^{(2)}$ |

where $W_{l,l',m,m',n}^{(2)} = \frac{1}{\sqrt{2P}}\begin{bmatrix} v_{l,m} & v_{l',m'} \\ \varphi_n v_{l,m} & -\varphi_n v_{l',m'} \end{bmatrix}$, if $N_1 \geq N_2$ $W_{l,l',m,m',n}^{(2)} = \frac{1}{\sqrt{2P}}\begin{bmatrix} v_{m,l} & v_{m',l'} \\ \varphi_n v_{m,l} & -\varphi_n v_{m',l'} \end{bmatrix}$, if $N_1 < N_2$

TABLE 96-2

| Codebook for 1-layer CSI reporting using antenna ports 15 to 14 + P | | | | | |
|---|---|---|---|---|---|
| Value of Code-book- | | | $i_2$ | | |
| Config | $i_{1,1}$ | $i_{1,2}$ | 0 | 1 | 2 |
| 2 | $0, 1, \ldots, \frac{N_1O_1}{2} - 1$ | $0, 1, \ldots, \frac{N_2O_2}{2} - 1$ | $W_{s_1i_{1,1},s_1i_{1,1},s_2i_{1,2},s_2i_{1,2},0}^{(2)}$ | $W_{s_1i_{1,1},s_1i_{1,1},s_2i_{1,2},s_2i_{1,2},1}^{(2)}$ | $W_{s_1i_{1,1}+p_1,s_1i_{1,1}+p_1,s_2i_{1,2},s_2i_{1,2},0}^{(2)}$ |
| Value of Code-book- | | | $i_2$ | | |
| Config | $i_{1,1}$ | $i_{1,2}$ | 3 | 4 | 5 |
| 2 | $0, 1, \ldots, \frac{N_1O_1}{2} - 1$ | $0, 1, \ldots, \frac{N_2O_2}{2} - 1$ | $W_{s_1i_{1,1}+p_1,s_1i_{1,1}+p_1,s_2i_{1,2},s_2i_{1,2},1}^{(2)}$ | $W_{s_1i_{1,1},s_1i_{1,1}+p_1,s_2i_{1,2},s_2i_{1,2},0}^{(2)}$ | $W_{s_1i_{1,1},s_1i_{1,1}+p_1,s_2i_{1,2},s_2i_{1,2},1}^{(2)}$ |

TABLE 96-2-continued

Codebook for 1-layer CSI reporting using antenna ports 15 to 14 + P

| Value of Codebook-Config | $i_{1,1}$ | $i_{1,2}$ | $i_2$: 6 | $i_2$: 7 | $i_2$: 8 |
|---|---|---|---|---|---|
| 2 | $0, 1, \ldots, \frac{N_1O_1}{2}-1$ | $0, 1, \ldots, \frac{N_2O_2}{2}-1$ | $W^{(2)}_{s_1i_{1,1},s_1i_{1,1},s_2i_{1,2}+p_2,s_2i_{1,2}+p_2,0}$ | $W^{(2)}_{s_1i_{1,1},s_1i_{1,1},s_2i_{1,2}+p_2,s_2i_{1,2}+p_2,1}$ | $W^{(2)}_{s_1i_{1,1}+p_1,s_1i_{1,1}+p_1,s_2i_{1,2}+p_2,s_2i_{1,2}+p_2,0}$ |

| Value of Codebook-Config | $i_{1,1}$ | $i_{1,2}$ | $i_2$: 9 | $i_2$: 10 | $i_2$: 11 |
|---|---|---|---|---|---|
| 2 | $0, 1, \ldots, \frac{N_1O_1}{2}-1$ | $0, 1, \ldots, \frac{N_2O_2}{2}-1$ | $W^{(2)}_{s_1i_{1,1}+p_1,s_1i_{1,1}+p_1,s_2i_{1,2}+p_2,s_2i_{1,2}+p_2,1}$ | $W^{(2)}_{s_1i_{1,1},s_1i_{1,1}+p_1,s_2i_{1,2}+p_2,s_2i_{1,2}+p_2,0}$ | $W^{(2)}_{s_1i_{1,1},s_1i_{1,1}+p_1,s_2i_{1,2}+p_2,s_2i_{1,2}+p_2,1}$ |

| Value of Codebook-Config | $i_{1,1}$ | $i_{1,2}$ | $i_2$: 12 | $i_2$: 13 | $i_2$: 14 |
|---|---|---|---|---|---|
| 2 | $0, 1, \ldots, \frac{N_1O_1}{2}-1$ | $0, 1, \ldots, \frac{N_2O_2}{2}-1$ | $W^{(2)}_{s_1i_{1,1},s_1i_{1,1},s_2i_{1,2},s_2i_{1,2}+p_2,0}$ | $W^{(2)}_{s_1i_{1,1},s_1i_{1,1},s_2i_{1,2},s_2i_{1,2}+p_2,1}$ | $W^{(2)}_{s_1i_{1,1}+p_1,s_1i_{1,1}+p_1,s_2i_{1,2},s_2i_{1,2}+p_2,0}$ |

| Value of Codebook-Config | $i_{1,1}$ | $i_{1,2}$ | $i_2$: 15 |
|---|---|---|---|
| 2 | $0, 1, \ldots, \frac{N_1O_1}{2}-1$ | $0, 1, \ldots, \frac{N_2O_2}{2}-1$ | $W^{(2)}_{s_1i_{1,1}+p_1,s_1i_{1,1}+p_1,s_2i_{1,2},s_2i_{1,2}+p_2,1}$ |

where $W^{(2)}_{l,l',m,m',n} = \frac{1}{\sqrt{2P}}\begin{bmatrix} v_{l,m} & v_{l',m'} \\ \varphi_n v_{l,m} & -\varphi_n v_{l',m'} \end{bmatrix}$, if $N_1 \geq N_2$ $W^{(2)}_{l,l',m,m',n} = \frac{1}{\sqrt{2P}}\begin{bmatrix} v_{m,l} & v_{m',l'} \\ \varphi_n v_{m,l} & -\varphi_n v_{m',l'} \end{bmatrix}$, if $N_1 < N_2$ If $N_1 <= N_2$, then $p_1 = O_1$ and $p_2 = 1$, otherwise $p_1 = 1$ and $p_2 = 1$.

TABLE 96-3

| Codebook for 1-layer CSI reporting using antenna ports 15 to 14 + P | | | | | |
|---|---|---|---|---|---|
| Value of Code-book-Config | $i_{1,1}$ | $i_{1,2}$ | $i_2$ | | |
| | | | 0 | 1 | 2 |
| 3 | $0, 1, \ldots, \frac{N_1 O_1}{2} - 1$ | $0, 1, \ldots, \frac{N_2 O_2}{2} - 1$ | $W^{(2)}_{s_1 i_{1,1}, s_1 i_{1,1}, s_2 i_{1,2}, s_2 i_{1,2}, 0}$ | $W^{(2)}_{s_1 i_{1,1}, s_1 i_{1,1}, s_2 i_{1,2}, s_2 i_{1,2}, 1}$ | $W^{(2)}_{s_1 i_{1,1}+2p_1, s_1 i_{1,1}+2p_1, s_2 i_{1,2}, s_2 i_{1,2}, 0}$ |
| Value of Code-book-Config | $i_{1,1}$ | $i_{1,2}$ | $i_2$ | | |
| | | | 3 | 4 | 5 |
| 3 | $0, 1, \ldots, \frac{N_1 O_1}{2} - 1$ | $0, 1, \ldots, \frac{N_2 O_2}{2} - 1$ | $W^{(2)}_{s_1 i_{1,1}+2p_1, s_1 i_{1,1}+2p_1, s_2 i_{1,2}, s_2 i_{1,2}, 1}$ | $W^{(2)}_{s_1 i_{1,1}+p_1, s_1 i_{1,1}+p_1, s_2 i_{1,2}+p_2, s_2 i_{1,2}+p_2, 0}$ | $W^{(2)}_{s_1 i_{1,1}+p_1, s_1 i_{1,1}+p_1, s_2 i_{1,2}+p_2, s_2 i_{1,2}+p_2, 1}$ |
| Value of Code-book-Config | $i_{1,1}$ | $i_{1,2}$ | $i_2$ | | |
| | | | 6 | 7 | 8 |
| 3 | $0, 1, \ldots, \frac{N_1 O_1}{2} - 1$ | $0, 1, \ldots, \frac{N_2 O_2}{2} - 1$ | $W^{(2)}_{s_1 i_{1,1}+3p_1, s_1 i_{1,1}+3p_1, s_2 i_{1,2}+p_2, s_2 i_{1,2}+p_2, 0}$ | $W^{(2)}_{s_1 i_{1,1}+3p_1, s_1 i_{1,1}+3p_1, s_2 i_{1,2}+p_2, s_2 i_{1,2}+p_2, 1}$ | $W^{(2)}_{s_1 i_{1,1}+p_1, s_1 i_{1,1}+3p_1, s_2 i_{1,2}+p_2, s_2 i_{1,2}+p_2, 0}$ |
| Value of Code-book-Config | $i_{1,1}$ | $i_{1,2}$ | $i_2$ | | |
| | | | 9 | 10 | 11 |
| 3 | $0, 1, \ldots, \frac{N_1 O_1}{2} - 1$ | $0, 1, \ldots, \frac{N_2 O_2}{2} - 1$ | $W^{(2)}_{s_1 i_{1,1}+p_1, s_1 i_{1,1}+3p_1, s_2 i_{1,2}+p_2, s_2 i_{1,2}+p_2, 1}$ | $W^{(2)}_{s_1 i_{1,1}, s_1 i_{1,1}+p_1, s_2 i_{1,2}, s_2 i_{1,2}+p_2, 0}$ | $W^{(2)}_{s_1 i_{1,1}, s_1 i_{1,1}+p_1, s_2 i_{1,2}, s_2 i_{1,2}+p_2, 1}$ |
| Value of Code-book-Config | $i_{1,1}$ | $i_{1,2}$ | $i_2$ | | |
| | | | 12 | 13 | 14 |
| 3 | $0, 1, \ldots, \frac{N_1 O_1}{2} - 1$ | $0, 1, \ldots, \frac{N_2 O_2}{2} - 1$ | $W^{(2)}_{s_1 i_{1,1}+p_1, s_1 i_{1,1}+2p_1, s_2 i_{1,2}+p_2, s_2 i_{1,2}, 0}$ | $W^{(2)}_{s_1 i_{1,1}+p_1, s_1 i_{1,1}+2p_1, s_2 i_{1,2}+p_2, s_2 i_{1,2}, 1}$ | $W^{(2)}_{s_1 i_{1,1}, s_1 i_{1,1}+3p_1, s_2 i_{1,2}, s_2 i_{1,2}+p_2, 0}$ |

TABLE 96-3-continued

Codebook for 1-layer CSI reporting using antenna ports 15 to 14 + P

| Value of Code-book-Config | $i_{1,1}$ | $i_{1,2}$ | $i_2$: 15 |
|---|---|---|---|
| 3 | $0, 1, \ldots, \frac{N_1O_1}{2} - 1$ | $0, 1, \ldots, \frac{N_2O_2}{2} - 1$ | $W^{(2)}_{s_1i_{1,1}, s_1i_{1,1}+3p_1, s_2i_{1,2}, s_2i_{1,2}+p_2, 1}$ |

where $W^{(2)}_{l,l',m,m',n} = \frac{1}{\sqrt{2P}}\begin{bmatrix} v_{l,m} & v_{l',m'} \\ \varphi_n v_{l,m} & -\varphi_n v_{l',m'} \end{bmatrix}$, if $N_1 \geq N_2$ $W^{(2)}_{l,l',m,m',n} = \frac{1}{\sqrt{2P}}\begin{bmatrix} v_{m,l} & v_{m',l'} \\ \varphi_n v_{m,l} & -\varphi_n v_{m',l'} \end{bmatrix}$, if $N_1 < N_2$

TABLE 96-4

Codebook for 1-layer CSI reporting using antenna ports 15 to 14 + P

| Value of Codebook-Config | $i_{1,1}$ | $i_{1,2}$ | $i_2$: 0 | $i_2$: 1 | $i_2$: 2 |
|---|---|---|---|---|---|
| 4 | $0, 1, \ldots, \frac{N_1O_1}{2} - 1$ | $0, 1, \ldots, \frac{N_2O_2}{2} - 1$ | $W^{(2)}_{s_1i_{1,1}, s_1i_{1,1}, s_2i_{1,2}, s_2i_{1,2}, 0}$ | $W^{(2)}_{s_1i_{1,1}, s_1i_{1,1}, s_2i_{1,2}, s_2i_{1,2}, 1}$ | $W^{(2)}_{s_1i_{1,1}+p_1, s_1i_{1,1}+p_1, s_2i_{1,2}, s_2i_{1,2}, 0}$ |

| Value of Codebook-Config | $i_{1,1}$ | $i_{1,2}$ | $i_2$: 3 | $i_2$: 4 | $i_2$: 5 |
|---|---|---|---|---|---|
| 4 | $0, 1, \ldots, \frac{N_1O_1}{2} - 1$ | $0, 1, \ldots, \frac{N_2O_2}{2} - 1$ | $W^{(2)}_{s_1i_{1,1}+p_1, s_1i_{1,1}+p_1, s_2i_{1,2}, s_2i_{1,2}, 1}$ | $W^{(2)}_{s_1i_{1,1}+2p_1, s_1i_{1,1}+2p_1, s_2i_{1,2}, s_2i_{1,2}, 0}$ | $W^{(2)}_{s_1i_{1,1}+2p_1, s_1i_{1,1}+2p_1, s_2i_{1,2}, s_2i_{1,2}, 1}$ |

| Value of Codebook-Config | $i_{1,1}$ | $i_{1,2}$ | $i_2$: 6 | $i_2$: 7 | $i_2$: 8 |
|---|---|---|---|---|---|
| 4 | $0, 1, \ldots, \frac{N_1O_1}{2} - 1$ | $0, 1, \ldots, \frac{N_2O_2}{2} - 1$ | $W^{(2)}_{s_1i_{1,1}+3p_1, s_1i_{1,1}+3p_1, s_2i_{1,2}, s_2i_{1,2}, 0}$ | $W^{(2)}_{s_1i_{1,1}+3p_1, s_1i_{1,1}+3p_1, s_2i_{1,2}, s_2i_{1,2}, 1}$ | $W^{(2)}_{s_1i_{1,1}, s_1i_{1,1}+p_1, s_2i_{1,2}, s_2i_{1,2}, 0}$ |

| Value of Codebook-Config | $i_{1,1}$ | $i_{1,2}$ | $i_2$: 9 | $i_2$: 10 | $i_2$: 11 |
|---|---|---|---|---|---|
| 4 | $0, 1, \ldots, \frac{N_1O_1}{2} - 1$ | $0, 1, \ldots, \frac{N_2O_2}{2} - 1$ | $W^{(2)}_{s_1i_{1,1}, s_1i_{1,1}+p_1, s_2i_{1,2}, s_2i_{1,2}, 1}$ | $W^{(2)}_{s_1i_{1,1}+p_1, s_1i_{1,1}+2p_1, s_2i_{1,2}, s_2i_{1,2}, 0}$ | $W^{(2)}_{s_1i_{1,1}+p_1, s_1i_{1,1}+2p_1, s_2i_{1,2}, s_2i_{1,2}, 1}$ |

| Value of Codebook-Config | $i_{1,1}$ | $i_{1,2}$ | $i_2$: 12 | $i_2$: 13 | $i_2$: 14 |
|---|---|---|---|---|---|
| 4 | $0, 1, \ldots, \frac{N_1O_1}{2} - 1$ | $0, 1, \ldots, \frac{N_2O_2}{2} - 1$ | $W^{(2)}_{s_1i_{1,1}, s_1i_{1,1}+3p_1, s_2i_{1,2}, s_2i_{1,2}, 0}$ | $W^{(2)}_{s_1i_{1,1}, s_1i_{1,1}+3p_1, s_2i_{1,2}, s_2i_{1,2}, 1}$ | $W^{(2)}_{s_1i_{1,1}+p_1, s_1i_{1,1}+3p_1, s_2i_{1,2}, s_2i_{1,2}, 0}$ |

TABLE 96-4-continued

Codebook for 1-layer CSI reporting using antenna ports 15 to 14 + P

| Value of Codebook-Config | $i_{1,1}$ | $i_{1,2}$ | $i_2$: 15 |
|---|---|---|---|
| 4 | $0, 1, \ldots, \frac{N_1O_1}{2}-1$ | $0, 1, \ldots, \frac{N_2O_2}{2}-1$ | $W^{(2)}_{s_1i_{1,1}+p_1,s_1i_{1,1}+3p_1,s_2i_{1,2},s_2i_{1,2},1}$ |

where $W^{(2)}_{l,l',m,m',n} = \frac{1}{\sqrt{2P}}\begin{bmatrix} v_{l,m} & v_{l',m'} \\ \varphi_n v_{l,m} & -\varphi_n v_{l',m'} \end{bmatrix}$, if $N_1 \geq N_2$ $W^{(2)}_{l,l',m,m',n} = \frac{1}{\sqrt{2P}}\begin{bmatrix} v_{m,l} & v_{m',l'} \\ \varphi_n v_{m,l} & -\varphi_n v_{m',l'} \end{bmatrix}$, if $N_1 < N_2$

TABLE 97-1

Codebook for 3-layer CSI reporting using antenna ports 15 to 14 + P

| Value of Codebook-Config | $i_{1,1}$ | $i_{1,2}$ | $(\delta_1, \delta_2)$ | $i_2$: 0 | $i_2$: 1 |
|---|---|---|---|---|---|
| 1 | $0, 1, \ldots, O_1N_1-1$ | $0, 1, \ldots, O_2N_2-1$ | $(O_1, 0), (0, O_2)$ if $N_1, N_2 > 1$<br>$(O_1, 0), (2O_1, 0), (3O_1, 0)$ if $N_1 = 1$<br>$(0, O_2), (0, 2O_2), (0, 3O_2)$ if $N_2 = 1$ | $W^{(3)}_{i_{1,1},i_{1,1}+\delta_1,i_{1,2},i_{1,2}+\delta_2}$ | $\tilde{W}^{(3)}_{i_{1,1},i_{1,1}+\delta_1,i_{1,2},i_{1,2}+\delta_2}$ |

where $W^{(3)}_{l,l',m,m'} = \frac{1}{\sqrt{3P}}\begin{bmatrix} v_{l,m} & v_{l,m} & v_{l',m'} \\ v_{l,m} & -v_{l,m} & -v_{l',m'} \end{bmatrix}$ and $\tilde{W}^{(3)}_{l,l',m,m'} = \frac{1}{\sqrt{3P}}\begin{bmatrix} v_{l,m} & v_{l',m'} & v_{l',m'} \\ v_{l,m} & v_{l',m'} & -v_{l',m'} \end{bmatrix}$, if $N_1 \geq N_2$ $W^{(3)}_{l,l',m,m'} = \frac{1}{\sqrt{3P}}\begin{bmatrix} v_{m,l} & v_{m,l} & v_{m',l'} \\ v_{m,l} & -v_{m,l} & -v_{m',l'} \end{bmatrix}$ and $W^{(3)}_{l,l',m,m'} = \frac{1}{\sqrt{3P}}\begin{bmatrix} v_{m,l} & v_{m',l'} & v_{m',l'} \\ v_{m,l} & v_{m',l'} & -v_{m',l'} \end{bmatrix}$, if $N_1 < N_2$

TABLE 97-2

Codebook for 3-layer CSI reporting using antenna ports 15 to 14 + P

| Value of Codebook-Config | $i_{1,1}$ | $i_{1,2}$ | $(\delta_1, \delta_2)$ | $i_2$: 0 | $i_2$: 1 |
|---|---|---|---|---|---|
| 2 | $0, 1, \ldots, 2N_1-1$ | $0, 1, \ldots, 2N_2-1$ | $(O_1, 0)$,<br>$(0, O_2)$ | $W^{(3)}_{s_1i_{1,1},s_1i_{1,1}+\delta_1,s_2i_{1,2},s_2i_{1,2}+\delta_2}$ | $W^{(3)}_{s_1i_{1,1}+\delta_1,s_1i_{1,1},s_2i_{1,2}+\delta_2,s_2i_{1,2}}$ |

| Value of Codebook-Config | $i_{1,1}$ | $i_{1,2}$ | $(\delta_1, \delta_2)$ | $i_2$: 2 | $i_2$: 3 |
|---|---|---|---|---|---|
| 2 | $0, 1, \ldots, 2N_1-1$ | $0, 1, \ldots, 2N_2-1$ | $(O_1, 0)$,<br>$(0, O_2)$ | $\tilde{W}^{(3)}_{s_1i_{1,1},s_1i_{1,1}+\delta_1,s_2i_{1,2},s_2i_{1,2}+\delta_2}$ | $\tilde{W}^{(3)}_{s_1i_{1,1}+\delta_1,s_1i_{1,1},s_2i_{1,2}+\delta_2,s_2i_{1,2}}$ |

| Value of Codebook-Config | $i_{1,1}$ | $i_{1,2}$ | $(\delta_1, \delta_2)$ | $i_2$: 4 | $i_2$: 5 |
|---|---|---|---|---|---|
| 2 | $0, 1, \ldots, 2N_1-1$ | $0, 1, \ldots, 2N_2-1$ | $(O_1, 0)$,<br>$(0, O_2)$ | $W^{(3)}_{s_1i_{1,1}+p_1,s_1i_{1,1}+p_1+\delta_1,s_2i_{1,2},s_2i_{1,2}+\delta_2}$ | $W^{(3)}_{s_1i_{1,1}+p_1+\delta_1,s_1i_{1,1}+p_1,s_2i_{1,2}+\delta_2,s_2i_{1,2}}$ |

| Value of Codebook-Config | $i_{1,1}$ | $i_{1,2}$ | $(\delta_1, \delta_2)$ | $i_2$: 6 | $i_2$: 7 |
|---|---|---|---|---|---|
| 2 | $0, 1, \ldots, 2N_1-1$ | $0, 1, \ldots, 2N_2-1$ | $(O_1, 0)$,<br>$(0, O_2)$ | $\tilde{W}^{(3)}_{s_1i_{1,1}+p_1,s_1i_{1,1}+p_1+\delta_1,s_2i_{1,2},s_2i_{1,2}+\delta_2}$ | $\tilde{W}^{(3)}_{s_1i_{1,1}+p_1+\delta_1,s_1i_{1,1}+p_1,s_2i_{1,2}+\delta_2,s_2i_{1,2}}$ |

TABLE 97-2-continued

| Codebook for 3-layer CSI reporting using antenna ports 15 to 14 + P | | | | | |
|---|---|---|---|---|---|
| Value of Codebook- | | | | $i_2$ | |
| Config | $i_{1,1}$ | $i_{1,2}$ | $(\delta_1, \delta_2)$ | 8 | 9 |
| 2 | $0, 1, \ldots, 2N_1 - 1$ | $0, 1, \ldots, 2N_2 - 1$ | $(O_1, 0)$, $(0, O_2)$ | $W_{s_1 i_{1,1}, s_1 i_{1,1}+\delta_1, s_2 i_{1,2}+p_2, s_2 i_{1,2}+\delta_2+p_2}^{(3)}$ | $W_{s_1 i_{1,1}+\delta_1, s_1 i_{1,1}, s_2 i_{1,2}+\delta_2+p_2, s_2 i_{1,2}+p_2}^{(3)}$ |
| Value of Codebook- | | | | $i_2$ | |
| Config | $i_{1,1}$ | $i_{1,2}$ | $(\delta_1, \delta_2)$ | 10 | 11 |
| 2 | $0, 1, \ldots, 2N_1 - 1$ | $0, 1, \ldots, 2N_2 - 1$ | $(O_1, 0)$, $(0, O_2)$ | $\tilde{W}_{s_1 i_{1,1}, s_1 i_{1,1}+\delta_1, s_2 i_{1,2}+p_2, s_2 i_{1,2}+\delta_2+p_2}^{(3)}$ | $\tilde{W}_{s_1 i_{1,1}+\delta_1, s_1 i_{1,1}, s_2 i_{1,2}+\delta_2+p_2, s_2 i_{1,2}+p_2}^{(2)}$ |
| Value of Codebook- | | | | $i_2$ | |
| Config | $i_{1,1}$ | $i_{1,2}$ | $(\delta_1, \delta_2)$ | 12 | 13 |
| 2 | $0, 1, \ldots, 2N_1 - 1$ | $0, 1, \ldots, 2N_2 - 1$ | $(O_1, 0)$, $(0, O_2)$ | $W_{s_1 i_{1,1}+p_1, s_1 i_{1,1}+p_1+\delta_1, s_2 i_{1,2}+p_2, s_2 i_{1,2}+\delta_2+p_2}^{(3)}$ | $W_{s_1 i_{1,1}+p_1+\delta_1, s_1 i_{1,1}+p_1, s_2 i_{1,2}+\delta_2+p_2, s_2 i_{1,2}+p_2}^{(3)}$ |
| Value of Codebook- | | | | $i_2$ | |
| Config | $i_{1,1}$ | $i_{1,2}$ | $(\delta_1, \delta_2)$ | 14 | 15 |
| 2 | $0, 1, \ldots, 2N_1 - 1$ | $0, 1, \ldots, 2N_2 - 1$ | $(O_1, 0)$, $(0, O_2)$ | $\tilde{W}_{s_1 i_{1,1}+p_1, s_1 i_{1,1}+p_1+\delta_1, s_2 i_{1,2}+p_2, s_2 i_{1,2}+\delta_2+p_2}^{(3)}$ | $\tilde{W}_{s_1 i_{1,1}+p_1+\delta_1, s_1 i_{1,1}+p_1, s_2 i_{1,2}+\delta_2+p_2, s_2 i_{1,2}+p_2}^{(3)}$ |

where $W_{l,l',m,m'}^{(3)} = \frac{1}{\sqrt{3P}}\begin{bmatrix} v_{l,m} & v_{l,m} & v_{l',m'} \\ v_{l,m} & -v_{l,m} & -v_{l',m'} \end{bmatrix}$ and $\tilde{W}_{l,l',m,m'}^{(3)} = \frac{1}{\sqrt{3P}}\begin{bmatrix} v_{l,m} & v_{l',m'} & v_{l',m'} \\ v_{l,m} & v_{l',m'} & -v_{l',m'} \end{bmatrix}$, if $N_1 \geq N_2$ $W_{l,l',m,m'}^{(3)} = \frac{1}{\sqrt{3P}}\begin{bmatrix} v_{m,l} & v_{m,l} & v_{m',l'} \\ v_{m,l} & -v_{m,l} & -v_{m',l'} \end{bmatrix}$ and $W_{l,l',m,m'}^{(3)} = \frac{1}{\sqrt{3P}}\begin{bmatrix} v_{m,l} & v_{m',l'} & v_{m',l'} \\ v_{m,l} & v_{m',l'} & -v_{m',l'} \end{bmatrix}$, if $N_1 < N_2$ $(s_1, s_2) = \left(\frac{O_1}{2}, \frac{O_2}{2}\right)$ and $(p_1, p_2) = \left(\frac{O_1}{4}, \frac{O_2}{4}\right)$.

TABLE 97-3

| Codebook for 3-layer CSI reporting using antenna ports 15 to 14 + P | | | | | |
|---|---|---|---|---|---|
| Value of Codebook- | | | | $i_2$ | |
| Config | $i_{1,1}$ | $i_{1,2}$ | $(\delta_1, \delta_2)$ | 0 | 1 |
| 3 | $0, 1, \ldots, N_1 - 1$ | $0, 1, \ldots, 2N_2 - 1$ | $(O_1, 0)$, $(0, O_2)$ | $W_{s_1 i_{1,1}+2p_1, s_1 i_{1,1}+2p_1+\delta_1, s_2 i_{1,2}, s_2 i_{1,2}+\delta_2}^{(3)}$ | $W_{s_1 i_{1,1}+2p_1+\delta_1, s_1 i_{1,1}+2p_1, s_2 i_{1,2}+\delta_2, s_2 i_{1,2}}^{(3)}$ |
| Value of Codebook- | | | | $i_2$ | |
| Config | $i_{1,1}$ | $i_{1,2}$ | $(\delta_1, \delta_2)$ | 2 | 3 |
| 3 | $0, 1, \ldots, N_1 - 1$ | $0, 1, \ldots, 2N_2 - 1$ | $(O_1, 0)$, $(0, O_2)$ | $\tilde{W}_{s_1 i_{1,1}+2p_1, s_1 i_{1,1}+2p_1+\delta_1, s_2 i_{1,2}, s_2 i_{1,2}+\delta_2}^{(3)}$ | $\tilde{W}_{s_1 i_{1,1}+2p_1+\delta_1, s_1 i_{1,1}+2p_1, s_2 i_{1,2}+\delta_2, s_2 i_{1,2}}^{(3)}$ |
| Value of Codebook- | | | | $i_2$ | |
| Config | $i_{1,1}$ | $i_{1,2}$ | $(\delta_1, \delta_2)$ | 4 | 5 |
| 3 | $0, 1, \ldots, N_1 - 1$ | $0, 1, \ldots, 2N_2 - 1$ | $(O_1, 0)$, $(0, O_2)$ | $W_{s_1 i_{1,1}+3p_1, s_1 i_{1,1}+3p_1+\delta_1, s_2 i_{1,2}, s_2 i_{1,2}+\delta_2}^{(3)}$ | $W_{s_1 i_{1,1}+3p_1+\delta_1, s_1 i_{1,1}+3p_1, s_2 i_{1,2}+\delta_2, s_2 i_{1,2}}^{(3)}$ |

TABLE 97-3-continued

Codebook for 3-layer CSI reporting using antenna ports 15 to 14 + P

| Value of Codebook-Config | $i_{1,1}$ | $i_{1,2}$ | $(\delta_1, \delta_2)$ | $i_2$: 6 | $i_2$: 7 |
|---|---|---|---|---|---|
| 3 | $0, 1, \ldots, N_1 - 1$ | $0, 1, \ldots, 2N_2 - 1$ | $(O_1, 0)$, $(0, O_2)$ | $\tilde{W}^{(3)}_{s_1 i_{1,1}+3p_1, s_1 i_{1,1}+3p_1+\delta_1, s_2 i_{1,2}, s_2 i_{1,2}+\delta_2}$ | $\tilde{W}^{(3)}_{s_1 i_{1,1}+3p_1+\delta_1, s_1 i_{1,1}+3p_1, s_2 i_{1,2}+\delta_2, s_2 i_{1,2}}$ |
| **Value of Codebook-Config** | **$i_{1,1}$** | **$i_{1,2}$** | **$(\delta_1, \delta_2)$** | **$i_2$: 8** | **$i_2$: 9** |
| 3 | $0, 1, \ldots, N_1 - 1$ | $0, 1, \ldots, 2N_2 - 1$ | $(O_1, 0)$, $(0, O_2)$ | $W^{(3)}_{s_1 i_{1,1}, s_1 i_{1,1}+\delta_1, s_2 i_{1,2}+p_2, s_2 i_{1,2}+\delta_2+p_2}$ | $W^{(3)}_{s_1 i_{1,1}+\delta_1, s_1 i_{1,1}, s_2 i_{1,2}+\delta_2+p_2, s_2 i_{1,2}+p_2}$ |
| **Value of Codebook-Config** | **$i_{1,1}$** | **$i_{1,2}$** | **$(\delta_1, \delta_2)$** | **$i_2$: 10** | **$i_2$: 11** |
| 3 | $0, 1, \ldots, N_1 - 1$ | $0, 1, \ldots, 2N_2 - 1$ | $(O_1, 0)$, $(0, O_2)$ | $\tilde{W}^{(3)}_{s_1 i_{1,1}, s_1 i_{1,1}+\delta_1, s_2 i_{1,2}+p_2, s_2 i_{1,2}+\delta_2+p_2}$ | $\tilde{W}^{(3)}_{s_1 i_{1,1}+\delta_1, s_1 i_{1,1}, s_2 i_{1,2}+\delta_2+p_2, s_2 i_{1,2}+p_2}$ |
| **Value of Codebook-Config** | **$i_{1,1}$** | **$i_{1,2}$** | **$(\delta_1, \delta_2)$** | **$i_2$: 12** | **$i_2$: 13** |
| 3 | $0, 1, \ldots, N_1 - 1$ | $0, 1, \ldots, N_1 - 1$ | $(O_1, 0)$, $(0, O_2)$ | $W^{(3)}_{s_1 i_{1,1}+p_1, s_1 i_{1,1}+p_1+\delta_1, s_2 i_{1,2}+p_2, s_2 i_{1,2}+\delta_2+p_2}$ | $W^{(3)}_{s_1 i_{1,1}+p_1+\delta_1, s_1 i_{1,1}+p_1, s_2 i_{1,2}+\delta_2+p_2, s_2 i_{1,2}+p_2}$ |
| **Value of Codebook-Config** | **$i_{1,1}$** | **$i_{1,2}$** | **$(\delta_1, \delta_2)$** | **$i_2$: 14** | **$i_2$: 15** |
| 3 | $0, 1, \ldots, N_1 - 1$ | $0, 1, \ldots, N_1 - 1$ | $(O_1, 0)$, $(0, O_2)$ | $\tilde{W}^{(3)}_{s_1 i_{1,1}+p_1, s_1 i_{1,1}+p_1+\delta_1, s_2 i_{1,2}+p_2, s_2 i_{1,2}+\delta_2+p_2}$ | $\tilde{W}^{(3)}_{s_1 i_{1,1}+p_1+\delta_1, s_1 i_{1,1}+p_1, s_2 i_{1,2}+\delta_2+p_2, s_2 i_{1,2}+p_2}$ |

where $W^{(3)}_{l,l',m,m'} = \frac{1}{\sqrt{3P}}\begin{bmatrix} v_{l,m} & v_{l,m} & v_{l',m'} \\ v_{l,m} & -v_{l,m} & -v_{l',m'} \end{bmatrix}$ and $\tilde{W}^{(3)}_{l,l',m,m'} = \frac{1}{\sqrt{3P}}\begin{bmatrix} v_{l,m} & v_{l',m'} & v_{l',m'} \\ v_{l,m} & v_{l',m'} & -v_{l',m'} \end{bmatrix}$, if $N_1 \geq N_2$ $W^{(3)}_{l,l',m,m'} = \frac{1}{\sqrt{3P}}\begin{bmatrix} v_{m,l} & v_{m,l} & v_{m',l'} \\ v_{m,l} & -v_{m,l} & -v_{m',l'} \end{bmatrix}$ and $W^{(3)}_{l,l',m,m'} = \frac{1}{\sqrt{3P}}\begin{bmatrix} v_{m,l} & v_{m',l'} & v_{m',l'} \\ v_{m,l} & v_{m',l'} & -v_{m',l'} \end{bmatrix}$, if $N_1 < N_2$ $(s_1, s_2) = \left(O_1, \frac{O_2}{2}\right)$ and $(p_1, p_2) = \left(\frac{O_1}{4}, \frac{O_2}{4}\right)$.

TABLE 97-4

Codebook for 3-layer CSI reporting using antenna ports 15 to 14 + P

| Value of Codebook-Config | $i_{1,1}$ | $i_{1,2}$ | $(\delta_1, \delta_2)$ | $i_2$: 0 | $i_2$: 1 |
|---|---|---|---|---|---|
| 4 | $0, 1, \ldots, N_1 - 1$ | $0, 1, \ldots, 4N_1 - 1$ | $(O_1, 0), (0, O_2)$ if $N_1, N_2 > 1$<br>$(O_1, 0), (2O_1, 0), (3O_1, 0)$ if $N_1 = 1$<br>$(0, O_2), (0, 2O_2), (0, 3O_2)$ if $N_2 = 1$ | $W^{(3)}_{s_1 i_{1,1}, s_1 i_{1,1}+\delta_1, s_2 i_{1,2}, s_2 i_{1,2}+\delta_2}$ | $W^{(3)}_{s_1 i_{1,1}+\delta_1, s_1 i_{1,1}, s_2 i_{1,2}+\delta_2, s_2 i_{1,2}}$ |
| **Value of Codebook-Config** | **$i_{1,1}$** | **$i_{1,2}$** | **$(\delta_1, \delta_2)$** | **$i_2$: 2** | **$i_2$: 3** |
| 4 | $0, 1, \ldots, N_1 - 1$ | $0, 1, \ldots, 4N_1 - 1$ | $(O_1, 0), (0, O_2)$ if $N_1, N_2 > 1$<br>$(O_1, 0), (2O_1, 0), (3O_1, 0)$ if $N_1 = 1$<br>$(0, O_2), (0, 2O_2), (0, 3O_2)$ if $N_2 = 1$ | $\tilde{W}^{(3)}_{s_1 i_{1,1}, s_1 i_{1,1}+\delta_1, s_2 i_{1,2}, s_2 i_{1,2}+\delta_2}$ | $\tilde{W}^{(3)}_{s_1 i_{1,1}+\delta_1, s_1 i_{1,1}, s_2 i_{1,2}+\delta_2, s_2 i_{1,2}}$ |

TABLE 97-4-continued

Codebook for 3-layer CSI reporting using antenna ports 15 to 14 + P

| Value of Codebook-Config | $i_{1,1}$ | $i_{1,2}$ | $(\delta_1, \delta_2)$ | $i_2$: 4 | $i_2$: 5 |
|---|---|---|---|---|---|
| 4 | 0, 1, . . . , $N_1 - 1$ | 0, 1, . . . , $4N_1 - 1$ | $(O_1, 0), (0, O_2)$ if $N_1, N_2 > 1$<br>$(O_1, 0), (2O_1, 0), (3O_1, 0)$ if $N_1 = 1$<br>$(0, O_2), (0, 2O_2), (0, 3O_2)$ if $N_2 = 1$ | $W_{s_1 i_{1,1}+p_1, s_1 i_{1,1}+p_1+\delta_1, s_2 i_{1,2}, s_2 i_{1,2}+\delta_2}^{(3)}$ | $W_{s_1 i_{1,1}+p_1+\delta_1, s_1 i_{1,1}+p_1, s_2 i_{1,2}+\delta_2, s_2 i_{1,2}}^{(3)}$ |
| **Value of Codebook-Config** | **$i_{1,1}$** | **$i_{1,2}$** | **$(\delta_1, \delta_2)$** | **$i_2$: 6** | **$i_2$: 7** |
| 4 | 0, 1, . . . , $N_1 - 1$ | 0, 1, . . . , $4N_1 - 1$ | $(O_1, 0), (0, O_2)$ if $N_1, N_2 > 1$<br>$(O_1, 0), (2O_1, 0), (3O_1, 0)$ if $N_1 = 1$<br>$(0, O_2), (0, 2O_2), (0, 3O_2)$ if $N_2 = 1$ | $\tilde{W}_{s_1 i_{1,1}+p_1, s_1 i_{1,1}+p_1+\delta_1, s_2 i_{1,2}, s_2 i_{1,2}+\delta_2}^{(3)}$ | $\tilde{W}_{s_1 i_{1,1}+p_1+\delta_1, s_1 i_{1,1}+p_1, s_2 i_{1,2}+\delta_2, s_2 i_{1,2}}^{(3)}$ |
| **Value of Codebook-Config** | **$i_{1,1}$** | **$i_{1,2}$** | **$(\delta_1, \delta_2)$** | **$i_2$: 8** | **$i_2$: 9** |
| 4 | 0, 1, . . . , $N_1 - 1$ | 0, 1, . . . , $4N_1 - 1$ | $(O_1, 0), (0, O_2)$ if $N_1, N_2 > 1$<br>$(O_1, 0), (2O_1, 0), (3O_1, 0)$ if $N_1 = 1$<br>$(0, O_2), (0, 2O_2), (0, 3O_2)$ if $N_2 = 1$ | $W_{s_1 i_{1,1}+2p_1, s_1 i_{1,1}+2p_1+\delta_1, s_2 i_{1,2}, s_2 i_{1,2}+\delta_2}^{(3)}$ | $W_{s_1 i_{1,1}+2p_1+\delta_1, s_1 i_{1,1}+2p_1, s_2 i_{1,2}+\delta_2, s_2 i_{1,2}}^{(3)}$ |
| **Value of Codebook-Config** | **$i_{1,1}$** | **$i_{1,2}$** | **$(\delta_1, \delta_2)$** | **$i_2$: 10** | **$i_2$: 11** |
| 4 | 0, 1, . . . , $N_1 - 1$ | 0, 1, . . . , $4N_1 - 1$ | $(O_1, 0), (0, O_2)$ if $N_1, N_2 > 1$<br>$(O_1, 0), (2O_1, 0), (3O_1, 0)$ if $N_1 = 1$<br>$(0, O_2), (0, 2O_2), (0, 3O_2)$ if $N_2 = 1$ | $\tilde{W}_{s_1 i_{1,1}+2p_1, s_1 i_{1,1}+2p_1+\delta_1, s_2 i_{1,2}, s_2 i_{1,2}+\delta_2}^{(3)}$ | $\tilde{W}_{s_1 i_{1,1}+2p_1+\delta_1, s_1 i_{1,1}+2p_1, s_2 i_{1,2}+\delta_2, s_2 i_{1,2}}^{(3)}$ |
| **Value of Codebook-Config** | **$i_{1,1}$** | **$i_{1,2}$** | **$(\delta_1, \delta_2)$** | **$i_2$: 12** | **$i_2$: 13** |
| 4 | 0, 1, . . . , $N_1 - 1$ | 0, 1, . . . , $4N_1 - 1$ | $(O_1, 0), (0, O_2)$ if $N_1, N_2 > 1$<br>$(O_1, 0), (2O_1, 0), (3O_1, 0)$ if $N_1 = 1$<br>$(0, O_2), (0, 2O_2), (0, 3O_2)$ if $N_2 = 1$ | $W_{s_1 i_{1,1}+3p_1, s_1 i_{1,1}+3p_1+\delta_1, s_2 i_{1,2}, s_2 i_{1,2}+\delta_2}^{(3)}$ | $W_{s_1 i_{1,1}+3p_1+\delta_1, s_1 i_{1,1}+3p_1, s_2 i_{1,2}+\delta_2, s_2 i_{1,2}}^{(3)}$ |
| **Value of Codebook-Config** | **$i_{1,1}$** | **$i_{1,2}$** | **$(\delta_1, \delta_2)$** | **$i_2$: 14** | **$i_2$: 15** |
| 4 | 0, 1, . . . , $N_1 - 1$ | 0, 1, . . . , $4N_1 - 1$ | $(O_1, 0), (0, O_2)$ if $N_1, N_2 > 1$<br>$(O_1, 0), (2O_1, 0), (3O_1, 0)$ if $N_1 = 1$<br>$(0, O_2), (0, 2O_2), (0, 3O_2)$ if $N_2 = 1$ | $\tilde{W}_{s_1 i_{1,1}+3p_1, s_1 i_{1,1}+3p_1+\delta_1, s_2 i_{1,2}, s_2 i_{1,2}+\delta_2}^{(3)}$ | $\tilde{W}_{s_1 i_{1,1}+3p_1+\delta_1, s_1 i_{1,1}+3p_1, s_2 i_{1,2}+\delta_2, s_2 i_{1,2}}^{(3)}$ |

where $W_{l,l',m,m'}^{(3)} = \frac{1}{\sqrt{3P}}\begin{bmatrix} v_{l,m} & v_{l,m} & v_{l',m'} \\ v_{l,m} & -v_{l,m} & -v_{l',m'} \end{bmatrix}$ and $\tilde{W}_{l,l',m,m'}^{(3)} = \frac{1}{\sqrt{3P}}\begin{bmatrix} v_{l,m} & v_{l',m'} & v_{l',m'} \\ v_{l,m} & v_{l',m'} & -v_{l',m'} \end{bmatrix}$, if $N_1 \geq N_2$ $W_{l,l',m,m'}^{(3)} = \frac{1}{\sqrt{3P}}\begin{bmatrix} v_{m,l} & v_{m,l} & v_{m',l'} \\ v_{m,l} & -v_{m,l} & -v_{m',l'} \end{bmatrix}$ and $W_{l,l',m,m'}^{(3)} = \frac{1}{\sqrt{3P}}\begin{bmatrix} v_{m,l} & v_{m',l'} & v_{m',l'} \\ v_{m,l} & v_{m',l'} & -v_{m',l'} \end{bmatrix}$, if $N_1 < N_2$ $(s_1, s_2) = \left(O_1, \frac{O_2}{2}\right)$ and $(p_1, p_2) = \left(\frac{O_1}{4}, —\right)$.

TABLE 98-1

| Codebook for 4-layer CSI reporting using antenna ports 15 to 14 + P | | | | | |
|---|---|---|---|---|---|
| Value of Codebook- | | | | $i_2$ | |
| Config | $i_{1,1}$ | $i_{1,2}$ | $(\delta_1, \delta_2)$ | 0 | 1 |
| 1 | 0, 1, . . . , $O_1N_1 - 1$ | 0, 1, . . . , $O_2N_2 - 1$ | $(O_1, 0), (0, O_2)$ if $N_1, N_2 > 1$<br>$(O_1, 0), (2O_1, 0), (3O_1, 0)$ if $N_1 = 1$<br>$(0, O_2), (0, 2O_2), (0, 3O_2)$ if $N_2 = 1$ | $W_{i_{1,1},i_{1,1}+\delta_1,i_{1,2},i_{1,2}+\delta_2,0}^{(4)}$ | $W_{i_{1,1},i_{1,1}+\delta_1,i_{1,2},i_{1,2}+\delta_2,1}^{(4)}$ |

where $W_{l,l',m,m',n}^{(4)} = \frac{1}{\sqrt{4P}}\begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$, if $N_1 \geq N_2$ $W_{l,l',m,m',n}^{(4)} = \frac{1}{\sqrt{4P}}\begin{bmatrix} v_{m,l} & v_{m',l'} & v_{m,l} & v_{m',l'} \\ \varphi_n v_{m,l} & \varphi_n v_{m',l'} & -\varphi_n v_{m,l} & -\varphi_n v_{m',l'} \end{bmatrix}$, if $N_1 < N_2$

TABLE 98-2

| Codebook for 4-layer CSI reporting using antenna ports 15 to 14 + P | | | | | |
|---|---|---|---|---|---|
| Value of Codebook- | | | | $i_2$ | |
| Config | $i_{1,1}$ | $i_{1,2}$ | $(\delta_1, \delta_2)$ | 0 | 1 |
| 2 | 0, 1, . . . , $2N_1 - 1$ | 0, 1, . . . , $2N_2 - 1$ | $(O_1, 0)$,<br>$(0, O_2)$ | $W_{s_1i_{1,1},s_1i_{1,1}+\delta_1,s_2i_{1,2},s_2i_{1,2}+\delta_2,0}^{(4)}$ | $W_{s_1i_{1,1},s_1i_{1,1}+\delta_1,s_2i_{1,2},s_2i_{1,2}+\delta_2,1}^{(4)}$ |
| Value of Codebook- | | | | $i_2$ | |
| Config | $i_{1,1}$ | $i_{1,2}$ | $(\delta_1, \delta_2)$ | 2 | 3 |
| 2 | 0, 1, . . . , $2N_1 - 1$ | 0, 1, . . . , $2N_2 - 1$ | $(O_1, 0)$,<br>$(0, O_2)$ | $W_{s_1i_{1,1}+p_1,s_1i_{1,1}+p_1+\delta_1,s_2i_{1,2},s_2i_{1,2}+\delta_2,0}^{(4)}$ | $W_{s_1i_{1,1}+p_1,s_1i_{1,1}+p_1+\delta_1,s_2i_{1,2},s_2i_{1,2}+\delta_2,1}^{(4)}$ |
| Value of Codebook- | | | | $i_2$ | |
| Config | $i_{1,1}$ | $i_{1,2}$ | $(\delta_1, \delta_2)$ | 4 | 5 |
| 2 | 0, 1, . . . , $2N_1 - 1$ | 0, 1, . . . , $2N_2 - 1$ | $(O_1, 0)$,<br>$(0, O_2)$ | $W_{s_1i_{1,1},s_1i_{1,1}+\delta_1,s_2i_{1,2}+p_2,s_2i_{1,2}+\delta_2+p_2,0}^{(4)}$ | $W_{s_1i_{1,1},s_1i_{1,1}+\delta_1,s_2i_{1,2}+p_2,s_2i_{1,2}+\delta_2+p_2,1}^{(4)}$ |
| Value of Codebook- | | | | $i_2$ | |
| Config | $i_{1,1}$ | $i_{1,2}$ | $(\delta_1, \delta_2)$ | 6 | 7 |
| 2 | 0, 1, . . . , $2N_1 - 1$ | 0, 1, . . . , $2N_2 - 1$ | $(O_1, 0)$,<br>$(0, O_2)$ | $W_{s_1i_{1,1}+p_1,s_1i_{1,1}+p_1+\delta_1,s_2i_{1,2}+p_2,s_2i_{1,2}+\delta_2+p_2,0}^{(4)}$ | $W_{s_1i_{1,1}+p_1,s_1i_{1,1}+p_1+\delta_1,s_2i_{1,2}+p_2,s_2i_{1,2}+\delta_2+p_2,1}^{(4)}$ |

where $W_{l,l',m,m',n}^{(4)} = \frac{1}{\sqrt{4P}}\begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$, if $N_1 \geq N_2$ $W_{l,l',m,m',n}^{(4)} = \frac{1}{\sqrt{4P}}\begin{bmatrix} v_{m,l} & v_{m',l'} & v_{m,l} & v_{m',l'} \\ \varphi_n v_{m,l} & \varphi_n v_{m',l'} & -\varphi_n v_{m,l} & -\varphi_n v_{m',l'} \end{bmatrix}$, if $N_1 < N_2$ $(s_1, s_2) = \left(\frac{O_1}{2}, \frac{O_2}{2}\right)$ and $(p_1, p_2) = \left(\frac{O_1}{4}, \frac{O_2}{4}\right)$.

TABLE 98-3

| Codebook for 4-layer CSI reporting using antenna ports 15 to 14 + P | | | | | |
|---|---|---|---|---|---|
| Value of Codebook- | | | | $i_2$ | |
| Config | $i_{1,1}$ | $i_{1,2}$ | $(\delta_1, \delta_2)$ | 0 | 1 |
| 3 | 0, 1, . . . , $N_1 - 1$ | 0, 1, . . . , $2N_2 - 1$ | $(O_1, 0)$,<br>$(0, O_2)$ | $W_{s_1i_{1,1}+2p_1,s_1i_{1,1}+2p_1+\delta_1,s_2i_{1,2},s_2i_{1,2}+\delta_2,0}^{(4)}$ | $W_{s_1i_{1,1}+2p_1,s_1i_{1,1}+2p_1+\delta_1,s_2i_{1,2},s_2i_{1,2}+\delta_2,1}^{(4)}$ |

TABLE 98-3-continued

Codebook for 4-layer CSI reporting using antenna ports 15 to 14 + P

| Value of Codebook-Config | $i_{1,1}$ | $i_{1,2}$ | $(\delta_1, \delta_2)$ | $i_2$: 2 | $i_2$: 3 |
|---|---|---|---|---|---|
| 3 | $0, 1, \ldots, N_1 - 1$ | $0, 1, \ldots, 2N_2 - 1$ | $(O_1, 0)$, $(0, O_2)$ | $W_{s_1 i_{1,1}+3p_1, s_1 i_{1,1}+3p_1+\delta_1, s_2 i_{1,2}, s_2 i_{1,2}+\delta_2, 0}^{(4)}$ | $W_{s_1 i_{1,1}+3p_1, s_1 i_{1,1}+3p_1+\delta_1, s_2 i_{1,2}, s_2 i_{1,2}+\delta_2, 1}^{(4)}$ |

| Value of Codebook-Config | $i_{1,1}$ | $i_{1,2}$ | $(\delta_1, \delta_2)$ | $i_2$: 4 | $i_2$: 5 |
|---|---|---|---|---|---|
| 3 | $0, 1, \ldots, N_1 - 1$ | $0, 1, \ldots, 2N_2 - 1$ | $(O_1, 0)$, $(0, O_2)$ | $W_{s_1 i_{1,1}, s_1 i_{1,1}+\delta_1, s_2 i_{1,2}+p_2, s_2 i_{1,2}+\delta_2+p_2, 0}^{(4)}$ | $W_{s_1 i_{1,1}, s_1 i_{1,1}+\delta_1, s_2 i_{1,2}+p_2, s_2 i_{1,2}+\delta_2+p_2, 1}^{(4)}$ |

| Value of Codebook-Config | $i_{1,1}$ | $i_{1,2}$ | $(\delta_1, \delta_2)$ | $i_2$: 6 | $i_2$: 7 |
|---|---|---|---|---|---|
| 3 | $0, 1, \ldots, N_1 - 1$ | $0, 1, \ldots, N_1 - 1$ | $(O_1, 0)$, $(0, O_2)$ | $W_{s_1 i_{1,1}+p_1, s_1 i_{1,1}+p_1+\delta_1, s_2 i_{1,2}+p_2, s_2 i_{1,2}+\delta_2+p_2, 0}^{(4)}$ | $W_{s_1 i_{1,1}+p_1, s_1 i_{1,1}+p_1+\delta_1, s_2 i_{1,2}+p_2, s_2 i_{1,2}+\delta_2+p_2, 1}^{(4)}$ |

where $W_{l,l',m,m',n}^{(4)} = \frac{1}{\sqrt{4P}}\begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$, if $N_1 \geq N_2$ $W_{l,l',m,m',n}^{(4)} = \frac{1}{\sqrt{4P}}\begin{bmatrix} v_{m,l} & v_{m',l'} & v_{m,l} & v_{m',l'} \\ \varphi_n v_{m,l} & \varphi_n v_{m',l'} & -\varphi_n v_{m,l} & -\varphi_n v_{m',l'} \end{bmatrix}$, if $N_1 < N_2$ $(s_1, s_2) = \left(O_1, \frac{O_2}{2}\right)$ and $(p_1, p_2) = \left(\frac{O_1}{4}, \frac{O_2}{4}\right)$.

TABLE 98-4

Codebook for 4-layer CSI reporting using antenna ports 15 to 14 + P

| Value of Codebook-Config | $i_{1,1}$ | $i_{1,2}$ | $(\delta_1, \delta_2)$ | $i_2$: 0 | $i_2$: 1 |
|---|---|---|---|---|---|
| 4 | $0, 1, \ldots, N_1 - 1$ | $0, 1, \ldots, 4N_1 - 1$ | $(O_1, 0)$, $(0, O_2)$ if $N_1, N_2 > 1$; $(O_1, 0)$, $(2O_1, 0)$, $(3O_1, 0)$ if $N_1 = 1$; $(0, O_2)$, $(0, 2O_2)$, $(0, 3O_2)$ if $N_2 = 1$ | $W_{s_1 i_{1,1}, s_1 i_{1,1}+\delta_1, s_2 i_{1,2}, s_2 i_{1,2}+\delta_2, 0}^{(4)}$ | $W_{s_1 i_{1,1}, s_1 i_{1,1}+\delta_1, s_2 i_{1,2}, s_2 i_{1,2}+\delta_2, 1}^{(4)}$ |

| Value of Codebook-Config | $i_{1,1}$ | $i_{1,2}$ | $(\delta_1, \delta_2)$ | $i_2$: 2 | $i_2$: 3 |
|---|---|---|---|---|---|
| 4 | $0, 1, \ldots, N_1 - 1$ | $0, 1, \ldots, 4N_1 - 1$ | $(O_1, 0)$, $(0, O_2)$ if $N_1, N_2 > 1$; $(O_1, 0)$, $(2O_1, 0)$, $(3O_1, 0)$ if $N_1 = 1$; $(0, O_2)$, $(0, 2O_2)$, $(0, 3O_2)$ if $N_2 = 1$ | $W_{s_1 i_{1,1}+p_1, s_1 i_{1,1}+p_1+\delta_1, s_2 i_{1,2}, s_2 i_{1,2}+\delta_2, 0}^{(4)}$ | $W_{s_1 i_{1,1}+p_1, s_1 i_{1,1}+p_1+\delta_1, s_2 i_{1,2}, s_2 i_{1,2}+\delta_2, 1}^{(4)}$ |

| Value of Codebook-Config | $i_{1,1}$ | $i_{1,2}$ | $(\delta_1, \delta_2)$ | $i_2$: 4 | $i_2$: 5 |
|---|---|---|---|---|---|
| 4 | $0, 1, \ldots, N_1 - 1$ | $0, 1, \ldots, 4N_1 - 1$ | $(O_1, 0)$, $(0, O_2)$ if $N_1, N_2 > 1$; $(O_1, 0)$, $(2O_1, 0)$, $(3O_1, 0)$ if $N_1 = 1$; $(0, O_2)$, $(0, 2O_2)$, $(0, 3O_2)$ if $N_2 = 1$ | $W_{s_1 i_{1,1}+2p_1, s_1 i_{1,1}+2p_1+\delta_1, s_2 i_{1,2}, s_2 i_{1,2}+\delta_2, 0}^{(4)}$ | $W_{s_1 i_{1,1}+2p_1, s_1 i_{1,1}+2p_1+\delta_1, s_2 i_{1,2}, s_2 i_{1,2}+\delta_2, 1}^{(4)}$ |

TABLE 98-4-continued

| Codebook for 4-layer CSI reporting using antenna ports 15 to 14 + P | | | | | |
|---|---|---|---|---|---|
| Value of Codebook- | | | | $i_2$ | |
| Config | $i_{1,1}$ | $i_{1,2}$ | $(\delta_1, \delta_2)$ | 6 | 7 |
| 4 | 0, 1, . . . , $N_1 - 1$ | 0, 1, . . . , $4N_1 - 1$ | $(O_1, 0), (0, O_2)$ if $N_1, N_2 > 1$<br>$(O_1, 0), (2O_1, 0), (3O_1, 0)$ if $N_1 = 1$<br>$(0, O_2), (0, 2O_2), (0, 3O_2)$ if $N_2 = 1$ | $W_{s_1 i_{1,1}+3p_1, s_1 i_{1,1}+3p_1+\delta_1, s_2 i_{1,2}, s_2 i_{1,2}+\delta_2, 0}^{(4)}$ | $W_{s_1 i_{1,1}+3p_1, s_1 i_{1,1}+3p_1+\delta_1, s_2 i_{1,2}, s_2 i_{1,2}+\delta_2, 1}^{(4)}$ |

where $W_{l,l',m,m',n}^{(4)} = \frac{1}{\sqrt{4P}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$, if $N_1 \geq N_2$ $W_{l,l',m,m',n}^{(4)} = \frac{1}{\sqrt{4P}} \begin{bmatrix} v_{m,l} & v_{m',l'} & v_{m,l} & v_{m',l'} \\ \varphi_n v_{m,l} & \varphi_n v_{m',l'} & -\varphi_n v_{m,l} & -\varphi_n v_{m',l'} \end{bmatrix}$, if $N_1 < N_2$ $(s_1, s_2) = \left(O_1, \frac{O_2}{4}\right)$ and $(p_1, p_2) = \left(\frac{O_1}{4}, —\right)$.

TABLE 99

| Codebook for 5-layer CSI reporting using antenna ports 15 to 14 + P | | | |
|---|---|---|---|
| Value of Codebook- | | | $i_2$ |
| Config | $i_{1,1}$ | $i_{1,2}$ | 0 |
| 1 | 0, 1, . . . , $O_1N_1 - 1$ | 0, 1, . . . , $O_2N_2 - 1$ | $W_{i_{1,1},i_{1,2}}^{(5)} = \frac{1}{\sqrt{5Q}} \begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+O_1, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+O_1, s_2 i_{1,2}+O_2} \end{bmatrix}$ if $N_1 \geq N_2$ |
| | | | $W_{i_{1,1},i_{1,2}}^{(5)} = \frac{1}{\sqrt{5Q}} \begin{bmatrix} v_{s_2 i_{1,2}, s_1 i_{1,1}} & v_{s_2 i_{1,2}, s_1 i_{1,1}} & v_{s_2 i_{1,2}, s_1 i_{1,1}+O_1} & v_{s_2 i_{1,2}, s_1 i_{1,1}+O_1} & v_{s_2 i_{1,2}+O_2, s_1 i_{1,1}+O_1} \\ v_{s_2 i_{1,2}, s_1 i_{1,1}} & -v_{s_2 i_{1,2}, s_1 i_{1,1}} & v_{s_2 i_{1,2}, s_1 i_{1,1}+O_1} & -v_{s_2 i_{1,2}, s_1 i_{1,1}+O_1} & v_{s_2 i_{1,2}+O_2, s_1 i_{1,1}+O_1} \end{bmatrix}$ if $N_1 < N_2$ |
| 2 | 0, 1, . . . , $4N_1 - 1$ | 0, 1, . . . , $4N_1 - 1$ | $W_{i_{1,1},i_{1,2}}^{(5)} = \frac{1}{\sqrt{5Q}} \begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+O_1, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+O_1, s_2 i_{1,2}+O_2} \end{bmatrix}$ if $N_1 \geq N_2$ |
| | | | $W_{i_{1,1},i_{1,2}}^{(5)} = \frac{1}{\sqrt{5Q}} \begin{bmatrix} v_{s_2 i_{1,2}, s_1 i_{1,1}} & v_{s_2 i_{1,2}, s_1 i_{1,1}} & v_{s_2 i_{1,2}, s_1 i_{1,1}+O_1} & v_{s_2 i_{1,2}, s_1 i_{1,1}+O_1} & v_{s_2 i_{1,2}+O_2, s_1 i_{1,1}+O_1} \\ v_{s_2 i_{1,2}, s_1 i_{1,1}} & -v_{s_2 i_{1,2}, s_1 i_{1,1}} & v_{s_2 i_{1,2}, s_1 i_{1,1}+O_1} & -v_{s_2 i_{1,2}, s_1 i_{1,1}+O_1} & v_{s_2 i_{1,2}+O_2, s_1 i_{1,1}+O_1} \end{bmatrix}$ if $N_1 < N_2$ |
| 3 | 0, 1, . . . , $4N_1 - 1$ | 0, 1, . . . , $4N_1 - 1$ | $W_{i_{1,1},i_{1,2}}^{(5)} = \frac{1}{\sqrt{5Q}} \begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}+O_2} \end{bmatrix}$ if $N_1 \geq N_2$ |
| | | | $W_{i_{1,1},i_{1,2}}^{(5)} = \frac{1}{\sqrt{5Q}} \begin{bmatrix} v_{s_2 i_{1,2}, s_1 i_{1,1}} & v_{s_2 i_{1,2}, s_1 i_{1,1}} & v_{s_2 i_{1,2}, s_1 i_{1,1}+O_1} & v_{s_2 i_{1,2}, s_1 i_{1,1}+O_1} & v_{s_2 i_{1,2}+2O_2, s_1 i_{1,1}+O_1} \\ v_{s_2 i_{1,2}, s_1 i_{1,1}} & -v_{s_2 i_{1,2}, s_1 i_{1,1}} & v_{s_2 i_{1,2}, s_1 i_{1,1}+O_1} & -v_{s_2 i_{1,2}, s_1 i_{1,1}+O_1} & v_{s_2 i_{1,2}+2O_2, s_1 i_{1,1}+O_1} \end{bmatrix}$ if $N_1 < N_2$ |
| 4 | 0, 1, . . . , $4N_1 - 1$ | 0, 1, . . . , $4N_1 - 1$ | $W_{i_{1,1},i_{1,2}}^{(5)} = \frac{1}{\sqrt{5Q}} \begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}} \end{bmatrix}$ if $N_1 \geq N_2$ |
| | | | $W_{i_{1,1},i_{1,2}}^{(5)} = \frac{1}{\sqrt{5Q}} \begin{bmatrix} v_{s_2 i_{1,2}, s_1 i_{1,1}} & v_{s_2 i_{1,2}, s_1 i_{1,1}} & v_{s_2 i_{1,2}+O_2, s_1 i_{1,1}} & v_{s_2 i_{1,2}+O_2, s_1 i_{1,1}} & v_{s_2 i_{1,2}+2O_2, s_1 i_{1,1}} \\ v_{s_2 i_{1,2}, s_1 i_{1,1}} & -v_{s_2 i_{1,2}, s_1 i_{1,1}} & v_{s_2 i_{1,2}+O_2, s_1 i_{1,1}} & -v_{s_2 i_{1,2}+O_2, s_1 i_{1,1}} & v_{s_2 i_{1,2}+2O_2, s_1 i_{1,1}} \end{bmatrix}$ if $N_1 < N_2$ |

TABLE 100

| Codebook for 6-layer CSI reporting using antenna ports 15 to 14 + P | | | |
|---|---|---|---|
| Value of Codebook-Config | $i_{1,1}$ | $i_{1,2}$ | $i_2$: 0 |
| 1 | $0, 1, \ldots, O_1N_1 - 1$ | $0, 1, \ldots, O_2N_2 - 1$ | $W^{(6)}_{i_{1,1},i_{1,2}} = \frac{1}{\sqrt{6Q}}\begin{bmatrix} v_{s_1i_{1,1},s_2i_{1,2}} & v_{s_1i_{1,1},s_2i_{1,2}} & v_{s_1i_{1,1}+O_1,s_2i_{1,2}} & v_{s_1i_{1,1}+O_1,s_2i_{1,2}} & v_{s_1i_{1,1}+O_1,s_2i_{1,2}+O_2} & v_{s_1i_{1,1}+O_1,s_2i_{1,2}+O_2} \\ v_{s_1i_{1,1},s_2i_{1,2}} & -v_{s_1i_{1,1},s_2i_{1,2}} & v_{s_1i_{1,1}+O_1,s_2i_{1,2}} & -v_{s_1i_{1,1}+O_1,s_2i_{1,2}} & v_{s_1i_{1,1}+O_1,s_2i_{1,2}+O_2} & -v_{s_1i_{1,1}+O_1,s_2i_{1,2}+O_2} \end{bmatrix}$ if $N_1 \geq N_2$ |
| | | | $W^{(6)}_{i_{1,1},i_{1,2}} = \frac{1}{\sqrt{6Q}}\begin{bmatrix} v_{s_2i_{1,2},s_1i_{1,1}} & v_{s_2i_{1,2},s_1i_{1,1}} & v_{s_2i_{1,2},s_1i_{1,1}+O_1} & v_{s_2i_{1,2},s_1i_{1,1}+O_1} & v_{s_2i_{1,2}+O_2,s_1i_{1,1}+O_1} & v_{s_2i_{1,2}+O_2,s_1i_{1,1}+O_1} \\ v_{s_2i_{1,2},s_1i_{1,1}} & -v_{s_2i_{1,2},s_1i_{1,1}} & v_{s_2i_{1,2},s_1i_{1,1}+O_1} & -v_{s_2i_{1,2},s_1i_{1,1}+O_1} & v_{s_2i_{1,2}+O_2,s_1i_{1,1}+O_1} & -v_{s_2i_{1,2}+O_2,s_1i_{1,1}+O_1} \end{bmatrix}$ if $N_1 < N_2$ |
| 2 | $0, 1, \ldots, 4N_1 - 1$ | $0, 1, \ldots, 4N_1 - 1$ | $W^{(6)}_{i_{1,1},i_{1,2}} = \frac{1}{\sqrt{6Q}}\begin{bmatrix} v_{s_1i_{1,1},s_2i_{1,2}} & v_{s_1i_{1,1},s_2i_{1,2}} & v_{s_1i_{1,1}+O_1,s_2i_{1,2}} & v_{s_1i_{1,1}+O_1,s_2i_{1,2}} & v_{s_1i_{1,1}+O_1,s_2i_{1,2}+O_2} & v_{s_1i_{1,1}+O_1,s_2i_{1,2}+O_2} \\ v_{s_1i_{1,1},s_2i_{1,2}} & -v_{s_1i_{1,1},s_2i_{1,2}} & v_{s_1i_{1,1}+O_1,s_2i_{1,2}} & -v_{s_1i_{1,1}+O_1,s_2i_{1,2}} & v_{s_1i_{1,1}+O_1,s_2i_{1,2}+O_2} & -v_{s_1i_{1,1}+O_1,s_2i_{1,2}+O_2} \end{bmatrix}$ if $N_1 \geq N_2$ |
| | | | $W^{(6)}_{i_{1,1},i_{1,2}} = \frac{1}{\sqrt{6Q}}\begin{bmatrix} v_{s_2i_{1,2},s_1i_{1,1}} & v_{s_2i_{1,2},s_1i_{1,1}} & v_{s_2i_{1,2},s_1i_{1,1}+O_1} & v_{s_2i_{1,2},s_1i_{1,1}+O_1} & v_{s_2i_{1,2}+O_2,s_1i_{1,1}+O_1} & v_{s_2i_{1,2}+O_2,s_1i_{1,1}+O_1} \\ v_{s_2i_{1,2},s_1i_{1,1}} & -v_{s_2i_{1,2},s_1i_{1,1}} & v_{s_2i_{1,2},s_1i_{1,1}+O_1} & -v_{s_2i_{1,2},s_1i_{1,1}+O_1} & v_{s_2i_{1,2}+O_2,s_1i_{1,1}+O_1} & -v_{s_2i_{1,2}+O_2,s_1i_{1,1}+O_1} \end{bmatrix}$ if $N_1 < N_2$ |
| 3 | $0, 1, \ldots, 4N_1 - 1$ | $0, 1, \ldots, 4N_1 - 1$ | $W^{(6)}_{i_{1,1},i_{1,2}} = \frac{1}{\sqrt{6Q}}\begin{bmatrix} v_{s_1i_{1,1},s_2i_{1,2}} & v_{s_1i_{1,1},s_2i_{1,2}} & v_{s_1i_{1,1}+O_1,s_2i_{1,2}} & v_{s_1i_{1,1}+O_1,s_2i_{1,2}} & v_{s_1i_{1,1}+2O_1,s_2i_{1,2}+O_2} & v_{s_1i_{1,1}+2O_1,s_2i_{1,2}+O_2} \\ v_{s_1i_{1,1},s_2i_{1,2}} & -v_{s_1i_{1,1},s_2i_{1,2}} & v_{s_1i_{1,1}+O_1,s_2i_{1,2}} & -v_{s_1i_{1,1}+O_1,s_2i_{1,2}} & v_{s_1i_{1,1}+2O_1,s_2i_{1,2}+O_2} & -v_{s_1i_{1,1}+2O_1,s_2i_{1,2}+O_2} \end{bmatrix}$ if $N_1 \geq N_2$ |
| | | | $W^{(6)}_{i_{1,1},i_{1,2}} = \frac{1}{\sqrt{6Q}}\begin{bmatrix} v_{s_2i_{1,2},s_1i_{1,1}} & v_{s_2i_{1,2},s_1i_{1,1}} & v_{s_2i_{1,2},s_1i_{1,1}+O_1} & v_{s_2i_{1,2},s_1i_{1,1}+O_1} & v_{s_2i_{1,2}+2O_2,s_1i_{1,1}+O_1} & v_{s_2i_{1,2}+2O_2,s_1i_{1,1}+O_1} \\ v_{s_2i_{1,2},s_1i_{1,1}} & -v_{s_2i_{1,2},s_1i_{1,1}} & v_{s_2i_{1,2},s_1i_{1,1}+O_1} & -v_{s_2i_{1,2},s_1i_{1,1}+O_1} & v_{s_2i_{1,2}+2O_2,s_1i_{1,1}+O_1} & -v_{s_2i_{1,2}+2O_2,s_1i_{1,1}+O_1} \end{bmatrix}$ if $N_1 < N_2$ |
| 4 | $0, 1, \ldots, 4N_1 - 1$ | $0, 1, \ldots, 4N_1 - 1$ | $W^{(6)}_{i_{1,1},i_{1,2}} = \frac{1}{\sqrt{6Q}}\begin{bmatrix} v_{s_1i_{1,1},s_2i_{1,2}} & v_{s_1i_{1,1},s_2i_{1,2}} & v_{s_1i_{1,1}+O_1,s_2i_{1,2}} & v_{s_1i_{1,1}+O_1,s_2i_{1,2}} & v_{s_1i_{1,1}+2O_1,s_2i_{1,2}} & v_{s_1i_{1,1}+2O_1,s_2i_{1,2}} \\ v_{s_1i_{1,1},s_2i_{1,2}} & -v_{s_1i_{1,1},s_2i_{1,2}} & v_{s_1i_{1,1}+O_1,s_2i_{1,2}} & -v_{s_1i_{1,1}+O_1,s_2i_{1,2}} & v_{s_1i_{1,1}+2O_1,s_2i_{1,2}} & -v_{s_1i_{1,1}+2O_1,s_2i_{1,2}} \end{bmatrix}$ if $N_1 \geq N_2$ |
| | | | $W^{(6)}_{i_{1,1},i_{1,2}} = \frac{1}{\sqrt{6Q}}\begin{bmatrix} v_{s_2i_{1,2},s_1i_{1,1}} & v_{s_2i_{1,2},s_1i_{1,1}} & v_{s_2i_{1,2}+O_2,s_1i_{1,1}} & v_{s_2i_{1,2}+O_2,s_1i_{1,1}} & v_{s_2i_{1,2}+2O_2,s_1i_{1,1}} & v_{s_2i_{1,2}+2O_2,s_1i_{1,1}} \\ v_{s_2i_{1,2},s_1i_{1,1}} & -v_{s_2i_{1,2},s_1i_{1,1}} & v_{s_2i_{1,2}+O_2,s_1i_{1,1}} & -v_{s_2i_{1,2}+O_2,s_1i_{1,1}} & v_{s_2i_{1,2}+2O_2,s_1i_{1,1}} & -v_{s_2i_{1,2}+2O_2,s_1i_{1,1}} \end{bmatrix}$ if $N_1 < N_2$ |

TABLE 101

| Codebook for 7-layer CSI reporting using antenna ports 15 to 14 + P | | | |
|---|---|---|---|
| Value of Codebook-Config | $i_{1,1}$ | $i_{1,2}$ | $i_2$: 0 |
| 1 | $0, 1, \ldots, O_1N_1 - 1$ | $0, 1, \ldots, O_2N_2 - 1$ | $W^{(7)}_{i_{1,1},i_{1,2}} = \frac{1}{\sqrt{7Q}} \begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+O_1, s_2 i_{1,2}+O_2} & v_{s_1 i_{1,1}+O_1, s_2 i_{1,2}+O_2} & v_{s_1 i_{1,1}, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+O_1, s_2 i_{1,2}+O_2} & -v_{s_1 i_{1,1}+O_1, s_2 i_{1,2}+O_2} & v_{s_1 i_{1,1}, s_2 i_{1,2}+O_2} \end{bmatrix}$ if $N_1 \geq N_2$<br>$W^{(7)}_{i_{1,1},i_{1,2}} = \frac{1}{\sqrt{7Q}} \begin{bmatrix} v_{s_2 i_{1,2}, s_1 i_{1,1}} & v_{s_2 i_{1,2}, s_1 i_{1,1}} & v_{s_2 i_{1,2}, s_1 i_{1,1}+O_1} & v_{s_2 i_{1,2}, s_1 i_{1,1}+O_1} & v_{s_2 i_{1,2}+O_2, s_1 i_{1,1}+O_1} & v_{s_2 i_{1,2}+O_2, s_1 i_{1,1}+O_1} & v_{s_2 i_{1,2}+O_2, s_1 i_{1,1}} \\ v_{s_2 i_{1,2}, s_1 i_{1,1}} & -v_{s_2 i_{1,2}, s_1 i_{1,1}} & v_{s_2 i_{1,2}, s_1 i_{1,1}+O_1} & -v_{s_2 i_{1,2}, s_1 i_{1,1}+O_1} & v_{s_2 i_{1,2}+O_2, s_1 i_{1,1}+O_1} & -v_{s_2 i_{1,2}+O_2, s_1 i_{1,1}+O_1} & v_{s_2 i_{1,2}+O_2, s_1 i_{1,1}} \end{bmatrix}$ if $N_1 < N_2$ |
| 2 | $0, 1, \ldots, 4N_1 - 1$ | $0, 1, \ldots, 4N_1 - 1$ | $W^{(7)}_{i_{1,1},i_{1,2}} = \frac{1}{\sqrt{7Q}} \begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+O_1, s_2 i_{1,2}+O_2} & v_{s_1 i_{1,1}+O_1, s_2 i_{1,2}+O_2} & v_{s_1 i_{1,1}, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+O_1, s_2 i_{1,2}+O_2} & -v_{s_1 i_{1,1}+O_1, s_2 i_{1,2}+O_2} & v_{s_1 i_{1,1}, s_2 i_{1,2}+O_2} \end{bmatrix}$ if $N_1 \geq N_2$<br>$W^{(7)}_{i_{1,1},i_{1,2}} = \frac{1}{\sqrt{7Q}} \begin{bmatrix} v_{s_2 i_{1,2}, s_1 i_{1,1}} & v_{s_2 i_{1,2}, s_1 i_{1,1}} & v_{s_2 i_{1,2}, s_1 i_{1,1}+O_1} & v_{s_2 i_{1,2}, s_1 i_{1,1}+O_1} & v_{s_2 i_{1,2}+O_2, s_1 i_{1,1}+O_1} & v_{s_2 i_{1,2}+O_2, s_1 i_{1,1}+O_1} & v_{s_2 i_{1,2}+O_2, s_1 i_{1,1}} \\ v_{s_2 i_{1,2}, s_1 i_{1,1}} & -v_{s_2 i_{1,2}, s_1 i_{1,1}} & v_{s_2 i_{1,2}, s_1 i_{1,1}+O_1} & -v_{s_2 i_{1,2}, s_1 i_{1,1}+O_1} & v_{s_2 i_{1,2}+O_2, s_1 i_{1,1}+O_1} & -v_{s_2 i_{1,2}+O_2, s_1 i_{1,1}+O_1} & v_{s_2 i_{1,2}+O_2, s_1 i_{1,1}} \end{bmatrix}$ if $N_1 < N_2$ |
| 3 | $0, 1, \ldots, 4N_1 - 1$ | $0, 1, \ldots, 4N_1 - 1$ | $W^{(7)}_{i_{1,1},i_{1,2}} = \frac{1}{\sqrt{7Q}} \begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}+O_2} & v_{s_1 i_{1,1}+2O_1, s_2 i_{1,2}+O_2} & v_{s_1 i_{1,1}+O_1, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}+O_2} & -v_{s_1 i_{1,1}+2O_1, s_2 i_{1,2}+O_2} & v_{s_1 i_{1,1}+O_1, s_2 i_{1,2}+O_2} \end{bmatrix}$ if $N_1 \geq N_2$ and 12 port configuration<br>$W^{(7)}_{i_{1,1},i_{1,2}} = \frac{1}{\sqrt{7Q}} \begin{bmatrix} v_{s_2 i_{1,2}, s_1 i_{1,1}} & v_{s_2 i_{1,2}, s_1 i_{1,1}} & v_{s_2 i_{1,2}, s_1 i_{1,1}+O_1} & v_{s_2 i_{1,2}, s_1 i_{1,1}+O_1} & v_{s_2 i_{1,2}+2O_2, s_1 i_{1,1}+O_1} & v_{s_2 i_{1,2}+O_2, s_1 i_{1,1}+O_1} & v_{s_2 i_{1,2}+O_2, s_1 i_{1,1}+O_1} \\ v_{s_2 i_{1,2}, s_1 i_{1,1}} & -v_{s_2 i_{1,2}, s_1 i_{1,1}} & v_{s_2 i_{1,2}, s_1 i_{1,1}+O_1} & -v_{s_2 i_{1,2}, s_1 i_{1,1}+O_1} & v_{s_2 i_{1,2}+2O_2, s_1 i_{1,1}+O_1} & -v_{s_2 i_{1,2}+O_2, s_1 i_{1,1}+O_1} & v_{s_2 i_{1,2}+O_2, s_1 i_{1,1}+O_1} \end{bmatrix}$ if $N_1 < N_2$ and 12 port configuration |

TABLE 101-continued

| Codebook for 7-layer CSI reporting using antenna ports 15 to 14 + P | | | |
|---|---|---|---|
| Value of Codebook-Config | $i_{1,1}$ | $i_{1,2}$ | $i_2$: 0 |
| | | | $W^{(7)}_{i_{1,1},i_{1,2}} = \frac{1}{\sqrt{7Q}}\begin{bmatrix} v_{s_1 i_{1,1},s_2 i_{1,2}} & v_{s_1 i_{1,1},s_2 i_{1,2}} & v_{s_1 i_{1,1}+O_1,s_2 i_{1,2}} & v_{s_1 i_{1,1}+O_1,s_2 i_{1,2}} & v_{s_1 i_{1,1}+2O_1,s_2 i_{1,2}+O_2} & v_{s_1 i_{1,1}+2O_1,s_2 i_{1,2}+O_2} & v_{s_1 i_{1,1}+3O_1,s_2 i_{1,2}+O_2} \\ v_{s_1 i_{1,1},s_2 i_{1,2}} & -v_{s_1 i_{1,1},s_2 i_{1,2}} & v_{s_1 i_{1,1}+O_1,s_2 i_{1,2}} & -v_{s_1 i_{1,1}+O_1,s_2 i_{1,2}} & v_{s_1 i_{1,1}+2O_1,s_2 i_{1,2}+O_2} & -v_{s_1 i_{1,1}+2O_1,s_2 i_{1,2}+O_2} & v_{s_1 i_{1,1}+3O_1,s_2 i_{1,2}+O_2} \end{bmatrix}$ if $N_1 \geq N_2$ and 16 port configuration |
| | | | $W^{(7)}_{i_{1,1},i_{1,2}} = \frac{1}{\sqrt{7Q}}\begin{bmatrix} v_{s_2 i_{1,2},s_1 i_{1,1}} & v_{s_2 i_{1,2},s_1 i_{1,1}} & v_{s_2 i_{1,2},s_1 i_{1,1}+O_1} & v_{s_2 i_{1,2},s_1 i_{1,1}+O_1} & v_{s_2 i_{1,2}+2O_2,s_1 i_{1,1}+O_1} & v_{s_2 i_{1,2}+2O_2,s_1 i_{1,1}+O_1} & v_{s_2 i_{1,2}+3O_2,s_1 i_{1,1}+O_1} \\ v_{s_2 i_{1,2},s_1 i_{1,1}} & -v_{s_2 i_{1,2},s_1 i_{1,1}} & v_{s_2 i_{1,2},s_1 i_{1,1}+O_1} & -v_{s_2 i_{1,2},s_1 i_{1,1}+O_1} & v_{s_2 i_{1,2}+2O_2,s_1 i_{1,1}+O_1} & -v_{s_2 i_{1,2}+2O_2,s_1 i_{1,1}+O_1} & v_{s_2 i_{1,2}+3O_2,s_1 i_{1,1}+O_1} \end{bmatrix}$ if $N_1 < N_2$ and 16 port configuration |
| 4 | 0, 1, . . . , $4N_1 - 1$ | 0, 1, . . . , $4N_1 - 1$ | $W^{(7)}_{i_{1,1},i_{1,2}} = \frac{1}{\sqrt{7Q}}\begin{bmatrix} v_{s_1 i_{1,1},s_2 i_{1,2}} & v_{s_1 i_{1,1},s_2 i_{1,2}} & v_{s_1 i_{1,1}+O_1,s_2 i_{1,2}} & v_{s_1 i_{1,1}+O_1,s_2 i_{1,2}} & v_{s_1 i_{1,1}+2O_1,s_2 i_{1,2}} & v_{s_1 i_{1,1}+2O_1,s_2 i_{1,2}} & v_{s_1 i_{1,1},s_2 i_{1,2}+O_2} \\ v_{s_1 i_{1,1},s_2 i_{1,2}} & -v_{s_1 i_{1,1},s_2 i_{1,2}} & v_{s_1 i_{1,1}+O_1,s_2 i_{1,2}} & -v_{s_1 i_{1,1}+O_1,s_2 i_{1,2}} & v_{s_1 i_{1,1}+2O_1,s_2 i_{1,2}} & -v_{s_1 i_{1,1}+2O_1,s_2 i_{1,2}} & v_{s_1 i_{1,1},s_2 i_{1,2}+O_2} \end{bmatrix}$ if $N_1 \geq N_2$ and 12 port configuration |
| | | | $W^{(7)}_{i_{1,1},i_{1,2}} = \frac{1}{\sqrt{7Q}}\begin{bmatrix} v_{s_2 i_{1,2},s_1 i_{1,1}} & v_{s_2 i_{1,2},s_1 i_{1,1}} & v_{s_2 i_{1,2}+O_2,s_1 i_{1,1}} & v_{s_2 i_{1,2}+O_2,s_1 i_{1,1}} & v_{s_2 i_{1,2}+2O_2,s_1 i_{1,1}} & v_{s_2 i_{1,2}+2O_2,s_1 i_{1,1}} & v_{s_2 i_{1,2},s_1 i_{1,1}+O_1} \\ v_{s_2 i_{1,2},s_1 i_{1,1}} & -v_{s_2 i_{1,2},s_1 i_{1,1}} & v_{s_2 i_{1,2}+O_2,s_1 i_{1,1}} & -v_{s_2 i_{1,2}+O_2,s_1 i_{1,1}} & v_{s_2 i_{1,2}+2O_2,s_1 i_{1,1}} & -v_{s_2 i_{1,2}+2O_2,s_1 i_{1,1}} & v_{s_2 i_{1,2},s_1 i_{1,1}+O_1} \end{bmatrix}$ if $N_1 < N_2$ and 12 port configuration |
| | | | $W^{(7)}_{i_{1,1},i_{1,2}} = \frac{1}{\sqrt{7Q}}\begin{bmatrix} v_{s_1 i_{1,1},s_2 i_{1,2}} & v_{s_1 i_{1,1},s_2 i_{1,2}} & v_{s_1 i_{1,1}+O_1,s_2 i_{1,2}} & v_{s_1 i_{1,1}+O_1,s_2 i_{1,2}} & v_{s_1 i_{1,1}+2O_1,s_2 i_{1,2}} & v_{s_1 i_{1,1}+2O_1,s_2 i_{1,2}} & v_{s_1 i_{1,1}+3O_1,s_2 i_{1,2}} \\ v_{s_1 i_{1,1},s_2 i_{1,2}} & -v_{s_1 i_{1,1},s_2 i_{1,2}} & v_{s_1 i_{1,1}+O_1,s_2 i_{1,2}} & -v_{s_1 i_{1,1}+O_1,s_2 i_{1,2}} & v_{s_1 i_{1,1}+2O_1,s_2 i_{1,2}} & -v_{s_1 i_{1,1}+2O_1,s_2 i_{1,2}} & v_{s_1 i_{1,1}+3O_1,s_2 i_{1,2}} \end{bmatrix}$ if $N_1 \geq N_2$ and 16 port configuration |
| | | | $W^{(7)}_{i_{1,1},i_{1,2}} = \frac{1}{\sqrt{7Q}}\begin{bmatrix} v_{s_2 i_{1,2},s_1 i_{1,1}} & v_{s_2 i_{1,2},s_1 i_{1,1}} & v_{s_2 i_{1,2}+O_2,s_1 i_{1,1}} & v_{s_2 i_{1,2}+O_2,s_1 i_{1,1}} & v_{s_2 i_{1,2}+2O_2,s_1 i_{1,1}} & v_{s_2 i_{1,2}+2O_2,s_1 i_{1,1}} & v_{s_2 i_{1,2}+3O_2,s_1 i_{1,1}} \\ v_{s_2 i_{1,2},s_1 i_{1,1}} & -v_{s_2 i_{1,2},s_1 i_{1,1}} & v_{s_2 i_{1,2}+O_2,s_1 i_{1,1}} & -v_{s_2 i_{1,2}+O_2,s_1 i_{1,1}} & v_{s_2 i_{1,2}+2O_2,s_1 i_{1,1}} & -v_{s_2 i_{1,2}+2O_2,s_1 i_{1,1}} & v_{s_2 i_{1,2}+3O_2,s_1 i_{1,1}} \end{bmatrix}$ if $N_1 < N_2$ and 16 port configuration |

TABLE 102

Codebook for 8-layer CSI reporting using antenna ports 15 to 14 + P

| Value of Codebook-Config | $i_{1,1}$ | $i_{1,2}$ | $i_2$: 0 |
| --- | --- | --- | --- |
| 1 | 0, 1, . . . , $O_1N_1 - 1$ | 0, 1, . . . , $O_2N_2 - 1$ | $W^{(8)}_{i_{1,1},i_{1,2}} = \frac{1}{\sqrt{8Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} \\ v_{s_1 i_{1,1}+O_1, s_2 i_{1,2}+O_2} & v_{s_1 i_{1,1}+O_1, s_2 i_{1,2}+O_2} & v_{s_1 i_{1,1}, s_2 i_{1,2}+O_2} & v_{s_1 i_{1,1}, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} \\ v_{s_1 i_{1,1}+O_1, s_2 i_{1,2}+O_2} & -v_{s_1 i_{1,1}+O_1, s_2 i_{1,2}+O_2} & v_{s_1 i_{1,1}, s_2 i_{1,2}+O_2} & -v_{s_1 i_{1,1}, s_2 i_{1,2}+O_2} \end{bmatrix}$ if $N_1 \geq N_2$<br>$W^{(8)}_{i_{1,1},i_{1,2}} = \frac{1}{\sqrt{8Q}}\begin{bmatrix} v_{s_2 i_{1,2}, s_1 i_{1,1}} & v_{s_2 i_{1,2}, s_1 i_{1,1}} & v_{s_2 i_{1,2}, s_1 i_{1,1}+O_1} & v_{s_2 i_{1,2}, s_1 i_{1,1}+O_1} \\ v_{s_2 i_{1,2}+O_2, s_1 i_{1,1}+O_1} & v_{s_2 i_{1,2}+O_2, s_1 i_{1,1}+O_1} & v_{s_2 i_{1,2}+O_2, s_1 i_{1,1}} & v_{s_2 i_{1,2}+O_2, s_1 i_{1,1}} \\ v_{s_2 i_{1,2}, s_1 i_{1,1}} & -v_{s_2 i_{1,2}, s_1 i_{1,1}} & v_{s_2 i_{1,2}, s_1 i_{1,1}+O_1} & -v_{s_2 i_{1,2}, s_1 i_{1,1}+O_1} \\ v_{s_2 i_{1,2}+O_2, s_1 i_{1,1}+O_1} & -v_{s_2 i_{1,2}+O_2, s_1 i_{1,1}+O_1} & v_{s_2 i_{1,2}+O_2, s_1 i_{1,1}} & -v_{s_2 i_{1,2}+O_2, s_1 i_{1,1}} \end{bmatrix}$ if $N_1 < N_2$ |
| 2 | 0, 1, . . . , $4N_1 - 1$ | 0, 1, . . . , $4N_1 - 1$ | $W^{(8)}_{i_{1,1},i_{1,2}} = \frac{1}{\sqrt{8Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} \\ v_{s_1 i_{1,1}+O_1, s_2 i_{1,2}+O_2} & v_{s_1 i_{1,1}+O_1, s_2 i_{1,2}+O_2} & v_{s_1 i_{1,1}, s_2 i_{1,2}+O_2} & v_{s_1 i_{1,1}, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} \\ v_{s_1 i_{1,1}+O_1, s_2 i_{1,2}+O_2} & -v_{s_1 i_{1,1}+O_1, s_2 i_{1,2}+O_2} & v_{s_1 i_{1,1}, s_2 i_{1,2}+O_2} & -v_{s_1 i_{1,1}, s_2 i_{1,2}+O_2} \end{bmatrix}$ if $N_1 \geq N_2$<br>$W^{(8)}_{i_{1,1},i_{1,2}} = \frac{1}{\sqrt{8Q}}\begin{bmatrix} v_{s_2 i_{1,2}, s_1 i_{1,1}} & v_{s_2 i_{1,2}, s_1 i_{1,1}} & v_{s_2 i_{1,2}, s_1 i_{1,1}+O_1} & v_{s_2 i_{1,2}, s_1 i_{1,1}+O_1} \\ v_{s_2 i_{1,2}+O_2, s_1 i_{1,1}+O_1} & v_{s_2 i_{1,2}+O_2, s_1 i_{1,1}+O_1} & v_{s_2 i_{1,2}+O_2, s_1 i_{1,1}} & v_{s_2 i_{1,2}+O_2, s_1 i_{1,1}} \\ v_{s_2 i_{1,2}, s_1 i_{1,1}} & -v_{s_2 i_{1,2}, s_1 i_{1,1}} & v_{s_2 i_{1,2}, s_1 i_{1,1}+O_1} & -v_{s_2 i_{1,2}, s_1 i_{1,1}+O_1} \\ v_{s_2 i_{1,2}+O_2, s_1 i_{1,1}+O_1} & -v_{s_2 i_{1,2}+O_2, s_1 i_{1,1}+O_1} & v_{s_2 i_{1,2}+O_2, s_1 i_{1,1}} & -v_{s_2 i_{1,2}+O_2, s_1 i_{1,1}} \end{bmatrix}$ if $N_1 < N_2$ |
| 3 | 0, 1, . . . , $4N_1 - 1$ | 0, 1, . . . , $4N_1 - 1$ | $W^{(8)}_{i_{1,1},i_{1,2}} = \frac{1}{\sqrt{8Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} \\ v_{s_1 i_{1,1}+2O_1, s_2 i_{1,2}+O_2} & v_{s_1 i_{1,1}+2O_1, s_2 i_{1,2}+O_2} & v_{s_1 i_{1,1}+O_1, s_2 i_{1,2}+O_2} & v_{s_1 i_{1,1}+O_1, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} \\ v_{s_1 i_{1,1}+2O_1, s_2 i_{1,2}+O_2} & -v_{s_1 i_{1,1}+2O_1, s_2 i_{1,2}+O_2} & v_{s_1 i_{1,1}+O_1, s_2 i_{1,2}+O_2} & -v_{s_1 i_{1,1}+O_1, s_2 i_{1,2}+O_2} \end{bmatrix}$ if $N_1 \geq N_2$ and 12 port configuration<br>$W^{(8)}_{i_{1,1},i_{1,2}} = \frac{1}{\sqrt{8Q}}\begin{bmatrix} v_{s_2 i_{1,2}, s_1 i_{1,1}} & v_{s_2 i_{1,2}, s_1 i_{1,1}} & v_{s_2 i_{1,2}, s_1 i_{1,1}+O_1} & v_{s_2 i_{1,2}, s_1 i_{1,1}+O_1} \\ v_{s_2 i_{1,2}+2O_2, s_1 i_{1,1}+O_1} & v_{s_2 i_{1,2}+2O_2, s_1 i_{1,1}+O_1} & v_{s_2 i_{1,2}+O_2, s_1 i_{1,1}+O_1} & v_{s_2 i_{1,2}+O_2, s_1 i_{1,1}+O_1} \\ v_{s_2 i_{1,2}, s_1 i_{1,1}} & -v_{s_2 i_{1,2}, s_1 i_{1,1}} & v_{s_2 i_{1,2}, s_1 i_{1,1}+O_1} & -v_{s_2 i_{1,2}, s_1 i_{1,1}+O_1} \\ v_{s_2 i_{1,2}+2O_2, s_1 i_{1,1}+O_1} & -v_{s_2 i_{1,2}+2O_2, s_1 i_{1,1}+O_1} & v_{s_2 i_{1,2}+O_2, s_1 i_{1,1}+O_1} & -v_{s_2 i_{1,2}+O_2, s_1 i_{1,1}+O_1} \end{bmatrix}$ if $N_1 < N_2$ and 12 port configuration |

TABLE 102-continued

Codebook for 8-layer CSI reporting using antenna ports 15 to 14 + P

| Value of Code-book-Config | $i_{1,1}$ | $i_{1,2}$ | $i_2$ 0 |
| --- | --- | --- | --- |
| | | | $W^{(8)}_{i_{1,1},i_{1,2}} = \frac{1}{\sqrt{8Q}} \begin{bmatrix} v_{s_1 i_{1,1},s_2 i_{1,2}} & v_{s_1 i_{1,1},s_2 i_{1,2}} & v_{s_1 i_{1,1}+O_1,s_2 i_{1,2}} & v_{s_1 i_{1,1}+O_1,s_2 i_{1,2}} \\ v_{s_1 i_{1,1}+2O_1,s_2 i_{1,2}+O_2} & v_{s_1 i_{1,1}+2O_1,s_2 i_{1,2}+O_2} & v_{s_1 i_{1,1}+3O_1,s_2 i_{1,2}+O_2} & v_{s_1 i_{1,1}+3O_1,s_2 i_{1,2}+O_2} \\ v_{s_1 i_{1,1},s_2 i_{1,2}} & -v_{s_1 i_{1,1},s_2 i_{1,2}} & v_{s_1 i_{1,1}+O_1,s_2 i_{1,2}} & -v_{s_1 i_{1,1}+O_1,s_2 i_{1,2}} \\ v_{s_1 i_{1,1}+2O_1,s_2 i_{1,2}+O_2} & -v_{s_1 i_{1,1}+2O_1,s_2 i_{1,2}+O_2} & v_{s_1 i_{1,1}+3O_1,s_2 i_{1,2}+O_2} & -v_{s_1 i_{1,1}+3O_1,s_2 i_{1,2}+O_2} \end{bmatrix}$ if $N_1 \geq N_2$ and 16 port configuration |
| | | | $W^{(8)}_{i_{1,1},i_{1,2}} = \frac{1}{\sqrt{8Q}} \begin{bmatrix} v_{s_2 i_{1,2},s_1 i_{1,1}} & v_{s_2 i_{1,2},s_1 i_{1,1}} & v_{s_2 i_{1,2},s_1 i_{1,1}+O_1} & v_{s_2 i_{1,2},s_1 i_{1,1}+O_1} \\ v_{s_2 i_{1,2}+2O_2,s_1 i_{1,1}+O_1} & v_{s_2 i_{1,2}+2O_2,s_1 i_{1,1}+O_1} & v_{s_2 i_{1,2}+3O_2,s_1 i_{1,1}+O_1} & v_{s_2 i_{1,2}+3O_2,s_1 i_{1,1}+O_1} \\ v_{s_2 i_{1,2},s_1 i_{1,1}} & -v_{s_2 i_{1,2},s_1 i_{1,1}} & v_{s_2 i_{1,2},s_1 i_{1,1}+O_1} & -v_{s_2 i_{1,2},s_1 i_{1,1}+O_1} \\ v_{s_2 i_{1,2}+2O_2,s_1 i_{1,1}+O_1} & -v_{s_2 i_{1,2}+2O_2,s_1 i_{1,1}+O_1} & v_{s_2 i_{1,2}+3O_2,s_1 i_{1,1}+O_1} & -v_{s_2 i_{1,2}+3O_2,s_1 i_{1,1}+O_1} \end{bmatrix}$ if $N_1 < N_2$ and 16 port configuration |
| 4 | 0, 1, . . . , $4N_1 - 1$ | 0, 1, . . . , $4N_1 - 1$ | $W^{(8)}_{i_{1,1},i_{1,2}} = \frac{1}{\sqrt{8Q}} \begin{bmatrix} v_{s_1 i_{1,1},s_2 i_{1,2}} & v_{s_1 i_{1,1},s_2 i_{1,2}} & v_{s_1 i_{1,1}+O_1,s_2 i_{1,2}} & v_{s_1 i_{1,1}+O_1,s_2 i_{1,2}} \\ v_{s_1 i_{1,1}+2O_1,s_2 i_{1,2}} & v_{s_1 i_{1,1}+2O_1,s_2 i_{1,2}} & v_{s_1 i_{1,1},s_2 i_{1,2}+O_2} & v_{s_1 i_{1,1},s_2 i_{1,2}+O_2} \\ v_{s_1 i_{1,1},s_2 i_{1,2}} & -v_{s_1 i_{1,1},s_2 i_{1,2}} & v_{s_1 i_{1,1}+O_1,s_2 i_{1,2}} & -v_{s_1 i_{1,1}+O_1,s_2 i_{1,2}} \\ v_{s_1 i_{1,1}+2O_1,s_2 i_{1,2}} & -v_{s_1 i_{1,1}+2O_1,s_2 i_{1,2}} & v_{s_1 i_{1,1},s_2 i_{1,2}+O_2} & -v_{s_1 i_{1,1},s_2 i_{1,2}+O_2} \end{bmatrix}$ if $N_1 \geq N_2$ and 12 port configuration |
| | | | $W^{(8)}_{i_{1,1},i_{1,2}} = \frac{1}{\sqrt{8Q}} \begin{bmatrix} v_{s_2 i_{1,2},s_1 i_{1,1}} & v_{s_2 i_{1,2},s_1 i_{1,1}} & v_{s_2 i_{1,2}+O_2,s_1 i_{1,1}} & v_{s_2 i_{1,2}+O_2,s_1 i_{1,1}} \\ v_{s_2 i_{1,2}+2O_2,s_1 i_{1,1}} & v_{s_2 i_{1,2}+2O_2,s_1 i_{1,1}} & v_{s_2 i_{1,2},s_1 i_{1,1}+O_1} & v_{s_2 i_{1,2},s_1 i_{1,1}+O_1} \\ v_{s_2 i_{1,2},s_1 i_{1,1}} & -v_{s_2 i_{1,2},s_1 i_{1,1}} & v_{s_2 i_{1,2}+O_2,s_1 i_{1,1}} & -v_{s_2 i_{1,2}+O_2,s_1 i_{1,1}} \\ v_{s_2 i_{1,2}+2O_2,s_1 i_{1,1}} & -v_{s_2 i_{1,2}+2O_2,s_1 i_{1,1}} & v_{s_2 i_{1,2},s_1 i_{1,1}+O_1} & -v_{s_2 i_{1,2},s_1 i_{1,1}+O_1} \end{bmatrix}$ if $N_1 < N_2$ and 12 port configuration |
| | | | $W^{(8)}_{i_{1,1},i_{1,2}} = \frac{1}{\sqrt{8Q}} \begin{bmatrix} v_{s_1 i_{1,1},s_2 i_{1,2}} & v_{s_1 i_{1,1},s_2 i_{1,2}} & v_{s_1 i_{1,1}+O_1,s_2 i_{1,2}} & v_{s_1 i_{1,1}+O_1,s_2 i_{1,2}} \\ v_{s_1 i_{1,1}+2O_1,s_2 i_{1,2}} & v_{s_1 i_{1,1}+2O_1,s_2 i_{1,2}} & v_{s_1 i_{1,1}+3O_1,s_2 i_{1,2}} & v_{s_1 i_{1,1}+3O_1,s_2 i_{1,2}} \\ v_{s_1 i_{1,1},s_2 i_{1,2}} & -v_{s_1 i_{1,1},s_2 i_{1,2}} & v_{s_1 i_{1,1}+O_1,s_2 i_{1,2}} & -v_{s_1 i_{1,1}+O_1,s_2 i_{1,2}} \\ v_{s_1 i_{1,1}+2O_1,s_2 i_{1,2}} & -v_{s_1 i_{1,1}+2O_1,s_2 i_{1,2}} & v_{s_1 i_{1,1}+3O_1,s_2 i_{1,2}} & -v_{s_1 i_{1,1}+3O_1,s_2 i_{1,2}} \end{bmatrix}$ if $N_1 \geq N_2$ and 16 port configuration |
| | | | $W^{(8)}_{i_{1,1},i_{1,2}} = \frac{1}{\sqrt{8Q}} \begin{bmatrix} v_{s_2 i_{1,2},s_1 i_{1,1}} & v_{s_2 i_{1,2},s_1 i_{1,1}} & v_{s_2 i_{1,2}+O_2,s_1 i_{1,1}} & v_{s_2 i_{1,2}+O_2,s_1 i_{1,1}} \\ v_{s_2 i_{1,2}+2O_2,s_1 i_{1,1}} & v_{s_2 i_{1,2}+2O_2,s_1 i_{1,1}} & v_{s_2 i_{1,2}+3O_2,s_1 i_{1,1}} & v_{s_2 i_{1,2}+3O_2,s_1 i_{1,1}} \\ v_{s_2 i_{1,2},s_1 i_{1,1}} & -v_{s_2 i_{1,2},s_1 i_{1,1}} & v_{s_2 i_{1,2}+O_2,s_1 i_{1,1}} & -v_{s_2 i_{1,2}+O_2,s_1 i_{1,1}} \\ v_{s_2 i_{1,2}+2O_2,s_1 i_{1,1}} & -v_{s_2 i_{1,2}+2O_2,s_1 i_{1,1}} & v_{s_2 i_{1,2}+3O_2,s_1 i_{1,1}} & -v_{s_2 i_{1,2}+3O_2,s_1 i_{1,1}} \end{bmatrix}$ if $N_1 < N_2$ and 16 port configuration |

What is claimed:

1. A user equipment (UE) capable of communicating with a base station (BS) comprising a plurality of antenna ports P, the UE comprising:

a transceiver configured to receive downlink signals indicating precoder codebook parameters, the downlink signal including:

first and second quantities of antenna ports ($N_1$, $N_2$) indicating respective quantities of antenna ports in first and second dimensions;

first and second oversampling factors ($O_1$, $O_2$) indicating respective oversampling factors for Discrete Fourier Transform (DFT), beams in the first and second dimensions; and a Codebook-Config parameter indicating a codebook subset selection configuration among a plurality of codebook subset selection configurations; and a controller configured to:

determine first and second beam skip numbers ($S_1$, $S_2$) indicating respective differences of leading beam indices of two adjacent beam groups in the first and second dimensions, wherein the beam groups are determined based on the Codebook-Config parameter; and determine a plurality of precoding matrix indicators (PMIs) including a first PMI pair ($i_{1,1}$, $i_{1,2}$) and a second PMI $i_2$, based on the received downlink signals and the skip numbers, wherein the skip numbers ($S_1$, $S_2$) are rank dependent and ($O_1$, $O_2$) dependent.

2. The UE of claim 1, wherein a value range determining a bit width of the first PMT $i_{1,1}$ reporting is $$\frac{N_1 O_1}{S_1},$$

and a value range determining the bit width of the first PMI $i_{1,2}$ reporting is $$\frac{N_2 O_2}{S_2}.$$

3. The UE of claim 1, wherein second PMI $i_2$ are determined according to a following codebook for 2-layer channel state information (CSI) reporting:

| 2 Layers, Codebook-Config = 1 | | | | |
|---|---|---|---|---|
| $i_{1,2} = 0, \ldots, N_2O_2 - 1$ | | | | |
| | $i_2$ | | | |
| $i_{1,1}$ | 0 | 1 | 2 | 3 |
| $0, \ldots, N_1O_1 - 1$ | $W_{i_{1,1},i_{1,1},i_{1,2},i_{1,2},0}^{(2)}$ | $W_{i_{1,1},i_{1,1},i_{1,2},i_{1,2},1}^{(2)}$ | $W_{i_{1,1},i_{1,1},i_{1,2},i_{1,2},2}^{(2)}$ | $W_{i_{1,1},i_{1,1},i_{1,2},i_{1,2},3}^{(2)}$ |

where $W_{l,l',m,m',n}^{(2)} = \frac{1}{\sqrt{2P}}\begin{bmatrix} v_{l,m} & v_{l',m'} \\ \varphi_n v_{l,m} & -\varphi_n v_{l',m'} \end{bmatrix}$.

| 2 Layers, Codebook-Config = 2 | | | |
|---|---|---|---|
| If $N_1 > N_2$, p = 1 otherwise p = $O_1$<br>$i_{1,2} = 0, \ldots, N_2O_2/2 - 1$<br>$i_{1,1} = 0, \ldots, N_1O_1/2 - 1$ | | | |
| $i_2$ | | | |
| 0 | 1 | 2 | 3 |
| $W_{2i_{1,1},2i_{1,1},2i_{1,2},2i_{1,2},0}^{(2)}$ | $W_{2i_{1,1},2i_{1,1},2i_{1,2},2i_{1,2},1}^{(2)}$ | $W_{2i_{1,1}+p,2i_{1,1}+p,2i_{1,2},2i_{1,2},0}^{(2)}$ | $W_{2i_{1,1}+p,2i_{1,1}+p,2i_{1,2},2i_{1,2},1}^{(2)}$ |
| $i_2$ | | | |
| 4 | 5 | 6 | 7 |
| $W_{2i_{1,1}+p,2i_{1,1}+p,2i_{1,2}+1,2i_{1,2}+1,0}^{(2)}$ | $W_{2i_{1,1}+p,2i_{1,1}+p,2i_{1,2}+1,2i_{1,2}+1,1}^{(2)}$ | $W_{2i_{1,1},2i_{1,1},2i_{1,2}+1,2i_{1,2}+1,0}^{(2)}$ | $W_{2i_{1,1},2i_{1,1},2i_{1,2}+1,2i_{1,2}+1,1}^{(2)}$ |
| $i_2$ | | | |
| 8 | 9 | 10 | 11 |
| $W_{2i_{1,1},2i_{1,1}+p,2i_{1,2},2i_{1,2},0}^{(2)}$ | $W_{2i_{1,1},2i_{1,1}+p,2i_{1,2},2i_{1,2},1}^{(2)}$ | $W_{2i_{1,1},2i_{1,1}+p,2i_{1,2}+1,2i_{1,2}+1,0}^{(2)}$ | $W_{2i_{1,1},2i_{1,1}+p,2i_{1,2}+1,2i_{1,2}+1,1}^{(2)}$ |
| $i_2$ | | | |
| 12 | 13 | 14 | 15 |
| $W_{2i_{1,1},2i_{1,1},2i_{1,2},2i_{1,2}+1,0}^{(2)}$ | $W_{2i_{1,1},2i_{1,1},2i_{1,2},2i_{1,2}+1,1}^{(2)}$ | $W_{2i_{1,1}+p,2i_{1,1}+p,2i_{1,2},2i_{1,2}+1,0}^{(2)}$ | $W_{2i_{1,1}+p,2i_{1,1}+p,2i_{1,2},2i_{1,2}+1,1}^{(2)}$. |

where $W_{l,l',m,m',n}^{(2)} = \frac{1}{\sqrt{2P}}\begin{bmatrix} v_{l,m} & v_{l',m'} \\ \varphi_n v_{l,m} & -\varphi_n v_{l',m'} \end{bmatrix}$ -continued

| 2 Layers, Codebook-Config = 3 | | | |
|---|---|---|---|
| $i_{1,1} = 0, \ldots, \frac{N_1 O_1}{2} - 1$<br>$i_{1,2} = 0, \ldots, \frac{N_2 O_2}{2} - 1$ | | | |
| $i_2$ | | | |
| 0 | 1 | 2 | 3 |
| $W_{s_1 i_{1,1}, s_1 i_{1,1}, s_2 i_{1,2}, s_2 i_{1,2}, 0}^{(2)}$ | $W_{s_1 i_{1,1}, s_1 i_{1,1}, s_2 i_{1,2}, s_2 i_{1,2}, 1}^{(2)}$ | $W_{s_1 i_{1,1}+2p_1, s_1 i_{1,1}+2p_1, s_2 i_{1,2}, s_2 i_{1,2}, 0}^{(2)}$ | $W_{s_1 i_{1,1}+2p_1, s_1 i_{1,1}+2p_1, s_2 i_{1,2}, s_2 i_{1,2}, 1}^{(2)}$ |
| $i_2$ | | | |
| 4 | 5 | 6 | 7 |
| $W_{s_1 i_{1,1}+p_1, s_1 i_{1,1}+p_1, s_2 i_{1,2}+p_2, s_2 i_{1,2}+p_2, 0}^{(2)}$ | $W_{s_1 i_{1,1}+p_1, s_1 i_{1,1}+p_1, s_2 i_{1,2}+p_2, s_2 i_{1,2}+p_2, 1}^{(2)}$ | $W_{s_1 i_{1,1}+3p_1, s_1 i_{1,1}+3p_1, s_2 i_{1,2}+p_2, s_2 i_{1,2}+p_2, 0}^{(2)}$ | $W_{s_1 i_{1,1}+3p_1, s_1 i_{1,1}+3p_1, s_2 i_{1,2}+p_2, s_2 i_{1,2}+p_2, 1}^{(2)}$ |
| $i_2$ | | | |
| 8 | 9 | 10 | 11 |
| $W_{s_1 i_{1,1}+p_1, s_1 i_{1,1}+3p_1, s_2 i_{1,2}+p_2, s_2 i_{1,2}+p_2, 0}^{(2)}$ | $W_{s_1 i_{1,1}+p_1, s_1 i_{1,1}+3p_1, s_2 i_{1,2}+p_2, s_2 i_{1,2}+p_2, 1}^{(2)}$ | $W_{s_1 i_{1,1}, s_1 i_{1,1}+p_1, s_2 i_{1,2}, s_2 i_{1,2}+p_2, 0}^{(2)}$ | $W_{s_1 i_{1,1}, s_1 i_{1,1}+p_1, s_2 i_{1,2}, s_2 i_{1,2}+p_2, 1}^{(2)}$ |
| $i_2$ | | | |
| 12 | 13 | 14 | 15 |
| $W_{s_1 i_{1,1}+p_1, s_1 i_{1,1}+2p_1, s_2 i_{1,2}+p_2, s_2 i_{1,2}, 0}^{(2)}$ | $W_{s_1 i_{1,1}+p_1, s_1 i_{1,1}+2p_1, s_2 i_{1,2}+p_2, s_2 i_{1,2}, 1}^{(2)}$ | $W_{s_1 i_{1,1}, s_1 i_{1,1}+3p_1, s_2 i_{1,2}, s_2 i_{1,2}+p_2, 0}^{(2)}$ | $W_{s_1 i_{1,1}, s_1 i_{1,1}+3p_1, s_2 i_{1,2}, s_2 i_{1,2}+p_2, 1}^{(2)}$ |
| where $W_{l,l',m,m',n}^{(2)} = \frac{1}{\sqrt{2P}} \begin{bmatrix} v_{l,m} & v_{l',m'} \\ \varphi_n v_{l,m} & -\varphi_n v_{l',m'} \end{bmatrix}$; $p_1 = p_2 = 1$ | | | |

| 2 Layers, Codebook-Config = 4 | | | |
|---|---|---|---|
| $i_{1,1} = 0, \ldots, \frac{N_1 O_1}{2} - 1$<br>$i_{1,2} = 0, \ldots, \frac{N_2 O_2}{2} - 1$ | | | |
| $i_2$ | | | |
| 0 | 1 | 2 | 3 |
| $W_{s_1 i_{1,1}, s_1 i_{1,1}, s_2 i_{1,2}, s_2 i_{1,2}, 0}^{(2)}$ | $W_{s_1 i_{1,1}, s_1 i_{1,1}, s_2 i_{1,2}, s_2 i_{1,2}, 1}^{(2)}$ | $W_{s_1 i_{1,1}+p_1, s_1 i_{1,1}+p_1, s_2 i_{1,2}, s_2 i_{1,2}, 0}^{(2)}$ | $W_{s_1 i_{1,1}+p_1, s_1 i_{1,1}+p_1, s_2 i_{1,2}, s_2 i_{1,2}, 1}^{(2)}$ |
| $i_2$ | | | |
| 4 | 5 | 6 | 7 |
| $W_{s_1 i_{1,1}+2p_1, s_1 i_{1,1}+2p_1, s_2 i_{1,2}, s_2 i_{1,2}, 0}^{(2)}$ | $W_{s_1 i_{1,1}+2p_1, s_1 i_{1,1}+2p_1, s_2 i_{1,2}, s_2 i_{1,2}, 1}^{(2)}$ | $W_{s_1 i_{1,1}+3p_1, s_1 i_{1,1}+3p_1, s_2 i_{1,2}, s_2 i_{1,2}, 0}^{(2)}$ | $W_{s_1 i_{1,1}+3p_1, s_1 i_{1,1}+3p_1, s_2 i_{1,2}, s_2 i_{1,2}, 1}^{(2)}$ |
| $i_2$ | | | |
| 8 | 9 | 10 | 11 |
| $W_{s_1 i_{1,1}, s_1 i_{1,1}+p_1, s_2 i_{1,2}, s_2 i_{1,2}, 0}^{(2)}$ | $W_{s_1 i_{1,1}, s_1 i_{1,1}+p_1, s_2 i_{1,2}, s_2 i_{1,2}, 1}^{(2)}$ | $W_{s_1 i_{1,1}+p_1, s_1 i_{1,1}+2p_1, s_2 i_{1,2}, s_2 i_{1,2}, 0}^{(2)}$ | $W_{s_1 i_{1,1}+p_1, s_1 i_{1,1}+2p_1, s_2 i_{1,2}, s_2 i_{1,2}, 1}^{(2)}$ |
| $i_2$ | | | |
| 12 | 13 | 14 | 15 |
| $W_{s_1 i_{1,1}, s_1 i_{1,1}+3p_1, s_2 i_{1,2}, s_2 i_{1,2}, 0}^{(2)}$ | $W_{s_1 i_{1,1}, s_1 i_{1,1}+3p_1, s_2 i_{1,2}, s_2 i_{1,2}, 1}^{(2)}$ | $W_{s_1 i_{1,1}+p_1, s_1 i_{1,1}+3p_1, s_2 i_{1,2}, s_2 i_{1,2}, 0}^{(2)}$ | $W_{s_1 i_{1,1}+p_1, s_1 i_{1,1}+3p_1, s_2 i_{1,2}, s_2 i_{1,2}, 1}^{(2)}$ |
| where $W_{l,l',m,m',n}^{(2)} = \frac{1}{\sqrt{2P}} \begin{bmatrix} v_{l,m} & v_{l',m'} \\ \varphi_n v_{l,m} & -\varphi_n v_{l',m'} \end{bmatrix}$; $p_1 = p_2 = 1$. | | | |

4. The UE of claim 1, wherein the second PMI $i_2$ is determined according to a following codebook for 3-layer CSI reporting:

Value of Codebook-Config = 1

$i_{1,1} = 0, 1, \ldots, O_1N_1 - 1$
$i_{1,2} = 0, 1, \ldots, O_2N_2 - 1$

3 Layers, $N_1 > 1$, $N_2 > 1$

| | $i_2$ | |
|---|---|---|
| $(\delta_1, \delta_2)$ | 0 | 1 |
| $(O_1, 0)$<br>$(0, O_2)$ | $W_{i_{1,1},i_{1,1}+O_1,i_{1,2},i_{1,2}}^{(3)}$<br>$W_{i_{1,1},i_{1,1},i_{1,2},i_{1,2}+O_2}^{(3)}$ | $\tilde{W}_{i_{1,1},i_{1,1}+O_1,i_{1,2},i_{1,2}}^{(3)}$<br>$\tilde{W}_{i_{1,1},i_{1,1},i_{1,2},i_{1,2}+O_2}^{(3)}$ |

where $W_{l,l',m,m'}^{(3)} = \frac{1}{\sqrt{3P}}\begin{bmatrix} v_{l,m} & v_{l,m} & v_{l',m'} \\ v_{l,m} & -v_{l,m} & -v_{l',m'} \end{bmatrix}$, $\tilde{W}_{l,l',m,m'}^{(3)} = \frac{1}{\sqrt{3P}}\begin{bmatrix} v_{l,m} & v_{l',m'} & v_{l',m'} \\ v_{l,m} & v_{l',m'} & -v_{l',m'} \end{bmatrix}$ 3 Layers, $N_2 = 1$

| | $i_2$ | |
|---|---|---|
| $(\delta_1, \delta_2)$ | 0 | 1 |
| $(O_1, 0)$<br>$(2O_1, 0)$<br>$(3O_1, 0)$ | $W_{i_{1,1},i_{1,1}+O_1,0,0}^{(3)}$<br>$W_{i_{1,1},i_{1,1}+2O_1,0,0}^{(3)}$<br>$W_{i_{1,1},i_{1,1}+3O_1,0,0}^{(3)}$ | $\tilde{W}_{i_{1,1},i_{1,1}+O_1,0,0}^{(3)}$<br>$\tilde{W}_{i_{1,1},i_{1,1}+2O_1,0,0}^{(3)}$<br>$\tilde{W}_{i_{1,1},i_{1,1}+3O_1,0,0}^{(3)}$ |

where $W_{l,l',m,m'}^{(3)} = \frac{1}{\sqrt{3P}}\begin{bmatrix} v_{l,m} & v_{l,m} & v_{l',m'} \\ v_{l,m} & -v_{l,m} & -v_{l',m'} \end{bmatrix}$, $\tilde{W}_{l,l',m,m'}^{(3)} = \frac{1}{\sqrt{3P}}\begin{bmatrix} v_{l,m} & v_{l',m'} & v_{l',m'} \\ v_{l,m} & v_{l',m'} & -v_{l',m'} \end{bmatrix}$ Value of Codebook-Config = 2

$i_{1,1} = 0, 1, \ldots, 2N_1 - 1$
$i_{1,2} = 0, 1, \ldots, 2N_2 - 1$

| | $i_2$ | | | |
|---|---|---|---|---|
| $(\delta_1, \delta_2)$ | 0 | 1 | 2 | 3 |
| $(O_1, 0)$, $(0, O_2)$ | $W_{s_1i_{1,1},s_1i_{1,1}+\delta_1,s_2i_{1,2},s_2i_{1,2}+\delta_2}^{(3)}$ | $W_{s_1i_{1,1}+\delta_1,s_1i_{1,1},s_2i_{1,2}+\delta_2,s_2i_{1,2}}^{(3)}$ | $\tilde{W}_{s_1i_{1,1},s_1i_{1,1}+\delta_1,s_2i_{1,2},s_2i_{1,2}+\delta_2}^{(3)}$ | $\tilde{W}_{s_1i_{1,1}+\delta_1,s_1i_{1,1},s_2i_{1,2}+\delta_2,s_2i_{1,2}}^{(3)}$ |

| | $i_2$ | | | |
|---|---|---|---|---|
| $(\delta_1, \delta_2)$ | 4 | 5 | 6 | 7 |
| $(O_1, 0)$, $(0, O_2)$ | $W_{s_1i_{1,1}+p_1,s_1i_{1,1}+p_1+\delta_1,s_2i_{1,2},s_2i_{1,2}+\delta_2}^{(3)}$ | $W_{s_1i_{1,1}+p_1+\delta_1,s_1i_{1,1}+p_1,s_2i_{1,2}+\delta_2,s_2i_{1,2}}^{(3)}$ | $\tilde{W}_{s_1i_{1,1}+p_1,s_1i_{1,1}+p_1+\delta_1,s_2i_{1,2},s_2i_{1,2}+\delta_2}^{(3)}$ | $\tilde{W}_{s_1i_{1,1}+p_1+\delta_1,s_1i_{1,1}+p_1,s_2i_{1,2}+\delta_2,s_2i_{1,2}}^{(3)}$ |

-continued

| | $i_2$ | | | |
|---|---|---|---|---|
| $(\delta_1, \delta_2)$ | 8 | 9 | 10 | 11 |
| $(O_1, 0), (0, O_2)$ | $W^{(3)}_{s_1i_{1,1}, s_1i_{1,1}+\delta_1, s_2i_{1,2}+p_2, s_2i_{1,2}+\delta_2+p_2}$ | $W^{(3)}_{s_1i_{1,1}+\delta_1, s_1i_{1,1}, s_2i_{1,2}+\delta_2+p_2, s_2i_{1,2}+p_2}$ | $\tilde{W}^{(3)}_{s_1i_{1,1}, s_1i_{1,1}+\delta_1, s_2i_{1,2}+p_2, s_2i_{1,2}+\delta_2+p_2}$ | $\tilde{W}^{(3)}_{s_1i_{1,1}+\delta_1, s_1i_{1,1}, s_2i_{1,2}+\delta_2+p_2, s_2i_{1,2}+p_2}$ |

| | $i_2$ | | | |
|---|---|---|---|---|
| $(\delta_1, \delta_2)$ | 12 | 13 | 14 | 15 |
| $(O_1, 0), (0, O_2)$ | $W^{(3)}_{s_1i_{1,1}+p_1, s_1i_{1,1}+p_1+\delta_1, s_2i_{1,2}+p_2, s_2i_{1,2}+\delta_2+p_2}$ | $W^{(3)}_{s_1i_{1,1}+p_1+\delta_1, s_1i_{1,1}+p_1, s_2i_{1,2}+\delta_2+p_2, s_2i_{1,2}+p_2}$ | $\tilde{W}^{(3)}_{s_1i_{1,1}+p_1, s_1i_{1,1}+p_1+\delta_1, s_2i_{1,2}+p_2, s_2i_{1,2}+\delta_2+p_2}$ | $\tilde{W}^{(3)}_{s_1i_{1,1}+p_1+\delta_1, s_1i_{1,1}+p_1, s_2i_{1,2}+\delta_2+p_2, s_2i_{1,2}+p_2}$ |

where $W^{(3)}_{l,l',m,m'} = \frac{1}{\sqrt{3P}}\begin{bmatrix} v_{l,m} & v_{l,m} & v_{l',m'} \\ v_{l,m} & -v_{l,m} & -v_{l',m'} \end{bmatrix}$ and $\tilde{W}^{(3)}_{l,l',m,m'} = \frac{1}{\sqrt{3P}}\begin{bmatrix} v_{l,m} & v_{l',m'} & v_{l',m'} \\ v_{l,m} & v_{l',m'} & -v_{l',m'} \end{bmatrix}$, if $N_1 \geq N_2$ $(s_1, s_2) = \left(\frac{O_1}{2}, \frac{O_2}{2}\right)$ and $(p_1, p_2) = \left(\frac{O_1}{4}, \frac{O_2}{4}\right)$.

Value of Codebook-Config = 3

$i_{1,1} = 0, 1, \ldots, N_1 - 1$
$i_{1,2} = 0, 1, \ldots, 2N_2 - 1$

| | $i_2$ | | | |
|---|---|---|---|---|
| $(\delta_1, \delta_2)$ | 0 | 1 | 2 | 3 |
| $(O_1, 0), (0, O_2)$ | $W^{(3)}_{s_1i_{1,1}+2p_1, s_1i_{1,1}+2p_1+\delta_1, s_2i_{1,2}, s_2i_{1,2}+\delta_2}$ | $W^{(3)}_{s_1i_{1,1}+2p_1+\delta_1, s_1i_{1,1}+2p_1, s_2i_{1,2}+\delta_2, s_2i_{1,2}}$ | $\tilde{W}^{(3)}_{s_1i_{1,1}+2p_1, s_1i_{1,1}+2p_1+\delta_1, s_2i_{1,2}, s_2i_{1,2}+\delta_2}$ | $\tilde{W}^{(3)}_{s_1i_{1,1}+2p_1+\delta_1, s_1i_{1,1}+2p_1, s_2i_{1,2}+\delta_2, s_2i_{1,2}}$ |

| | $i_2$ | | | |
|---|---|---|---|---|
| $(\delta_1, \delta_2)$ | 4 | 5 | 6 | 7 |
| $(O_1, 0), (0, O_2)$ | $W^{(3)}_{s_1i_{1,1}+3p_1, s_1i_{1,1}+3p_1+\delta_1, s_2i_{1,2}, s_2i_{1,2}+\delta_2}$ | $W^{(3)}_{s_1i_{1,1}+3p_1+\delta_1, s_1i_{1,1}+3p_1, s_2i_{1,2}+\delta_2, s_2i_{1,2}}$ | $\tilde{W}^{(3)}_{s_1i_{1,1}+3p_1, s_1i_{1,1}+3p_1+\delta_1, s_2i_{1,2}, s_2i_{1,2}+\delta_2}$ | $\tilde{W}^{(3)}_{s_1i_{1,1}+3p_1+\delta_1, s_1i_{1,1}+3p_1, s_2i_{1,2}+\delta_2, s_2i_{1,2}}$ |

| | $i_2$ | | | |
|---|---|---|---|---|
| $(\delta_1, \delta_2)$ | 8 | 9 | 10 | 11 |
| $(O_1, 0), (0, O_2)$ | $W^{(3)}_{s_1i_{1,1}, s_1i_{1,1}+\delta_1, s_2i_{1,2}+p_2, s_2i_{1,2}+\delta_2+p_2}$ | $W^{(3)}_{s_1i_{1,1}+\delta_1, s_1i_{1,1}, s_2i_{1,2}+\delta_2+p_2, s_2i_{1,2}+p_2}$ | $\tilde{W}^{(3)}_{s_1i_{1,1}, s_1i_{1,1}+\delta_1, s_2i_{1,2}+p_2, s_2i_{1,2}+\delta_2+p_2}$ | $\tilde{W}^{(3)}_{s_1i_{1,1}+\delta_1, s_1i_{1,1}, s_2i_{1,2}+\delta_2+p_2, s_2i_{1,2}+p_2}$ |

| | $i_2$ | | | |
|---|---|---|---|---|
| $(\delta_1, \delta_2)$ | 12 | 13 | 14 | 15 |
| $(O_1, 0), (0, O_2)$ | $W^{(3)}_{s_1i_{1,1}+p_1, s_1i_{1,1}+p_1+\delta_1, s_2i_{1,2}+p_2, s_2i_{1,2}+\delta_2+p_2}$ | $W^{(3)}_{s_1i_{1,1}+p_1+\delta_1, s_1i_{1,1}+p_1, s_2i_{1,2}+\delta_2+p_2, s_2i_{1,2}+p_2}$ | $\tilde{W}^{(3)}_{s_1i_{1,1}+p_1, s_1i_{1,1}+p_1+\delta_1, s_2i_{1,2}+p_2, s_2i_{1,2}+\delta_2+p_2}$ | $\tilde{W}^{(3)}_{s_1i_{1,1}+p_1+\delta_1, s_1i_{1,1}+p_1, s_2i_{1,2}+\delta_2+p_2, s_2i_{1,2}+p_2}$ |

-continued where $W^{(3)}_{l,l',m,m'} = \frac{1}{\sqrt{3P}}\begin{bmatrix} v_{l,m} & v_{l,m} & v_{l',m'} \\ v_{l,m} & -v_{l,m} & -v_{l',m'} \end{bmatrix}$ and $\tilde{W}^{(3)}_{l,l',m,m'} = \frac{1}{\sqrt{3P}}\begin{bmatrix} v_{l,m} & v_{l',m'} & v_{l',m'} \\ v_{l,m} & v_{l',m'} & -v_{l',m'} \end{bmatrix}$, if $N_1 \geq N_2$ $(s_1, s_2) = \left(O_1, \frac{O_2}{2}\right)$ and $(p_1, p_2) = \left(\frac{O_1}{4}, \frac{O_2}{4}\right)$.

| Value of Codebook-Config = 4 | | | | |
|---|---|---|---|---|
| $i_{1,1} = 0, 1, \ldots, N_1 - 1$<br>$i_{1,2} = 0, 1, \ldots, 4N_2 - 1$ | | | | |
| | $i_2$ | | | |
| $(\delta_1, \delta_2)$ | 0 | 1 | 2 | 3 |
| $(O_1, 0), (0, O_2)$ if $N_1, N_2 > 1$<br>$(O_1, 0), (2O_1, 0), (3O_1, 0)$ if $N_1 = 1$<br>$(0, O_2), (0, 2O_2), (0, 3O_2)$ if $N_2 = 1$ | $W^{(3)}_{s_1 i_{1,1}, s_1 i_{1,1}+\delta_1, s_2 i_{1,2}, s_2 i_{1,2}+\delta_2}$ | $W^{(3)}_{s_1 i_{1,1}+\delta_1, s_1 i_{1,1}, s_2 i_{1,2}+\delta_2, s_2 i_{1,2}}$ | $\tilde{W}^{(3)}_{s_1 i_{1,1}, s_1 i_{1,1}+\delta_1, s_2 i_{1,2}, s_2 i_{1,2}+\delta_2}$ | $\tilde{W}^{(3)}_{s_1 i_{1,1}+\delta_1, s_1 i_{1,1}, s_2 i_{1,2}+\delta_2, s_2 i_{1,2}}$ |
| | $i_2$ | | | |
| $(\delta_1, \delta_2)$ | 4 | 5 | 6 | 7 |
| $(O_1, 0), (0, O_2)$ if $N_1, N_2 > 1$<br>$(O_1, 0), (2O_1, 0), (3O_1, 0)$ if $N_1 = 1$<br>$(0, O_2), (0, 2O_2), (0, 3O_2)$ if $N_2 = 1$ | $W^{(3)}_{s_1 i_{1,1}+p_1, s_1 i_{1,1}+p_1+\delta_1, s_2 i_{1,2}, s_2 i_{1,2}+\delta_2}$ | $W^{(3)}_{s_1 i_{1,1}+p_1+\delta_1, s_1 i_{1,1}+p_1, s_2 i_{1,2}+\delta_2, s_2 i_{1,2}}$ | $\tilde{W}^{(3)}_{s_1 i_{1,1}+p_1, s_1 i_{1,1}+p_1+\delta_1, s_2 i_{1,2}, s_2 i_{1,2}+\delta_2}$ | $\tilde{W}^{(3)}_{s_1 i_{1,1}+p_1+\delta_1, s_1 i_{1,1}+p_1, s_2 i_{1,2}+\delta_2, s_2 i_{1,2}}$ |
| | $i_2$ | | | |
| $(\delta_1, \delta_2)$ | 8 | 9 | 10 | 11 |
| $(O_1, 0), (0, O_2)$ if $N_1, N_2 > 1$<br>$(O_1, 0), (2O_1, 0), (3O_1, 0)$ if $N_1 = 1$<br>$(0, O_2), (0, 2O_2), (0, 3O_2)$ if $N_2 = 1$ | $W^{(3)}_{s_1 i_{1,1}+2p_1, s_1 i_{1,1}+2p_1+\delta_1, s_2 i_{1,2}, s_2 i_{1,2}+\delta_2}$ | $W^{(3)}_{s_1 i_{1,1}+2p_1+\delta_1, s_1 i_{1,1}+2p_1, s_2 i_{1,2}+\delta_2, s_2 i_{1,2}}$ | $\tilde{W}^{(3)}_{s_1 i_{1,1}+2p_1, s_1 i_{1,1}+2p_1+\delta_1, s_2 i_{1,2}, s_2 i_{1,2}+\delta_2}$ | $\tilde{W}^{(3)}_{s_1 i_{1,1}+2p_1+\delta_1, s_1 i_{1,1}+2p_1, s_2 i_{1,2}+\delta_2, s_2 i_{1,2}}$ |
| | $i_2$ | | | |
| $(\delta_1, \delta_2)$ | 12 | 13 | 14 | 15 |
| $(O_1, 0), (0, O_2)$ if $N_1, N_2 > 1$<br>$(O_1, 0), (2O_1, 0), (3O_1, 0)$ if $N_1 = 1$<br>$(0, O_2), (0, 2O_2), (0, 3O_2)$ if $N_2 = 1$ | $W^{(3)}_{s_1 i_{1,1}+3p_1, s_1 i_{1,1}+3p_1+\delta_1, s_2 i_{1,2}, s_2 i_{1,2}+\delta_2}$ | $W^{(3)}_{s_1 i_{1,1}+3p_1+\delta_1, s_1 i_{1,1}+3p_1, s_2 i_{1,2}+\delta_2, s_2 i_{1,2}}$ | $\tilde{W}^{(3)}_{s_1 i_{1,1}+3p_1, s_1 i_{1,1}+3p_1+\delta_1, s_2 i_{1,2}, s_2 i_{1,2}+\delta_2}$ | $\tilde{W}^{(3)}_{s_1 i_{1,1}+3p_1+\delta_1, s_1 i_{1,1}+3p_1, s_2 i_{1,2}+\delta_2, s_2 i_{1,2}}$ |

where $W^{(3)}_{l,l',m,m'} = \frac{1}{\sqrt{3P}}\begin{bmatrix} v_{l,m} & v_{l,m} & v_{l',m'} \\ v_{l,m} & -v_{l,m} & -v_{l',m'} \end{bmatrix}$ and $\tilde{W}^{(3)}_{l,l',m,m'} = \frac{1}{\sqrt{3P}}\begin{bmatrix} v_{l,m} & v_{l',m'} & v_{l',m'} \\ v_{l,m} & v_{l',m'} & -v_{l',m'} \end{bmatrix}$, if $N_1 \geq N_2$ $(s_1, s_2) = \left(O_1, \frac{O_2}{4}\right)$ and $(p_1, p_2) = \left(\frac{O_1}{4}, \frac{O_2}{4}\right)$.

5. The UE of claim 1, wherein the second PMI $i_2$ is determined according to a following codebook for 4-layer CSI reporting:

| 4 Layers, Codebook-Config = 1, $N_1 > 1$, $N_2 > 1$ | | |
|---|---|---|
| | $i_{1,1} = 0, 1, \ldots, O_1N_1 - 1$<br>$i_{1,2} = 0, 1, \ldots, O_2N_2 - 1$ | |
| | $i_2$ | |
| $(\delta_1, \delta_2)$ | 0 | 1 |
| $(O_1, 0)$<br>$(0, O_2)$ | $W_{i_{1,1},i_{1,1}+O_1,i_{1,2},i_{1,2},0}^{(4)}$<br>$W_{i_{1,1},i_{1,1},i_{1,2},i_{1,2}+O_2,0}^{(4)}$ | $W_{i_{1,1},i_{1,1}+O_1,i_{1,2},i_{1,2},1}^{(4)}$<br>$W_{i_{1,1},i_{1,1},i_{1,2},i_{1,2}+O_2,1}^{(4)}$ |
| where $W_{l,l',m,m'}^{(4)} = \frac{1}{\sqrt{4P}}\begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$ | | |

| 4 Layers, , Codebook-Config = 1, $N_2 = 1$ | | |
|---|---|---|
| | $i_{1,1} = 0, 1, \ldots, O_1N_1 - 1$<br>$i_{1,2} = 0, 1, \ldots, O_2N_2 - 1$ | |
| | $i_2$ | |
| $(\delta_1, \delta_2)$ | 0 | 1 |
| $(O_1, 0)$<br>$(2O_1, 0)$<br>$(3O_1, 0)$ | $W_{i_{1,1},i_{1,1}+O_1,0,0,0}^{(4)}$<br>$W_{i_{1,1},i_{1,1}+2O_1,0,0,0}^{(4)}$<br>$W_{i_{1,1},i_{1,1}+3O_1,0,0,0}^{(4)}$ | $W_{i_{1,1},i_{1,1}+O_1,0,0,1}^{(4)}$<br>$W_{i_{1,1},i_{1,1}+2O_1,0,0,1}^{(4)}$<br>$W_{i_{1,1},i_{1,1}+3O_1,0,0,1}^{(4)}$ |
| $W_{l,l',m,m'}^{(4)} = \frac{1}{\sqrt{4P}}\begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$ | | |

| Value of Codebook-Config = 2 | | |
|---|---|---|
| | $i_{1,1} = 0, 1, \ldots, 2N_1 - 1$<br>$i_{1,2} = 0, 1, \ldots, 2N_2 - 1$ | |
| | $i_2$ | |
| $(\delta_1, \delta_2)$ | 0 | 1 |
| $(O_1, 0), (0, O_2)$ | $W_{s_1i_{1,1},s_1i_{1,1}+\delta_1,s_2i_{1,2},s_2i_{1,2}+\delta_2,0}^{(4)}$ | $W_{s_1i_{1,1},s_1i_{1,1}+\delta_1,s_2i_{1,2},s_2i_{1,2}+\delta_2,1}^{(4)}$ |
| | $i_2$ | |
| $(\delta_1, \delta_2)$ | 2 | 3 |
| $(O_1, 0), (0, O_2)$ | $W_{s_1i_{1,1}+p_1,s_1i_{1,1}+p_1+\delta_1,s_2i_{1,2},s_2i_{1,2}+\delta_2,0}^{(4)}$ | $W_{s_1i_{1,1}+p_1,s_1i_{1,1}+p_1+\delta_1,s_2i_{1,2},s_2i_{1,2}+\delta_2,1}^{(4)}$ |
| | $i_2$ | |
| $(\delta_1, \delta_2)$ | 4 | 5 |
| $(O_1, 0), (0, O_2)$ | $W_{s_1i_{1,1},s_1i_{1,1}+\delta_1,s_2i_{1,2}+p_2,s_2i_{1,2}+\delta_2+p_2,0}^{(4)}$ | $W_{s_1i_{1,1},s_1i_{1,1}+\delta_1,s_2i_{1,2}+p_2,s_2i_{1,2}+\delta_2+p_2,1}^{(4)}$ |
| | $i_2$ | |
| $(\delta_1, \delta_2)$ | 6 | 7 |
| $(O_1, 0), (0, O_2)$ | $W_{s_1i_{1,1}+p_1,s_1i_{1,1}+p_1+\delta_1,s_2i_{1,2}+p_2,s_2i_{1,2}+\delta_2+p_2,0}^{(4)}$ | $W_{s_1i_{1,1}+p_1,s_1i_{1,1}+p_1+\delta_1,s_2i_{1,2}+p_2,s_2i_{1,2}+\delta_2+p_2,1}^{(4)}$ |
| where $W_{l,l',m,m',n}^{(4)} = \frac{1}{\sqrt{4P}}\begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$, $(s_1, s_2) = \left(\frac{O_1}{2}, \frac{O_2}{2}\right)$ and $(p_1, p_2) = \left(\frac{O_1}{4}, \frac{O_2}{4}\right)$. | | |

| Value of Codebook-Config = 3 | | |
|---|---|---|
| | $i_{1,1} = 0, 1, \ldots, N_1 - 1$<br>$i_{1,2} = 0, 1, \ldots, 2N_2 - 1$ | |

-continued

| | $i_2$ | |
|---|---|---|
| $(\delta_1, \delta_2)$ | 0 | 1 |
| $(O_1, 0), (0, O_2)$ | $W_{s_1 i_{1,1}+2p_1, s_1 i_{1,1}+2p_1+\delta_1, s_2 i_{1,2}, s_2 i_{1,2}+\delta_2, 0}^{(4)}$ | $W_{s_1 i_{1,1}+2p_1, s_1 i_{1,1}+2p_1+\delta_1, s_2 i_{1,2}, s_2 i_{1,2}+\delta_2, 1}^{(4)}$ |
| | $i_2$ | |
| $(\delta_1, \delta_2)$ | 2 | 3 |
| $(O_1, 0), (0, O_2)$ | $W_{s_1 i_{1,1}+3p_1, s_1 i_{1,1}+3p_1+\delta_1, s_2 i_{1,2}, s_2 i_{1,2}+\delta_2, 0}^{(4)}$ | $W_{s_1 i_{1,1}+3p_1, s_1 i_{1,1}+3p_1+\delta_1, s_2 i_{1,2}, s_2 i_{1,2}+\delta_2, 1}^{(4)}$ |
| | $i_2$ | |
| $(\delta_1, \delta_2)$ | 4 | 5 |
| $(O_1, 0), (0, O_2)$ | $W_{s_1 i_{1,1}, s_1 i_{1,1}+\delta_1, s_2 i_{1,2}+p_2, s_2 i_{1,2}+\delta_2+p_2, 0}^{(4)}$ | $W_{s_1 i_{1,1}, s_1 i_{1,1}+\delta_1, s_2 i_{1,2}+p_2, s_2 i_{1,2}+\delta_2+p_2, 1}^{(4)}$ |
| | $i_2$ | |
| $(\delta_1, \delta_2)$ | 6 | 7 |
| $(O_1, 0), (0, O_2)$ | $W_{s_1 i_{1,1}+p_1, s_1 i_{1,1}+p_1+\delta_1, s_2 i_{1,2}+p_2, s_2 i_{1,2}+\delta_2+p_2, 0}^{(4)}$ | $W_{s_1 i_{1,1}+p_1, s_1 i_{1,1}+p_1+\delta_1, s_2 i_{1,2}+p_2, s_2 i_{1,2}+\delta_2+p_2, 1}^{(4)}$ |

where $W_{l,l',m,m',n}^{(4)} = \frac{1}{\sqrt{4P}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$, $(s_1, s_2) = \left(O_1, \frac{O_2}{2}\right)$ and $(p_1, p_2) = \left(\frac{O_1}{4}, \frac{O_2}{4}\right)$.

Value of Codebook-Config = 4
$i_{1,1} = 0, 1, \ldots, N_1 - 1$
$i_{1,2} = 0, 1, \ldots, 4N_2 - 1$

| $(\delta_1, \delta_2)$ | $(O_1, 0), (0, O_2)$ if $N_1, N_2 > 1$<br>$(O_1, 0), (2O_1, 0), (3O_1, 0)$ if $N_1 = 1$<br>$(0, O_2), (0, 2O_2), (0, 3O_2)$ if $N_2 = 1$ |
|---|---|
| $i_2$ | |
| 0 | 1 |
| $W_{s_1 i_{1,1}, s_1 i_{1,1}+\delta_1, s_2 i_{1,2}, s_2 i_{1,2}+\delta_2, 0}^{(4)}$ | $W_{s_1 i_{1,1}, s_1 i_{1,1}+\delta_1, s_2 i_{1,2}, s_2 i_{1,2}+\delta_2, 1}^{(4)}$ |
| $i_2$ | |
| 2 | 3 |
| $W_{s_1 i_{1,1}+p_1, s_1 i_{1,1}+p_1+\delta_1, s_2 i_{1,2}, s_2 i_{1,2}+\delta_2, 0}^{(4)}$ | $W_{s_1 i_{1,1}+p_1, s_1 i_{1,1}+p_1+\delta_1, s_2 i_{1,2}, s_2 i_{1,2}+\delta_2, 1}^{(4)}$ |
| $i_2$ | |
| 4 | 5 |
| $W_{s_1 i_{1,1}+2p_1, s_1 i_{1,1}+2p_1+\delta_1, s_2 i_{1,2}, s_2 i_{1,2}+\delta_2, 0}^{(4)}$ | $W_{s_1 i_{1,1}+2p_1, s_1 i_{1,1}+2p_1+\delta_1, s_2 i_{1,2}, s_2 i_{1,2}+\delta_2, 1}^{(4)}$ |
| $i_2$ | |
| 6 | 7 |
| $W_{s_1 i_{1,1}+3p_1, s_1 i_{1,1}+3p_1+\delta_1, s_2 i_{1,2}, s_2 i_{1,2}+\delta_2, 0}^{(4)}$ | $W_{s_1 i_{1,1}+3p_1, s_1 i_{1,1}+3p_1+\delta_1, s_2 i_{1,2}, s_2 i_{1,2}+\delta_2, 1}^{(4)}$ |

where $W_{l,l',m,m',n}^{(4)} = \frac{1}{\sqrt{4P}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$, $(s_1, s_2) = \left(O_1, \frac{O_2}{4}\right)$ and $(p_1, p_2) = \left(\frac{O_1}{4}, \text{—}\right)$.

6. The UE of claim 1, wherein the UE is configured with an orthogonal beam group type indicator $(\delta_1, \delta_2)$ by a higher layer.

7. The UE of claim 6, wherein that the orthogonal beam type indicator $(\delta_1, \delta_2)$ are reported jointly with the first PMI $i_{1,1}$ to the base station.

8. The UE of claim 1, wherein the second PMI $i_2$ is determined according to a following codebook for 5-layer and 6-layer CST reporting for P=12 and 16 ports:

| | $i_{1,1} = 0, 1, \ldots, 4N_1 - 1$<br>$i_{1,2} = 0, 1, \ldots, 4N_2 - 1$ |
|---|---|
| Codebook-Config | $i_2$ |
| 2 | $W^{(5)}_{i_{1,1},i_{1,2}} = \frac{1}{\sqrt{5Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+O_1, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+O_1, s_2 i_{1,2}+O_2} \end{bmatrix}$<br>$W^{(6)}_{i_{1,1},i_{1,2}} = \frac{1}{\sqrt{6Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+O_1, s_2 i_{1,2}+O_2} & v_{s_1 i_{1,1}+O_1, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+O_1, s_2 i_{1,2}+O_2} & -v_{s_1 i_{1,1}+O_1, s_2 i_{1,2}+O_2} \end{bmatrix}$ |
| 3 | $W^{(5)}_{i_{1,1},i_{1,2}} = \frac{1}{\sqrt{5Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}+O_2} \end{bmatrix} N_1 \geq N_2$<br>$W^{(6)}_{i_{1,1},i_{1,2}} = \frac{1}{\sqrt{6Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}+O_2} & v_{s_1 i_{1,1}+2O_1, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}+O_2} & -v_{s_1 i_{1,1}+2O_1, s_2 i_{1,2}+O_2} \end{bmatrix} N_1 \geq N_2$ |
| 4 | $W^{(5)}_{i_{1,1},i_{1,2}} = \frac{1}{\sqrt{5Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}} \end{bmatrix} N_1 \geq N_2$<br>$W^{(6)}_{i_{1,1},i_{1,2}} = \frac{1}{\sqrt{6Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}} & v_{s_1 i_{1,1}+2O_1, s_2 i_{1,2}} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}} & -v_{s_1 i_{1,1}+2O_1, s_2 i_{1,2}} \end{bmatrix} N_1 \geq N_2.$ |

9. The UE of claim 1, wherein the second PMI $i_2$ is determined according to a following codebook for 7-layer and 8-layer CSI reporting for P=16 ports:

| | $i_{1,1} = 0, 1, \ldots, 4N_1 - 1$ <br> $i_{1,2} = 0, 1, \ldots, 4N_2 - 1$ |
|---|---|
| Codebook-Config | $i_2$ |
| 2 | $W^{(7)}_{i_{1,1},i_{1,2}} = \frac{1}{\sqrt{7Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+O_1, s_2 i_{1,2}+O_2} & v_{s_1 i_{1,1}+O_1, s_2 i_{1,2}+O_2} & v_{s_1 i_{1,1}, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+O_1, s_2 i_{1,2}+O_2} & -v_{s_1 i_{1,1}+O_1, s_2 i_{1,2}+O_2} & v_{s_1 i_{1,1}, s_2 i_{1,2}+O_2} \end{bmatrix}$ <br> $W^{(8)}_{i_{1,1},i_{1,2}} = \frac{1}{\sqrt{8Q}}\begin{bmatrix} v_{s_1 i_{1,2}, s_2 i_{1,1}} & v_{s_2 i_{1,2}, s_1 i_{1,1}} & v_{s_2 i_{1,2}, s_1 i_{1,1}+O_1} & v_{s_2 i_{1,2}, s_1 i_{1,1}+O_1} & v_{s_2 i_{1,2}+O_2, s_1 i_{1,1}+O_1} & v_{s_2 i_{1,2}+O_2, s_1 i_{1,1}+O_1} & v_{s_2 i_{1,2}+O_2, s_1 i_{1,1}} & v_{s_2 i_{1,2}+O_2, s_1 i_{1,1}} \\ v_{s_2 i_{1,2}, s_1 i_{1,1}} & -v_{s_2 i_{1,2}, s_1 i_{1,1}} & v_{s_2 i_{1,2}, s_1 i_{1,1}+O_1} & -v_{s_2 i_{1,2}, s_1 i_{1,1}+O_1} & v_{s_2 i_{1,2}+O_2, s_1 i_{1,1}+O_1} & -v_{s_2 i_{1,2}+O_2, s_1 i_{1,1}+O_1} & v_{s_2 i_{1,2}+O_2, s_1 i_{1,1}} & -v_{s_2 i_{1,2}+O_2, s_1 i_{1,1}} \end{bmatrix}$ |
| 3 | $W^{(7)}_{i_{1,1},i_{1,2}} = \frac{1}{\sqrt{7Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}+O_2} & v_{s_1 i_{1,1}+2O_1, s_2 i_{1,2}+O_2} & v_{s_1 i_{1,1}+3O_1, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}+O_2} & -v_{s_1 i_{1,1}+2O_1, s_2 i_{1,2}+O_2} & v_{s_1 i_{1,1}+3O_1, s_2 i_{1,2}+O_2} \end{bmatrix} N_1 \geq N_2$ <br> $W^{(8)}_{i_{1,1},i_{1,2}} = \frac{1}{\sqrt{8Q}}\begin{bmatrix} v_{s_2 i_{1,2}, s_1 i_{1,1}} & v_{s_2 i_{1,2}, s_1 i_{1,1}} & v_{s_2 i_{1,2}, s_1 i_{1,1}+O_1} & v_{s_2 i_{1,2}, s_1 i_{1,1}+O_1} & v_{s_2 \cdot i_{1,2}+2O_2, s_1 i_{1,1}+O_1} & v_{s_2 i_{1,2}+2O_2, s_1 i_{1,1}+O_1} & v_{s_2 i_{1,2}+3O_2, s_1 i_{1,1}+O_1} & v_{s_2 i_{1,2}+3O_2, s_1 i_{1,1}+O_1} \\ v_{s_2 i_{1,2}, s_1 i_{1,1}} & -v_{s_2 i_{1,2}, s_1 i_{1,1}} & v_{s_2 i_{1,2}, s_1 i_{1,1}+O_1} & -v_{s_2 i_{1,2}, s_1 i_{1,1}+O_1} & v_{s_2 \cdot i_{1,2}+2O_2, s_1 i_{1,1}+O_1} & -v_{s_2 i_{1,2}+2O_2, s_1 i_{1,1}+O_1} & v_{s_2 i_{1,2}+3O_2, s_1 i_{1,1}+O_1} & -v_{s_2 i_{1,2}+3O_2, s_1 i_{1,1}+O_1} \end{bmatrix} N_1 \geq N_2$ |
| 4 | $W^{(7)}_{i_{1,1},i_{1,2}} = \frac{1}{\sqrt{7Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}} & v_{s_1 i_{1,1}+2O_1, s_2 i_{1,2}} & v_{s_1 i_{1,1}+3O_1, s_2 i_{1,2}} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}} & -v_{s_1 i_{1,1}+2O_1, s_2 i_{1,2}} & v_{s_1 i_{1,1}+3O_1, s_2 i_{1,2}} \end{bmatrix} N_1 \geq N_2$ <br> $W^{(8)}_{i_{1,1},i_{1,2}} = \frac{1}{\sqrt{8Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 \cdot i_{1,1}+O_1, s_2 i_{1,2}} & v_{s_1 i_{1,1}+2O_1, s_2 i_{1,2}} & v_{s_1 i_{1,1}+2O_1, s_2 i_{1,2}} & v_{s_1 i_{1,1}+3O_1, s_2 i_{1,2}} & v_{s_1 i_{1,1}+3O_1, s_2 i_{1,2}} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 \cdot i_{1,1}+O_1, s_2 i_{1,2}} & v_{s_1 i_{1,1}+2O_1, s_2 i_{1,2}} & -v_{s_1 i_{1,1}+2O_1, s_2 i_{1,2}} & v_{s_1 i_{1,1}+3O_1, s_2 i_{1,2}} & -v_{s_1 i_{1,1}+3O_1, s_2 i_{1,2}} \end{bmatrix} N_1 \geq N_2.$ |

10. The UE of claim 1, wherein the second PMI $i_2$ is determined according to a following codebook for 7-layer and 8-layer CSI reporting for P=12 ports:

| | $i_{1,1} = 0, 1, \ldots, 4N_1 - 1$<br>$i_{1,2} = 0, 1, \ldots, 4N_2 - 1$ |
|---|---|
| Codebook-Config | $i_2$ |
| 2 | $W^{(7)}_{i_{1,1},i_{1,2}} = \frac{1}{\sqrt{7Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+O_1, s_2 i_{1,2}+O_2} & v_{s_1 i_{1,1}+O_1, s_2 i_{1,2}+O_2} & v_{s_1 i_{1,1}, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+O_1, s_2 i_{1,2}+O_2} & -v_{s_1 i_{1,1}+O_1, s_2 i_{1,2}+O_2} & v_{s_1 i_{1,1}, s_2 i_{1,2}+O_2} \end{bmatrix}$<br>$W^{(8)}_{i_{1,1},i_{1,2}} = \frac{1}{\sqrt{8Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+O_1, s_2 i_{1,2}+O_2} & v_{s_1 i_{1,1}+O_1, s_2 i_{1,2}+O_2} & v_{s_1 i_{1,1}, s_2 i_{1,2}+O_2} & v_{s_1 i_{1,1}, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+O_1, s_2 i_{1,2}+O_2} & -v_{s_1 i_{1,1}+O_1, s_2 i_{1,2}+O_2} & v_{s_1 i_{1,1}, s_2 i_{1,2}+O_2} & -v_{s_1 i_{1,1}, s_2 i_{1,2}+O_2} \end{bmatrix}$ |
| 3 | $W^{(7)}_{i_{1,1},i_{1,2}} = \frac{1}{\sqrt{7Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}+O_2} & v_{s_1 i_{1,1}+2O_1, s_2 i_{1,2}+O_2} & v_{s_1 i_{1,1}, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}+O_2} & -v_{s_1 i_{1,1}+2O_1, s_2 i_{1,2}+O_2} & v_{s_1 i_{1,1}, s_2 i_{1,2}+O_2} \end{bmatrix}$ $N_1 \geq N_2$<br>$W^{(8)}_{i_{1,1},i_{1,2}} = \frac{1}{\sqrt{8Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}+O_2} & v_{s_1 i_{1,1}+2O_1, s_2 i_{1,2}+O_2} & v_{s_1 i_{1,1}+O_1, s_2 i_{1,2}+O_2} & v_{s_1 i_{1,1}+O_1, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}+O_2} & -v_{s_1 i_{1,1}+O_1, s_2 i_{1,2}+O_2} & v_{s_1 i_{1,1}+O_1, s_2 i_{1,2}+O_2} & -v_{s_1 i_{1,1}+O_1, s_2 i_{1,2}+O_2} \end{bmatrix}$ $N_1 \geq N_2$ |
| 4 | $W^{(7)}_{i_{1,1},i_{1,2}} = \frac{1}{\sqrt{7Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}} & v_{s_1 i_{1,1}+2O_1, s_2 i_{1,2}} & v_{s_1 i_{1,1}, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}} & -v_{s_1 i_{1,1}+2O_1, s_2 i_{1,2}} & v_{s_1 i_{1,1}, s_2 i_{1,2}+O_2} \end{bmatrix}$ $N_1 \geq N_2$<br>$W^{(8)}_{i_{1,1},i_{1,2}} = \frac{1}{\sqrt{8Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}} & v_{s_1 i_{1,1}+2O_1, s_2 i_{1,2}} & v_{s_1 i_{1,1}, s_2 i_{1,2}+O_2} & v_{s_1 i_{1,1}, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}} & -v_{s_1 i_{1,1}+2O_1, s_2 i_{1,2}} & v_{s_1 i_{1,1}, s_2 i_{1,2}+O_2} & -v_{s_1 i_{1,1}, s_2 i_{1,2}+O_2} \end{bmatrix}$ $N_1 \geq N_2$. |

11. A base station (BS) comprising a plurality of antenna ports P, the BS comprising:

a transmitter configured to transmit, to a user equipment (UE), downlink signals indicating precoder codebook parameters, the downlink signal including:

first and second quantities of antenna ports ($N_1$, $N_2$) indicating respective quantities of antenna ports in first and second dimensions;

first and second oversampling factors ($O_1$,$O_2$) indicating respective oversampling factors for DFT beams in the first and second dimensions; and a Codebook-Config parameter indicating a codebook subset selection configuration among a plurality of codebook subset selection configurations;

a receiver configured to receive a plurality of precoding matrix indicators (PMIs) including a first PMI ($i_{1,1}$, $i_{1,2}$) and a second PMI $i_2$, determined based on the downlink signals and skip numbers ($S_1$, $S_2$); and a controller configured to determine a precoder to precoding a transmission signal based on the plurality of PMIs, wherein the skip numbers ($S_1$, $S_2$) are rank dependent and ($O_1$, $O_2$) dependent.

12. The BS of claim 11, wherein a value range determining a bit width of the first PMI $i_{1,1}$ reporting is $$\frac{N_1 O_1}{S_1},$$

and a value range determining the bit width of the first PMI $i_{1,2}$ reporting is $$\frac{N_2 O_2}{S_2}.$$

13. The BS of claim 11, wherein second PMI $i_2$ are determined according to a following codebook for 2-layer channel state information (CSI) reporting:

| | | | | |
|---|---|---|---|---|
| 2 Layers, Codebook-Config = 1 | | | | |
| $i_{1,2} = 0, \ldots, N_2O_2 - 1$ | | | | |
| | $i_2$ | | | |
| $i_{1,1}$ | 0 | 1 | 2 | 3 |
| $0, \ldots, N_1O_1 - 1$ | $W_{i_{1,1},i_{1,1},i_{1,2},i_{1,2},0}^{(2)}$ | $W_{i_{1,1},i_{1,1},i_{1,2},i_{1,2},1}^{(2)}$ | $W_{i_{1,1},i_{1,1},i_{1,2},i_{1,2},2}^{(2)}$ | $W_{i_{1,1},i_{1,1},i_{1,2},i_{1,2},3}^{(2)}$ |
| where $W_{l,l',m,m',n}^{(2)} = \frac{1}{\sqrt{2P}}\begin{bmatrix} v_{l,m} & v_{l',m'} \\ \varphi_n v_{l,m} & -\varphi_n v_{l',m'} \end{bmatrix}$. | | | | |

| | | | |
|---|---|---|---|
| 2 Layers, codebook-Config = 2 | | | |
| If $N_1 > N_2$, p = 1 otherwise p = $O_1$<br>$i_{1,2} = 0, \ldots, N_2O_2/2 - 1$<br>$i_{1,1} = 0, \ldots, N_1O_1/2 - 1$ | | | |
| $i_2$ | | | |
| 0 | 1 | 2 | 3 |
| $W_{2i_{1,1},2i_{1,1},2i_{1,2},2i_{1,2},0}^{(2)}$ | $W_{2i_{1,1},2i_{1,1},2i_{1,2},2i_{1,2},1}^{(2)}$ | $W_{2i_{1,1}+p,2i_{1,1}+p,2i_{1,2},2i_{1,2},0}^{(2)}$ | $W_{2i_{1,1}+p,2i_{1,1}+p,2i_{1,2},2i_{1,2},1}^{(2)}$ |
| $i_2$ | | | |
| 4 | 5 | 6 | 7 |
| $W_{2i_{1,1}+p,2i_{1,1}+p,2i_{1,2}+1,2i_{1,2}+1,0}^{(2)}$ | $W_{2i_{1,1}+p,2i_{1,1}+p,2i_{1,2}+1,2i_{1,2}+1,1}^{(2)}$ | $W_{2i_{1,1},2i_{1,1},2i_{1,2},1,2i_{1,2}+1,0}^{(2)}$ | $W_{2i_{1,1},2i_{1,1},2i_{1,2}+1,2i_{1,2}+1,1}^{(2)}$ |
| $i_2$ | | | |
| 8 | 9 | 10 | 11 |
| $W_{2i_{1,1},2i_{1,1}+p,2i_{1,2},2i_{1,2},0}^{(2)}$ | $W_{2i_{1,1},2i_{1,1}+p,2i_{1,2},2i_{1,2},1}^{(2)}$ | $W_{2i_{1,1},2i_{1,1}+p,2i_{1,2},1,2i_{1,2}+1,0}^{(2)}$ | $W_{2i_{1,1},2i_{1,1}+p,2i_{1,2}+1,2i_{1,2}+1,1}^{(2)}$ |
| $i_2$ | | | |
| 12 | 13 | 14 | 15 |
| $W_{2i_{1,1},2i_{1,1},2i_{1,2},2i_{1,2}+1,0}^{(2)}$ | $W_{2i_{1,1},2i_{1,1},2i_{1,2},2i_{1,2}+1,1}^{(2)}$ | $W_{2i_{1,1},+p,2i_{1,1}+p,2i_{1,2},2i_{1,2}+1,0}^{(2)}$ | $W_{2i_{1,1}+p}^{(2)}$ |
| where $W_{l,l',m,m',n}^{(2)} = \frac{1}{\sqrt{2P}}\begin{bmatrix} v_{l,m} & v_{l',m'} \\ \varphi_n v_{l,m} & -\varphi_n v_{l',m'} \end{bmatrix}$ | | | |

| |
|---|
| 2 Layers, Codebook-Config = 3 |

$$i_{1,1} = 0, \ldots, \frac{N_1O_1}{2} - 1$$

-continued $$i_{1,2} = 0, \ldots, \frac{N_2 O_2}{2} - 1$$

| $i_2$ | | | |
|---|---|---|---|
| 0 | 1 | 2 | 3 |
| $W^{(2)}_{s_1 i_{1,1}, s_1 i_{1,1}, s_2 i_{1,2}, s_2 i_{1,2}, 0}$ | $W^{(2)}_{s_1 i_{1,1}, s_1 i_{1,1}, s_2 i_{1,2}, s_2 i_{1,2}, 1}$ | $W^{(2)}_{s_1 i_{1,1}+2p_1, s_1 i_{1,1}+2p_1, s_2 i_{1,2}, s_2 i_{1,2}, 0}$ | $W^{(2)}_{s_1 i_{1,1}+2p_1, s_1 i_{1,1}+2p_1, s_2 i_{1,2}, s_2 i_{1,2}, 1}$ |
| 4 | 5 | 6 | 7 |
| $W^{(2)}_{s_1 i_{1,1}+p_1, s_1 i_{1,1}+p_1, s_2 i_{1,2}+p_2, s_2 i_{1,2}+p_2, 0}$ | $W^{(2)}_{s_1 i_{1,1}+p_1, s_1 i_{1,1}+p_1, s_2 i_{1,2}+p_2, s_2 i_{1,2}+p_2, 1}$ | $W^{(2)}_{s_1 i_{1,1}+3p_1, s_1 i_{1,1}+3p_1, s_2 i_{1,2}+p_2, s_2 i_{1,2}+p_2, 0}$ | $W^{(2)}_{s_1 i_{1,1}+3p_1, s_1 i_{1,1}+3p_1, s_2 i_{1,2}+p_2, s_2 i_{1,2}+p_2, 1}$ |
| 8 | 9 | 10 | 11 |
| $W^{(2)}_{s_1 i_{1,1}+p_1, s_1 i_{1,1}+3p_1, s_2 i_{1,2}+p_2, s_2 i_{1,2}+p_2, 0}$ | $W^{(2)}_{s_1 i_{1,1}+p_1, s_1 i_{1,1}+3p_1, s_2 i_{1,2}+p_2, s_2 i_{1,2}+p_2, 1}$ | $W^{(2)}_{s_1 i_{1,1}, s_1 i_{1,1}+p_1, s_2 i_{1,2}, s_2 i_{1,2}+p_2, 0}$ | $W^{(2)}_{s_1 i_{1,1}, s_1 i_{1,1}+p_1, s_2 i_{1,2}, s_2 i_{1,2}+p_2, 1}$ |
| 12 | 13 | 14 | 15 |
| $W^{(2)}_{s_1 i_{1,1}+p_1, s_1 i_{1,1}+2p_1, s_2 i_{1,2}+p_2, s_2 i_{1,2}, 0}$ | $W^{(2)}_{s_1 i_{1,1}+p_1, s_1 i_{1,1}+2p_1, s_2 i_{1,2}+p_2, s_2 i_{1,2}, 1}$ | $W^{(2)}_{s_1 i_{1,1}, s_1 i_{1,1}+3p_1, s_2 i_{1,2}, s_2 i_{1,2}+p_2, 0}$ | $W^{(2)}_{s_1 i_{1,1}, s_1 i_{1,1}+3p_1, s_2 i_{1,2}, s_2 i_{1,2}+p_2, 1}$ |

where $W^{(2)}_{l,l',m,m',n} = \frac{1}{\sqrt{2P}} \begin{bmatrix} v_{l,m} & v_{l',m'} \\ \varphi_n v_{l,m} & -\varphi_n v_{l',m'} \end{bmatrix}$; $p_1 = p_2 = 1$ 2 Layers, Codebook-Config = 4

$$i_{1,1} = 0, \ldots, \frac{N_1 O_1}{2} - 1$$

$$i_{1,2} = 0, \ldots, \frac{N_2 O_2}{2} - 1$$

| $i_2$ | | | |
|---|---|---|---|
| 0 | 1 | 2 | 3 |
| $W^{(2)}_{s_1 i_{1,1}, s_1 i_{1,1}, s_2 i_{1,2}, s_2 i_{1,2}, 0}$ | $W^{(2)}_{s_1 i_{1,1}, s_1 i_{1,1}, s_2 i_{1,2}, s_2 i_{1,2}, 1}$ | $W^{(2)}_{s_1 i_{1,1}+p_1, s_1 i_{1,1}+p_1, s_2 i_{1,2}, s_2 i_{1,2}, 0}$ | $W^{(2)}_{s_1 i_{1,1}+p_1, s_1 i_{1,1}+p_1, s_2 i_{1,2}, s_2 i_{1,2}, 1}$ |
| 4 | 5 | 6 | 7 |
| $W^{(2)}_{s_1 i_{1,1}+2p_1, s_1 i_{1,1}+2p_1, s_2 i_{1,2}, s_2 i_{1,2}, 0}$ | $W^{(2)}_{s_1 i_{1,1}+2p_1, s_1 i_{1,1}+2p_1, s_2 i_{1,2}, s_2 i_{1,2}, 1}$ | $W^{(2)}_{s_1 i_{1,1}+3p_1, s_1 i_{1,1}+3p_1, s_2 i_{1,2}, s_2 i_{1,2}, 0}$ | $W^{(2)}_{s_1 i_{1,1}+3p_1, s_1 i_{1,1}+3p_1, s_2 i_{1,2}, s_2 i_{1,2}, 1}$ |
| 8 | 9 | 10 | 11 |
| $W^{(2)}_{s_1 i_{1,1}, s_1 i_{1,1}+p_1, s_2 i_{1,2}, s_2 i_{1,2}, 0}$ | $W^{(2)}_{s_1 i_{1,1}, s_1 i_{1,1}+p_1, s_2 i_{1,2}, s_2 i_{1,2}, 1}$ | $W^{(2)}_{s_1 i_{1,1}+p_1, s_1 i_{1,1}+2p_1, s_2 i_{1,2}, s_2 i_{1,2}, 0}$ | $W^{(2)}_{s_1 i_{1,1}+p_1, s_1 i_{1,1}+2p_1, s_2 i_{1,2}, s_2 i_{1,2}, 1}$ |
| 12 | 13 | 14 | 15 |
| $W^{(2)}_{s_1 i_{1,1}, s_1 i_{1,1}+3p_1, s_2 i_{1,2}, s_2 i_{1,2}, 0}$ | $W^{(2)}_{s_1 i_{1,1}, s_1 i_{1,1}+3p_1, s_2 i_{1,2}, s_2 i_{1,2}, 1}$ | $W^{(2)}_{s_1 i_{1,1}+p_1, s_1 i_{1,1}+3p_1, s_2 i_{1,2}, s_2 i_{1,2}, 0}$ | $W^{(2)}_{s_1 i_{1,1}+p_1, s_1 i_{1,1}+3p_1, s_2 i_{1,2}, s_2 i_{1,2}, 1}$ |

where $W^{(2)}_{l,l',m,m',n} = \frac{1}{\sqrt{2P}} \begin{bmatrix} v_{l,m} & v_{l',m'} \\ \varphi_n v_{l,m} & -\varphi_n v_{l',m'} \end{bmatrix}$; $p_1 = p_2 = 1$.

14. The BS of claim 11, wherein the second PMI $i_2$ is determined according to a following codebook for 3-layer CSI reporting:

| | | |
|---|---|---|
| Value of codebook-config = 1 | | |
| $i_{1,1} = 0, 1, \ldots, O_1N_1 - 1$<br>$i_{1,2} = 0, 1, \ldots, O_2N_2 - 1$ | | |
| | 3 Layers, $N_1 > 1$, $N_2 > 1$<br>$i_2$ | |
| $(\delta_1, \delta_2)$ | 0 | 1 |
| $(O_1, 0)$<br>$(0, O_2)$ | $W_{i_{1,1},i_{1,1}+O_1,i_{1,2},i_{1,2}}^{(3)}$<br>$W_{i_{1,1},i_{1,1},i_{1,2},i_{1,2}+O_2}^{(3)}$ | $\tilde{W}_{i_{1,1},i_{1,1}+O_1,i_{1,2},i_{1,2}}^{(3)}$<br>$\tilde{W}_{i_{1,1},i_{1,1},i_{1,2},i_{1,2}+O_2}^{(3)}$ |
| where $W_{l,l',m,m'}^{(3)} = \frac{1}{\sqrt{3P}}\begin{bmatrix} v_{l,m} & v_{l,m} & v_{l',m'} \\ v_{l,m} & -v_{l,m} & -v_{l',m'} \end{bmatrix}$, $\tilde{W}_{l,l',m,m'}^{(3)} = \frac{1}{\sqrt{3P}}\begin{bmatrix} v_{l,m} & v_{l',m'} & v_{l',m'} \\ v_{l,m} & v_{l',m'} & -v_{l',m'} \end{bmatrix}$ | | |
| | 3 Layers, $N_2 = 1$<br>$i_2$ | |
| $(\delta_1, \delta_2)$ | 0 | 1 |
| $(O_1, 0)$<br>$(2O_1, 0)$<br>$(3O_1, 0)$ | $W_{i_{1,1},i_{1,1}+O_1,0,0}^{(3)}$<br>$W_{i_{1,1},i_{1,1}+2O_1,0,0}^{(3)}$<br>$W_{i_{1,1},i_{1,1}+3O_1,0,0}^{(3)}$ | $\tilde{W}_{i_{1,1},i_{1,1}+O_1,0,0}^{(3)}$<br>$\tilde{W}_{i_{1,1},i_{1,1}+2O_1,0,0}^{(3)}$<br>$\tilde{W}_{i_{1,1},i_{1,1}+3O_1,0,0}^{(3)}$ |
| where $W_{l,l',m,m'}^{(3)} = \frac{1}{\sqrt{3P}}\begin{bmatrix} v_{l,m} & v_{l,m} & v_{l',m'} \\ v_{l,m} & -v_{l,m} & -v_{l',m'} \end{bmatrix}$, $\tilde{W}_{l,l',m,m'}^{(3)} = \frac{1}{\sqrt{3P}}\begin{bmatrix} v_{l,m} & v_{l',m'} & v_{l',m'} \\ v_{l,m} & v_{l',m'} & -v_{l',m'} \end{bmatrix}$ | | |
| Value of codebook-config = 2 | | |
| $i_{1,1} = 0, 1, \ldots, 2N_1 - 1$<br>$i_{1,2} = 0, 1, \ldots, 2N_2 - 1$ | | |
| | $i_2$ | |
| $(\delta_1, \delta_2)$ | 0 | 1 |
| $(O_1, 0), (0, O_2)$ | $W_{s_1i_{1,1},s_1i_{1,1}+\delta_1,s_2i_{1,2},s_2i_{1,2}+\delta_2}^{(3)}$ | $W_{s_1i_{1,1}+\delta_1,s_1i_{1,1},s_2i_{1,2}+\delta_2,s_2i_{1,2}}^{(3)}$ |
| | $i_2$ | |
| $(\delta_1, \delta_2)$ | 2 | 3 |
| $(O_1, 0), (0, O_2)$ | $\tilde{W}_{s_1i_{1,1},s_1i_{1,1}+\delta_1,s_2i_{1,2},s_2i_{1,2}+\delta_2}^{(3)}$ | $\tilde{W}_{s_1i_{1,1}+\delta_1,s_1i_{1,1},s_2i_{1,2}+\delta_2,s_2i_{1,2}}^{(3)}$ |
| | $i_2$ | |
| $(\delta_1, \delta_2)$ | 4 | 5 |
| $(O_1, 0), (0, O_2)$ | $W_{s_1i_{1,1}+p_1,s_1i_{1,1}+p_1+\delta_1,s_2i_{1,2},s_2i_{1,2}+\delta_2}^{(3)}$ | $W_{s_1i_{1,1}+p_1+\delta_1,s_1i_{1,1}+p_1,s_2i_{1,2}+\delta_2,s_2i_{1,2}}^{(3)}$ |
| | $i_2$ | |
| $(\delta_1, \delta_2)$ | 6 | 7 |
| $(O_1, 0), (0, O_2)$ | $\tilde{W}_{s_1i_{1,1}+p_1,s_1i_{1,1}+p_1+\delta_1,s_2i_{1,2},s_2i_{1,2}+\delta_2}^{(3)}$ | $\tilde{W}_{s_1i_{1,1}+p_1+\delta_1,s_1i_{1,1}+p_1,s_2i_{1,2}+\delta_2,s_2i_{1,2}}^{(3)}$ |
| | $i_2$ | |
| $(\delta_1, \delta_2)$ | 8 | 9 |
| $(O_1, 0), (0, O_2)$ | $W_{s_1i_{1,1},s_1i_{1,1}+\delta_1,s_2i_{1,2}+p_2,s_2i_{1,2}+\delta_2+p_2}^{(3)}$ | $W_{s_1i_{1,1}+\delta_1,s_1i_{1,1},s_2i_{1,2}+\delta_2+p_2,s_2i_{1,2}+p_2}^{(3)}$ |
| | $i_2$ | |
| $(\delta_1, \delta_2)$ | 10 | 11 |
| $(O_1, 0), (0, O_2)$ | $\tilde{W}_{s_1i_{1,1},s_1i_{1,1}+\delta_1,s_2i_{1,2}+p_2,s_2i_{1,2}+\delta_2+p_2}^{(3)}$ | $\tilde{W}_{s_1i_{1,1}+\delta_1,s_1i_{1,1},s_2i_{1,2}+\delta_2+p_2,s_2i_{1,2}+p_2}^{(3)}$ |
| | $i_2$ | |
| $(\delta_1, \delta_2)$ | 12 | 13 |
| $(O_1, 0), (0, O_2)$ | $W_{s_1i_{1,1}+p_1,s_1i_{1,1}+p_1+\delta_1,s_2i_{1,2}+p_2,s_2i_{1,2}+\delta_2+p_2}^{(3)}$ | $W_{s_1i_{1,1}+p_1,+\delta_1,s_1i_{1,1}+p_1,s_2i_{1,2}+\delta_2+p_2,s_2i_{1,2}+p_2}^{(3)}$ |

-continued

| | $i_2$ | |
|---|---|---|
| $(\delta_1, \delta_2)$ | 14 | 15 |
| $(O_1, 0), (0, O_2)$ | $\tilde{W}^{(3)}_{s_1 i_{1,1}+p_1, s_1 i_{1,1}+p_1+\delta_1, s_2 i_{1,2}+p_2, s_2 i_{1,2}+\delta_2+p_2}$ | $\tilde{W}^{(3)}_{s_1 i_{1,1}+p_1+\delta_1, s_1 i_{1,1}+p_1, s_2 i_{1,2}+\delta_2+p_2, s_2 i_{1,2}+p_2}$ |

where $W^{(3)}_{l,l',m,m'} = \frac{1}{\sqrt{3P}}\begin{bmatrix} v_{l,m} & v_{l,m} & v_{l',m'} \\ v_{l,m} & -v_{l,m} & -v_{l',m'} \end{bmatrix}$ and $\tilde{W}^{(3)}_{l,l',m,m'} = \frac{1}{\sqrt{3P}}\begin{bmatrix} v_{l,m} & v_{l',m'} & v_{l',m'} \\ v_{l,m} & v_{l',m'} & -v_{l',m'} \end{bmatrix}$, if $N_1 \geq N_2$ $(s_1, s_2) = \left(\frac{O_1}{2}, \frac{O_2}{2}\right)$ and $(p_1, p_2) = \left(\frac{O_1}{4}, \frac{O_2}{4}\right)$.

Value of codebook-config = 3

$i_{1,1} = 0, 1, \ldots, 2N_1 - 1$
$i_{1,2} = 0, 1, \ldots, 2N_2 - 1$

| | $i_2$ | |
|---|---|---|
| $(\delta_1, \delta_2)$ | 0 | 1 |
| $(O_1, 0), (0, O_2)$ | $W^{(3)}_{s_1 i_{1,1}+2p_1, s_1 i_{1,1}+2p_1+\delta_1, s_2 i_{1,2}, s_2 i_{1,2}+\delta_2}$ | $W^{(3)}_{s_1 i_{1,1}+2p_1+\delta_1, s_1 i_{1,1}+2p_1, s_2 i_{1,2}+\delta_2, s_2 i_{1,2}}$ |

| | $i_2$ | |
|---|---|---|
| $(\delta_1, \delta_2)$ | 2 | 3 |
| $(O_1, 0), (0, O_2)$ | $\tilde{W}^{(3)}_{s_1 i_{1,1}+2p_1, s_1 i_{1,1}+2p_1+\delta_1, s_2 i_{1,2}, s_2 i_{1,2}+\delta_2}$ | $\tilde{W}^{(3)}_{s_1 i_{1,1}+2p_1+\delta_1, s_1 i_{1,1}+2p_1, s_2 i_{1,2}+\delta_2, s_2 i_{1,2}}$ |

| | $i_2$ | |
|---|---|---|
| $(\delta_1, \delta_2)$ | 4 | 5 |
| $(O_1, 0), (0, O_2)$ | $W^{(3)}_{s_1 i_{1,1}+3p_1, s_1 i_{1,1}+3p_1+\delta_1, s_2 i_{1,2}, s_2 i_{1,2}+\delta_2}$ | $W^{(3)}_{s_1 i_{1,1}+3p_1+\delta_1, s_1 i_{1,1}+3p_1, s_2 i_{1,2}+\delta_2, s_2 i_{1,2}}$ |

| | $i_2$ | |
|---|---|---|
| $(\delta_1, \delta_2)$ | 6 | 7 |
| $(O_1, 0), (0, O_2)$ | $\tilde{W}^{(3)}_{s_1 i_{1,1}+3p_1, s_1 i_{1,1}+3p_1+\delta_1, s_2 i_{1,2}, s_2 i_{1,2}+\delta_2}$ | $\tilde{W}^{(3)}_{s_1 i_{1,1}+3p_1, s_1 i_{1,1}+3p_1, s_2 i_{1,2}+\delta_2, s_2 i_{1,2}}$ |

| | $i_2$ | |
|---|---|---|
| $(\delta_1, \delta_2)$ | 8 | 9 |
| $(O_1, 0), (0, O_2)$ | $W^{(3)}_{s_1 i_{1,1}, s_1 i_{1,1}+\delta_1, s_2 i_{1,2}+p_2, s_2 i_{1,2}+\delta_2+p_2}$ | $W^{(3)}_{s_1 i_{1,1}+\delta_1, s_1 i_{1,1}, s_2 i_{1,2}+\delta_2+p_2, s_2 i_{1,2}+p_2}$ |

| | $i_2$ | |
|---|---|---|
| $(\delta_1, \delta_2)$ | 10 | 11 |
| $(O_1, 0), (0, O_2)$ | $\tilde{W}^{(3)}_{s_1 i_{1,1}, s_1 i_{1,1}+\delta_1, s_2 i_{1,2}+p_2, s_2 i_{1,2}+\delta_2+p_2}$ | $\tilde{W}^{(3)}_{s_1 i_{1,1}+\delta_1, s_1 i_{1,1}, s_2 i_{1,2}+\delta_2+p_2, s_2 i_{1,2}+p_2}$ |

| | $i_2$ | |
|---|---|---|
| $(\delta_1, \delta_2)$ | 12 | 13 |
| $(O_1, 0), (0, O_2)$ | $W^{(3)}_{s_1 i_{1,1}+p_1, s_1 i_{1,1}+p_1+\delta_1, s_2 i_{1,2}+p_2, s_2 i_{1,2}+\delta_2+p_2}$ | $W^{(3)}_{s_1 i_{1,1}+p_1+\delta_1, s_1 i_{1,1}+p_1, s_2 i_{1,2}+\delta_2+p_2, s_2 i_{1,2}+p_2}$ |

| | $i_2$ | |
|---|---|---|
| $(\delta_1, \delta_2)$ | 14 | 15 |
| $(O_1, 0), (0, O_2)$ | $\tilde{W}^{(3)}_{s_1 i_{1,1}+p_1, s_1 i_{1,1}+p_1+\delta_1, s_2 i_{1,2}+p_2, s_2 i_{1,2}+\delta_2+p_2}$ | $\tilde{W}^{(3)}_{s_1 i_{1,1}+p_1+\delta_1, s_1 i_{1,1}+p_1, s_2 i_{1,2}+\delta_2+p_2, s_2 i_{1,2}+p_2}$ |

where $W^{(3)}_{l,l',m,m'} = \frac{1}{\sqrt{3P}}\begin{bmatrix} v_{l,m} & v_{l,m} & v_{l',m'} \\ v_{l,m} & -v_{l,m} & -v_{l',m'} \end{bmatrix}$ and $\tilde{W}^{(3)}_{l,l',m,m'} = \frac{1}{\sqrt{3P}}\begin{bmatrix} v_{l,m} & v_{l',m'} & v_{l',m'} \\ v_{l,m} & v_{l',m'} & -v_{l',m'} \end{bmatrix}$, if $N_1 \geq N_2$ $(s_1, s_2) = \left(O_1, \frac{O_2}{2}\right)$ and $(p_1, p_2) = \left(\frac{O_1}{4}, \frac{O_2}{4}\right)$.

Value of codebook-config = 4

$i_{1,1} = 0, 1, \ldots, N_1 - 1$
$i_{1,2} = 0, 1, \ldots, 4N_2 - 1$

-continued

| | $i_2$ | |
|---|---|---|
| $(\delta_1, \delta_2)$ | 0 | 1 |
| $(O_1, 0), (0, O_2)$ if $N_1, N_2 > 1$ $(O_1, 0), (2O_1, 0), (3O_1, 0)$ if $N_1 = 1$ $(0, O_2), (0, 2O_2), (0, 3O_2)$ if $N_2 = 1$ | $W_{s_1 i_{1,1}, s_1 i_{1,1}+\delta_1, s_2 i_{1,2}, s_2 i_{1,2}+\delta_2}^{(3)}$ | $W_{s_1 i_{1,1}+\delta_1, s_1 i_{1,1}, s_2 i_{1,2}+\delta_2, s_2 i_{1,2}}^{(3)}$ |

| | $i_2$ | |
|---|---|---|
| $(\delta_1, \delta_2)$ | 2 | 3 |
| $(O_1, 0), (0, O_2)$ if $N_1, N_2 > 1$ $(O_1, 0), (2O_1, 0), (3O_1, 0)$ if $N_1 = 1$ $(0, O_2), (0, 2O_2), (0, 3O_2)$ if $N_2 = 1$ | $\tilde{W}_{s_1 i_{1,1}, s_1 i_{1,1}+\delta_1, s_2 i_{1,2}, s_2 i_{1,2}+\delta_2}^{(3)}$ | $\tilde{W}_{s_1 i_{1,1}+\delta_1, s_1 i_{1,1}, s_2 i_{1,2}+\delta_2, s_2 i_{1,2}}^{(3)}$ |

| | $i_2$ | |
|---|---|---|
| $(\delta_1, \delta_2)$ | 4 | 5 |
| $(O_1, 0), (0, O_2)$ if $N_1, N_2 > 1$ $(O_1, 0), (2O_1, 0), (3O_1, 0)$ if $N_1 = 1$ $(0, O_2), (0, 2O_2), (0, 3O_2)$ if $N_2 = 1$ | $W_{s_1 i_{1,1}+p_1, s_1 i_{1,1}+p_1+\delta_1, s_2 i_{1,2}, s_2 i_{1,2}+\delta_2}^{(3)}$ | $W_{s_1 i_{1,1}+p_1+\delta_1, s_1 i_{1,1}+p_1, s_2 i_{1,2}+\delta_2, s_2 i_{1,2}}^{(3)}$ |

| | $i_2$ | |
|---|---|---|
| $(\delta_1, \delta_2)$ | 6 | 7 |
| $(O_1, 0), (0, O_2)$ if $N_1, N_2 > 1$ $(O_1, 0), (2O_1, 0), (3O_1, 0)$ if $N_1 = 1$ $(0, O_2), (0, 2O_2), (0, 3O_2)$ if $N_2 = 1$ | $\tilde{W}_{s_1 i_{1,1}+p_1, s_1 i_{1,1}+p_1+\delta_1, s_2 i_{1,2}, s_2 i_{1,2}+\delta_2}^{(3)}$ | $\tilde{W}_{s_1 i_{1,1}+p_1+\delta_1, s_1 i_{1,1}+p_1, s_2 i_{1,2}+\delta_2, s_2 i_{1,2}}^{(3)}$ |

| | $i_2$ | |
|---|---|---|
| $(\delta_1, \delta_2)$ | 8 | 9 |
| $(O_1, 0), (0, O_2)$ if $N_1, N_2 > 1$ $(O_1, 0), (2O_1, 0), (3O_1, 0)$ if $N_1 = 1$ $(0, O_2), (0, 2O_2), (0, 3O_2)$ if $N_2 = 1$ | $W_{s_1 i_{1,1}+2p_1, s_1 i_{1,1}+2p_1+\delta_1, s_2 i_{1,2}, s_2 i_{1,2}+\delta_2}^{(3)}$ | $W_{s_1 i_{1,1}+2p_1+\delta_1, s_1 i_{1,1}+2p_1, s_2 i_{1,2}+\delta_2, s_2 i_{1,2}}^{(3)}$ |

| | $i_2$ | |
|---|---|---|
| $(\delta_1, \delta_2)$ | 10 | 11 |
| $(O_1, 0), (0, O_2)$ if $N_1, N_2 > 1$ $(O_1, 0), (2O_1, 0), (3O_1, 0)$ if $N_1 = 1$ $(0,O_2), (0, 2O_2), (0, 3O_2)$ if $N_2 = 1$ | $\tilde{W}_{s_1 i_{1,1}+2p_1, s_1 i_{1,1}+2p_1+\delta_1, s_2 i_{1,2}, s_2 i_{1,2}+\delta_2}^{(3)}$ | $\tilde{W}_{s_1 i_{1,1}+2p_1+\delta_1, s_1 i_{1,1}+2p_1, s_2 i_{1,2}+\delta_2, s_2 i_{1,2}}^{(3)}$ |
| | $i_2$ | |
| $(\delta_1, \delta_2)$ | 12 | 13 |
| $(O_1, 0), (0, O_2)$ if $N_1, N_2 > 1$ $(O_1, 0), (2O_1, 0), (3O_1, 0)$ if $N_1 = 1$ $(0, O_2), (0, 2O_2), (0, 3O_2)$ if $N_2 = 1$ | $W_{s_1 i_{1,1}+3p_1, s_1 i_{1,1}+3p_1+\delta_1, s_2 i_{1,2}, s_2 i_{1,2}+\delta_2}^{(3)}$ | $W_{s_1 i_{1,1}+3p_1+\delta_1, s_1 i_{1,1}+3p_1, s_2 i_{1,2}+\delta_2, s_2 i_{1,2}}^{(3)}$ |

-continued

| | $i_2$ | |
|---|---|---|
| $(\delta_1, \delta_2)$ | 14 | 15 |
| $(O_1, 0), (0, O_2)$ if $N_1,N_2 > 1$<br>$(O_1, 0), (2O_1, 0), (3O_1, 0)$ if $N_1 = 1$<br>$(0,O_2), (0, 2O_2), (0, 3O_2)$ if $N_2 = 1$ | $\tilde{W}^{(3)}_{s_1 i_{1,1}+3p_1, s_1 i_{1,1}+3p_1,+\delta_1, s_2 i_{1,2}, s_2 i_{1,2}+\delta_2}$ | $\tilde{W}^{(3)}_{s_1 i_{1,1}+3p_1+\delta_1, s_1 i_{1,1}+3p_1, s_2 i_{1,2}+\delta_2, s_2 i_{1,2}}$ |

where $W^{(3)}_{l,l',m,m'} = \frac{1}{\sqrt{3P}}\begin{bmatrix} v_{l,m} & v_{l,m} & v_{l',m'} \\ v_{l,m} & -v_{l,m} & -v_{l',m'} \end{bmatrix}$ and $\tilde{W}^{(3)}_{l,l',m,m'} = \frac{1}{\sqrt{3P}}\begin{bmatrix} v_{l,m} & v_{l',m'} & v_{l',m'} \\ v_{l,m} & v_{l',m'} & -v_{l',m'} \end{bmatrix}$, if $N_1 \geq N_2$ $(s_1, s_2) = \left(O_1, \frac{O_2}{4}\right)$ and $(p_1, p_2) = \left(\frac{O_1}{4}, \frac{O_2}{4}\right)$.

15. The BS of claim 11, wherein the second PMI $i_2$ is determined according to a following codebook for 4-layer CST reporting:

| 4 Layers, Codebook-Config = 1, $N_1 > 1$, $N_2 > 1$ | | |
|---|---|---|
| $i_{1,1} = 0, 1, \ldots, O_1N_1 - 1$<br>$i_{1,2} = 0, 1, \ldots, O_2N_2 - 1$ | | |
| | $i_2$ | |
| $(\delta_1, \delta_2)$ | 0 | 1 |
| $(O_1, 0)$<br>$(0, O_2)$ | $W^{(4)}_{i_{1,1}, i_{1,1}+O_1, i_{1,2}, i_{1,2}, 0}$<br>$W^{(4)}_{i_{1,1}, i_{1,1}, i_{1,2}, i_{1,2}+O_2, 0}$ | $W^{(4)}_{i_{1,1}, i_{1,1}+O_1, i_{1,2}, i_{1,2}, 1}$<br>$W^{(4)}_{i_{1,1}, i_{1,1}, i_{1,2}, i_{1,2}+O_2, 0}$ |
| where $W^{(4)}_{l,l',m,m'} = \frac{1}{\sqrt{4P}}\begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$ | | |

| 4 Layers, , Codebook-Config = 1, $N_2 = 1$ | | |
|---|---|---|
| $i_{1,1} = 0, 1, \ldots, O_1N_1 - 1$<br>$i_{1,2} = 0, 1, \ldots, O_2N_2 - 1$ | | |
| | $i_2$ | |
| $(\delta_1, \delta_2)$ | 0 | 1 |
| $(O_1, 0)$<br>$(2O_1, 0)$<br>$(3O_1, 0)$ | $W^{(4)}_{i_{1,1}, i_{1,1}+O_1, 0, 0, 0}$<br>$W^{(4)}_{i_{1,1}, i_{1,1}+2O_1, 0, 0, 0}$<br>$W^{(4)}_{i_{1,1}, i_{1,1}+3O_1, 0, 0, 0}$ | $W^{(4)}_{i_{1,1}, i_{1,1}+O_1, 0, 0, 1}$<br>$W^{(4)}_{i_{1,1}, i_{1,1}+2O_1, 0, 0, 1}$<br>$W^{(4)}_{i_{1,1}, i_{1,1}+3O_1, 0, 0, 1}$ |
| where $W^{(4)}_{l,l',m,m'} = \frac{1}{\sqrt{4P}}\begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$ | | |

| Value of Codebook-Config = 2 | | |
|---|---|---|
| $i_{1,1} = 0, 1, \ldots, 2N_1 - 1$<br>$i_{1,2} = 0, 1, \ldots, 2N_2 - 1$ | | |
| | $i_2$ | |
| $(\delta_1, \delta_2)$ | 0 | 1 |
| $(O_1, 0), (0, O_2)$ | $W^{(4)}_{s_1 i_{1,1}, s_1 i_{1,1}+\delta_1, s_2 i_{1,2}, s_2 i_{1,2}+\delta_2, 0}$ | $W^{(4)}_{s_1 i_{1,1}, s_1 i_{1,1}+\delta_1, s_2 i_{1,2}, s_2 i_{1,2}+\delta_2, 1}$ |
| | $i_2$ | |
| $(\delta_1, \delta_2)$ | 2 | 3 |
| $(O_1, 0), (0, O_2)$ | $W^{(4)}_{s_1 i_{1,1}+p_1, s_1 i_{1,1}+p_1+\delta_1, s_2 i_{1,2}, s_2 i_{1,2}+\delta_2, 0}$ | $W^{(4)}_{s_1 i_{1,1}+p_1, s_1 i_{1,1}+p_1+\delta_1, s_2 i_{1,2}, s_2 i_{1,2}+\delta_2, 1}$ |

-continued

| $(\delta_1, \delta_2)$ | $i_2$ = 4 | $i_2$ = 5 |
|---|---|---|
| $(O_1, 0), (0, O_2)$ | $W^{(4)}_{s_1 i_{1,1}, s_1 i_{1,1}+\delta_1, s_2 i_{1,2}+p_2, s_2 i_{1,2}+\delta_2+p_2, 0}$ | $W^{(4)}_{s_1 i_{1,1}, s_1 i_{1,1}+\delta_1, s_2 i_{1,2}+p_2, s_2 i_{1,2}+\delta_2+p_2, 1}$ |

| $(\delta_1, \delta_2)$ | $i_2$ = 6 | $i_2$ = 7 |
|---|---|---|
| $(O_1, 0), (0, O_2)$ | $W^{(4)}_{s_1 i_{1,1}+p_1, s_1 i_{1,1}+p_1+\delta_1, s_2 i_{1,2}+p_2, s_2 i_{1,2}+\delta_2+p_2, 0}$ | $W^{(4)}_{s_1 i_{1,1}+p_1, s_1 i_{1,1}+p_1+\delta_1, s_2 i_{1,2}+p_2, s_2 i_{1,2}+\delta_2+p_2, 1}$ |

where $W^{(4)}_{l,l',m,m',n} = \frac{1}{\sqrt{4P}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$, $(s_1, s_2) = \left(\frac{O_1}{2}, \frac{O_2}{2}\right)$ and $(p_1, p_2) = \left(\frac{O_1}{4}, \frac{O_2}{4}\right)$.

Value of Codebook-Config = 3

$i_{1,1} = 0, 1, \ldots, 2N_1 - 1$
$i_{1,2} = 0, 1, \ldots, 2N_2 - 1$

| $(\delta_1, \delta_2)$ | $i_2$ = 0 | $i_2$ = 1 |
|---|---|---|
| $(O_1, 0), (0, O_2)$ | $W^{(4)}_{s_1 i_{1,1}+2p_1, s_1 i_{1,1}+2p_1+\delta_1, s_2 i_{1,2}, s_2 i_{1,2}+\delta_2, 0}$ | $W^{(4)}_{s_1 i_{1,1}+2p_1, s_1 i_{1,1}+2p_1+\delta_1, s_2 i_{1,2}, s_2 i_{1,2}+\delta_2, 1}$ |

| $(\delta_1, \delta_2)$ | $i_2$ = 2 | $i_2$ = 3 |
|---|---|---|
| $(O_1, 0), (0, O_2)$ | $W^{(4)}_{s_1 i_{1,1}+3p_1, s_1 i_{1,1}+3p_1+\delta_1, s_2 i_{1,2}, s_2 i_{1,2}+\delta_2, 0}$ | $W^{(4)}_{s_1 i_{1,1}+3p_1, s_1 i_{1,1}+3p_1+\delta_1, s_2 i_{1,2}, s_2 i_{1,2}+\delta_2, 1}$ |

| $(\delta_1, \delta_2)$ | $i_2$ = 4 | $i_2$ = 5 |
|---|---|---|
| $(O_1, 0), (0, O_2)$ | $W^{(4)}_{s_1 i_{1,1}, s_1 i_{1,1}+\delta_1, s_2 i_{1,2}+p_2, s_2 i_{1,2}+\delta_2+p_2, 0}$ | $W^{(4)}_{s_1 i_{1,1}, s_1 i_{1,1}+\delta_1, s_2 i_{1,2}+p_2, s_2 i_{1,2}+\delta_2+p_2, 1}$ |

| $(\delta_1, \delta_2)$ | $i_2$ = 6 | $i_2$ = 7 |
|---|---|---|
| $(O_1, 0), (0, O_2)$ | $W^{(4)}_{s_1 i_{1,1}+p_1, s_1 i_{1,1}+p_1+\delta_1, s_2 i_{1,2}+p_2, s_2 i_{1,2}+\delta_2+p_2, 0}$ | $W^{(4)}_{s_1 i_{1,1}+p_1, s_1 i_{1,1}+p_1+\delta_1, s_2 i_{1,2}+p_2, s_2 i_{1,2}+\delta_2+p_2, 1}$ |

where $W^{(4)}_{l,l',m,m',n} = \frac{1}{\sqrt{4P}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$, $(s_1, s_2) = \left(O_1, \frac{O_2}{2}\right)$ and $(p_1, p_2) = \left(\frac{O_1}{4}, \frac{O_2}{4}\right)$, Value of Codebook-Config = 4

$i_{1,1} = 0, 1, \ldots, 2N_1 - 1$
$i_{1,2} = 0, 1, \ldots, 4N_2 - 1$

| $(\delta_1, \delta_2)$ | $(O_1,0), (0, O_2)$ if $N_1, N_2 > 1$<br>$(O_1,0), (2O_1,0), (3O_1,0)$, if $N_1 = 1$<br>$(0, O_2), (0, 2O_2), (0, 3O_2)$, if $N_2 = 1$ |
|---|---|

| $i_2$ = 0 | $i_2$ = 1 |
|---|---|
| $W^{(4)}_{s_1 i_{1,1}, s_1 i_{1,1}+\delta_1, s_2 i_{1,2}, s_2 i_{1,2}+\delta_2, 0}$ | $W^{(4)}_{s_1 i_{1,1}, s_1 i_{1,1}+\delta_1, s_2 i_{1,2}, s_2 i_{1,2}+\delta_2, 1}$ |

| $i_2$ = 2 | $i_2$ = 3 |
|---|---|
| $W^{(4)}_{s_1 i_{1,1}+p_1, s_1 i_{1,1}+p_1+\delta_1, s_2 i_{1,2}, s_2 i_{1,2}+\delta_2, 0}$ | $W^{(4)}_{s_1 i_{1,1}+p_1, s_1 i_{1,1}+p_1+\delta_1, s_2 i_{1,2}, s_2 i_{1,2}+\delta_2, 1}$ |

| $i_2$ = 4 | $i_2$ = 5 |
|---|---|
| $W^{(4)}_{s_1 i_{1,1}+2p_1, s_1 i_{1,1}+2p_1+\delta_1, s_2 i_{1,2}, s_2 i_{1,2}+\delta_2, 0}$ | $W^{(4)}_{s_1 i_{1,1}+2p_1, s_1 i_{1,1}+2p_1+\delta_1, s_2 i_{1,2}, s_2 i_{1,2}+\delta_2, 1}$ |

-continued

| $i_2$ | |
|---|---|
| 6 | 7 |
| $W^{(4)}_{s_1 i_{1,1}+3p_1,\, s_1 i_{1,1}+3p_1+\delta_1,\, s_2 i_{1,2},\, s_2 i_{1,2}+\delta_2,\, 0}$ | $W^{(4)}_{s_1 i_{1,1}+3p_1,\, s_1 i_{1,1}+3p_1+\delta_1,\, s_2 i_{1,2},\, s_2 i_{1,2}+\delta_2,\, 1}$ |

where $W^{(4)}_{l,l',m,m',n} = \frac{1}{\sqrt{4P}}\begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$, $(s_1, s_2) = \left(O_1, \frac{O_2}{4}\right)$ and $(p_1, p_2) = \left(\frac{O_1}{4}, -\right)$.

16. The BS of claim 11, wherein the UE is configured with an orthogonal beam group type indicator ($\delta_1$, $\delta_2$) by a higher layer.

17. The BS of claim 16, wherein that the orthogonal beam type indicator ($\delta_1$, $\delta_2$) are reported jointly with the first PMI $i_{1,1}$ to the base station.

18. The BS of claim 1, wherein the second PMI $i_2$ is determined according to a following codebook for 5-layer and 6-layer CSI reporting for P=12 and 16 ports:

| $i_{1,1} = 0, 1, \ldots, 4N_1 - 1$<br>$i_{1,2} = 0, 1, \ldots, 4N_2 - 1$ | |
|---|---|
| Codebook-Config | $i_2$ |
| 2 | $W^{(5)}_{i_{1,1},i_{1,2}} = \frac{1}{\sqrt{5Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+O_1, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+O_1, s_2 i_{1,2}+O_2} \end{bmatrix}$<br>$W^{(6)}_{i_{1,1},i_{1,2}} = \frac{1}{\sqrt{6Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+O_1, s_2 i_{1,2}+O_2} & v_{s_1 i_{1,1}+O_1, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+O_1, s_2 i_{1,2}+O_2} & -v_{s_1 i_{1,1}+O_1, s_2 i_{1,2}+O_2} \end{bmatrix}$ |
| 3 | $W^{(5)}_{i_{1,1},i_{1,2}} = \frac{1}{\sqrt{5Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}+O_2} \end{bmatrix} N_1 \geq N_2$<br>$W^{(6)}_{i_{1,1},i_{1,2}} = \frac{1}{\sqrt{6Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}+O_2} & v_{s_1 i_{1,1}+2O_1, s_2 i_{1,2}+O_2} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}+O_2} & -v_{s_1 i_{1,1}+2O_1, s_2 i_{1,2}+O_2} \end{bmatrix} N_1 \geq N_2$ |
| 4 | $W^{(5)}_{i_{1,1},i_{1,2}} = \frac{1}{\sqrt{5Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}} \end{bmatrix} N_1 \geq N_2$<br>$W^{(6)}_{i_{1,1},i_{1,2}} = \frac{1}{\sqrt{6Q}}\begin{bmatrix} v_{s_1 i_{1,1}, s_2 i_{1,2}} & v_{s_1 i_{1,1}, s_2 i_{1,2}} & v_{s_1 i_{1,1}+O_1, s_2 i_{1,2}} & v_{s_1 i_{1,1}+O_1, s_2 i_{1,2}} & v_{s_1 i_{1,1}+2O_1, s_2 i_{1,2}} & v_{s_1 i_{1,1}+2O_1, s_2 i_{1,2}} \\ v_{s_1 i_{1,1}, s_2 i_{1,2}} & -v_{s_1 i_{1,1}, s_2 i_{1,2}} & v_{s_1 i_{1,1}+O_1, s_2 i_{1,2}} & -v_{s_1 i_{1,1}+O_1, s_2 i_{1,2}} & v_{s_1 i_{1,1}+2O_1, s_2 i_{1,2}} & -v_{s_1 i_{1,1}+2O_1, s_2 i_{1,2}} \end{bmatrix} N_1 \geq N_2.$ |

19. The BS of claim 11, wherein the second PMI $i_2$ is determined according to a following codebook for 7-layer and 8-layer CSI reporting for P=16 ports:

| Codebook-Config | $i_{1,1} = 0, 1, \ldots, 4N_1 - 1$ <br> $i_{1,2} = 0, 1, \ldots, 4N_2 - 1$ <br> $i_2$ |
|---|---|
| 2 | $W^{(7)}_{i_{1,1},i_{1,2}} = \frac{1}{\sqrt{7Q}}\begin{bmatrix} v_{s_1 i_{1,1},s_2 i_{1,2}} & v_{s_1 i_{1,1},s_2 i_{1,2}} & v_{s_1 i_{1,1}+O_1,s_2 i_{1,2}} & v_{s_1 i_{1,1}+O_1,s_2 i_{1,2}} & v_{s_1 i_{1,1}+O_1,s_2 i_{1,2}+O_2} & v_{s_1 i_{1,1}+O_1,s_2 i_{1,2}+O_2} & v_{s_1 i_{1,1},s_2 i_{1,2}+O_2} \\ v_{s_1 i_{1,1},s_2 i_{1,2}} & -v_{s_1 i_{1,1},s_2 i_{1,2}} & v_{s_1 i_{1,1}+O_1,s_2 i_{1,2}} & -v_{s_1 i_{1,1}+O_1,s_2 i_{1,2}} & v_{s_1 i_{1,1}+O_1,s_2 i_{1,2}+O_2} & -v_{s_1 i_{1,1}+O_1,s_2 i_{1,2}+O_2} & v_{s_1 i_{1,1},s_2 i_{1,2}+O_2} \end{bmatrix}$ <br> $W^{(8)}_{i_{1,1},i_{1,2}} = \frac{1}{\sqrt{8Q}}\begin{bmatrix} v_{s_2 i_{1,2},s_1 i_{1,1}} & v_{s_2 i_{1,2},s_1 i_{1,1}} & v_{s_2 i_{1,2},s_1 i_{1,1}+O_1} & v_{s_2 i_{1,2},s_1 i_{1,1}+O_1} & v_{s_2 i_{1,2}+O_2,s_1 i_{1,1}+O_1} & v_{s_2 i_{1,2}+O_2,s_1 i_{1,1}+O_1} & v_{s_2 i_{1,2}+O_2,s_1 i_{1,1}} & v_{s_2 i_{1,2}+O_2,s_1 i_{1,1}} \\ v_{s_2 i_{1,2},s_1 i_{1,1}} & -v_{s_2 i_{1,2},s_1 i_{1,1}} & v_{s_2 i_{1,2},s_1 i_{1,1}+O_1} & -v_{s_2 i_{1,2},s_1 i_{1,1}+O_1} & v_{s_2 i_{1,2}+O_2,s_1 i_{1,1}+O_1} & -v_{s_2 i_{1,2}+O_2,s_1 i_{1,1}+O_1} & v_{s_2 i_{1,2}+O_2,s_1 i_{1,1}} & -v_{s_2 i_{1,2}+O_2,s_1 i_{1,1}} \end{bmatrix}$ |
| 3 | $W^{(7)}_{i_{1,1},i_{1,2}} = \frac{1}{\sqrt{7Q}}\begin{bmatrix} v_{s_1 i_{1,1},s_2 i_{1,2}} & v_{s_1 i_{1,1},s_2 i_{1,2}} & v_{s_1 i_{1,1}+O_1,s_2 i_{1,2}} & v_{s_1 i_{1,2}+O_1,s_2 i_{1,2}} & v_{s_1 i_{1,1}+2O_1,s_2 i_{1,2}+O_2} & v_{s_1 i_{1,1}+2O_1,s_2 i_{1,2}+O_2} & v_{s_1 i_{1,1}+3O_1,s_2 i_{1,2}+O_2} \\ v_{s_1 i_{1,1},s_2 i_{1,2}} & -v_{s_1 i_{1,1},s_2 i_{1,2}} & v_{s_1 i_{1,1}+O_1,s_2 i_{1,2}} & -v_{s_1 i_{1,1}+O_1,s_2 i_{1,2}} & v_{s_1 i_{1,1}+2O_1,s_2 i_{1,2}+O_2} & -v_{s_1 i_{1,1}+2O_1,s_2 i_{1,2}+O_2} & v_{s_1 i_{1,1}+3O_1,s_2 i_{1,2}+O_2} \end{bmatrix} N_1 \geq N_2$ <br> $W^{(8)}_{i_{1,1},i_{1,2}} = \frac{1}{\sqrt{8Q}}\begin{bmatrix} v_{s_2 i_{1,2},s_1 i_{1,1}} & v_{s_2 i_{1,2},s_1 i_{1,1}} & v_{s_2 i_{1,2},s_1 i_{1,1}+O_1} & v_{s_2 i_{1,2},s_1 i_{1,1}+O_1} & v_{s_2 i_{1,2}+2O_2,s_1 i_{1,1}+O_1} & v_{s_2 i_{1,2}+2O_2,s_1 i_{1,1}+O_1} & v_{s_2 i_{1,2}+3O_2,s_1 i_{1,1}+O_1} & v_{s_2 i_{1,2}+3O_2,s_1 i_{1,1}+O_1} \\ v_{s_2 i_{1,2},s_1 i_{1,1}} & -v_{s_2 i_{1,2},s_1 i_{1,1}} & v_{s_2 i_{1,2},s_1 i_{1,1}+O_1} & -v_{s_2 i_{1,2},s_1 i_{1,1}+O_1} & v_{s_2 i_{1,2}+2O_2,s_1 i_{1,1}+O_1} & -v_{s_2 i_{1,2}+2O_2,s_1 i_{1,1}+O_1} & v_{s_2 i_{1,2}+3O_2,s_1 i_{1,1}+O_1} & -v_{s_2 i_{1,2}+3O_2,s_1 i_{1,1}+O_1} \end{bmatrix} N_1 \geq N_2$ |
| 4 | $W^{(7)}_{i_{1,1},i_{1,2}} = \frac{1}{\sqrt{7Q}}\begin{bmatrix} v_{s_1 i_{1,1},s_2 i_{1,2}} & v_{s_1 i_{1,1},s_2 i_{1,2}} & v_{s_1 i_{1,1}+O_1,s_2 i_{1,2}} & v_{s_1 i_{1,1}+O_1,s_2 i_{1,2}} & v_{s_1 i_{1,1}+2O_1,s_2 i_{1,2}} & v_{s_1 i_{1,1}+2O_1,s_2 i_{1,2}} & v_{s_1 i_{1,1}+3O_1,s_2 i_{1,2}} \\ v_{s_1 i_{1,1},s_2 i_{1,2}} & -v_{s_1 i_{1,1},s_2 i_{1,2}} & v_{s_1 i_{1,1}+O_1,s_2 i_{1,2}} & -v_{s_1 i_{1,1}+O_1,s_2 i_{1,2}} & v_{s_1 i_{1,1}+2O_1,s_2 i_{1,2}} & -v_{s_1 i_{1,1}+2O_1,s_2 i_{1,2}} & v_{s_1 i_{1,1}+3O_1,s_2 i_{1,2}} \end{bmatrix} N_1 \geq N_2$ <br> $W^{(8)}_{i_{1,1},i_{1,2}} = \frac{1}{\sqrt{8Q}}\begin{bmatrix} v_{s_1 i_{1,1},s_2 i_{1,2}} & v_{s_1 i_{1,1},s_2 i_{1,2}} & v_{s_1 i_{1,1},+O_1,s_2 i_{1,2}} & v_{s_1 i_{1,1}+O_1,s_2 i_{1,2}} & v_{s_1 i_{1,1}+2O_2,s_2 i_{1,2}} & v_{s_1 i_{1,1}+2O_2,s_2 i_{1,2}} & v_{s_1 i_{1,1}+3O_2,s_2 i_{1,2}} & v_{s_1 i_{1,1}+3O_2,s_2 i_{1,2}} \\ v_{s_1 i_{1,1},s_2 i_{1,2}} & -v_{s_1 i_{1,1},s_2 i_{1,2}} & v_{s_1 i_{1,1}+O_1,s_2 i_{1,2}} & -v_{s_1 i_{1,1}+O_1,s_2 i_{1,2}} & v_{s_1 i_{1,1}+2O_2,s_2 i_{1,2}} & -v_{s_1 i_{1,1}+2O_2,s_2 i_{1,2}} & v_{s_1 i_{1,1}+3O_2,s_2 i_{1,2}} & -v_{s_1 i_{1,1}+3O_2,s_2 i_{1,2}} \end{bmatrix} N_1 \geq N_2.$ |

$$(S_1, S_2) = \left(O_1, \frac{O_2}{2}\right)$$

20. The BS of claim 11, wherein the second PMI $i_2$ is determined according to a following codebook for 7-layer and 8-layer CSI reporting for P=12 ports:

| | $i_{1,1} = 0, 1, \ldots, 4N_1 - 1$<br>$i_{1,2} = 0, 1, \ldots, 4N_2 - 1$ |
|---|---|
| Codebook-Config | $i_2$ |
| 2 | $W^{(7)}_{i_{1,1},i_{1,2}} = \frac{1}{\sqrt{7Q}} \begin{bmatrix} \mathrm{v}_{s_1 i_{1,1}, s_2 i_{1,2}} & \mathrm{v}_{s_1 i_{1,1}, s_2 i_{1,2}} & \mathrm{v}_{s_1 i_{1,1}+O_1, s_2 i_{1,2}} & \mathrm{v}_{s_1 i_{1,1}+O_1, s_2 i_{1,2}} \\ \mathrm{v}_{s_1 i_{1,1}+O_1, s_2 i_{1,2}+O_2} & \mathrm{v}_{s_1 i_{1,1}+O_1, s_2 i_{1,2}+O_2} & \mathrm{v}_{s_1 i_{1,1}, s_2 i_{1,2}+O_2} & \\ \mathrm{v}_{s_1 i_{1,1}, s_2 i_{1,2}} & -\mathrm{v}_{s_1 i_{1,1}, s_2 i_{1,2}} & \mathrm{v}_{s_1 i_{1,1}+O_1, s_2 i_{1,2}} & -\mathrm{v}_{s_1 i_{1,1}+O_1, s_2 i_{1,2}} \\ \mathrm{v}_{s_1 i_{1,1}+O_1, s_2 i_{1,2}+O_2} & -\mathrm{v}_{s_1 i_{1,1}+O_1, s_2 i_{1,2}+O_2} & \mathrm{v}_{s_1 i_{1,1}, s_2 i_{1,2}+O_2} & \end{bmatrix}$<br>$W^{(8)}_{i_{1,1},i_{1,2}} = \frac{1}{\sqrt{8Q}} \begin{bmatrix} \mathrm{v}_{s_1 i_{1,1}, s_2 i_{1,2}} & \mathrm{v}_{s_1 i_{1,1}, s_2 i_{1,2}} & \mathrm{v}_{s_1 i_{1,1}+O_1, s_2 i_{1,2}} & \mathrm{v}_{s_1 i_{1,1}+O_1, s_2 i_{1,2}} \\ \mathrm{v}_{s_1 i_{1,1}+O_1, s_2 i_{1,2}+O_2} & \mathrm{v}_{s_1 i_{1,1}+O_1, s_2 i_{1,2}+O_2} & \mathrm{v}_{s_1 i_{1,1}, s_2 i_{1,2}+O_2} & \mathrm{v}_{s_1 i_{1,1}, s_2 i_{1,2}+O_2} \\ \mathrm{v}_{s_1 i_{1,1}, s_2 i_{1,2}} & -\mathrm{v}_{s_1 i_{1,1}, s_2 i_{1,2}} & \mathrm{v}_{s_1 i_{1,1}+O_1, s_2 i_{1,2}} & -\mathrm{v}_{s_1 i_{1,1}+O_1, s_2 i_{1,2}} \\ \mathrm{v}_{s_1 i_{1,1}+O_1, s_2 i_{1,2}+O_2} & -\mathrm{v}_{s_1 i_{1,1}+2O_1, s_2 i_{1,2}+O_2} & \mathrm{v}_{s_1 i_{1,1}, s_2 i_{1,2}+O_2} & -\mathrm{v}_{s_1 i_{1,1}, s_2 i_{1,2}+O_2} \end{bmatrix}$ |
| 3 | $W^{(7)}_{i_{1,1},i_{1,2}} = \frac{1}{\sqrt{7Q}} \begin{bmatrix} \mathrm{v}_{s_1 i_{1,1}, s_2 i_{1,2}} & \mathrm{v}_{s_1 i_{1,1}, s_2 i_{1,2}} & \mathrm{v}_{s_1 i_{1,1}+O_1, s_2 i_{1,2}} & \mathrm{v}_{s_1 i_{1,1}+O_1, s_2 i_{1,2}} \\ \mathrm{v}_{s_1 i_{1,1}+2O_1, s_2 i_{1,2}+O_2} & \mathrm{v}_{s_1 i_{1,1}+2O_1, s_2 i_{1,2}+O_2} & \mathrm{v}_{s_1 i_{1,1}+O_1, s_2 i_{1,2}+O_2} & \\ \mathrm{v}_{s_1 i_{1,1}, s_2 i_{1,2}} & -\mathrm{v}_{s_1 i_{1,1}, s_2 i_{1,2}} & \mathrm{v}_{s_1 i_{1,1}+O_1, s_2 i_{1,2}} & -\mathrm{v}_{s_1 i_{1,1}+O_1, s_2 i_{1,2}} \\ \mathrm{v}_{s_1 i_{1,1}+2O_1, s_2 i_{1,2}+O_2} & -\mathrm{v}_{s_1 i_{1,1}+2O_1, s_2 i_{1,2}+O_2} & \mathrm{v}_{s_1 i_{1,1}+O_1, s_2 i_{1,2}+O_2} & \end{bmatrix} N_1 \geq N_2$<br>$W^{(8)}_{i_{1,1},i_{1,2}} = \frac{1}{\sqrt{8Q}} \begin{bmatrix} \mathrm{v}_{s_1 i_{1,1}, s_2 i_{1,2}} & \mathrm{v}_{s_1 i_{1,1}, s_2 i_{1,2}} & \mathrm{v}_{s_1 i_{1,1}+O_1, s_2 i_{1,2}} & \mathrm{v}_{s_1 i_{1,1}+O_1, s_2 i_{1,2}} \\ \mathrm{v}_{s_1 i_{1,1}+2O_1, s_2 i_{1,2}+O_2} & \mathrm{v}_{s_1 i_{1,1}+2O_1, s_2 i_{1,2}+O_2} & \mathrm{v}_{s_1 i_{1,1}+O_1, s_2 i_{1,2}+O_2} & \mathrm{v}_{s_1 i_{1,1}+O_1, s_2 i_{1,2}+O_2} \\ \mathrm{v}_{s_1 i_{1,1}, s_2 i_{1,2}} & -\mathrm{v}_{s_1 i_{1,1}, s_2 i_{1,2}} & \mathrm{v}_{s_1 i_{1,1}+O_1, s_2 i_{1,2}} & -\mathrm{v}_{s_1 i_{1,1}+O_1, s_2 i_{1,2}} \\ \mathrm{v}_{s_1 i_{1,1}+2O_1, s_2 i_{1,2}+O_2} & -\mathrm{v}_{s_1 i_{1,1}+2O_1, s_2 i_{1,2}+O_2} & \mathrm{v}_{s_1 i_{1,1}+O_1, s_2 i_{1,2}+O_2} & -\mathrm{v}_{s_1 i_{1,1}+O_1, s_2 i_{1,2}+O_2} \end{bmatrix} N_1 \geq N_2$ |
| 4 | $W^{(7)}_{i_{1,1},i_{1,2}} = \frac{1}{\sqrt{7Q}} \begin{bmatrix} \mathrm{v}_{s_1 i_{1,1}, s_2 i_{1,2}} & \mathrm{v}_{s_1 i_{1,1}, s_2 i_{1,2}} & \mathrm{v}_{s_1 i_{1,1}+O_1, s_2 i_{1,2}} & \mathrm{v}_{s_1 i_{1,1}+O_1, s_2 i_{1,2}} \\ \mathrm{v}_{s_1 i_{1,1}+2O_1, s_2 i_{1,2}} & \mathrm{v}_{s_1 i_{1,1}+2O_1, s_2 i_{1,2}} & \mathrm{v}_{s_1 i_{1,1}, s_2 i_{1,2}+O_2} & \\ \mathrm{v}_{s_1 i_{1,1}, s_2 i_{1,2}} & -\mathrm{v}_{s_1 i_{1,1}, s_2 i_{1,2}} & \mathrm{v}_{s_1 i_{1,1}+O_1, s_2 i_{1,2}} & -\mathrm{v}_{s_1 i_{1,1}+O_1, s_2 i_{1,2}} \\ \mathrm{v}_{s_1 i_{1,1}+2O_1, s_2 i_{1,2}} & -\mathrm{v}_{s_1 i_{1,1}+2O_1, s_2 i_{1,2}} & \mathrm{v}_{s_1 i_{1,1}, s_2 i_{1,2}+O_2} & \end{bmatrix} N_1 \geq N_2$<br>$W^{(8)}_{i_{1,1},i_{1,2}} = \frac{1}{\sqrt{8Q}} \begin{bmatrix} \mathrm{v}_{s_1 i_{1,1}, s_2 i_{1,2}} & \mathrm{v}_{s_1 i_{1,1}, s_2 i_{1,2}} & \mathrm{v}_{s_1 i_{1,1}+O_1, s_2 i_{1,2}} & \mathrm{v}_{s_1 i_{1,1}+O_1, s_2 i_{1,2}} \\ \mathrm{v}_{s_1 i_{1,1}+2O_1, s_2 i_{1,2}} & \mathrm{v}_{s_1 i_{1,1}+2O_1, s_2 i_{1,2}} & \mathrm{v}_{s_1 i_{1,1}, s_2 i_{1,2}+O_2} & \mathrm{v}_{s_1 i_{1,1}, s_2 i_{1,2}+O_2} \\ \mathrm{v}_{s_1 i_{1,1}, s_2 i_{1,2}} & -\mathrm{v}_{s_1 i_{1,1}, s_2 i_{1,2}} & \mathrm{v}_{s_1 i_{1,1}+O_1, s_2 i_{1,2}} & -\mathrm{v}_{s_1 i_{1,1}+O_1, s_2 i_{1,2}} \\ \mathrm{v}_{s_1 i_{1,1}+2O_1, s_2 i_{1,2}} & -\mathrm{v}_{s_1 i_{1,1}+2O_1, s_2 i_{1,2}} & \mathrm{v}_{s_1 i_{1,1}, s_2 i_{1,2}+O_2} & -\mathrm{v}_{s_1 i_{1,1}, s_2 i_{1,2}+O_2} \end{bmatrix} N_1 \geq N_2.$ |

21. The UE of claim 1, wherein the controller is configured to cause the transceiver to transmit uplink signals containing the plurality of PMIs to the base station.

22. The UE of claim 1, wherein the skip numbers $(S_1, S_2)$ for rank 1 and 2 are defined as:

$(S_1, S_2)=(1,1)$ when the codebook subset selection configuration is equal to 1; and $(S_1, S_2)=(2, 2)$ when the codebook subset selection configuration is equal to 2, 3, and 4.

23. The UE of claim 22, wherein the skip numbers $(S_1, S_2)$ for rank 3 and 4 are defined as:

$(S_1, S_2)=(1,1)$ when the codebook subset selection configuration is equal to 1;

$$(S_1, S_2) = \left(\frac{O_1}{2}, \frac{O_2}{2}\right)$$

when the codebook subset selection configuration is equal to 2;

when the codebook subset selection configuration is equal to 3; and $$(S_1, S_2) = \left(O_1, \frac{O_2}{4}\right)$$

for the codebook subset selection configuration being equal to 4.

24. The UE of claim 23, wherein the skip numbers $(S_1, S_2)$ for rank 5 to 8 are defined as:

$(S_1, S_2)=(1,1)$ when the codebook subset selection configuration is equal to 1; and $$(S_1, S_2) = \left(\frac{O_1}{4}, \frac{O_2}{4}\right)$$

when the codebook subset selection configuration is equal to 2, 3, and 4.

25. The BS of claim 11, wherein the skip numbers $(S_1, S_2)$ for rank 1 and 2 are defined as:

$(S_1, S_2)=(1, 1)$ when the codebook subset selection configuration is equal to 1; and $(S_1, S_2)=(2, 2)$ when the codebook subset selection configuration is equal to 2, 3, and 4.

26. The BS of claim 25, wherein the skip numbers $(S_1, S_2)$ for rank 3 and 4 are defined as:

$(S_1, S_2)=(1, 1)$ when the codebook subset selection configuration is equal to 1;

$$(S_1, S_2) = \left(\frac{O_1}{2}, \frac{O_2}{2}\right)$$

when the codebook subset selection configuration is equal to 2;

$$(S_1, S_2) = \left(O_1, \frac{O_2}{2}\right)$$

when the codebook subset selection configuration is equal to 3; and $$(S_1, S_2) = \left(O_1, \frac{O_2}{4}\right)$$

for the codebook subset selection configuration being equal to 4.

27. The BS of claim 26, wherein for rank 5 to 8 are defined as: $(S_1, S_2)=(1, 1)$ when the codebook subset selection configuration is equal to 1; and $$(S_1, S_2) = \left(\frac{O_1}{4}, \frac{O_2}{4}\right)$$

when the codebook subset selection configuration is equal to 2, 3, and 4.

* * * * *